US011898731B2

(12) United States Patent
Ashraf et al.

(10) Patent No.: US 11,898,731 B2
(45) Date of Patent: Feb. 13, 2024

(54) BOUNDARY-MOUNTABLE LIGHTING SYSTEMS

(71) Applicant: Korrus, Inc., Los Angeles, CA (US)

(72) Inventors: Sana Ashraf, Glendale, CA (US); Jacob Hawkins, Sierra Madre, CA (US); Uriel Tekunoff, Los Angeles, CA (US); Marc Webster, Glendale, CA (US); Yicun Wu, Morgan Hill, CA (US); Robert Villegas, Glendora, CA (US)

(73) Assignee: KORRUS, INC., Los Angeles, CA (US)

( * ) Notice: Subject to any disclaimer, the term of this patent is extended or adjusted under 35 U.S.C. 154(b) by 0 days.

(21) Appl. No.: 18/304,680

(22) Filed: Apr. 21, 2023

(65) Prior Publication Data

US 2023/0383936 A1 Nov. 30, 2023

Related U.S. Application Data

(63) Continuation of application No. 17/659,288, filed on Apr. 14, 2022, now Pat. No. 11,674,675, which is a (Continued)

(51) Int. Cl.
*F21V 21/30* (2006.01)
*F21V 14/02* (2006.01)
(Continued)

(52) U.S. Cl.
CPC .............. *F21V 21/30* (2013.01); *F21V 14/02* (2013.01); *F21V 21/29* (2013.01); *F21V 29/70* (2015.01); *F21Y 2115/10* (2016.08)

(58) Field of Classification Search
CPC .......... F21V 21/30; F21V 21/29; F21V 29/70; F21V 14/02; F21Y 2115/10
See application file for complete search history.

(56) References Cited

U.S. PATENT DOCUMENTS 4,090,210 A 5/1978 Wehling
4,423,471 A 12/1983 Gordin
(Continued)

FOREIGN PATENT DOCUMENTS

EP 2118560 B1 5/2013

OTHER PUBLICATIONS

"ZUMTOBEL—Iyon Led Spotlight Catalog," downloaded on Oct. 19, 2015 from http://www.zumtobel.com/PDB/ Ressource/teaser/en/com/lyon.pdf, 40pp.

*Primary Examiner* — Anne M Hines
(74) *Attorney, Agent, or Firm* — BROWN & BROWN IP LAW; Jay M. Brown

(57) ABSTRACT

Lighting system including visible-light source with semiconductor light-emitting device, which may further include: pan assembly having pan ring, pinion gear, and central fixed gear; heat-sink, tilt assembly including tilt adjustment screw, leadscrew, and two spaced-apart panels defining tilt path for causing movement of heat-sink and visible-light source along tilt path; universal joint assembly including gimbal, swing bar with swing arms and being in threaded engagement with leadscrew, swing arms connected with visible-light source; support assembly configured for securing heat-sink and visible-light source together at plurality of selectable distances away from light emission aperture; heat-sink and visible-light source each having thermally-conductive surface, one surface having Dzus-type fastener button and another surface having Dzus-type cavity containing spring wire, for reversible attachment of heat-sink and visible-light source together; or power supply assembly, and receptacle for self-aligning reversible installation of power supply assembly, receptacle having guide walls with lead-ins.

11 Claims, 301 Drawing Sheets

100

Related U.S. Application Data continuation of application No. 16/398,724, filed on Apr. 30, 2019, now Pat. No. 11,402,087.

(60) Provisional application No. 62/665,957, filed on May 2, 2018.

(51) Int. Cl.

| | |
|---|---|
| ***F21V 21/29*** | (2006.01) |
| ***F21V 29/70*** | (2015.01) |
| *F21Y 115/10* | (2016.01) |

(56) References Cited

U.S. PATENT DOCUMENTS

| | | | | |
|---|---|---|---|---|
| 5,140,507 | A | 8/1992 | Harwood | |
| 5,325,281 | A | 6/1994 | Harwood | |
| 6,149,112 | A | 11/2000 | Thieltges | |
| 6,196,705 | B1 | 3/2001 | Finke | |
| 6,902,200 | B1 | 6/2005 | Beadle | |
| 6,948,823 | B2 | 9/2005 | Pohlert | |
| 7,098,397 | B2 | 8/2006 | Lange | |
| 7,712,926 | B2 | 5/2010 | Matheson | |
| 7,722,227 | B2 | 5/2010 | Zhang | |
| 7,862,214 | B2 | 1/2011 | Trott | |
| 7,934,860 | B2 | 5/2011 | Tsao | |
| 7,967,480 | B2 | 6/2011 | Pickard | |
| 8,002,438 | B2 | 8/2011 | Ko | |
| 8,104,934 | B2 | 1/2012 | Probasco | |
| 8,138,690 | B2 | 3/2012 | Chemel | |
| 8,172,436 | B2 | 5/2012 | Coleman | |
| 8,182,119 | B2 | 5/2012 | Trott | |
| 8,182,122 | B2 | 5/2012 | Chiu | |
| 8,232,745 | B2 | 7/2012 | Chemel | |
| 8,292,453 | B2 | 10/2012 | Trott | |
| 8,531,134 | B2 | 9/2013 | Chemel | |
| 8,536,802 | B2 | 9/2013 | Chemel | |
| 8,543,249 | B2 | 9/2013 | Chemel | |
| 8,552,664 | B2 | 10/2013 | Chemel | |
| 8,596,811 | B2 | 12/2013 | Trott | |
| 8,754,589 | B2 | 6/2014 | Chemel | |
| 8,805,550 | B2 | 8/2014 | Chemel | |
| 8,823,277 | B2 | 9/2014 | Chemel | |
| 8,841,859 | B2 | 9/2014 | Chemel | |
| 8,866,408 | B2 | 10/2014 | Chemel | |
| 8,888,696 | B2 | 11/2014 | Marka | |
| 8,954,170 | B2 | 2/2015 | Chemel | |
| 9,072,133 | B2 | 6/2015 | Chemel | |
| 9,125,254 | B2 | 9/2015 | Chemel | |
| 9,151,477 | B2 | 10/2015 | Pickard | |
| 9,395,056 | B2 | 7/2016 | Dixon | |
| 9,423,104 | B2 | 8/2016 | Durkee | |
| 9,618,162 | B2 | 4/2017 | Bendtsen | |
| 2005/0047170 | A1 | 3/2005 | Hilburger | |
| 2008/0170755 | A1 | 7/2008 | Nasser | |
| 2014/0313721 | A1 | 10/2014 | Morgan | |
| 2015/0219331 | A1 | 8/2015 | Clark | |
| 2015/0345762 | A1 | 12/2015 | Creasman | |
| 2017/0038046 | A1 * | 2/2017 | Bardot | F21V 21/15 |
| 2017/0292687 | A1 * | 10/2017 | Fujisawa | F21S 8/026 |

* cited by examiner

100a

100a

100b

100b

100b

100b

100c

100c

100c

100c

100d

100d

100d

100d

100

100

100

100

100

100

100

100

100

100

100

100

100

100

100

100

100

100

100

100

100

100

100

100

100

100

100

100

100

100

100

100

100

163

100

100

100

100

100

100

100

100

100

100

100

100

100

100

100

100

100

100

100

200

200

200

200

200

200

200

200

100

100

100

100

100

100

100

100

100

100

100

100

BOUNDARY-MOUNTABLE LIGHTING SYSTEMS

CROSS-REFERENCE TO RELATED APPLICATIONS

This application is a continuation of commonly-owned U.S. patent application Ser. No. 17/659,288 filed on Apr. 14, 2022 entitled “Boundary-Mountable Lighting Systems”, which is a continuation of commonly-owned U.S. patent application Ser. No. 16/398,724 filed on Apr. 30, 2019 which issued on Aug. 2, 2022 as U.S. Pat. No. 11,402,087 entitled “Boundary-Mountable Lighting Systems”, which claims the benefit of commonly-owned U.S. provisional patent application Ser. No. 62/665,957 filed on May 2, 2018, the entireties of all of the foregoing applications being hereby incorporated herein by reference.

BACKGROUND OF THE INVENTION

1. Field of the Invention

The present invention relates to the field of lighting systems that include semiconductor light-emitting devices, and processes related to such lighting systems.

2. Background of the Invention

Numerous lighting systems that include semiconductor light-emitting devices have been developed. As examples, some of such lighting systems may be suitable for mounting at a boundary such as a wall, ceiling or floor for example, so that light may be emitted by the semiconductor light-emitting devices for propagation away from the boundary. Despite the existence of these lighting systems, further improvements are still needed in lighting systems for mounting at a boundary, and in processes related to such lighting systems.

SUMMARY

In an example of an implementation, a lighting system is provided that includes a visible-light source including a semiconductor light-emitting device, the visible-light source being configured for generating visible-light emissions having a central light emission axis from the semiconductor light-emitting device. In this example, the lighting system may include a pan assembly having a pan ring, a pinion gear, and a central fixed gear. Further in this example of the lighting system, rotating the pinion gear may cause the pan ring to be rotated around a pan axis through a range of rotation around the central fixed gear.

In another example of an implementation, a lighting system is provided that includes a visible-light source including a semiconductor light-emitting device, the visible-light source being configured for generating visible-light emissions having a central light emission axis from the semiconductor light-emitting device. In this example, the lighting system may include a heat-sink being attached to the visible-light source. Further in this example, the lighting system may include a tilt assembly including a tilt adjustment screw, a leadscrew, and two spaced-apart panels each having an arcuate slot, the arcuate slots being mutually concentric and collectively defining an arcuate tilt path, the heat-sink being movably attached to the arcuate slots. Additionally in this example of the lighting system, the tilt adjustment screw may be configured for driving the leadscrew to cause movement of the heat-sink to a selected position along the tilt path; movement of the heat-sink along the tilt path may cause the visible-light source to be moved along the tilt path.

In a further example of an implementation, a lighting system is provided that includes a visible-light source including a semiconductor light-emitting device, the visible-light source being configured for generating visible-light emissions having a central light emission axis from the semiconductor light-emitting device. In this example, the lighting system may include a tilt adjustment screw, a leadscrew, and a universal joint assembly. Further in this example of the lighting system, the universal joint assembly may link together the tilt adjustment screw and the leadscrew. Additionally in this example of the lighting system, the universal joint assembly may include a gimbal and a swing bar having swing arms, the swing bar being in threaded engagement with the leadscrew, the tilt adjustment screw being attached to the gimbal. Also in this example of the lighting system, the swing arms may be connected with the visible-light source. Additionally in this example of the lighting system, the tilt adjustment screw may be configured for causing the universal joint assembly to drive the leadscrew for movement of the visible-light source to a selected position along a tilt path.

In an additional example of an implementation, a lighting system is provided that includes a visible-light source including a semiconductor light-emitting device, the visible-light source being configured for generating visible-light emissions having a central light emission axis from the semiconductor light-emitting device. In this example, the lighting system may include a light emission aperture being configured for causing the visible-light emissions to be emitted from the lighting system; and a heat-sink being attached to the visible-light source. Further in this example, the lighting system may include a support assembly being attached to the heat-sink or to the visible-light source, the support assembly being configured for securing the heat-sink and the visible-light source together at a plurality of selectable distances away from the light emission aperture.

In another example of an implementation, a lighting system is provided that includes a visible-light source including a semiconductor light-emitting device, the visible-light source being configured for generating visible-light emissions having a central light emission axis from the semiconductor light-emitting device, the visible-light source having a thermally-conductive surface. In this example, the lighting system may include a heat-sink having another thermally-conductive surface being configured for being placed in thermally-conductive contact with the thermally-conductive surface of the visible-light source. Additionally in this example of the lighting system, the another thermally-conductive surface of the heat sink may have a Dzus-type fastener button; and the thermally-conductive surface of the visible-light source may have a Dzus-type cavity containing a spring wire. Alternatively in this example of the lighting system, the another thermally-conductive surface of the heat sink may have a Dzus-type cavity containing a spring wire; and the thermally-conductive surface of the visible-light source may have a Dzus-type fastener button. Also in this example of the lighting system, the cavity may be adapted for receiving the fastener button and for rotation of the fastener button within the cavity to cause reversible deformation of the spring wire for reversibly locking together the visible-light source and the heat-sink.

In a further example of an implementation, a lighting system is provided that includes a visible-light source including a semiconductor light-emitting device, the visible-light source being configured for generating visible-light emissions having a central light emission axis from the semiconductor light-emitting device. In this example, the lighting system may include a power supply assembly including electrical circuitry for receiving a power input and a control signal input and for generating a power output being suitable for driving the semiconductor light-emitting device. Further in this example, the lighting system may include a receptacle for self-aligning reversible installation of the power supply assembly, the receptacle having guide walls with lead-ins.

Other systems, processes, features and advantages of the invention will be or will become apparent to one with skill in the art upon examination of the following figures and detailed description. It is intended that all such additional systems, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

Figure 1:
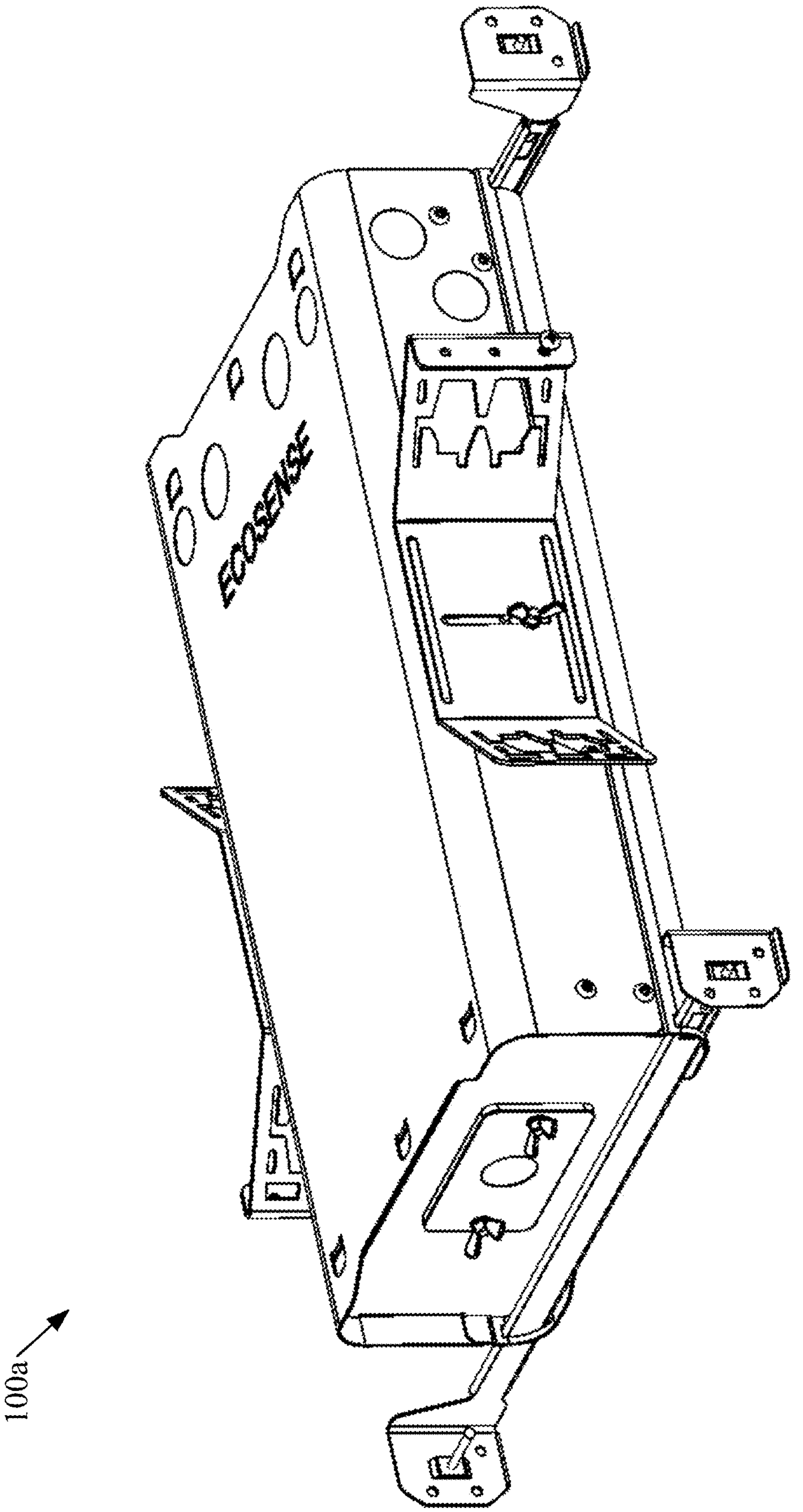
FIG. 1 on sheet 1 of the drawings is a screenshot of examples [100*a-d*] of the lighting system.
Figure 2:
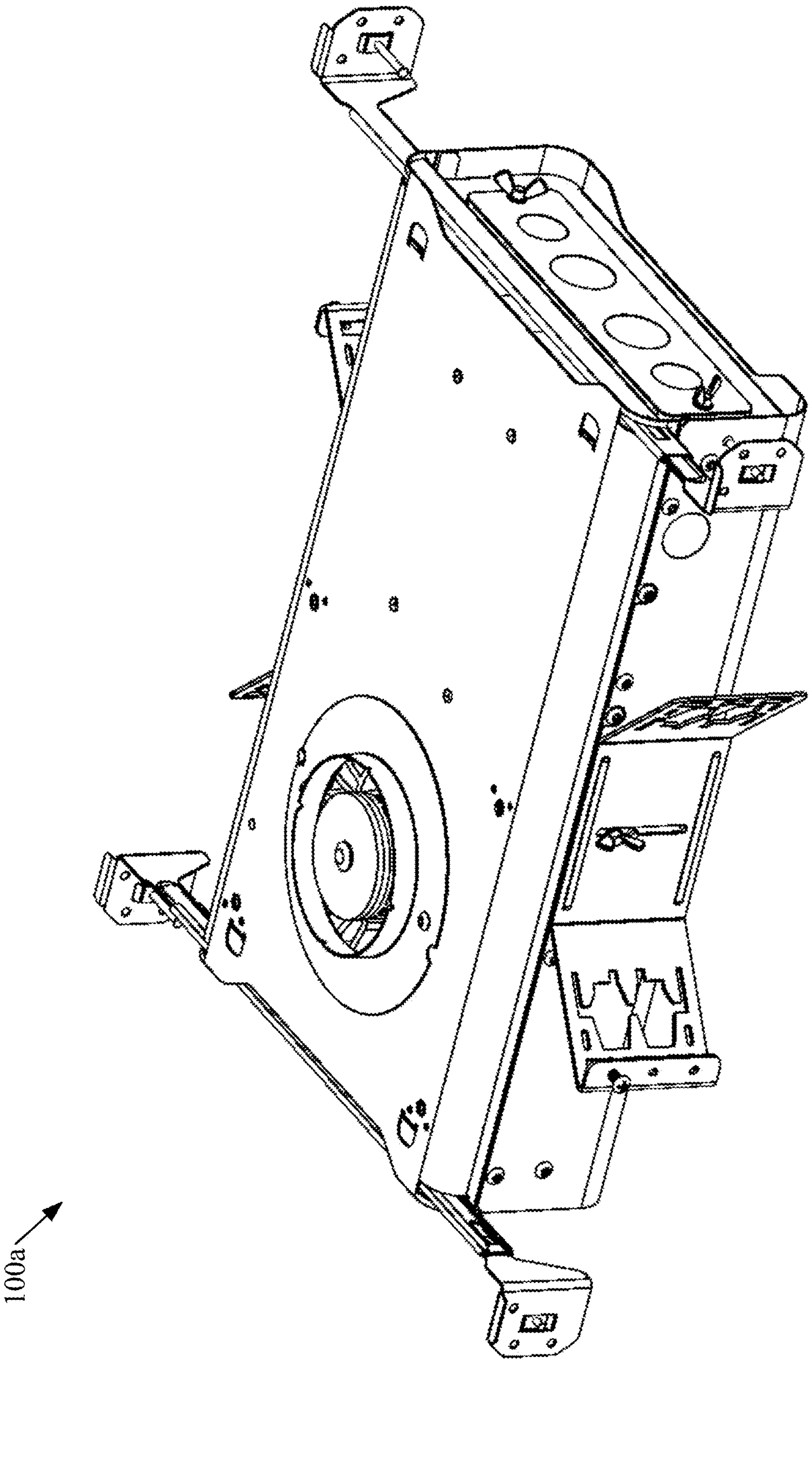
FIG. 2 on sheet 2 of the drawings is a screenshot of examples [100*a-d*] of the lighting system.
Figure 3:
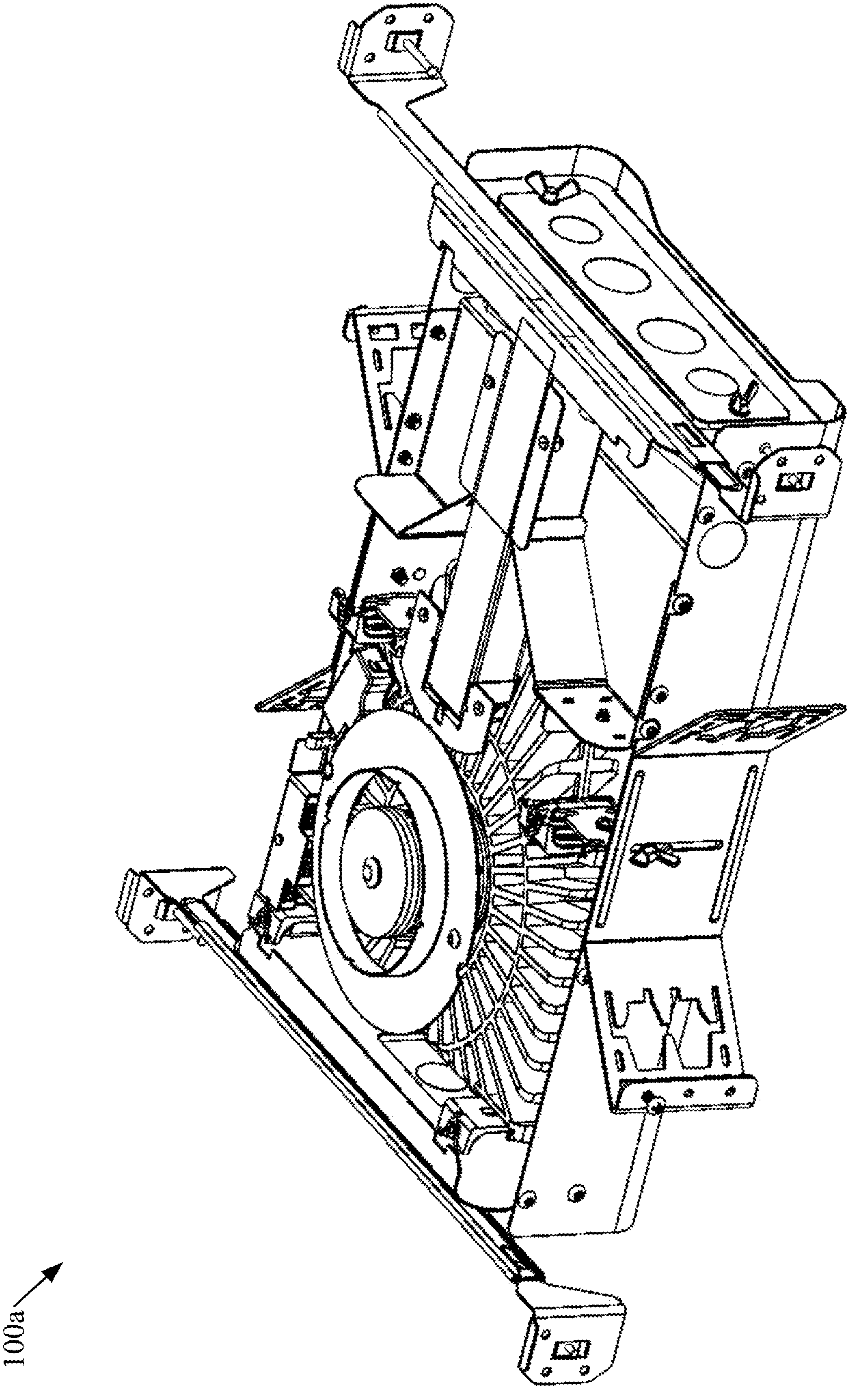
FIG. 3 on sheet 3 of the drawings is a screenshot of examples [100*a-d*] of the lighting system.
Figure 4:
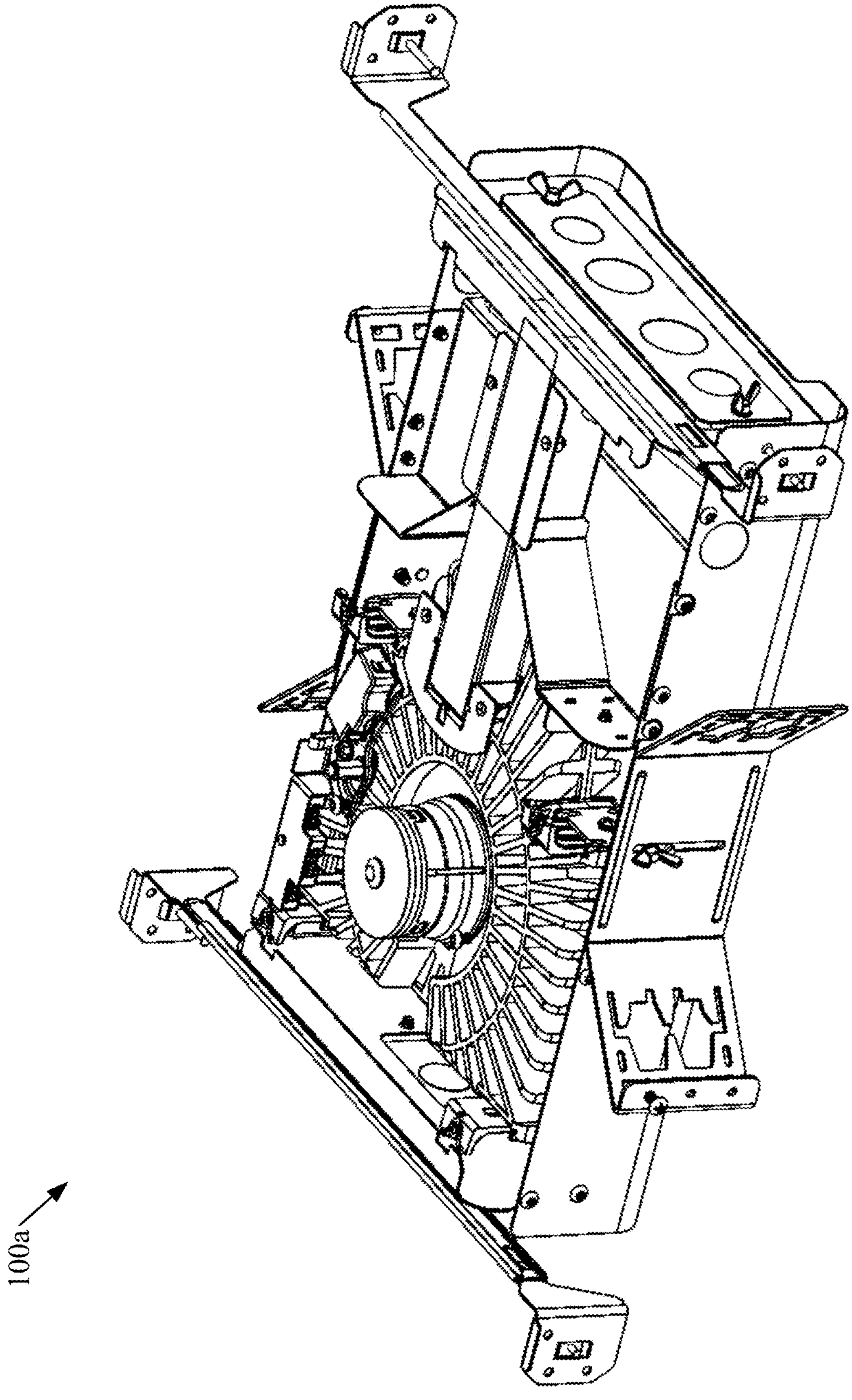
FIG. 4 on sheet 4 of the drawings is a screenshot of examples [100*a-d*] of the lighting system.
Figure 5:
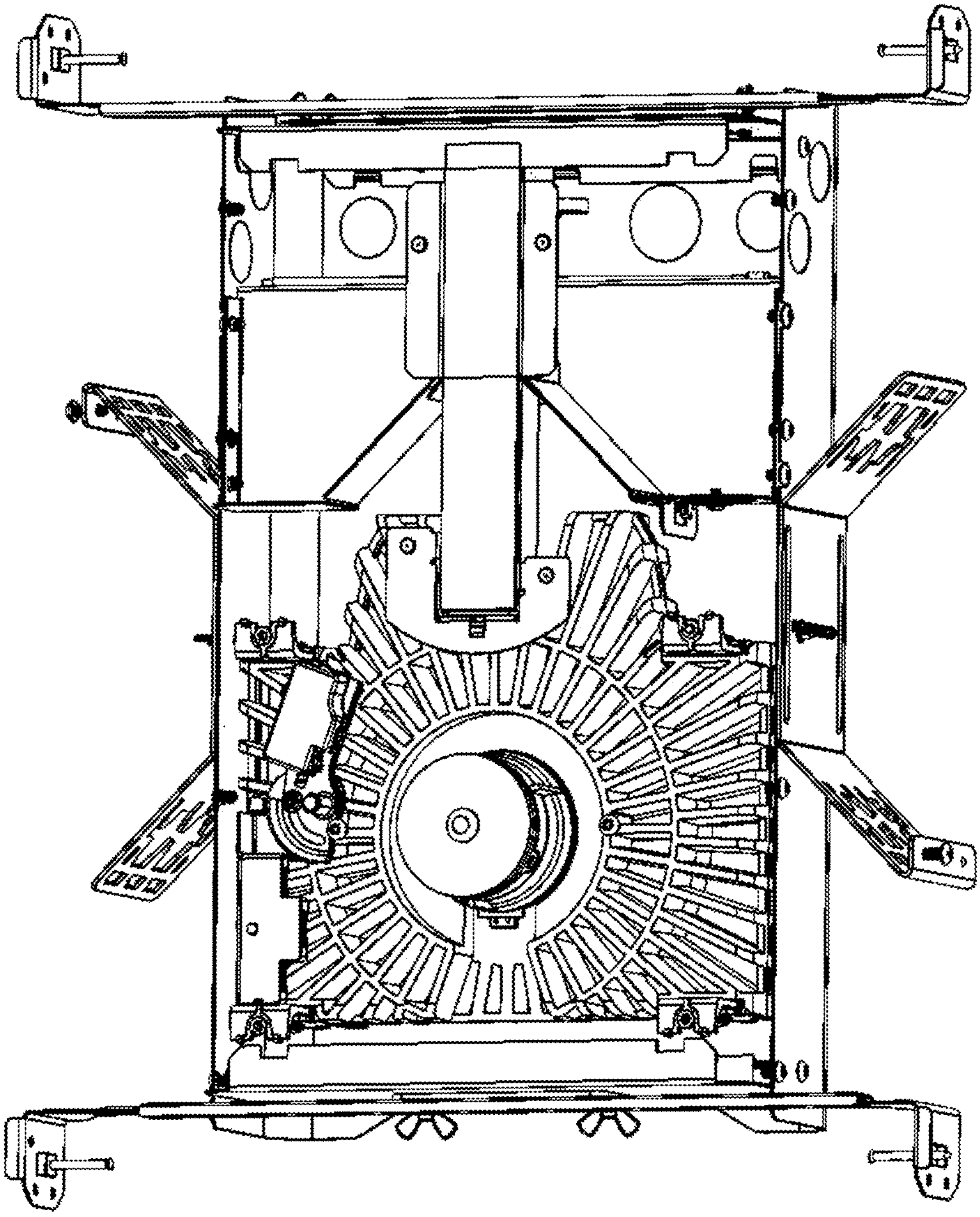
FIG. 5 on sheet 5 of the drawings is a screenshot of examples [100*a-d*] of the lighting system.
Figure 6:
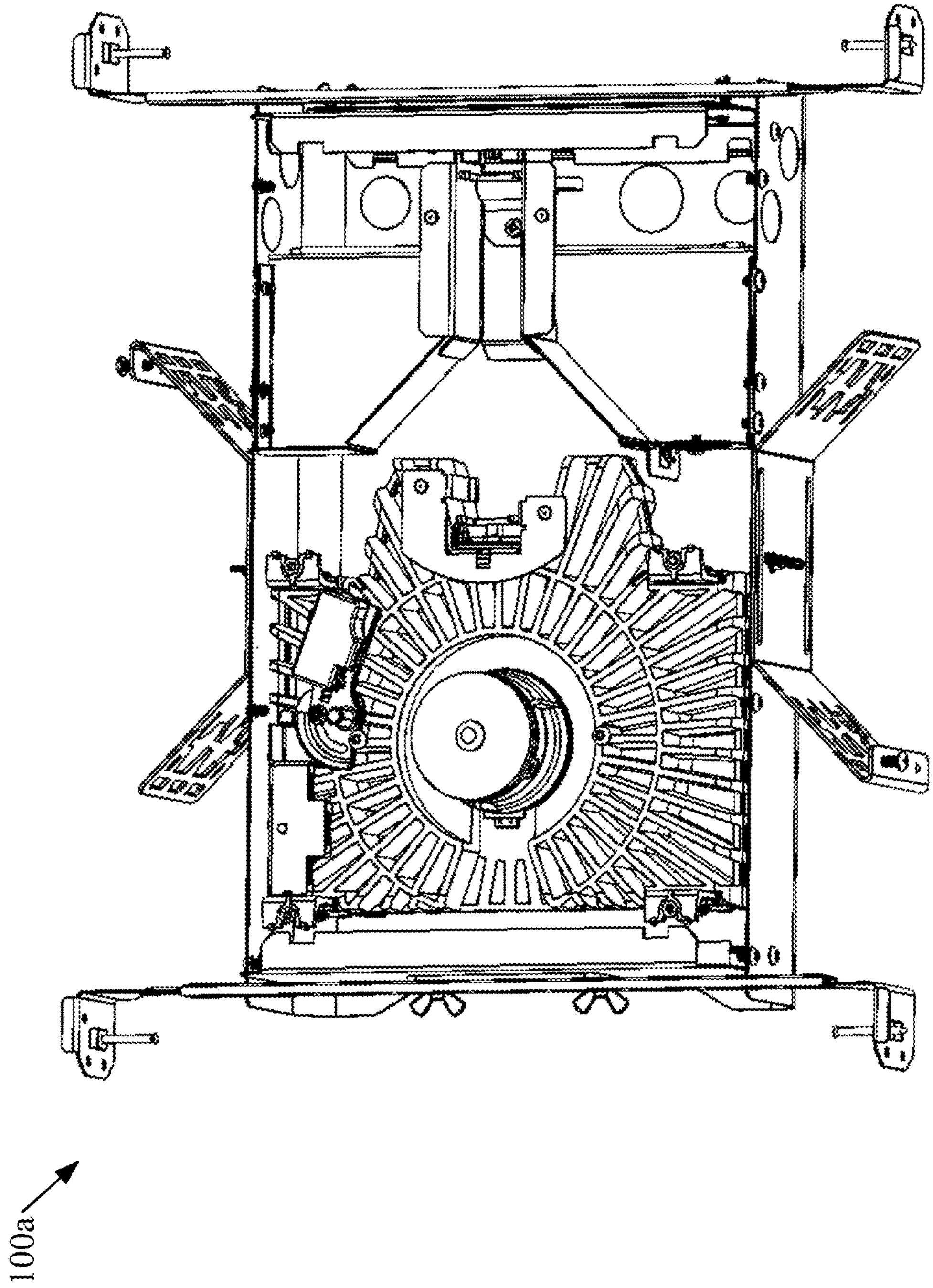
FIG. 6 on sheet 6 of the drawings is a screenshot of examples [100*a-d*] of the lighting system.
Figure 7:
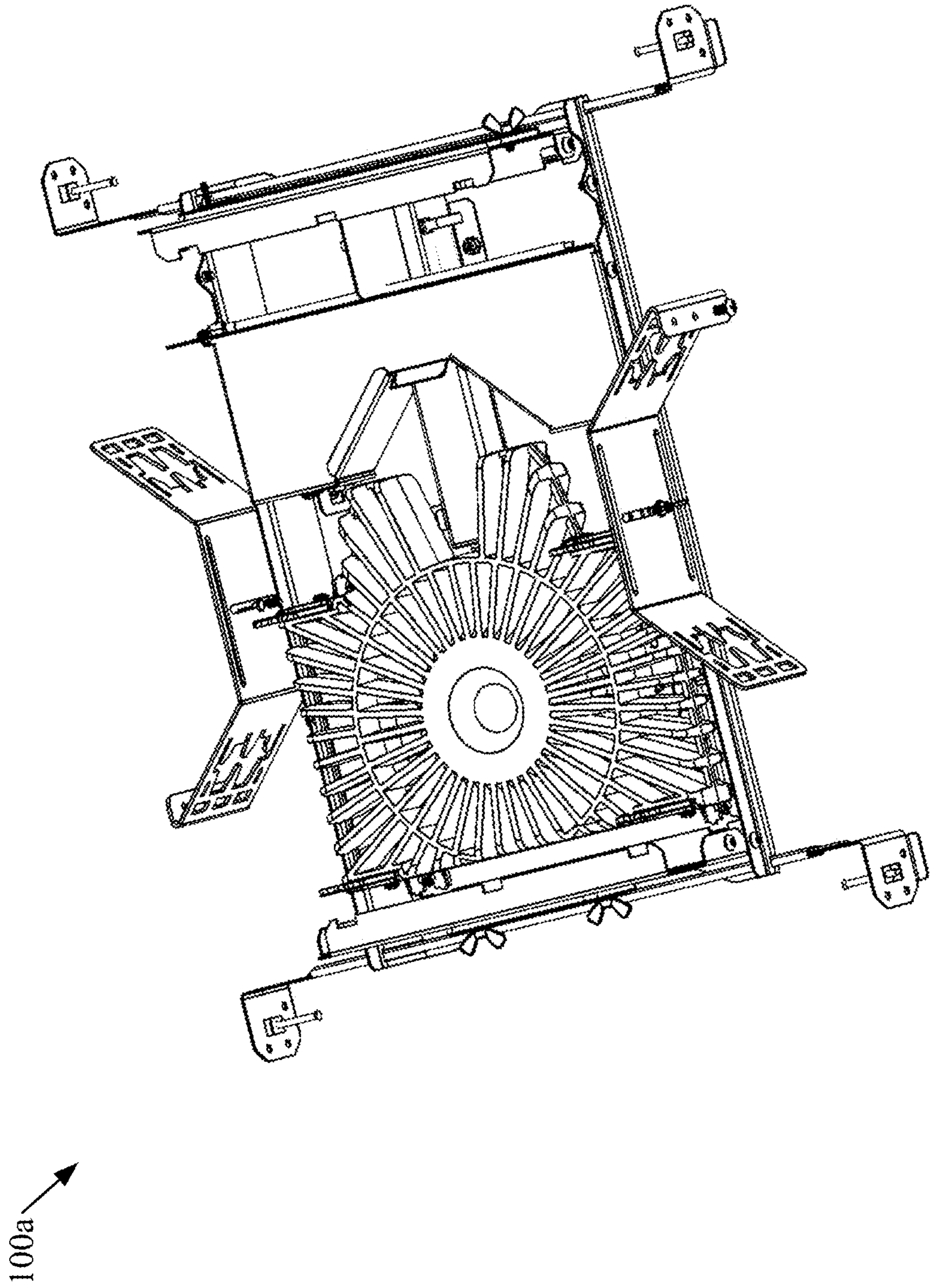
FIG. 7 on sheet 7 of the drawings is a screenshot of examples [100*a-d*] of the lighting system.
Figure 8:
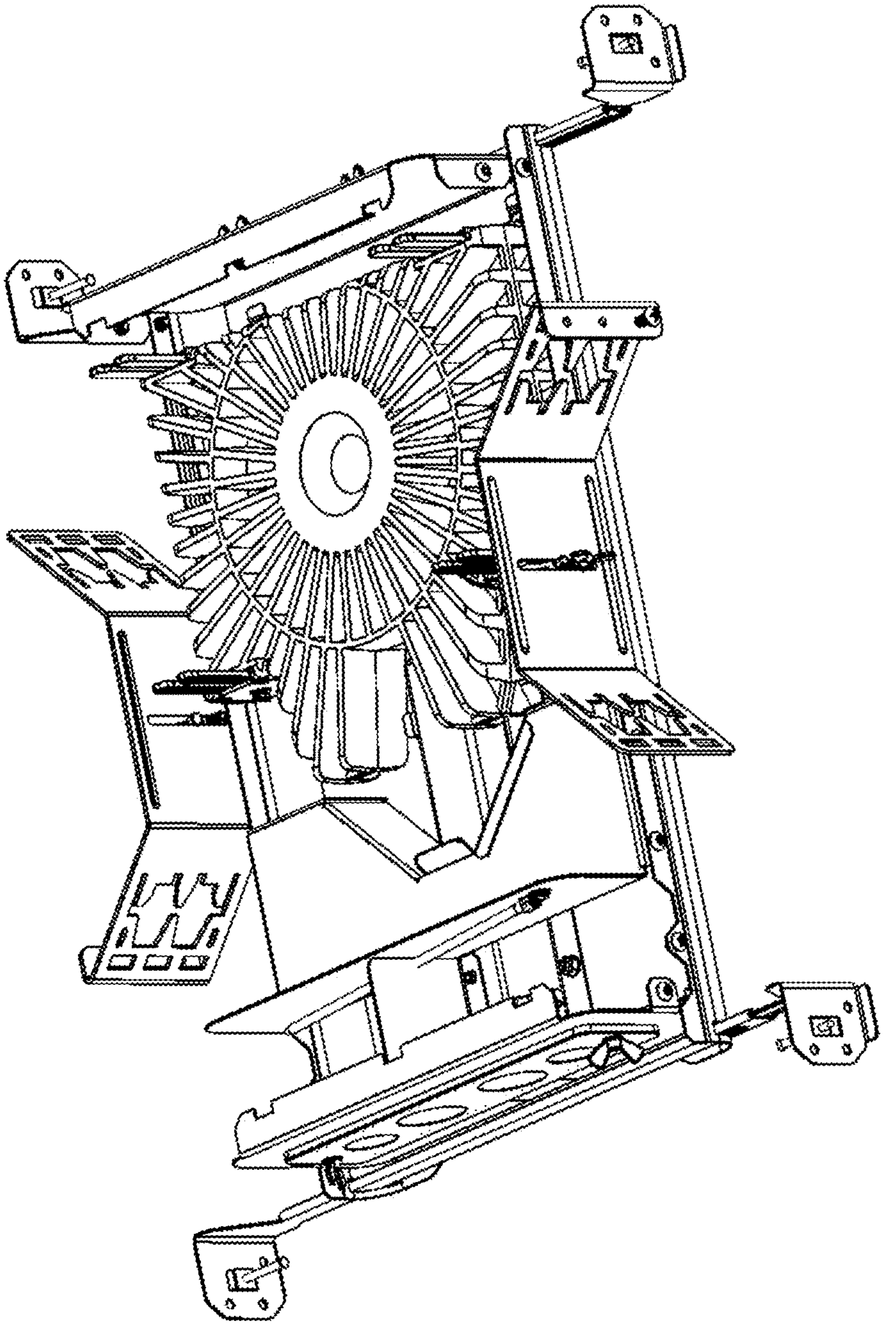
FIG. 8 on sheet 8 of the drawings is a screenshot of examples [100*a-d*] of the lighting system.
Figure 9:
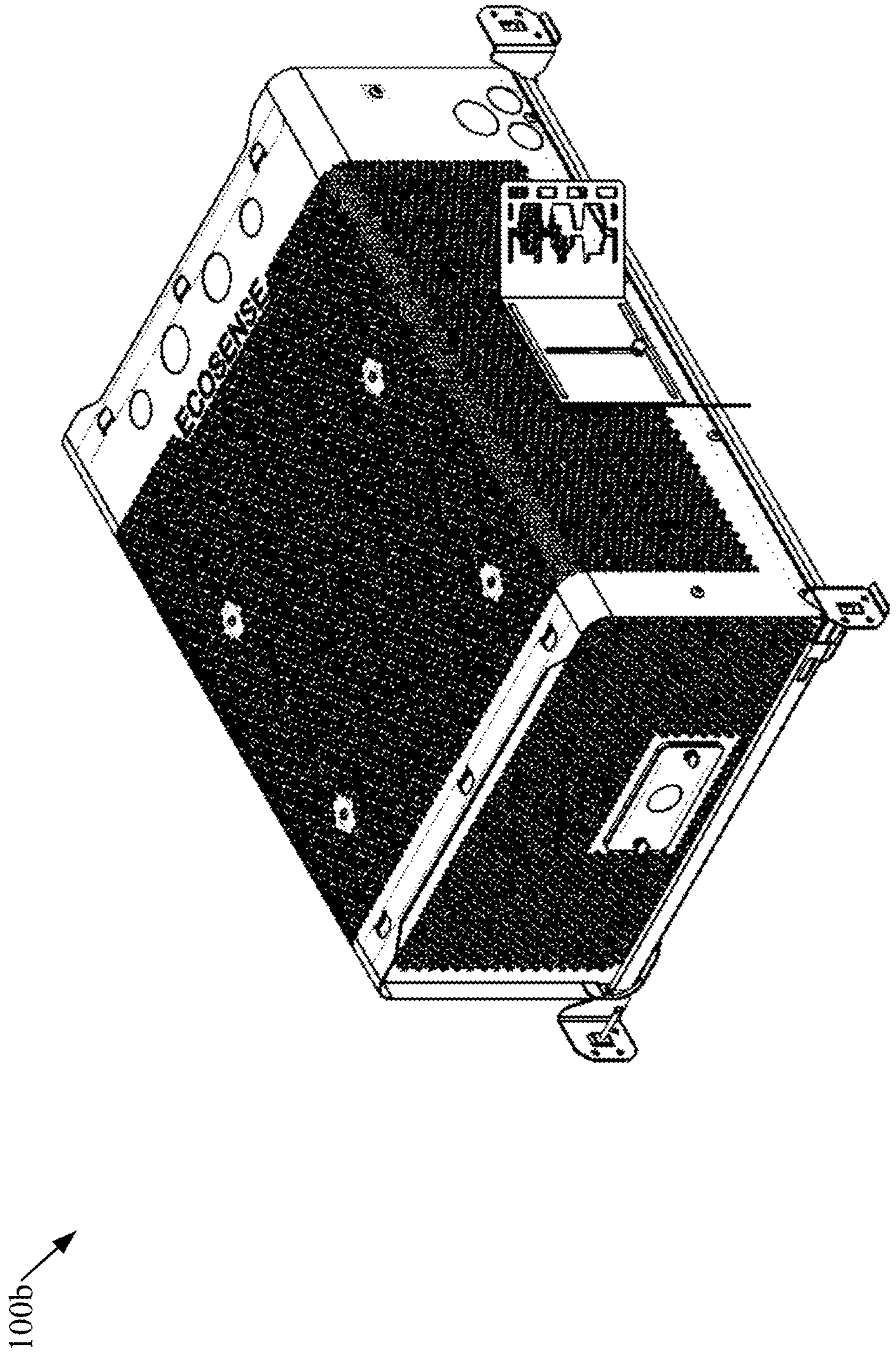
FIG. 9 on sheet 9 of the drawings is a screenshot of examples [100*a-d*] of the lighting system.
Figure 10:
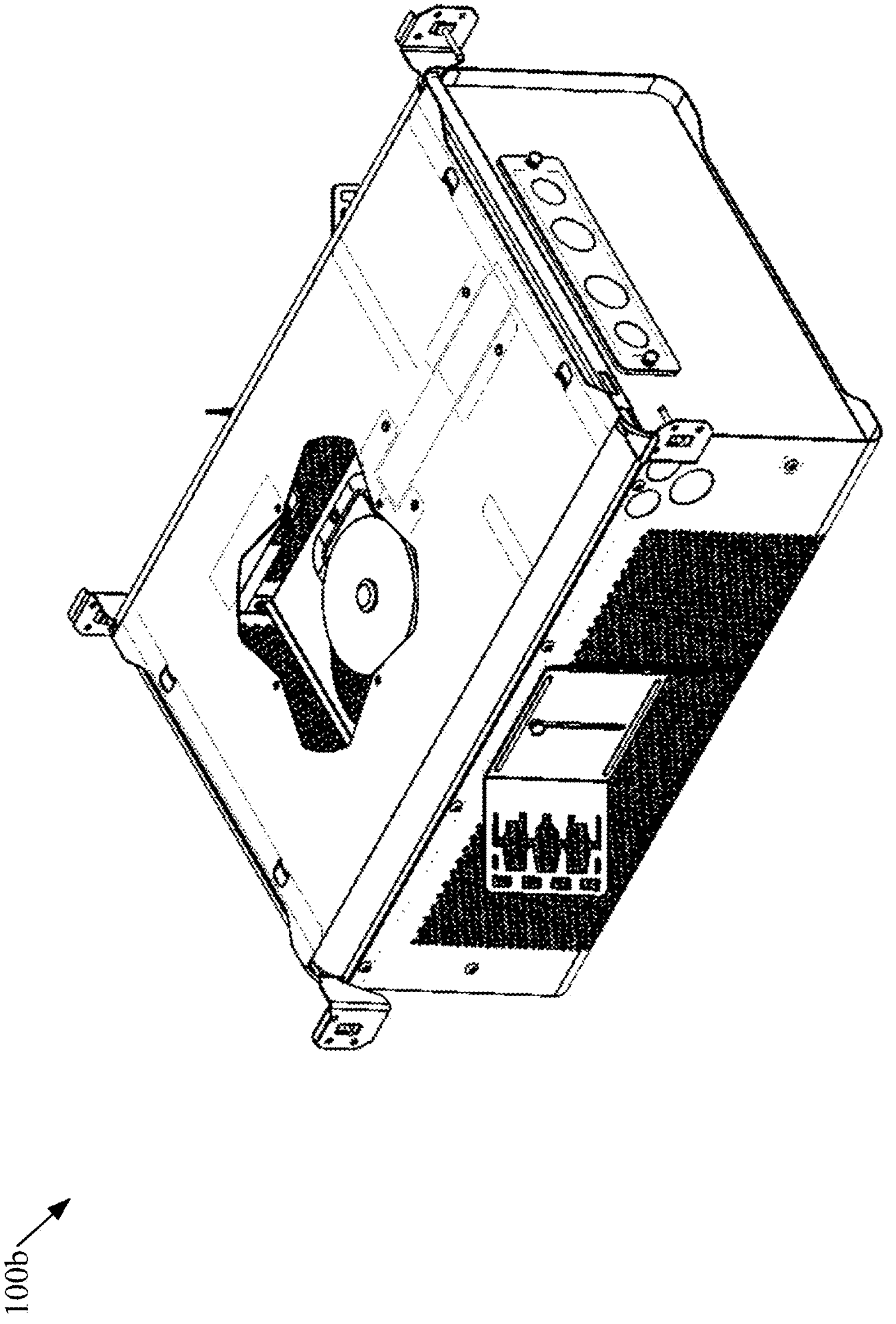
FIG. 10 on sheet 10 of the drawings is a screenshot of examples [100*a-d*] of the lighting system.
Figure 11:
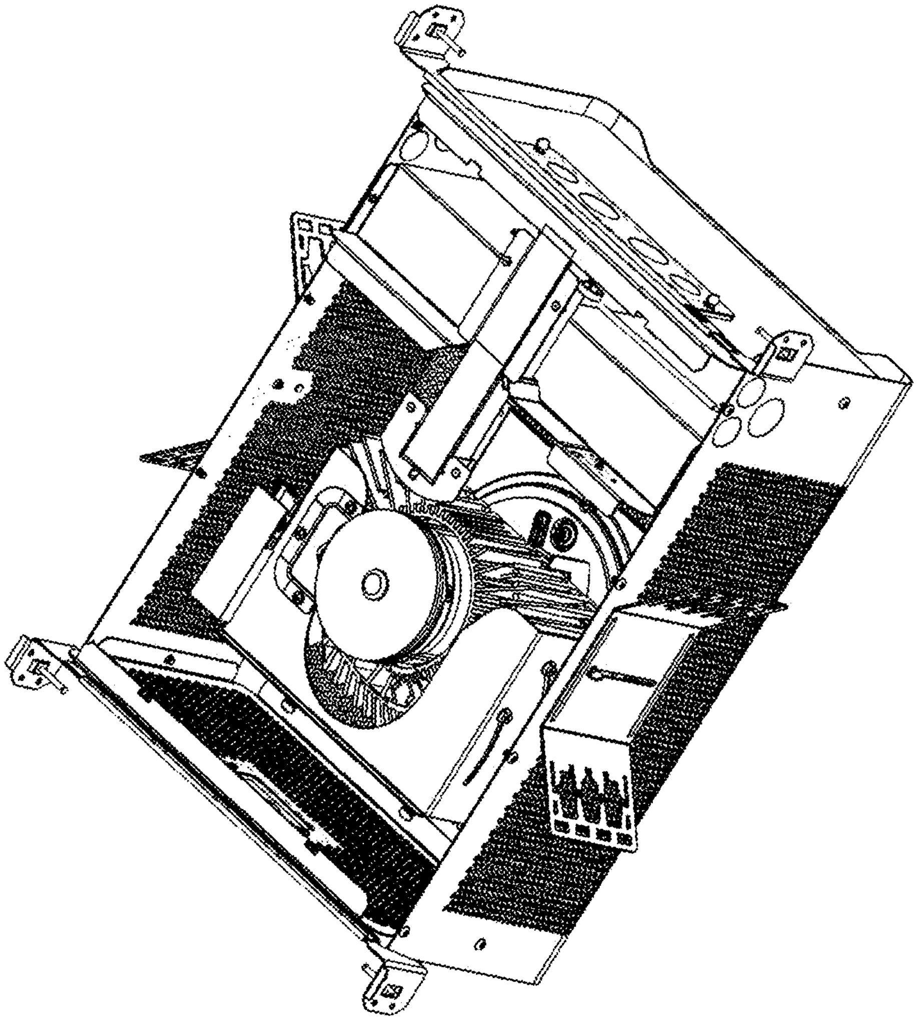
FIG. 11 on sheet 11 of the drawings is a screenshot of examples [100*a-d*] of the lighting system.
Figure 12:
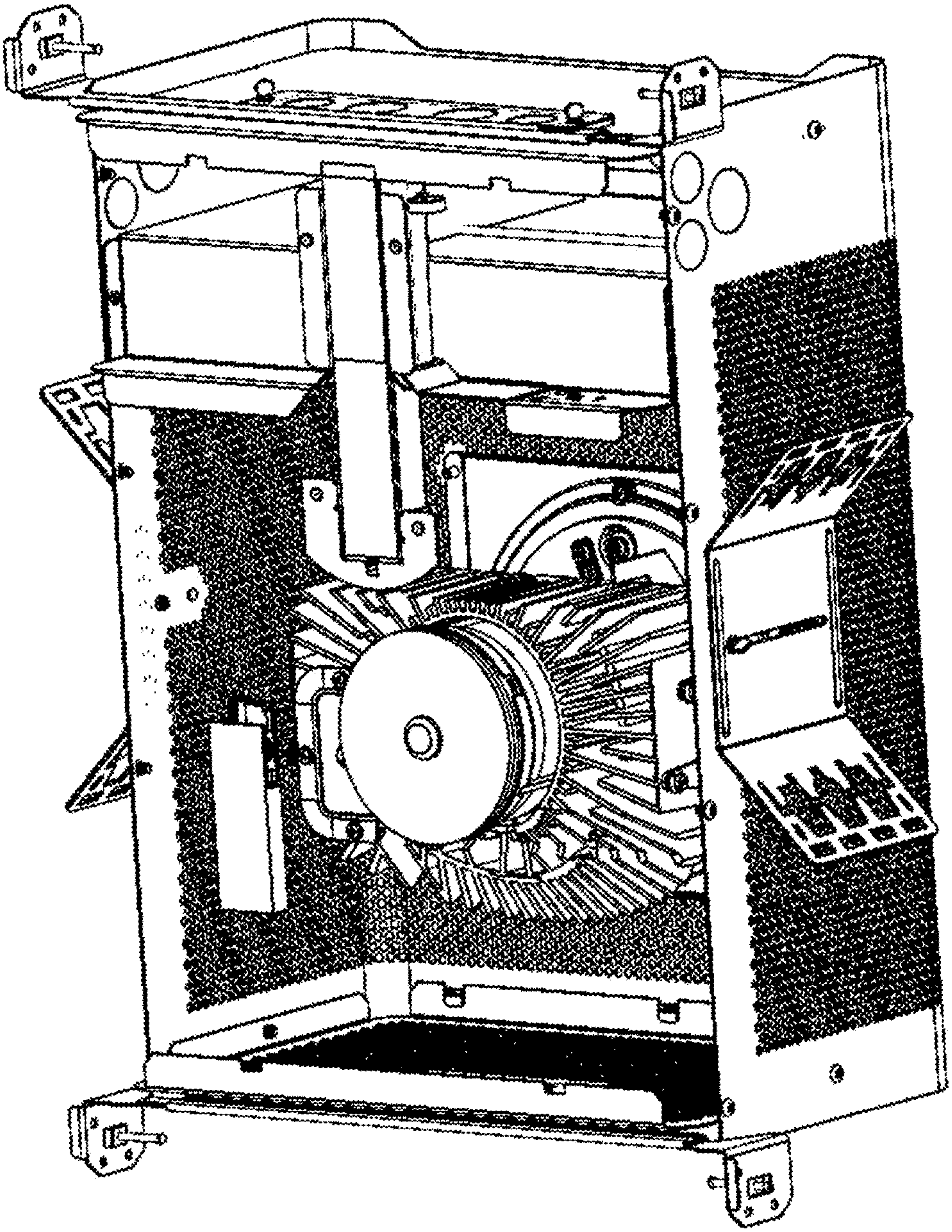
FIG. 12 on sheet 12 of the drawings is a screenshot of examples [100*a-d*] of the lighting system.
Figure 13:
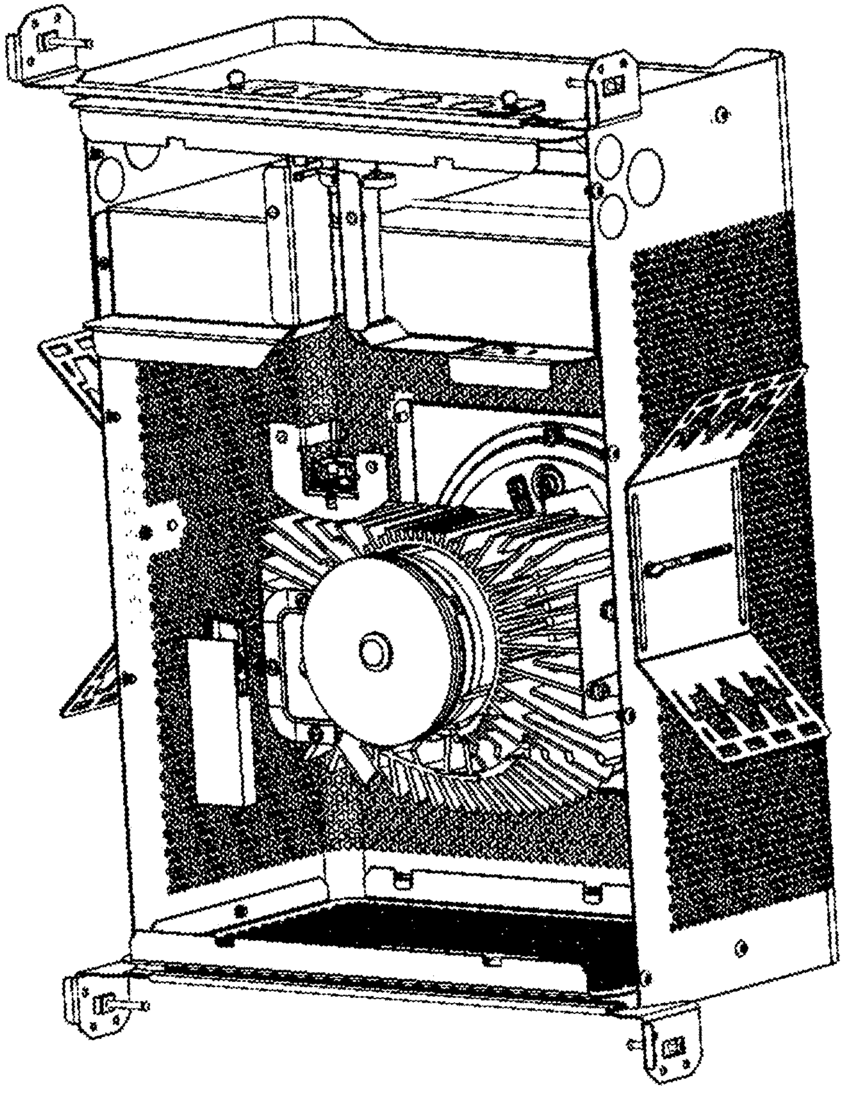
FIG. 13 on sheet 13 of the drawings is a screenshot of examples [100*a-d*] of the lighting system.
Figure 14:
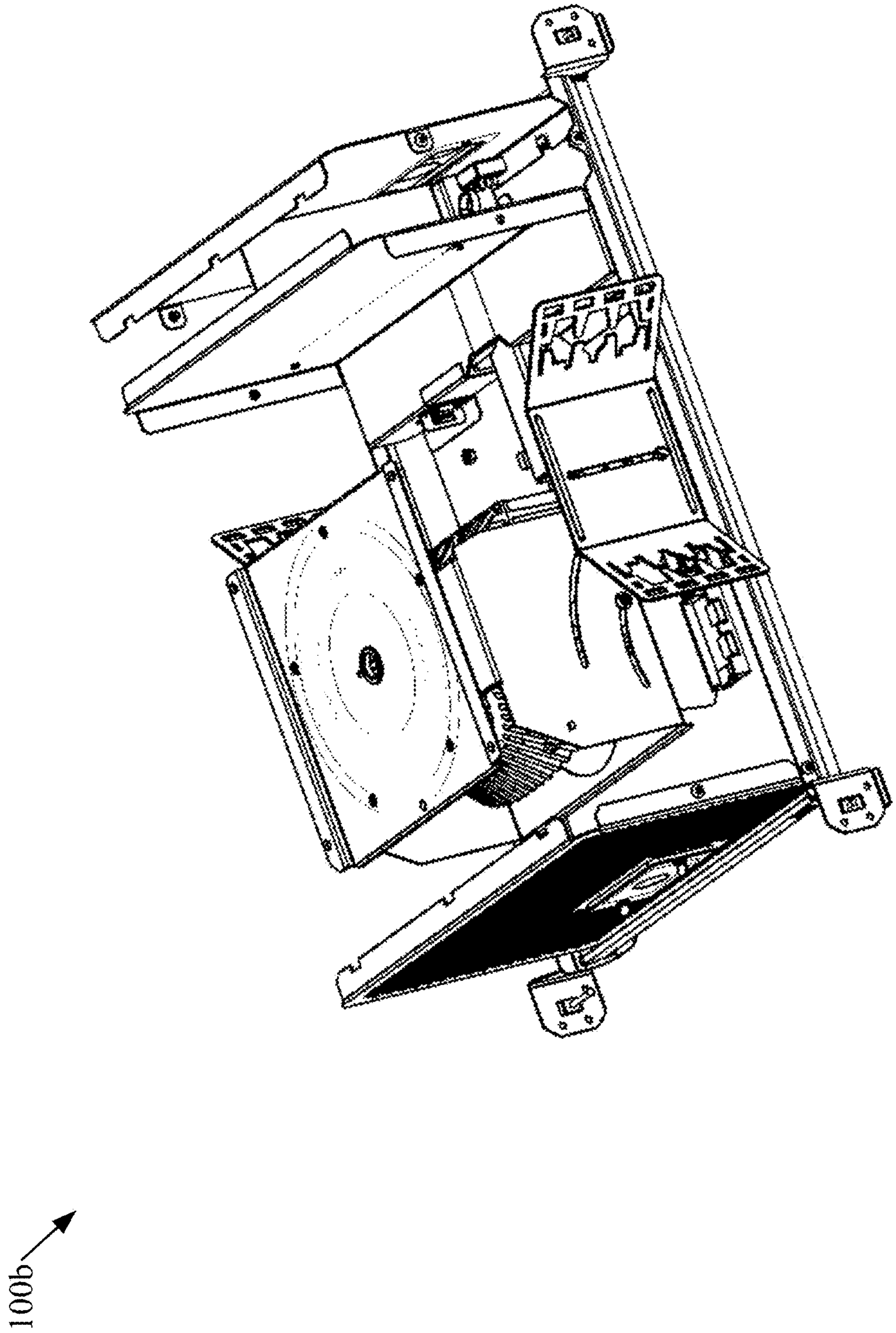
FIG. 14 on sheet 14 of the drawings is a screenshot of examples [100*a-d*] of the lighting system.
Figure 15:
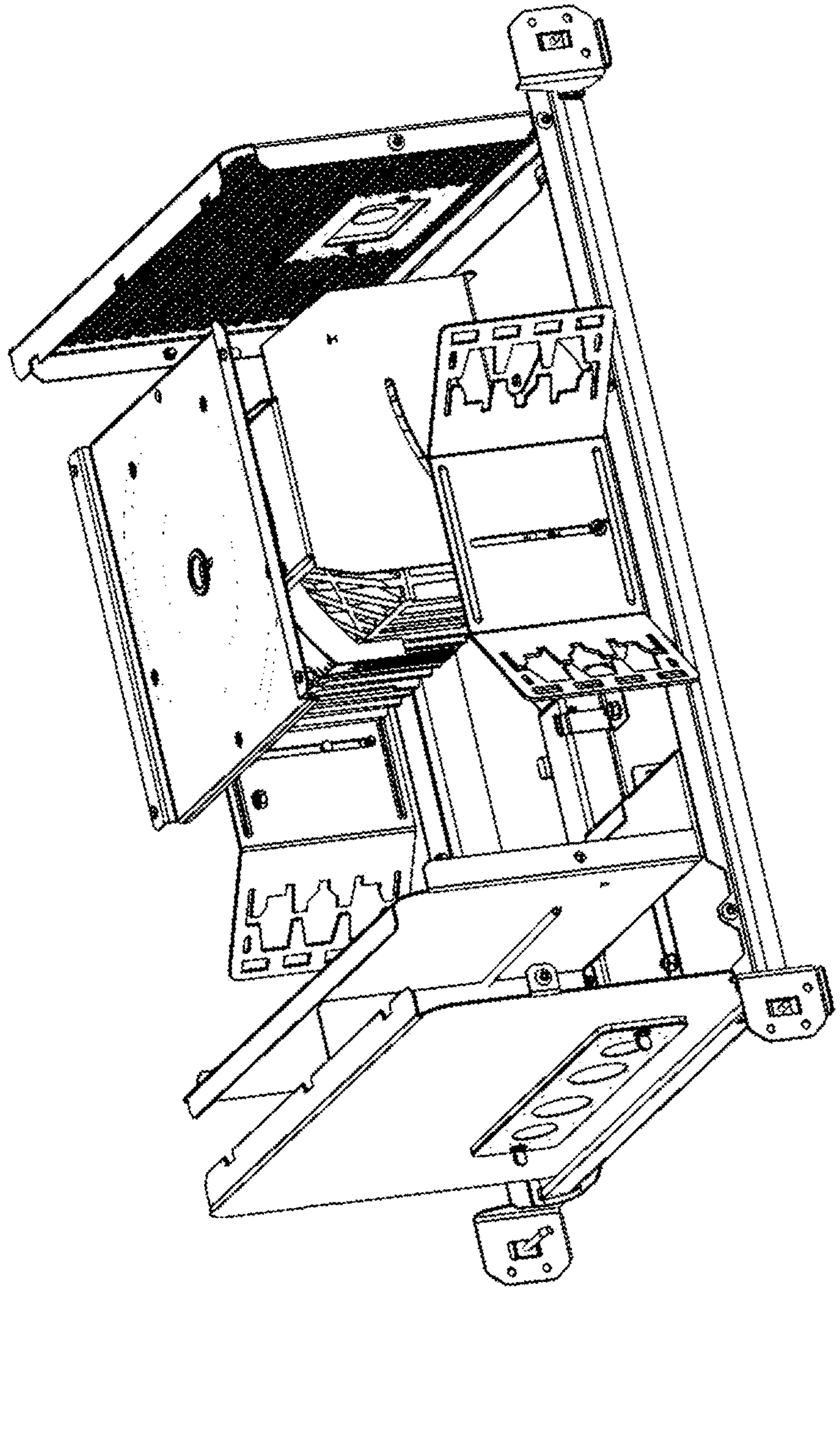
FIG. 15 on sheet 15 of the drawings is a screenshot of examples [100*a-d*] of the lighting system.
Figure 16:
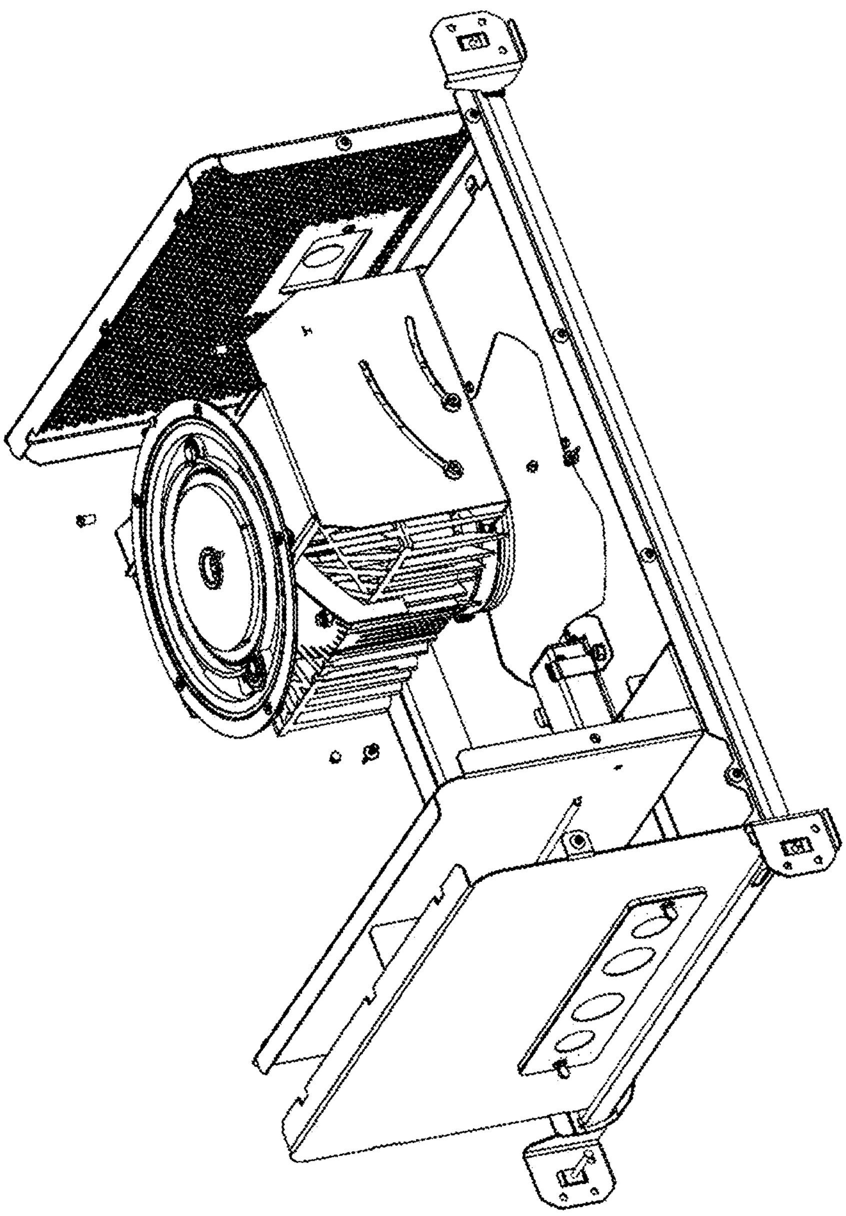
FIG. 16 on sheet 16 of the drawings is a screenshot of examples [100*a-d*] of the lighting system.
Figure 17:
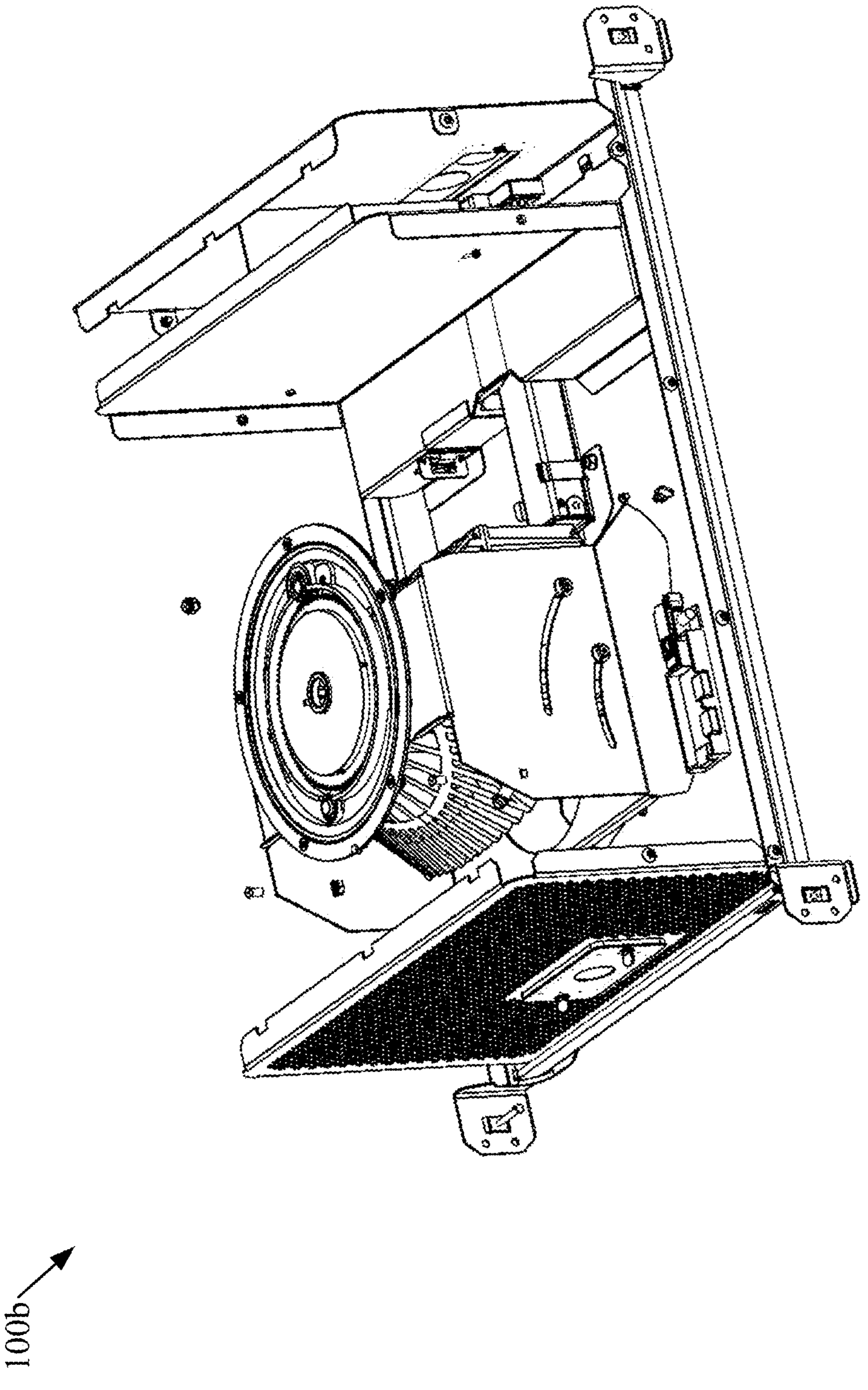
FIG. 17 on sheet 17 of the drawings is a screenshot of examples [100*a-d*] of the lighting system.
Figure 18:
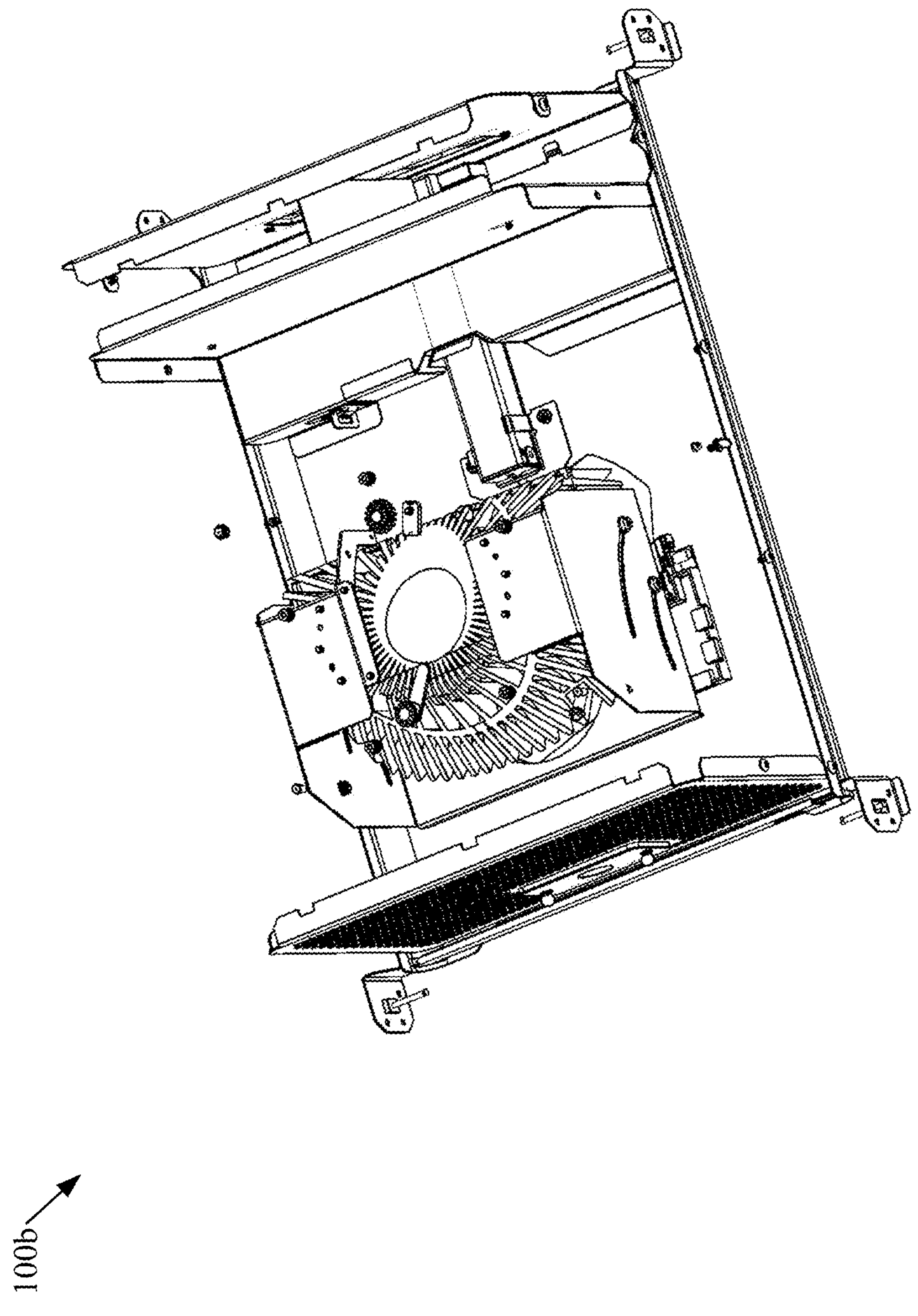
FIG. 18 on sheet 18 of the drawings is a screenshot of examples [100*a-d*] of the lighting system.
Figure 19:
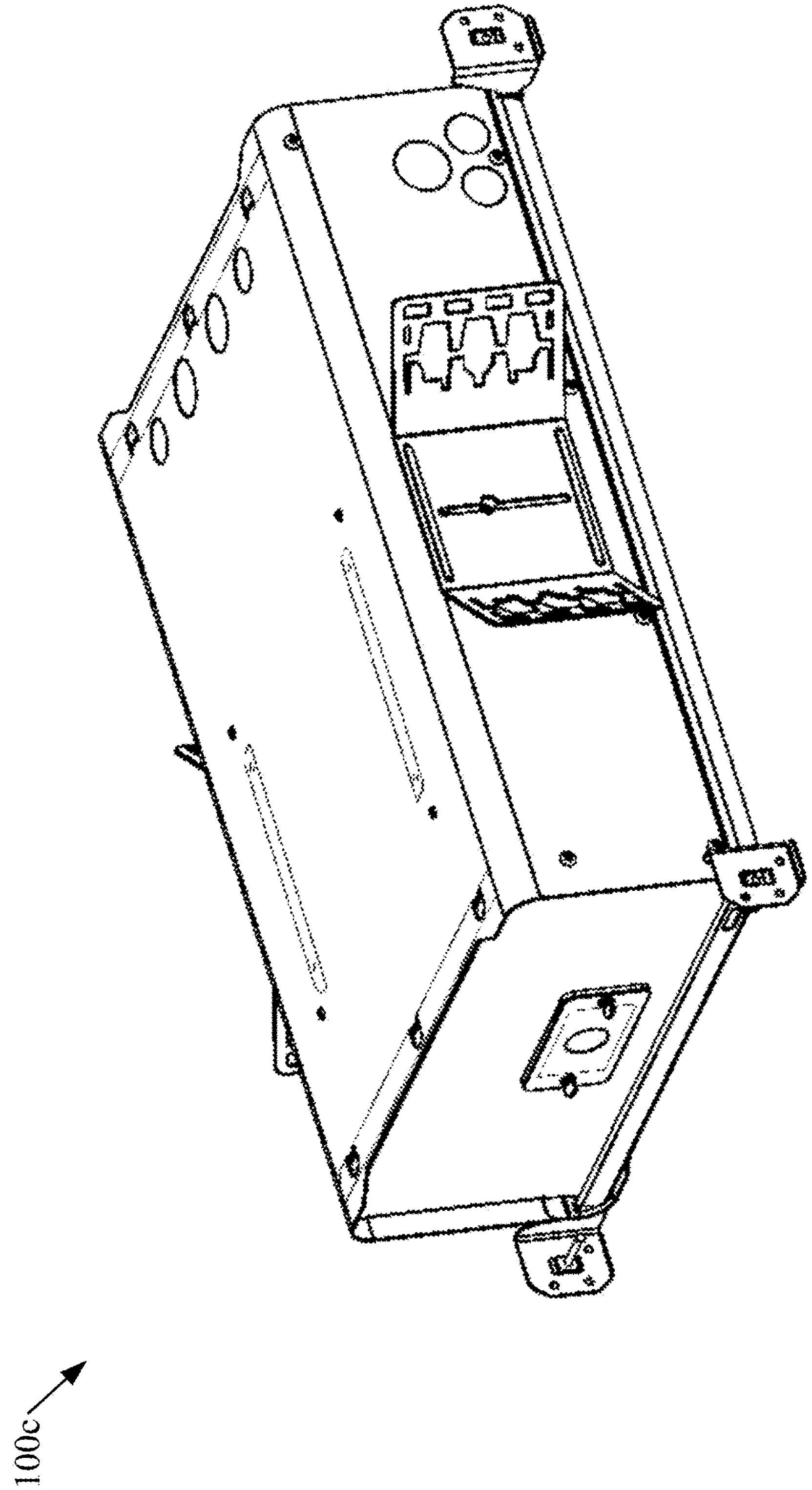
FIG. 19 on sheet 19 of the drawings is a screenshot of examples [100*a-d*] of the lighting system.
Figure 20:
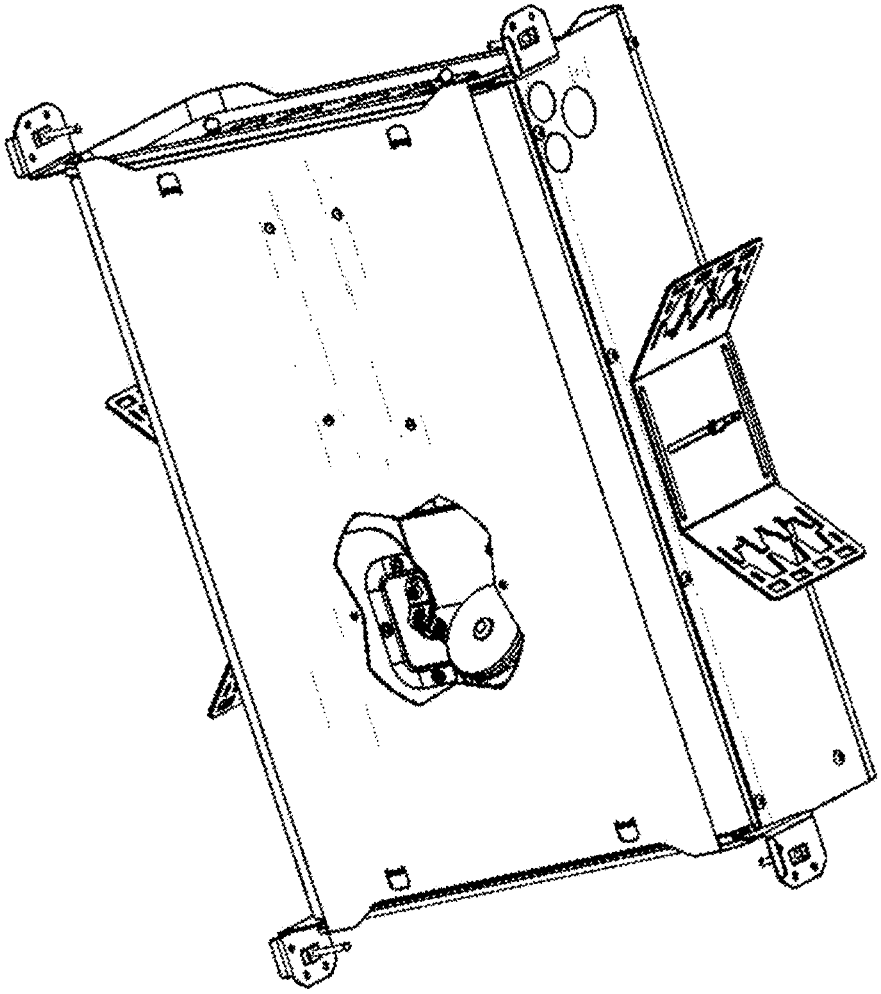
FIG. 20 on sheet 20 of the drawings is a screenshot of examples [100*a-d*] of the lighting system.
Figure 21:
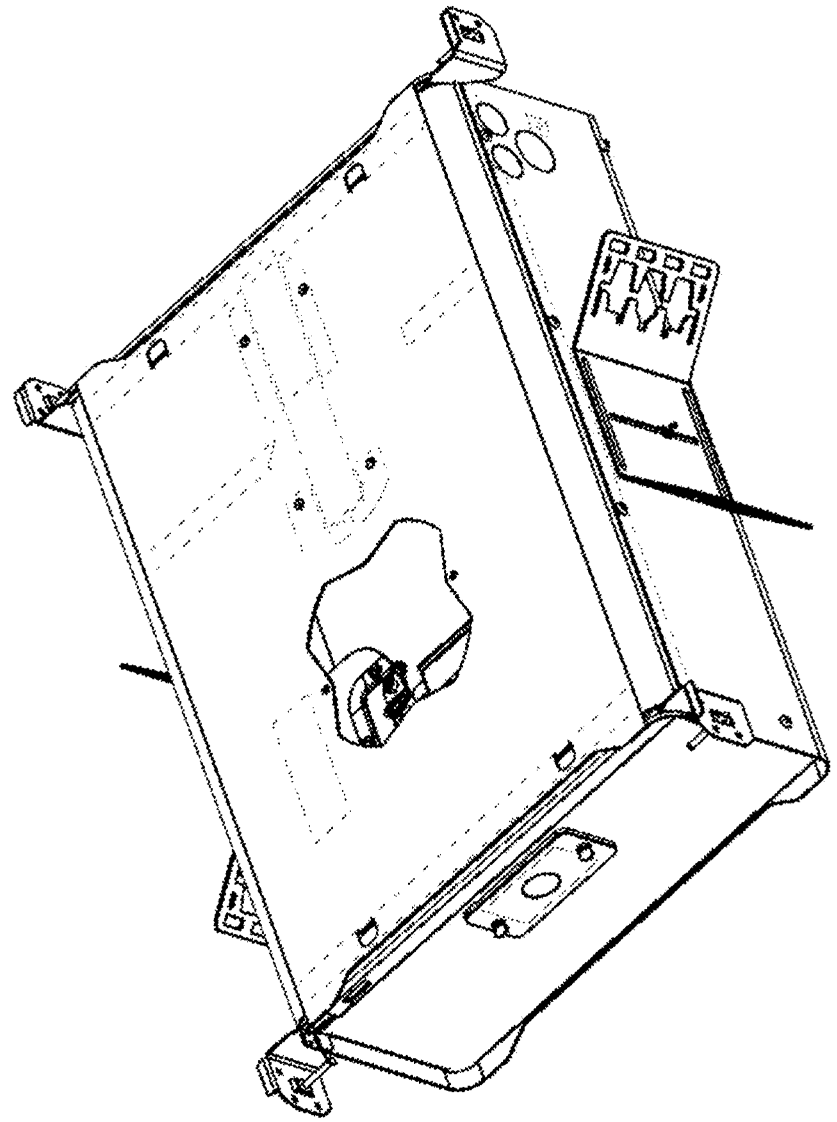
FIG. 21 on sheet 21 of the drawings is a screenshot of examples [100*a-d*] of the lighting system.
Figure 22:
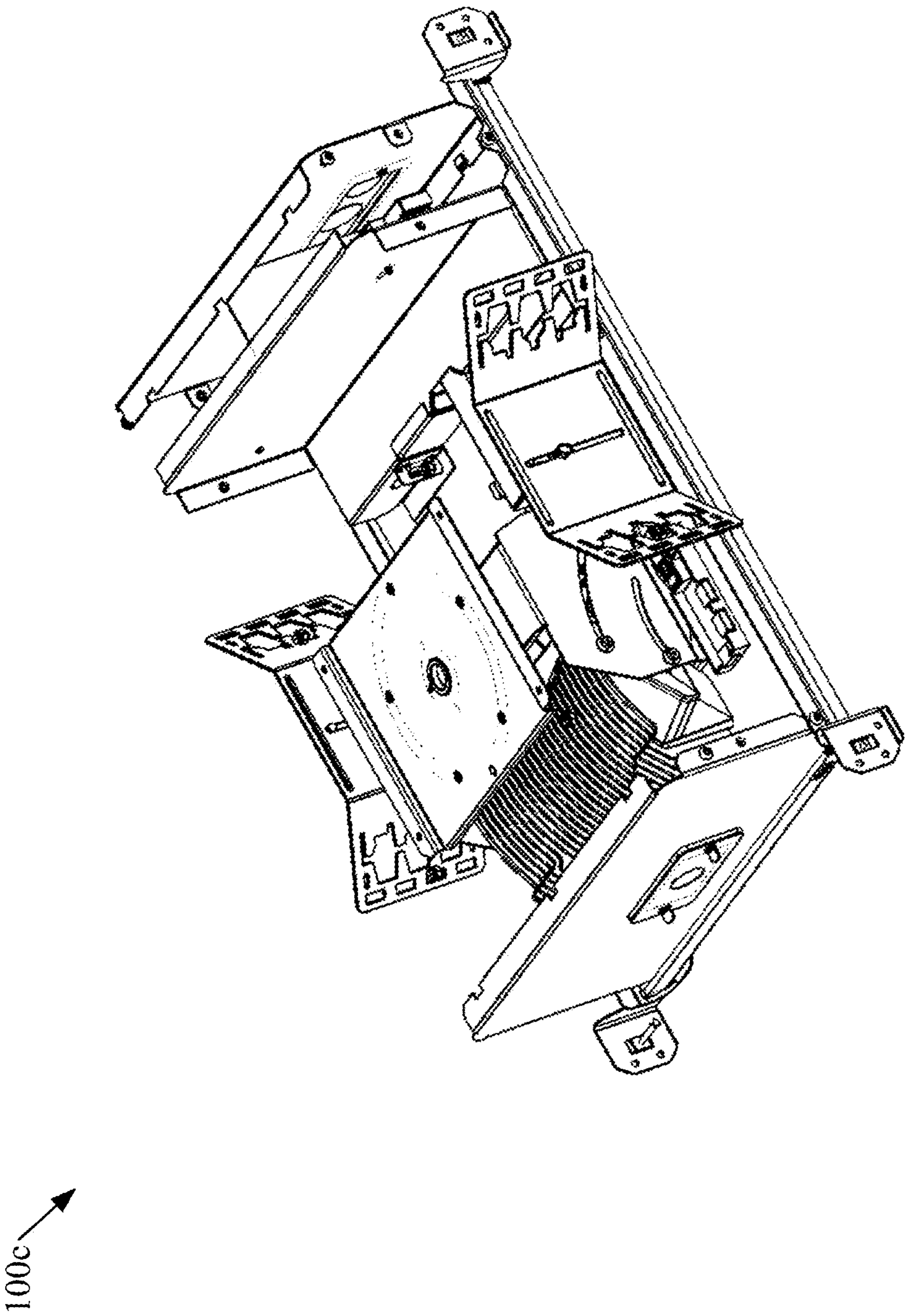
FIG. 22 on sheet 22 of the drawings is a screenshot of examples [100*a-d*] of the lighting system.
Figure 23:
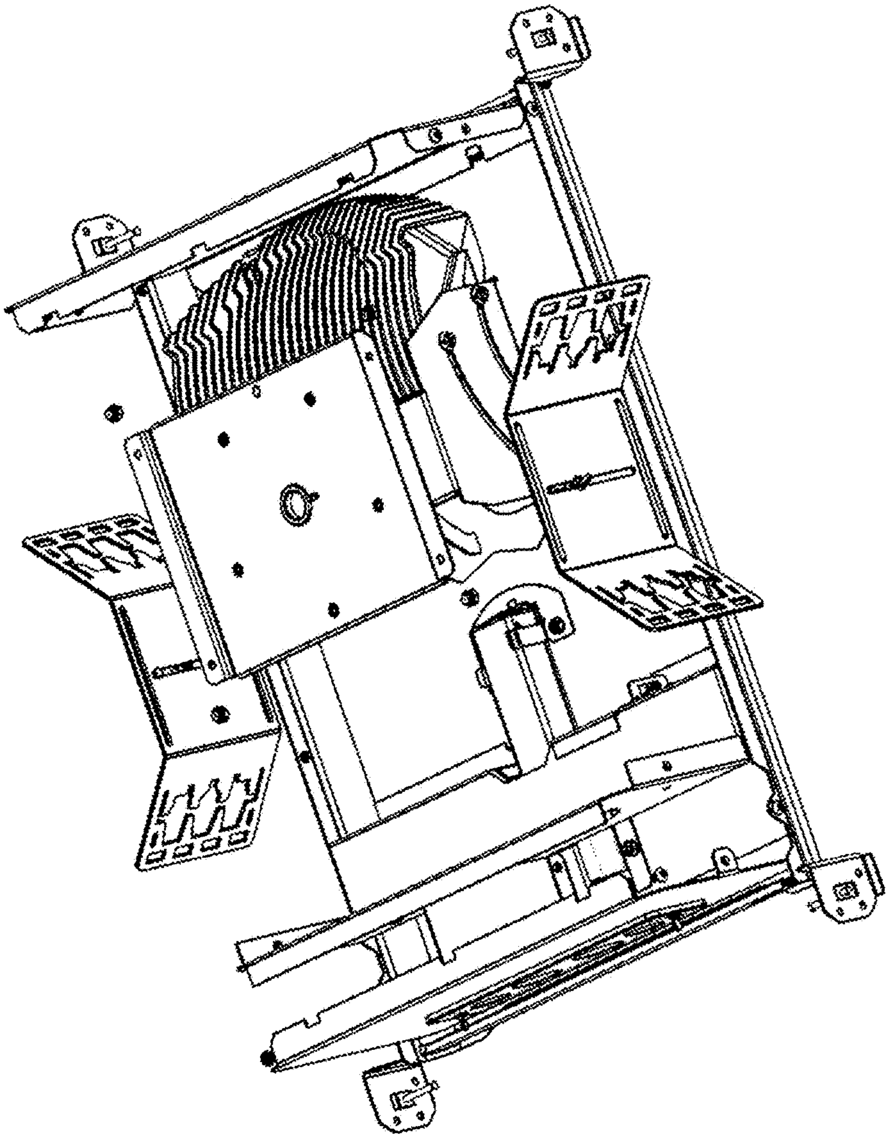
FIG. 23 on sheet 23 of the drawings is a screenshot of examples [100*a-d*] of the lighting system.
Figure 24:
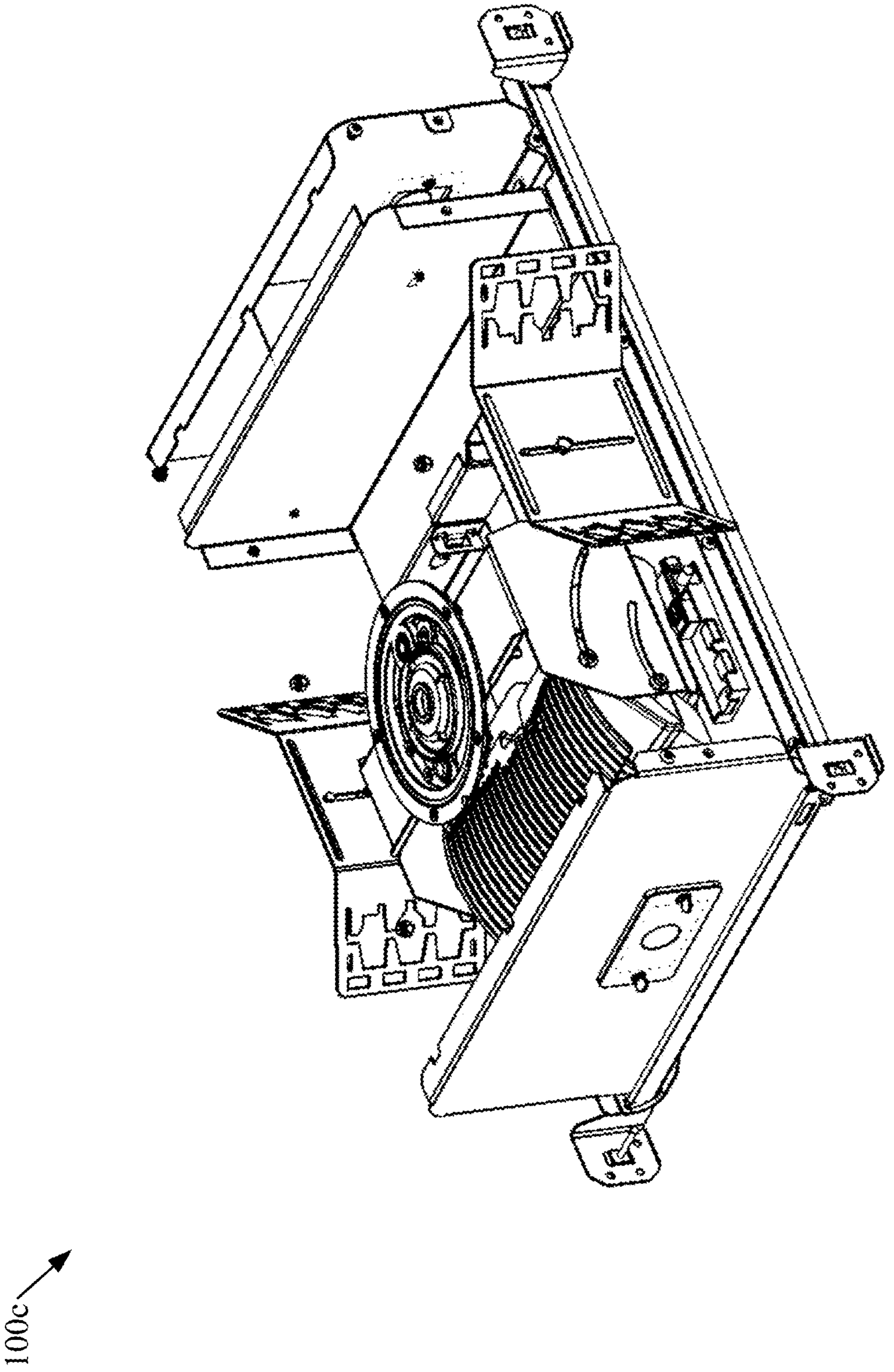
FIG. 24 on sheet 24 of the drawings is a screenshot of examples [100*a-d*] of the lighting system.
Figure 25:
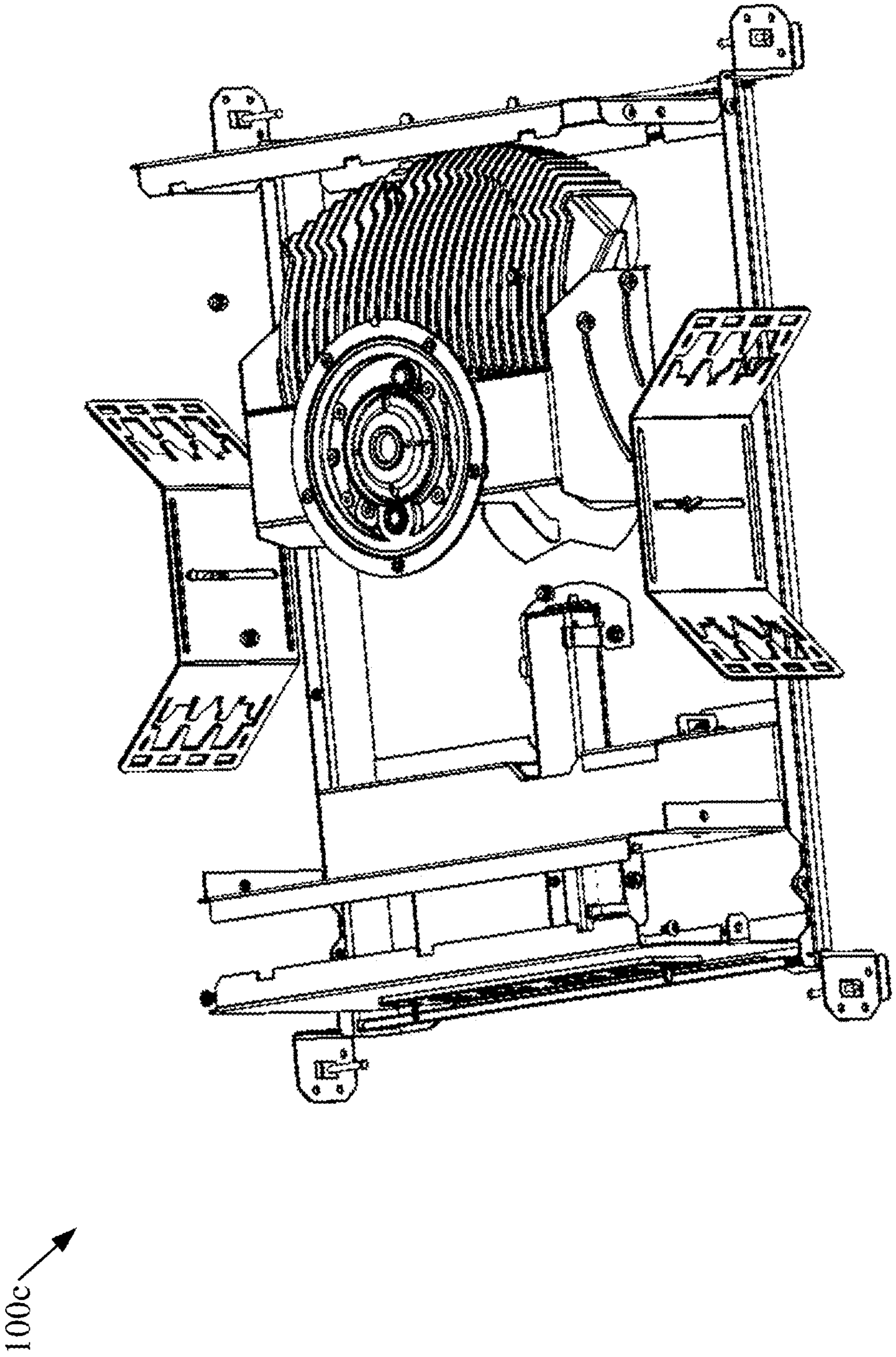
FIG. 25 on sheet 25 of the drawings is a screenshot of examples [100*a-d*] of the lighting system.
Figure 26:
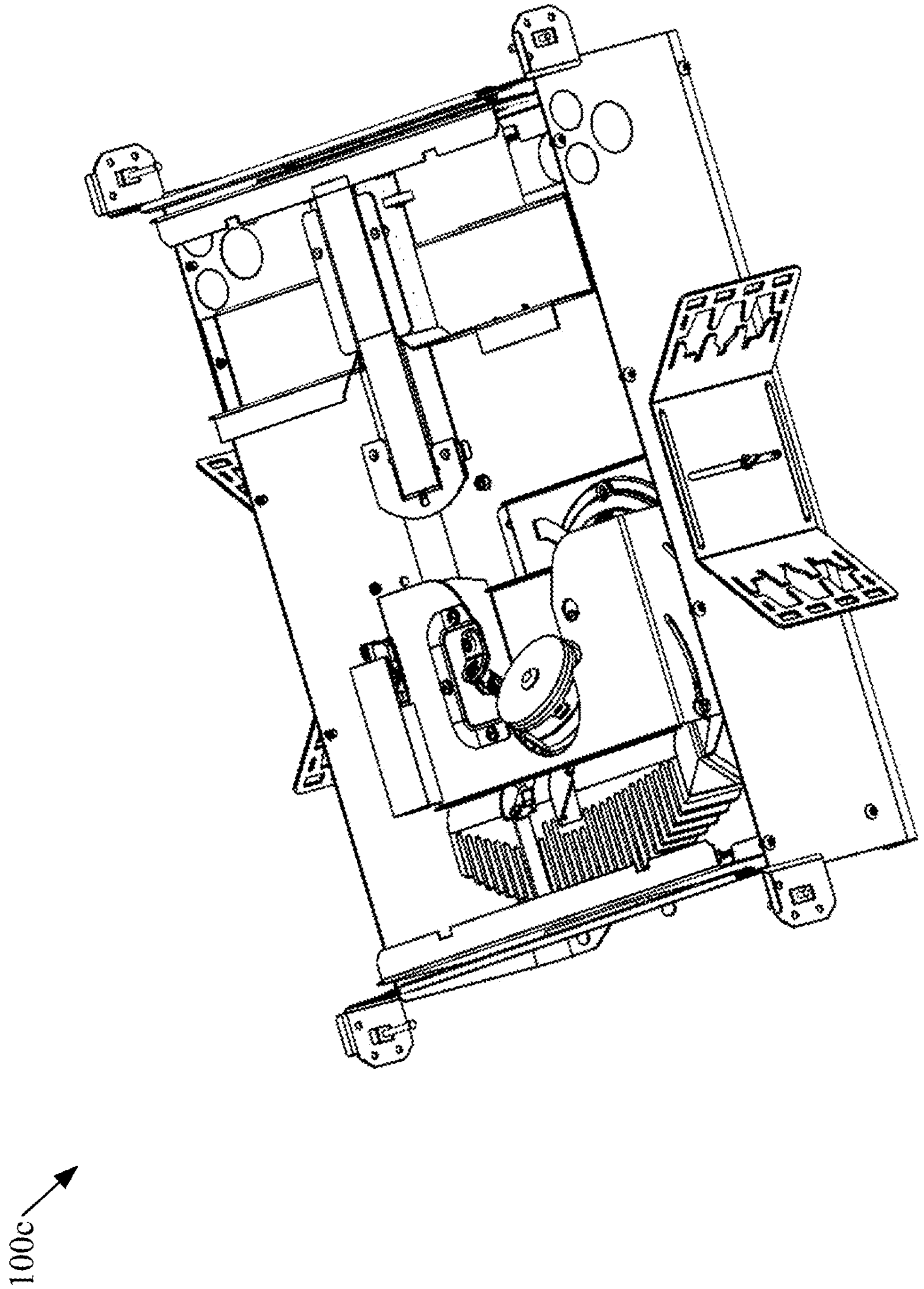
FIG. 26 on sheet 26 of the drawings is a screenshot of examples [100*a-d*] of the lighting system.
Figure 27:
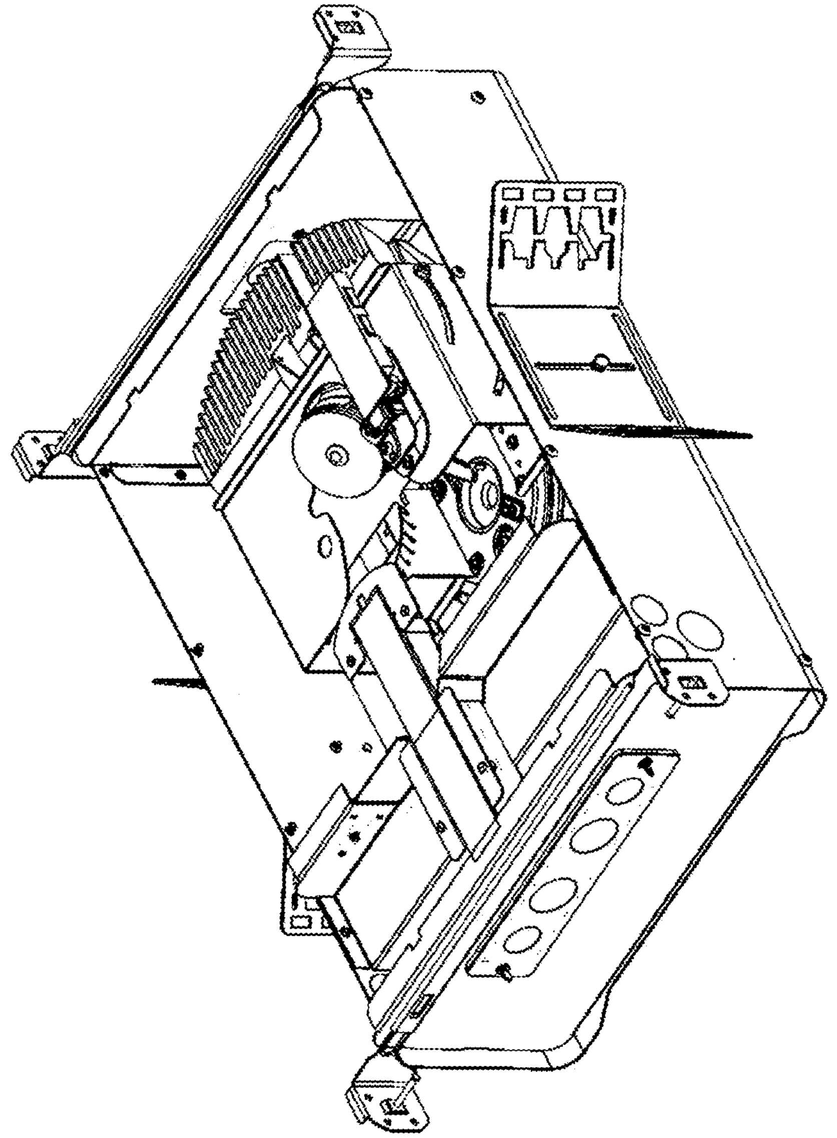
FIG. 27 on sheet 27 of the drawings is a screenshot of examples [100*a-d*] of the lighting system.
Figure 28:
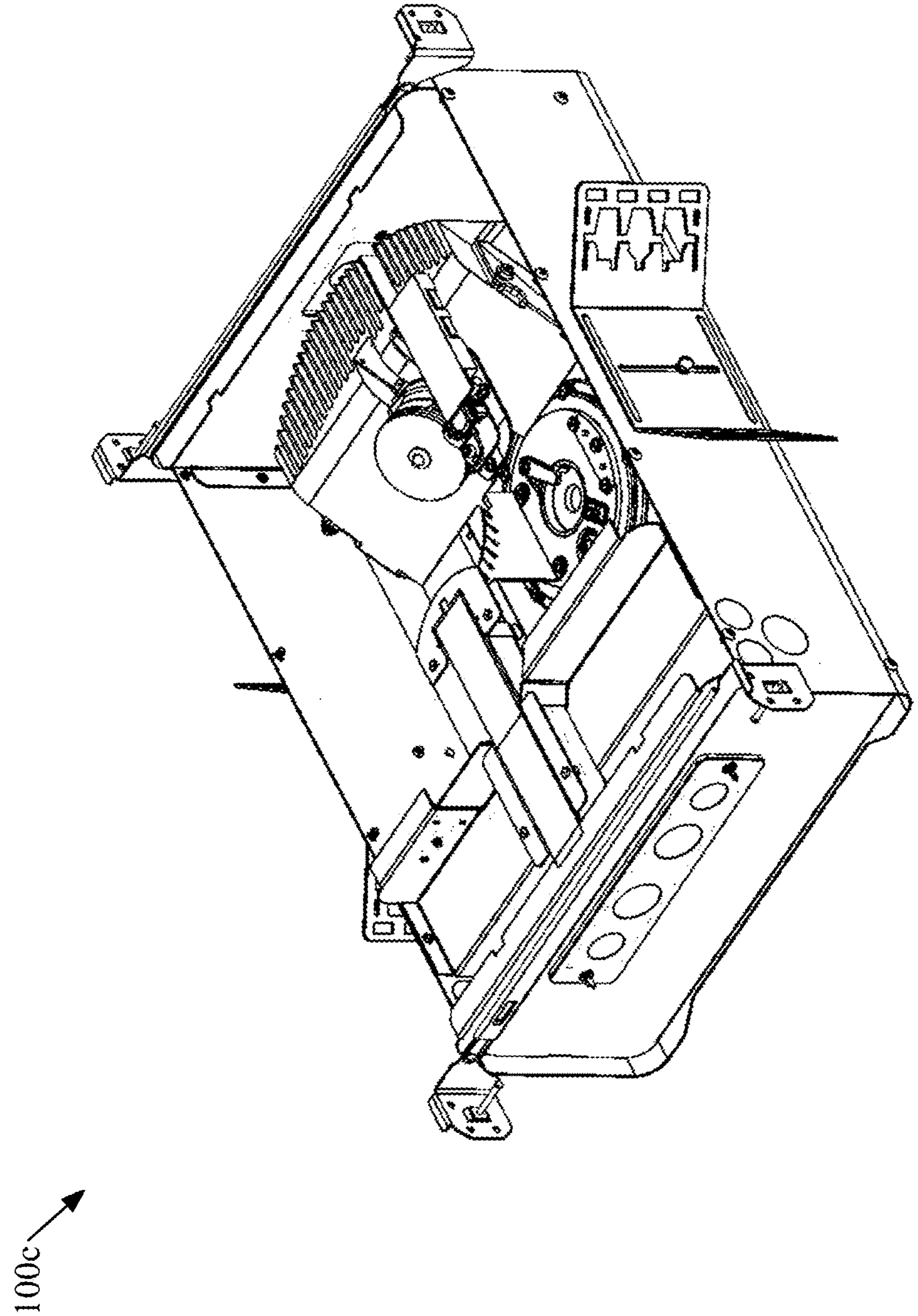
FIG. 28 on sheet 28 of the drawings is a screenshot of examples [100*a-d*] of the lighting system.
Figure 29:
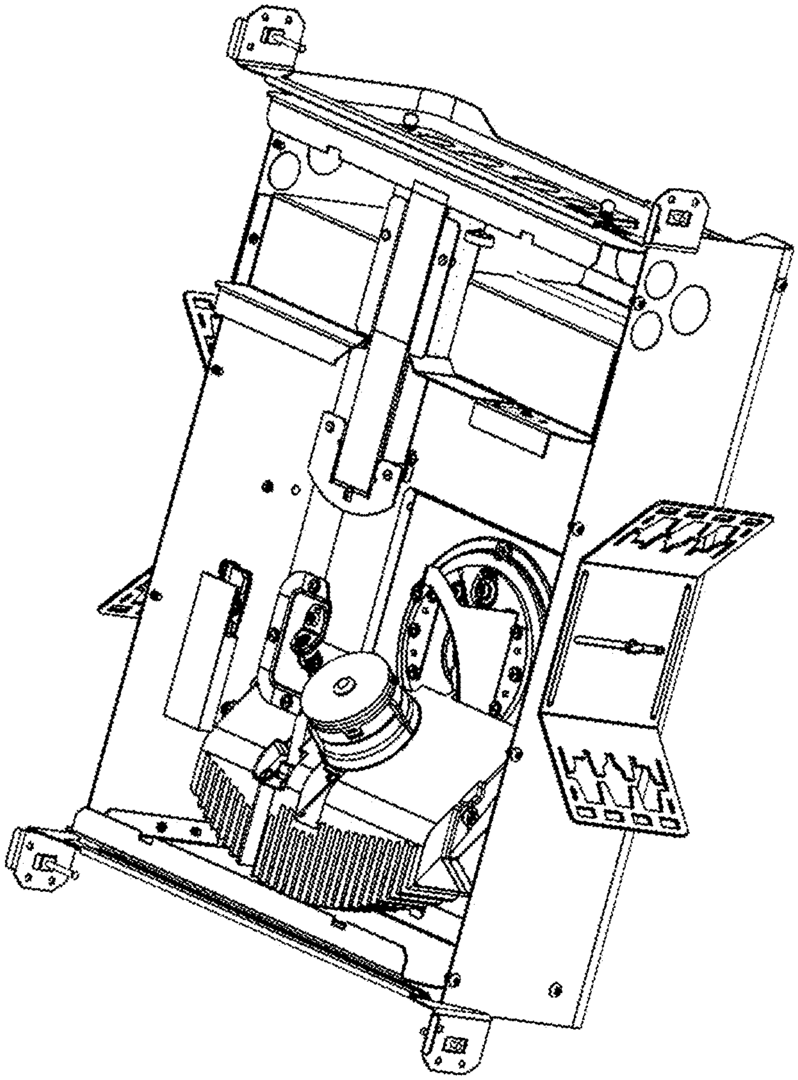
FIG. 29 on sheet 29 of the drawings is a screenshot of examples [100*a-d*] of the lighting system.
Figure 30:
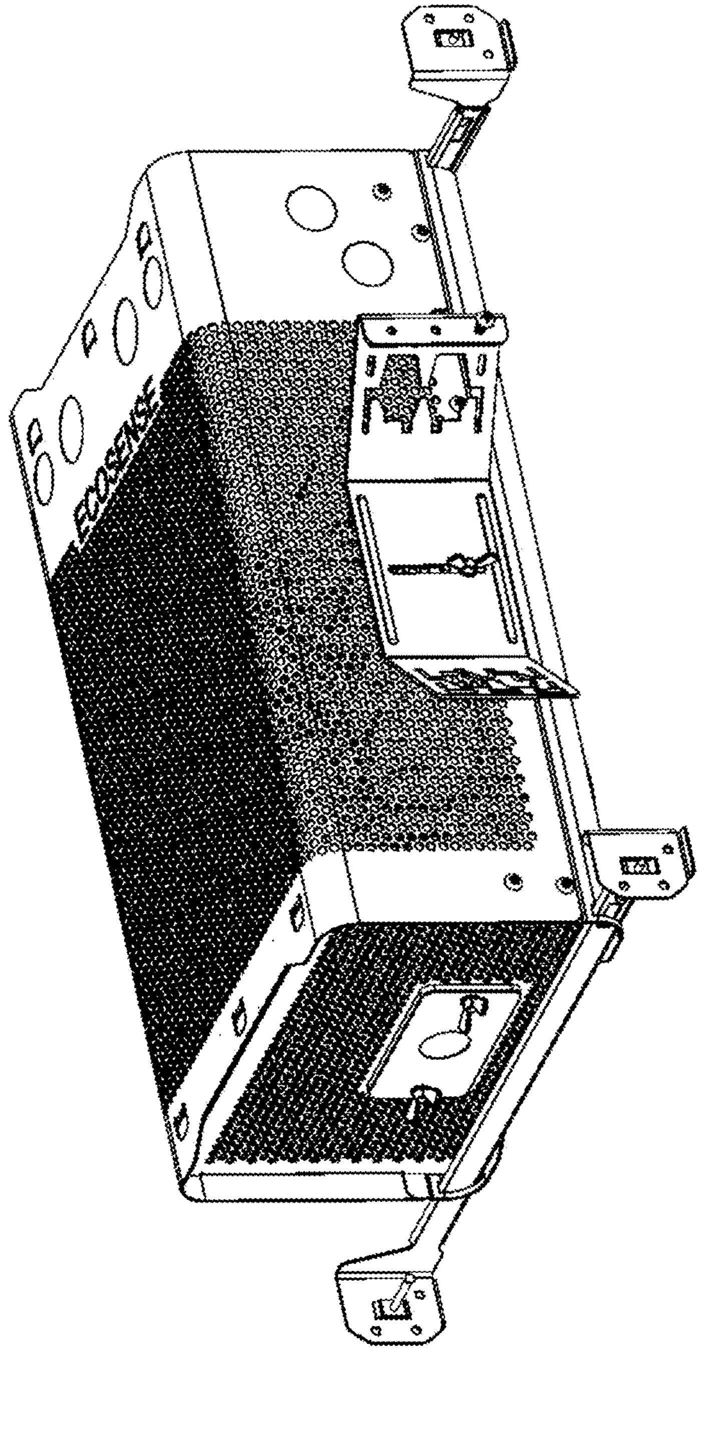
FIG. 30 on sheet 30 of the drawings is a screenshot of examples [100*a-d*] of the lighting system.
Figure 31:
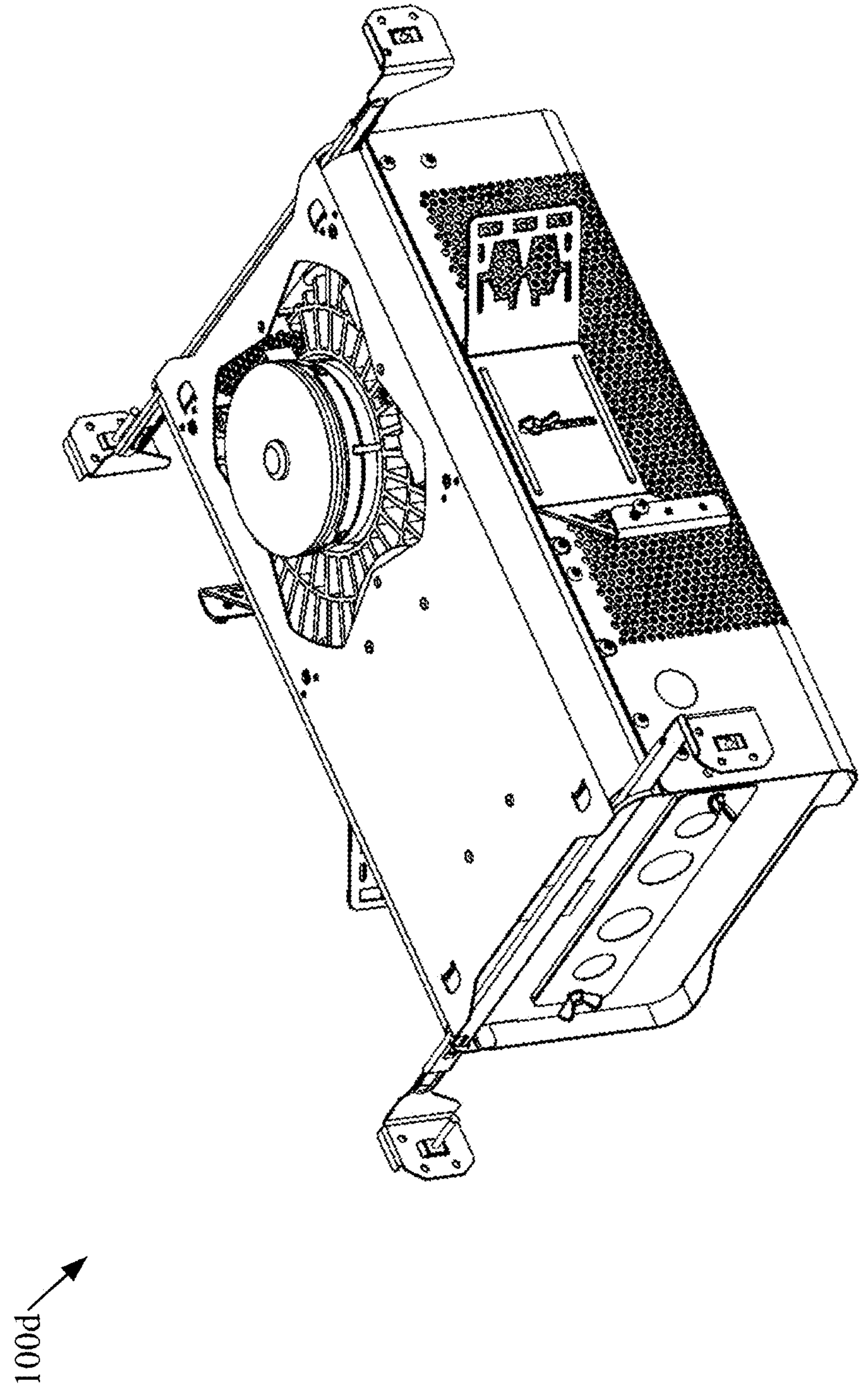
FIG. 31 on sheet 31 of the drawings is a screenshot of examples [100*a-d*] of the lighting system.
Figure 32:
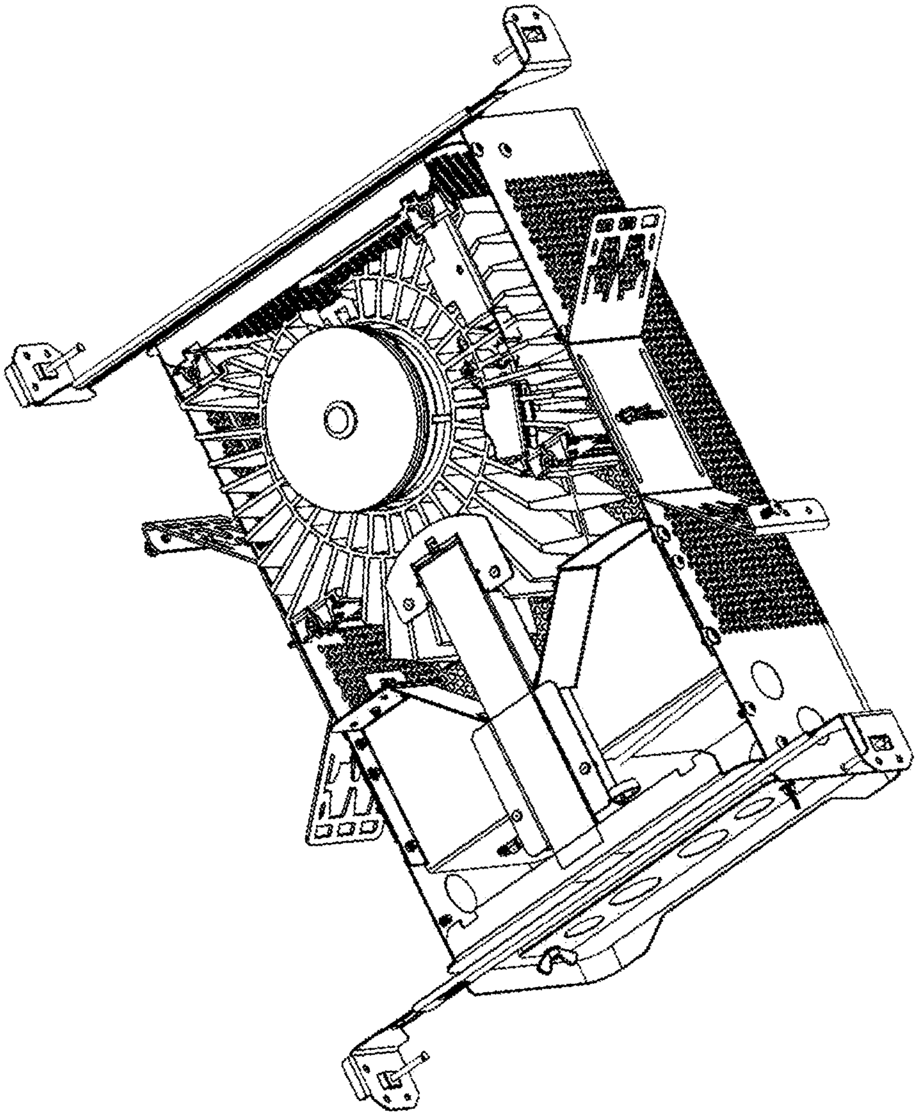
FIG. 32 on sheet 32 of the drawings is a screenshot of examples [100*a-d*] of the lighting system.
Figure 33:
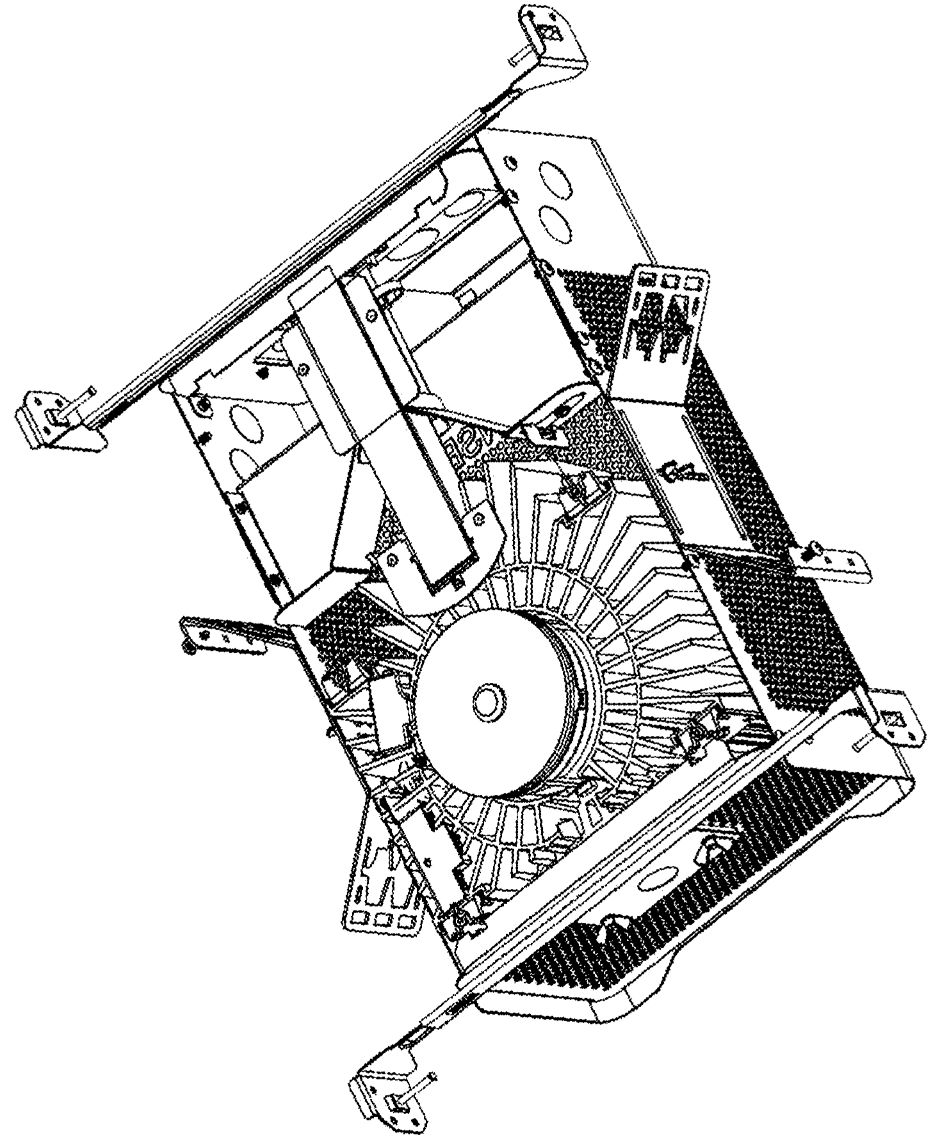
FIG. 33 on sheet 33 of the drawings is a screenshot of examples [100*a-d*] of the lighting system.
Figure 34:
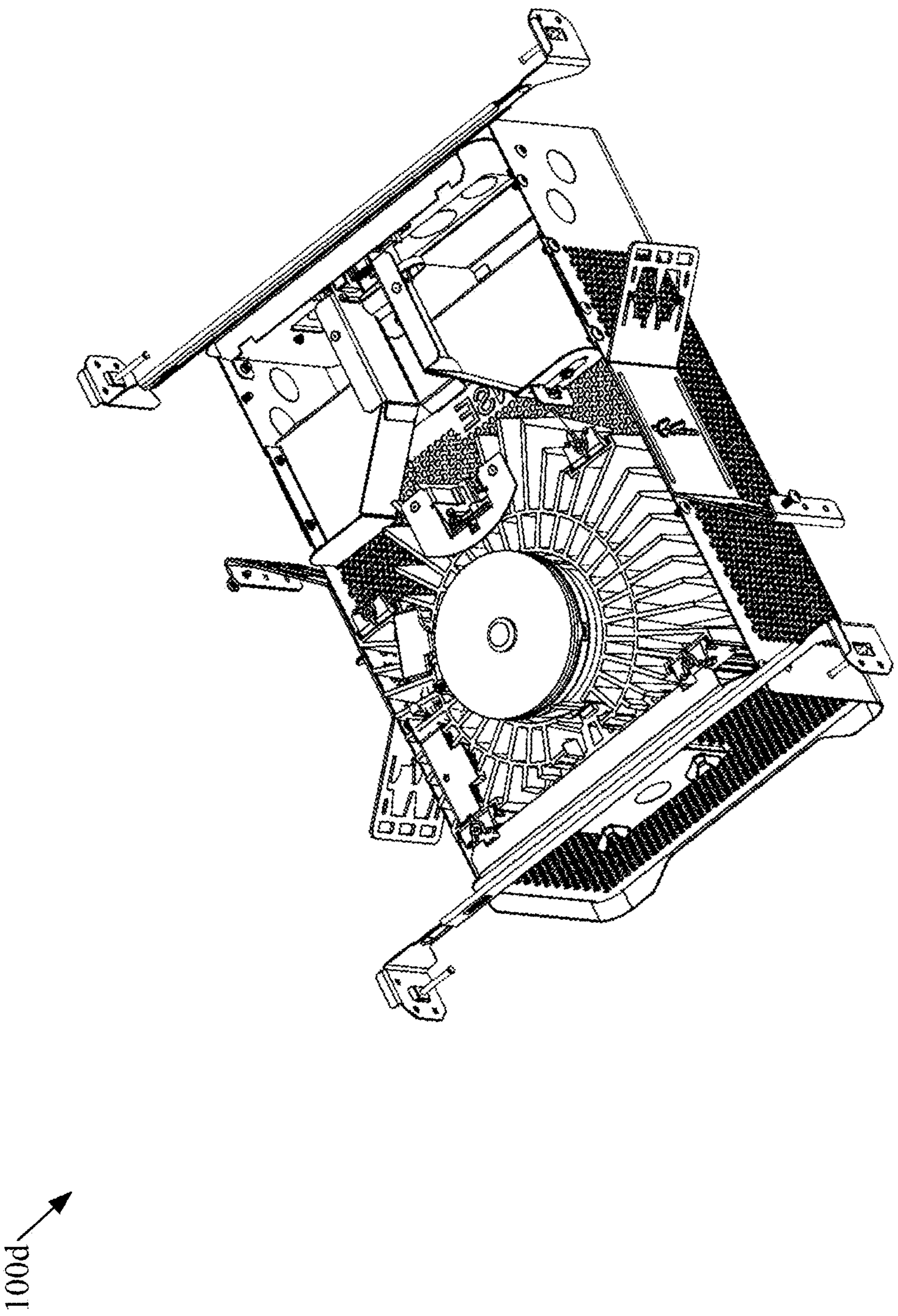
FIG. 34 on sheet 34 of the drawings is a screenshot of examples [100*a-d*] of the lighting system.
Figure 35:
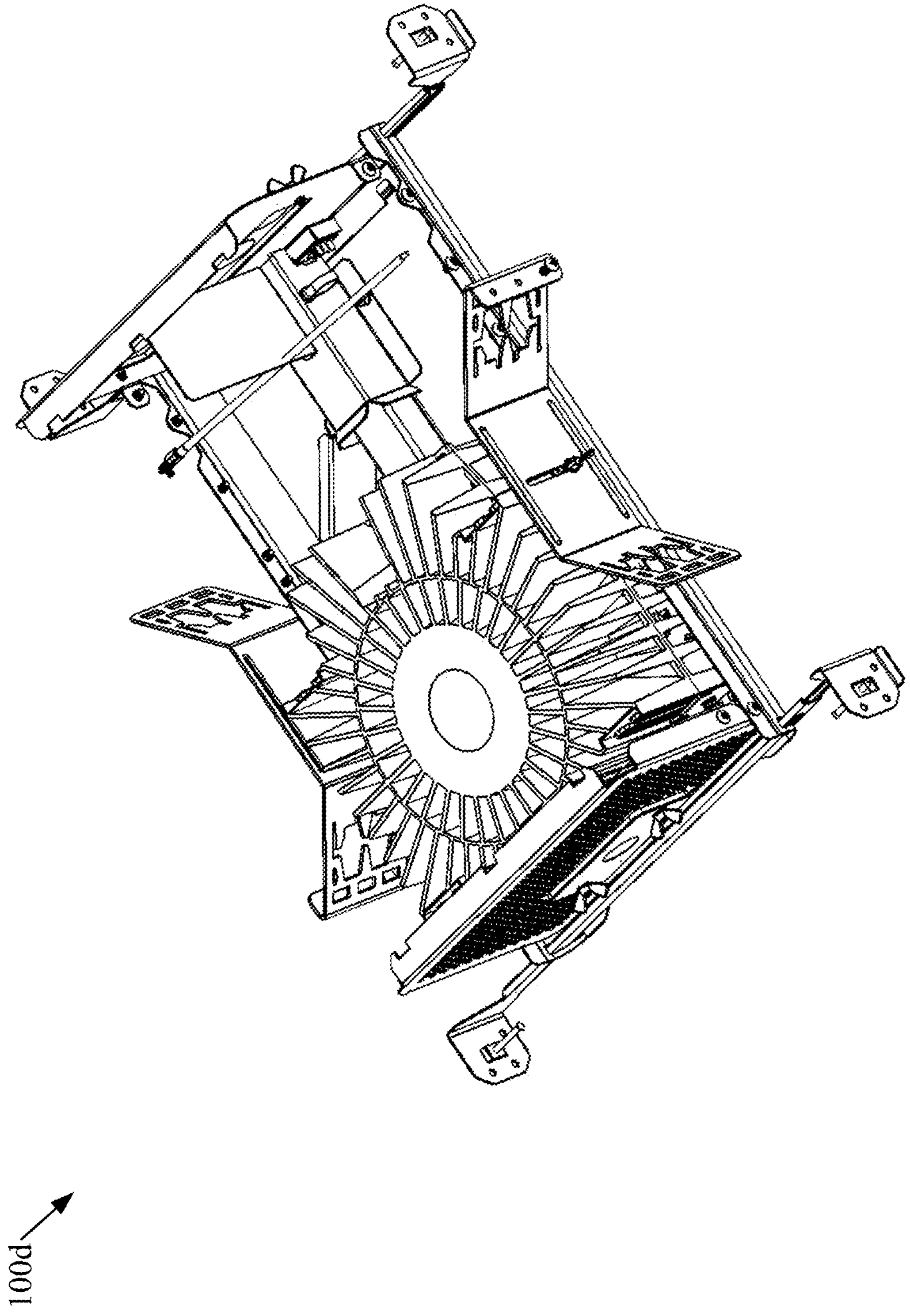
FIG. 35 on sheet 35 of the drawings is a screenshot of examples [100*a-d*] of the lighting system.
Figure 36:
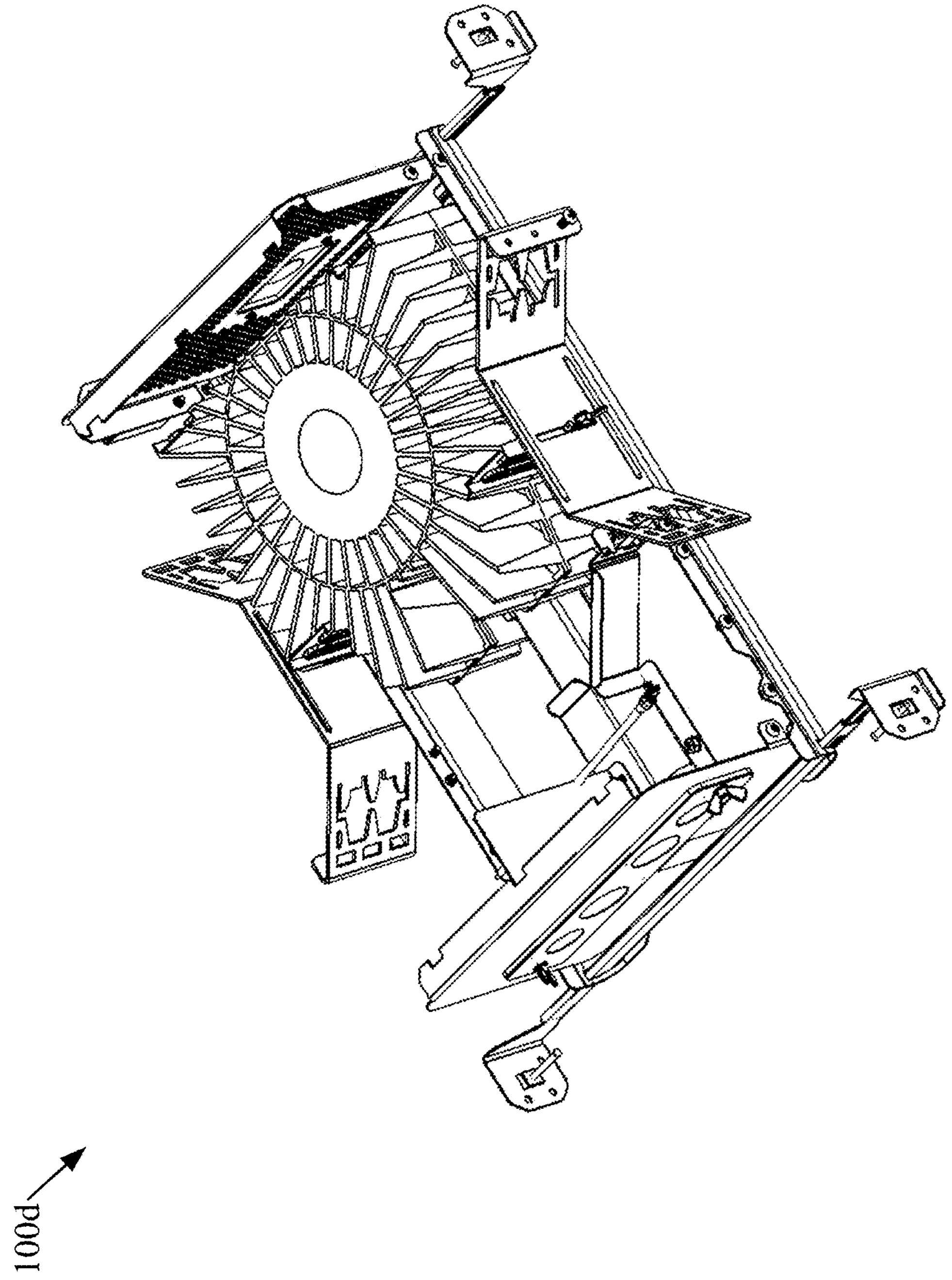
FIG. 36 on sheet 36 of the drawings is a screenshot of examples [100*a-d*] of the lighting system.
Figure 37:
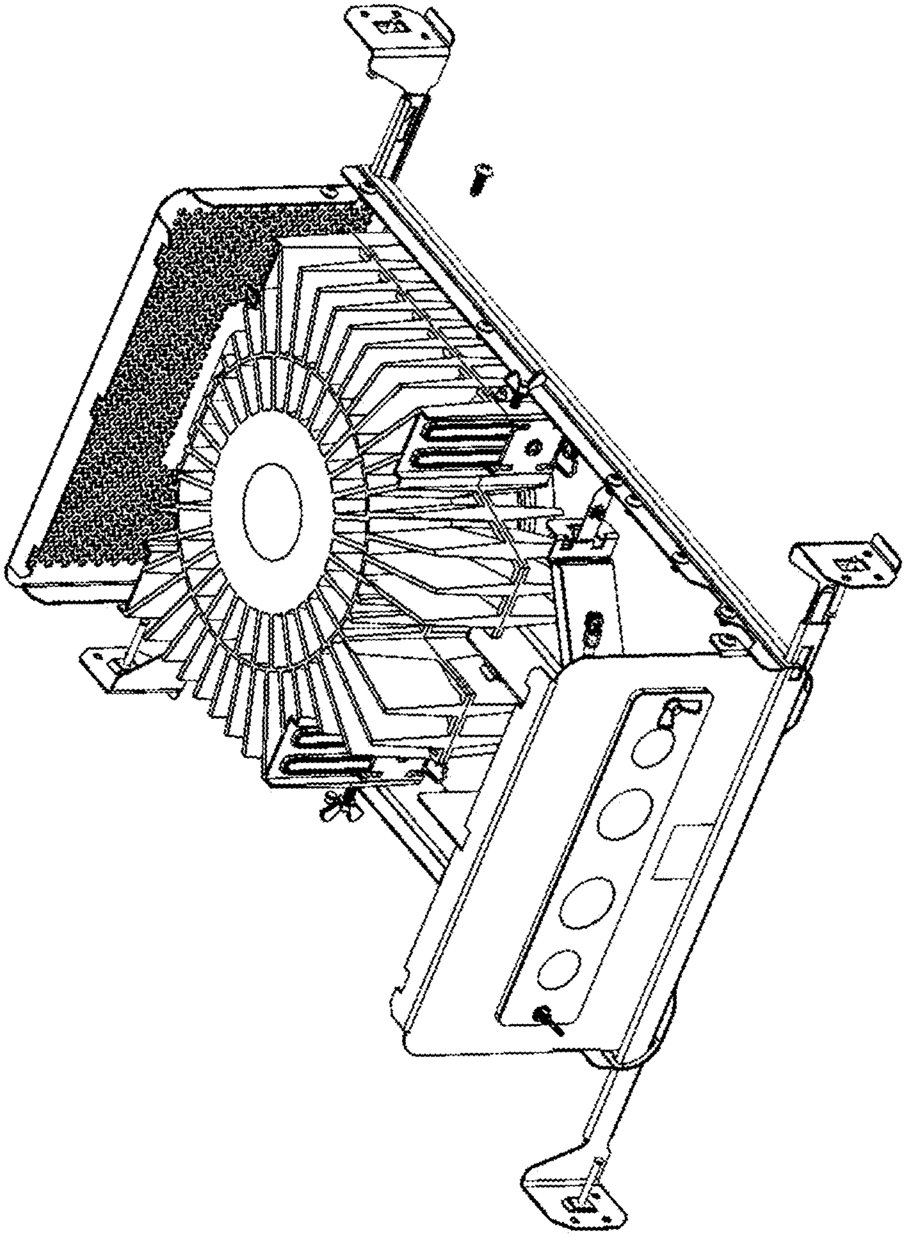
FIG. 37 on sheet 37 of the drawings is a screenshot of examples [100*a-d*] of the lighting system.
Figure 38:
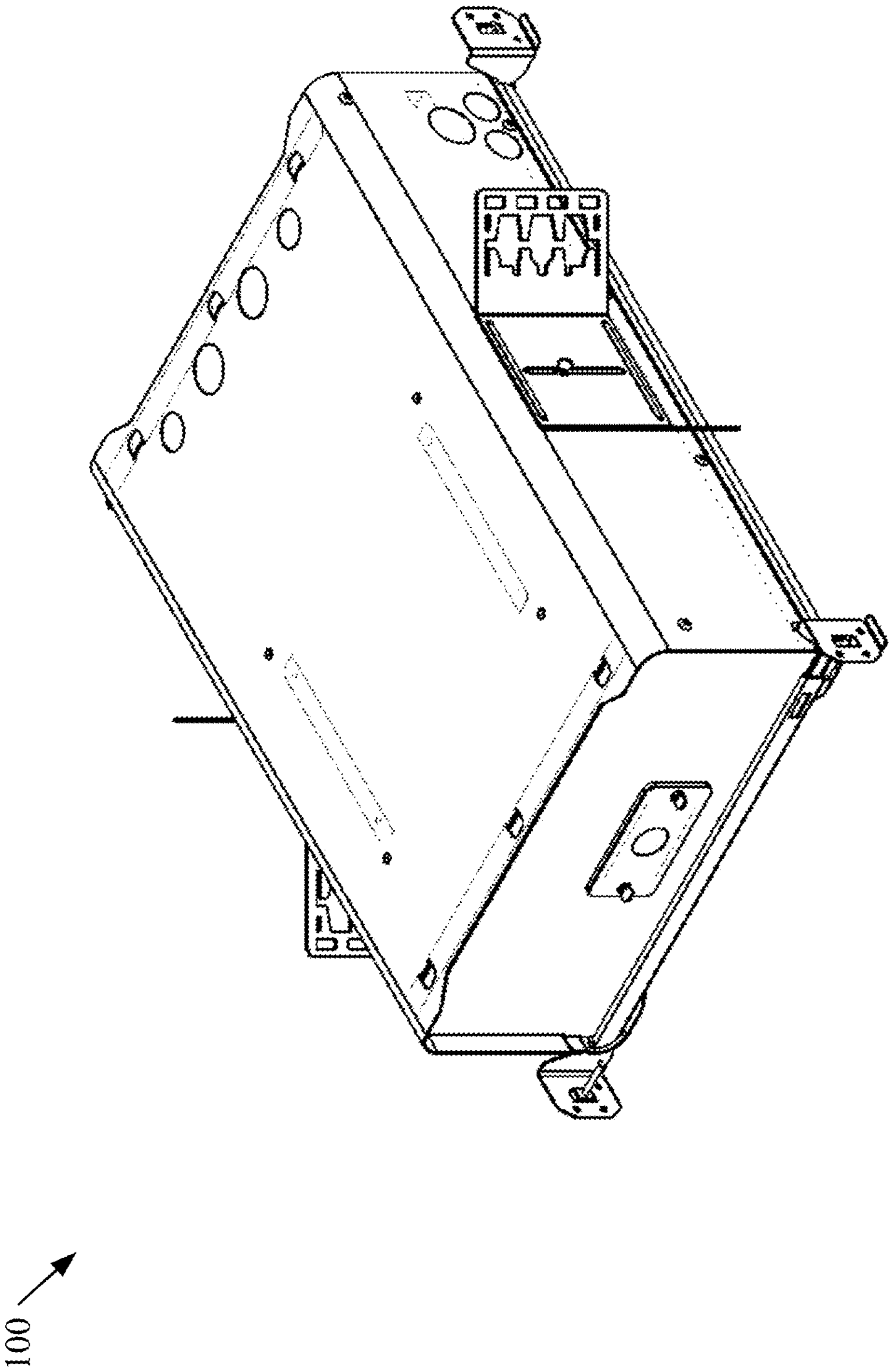
FIG. 38 on sheet 38 of the drawings is a screenshot of Pan-related features of the examples [100*a-d*] of the lighting system.
Figure 39:
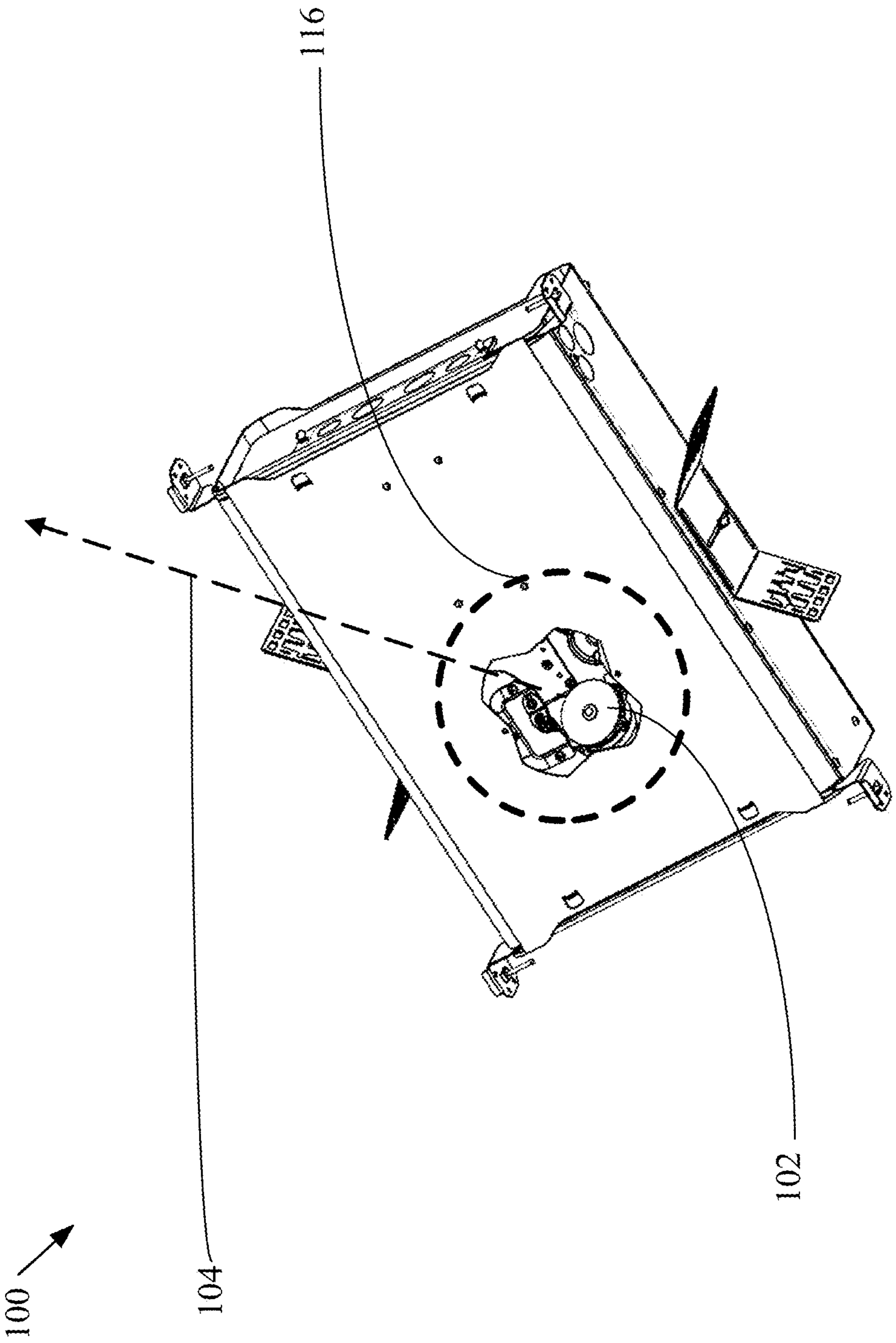
FIG. 39 on sheet 39 of the drawings is a screenshot of Pan-related features of the examples [100*a-d*] of the lighting system.
Figure 40:
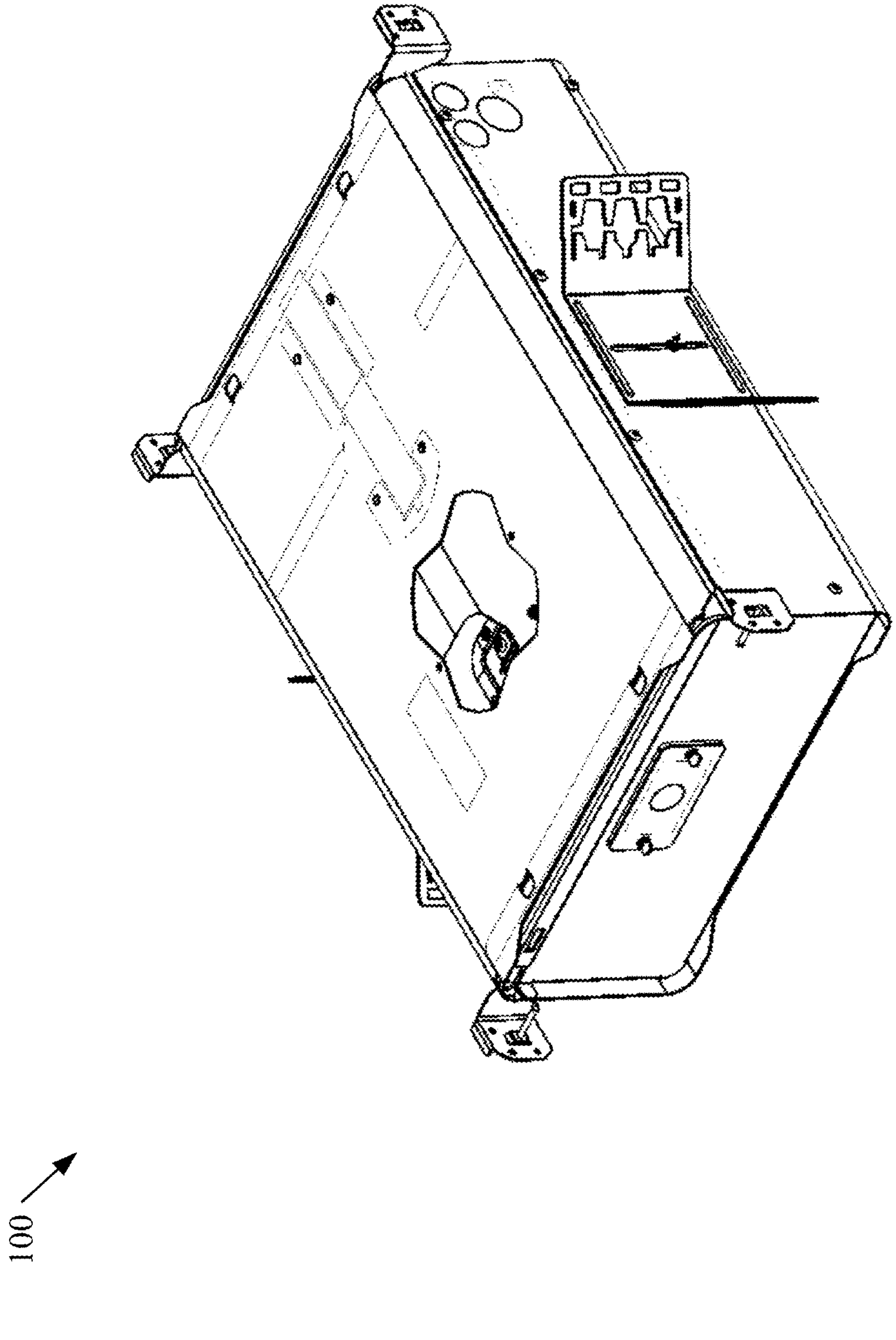
FIG. 40 on sheet 40 of the drawings is a screenshot of Pan-related features of the examples [100*a-d*] of the lighting system.
Figure 41:
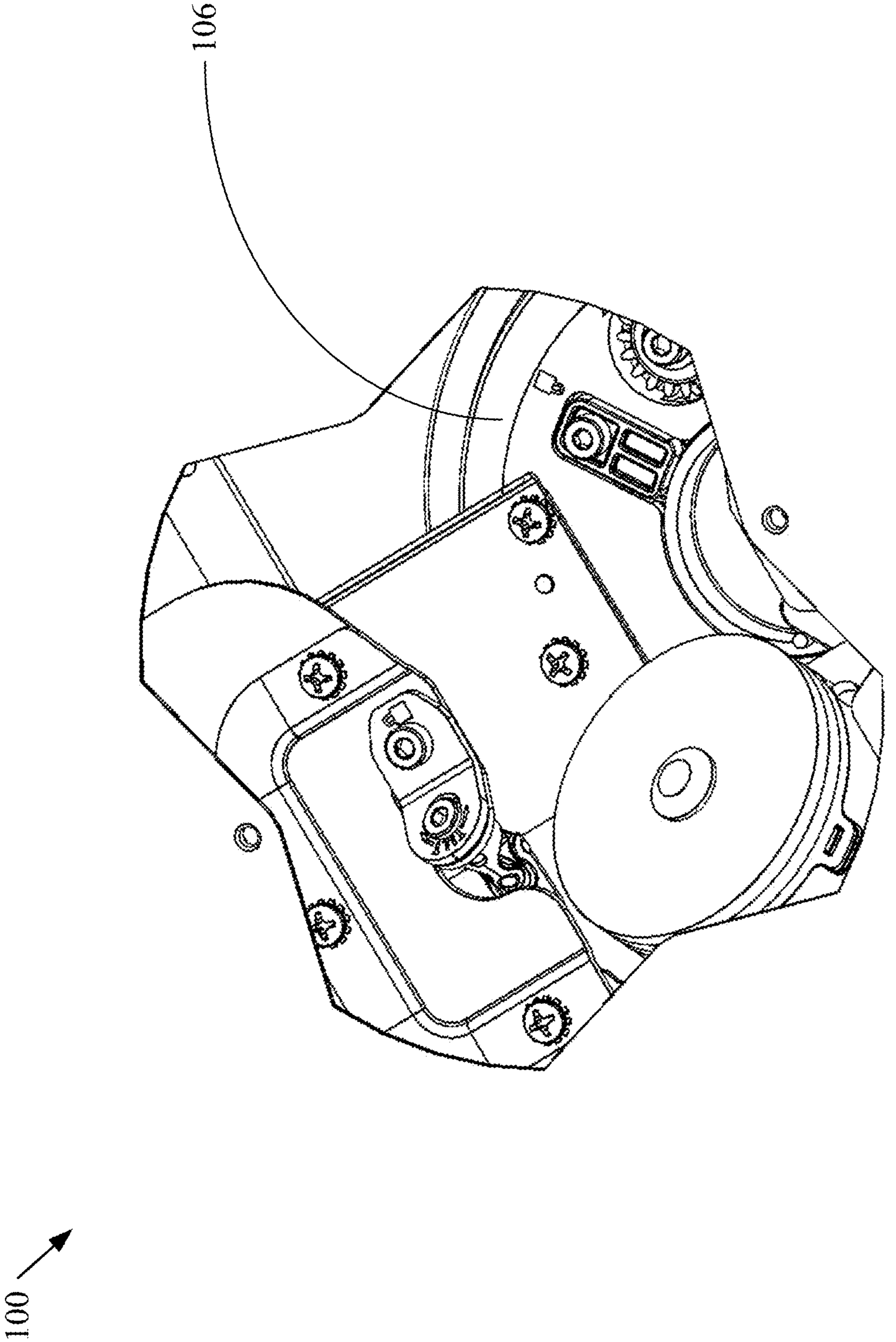
FIG. 41 on sheet 41 of the drawings is a screenshot of Pan-related features of the examples [100*a-d*] of the lighting system.
Figure 42:
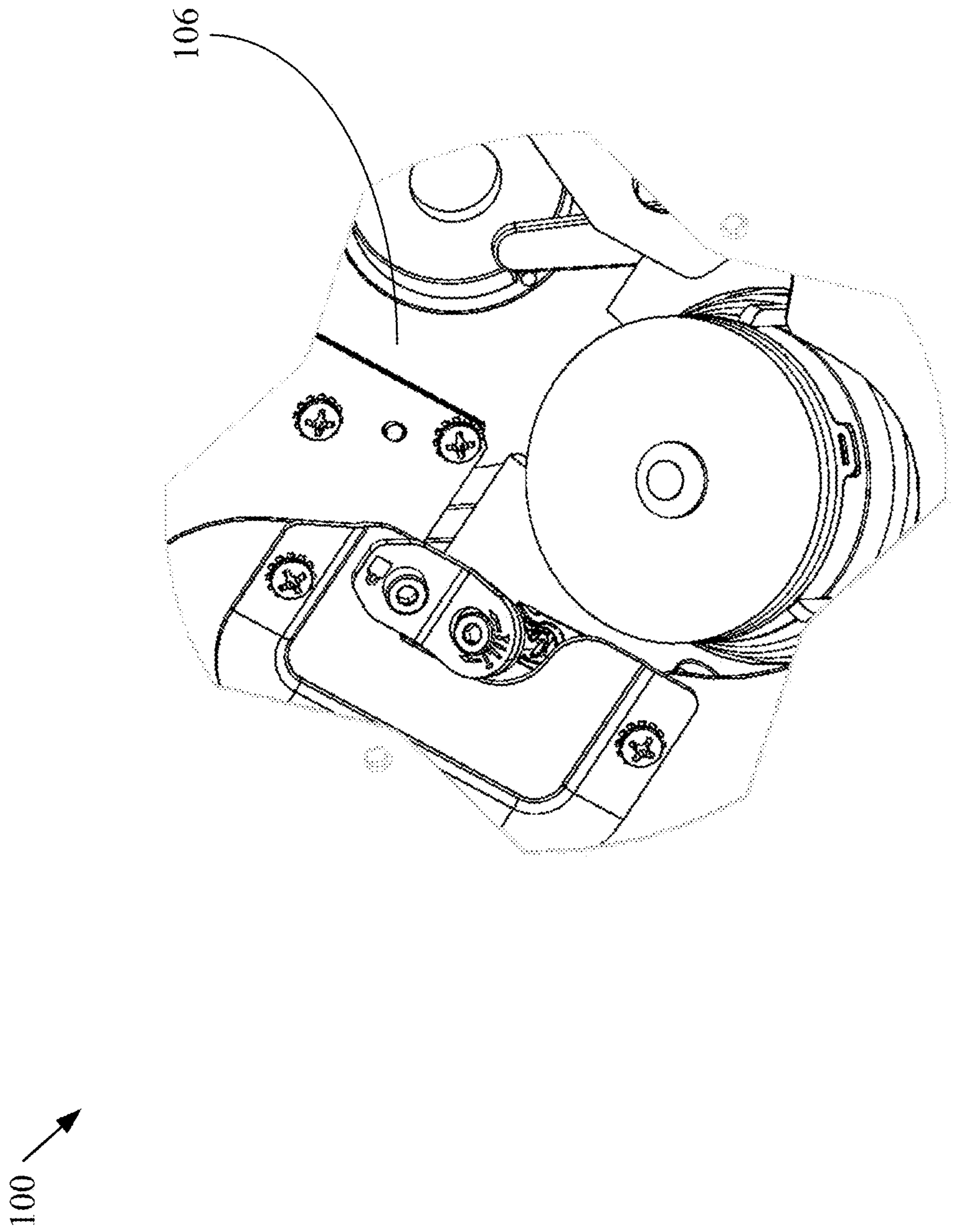
FIG. 42 on sheet 42 of the drawings is a screenshot of Pan-related features of the examples [100*a-d*] of the lighting system.
Figure 43:
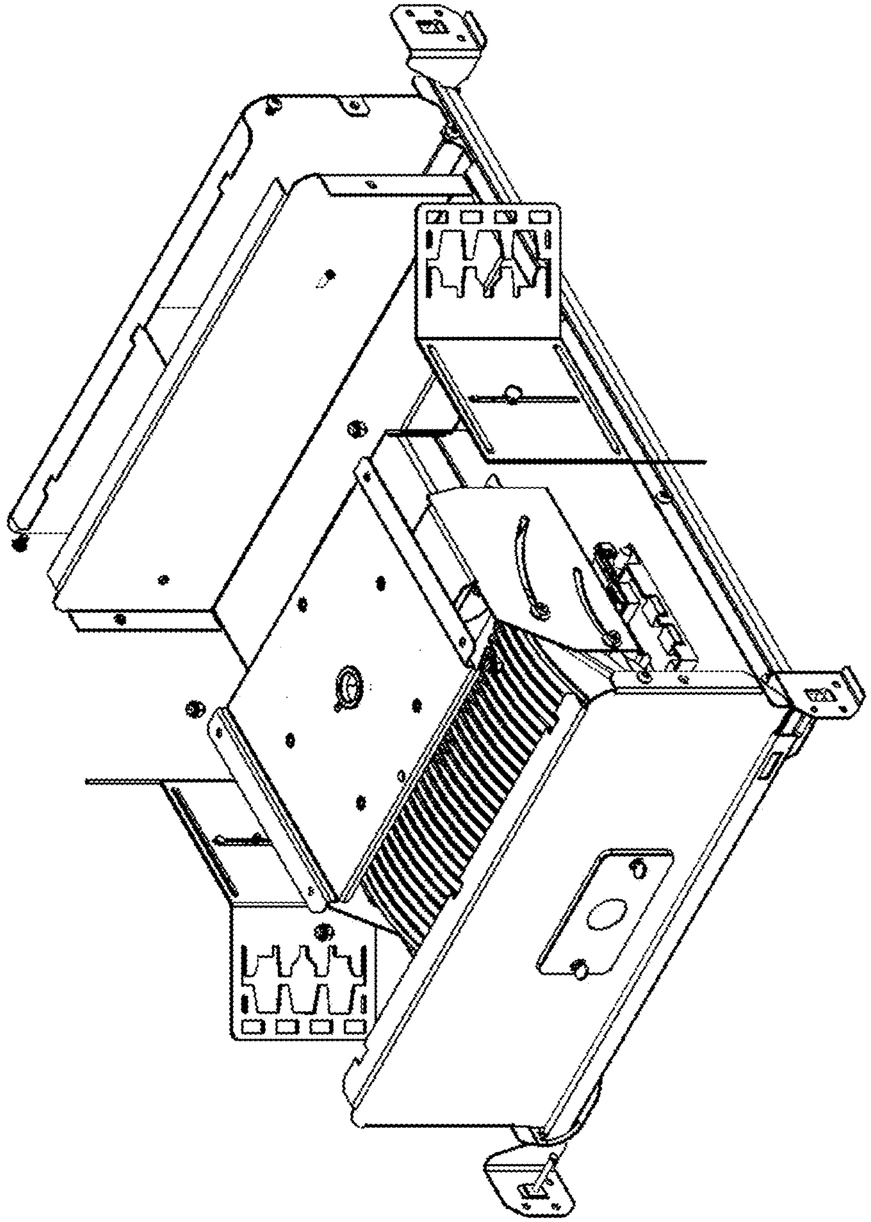
FIG. 43 on sheet 43 of the drawings is a screenshot of Pan-related features of the examples [100*a-d*] of the lighting system.
Figure 44:
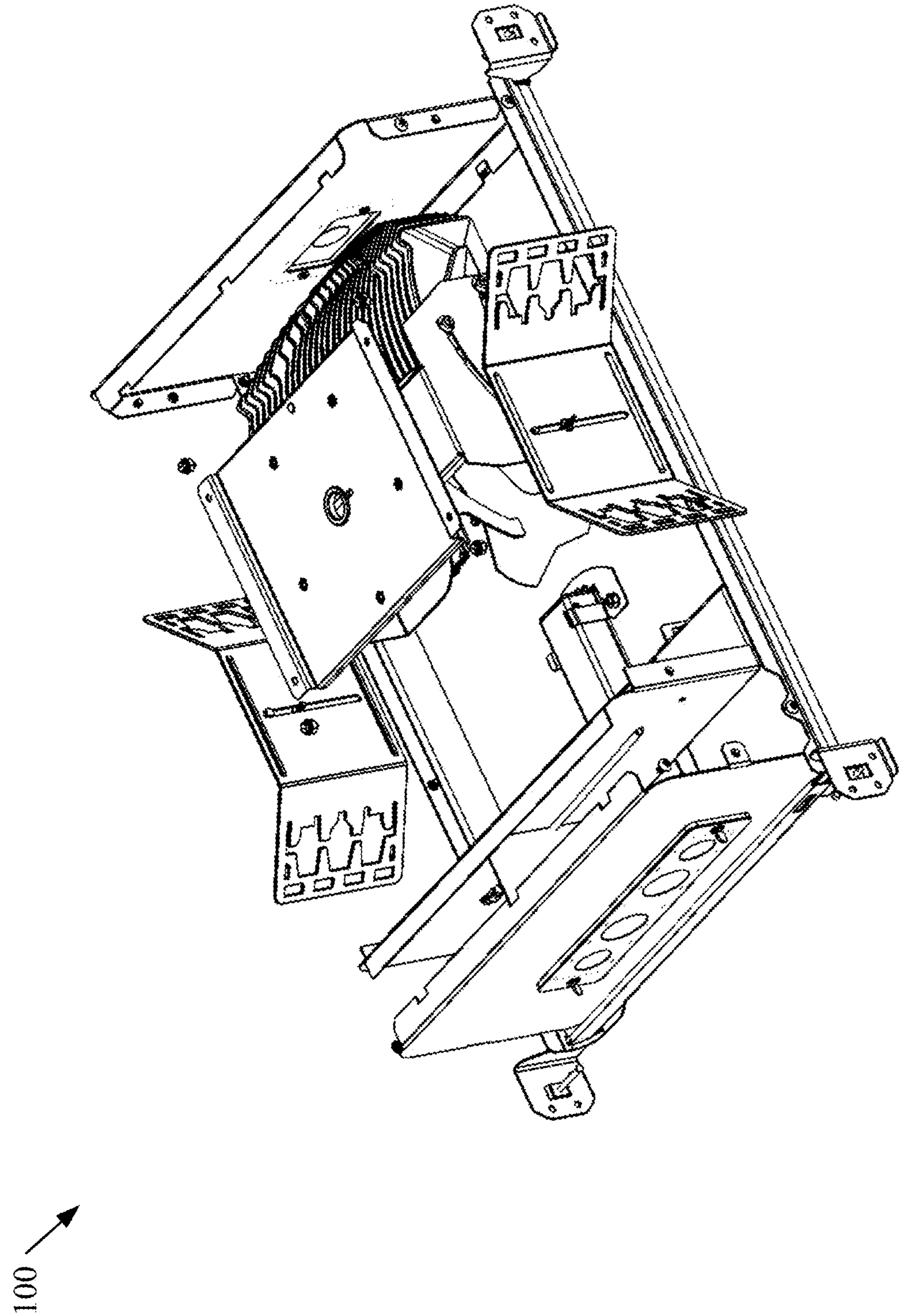
FIG. 44 on sheet 44 of the drawings is a screenshot of Pan-related features of the examples [100*a-d*] of the lighting system.
Figure 45:
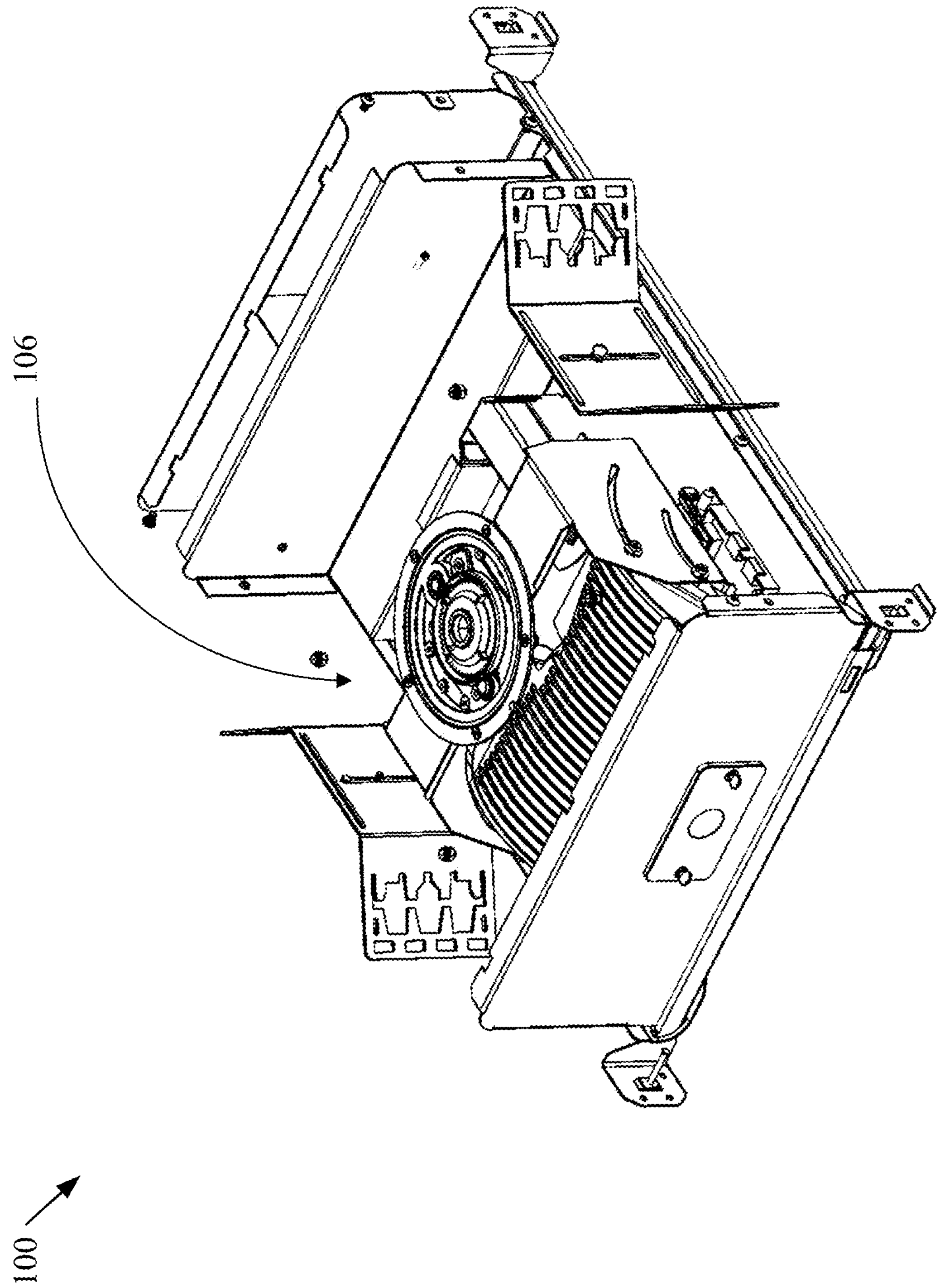
FIG. 45 on sheet 45 of the drawings is a screenshot of Pan-related features of the examples [100*a-d*] of the lighting system.
Figure 46:
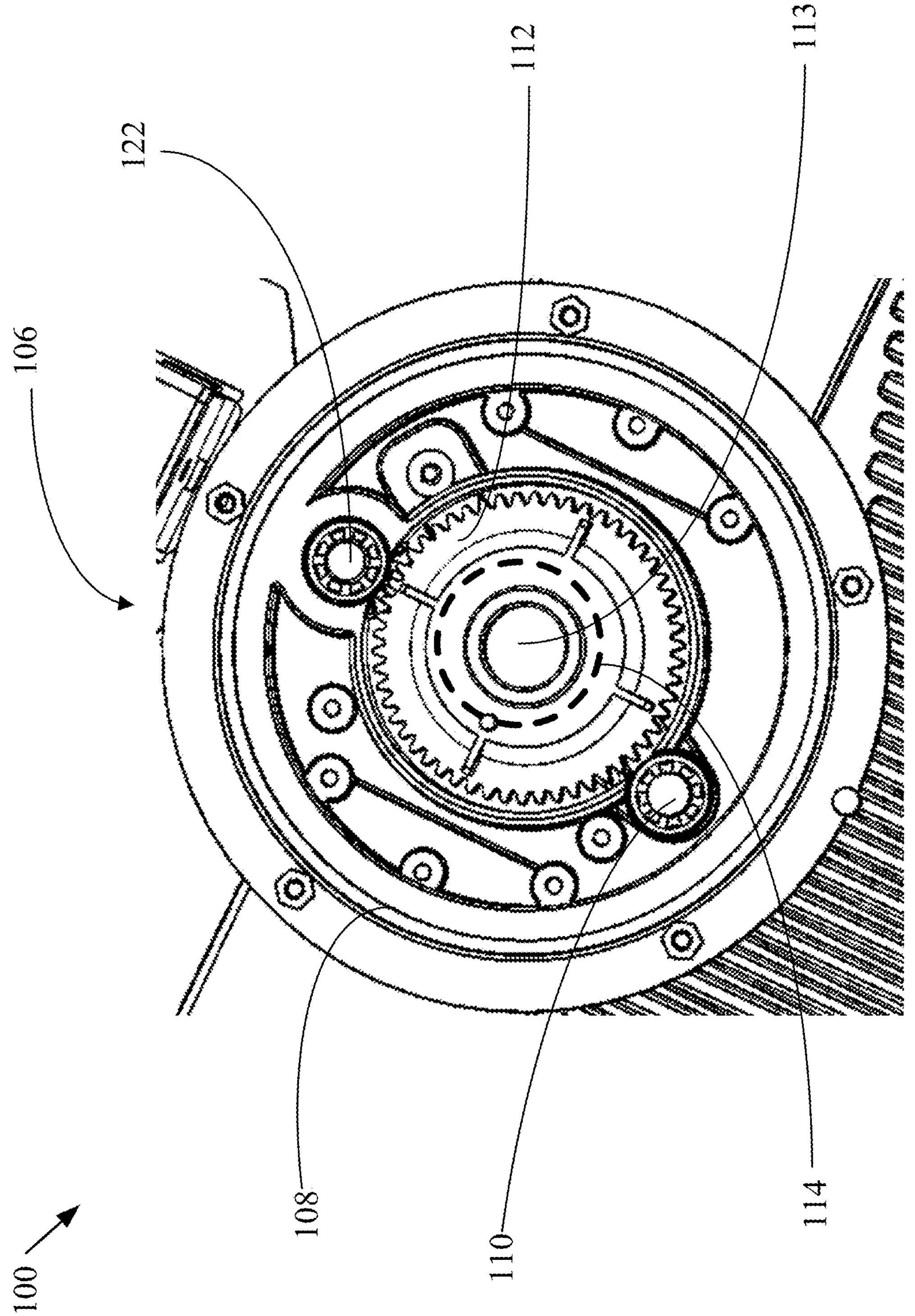
FIG. 46 on sheet 46 of the drawings is a screenshot of Pan-related features of the examples [100*a-d*] of the lighting system.
Figure 47:
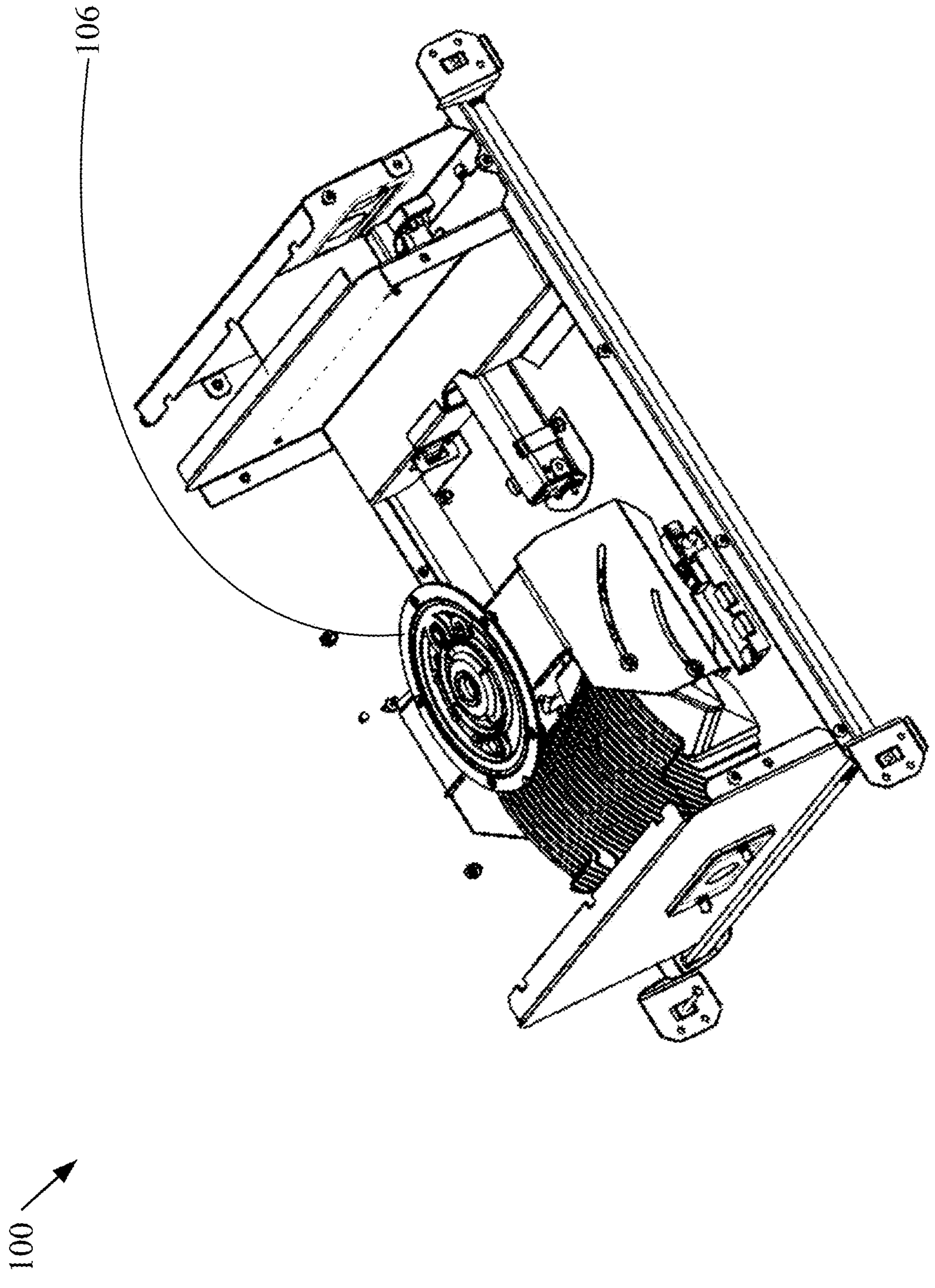
FIG. 47 on sheet 47 of the drawings is a screenshot of Pan-related features of the examples [100*a-d*] of the lighting system.
Figure 48:
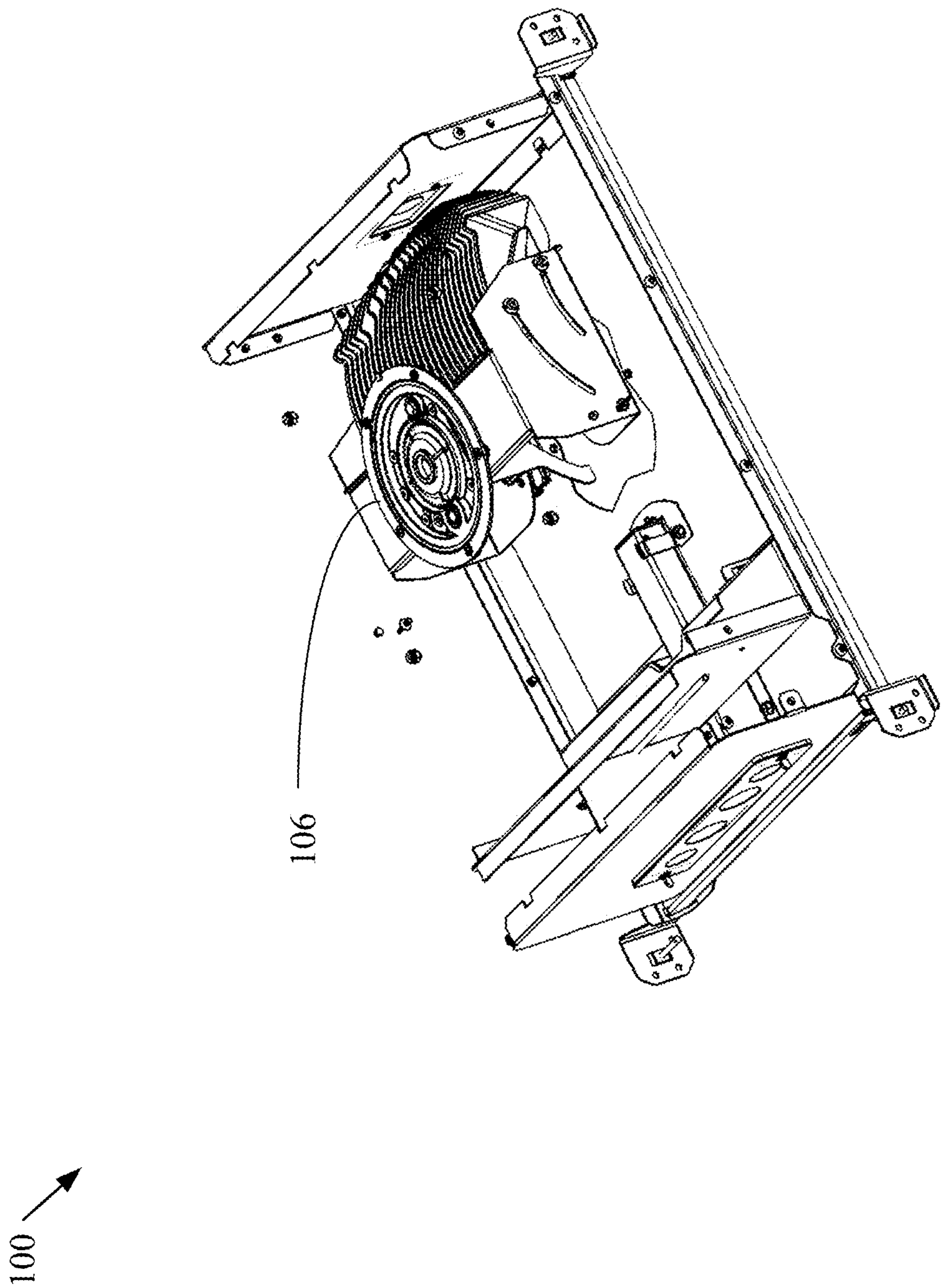
FIG. 48 on sheet 48 of the drawings is a screenshot of Pan-related features of the examples [100*a-d*] of the lighting system.
Figure 49:
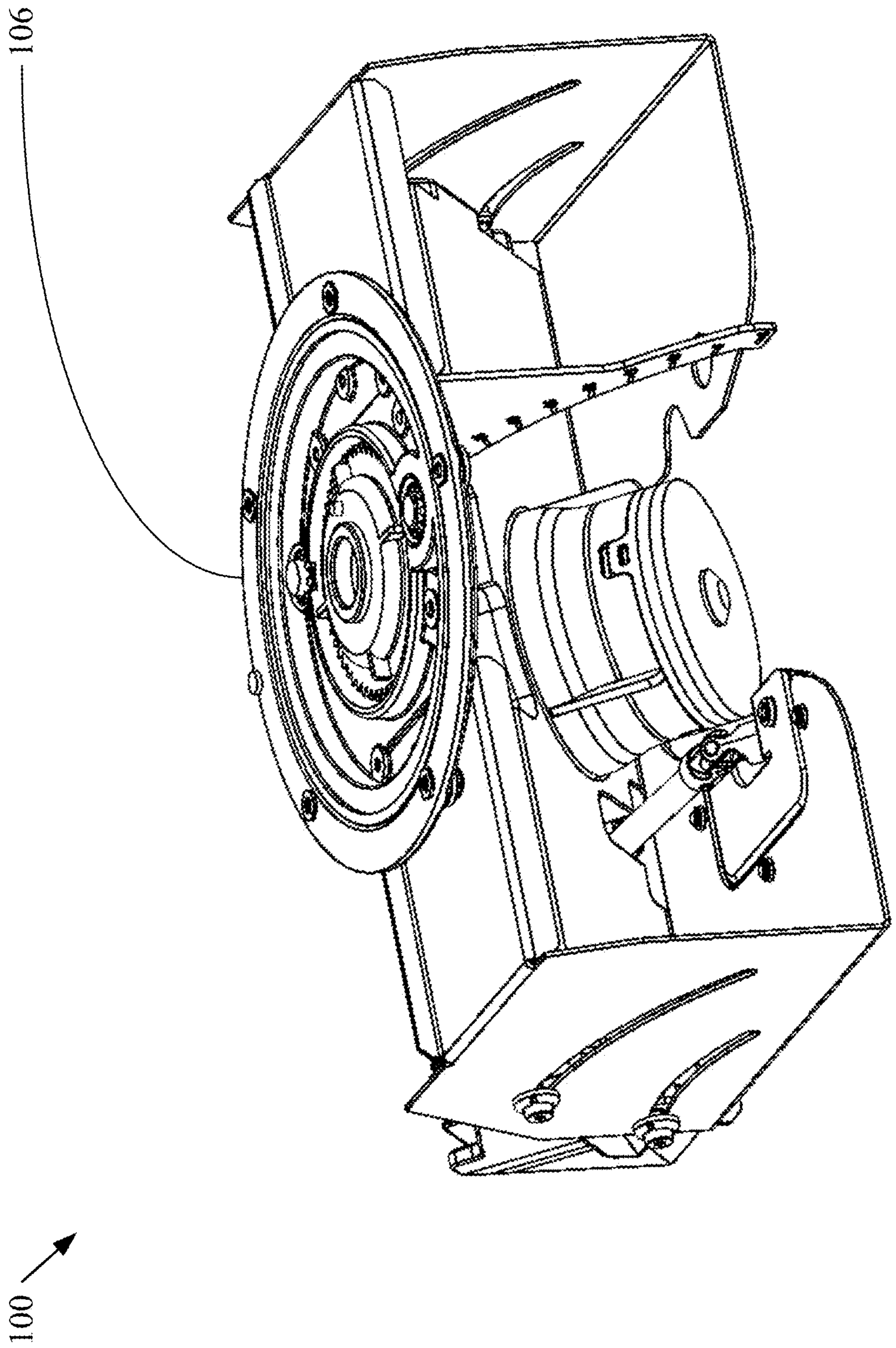
FIG. 49 on sheet 49 of the drawings is a screenshot of Pan-related features of the examples [100*a-d*] of the lighting system.
Figure 50:
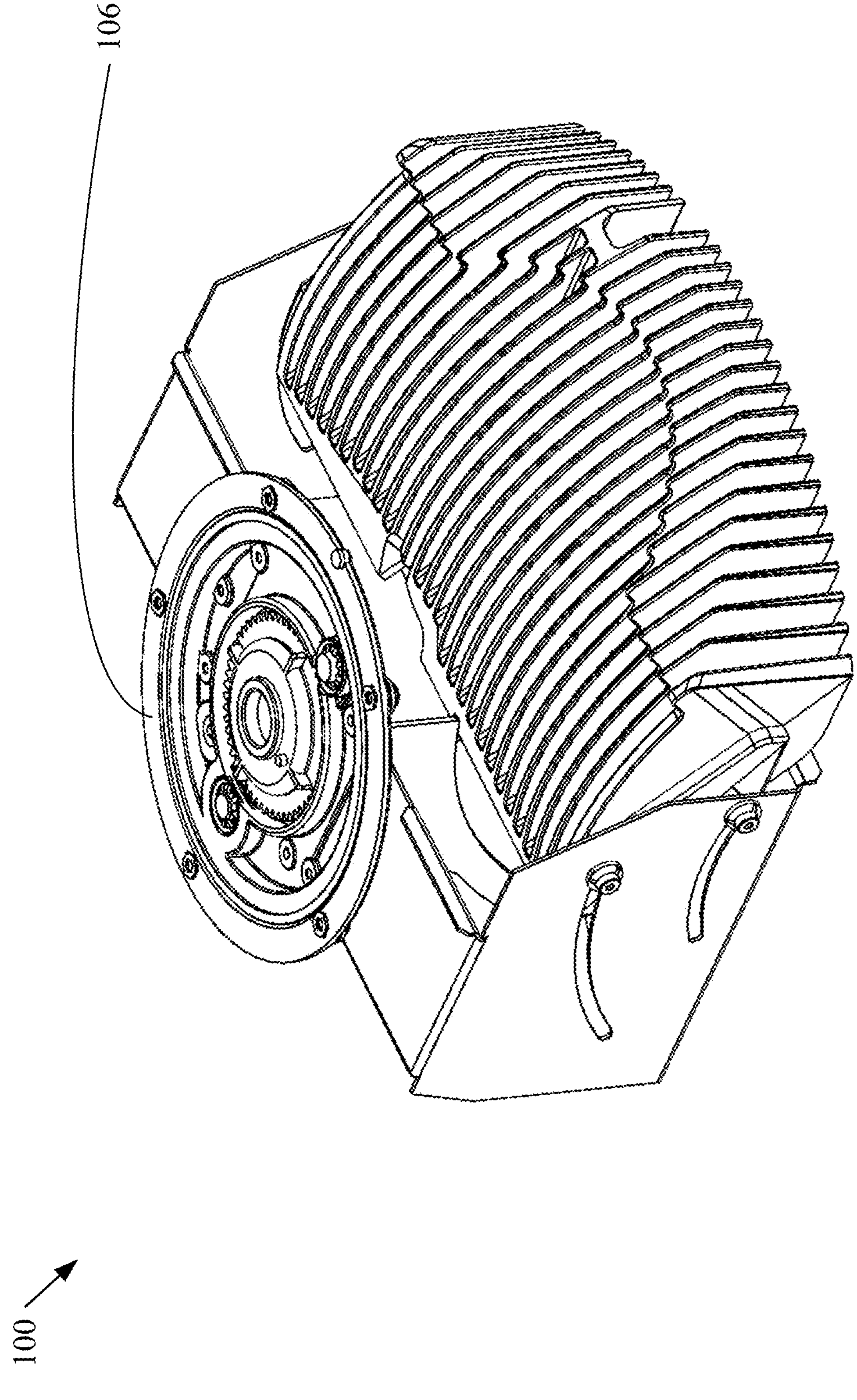
FIG. 50 on sheet 50 of the drawings is a screenshot of Pan-related features of the examples [100*a-d*] of the lighting system.
Figure 51:
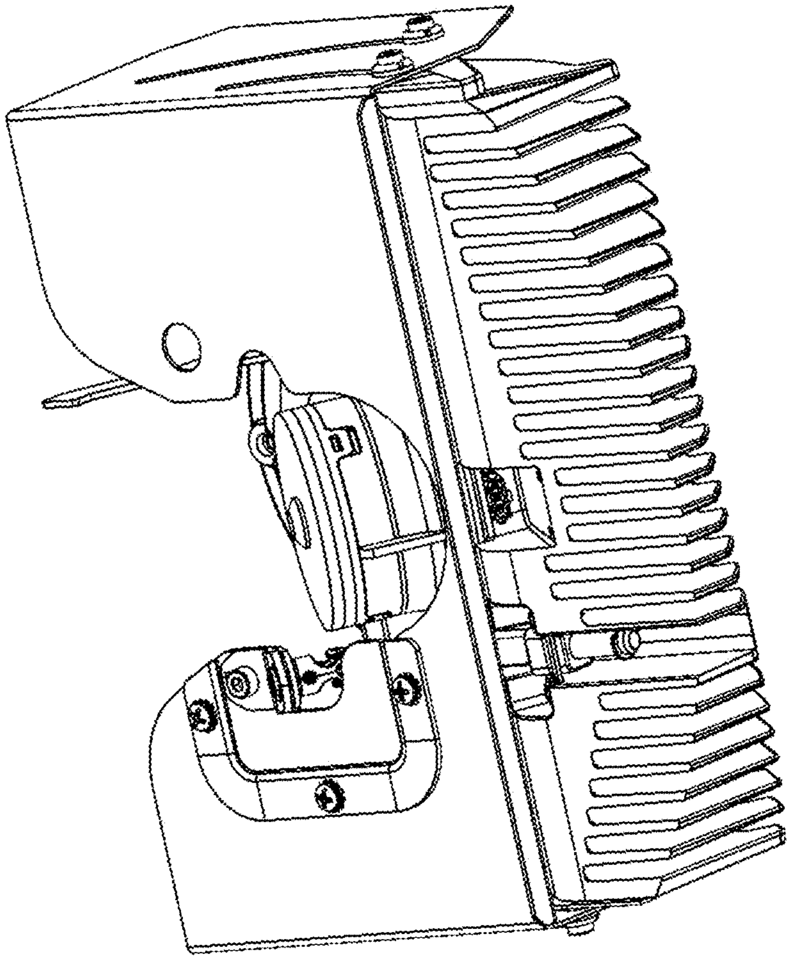
FIG. 51 on sheet 51 of the drawings is a screenshot of Pan-related features of the examples [100*a-d*] of the lighting system.
Figure 52:
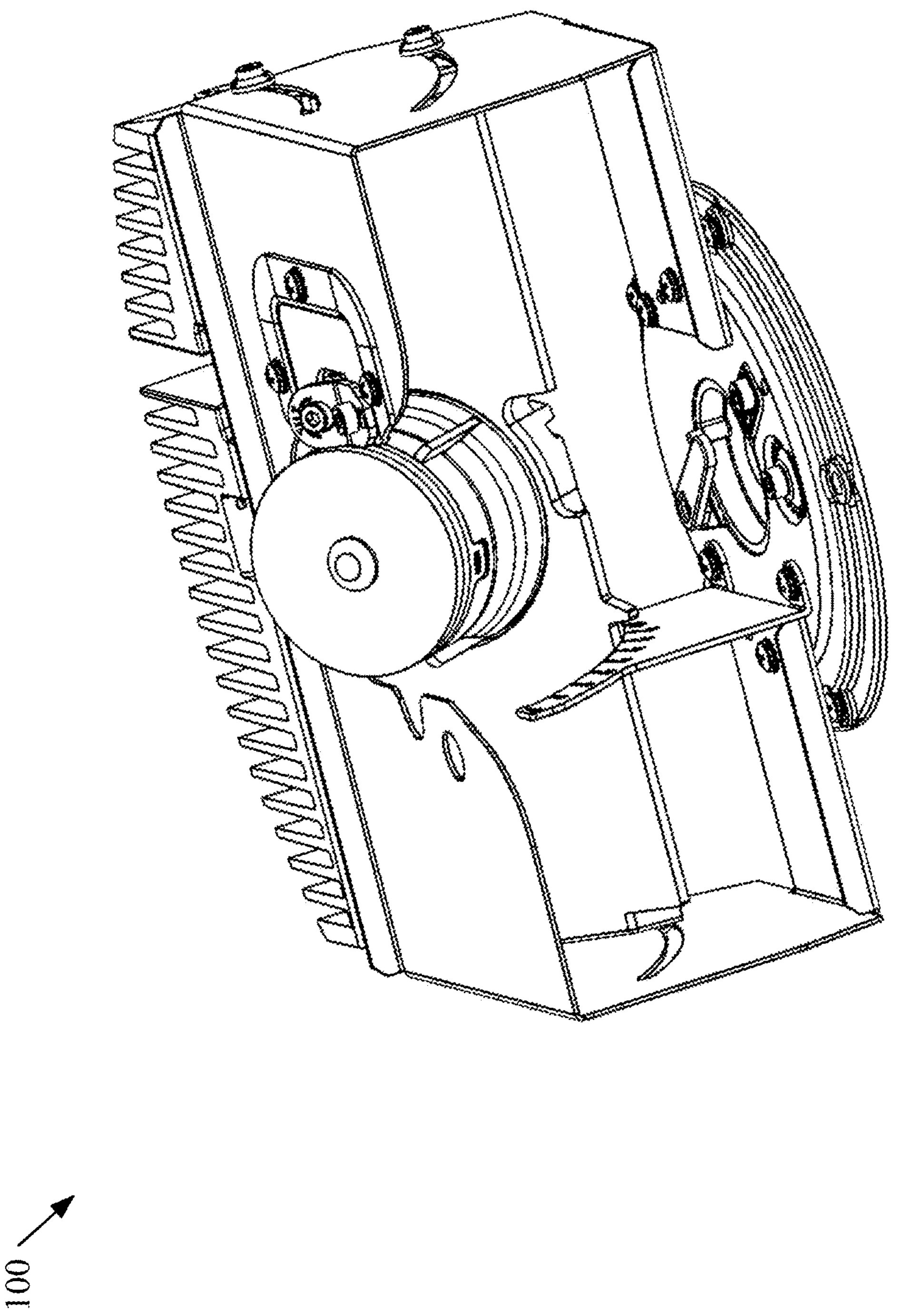
FIG. 52 on sheet 52 of the drawings is a screenshot of Pan-related features of the examples [100*a-d*] of the lighting system.
Figure 53:
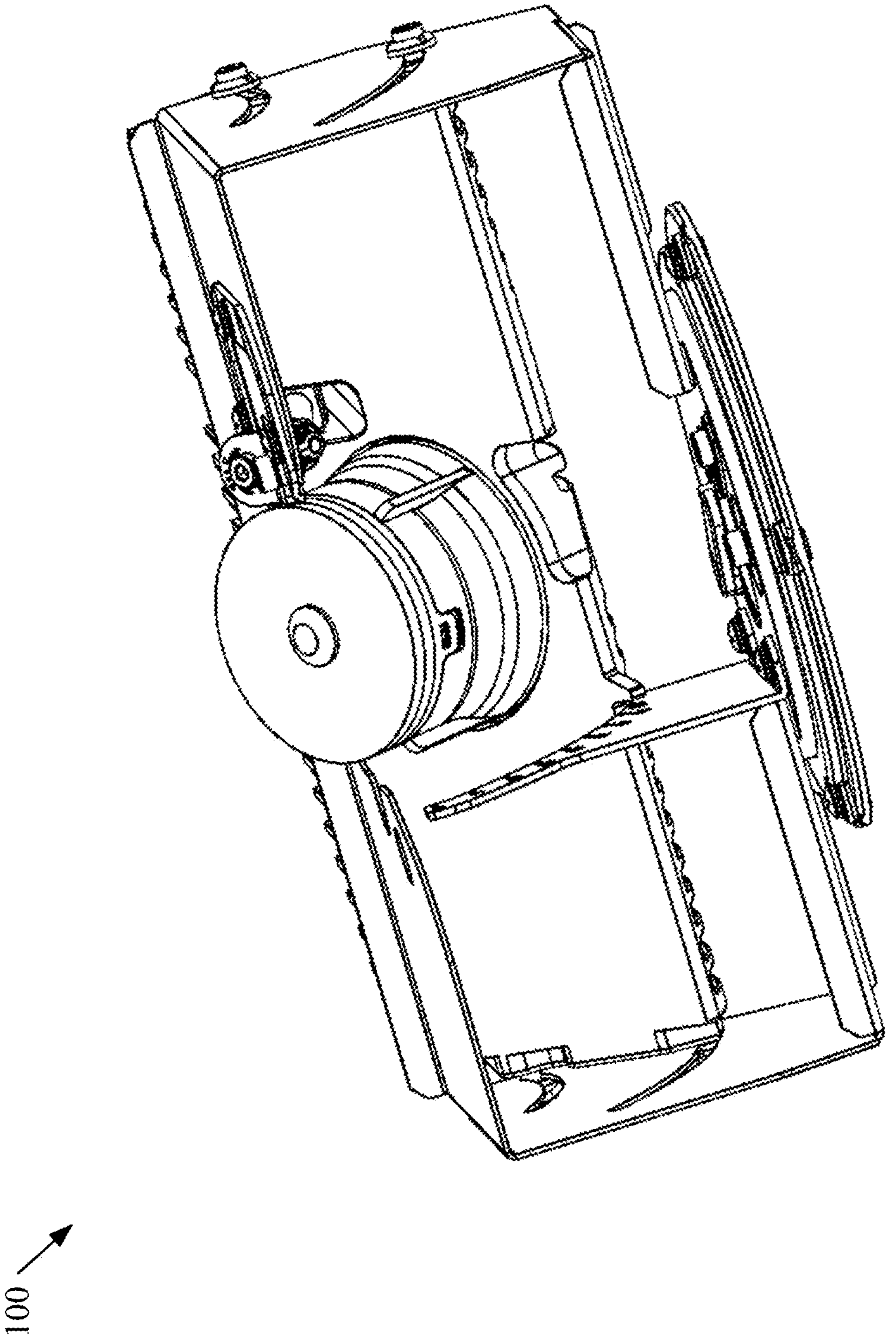
FIG. 53 on sheet 53 of the drawings is a screenshot of Pan-related features of the examples [100*a-d*] of the lighting system.
Figure 54:
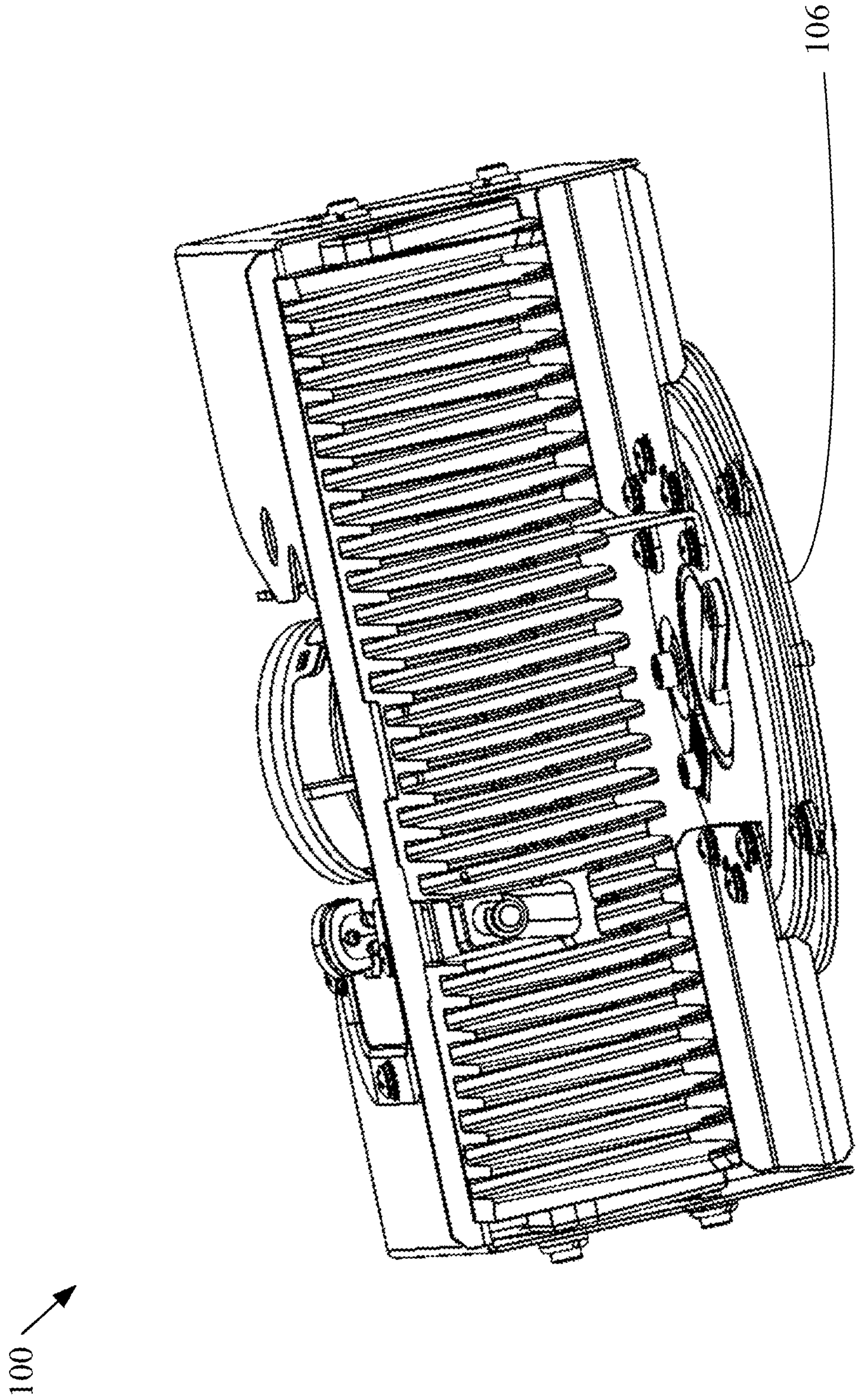
FIG. 54 on sheet 54 of the drawings is a screenshot of Pan-related features of the examples [100*a-d*] of the lighting system.
Figure 55:
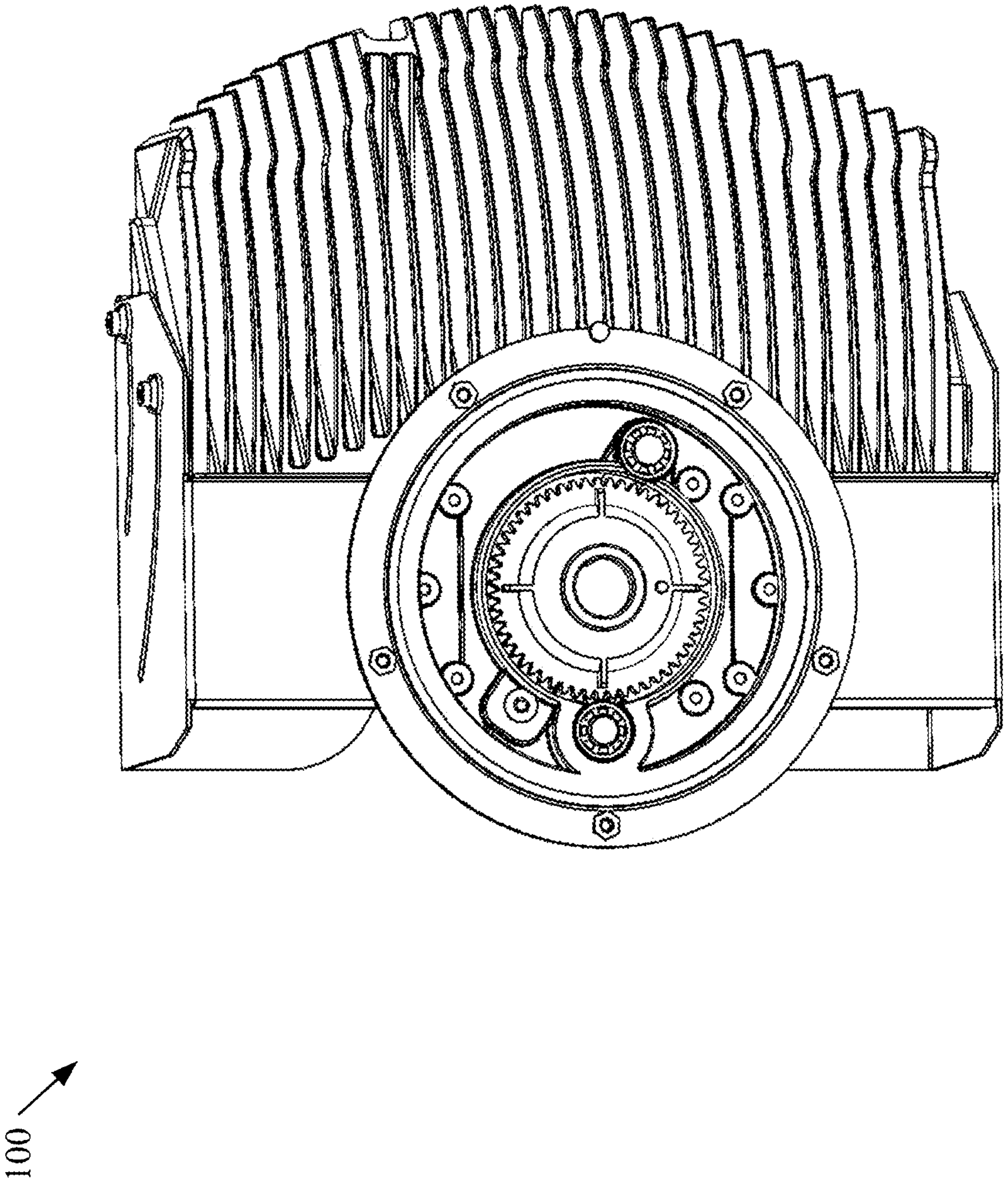
FIG. 55 on sheet 55 of the drawings is a screenshot of Pan-related features of the examples [100*a-d*] of the lighting system.
Figure 56:
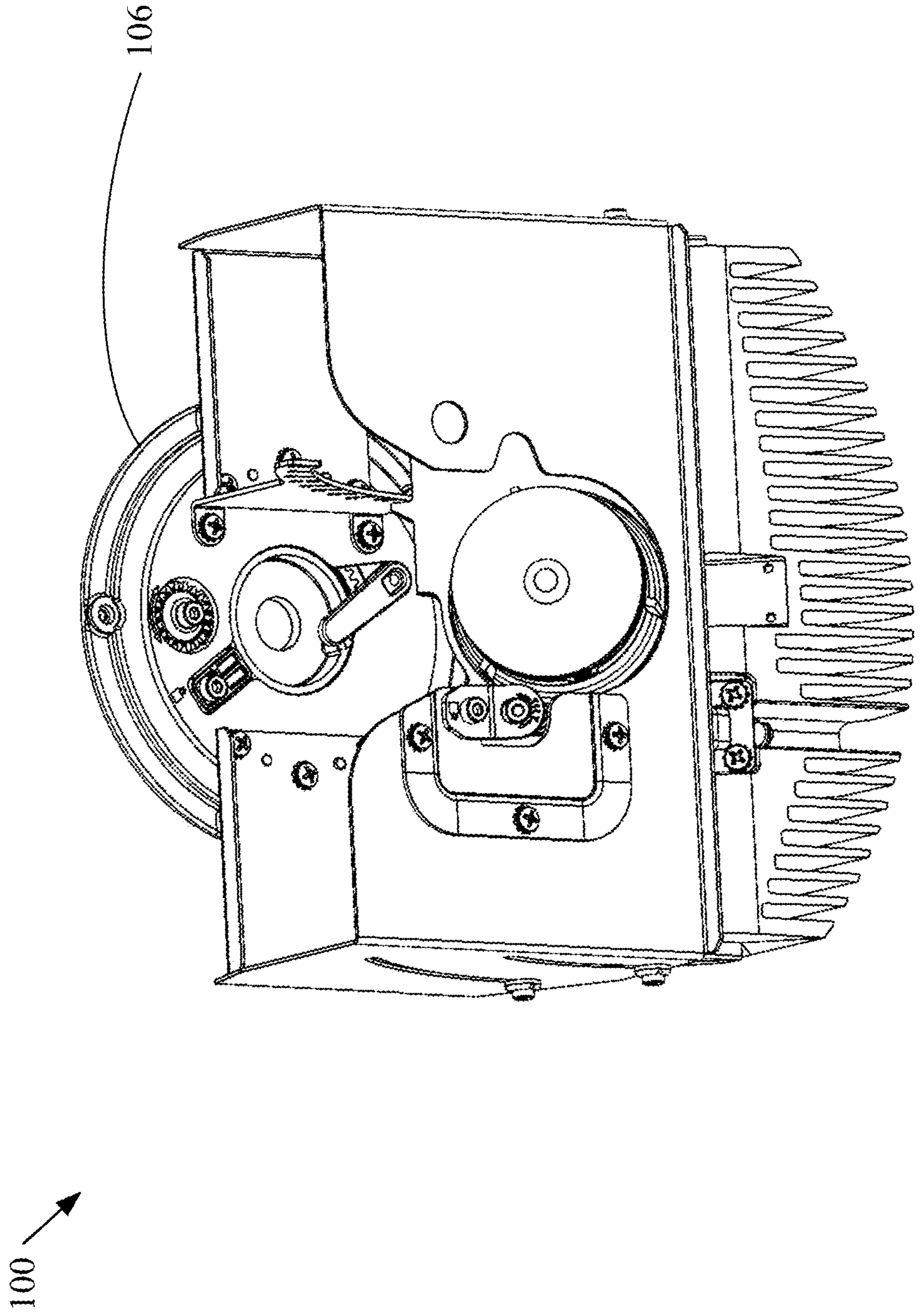
FIG. 56 on sheet 56 of the drawings is a screenshot of Pan-related features of the examples [100*a-d*] of the lighting system.
Figure 57:
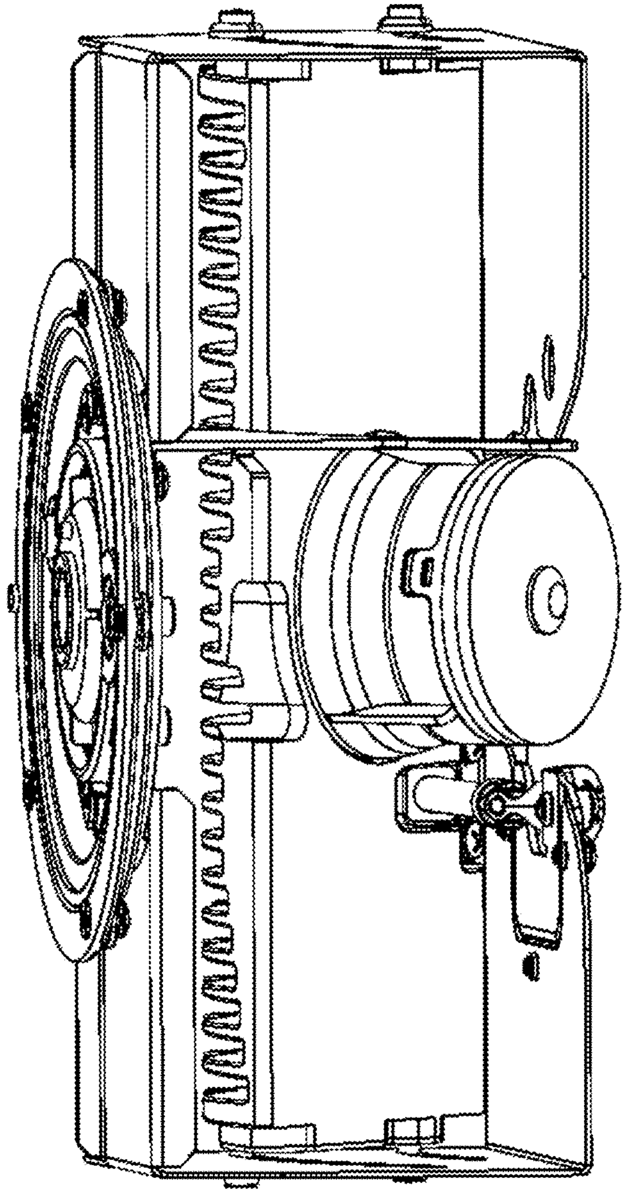
FIG. 57 on sheet 57 of the drawings is a screenshot of Pan-related features of the examples [100*a-d*] of the lighting system.
Figure 58:
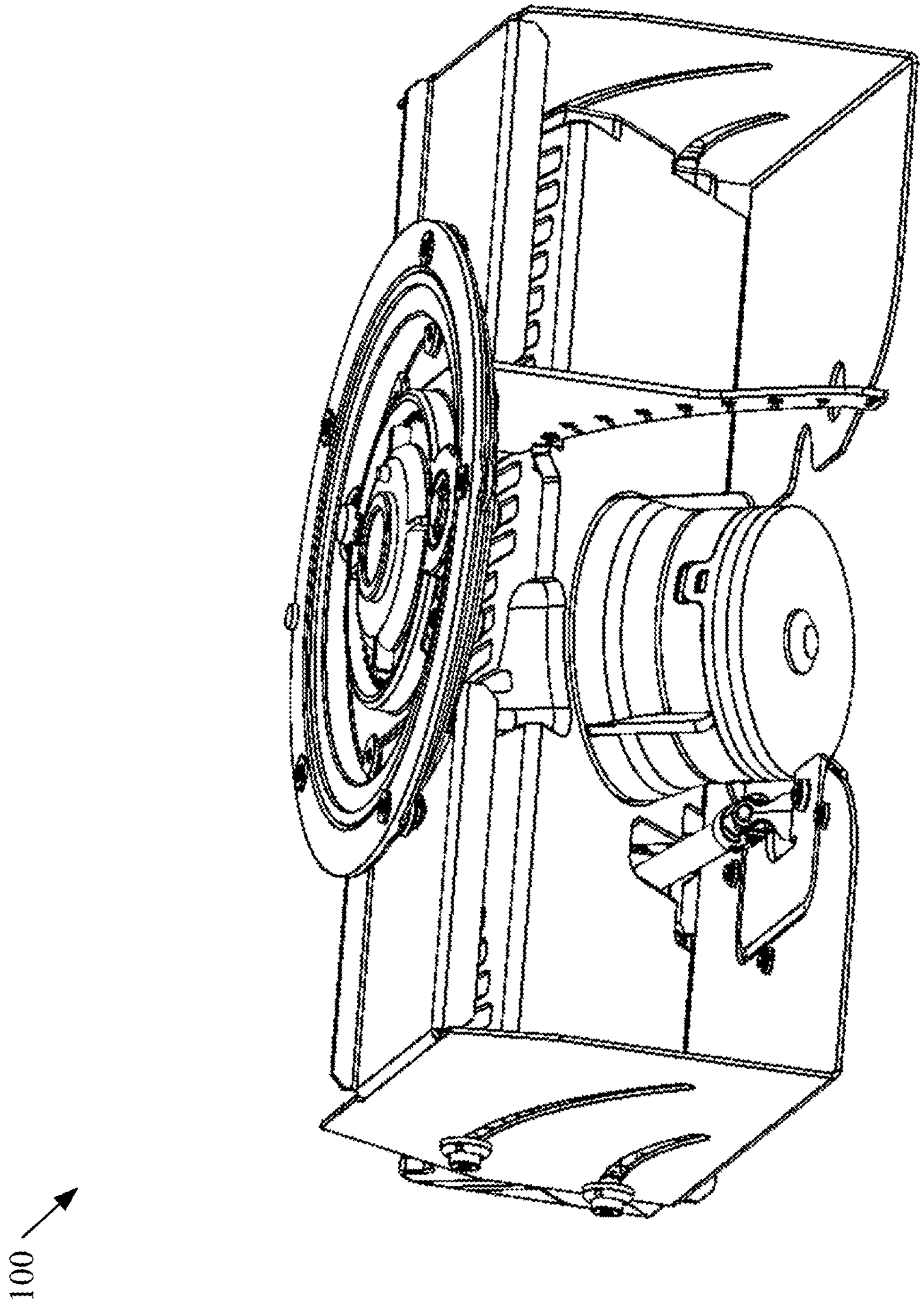
FIG. 58 on sheet 58 of the drawings is a screenshot of Pan-related features of the examples [100*a-d*] of the lighting system.
Figure 59:
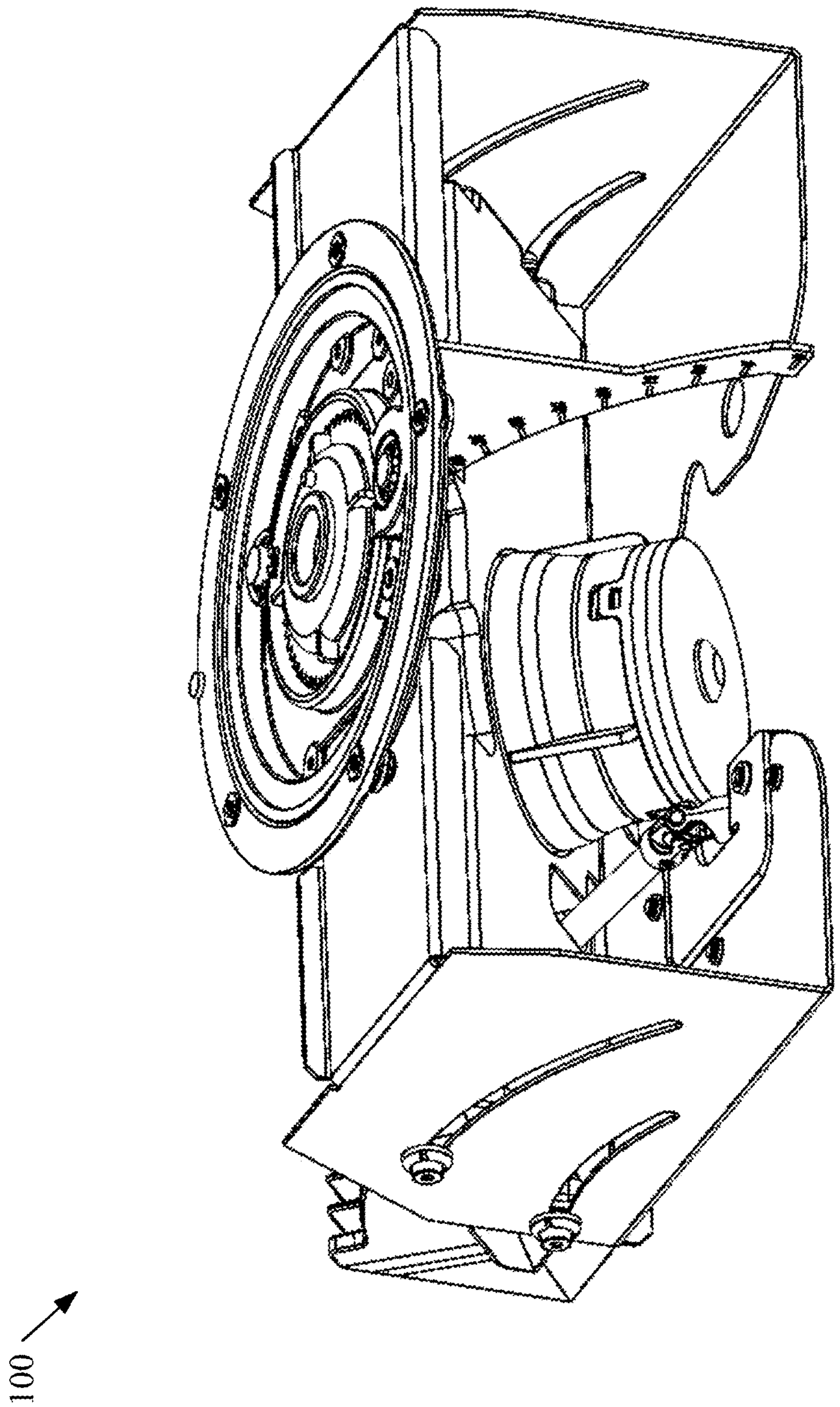
FIG. 59 on sheet 59 of the drawings is a screenshot of Pan-related features of the examples [100*a-d*] of the lighting system.
Figure 60:
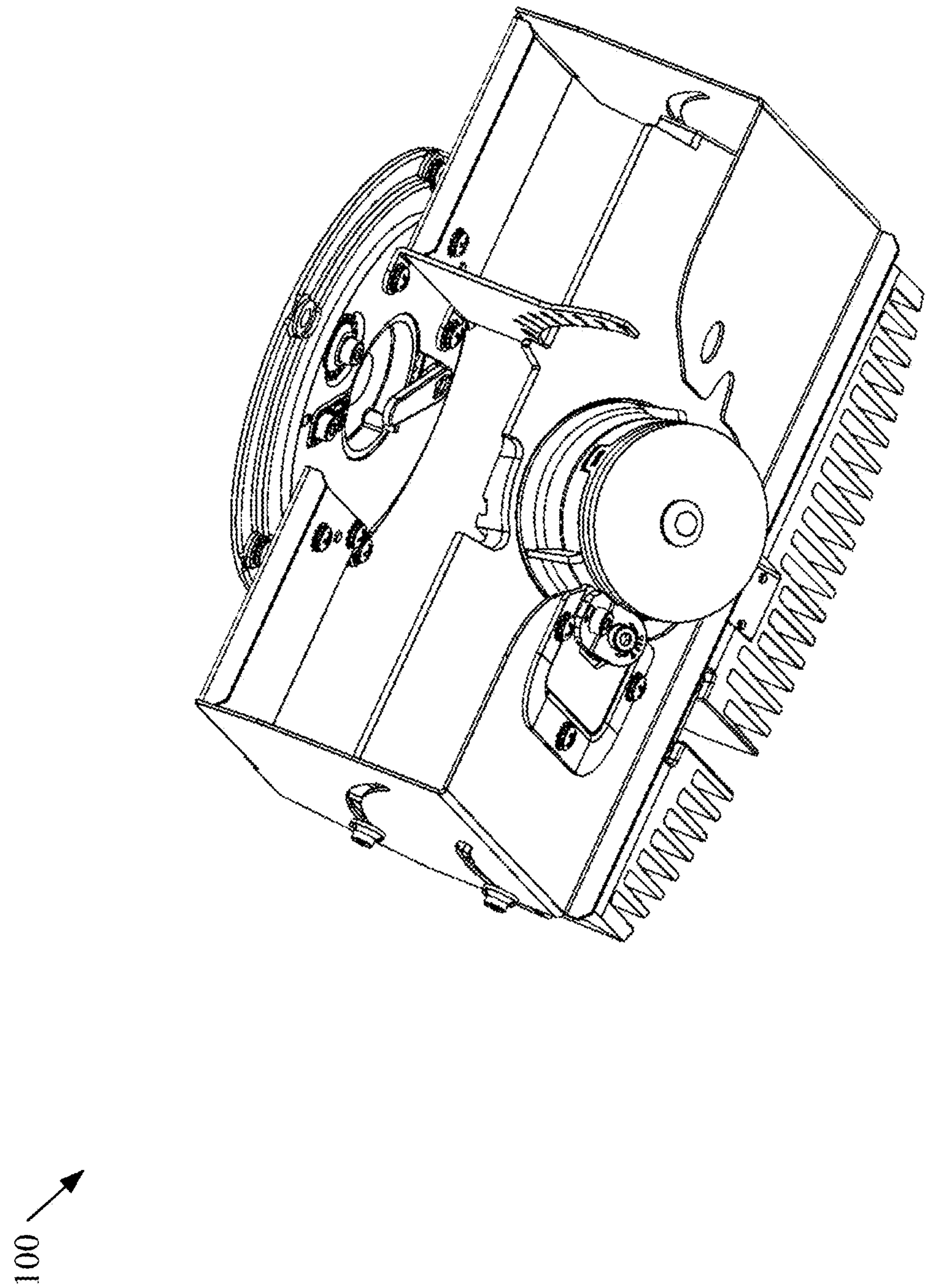
FIG. 60 on sheet 60 of the drawings is a screenshot of Pan-related features of the examples [100*a-d*] of the lighting system.
Figure 61:
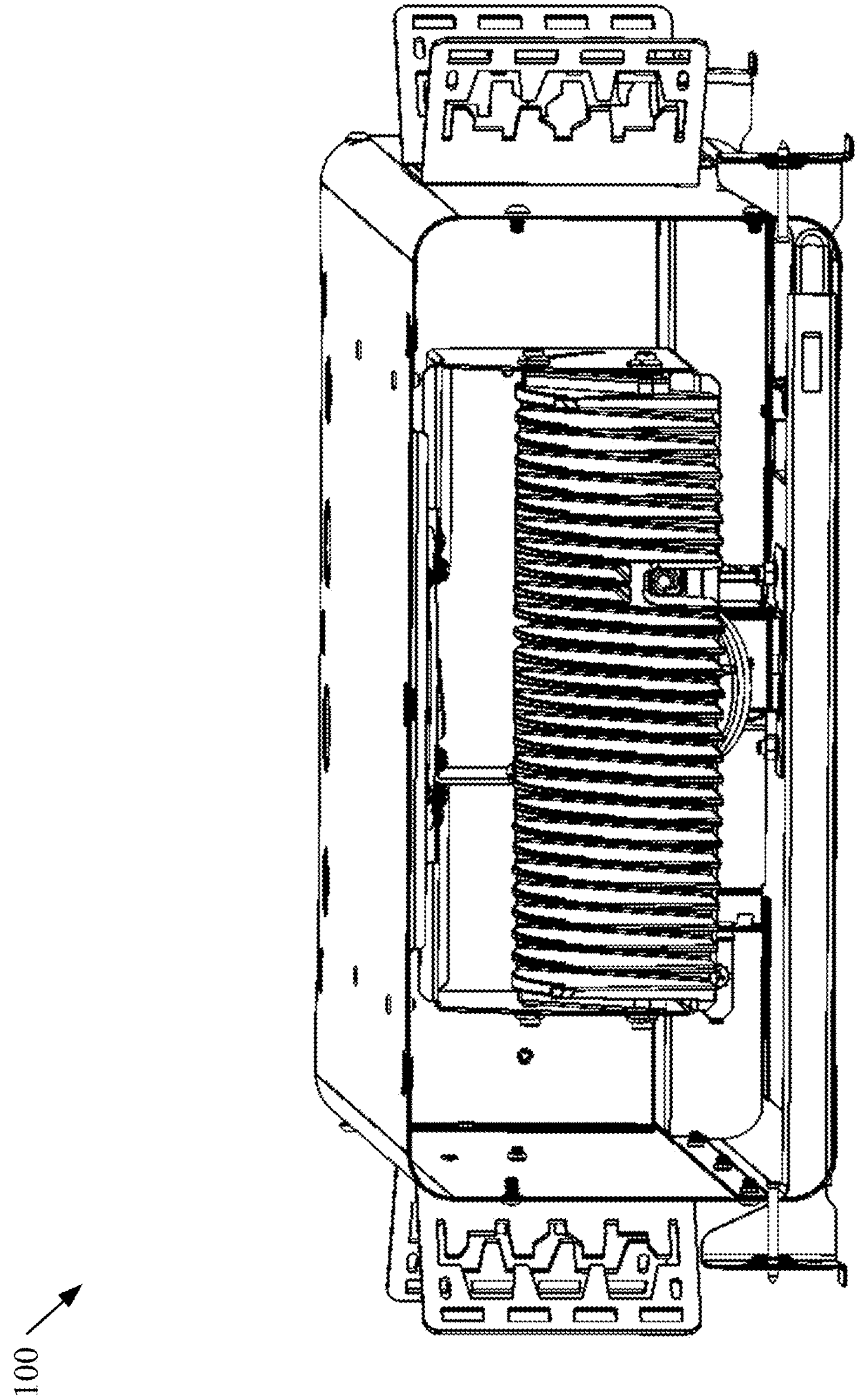
FIG. 61 on sheet 61 of the drawings is a screenshot of Pan-related features of the examples [100*a-d*] of the lighting system.
Figure 62:
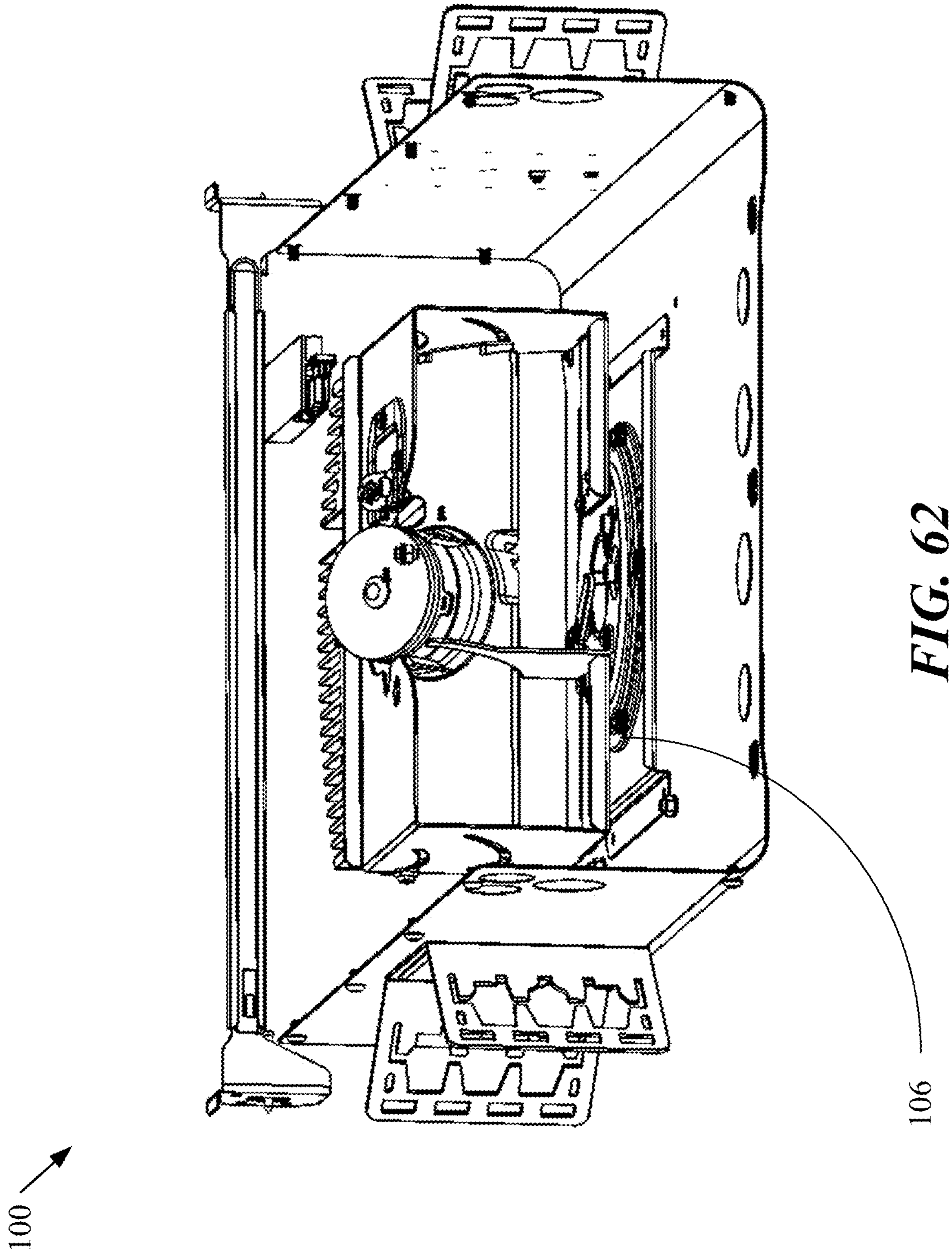
FIG. 62 on sheet 62 of the drawings is a screenshot of Pan-related features of the examples [100*a-d*] of the lighting system.
Figure 63:
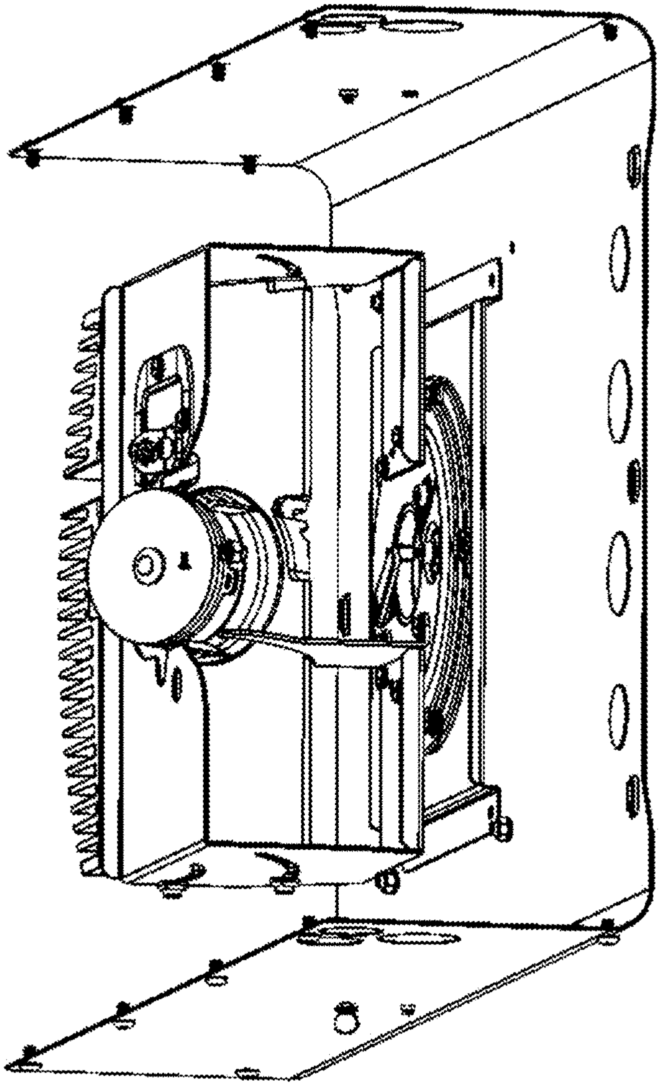
FIG. 63 on sheet 63 of the drawings is a screenshot of Pan-related features of the examples [100*a-d*] of the lighting system.
Figure 64:
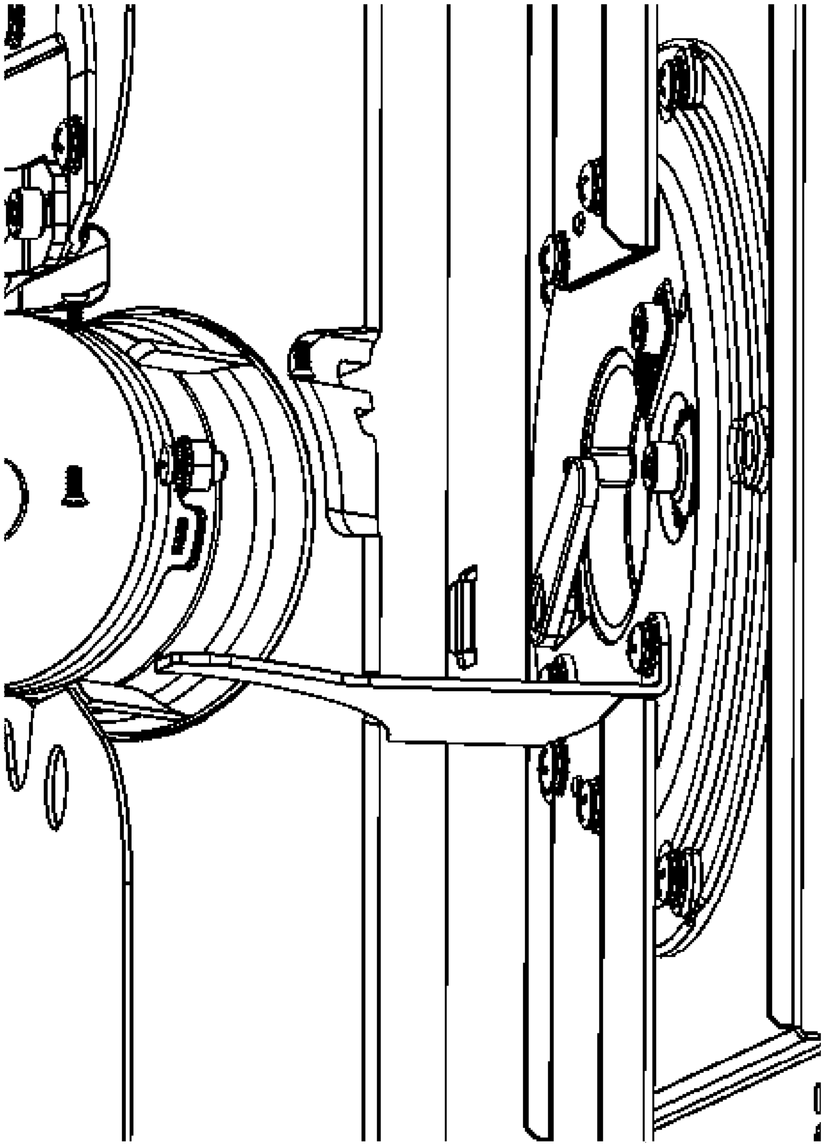
FIG. 64 on sheet 64 of the drawings is a screenshot of Pan-related features of the examples [100*a-d*] of the lighting system.
Figure 65:
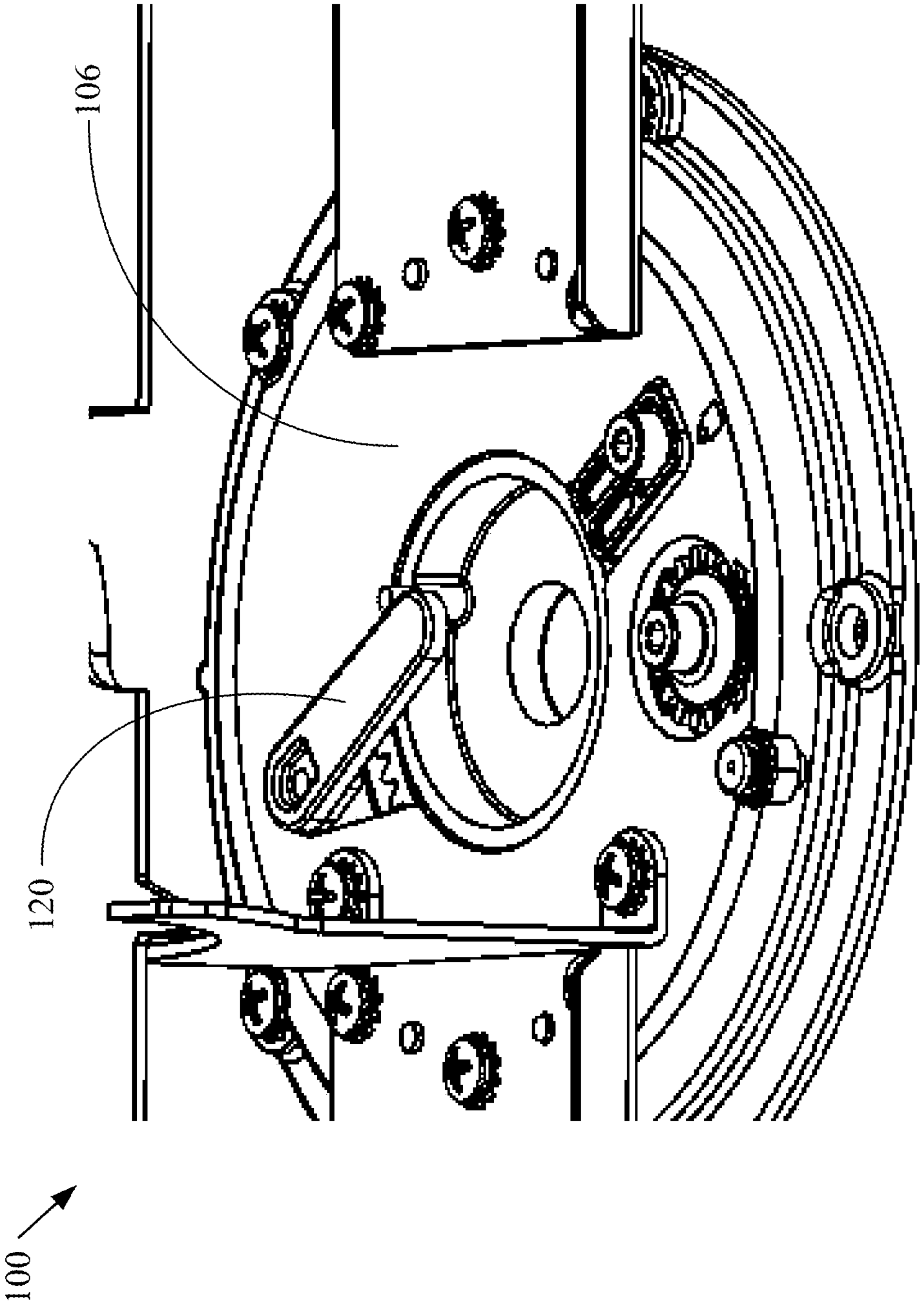
FIG. 65 on sheet 65 of the drawings is a screenshot of Pan-related features of the examples [100*a-d*] of the lighting system.
Figure 66:
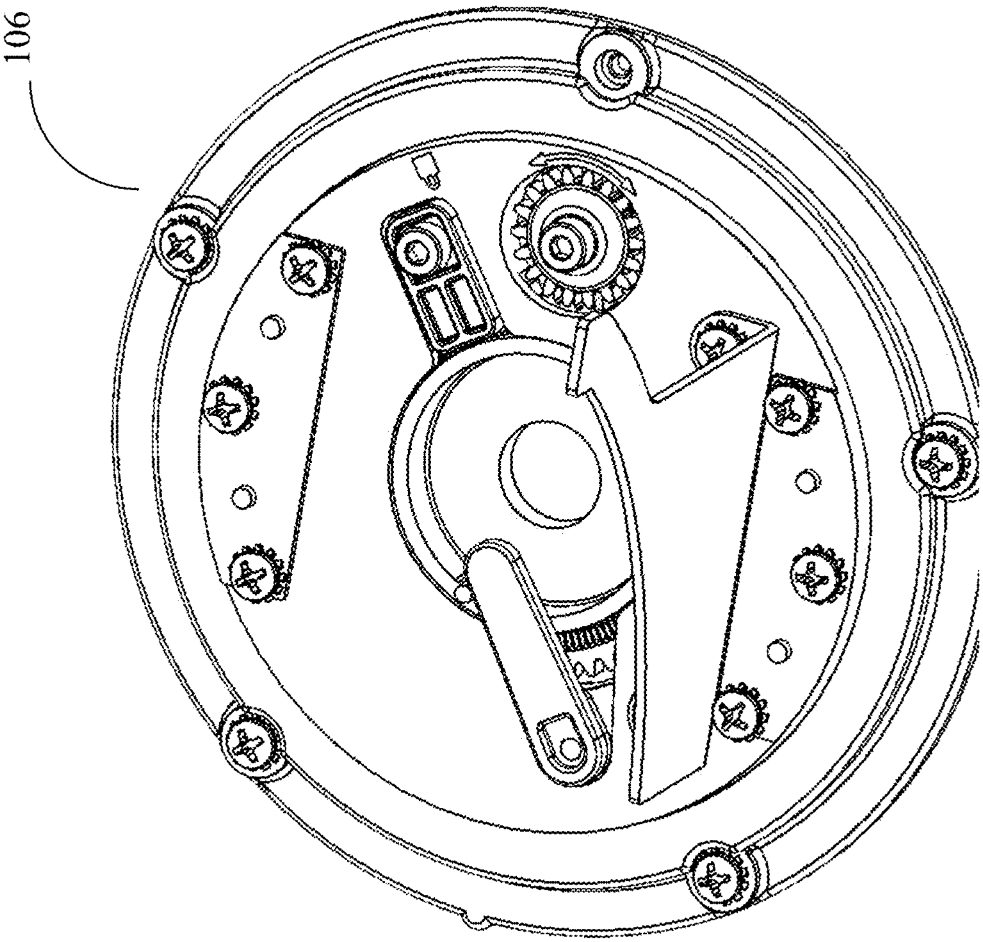
FIG. 66 on sheet 66 of the drawings is a screenshot of Pan-related features of the examples [100*a-d*] of the lighting system.
Figure 67:
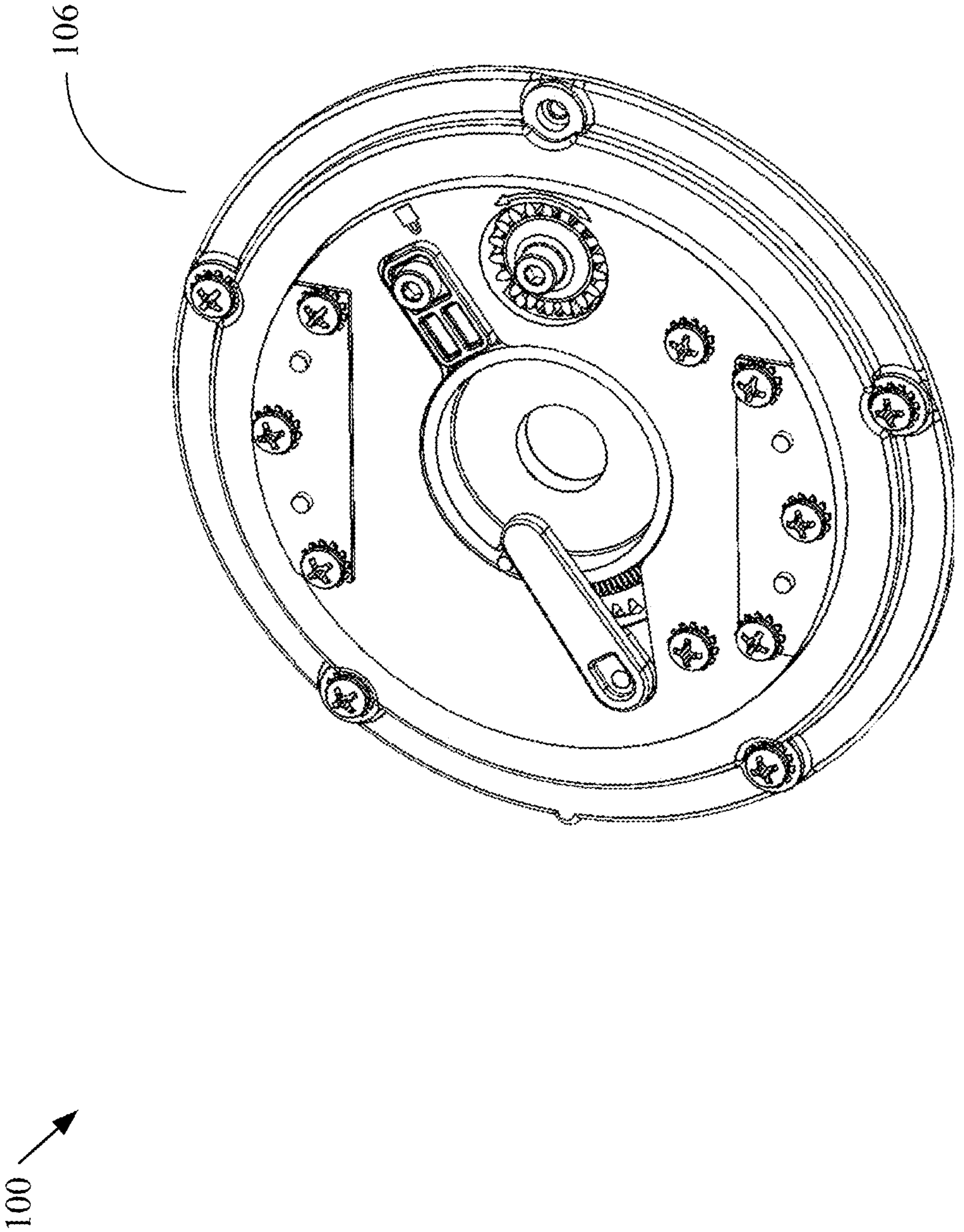
FIG. 67 on sheet 67 of the drawings is a screenshot of Pan-related features of the examples [100*a-d*] of the lighting system.
Figure 68:
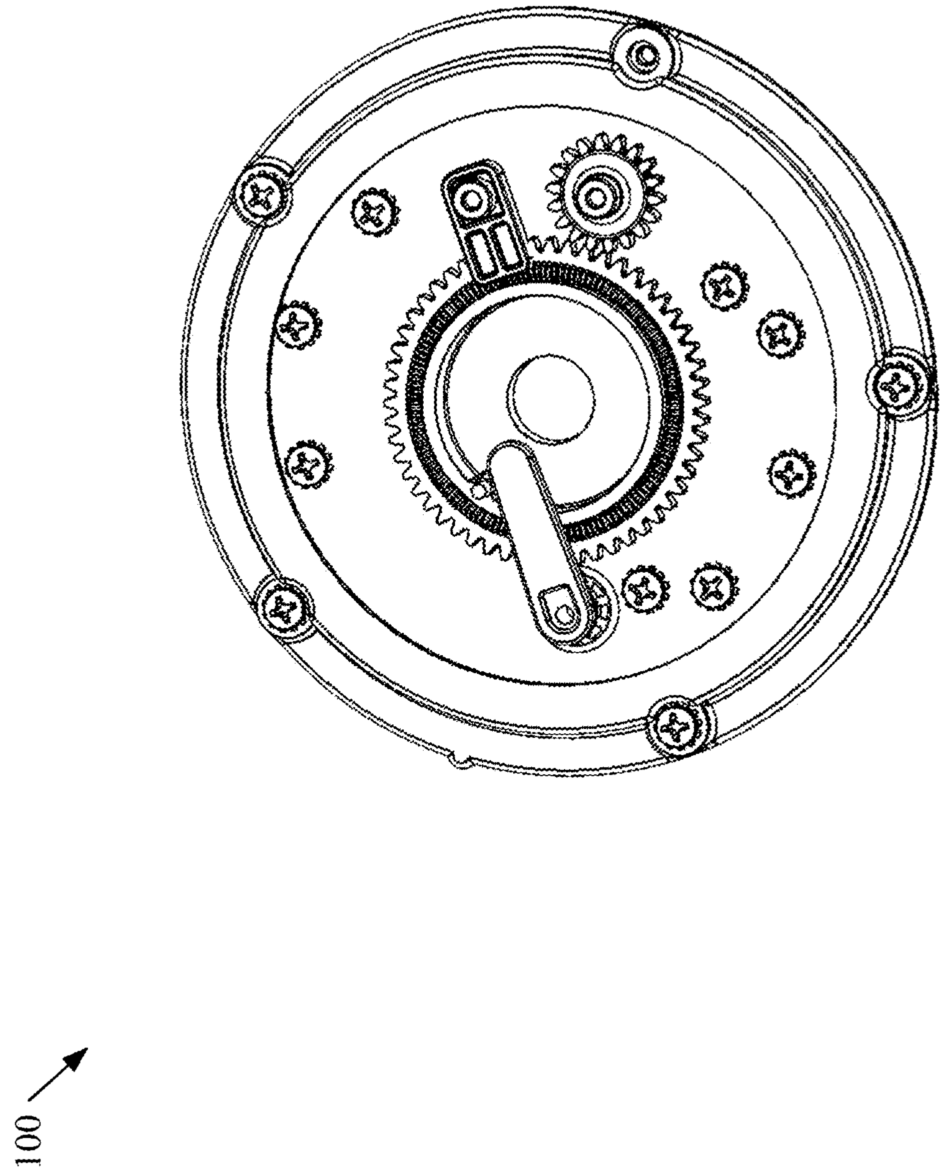
FIG. 68 on sheet 68 of the drawings is a screenshot of Pan-related features of the examples [100*a-d*] of the lighting system.
Figure 69:
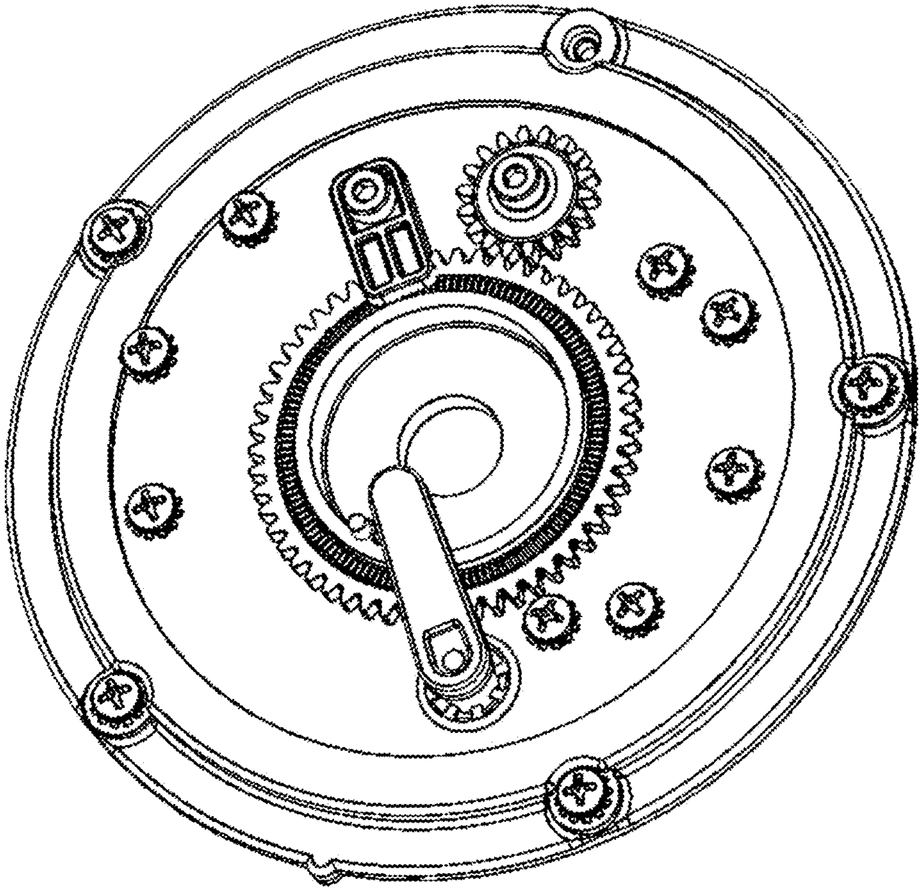
FIG. 69 on sheet 69 of the drawings is a screenshot of Pan-related features of the examples [100*a-d*] of the lighting system.
Figure 70:
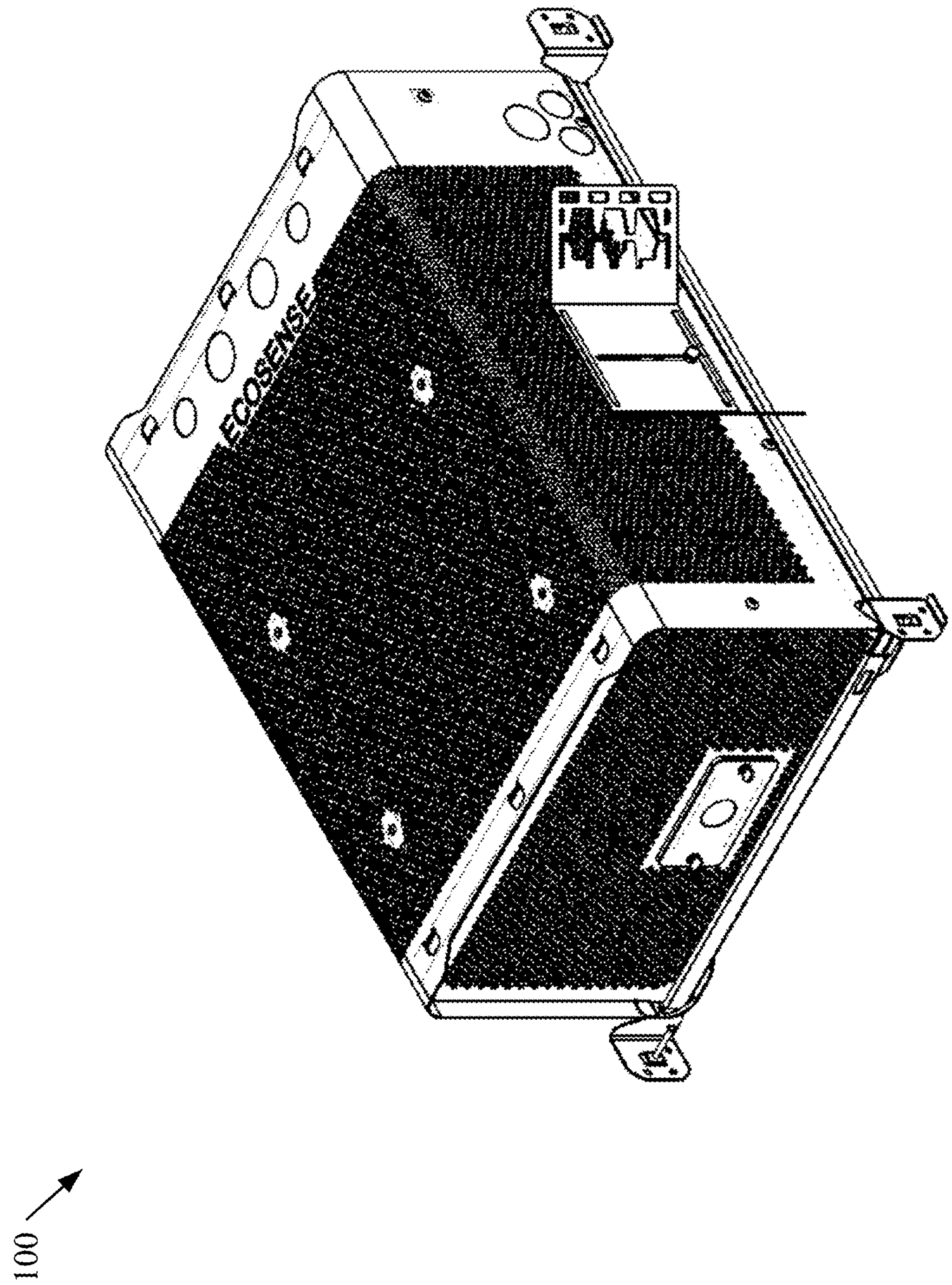
FIG. 70 on sheet 70 of the drawings is a screenshot of Pan-related features of the examples [100*a-d*] of the lighting system.
Figure 71:
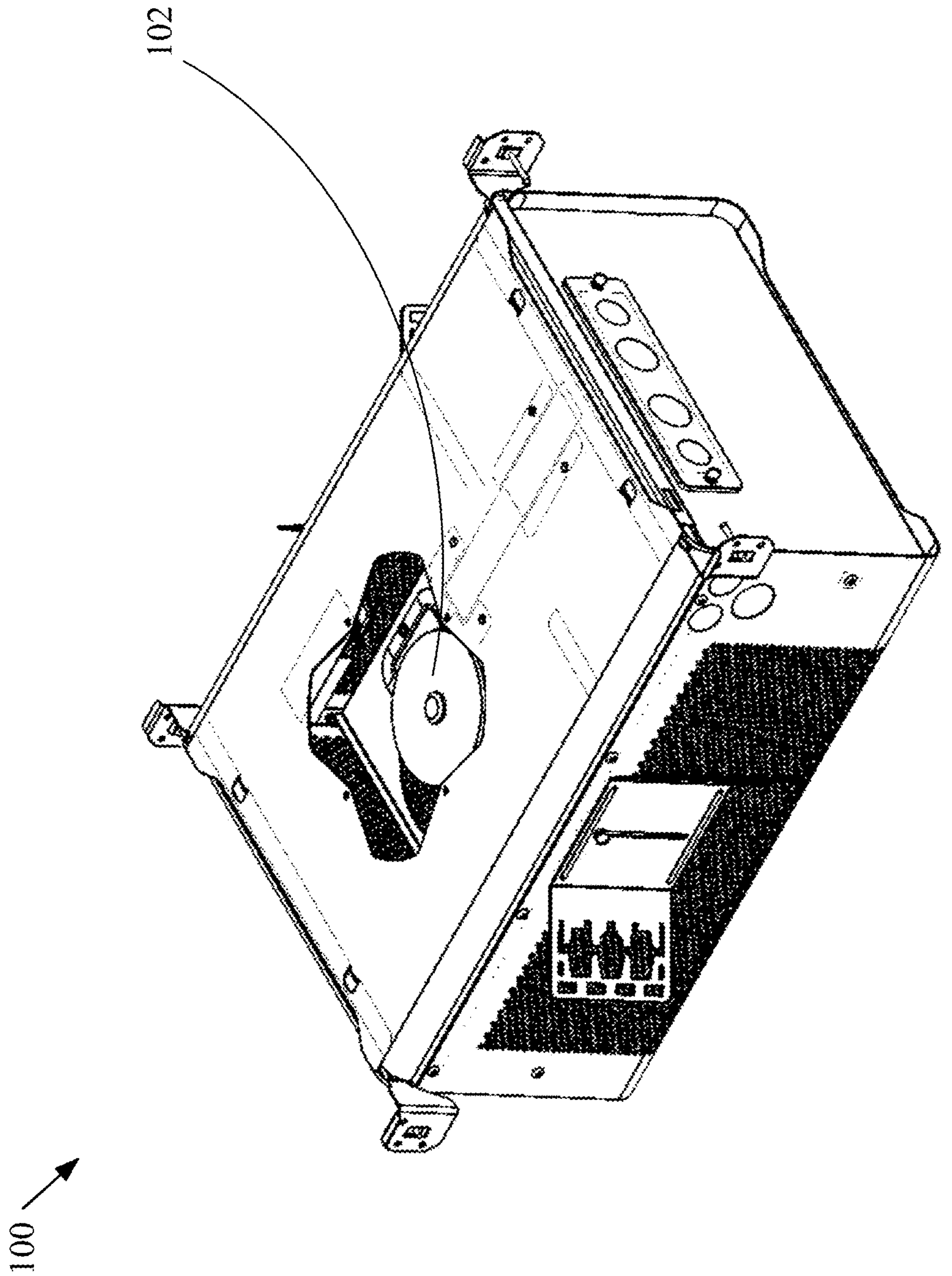
FIG. 71 on sheet 71 of the drawings is a screenshot of Pan-related features of the examples [100*a-d*] of the lighting system.
Figure 72:
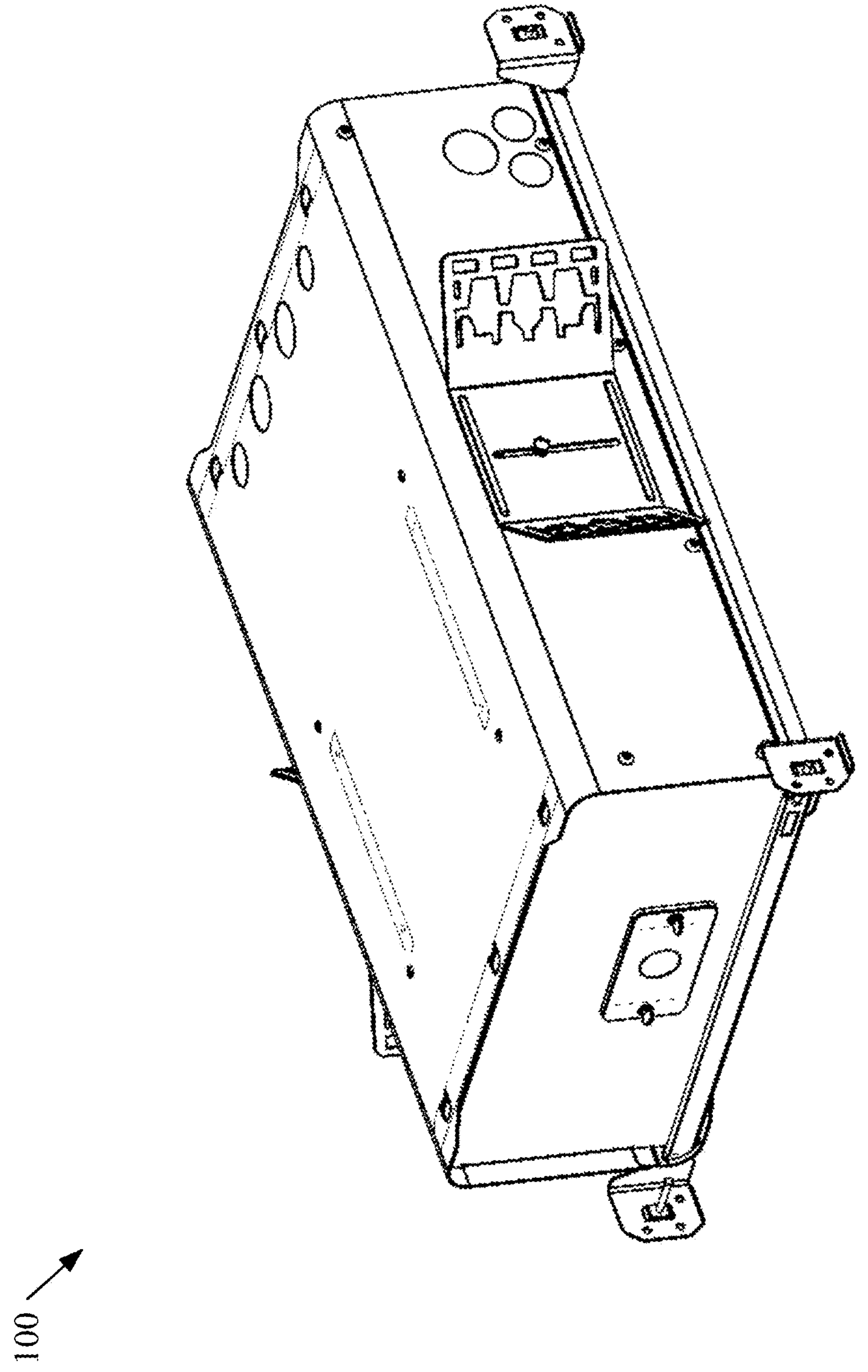
FIG. 72 on sheet 72 of the drawings is a screenshot of Tilt-related features of the examples [100*a-d*] of the lighting system.
Figure 73:
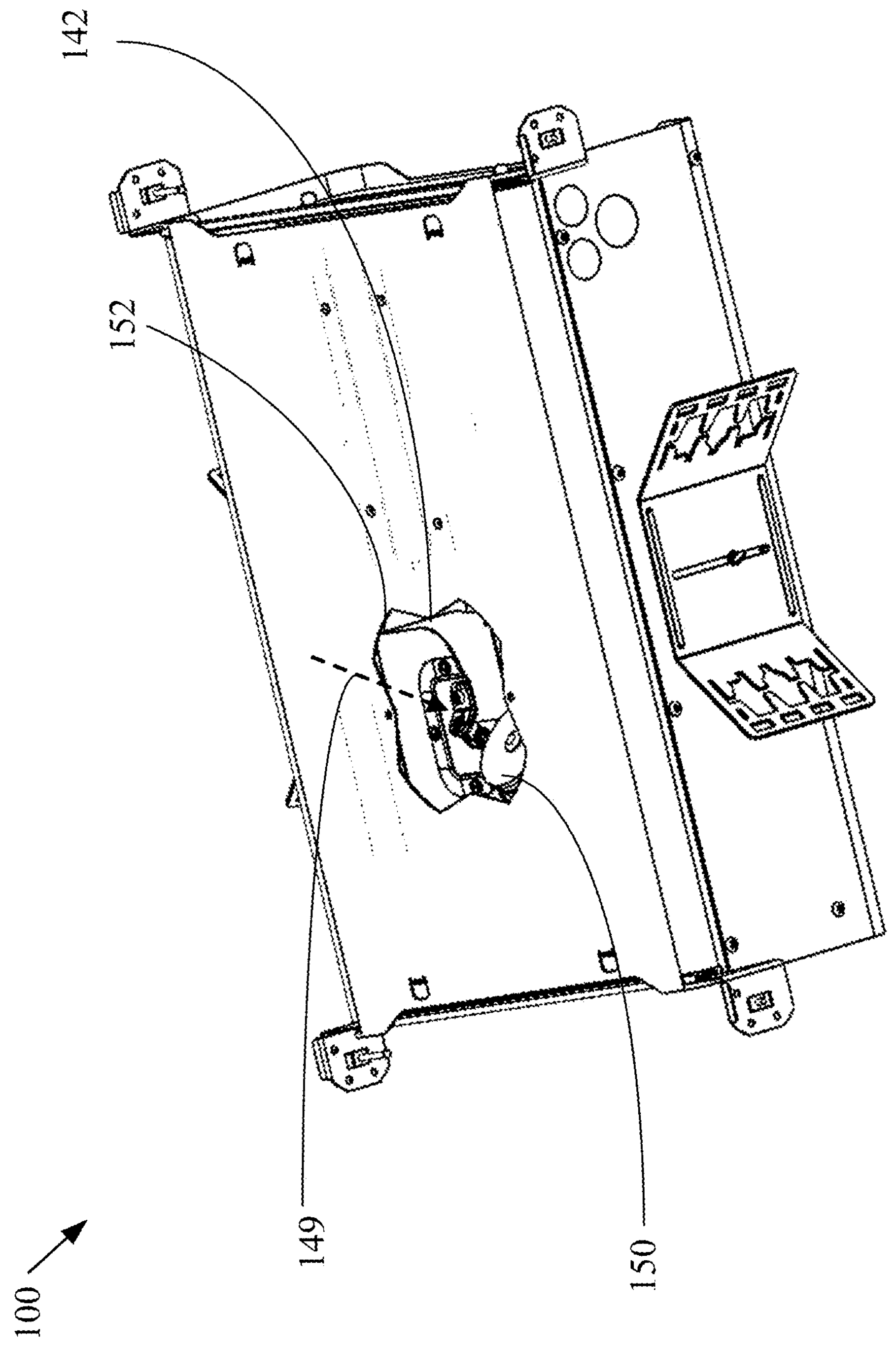
FIG. 73 on sheet 73 of the drawings is a screenshot of Tilt-related features of the examples [100*a-d*] of the lighting system.
Figure 74:
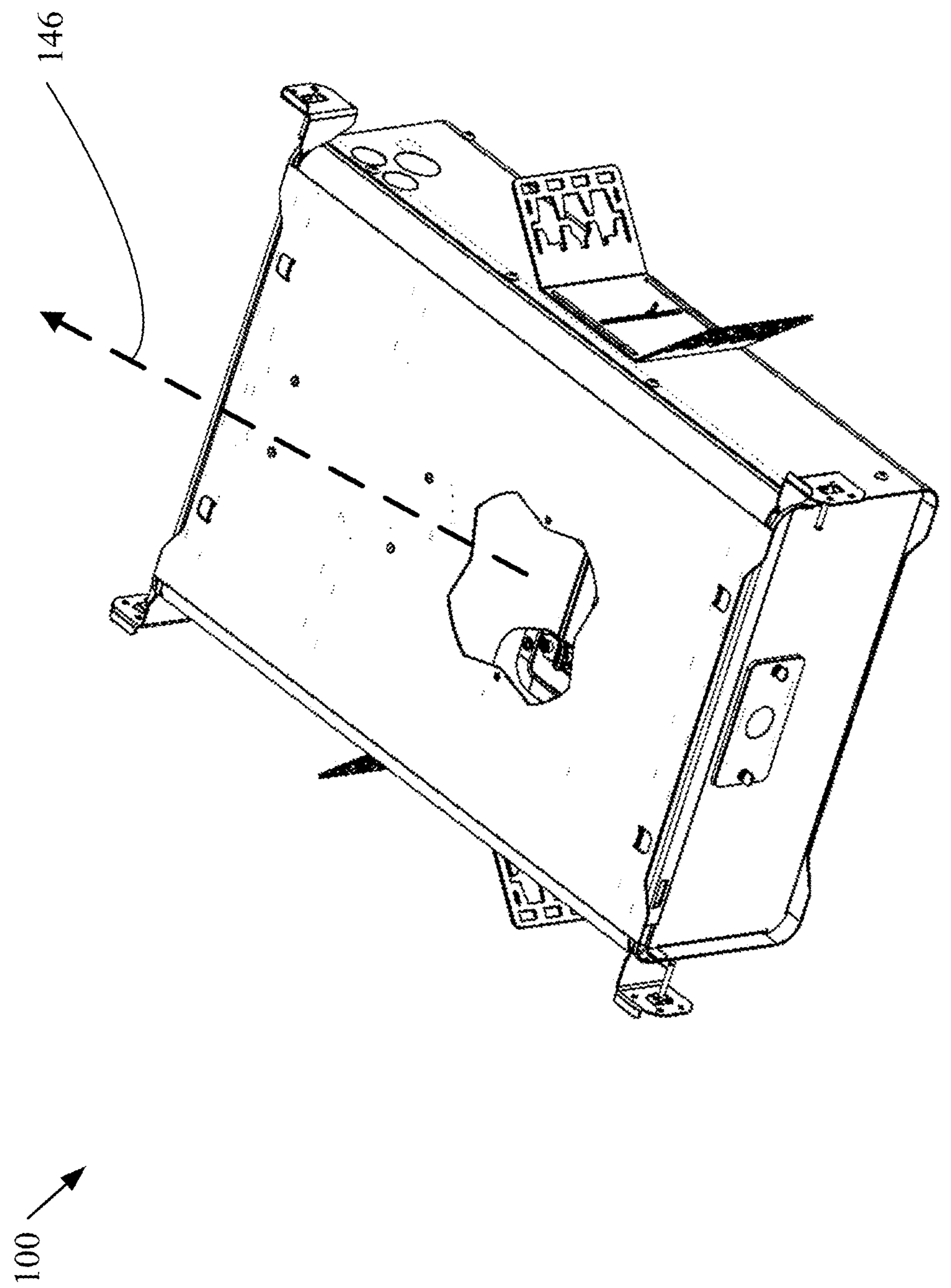
FIG. 74 on sheet 74 of the drawings is a screenshot of Tilt-related features of the examples [100*a-d*] of the lighting system.
Figure 75:
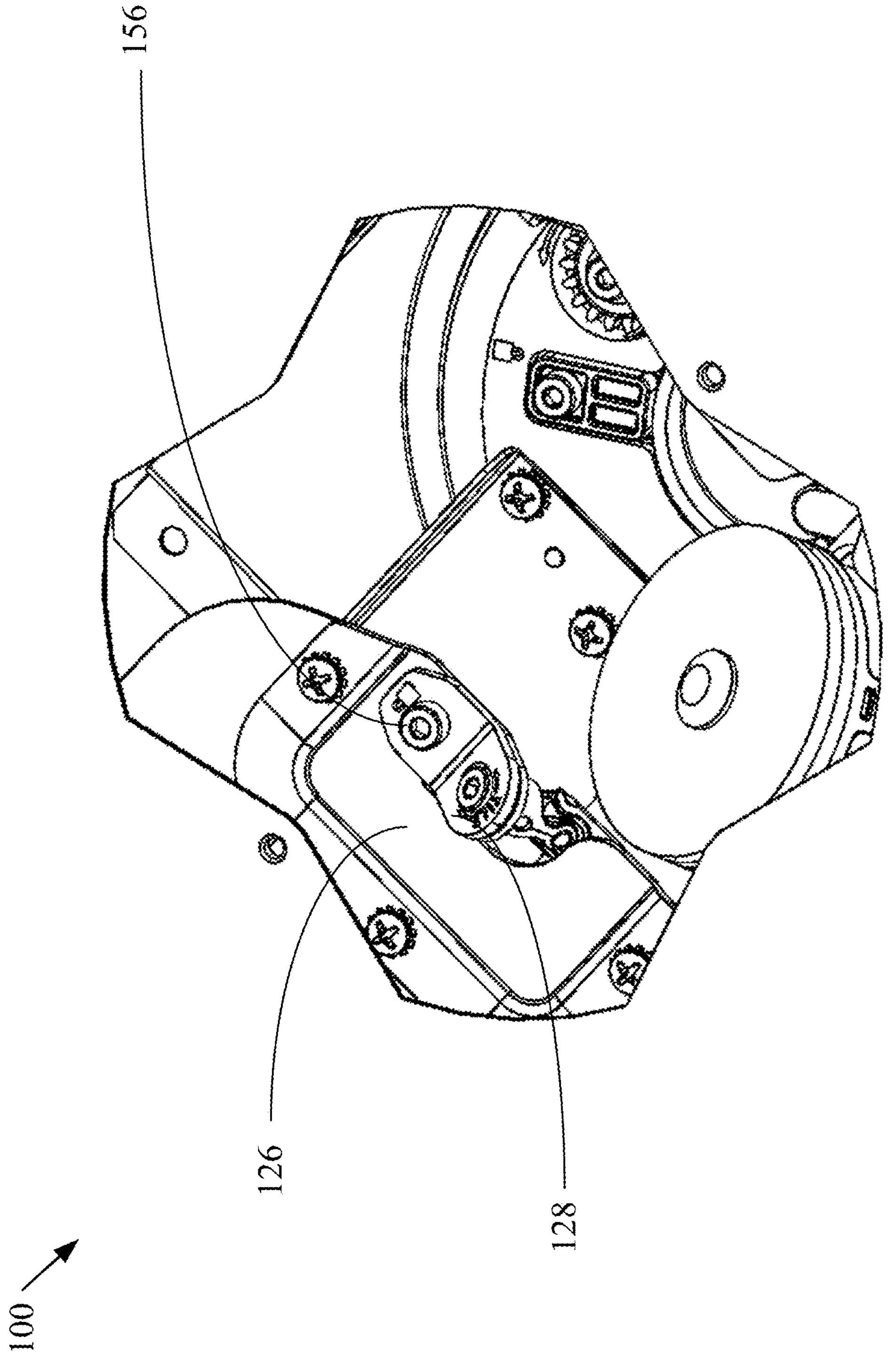
FIG. 75 on sheet 75 of the drawings is a screenshot of Tilt-related features of the examples [100*a-d*] of the lighting system.
Figure 76:
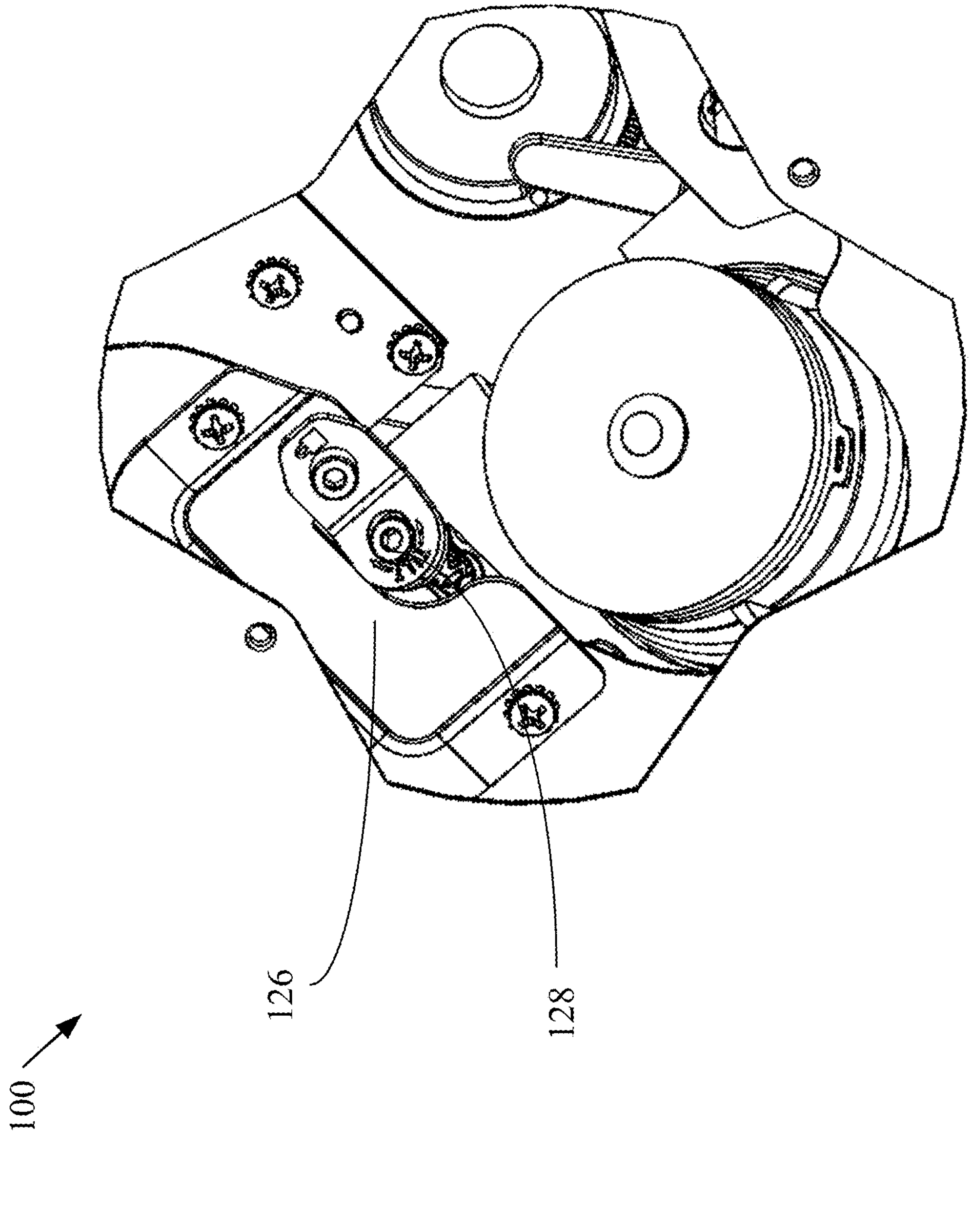
FIG. 76 on sheet 76 of the drawings is a screenshot of Tilt-related features of the examples [100*a-d*] of the lighting system.
Figure 77:
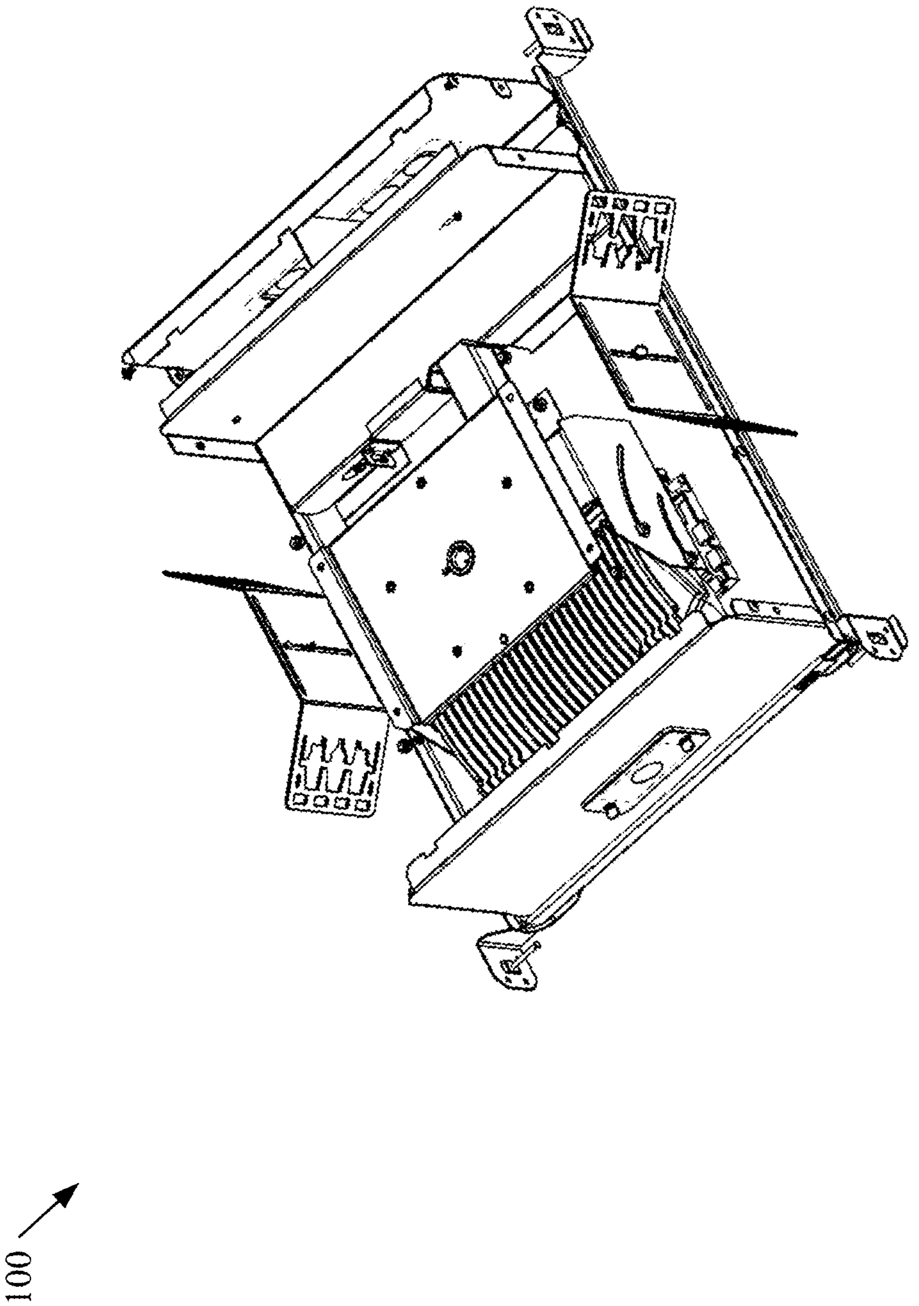
FIG. 77 on sheet 77 of the drawings is a screenshot of Tilt-related features of the examples [100*a-d*] of the lighting system.
Figure 78:
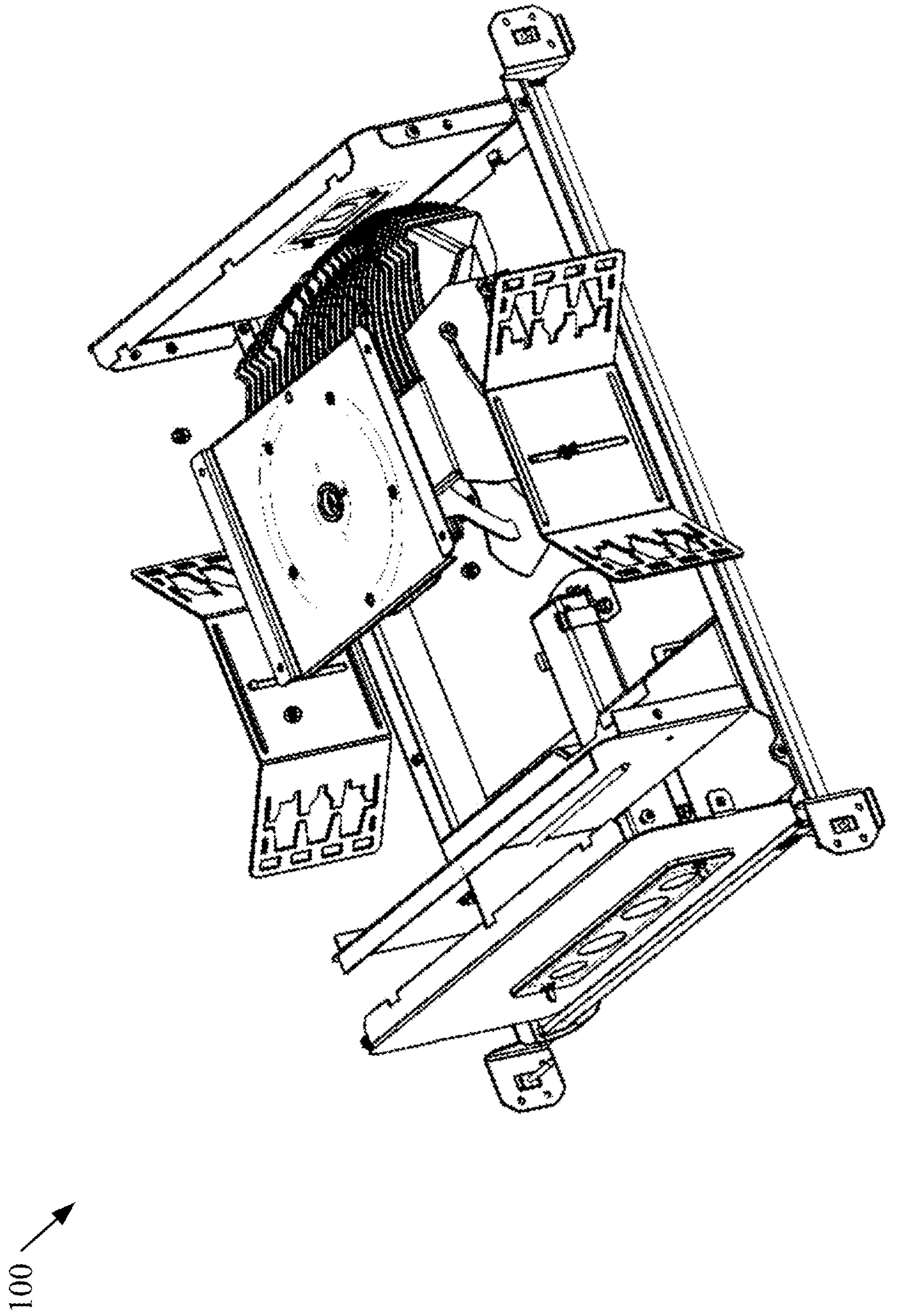
FIG. 78 on sheet 78 of the drawings is a screenshot of Tilt-related features of the examples [100*a-d*] of the lighting system.
Figure 79:
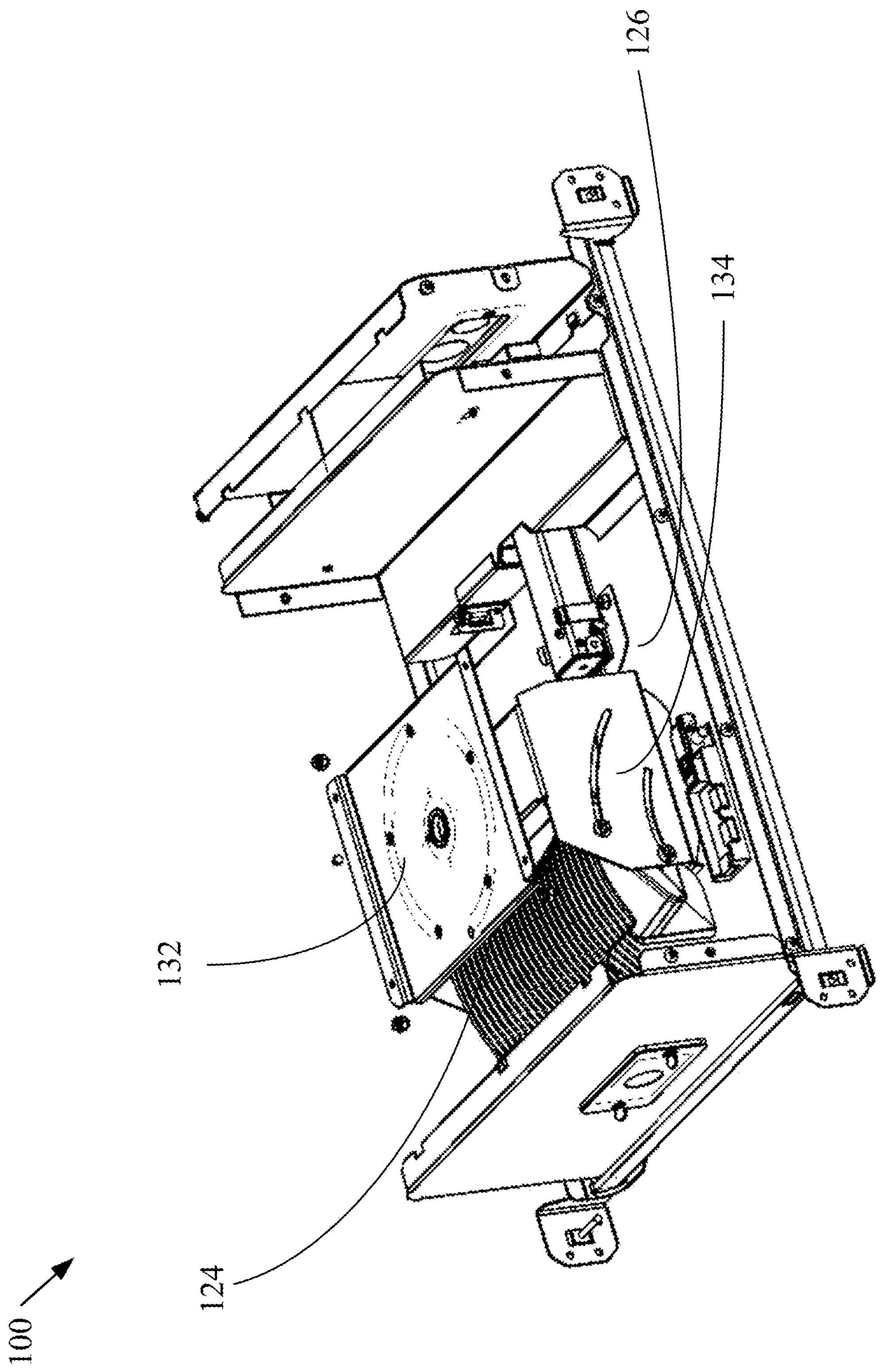
FIG. 79 on sheet 79 of the drawings is a screenshot of Tilt-related features of the examples [100*a-d*] of the lighting system.
Figure 80:
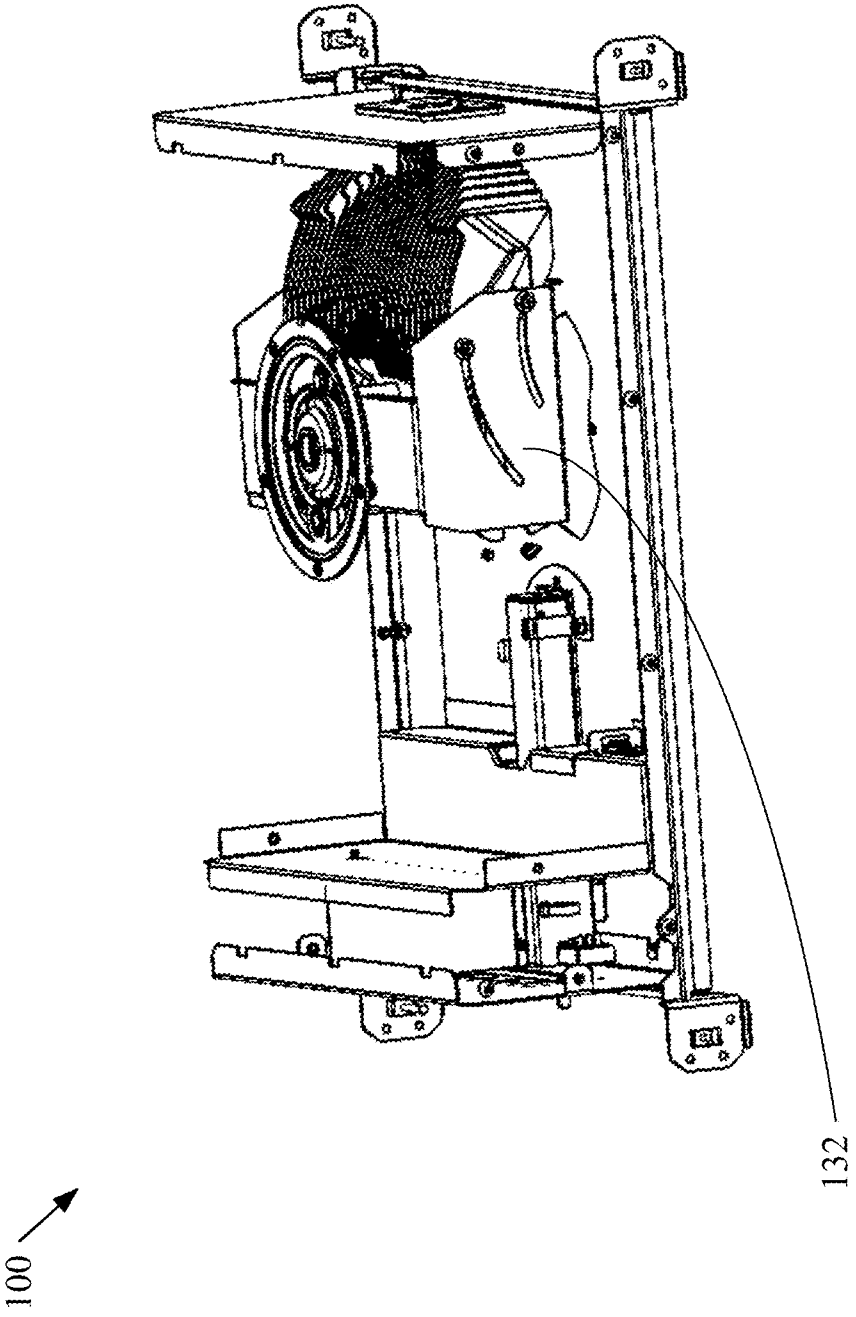
FIG. 80 on sheet 80 of the drawings is a screenshot of Tilt-related features of the examples [100*a-d*] of the lighting system.
Figure 81:
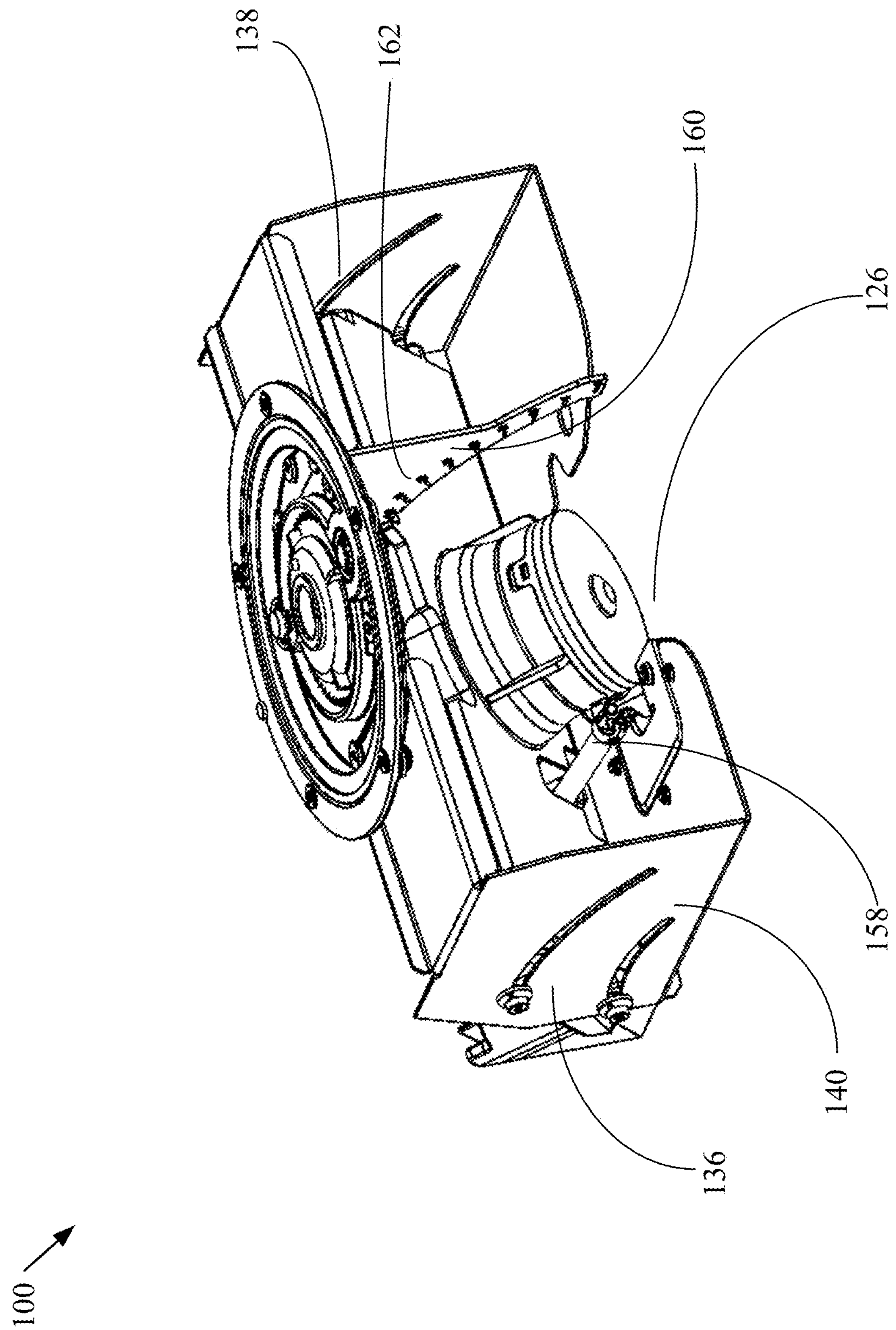
FIG. 81 on sheet 81 of the drawings is a screenshot of Tilt-related features of the examples [100*a-d*] of the lighting system.
Figure 82:
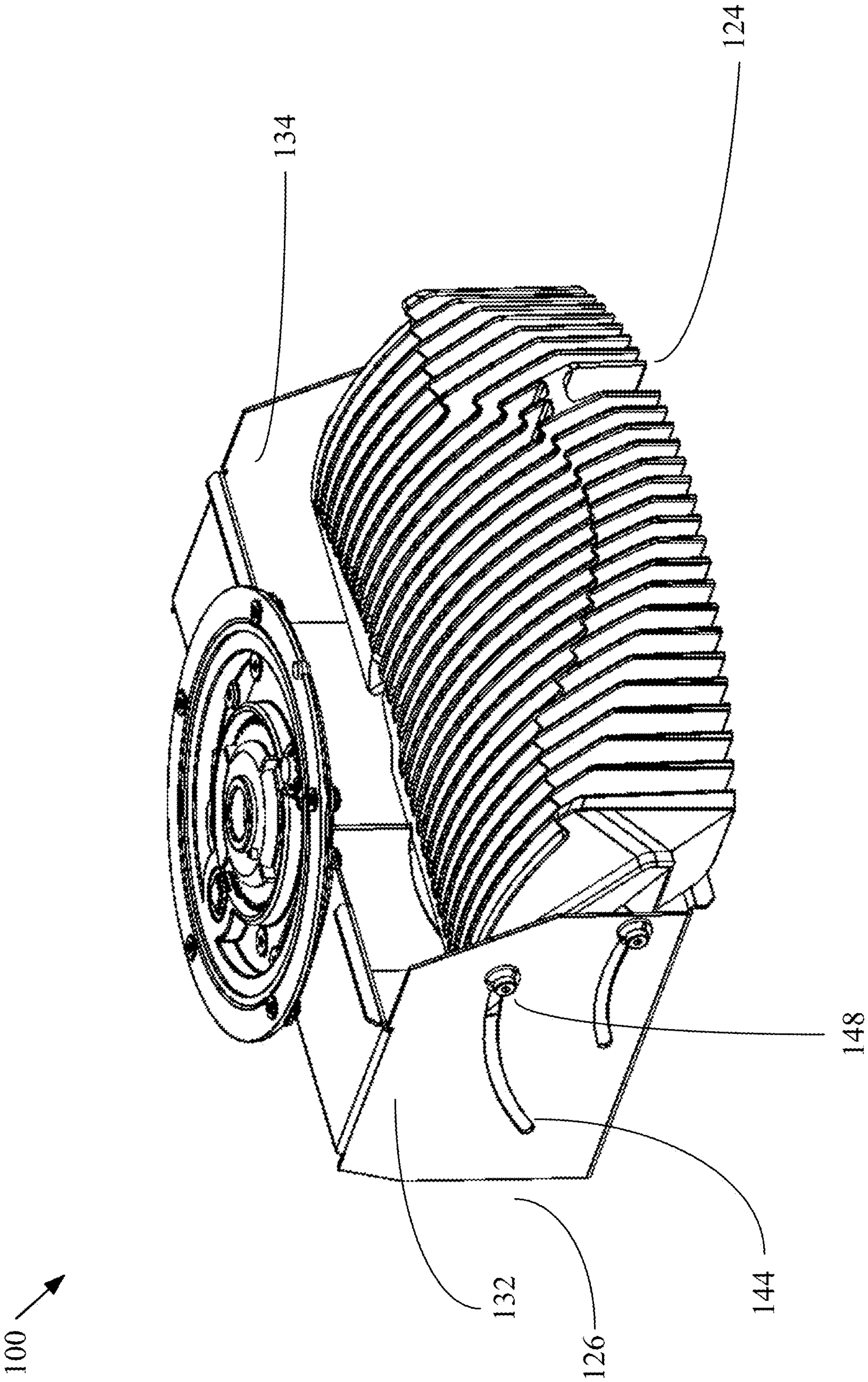
FIG. 82 on sheet 82 of the drawings is a screenshot of Tilt-related features of the examples [100*a-d*] of the lighting system.
Figure 83:
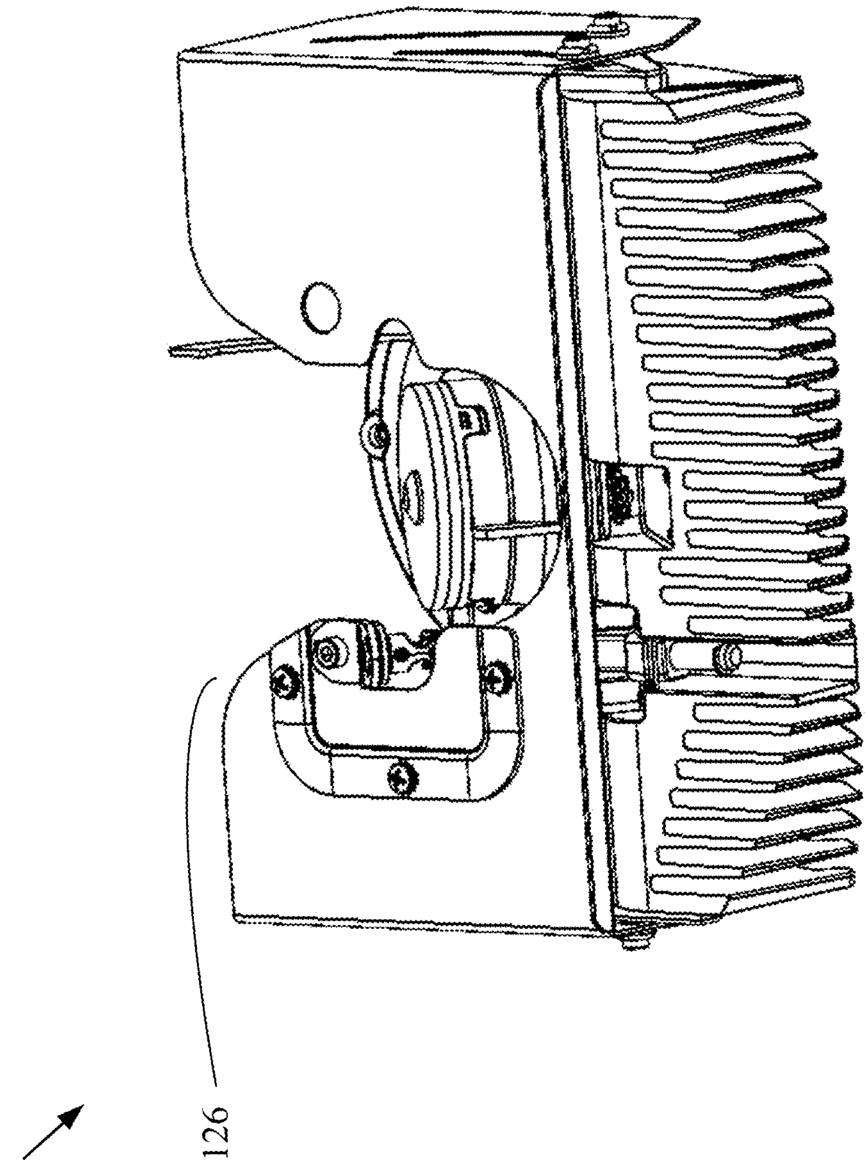
FIG. 83 on sheet 83 of the drawings is a screenshot of Tilt-related features of the examples [100*a-d*] of the lighting system.
Figure 84:
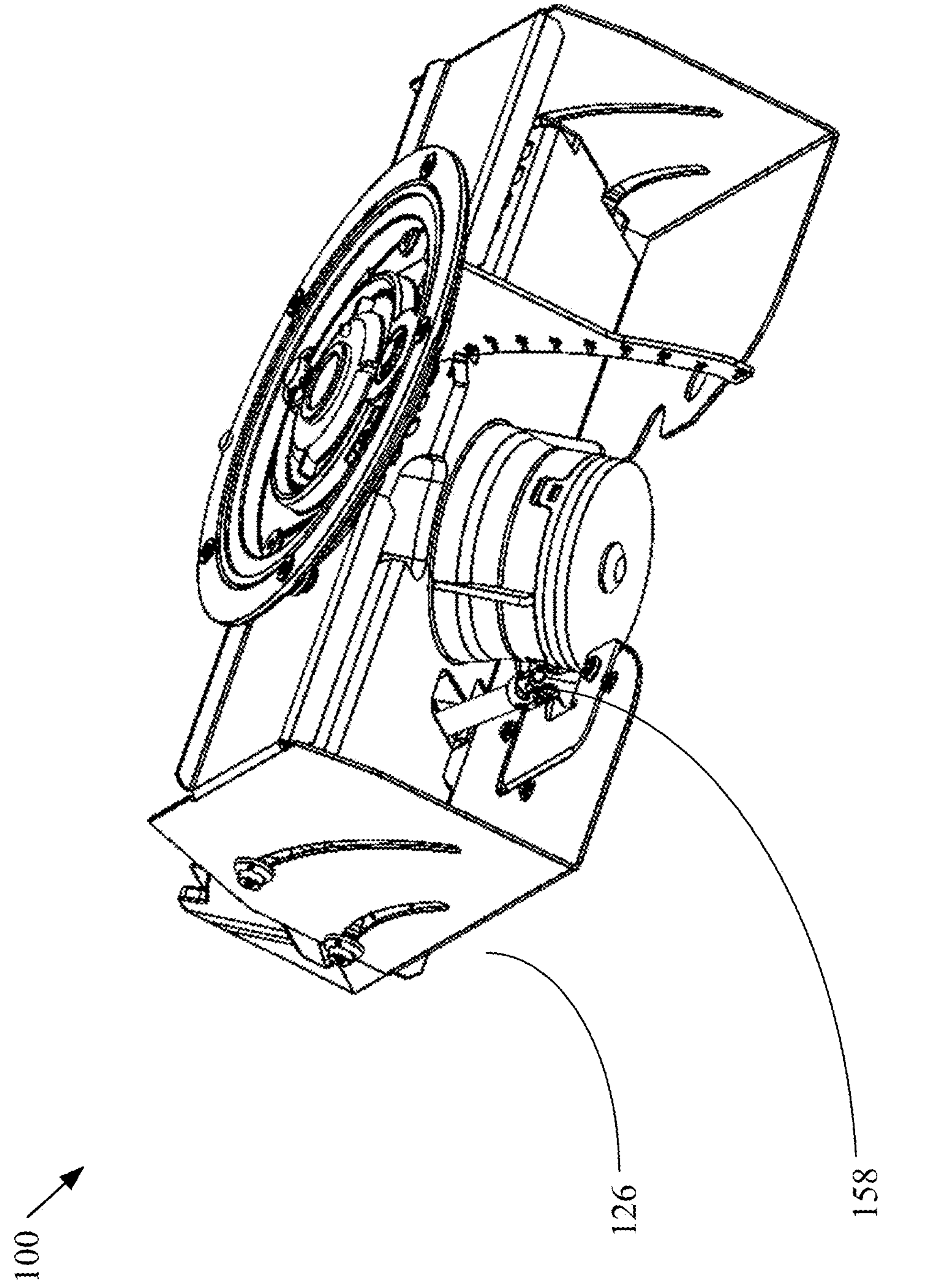
FIG. 84 on sheet 84 of the drawings is a screenshot of Tilt-related features of the examples [100*a-d*] of the lighting system.
Figure 85:
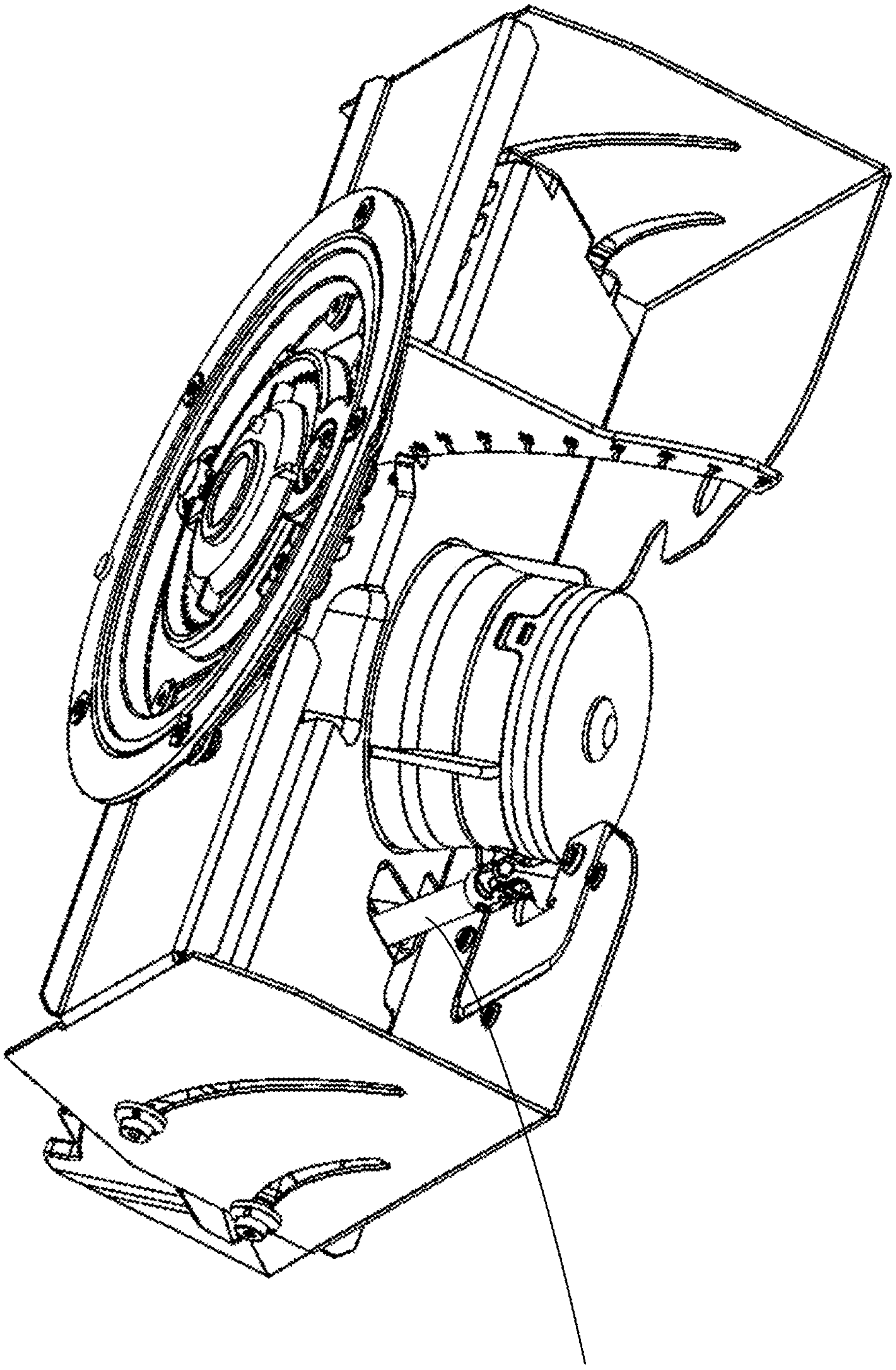
FIG. 85 on sheet 85 of the drawings is a screenshot of Tilt-related features of the examples [100*a-d*] of the lighting system.
Figure 86:
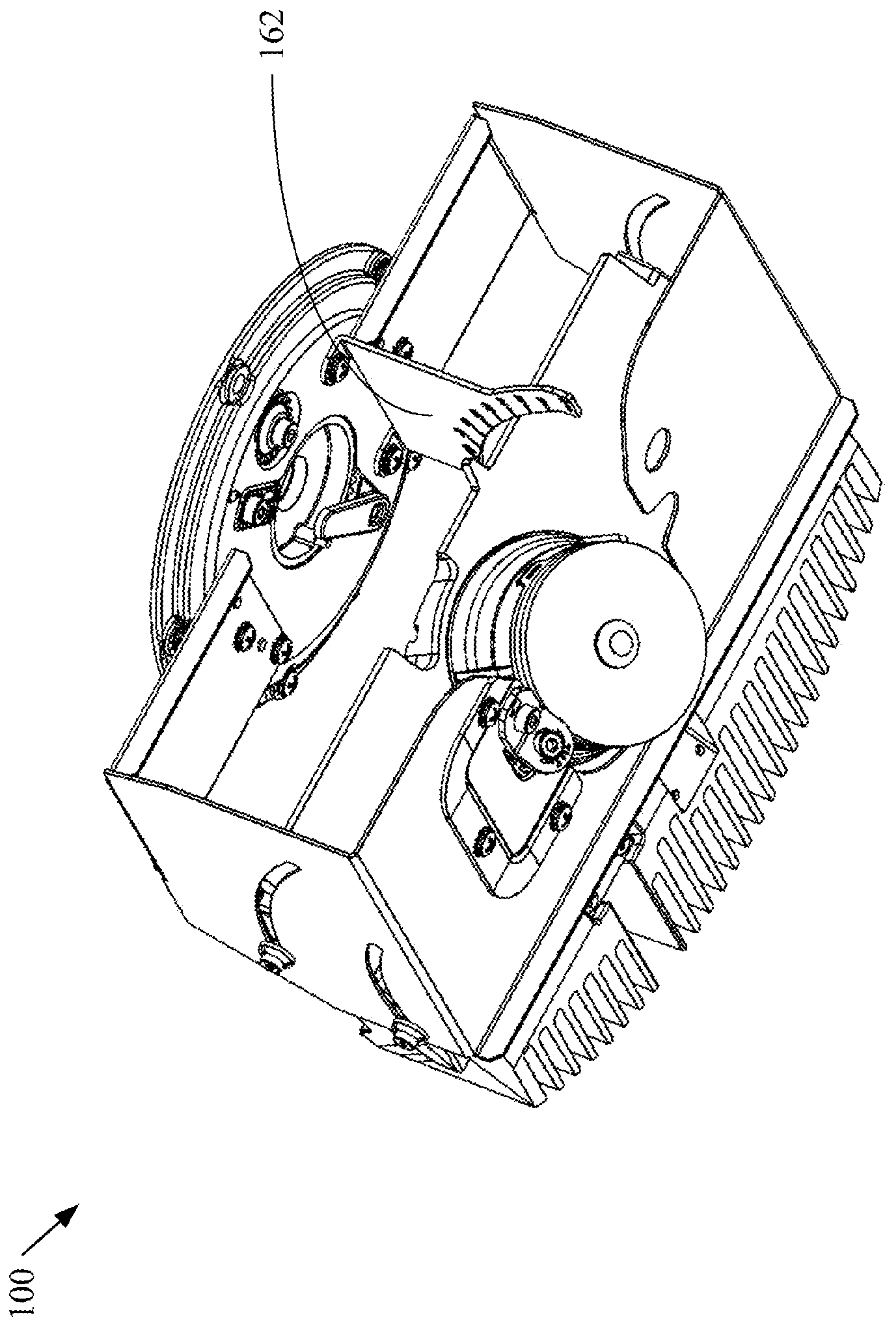
FIG. 86 on sheet 86 of the drawings is a screenshot of Tilt-related features of the examples [100*a-d*] of the lighting system.
Figure 87:
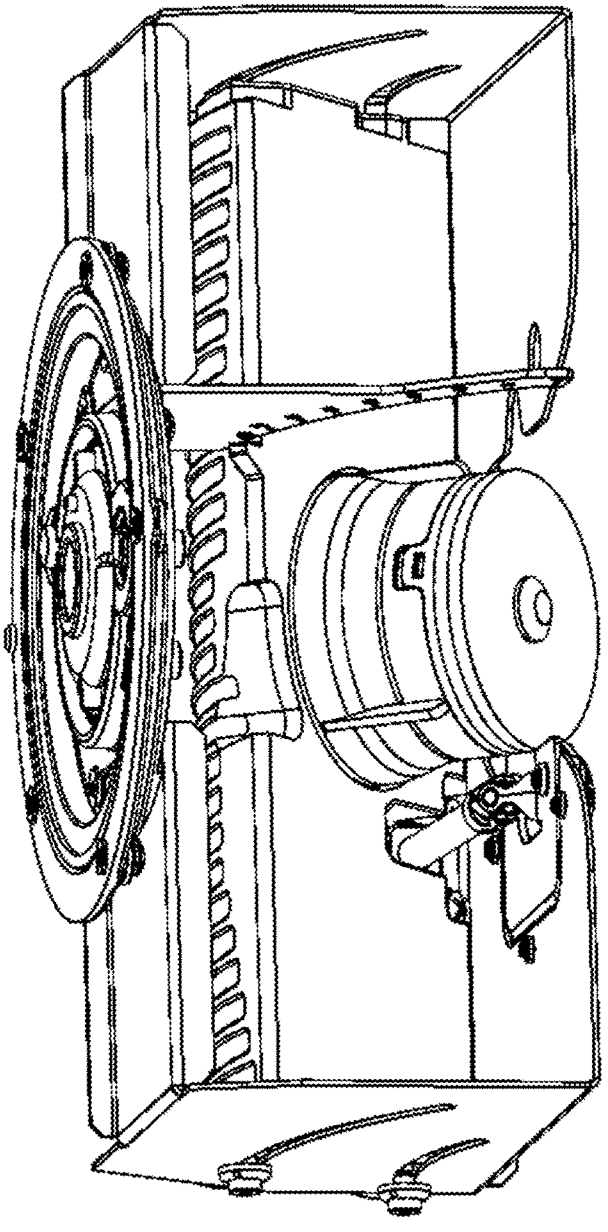
FIG. 87 on sheet 87 of the drawings is a screenshot of Tilt-related features of the examples [100*a-d*] of the lighting system.
Figure 88:
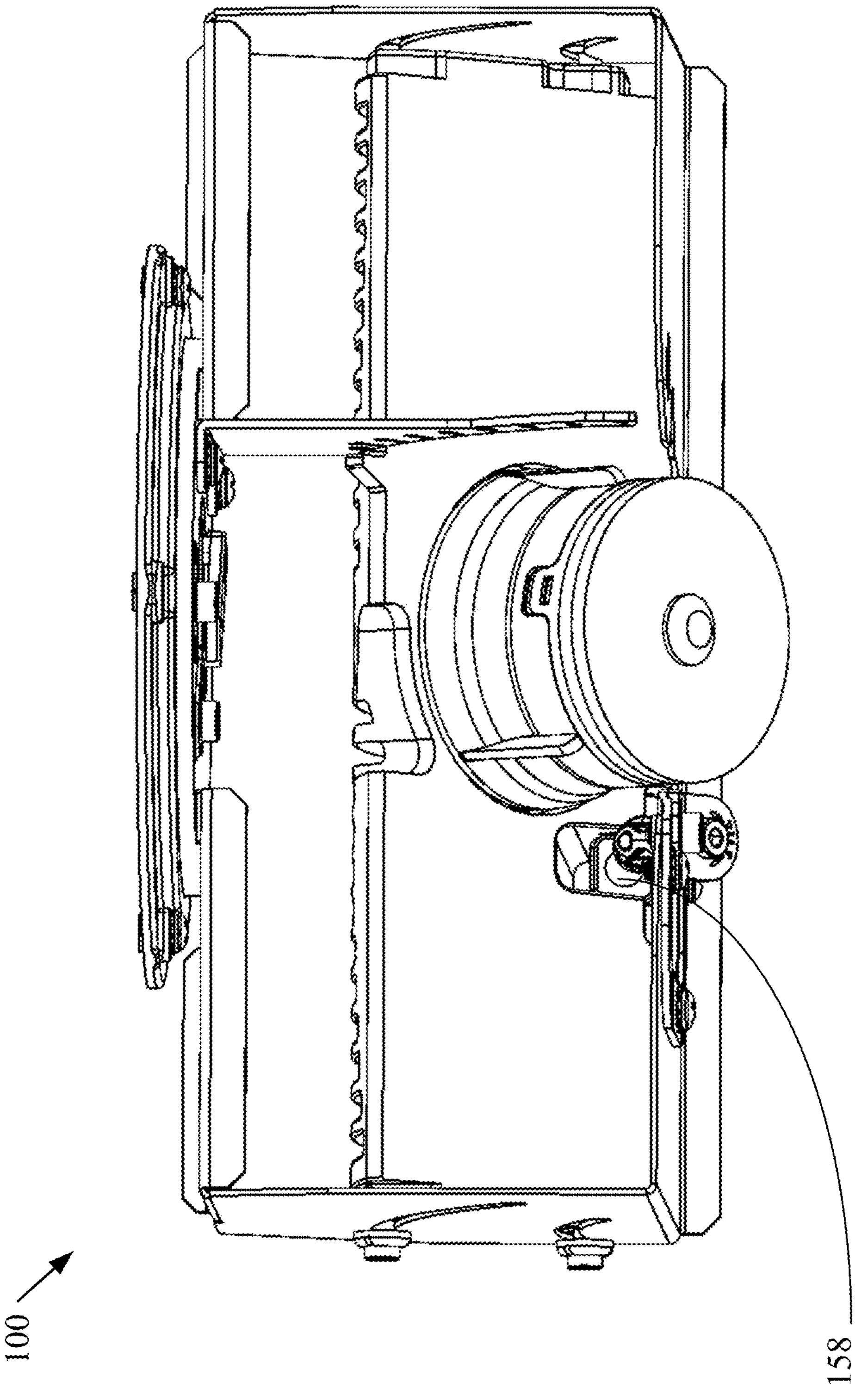
FIG. 88 on sheet 88 of the drawings is a screenshot of Tilt-related features of the examples [100*a-d*] of the lighting system.
Figure 89:
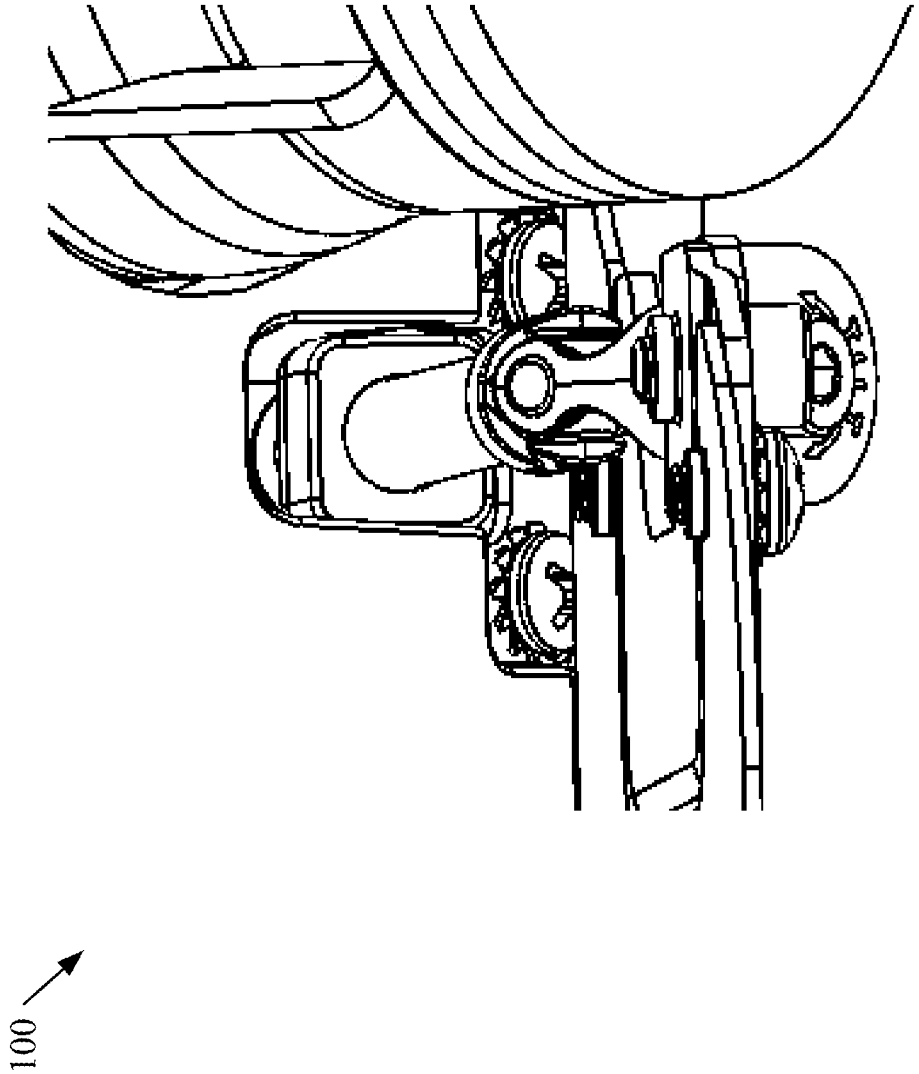
FIG. 89 on sheet 89 of the drawings is a screenshot of Tilt-related features of the examples [100*a-d*] of the lighting system.
Figure 90:
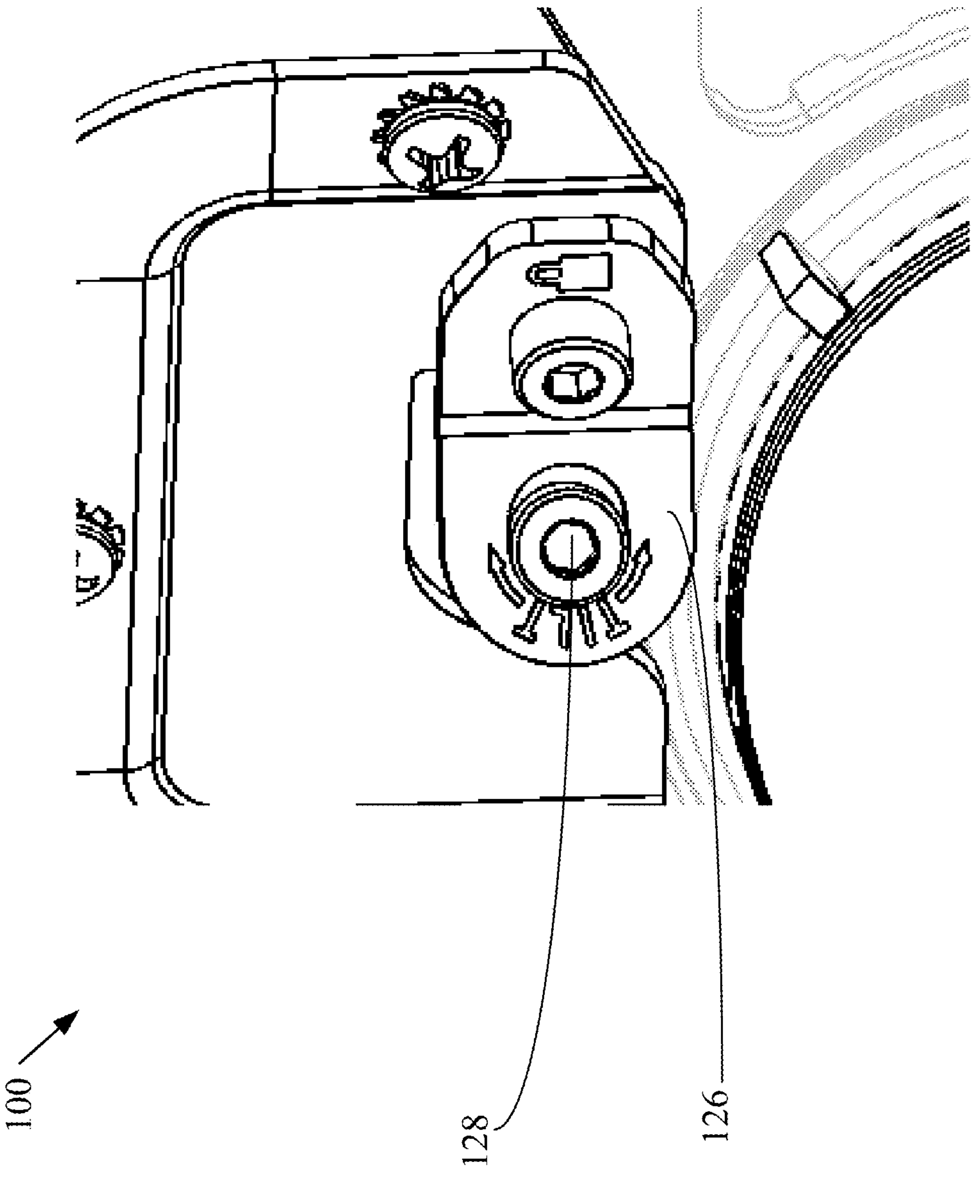
FIG. 90 on sheet 90 of the drawings is a screenshot of Tilt-related features of the examples [100*a-d*] of the lighting system.
Figure 91:
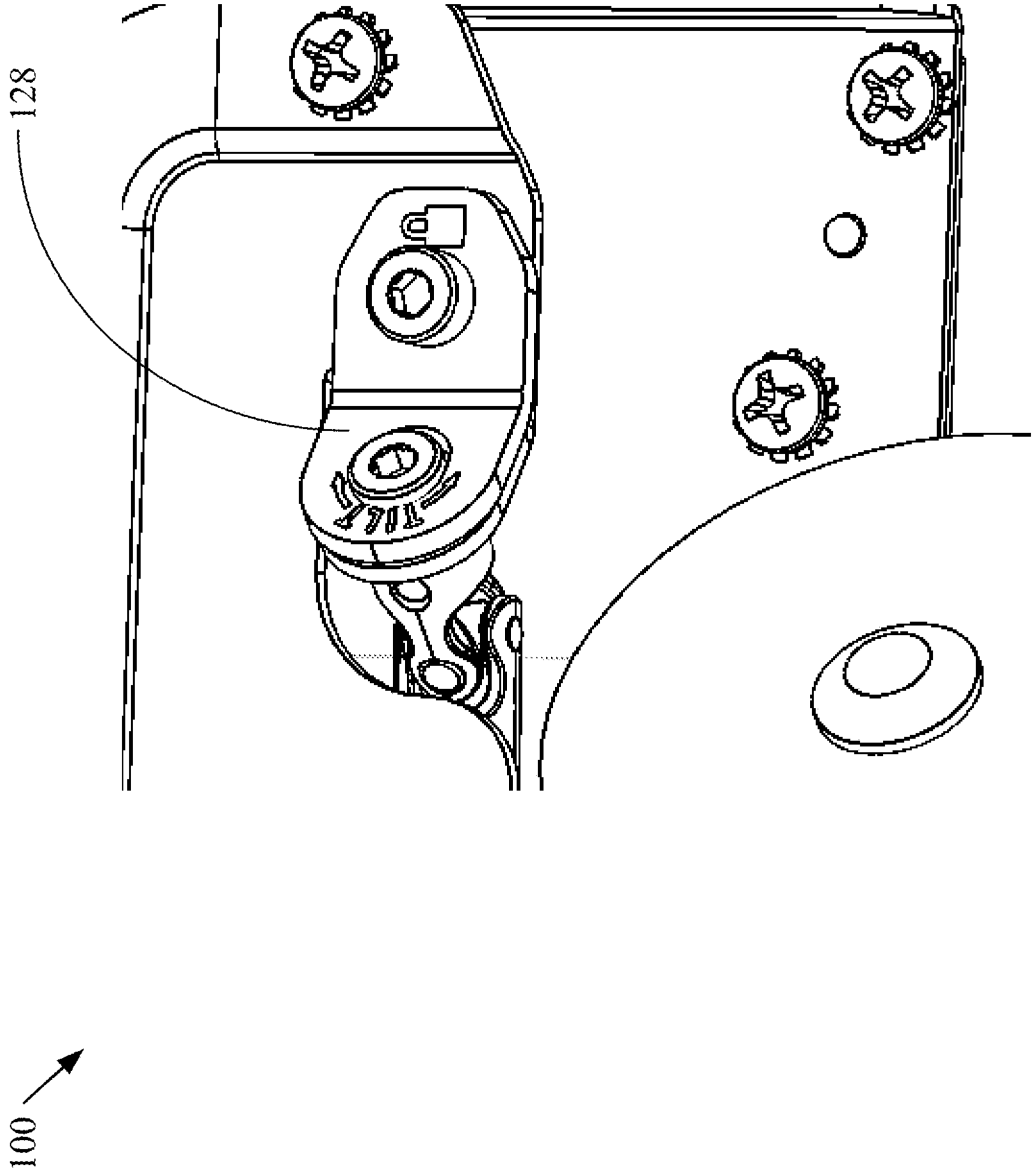
FIG. 91 on sheet 91 of the drawings is a screenshot of Tilt-related features of the examples [100*a-d*] of the lighting system.
Figure 92:
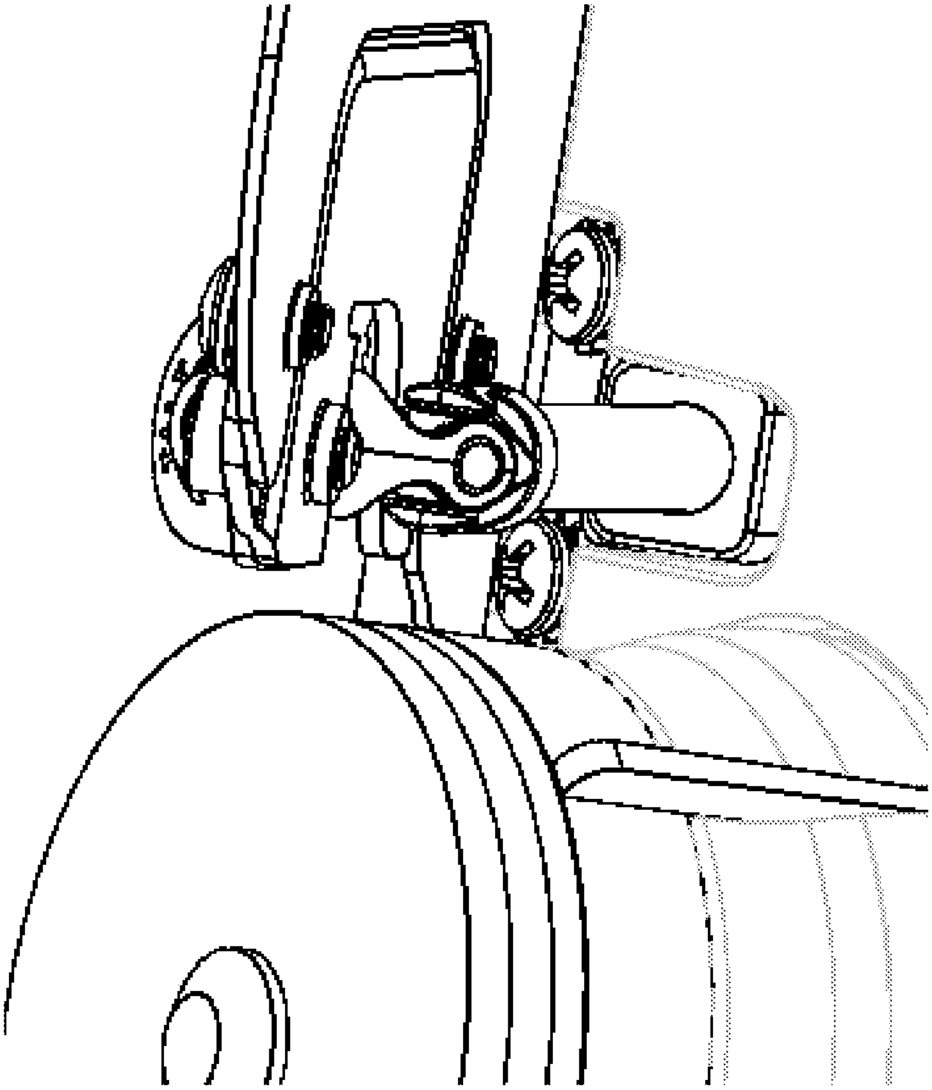
FIG. 92 on sheet 92 of the drawings is a screenshot of Tilt-related features of the examples [100*a*-*d*] of the lighting system.
Figure 93:
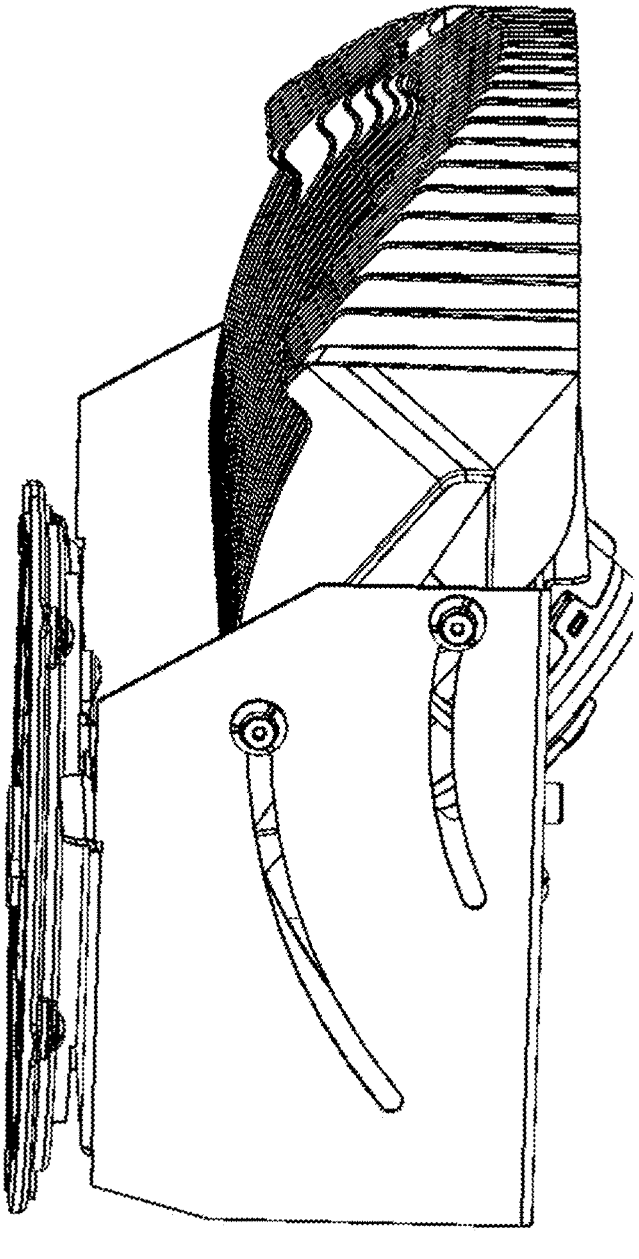
FIG. 93 on sheet 93 of the drawings is a screenshot of Tilt-related features of the examples [100*a*-*d*] of the lighting system.
Figure 94:
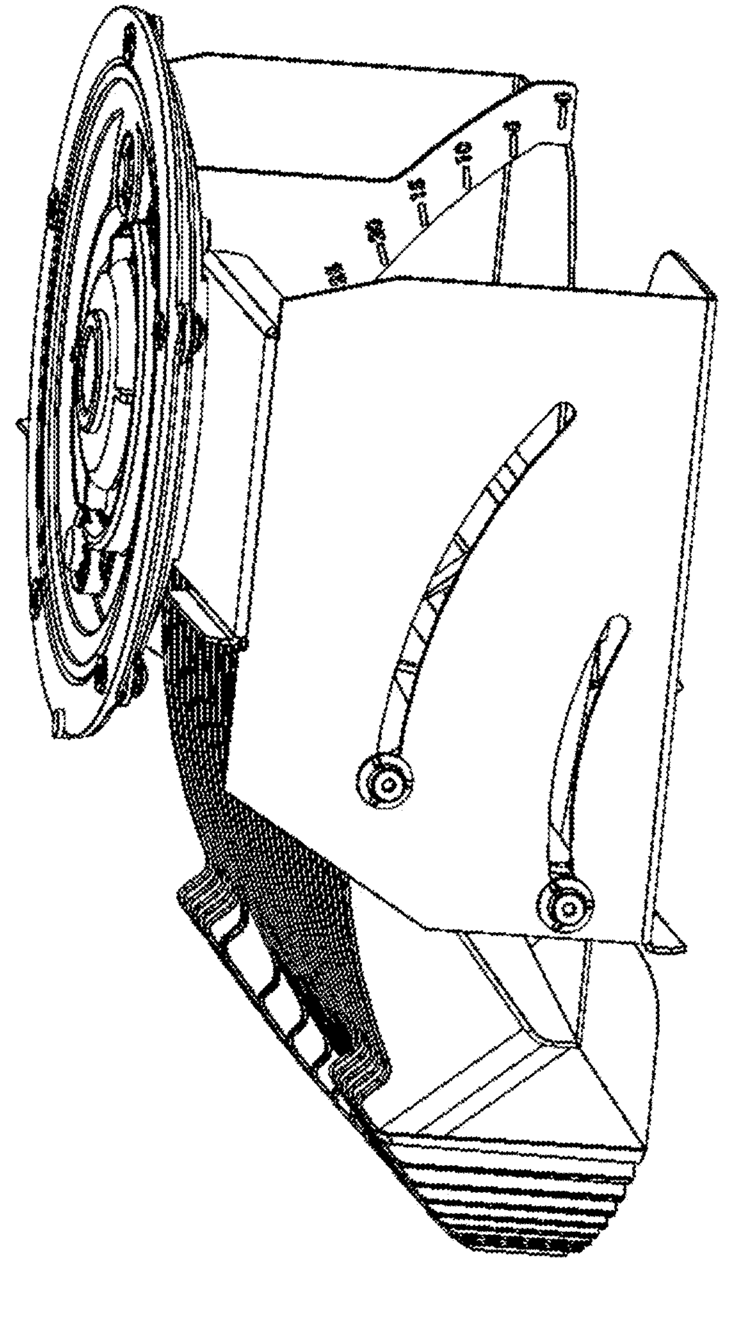
FIG. 94 on sheet 94 of the drawings is a screenshot of Tilt-related features of the examples [100*a*-*d*] of the lighting system.
Figure 95:
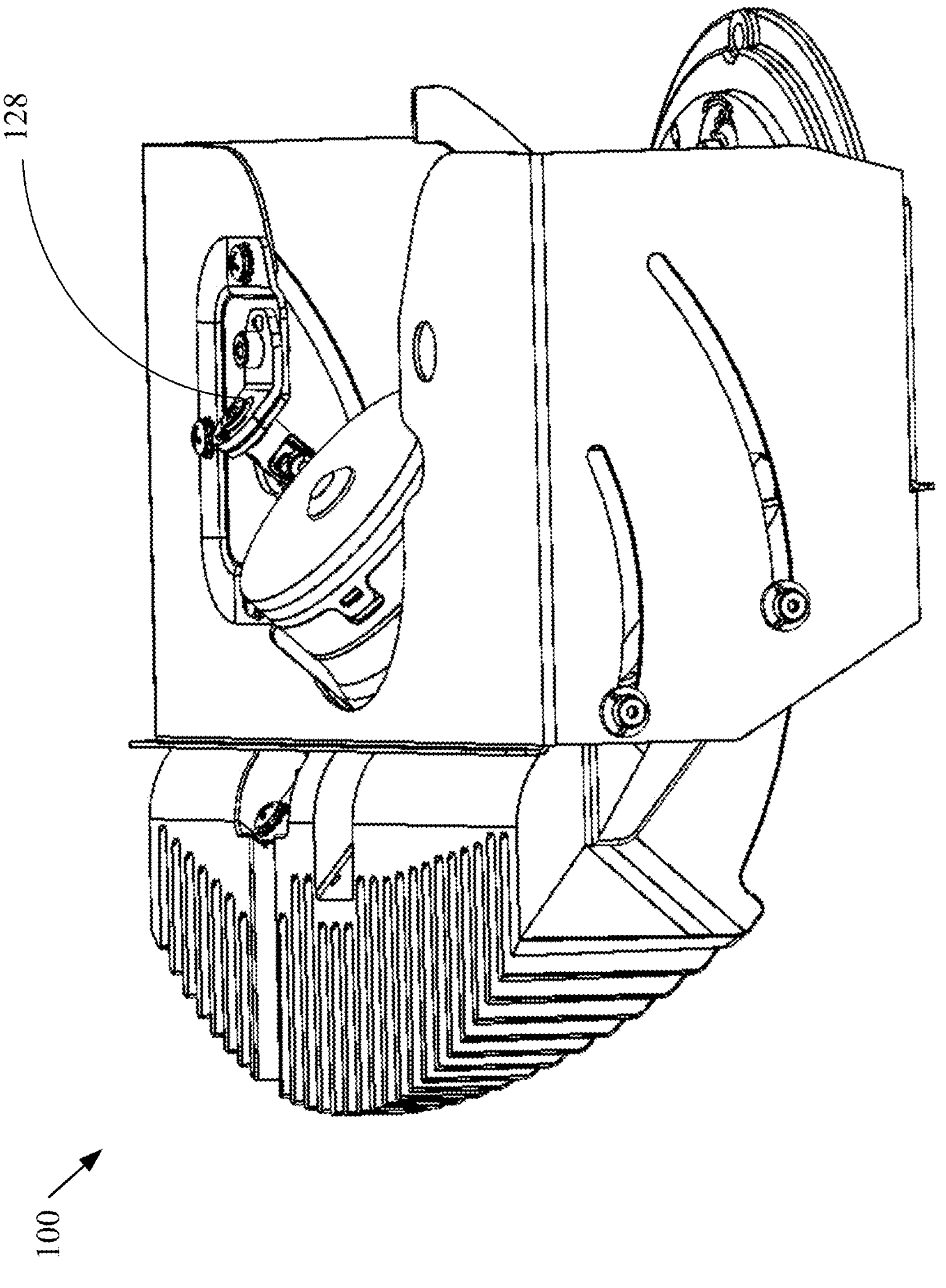
FIG. 95 on sheet 95 of the drawings is a screenshot of Tilt-related features of the examples [100*a*-*d*] of the lighting system.
Figure 96:
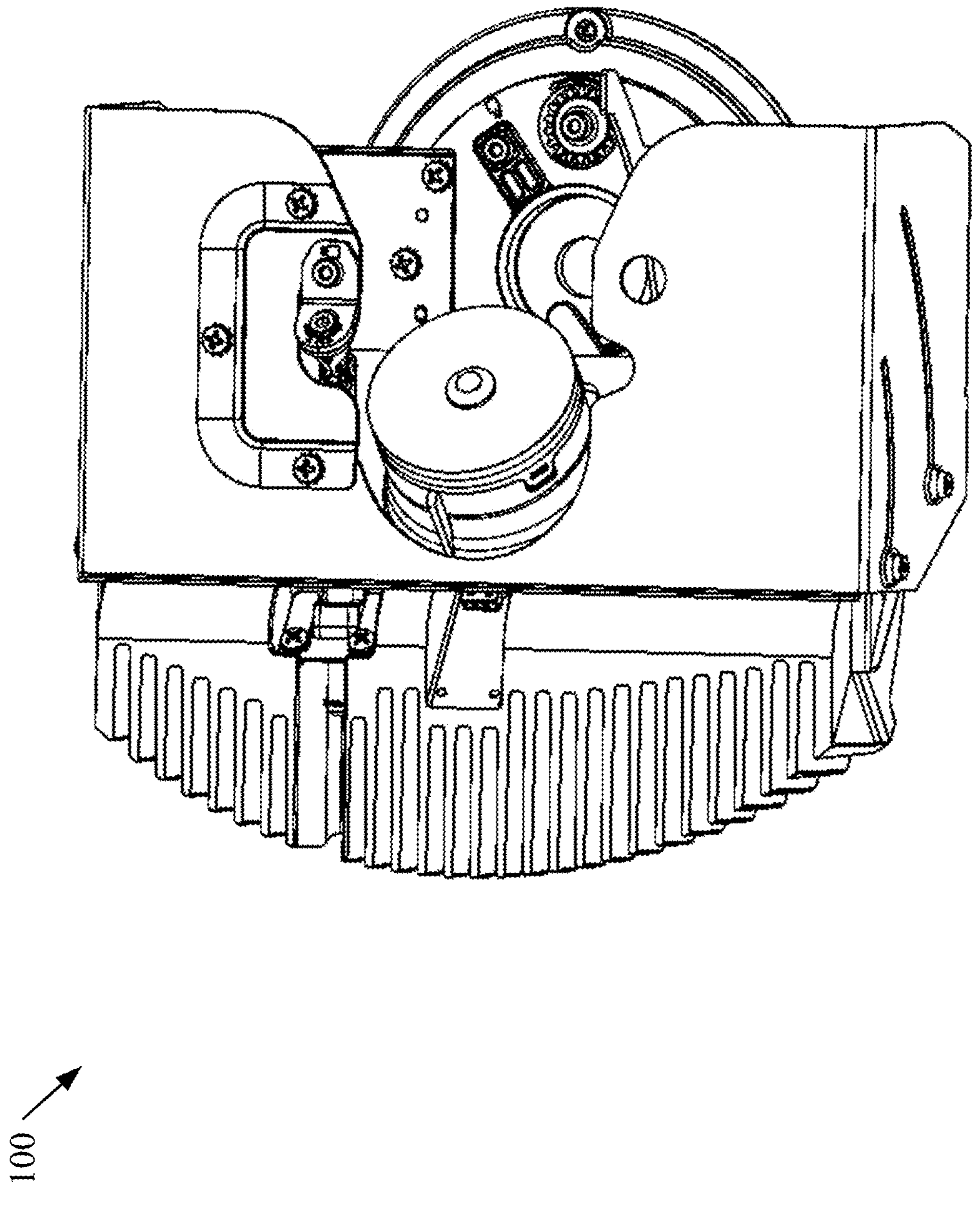
FIG. 96 on sheet 96 of the drawings is a screenshot of Tilt-related features of the examples [100*a*-*d*] of the lighting system.
Figure 97:
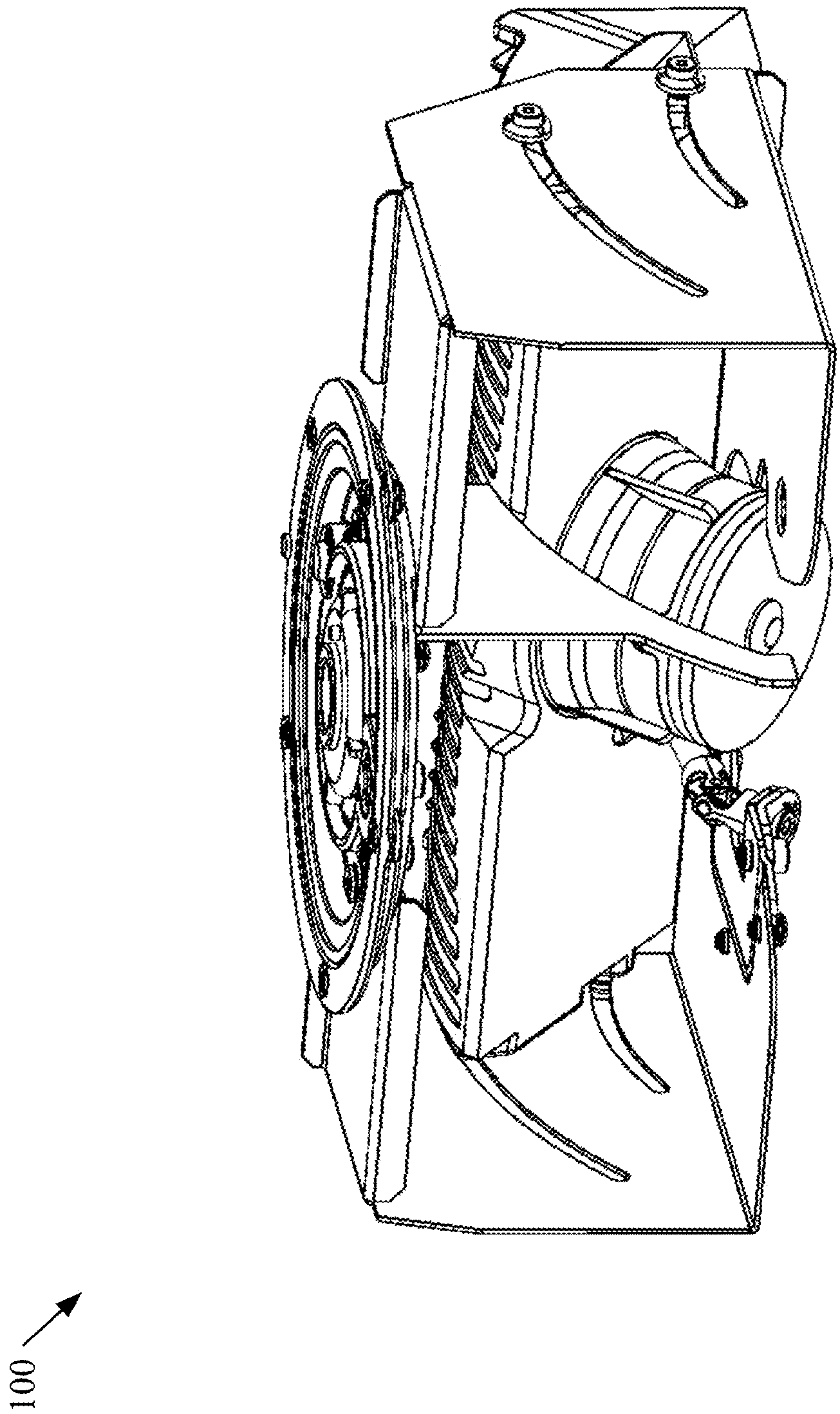
FIG. 97 on sheet 97 of the drawings is a screenshot of Tilt-related features of the examples [100*a*-*d*] of the lighting system.
Figure 98:
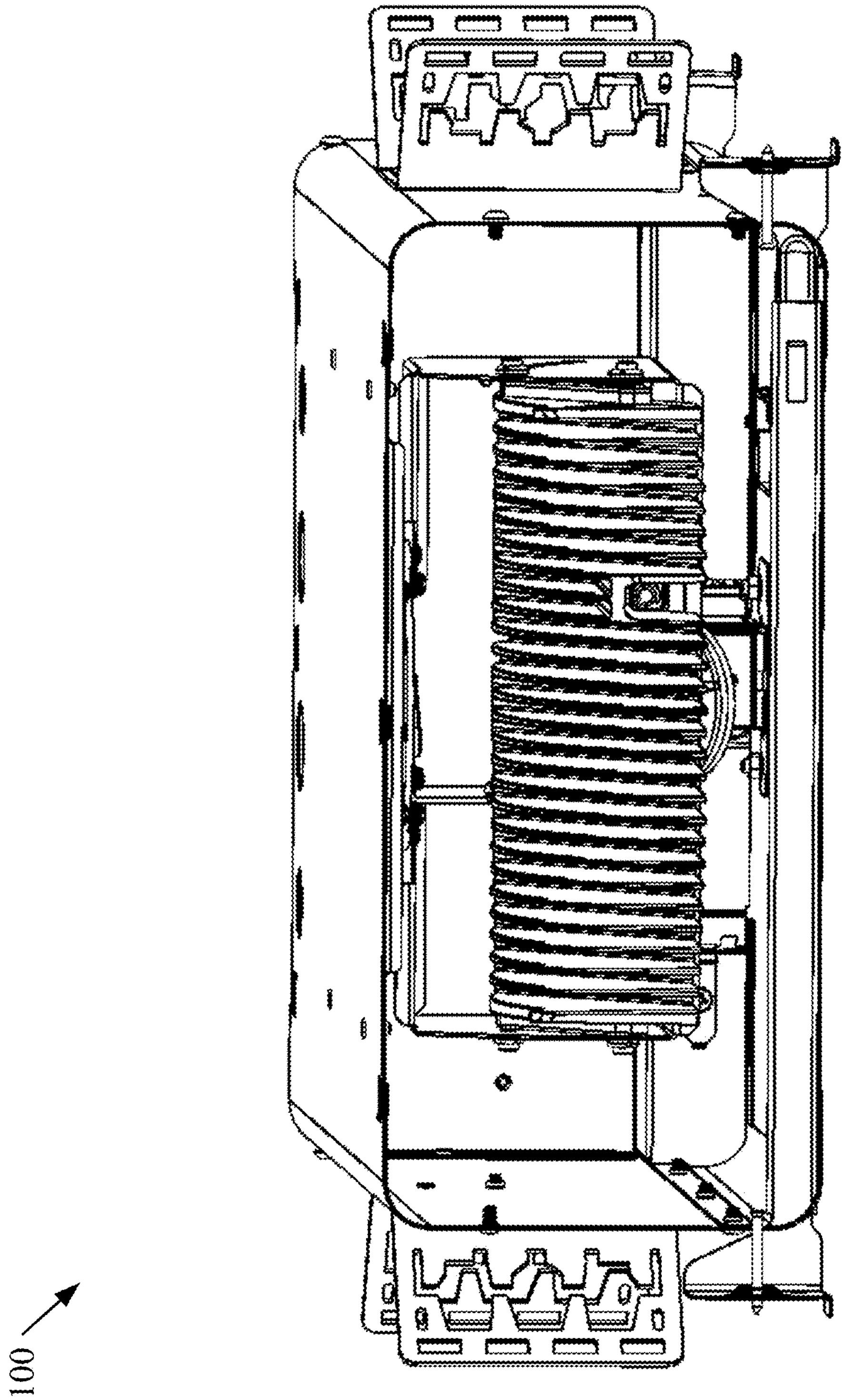
FIG. 98 on sheet 98 of the drawings is a screenshot of Tilt-related features of the examples [100*a*-*d*] of the lighting system.
Figure 99:
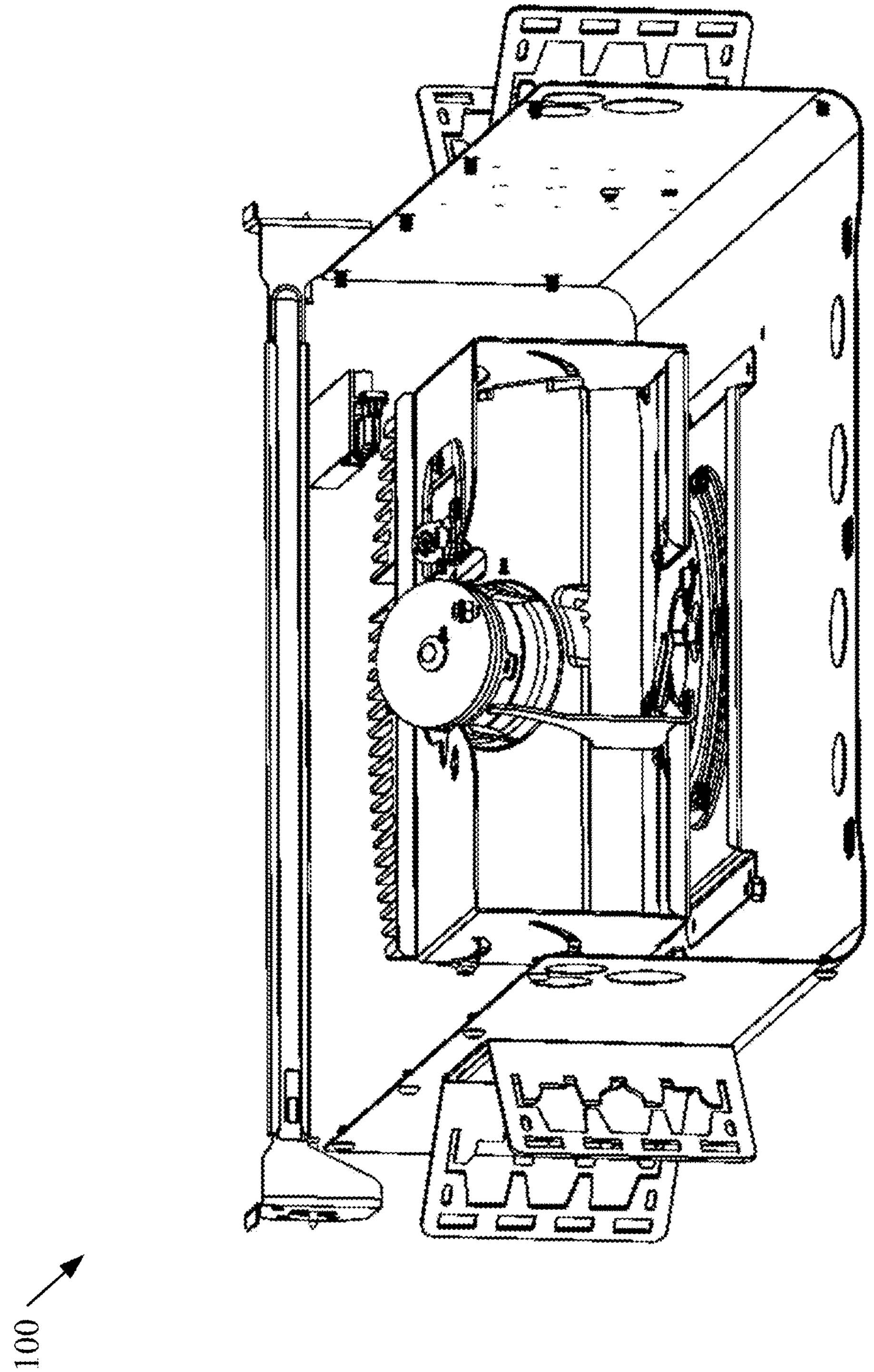
FIG. 99 on sheet 99 of the drawings is a screenshot of Tilt-related features of the examples [100*a*-*d*] of the lighting system.
Figure 100:
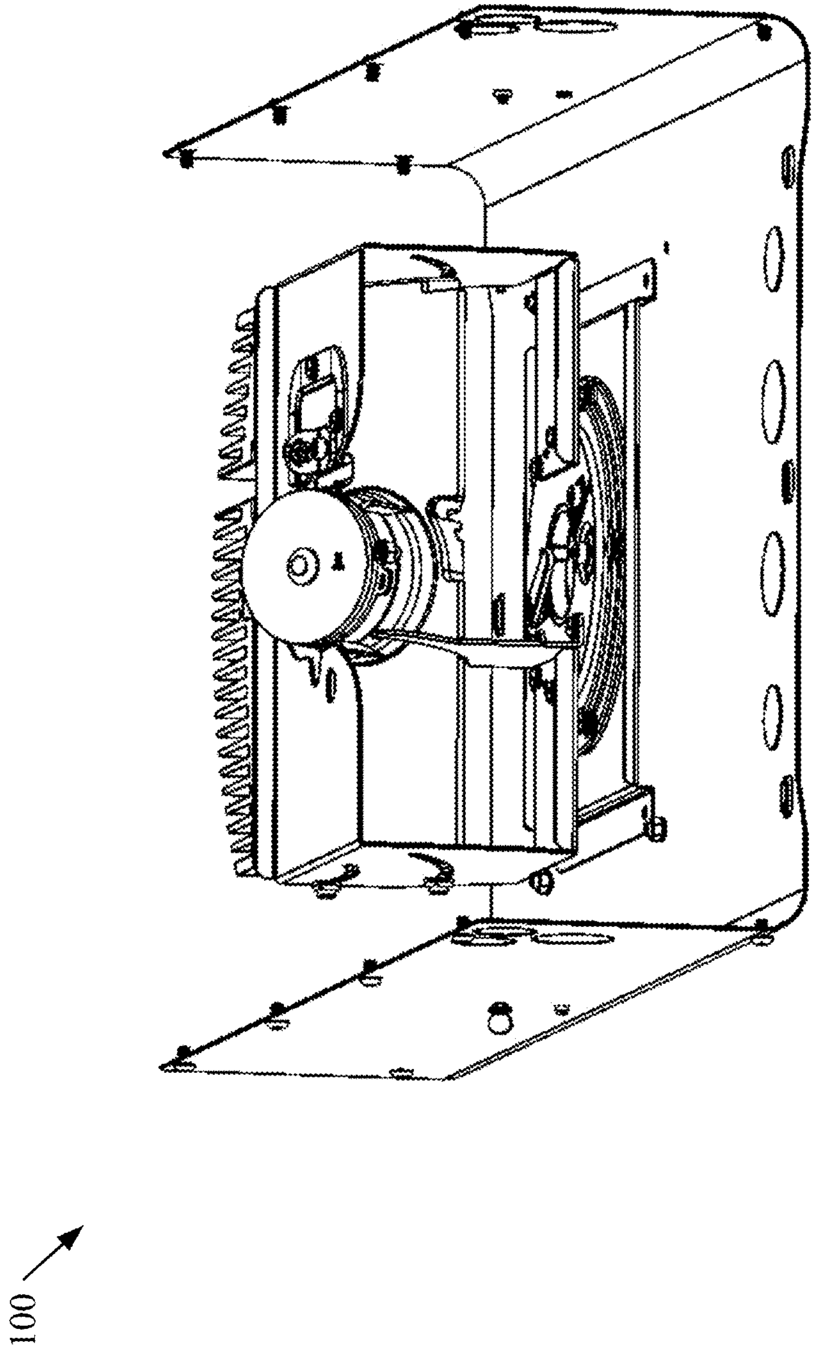
FIG. 100 on sheet 100 of the drawings is a screenshot of Tilt-related features of the examples [100*a*-*d*] of the lighting system.
Figure 101:
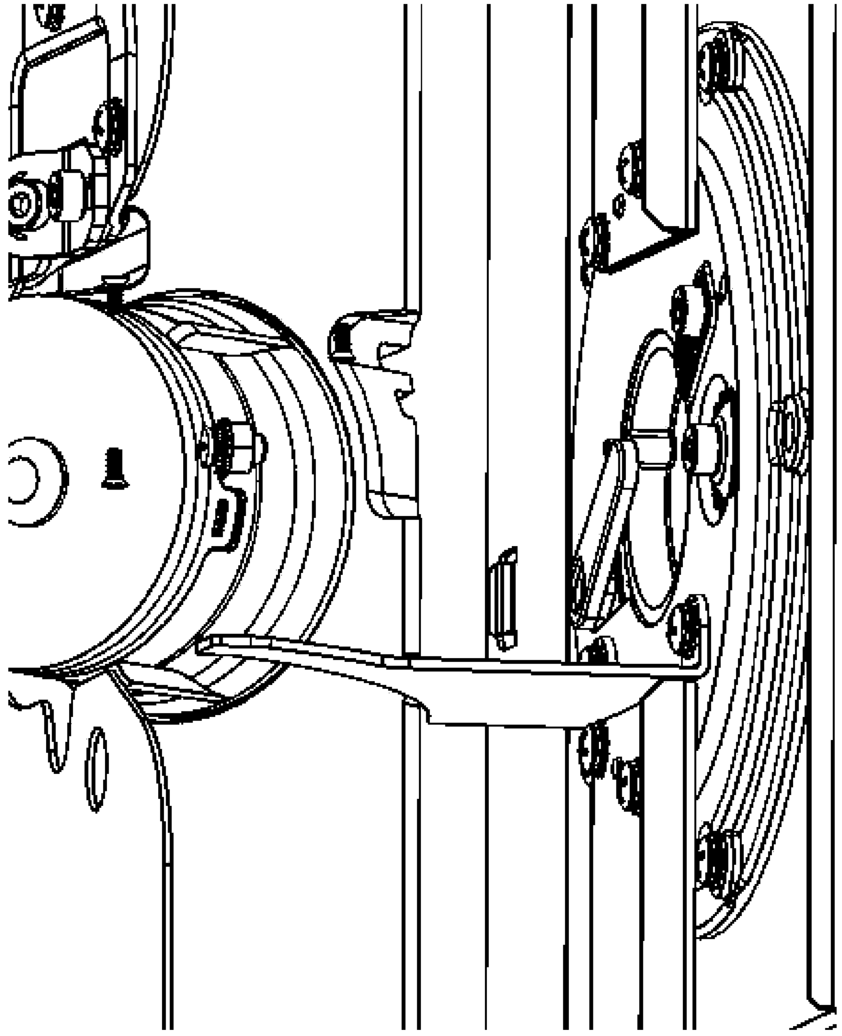
FIG. 101 on sheet 101 of the drawings is a screenshot of Tilt-related features of the examples [100*a*-*d*] of the lighting system.
Figure 102:
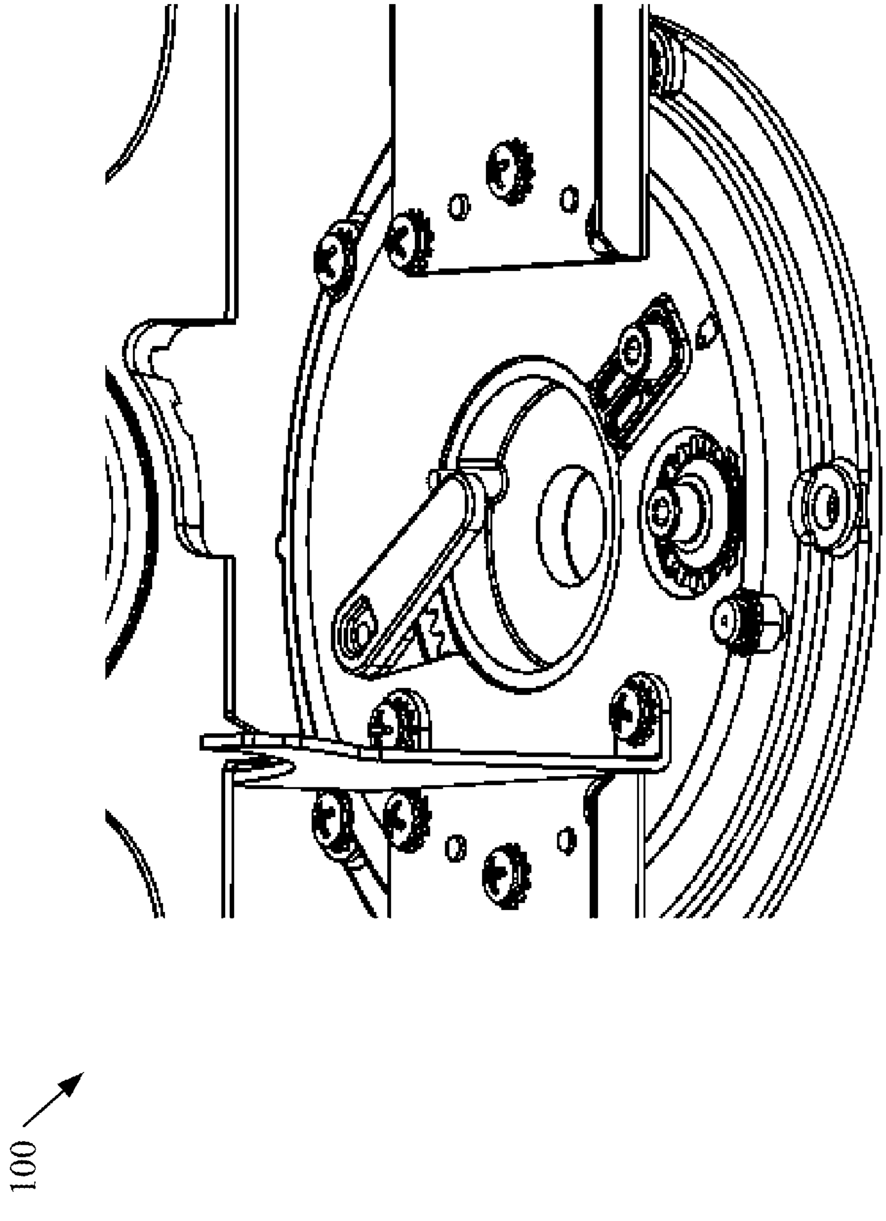
FIG. 102 on sheet 102 of the drawings is a screenshot of Tilt-related features of the examples [100*a*-*d*] of the lighting system.
Figure 103:
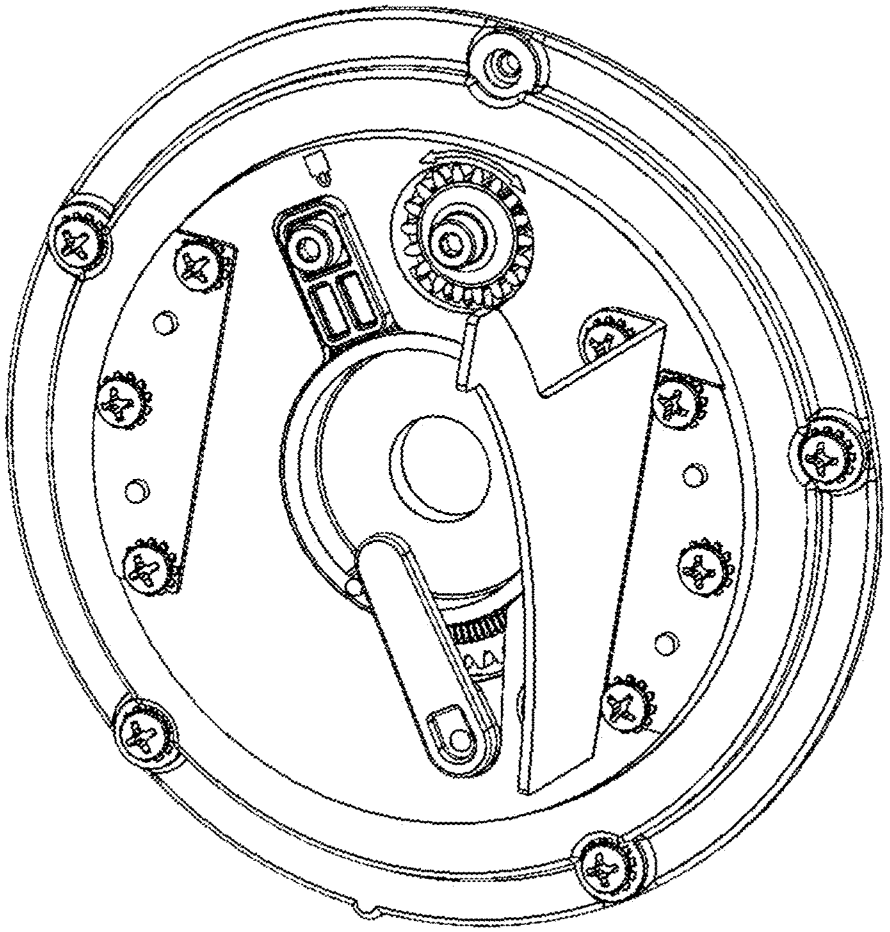
FIG. 103 on sheet 103 of the drawings is a screenshot of Tilt-related features of the examples [100*a*-*d*] of the lighting system.
Figure 104:
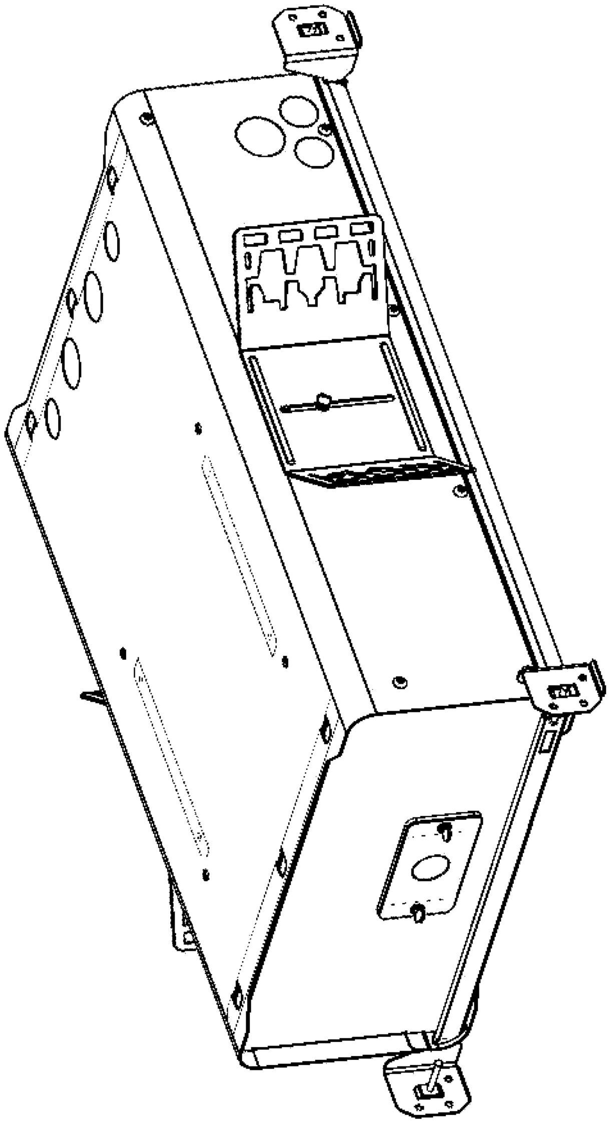
FIG. 104 on sheets 104 of the drawings is a screenshot of Universal Joint-related features of the examples [100*a*-*d*] of the lighting system.
Figure 105:
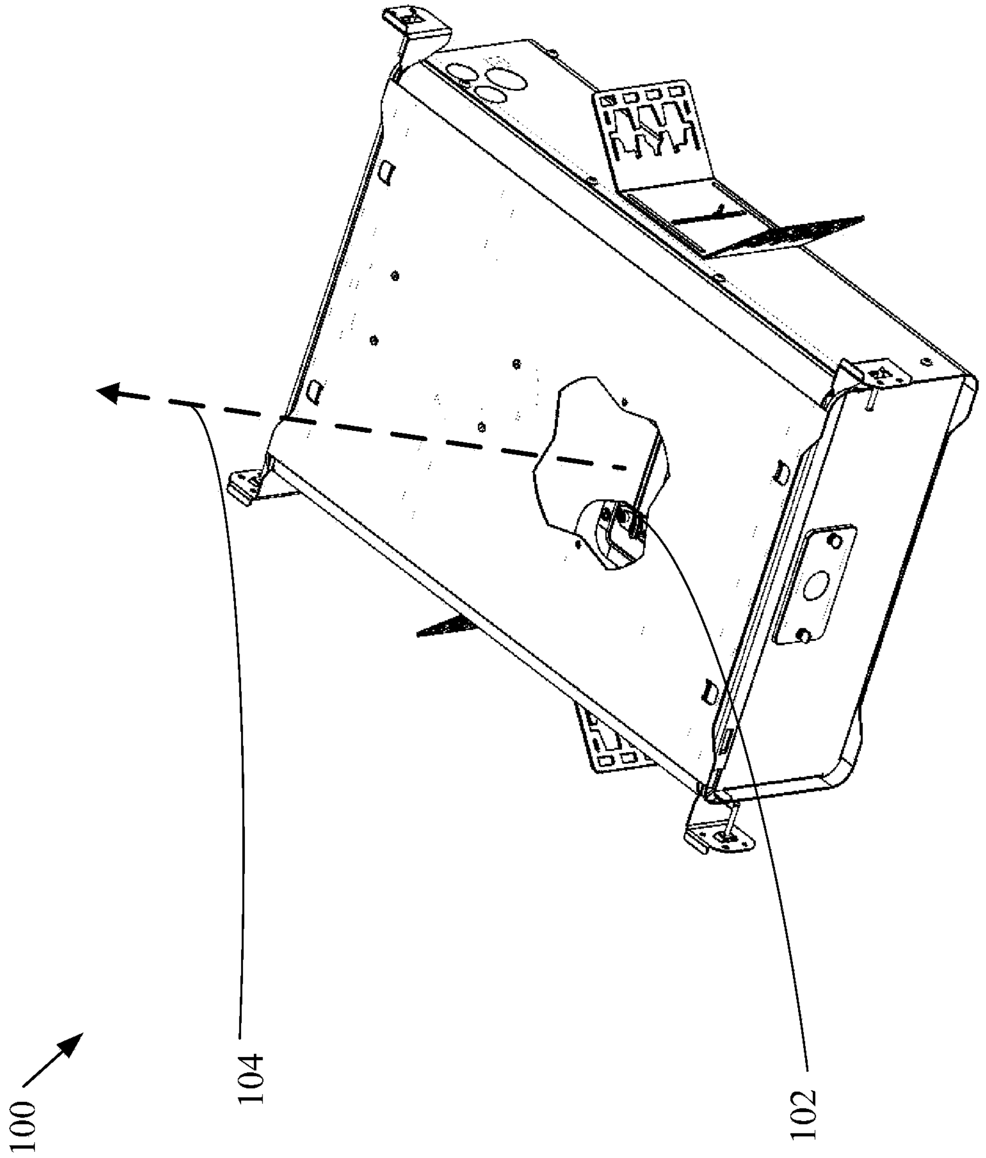
FIG. 105 on sheet 105 of the drawings is a screenshot of Universal Joint-related features of the examples [100*a*-*d*] of the lighting system.
Figure 106:
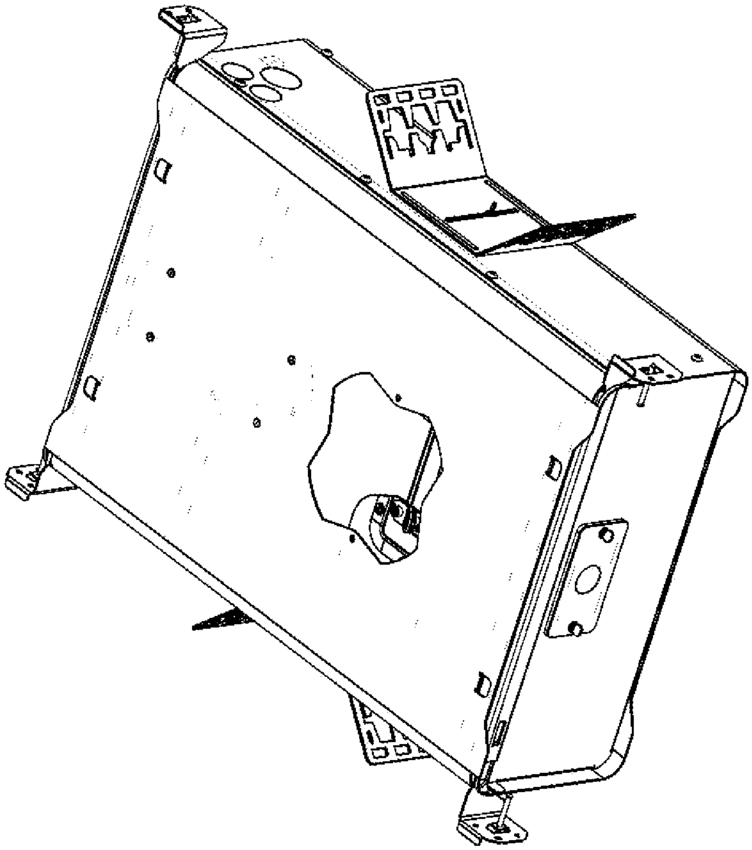
FIG. 106 on sheet 106 of the drawings is a screenshot of Universal Joint-related features of the examples [100*a*-*d*] of the lighting system.
Figure 107:
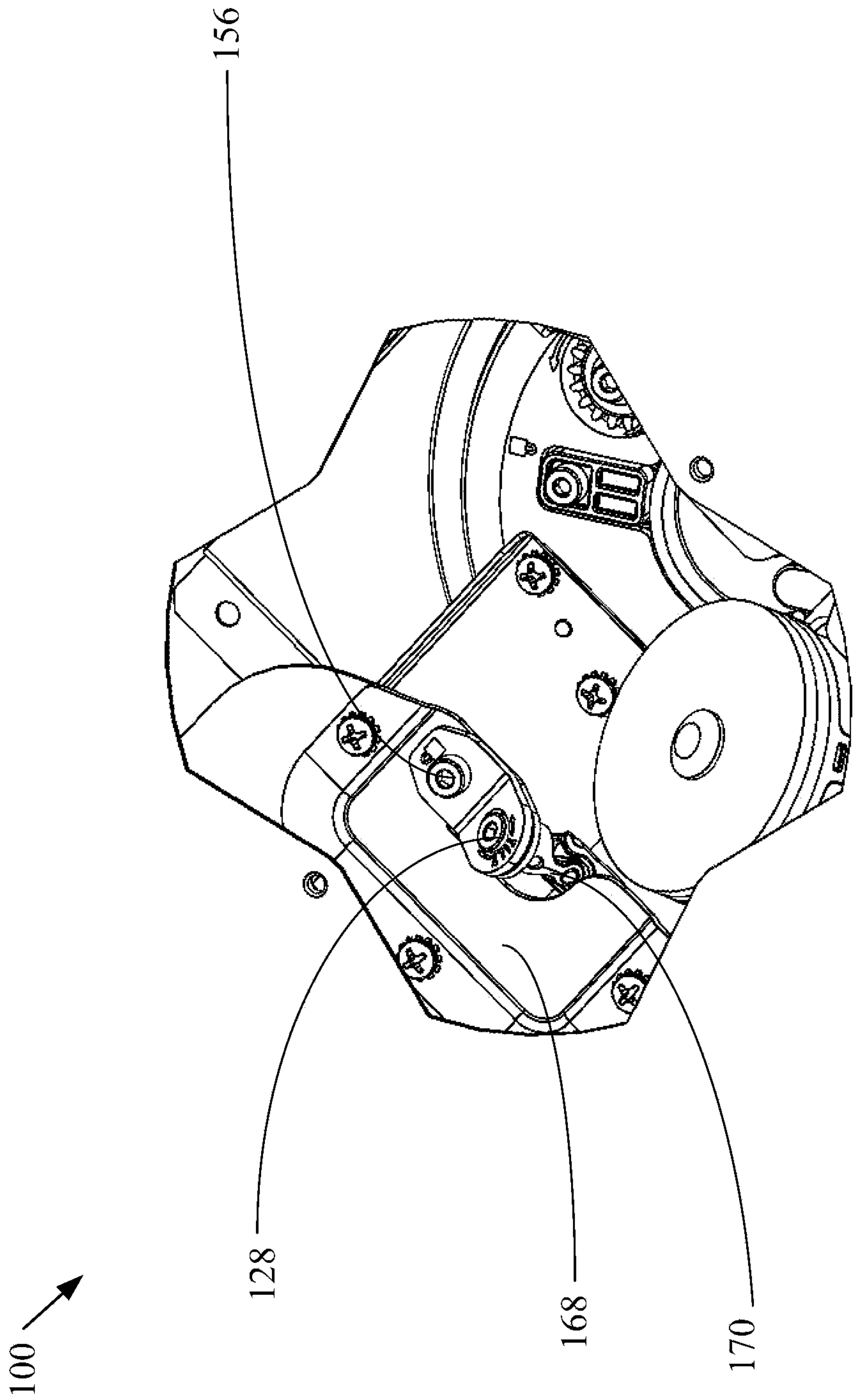
FIG. 107 on sheet 107 of the drawings is a screenshot of Universal Joint-related features of the examples [100*a*-*d*] of the lighting system.
Figure 108:
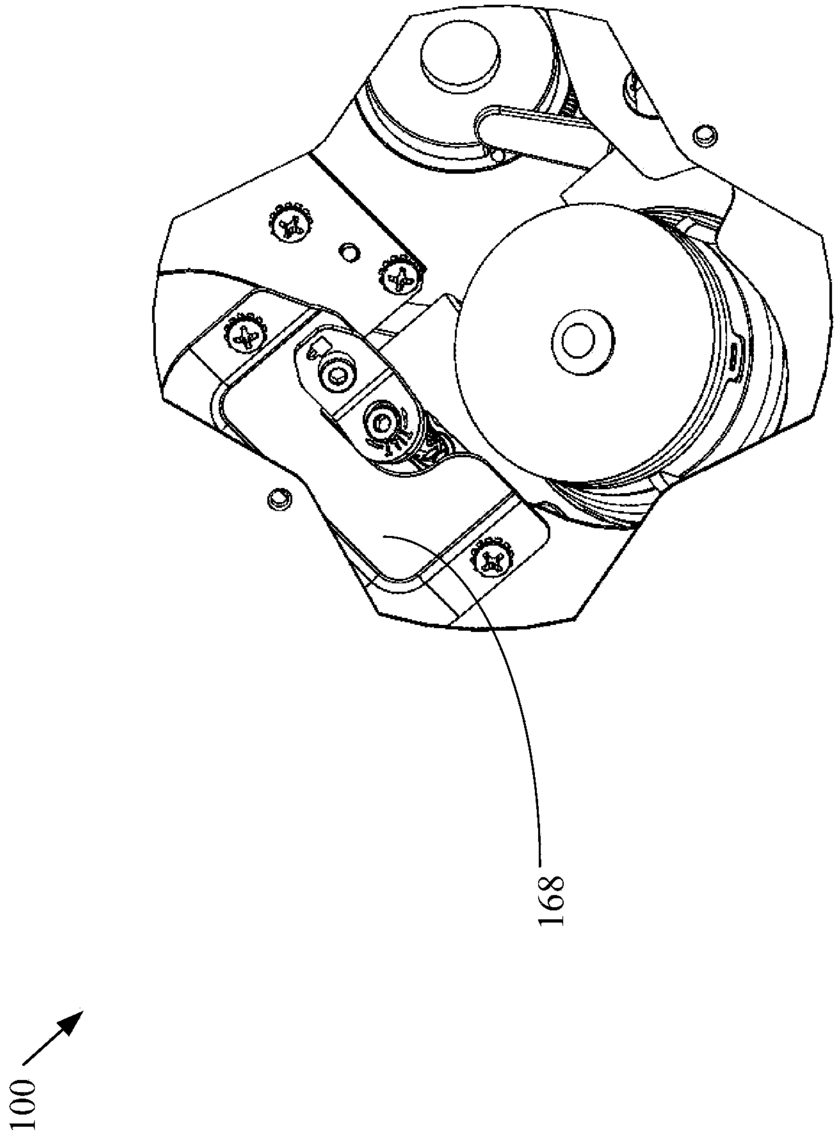
FIG. 108 on sheet 108 of the drawings is a screenshot of Universal Joint-related features of the examples [100*a*-*d*] of the lighting system.
Figure 109:
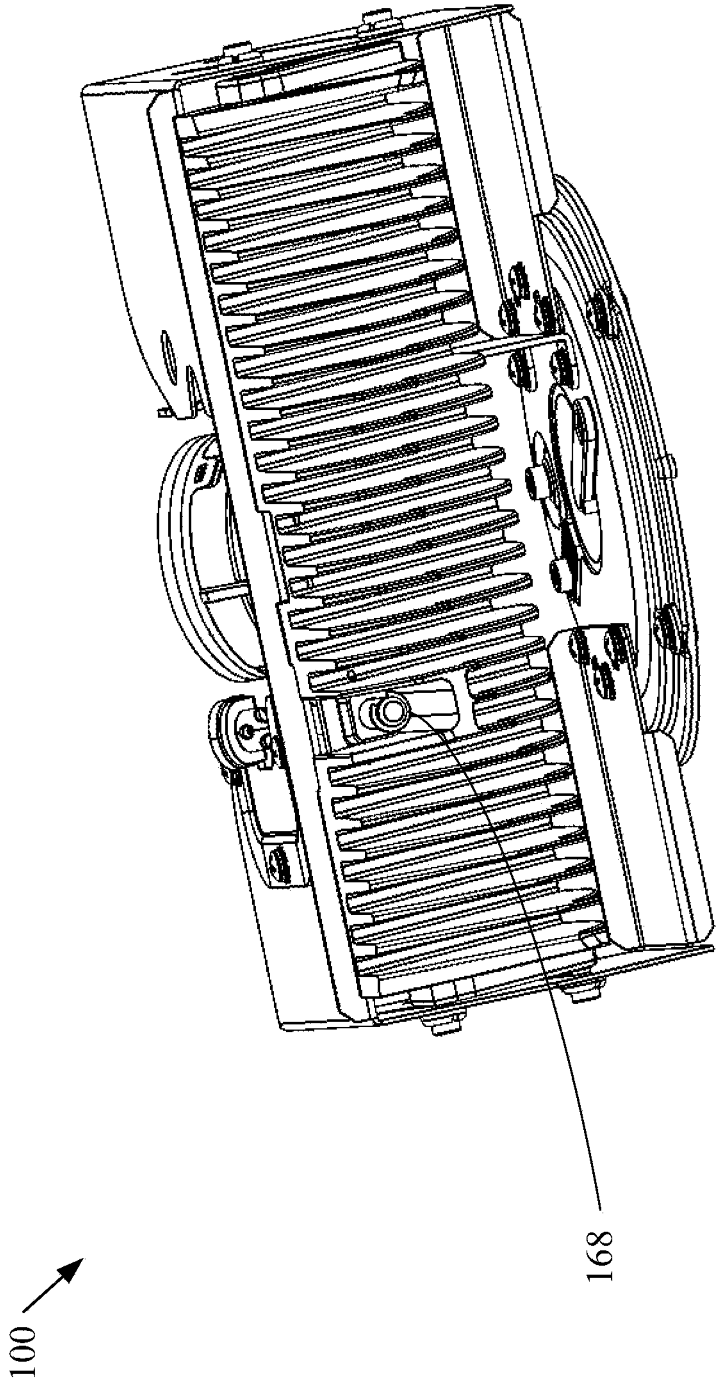
FIG. 109 on sheet 109 of the drawings is a screenshot of Universal Joint-related features of the examples [100*a*-*d*] of the lighting system.
Figure 110:
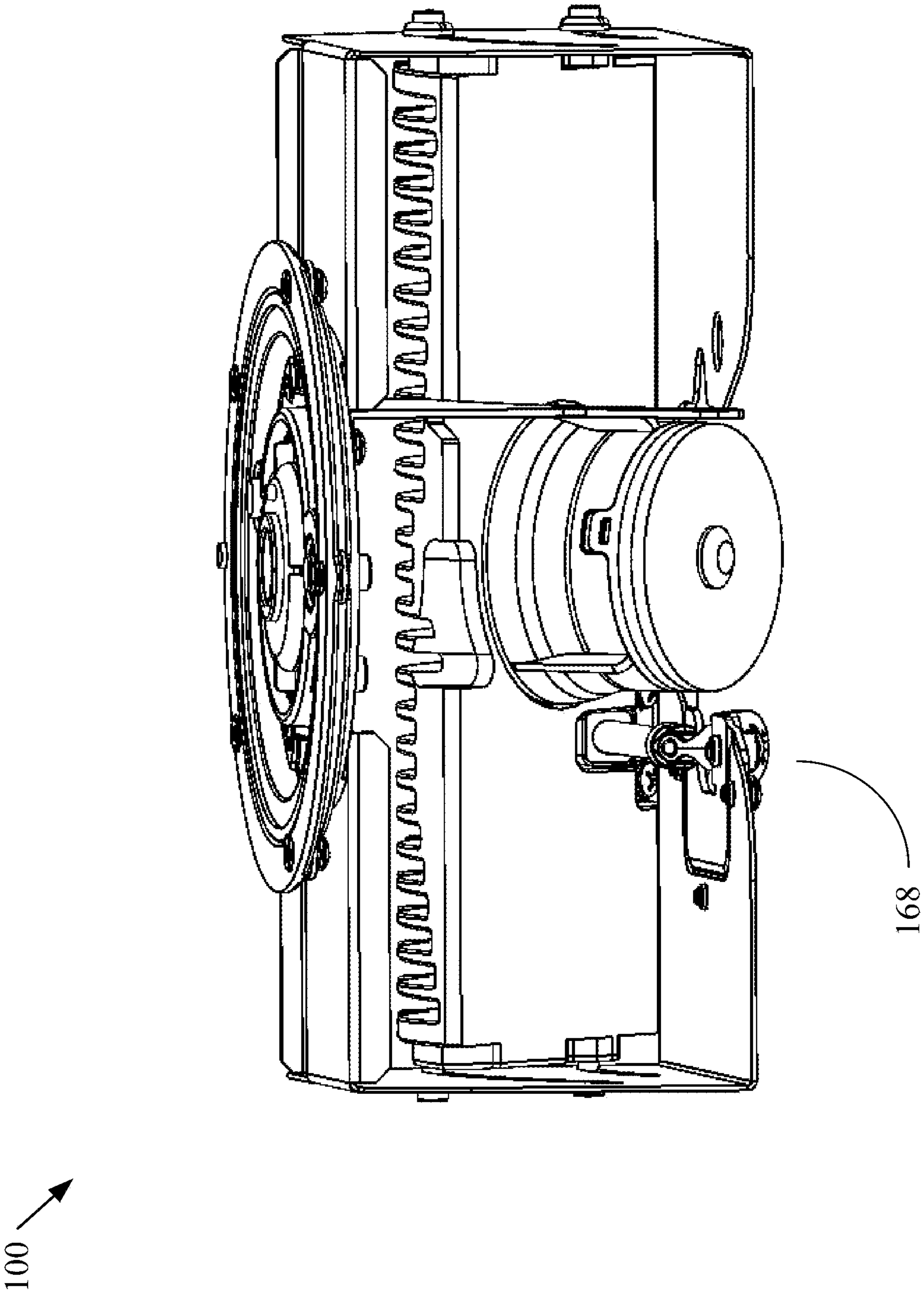
FIG. 110 on sheet 110 of the drawings is a screenshot of Universal Joint-related features of the examples [100*a*-*d*] of the lighting system.
Figure 111:
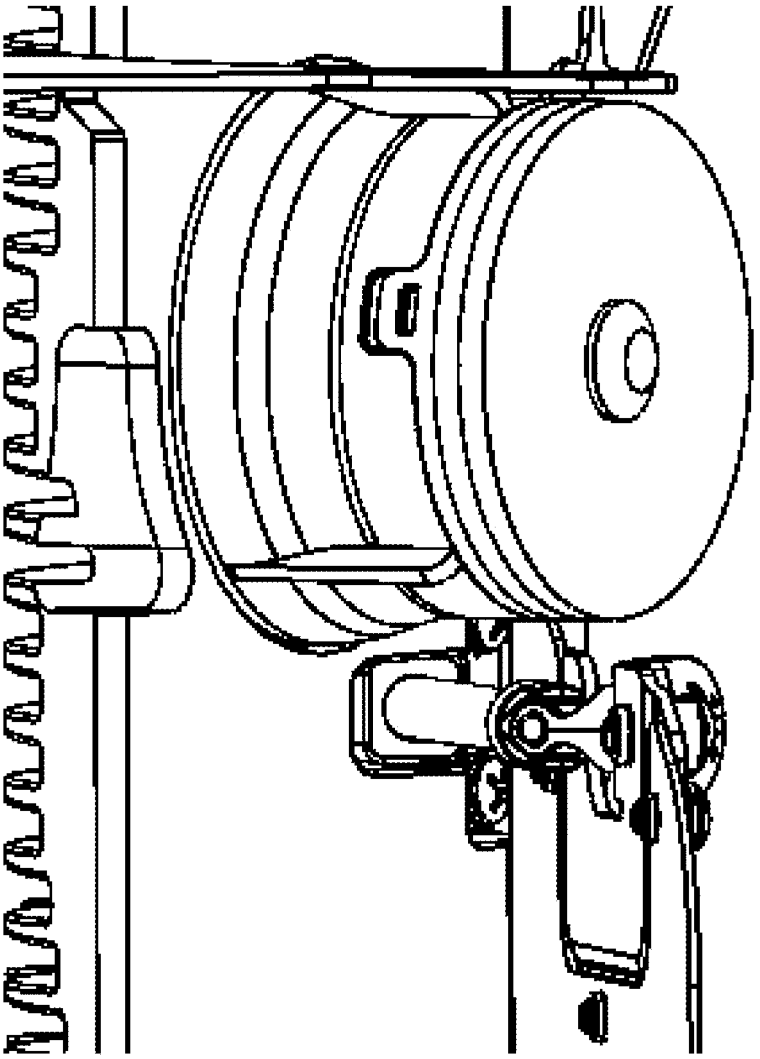
FIG. 111 on sheet 111 of the drawings is a screenshot of Universal Joint-related features of the examples [100*a*-*d*] of the lighting system.
Figure 112:
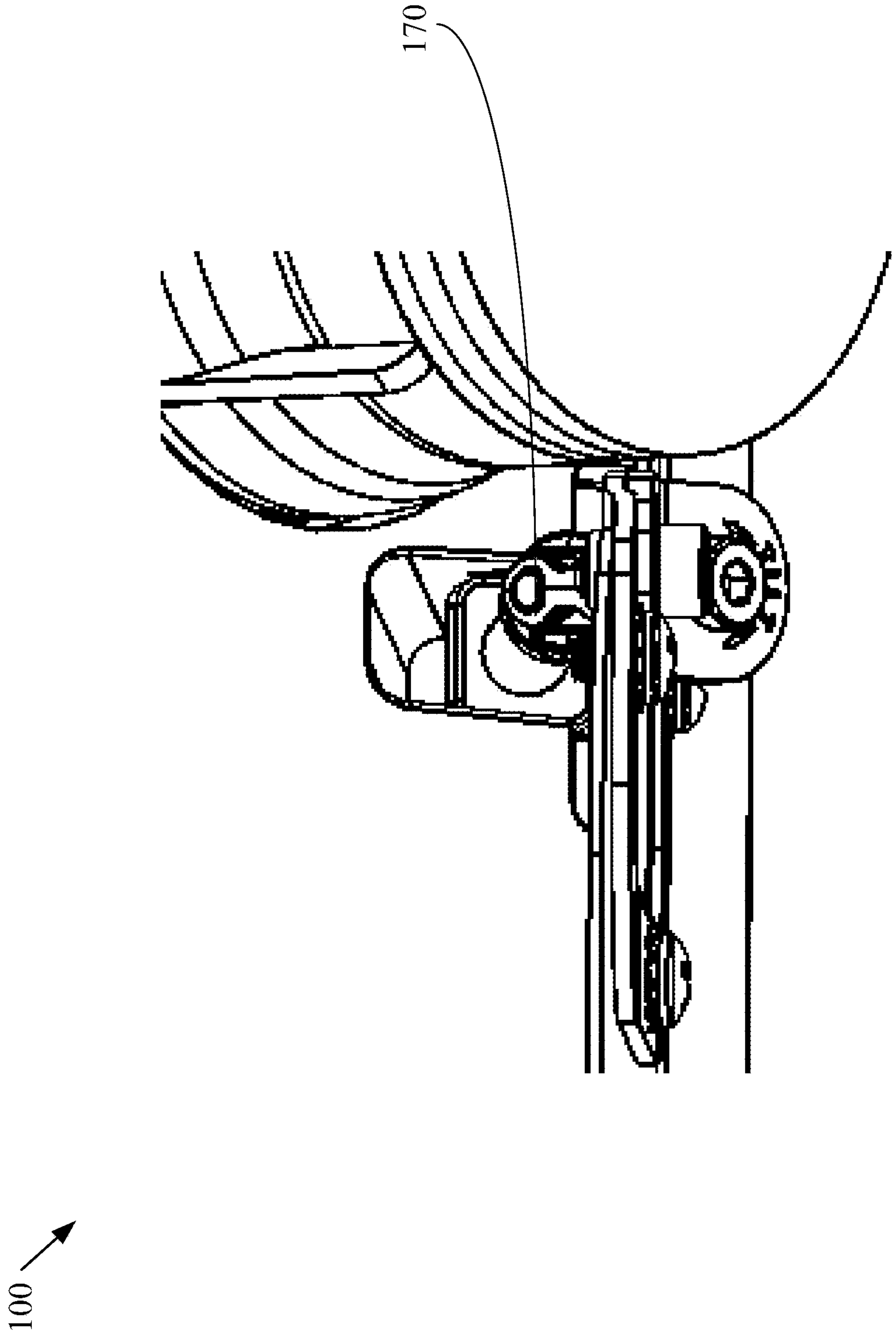
FIG. 112 on sheet 112 of the drawings is a screenshot of Universal Joint-related features of the examples [100*a*-*d*] of the lighting system.
Figure 113:
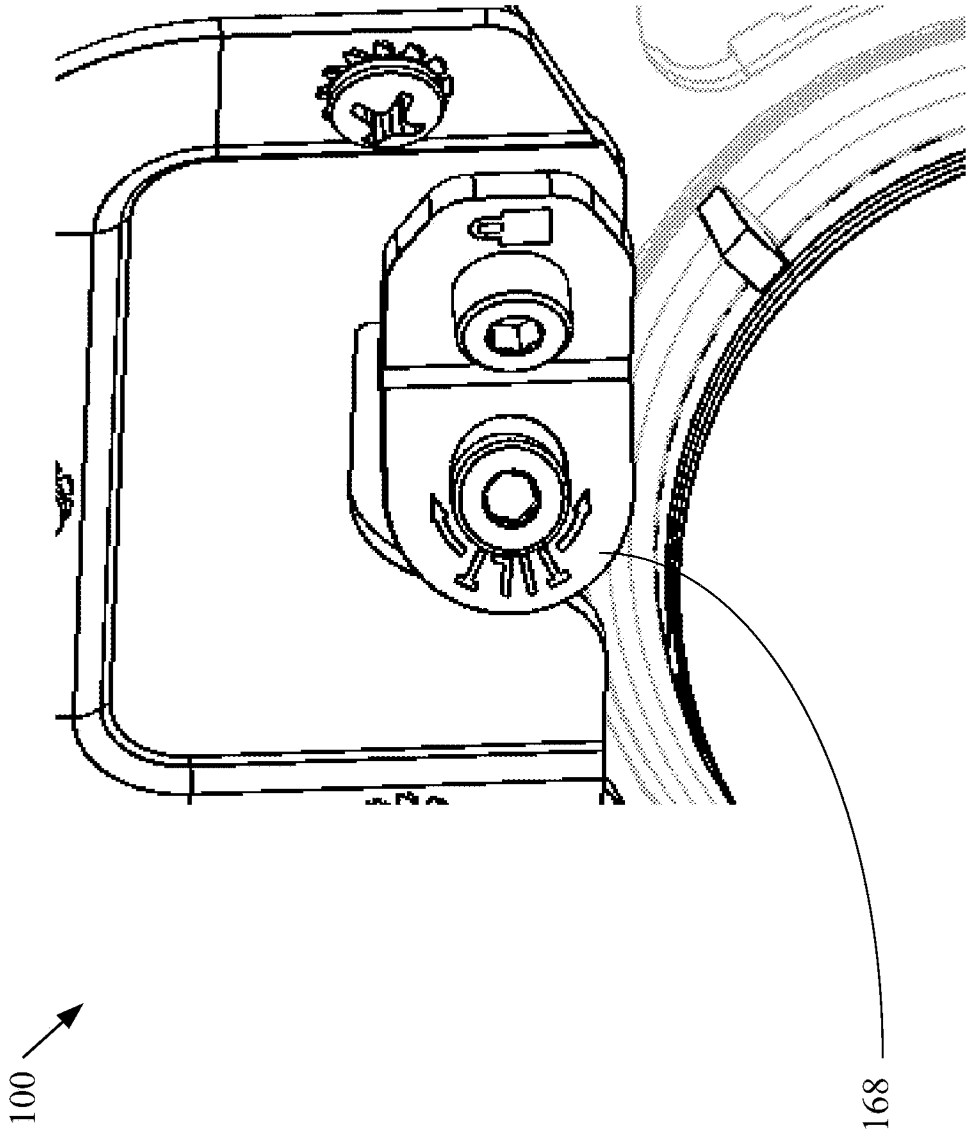
FIG. 113 on sheet 113 of the drawings is a screenshot of Universal Joint-related features of the examples [100*a*-*d*] of the lighting system.
Figure 114:
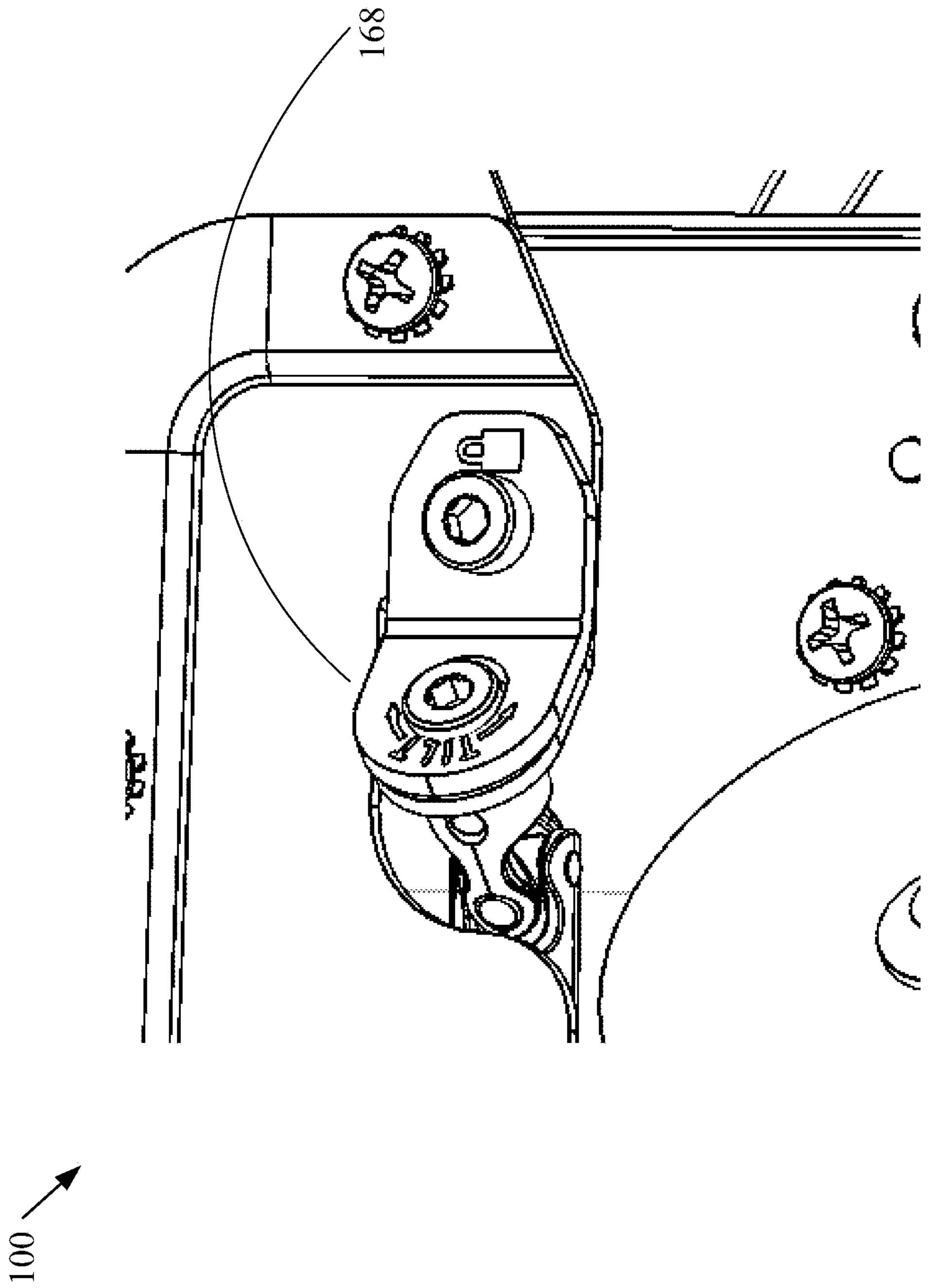
FIG. 114 on sheet 114 of the drawings is a screenshot of Universal Joint-related features of the examples [100*a*-*d*] of the lighting system.
Figure 115:
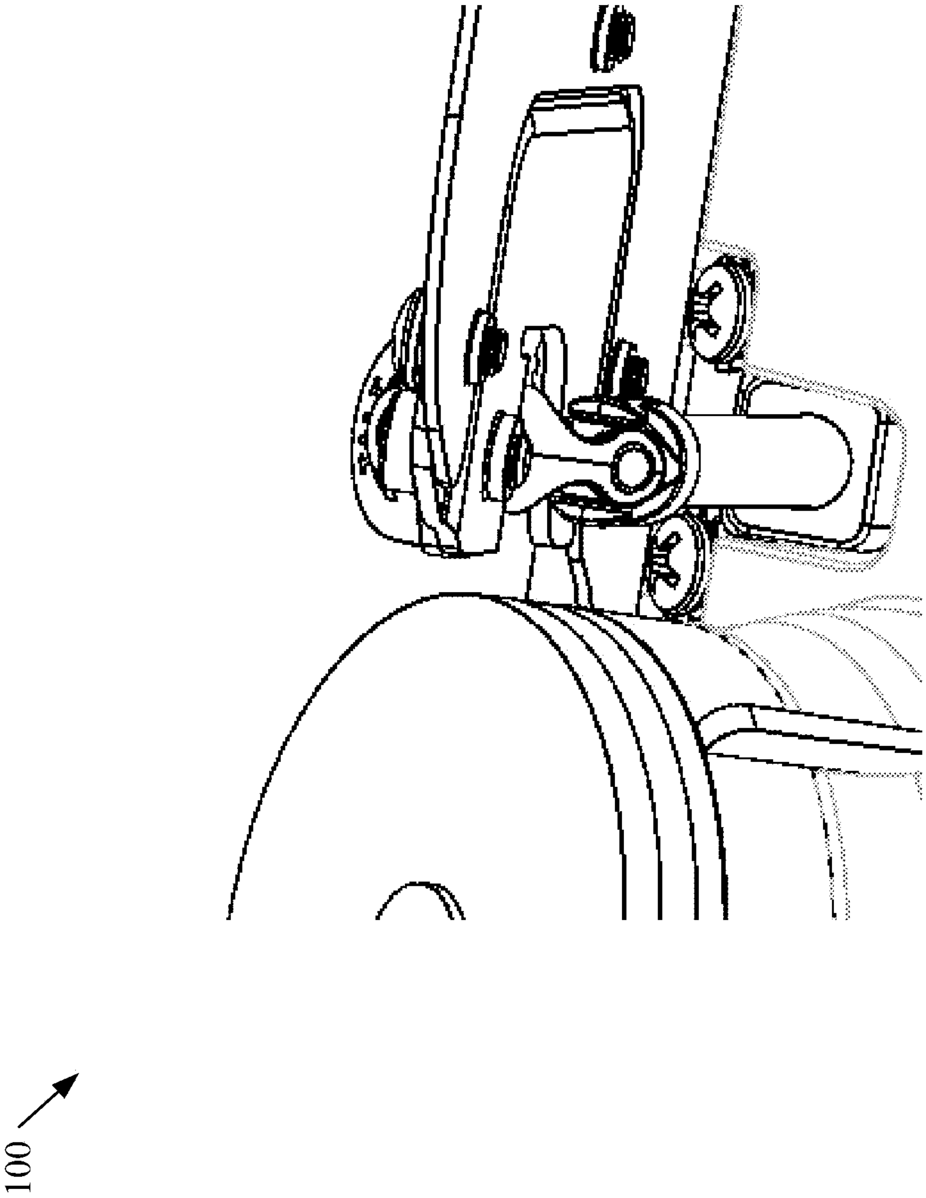
FIG. 115 on sheet 115 of the drawings is a screenshot of Universal Joint-related features of the examples [100*a*-*d*] of the lighting system.
Figure 116:
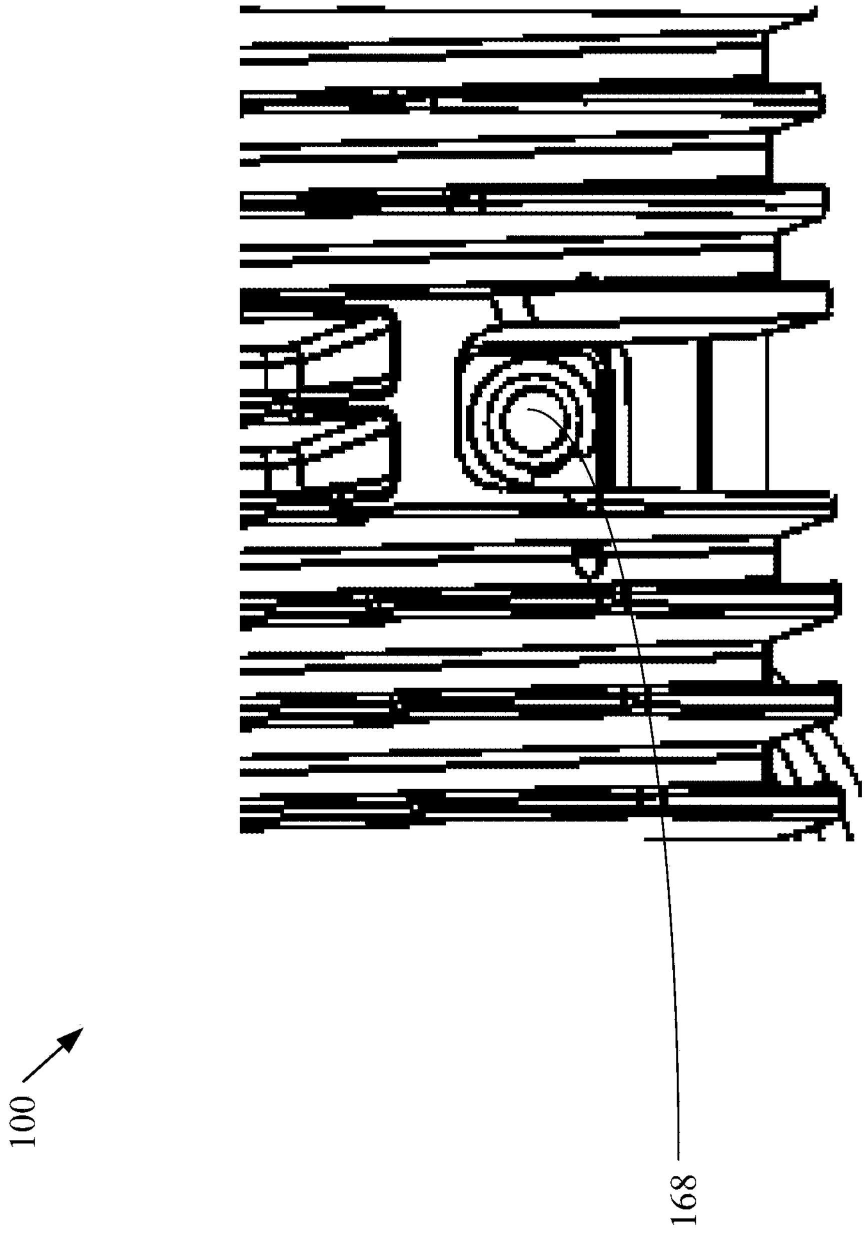
FIG. 116 on sheet 116 of the drawings is a screenshot of Universal Joint-related features of the examples [100*a*-*d*] of the lighting system.
Figures 117, 118:
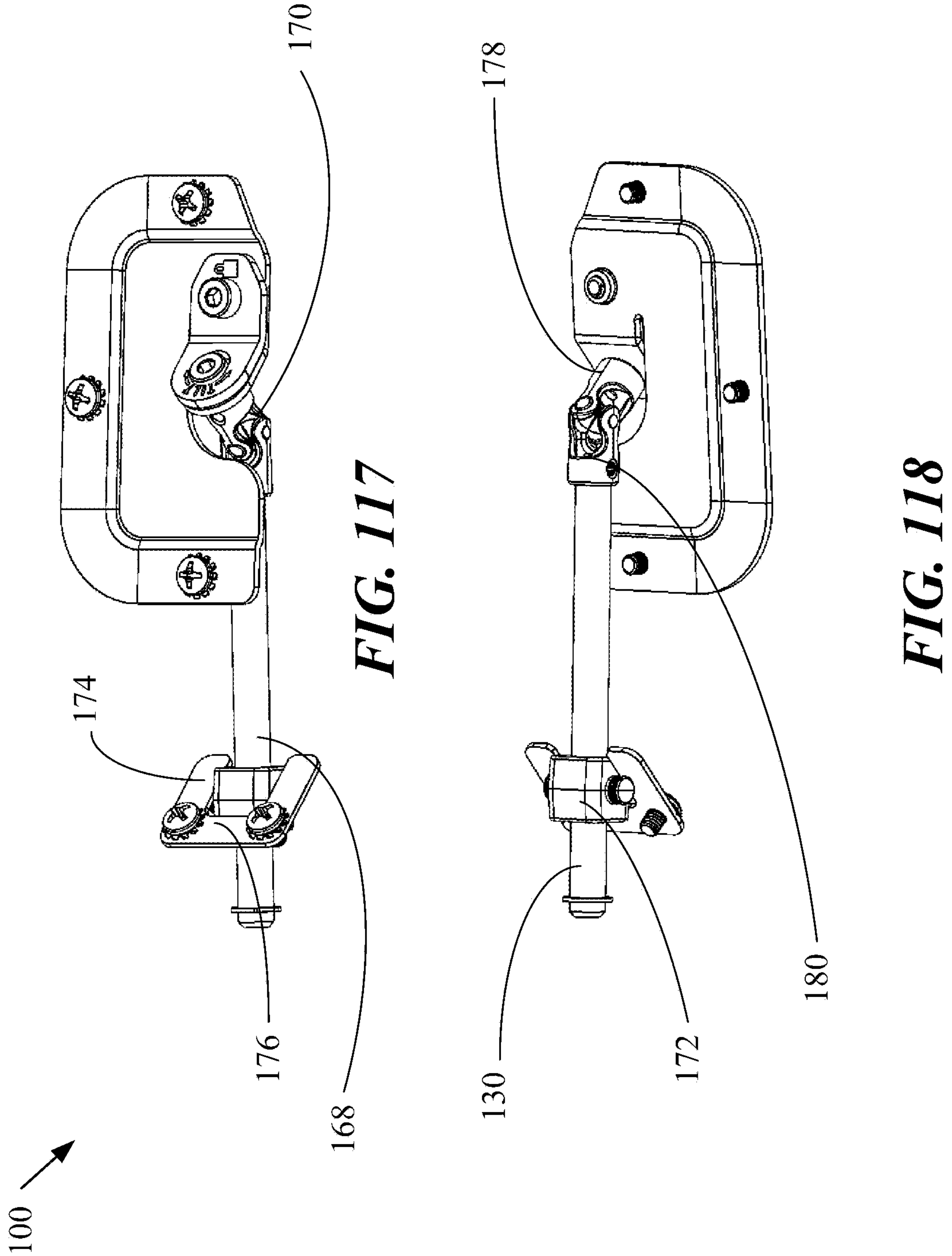
FIG. 117 on sheet 117 of the drawings is a screenshot of Universal Joint-related features of the examples [100*a*-*d*] of the lighting system.
FIG. 118 on sheet 117 of the drawings is a screenshot of Universal Joint-related features of the examples [100*a*-*d*] of the lighting system.
Figure 119:
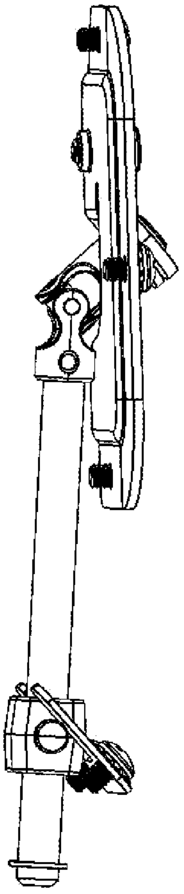

FIG. 119 on sheet 118 of the drawings is a screenshot of Universal Joint-related features of the examples [100*a*-*d*] of the lighting system.

Figure 120:
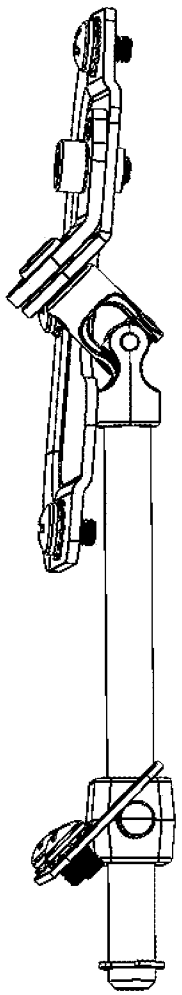

FIG. 120 on sheet 118 of the drawings is a screenshot of Universal Joint-related features of the examples [100*a*-*d*] of the lighting system.

Figure 121:
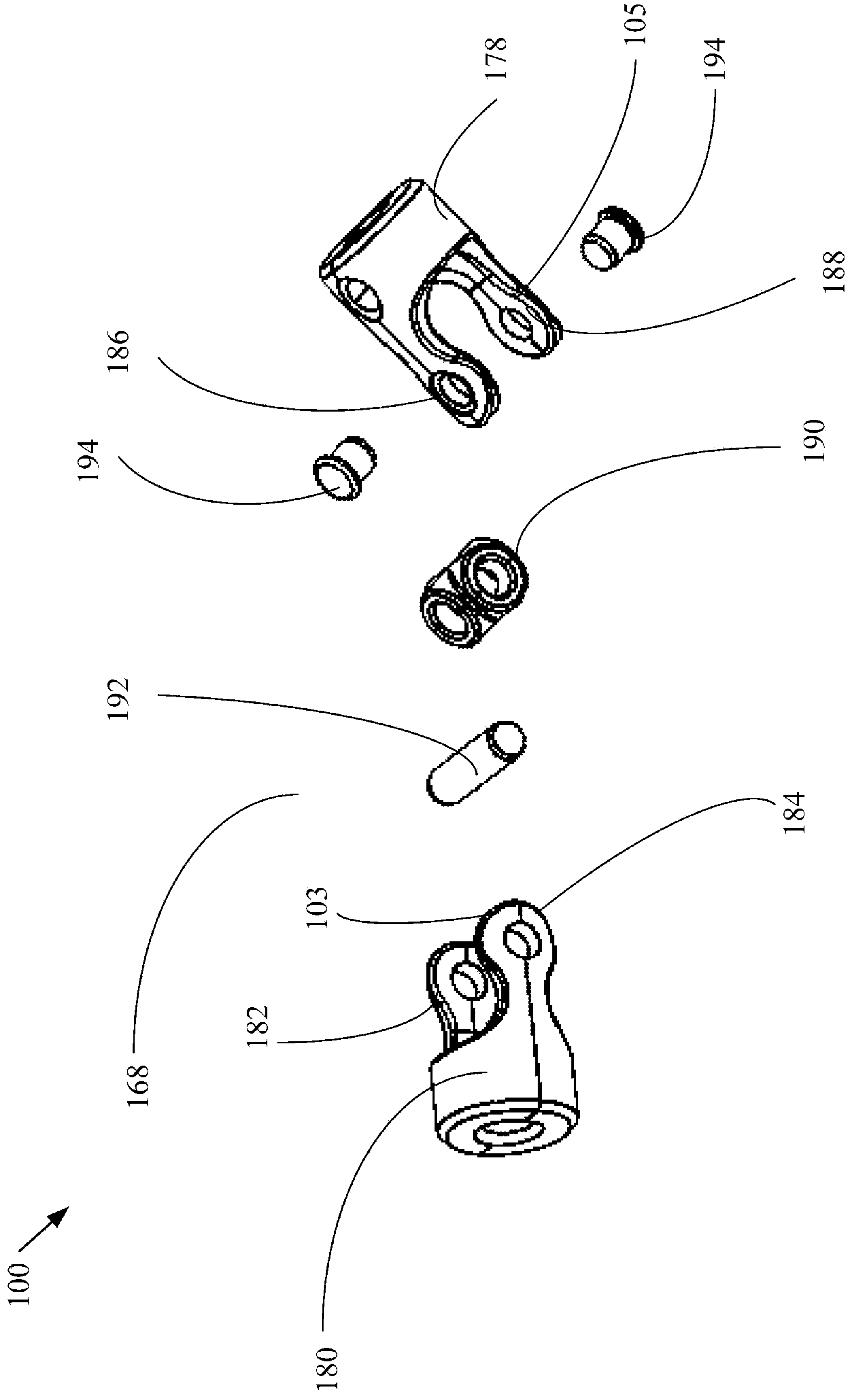

FIG. 121 on sheet 119 of the drawings is a screenshot of Universal Joint-related features of the examples [100*a*-*d*] of the lighting system.

Figure 122:
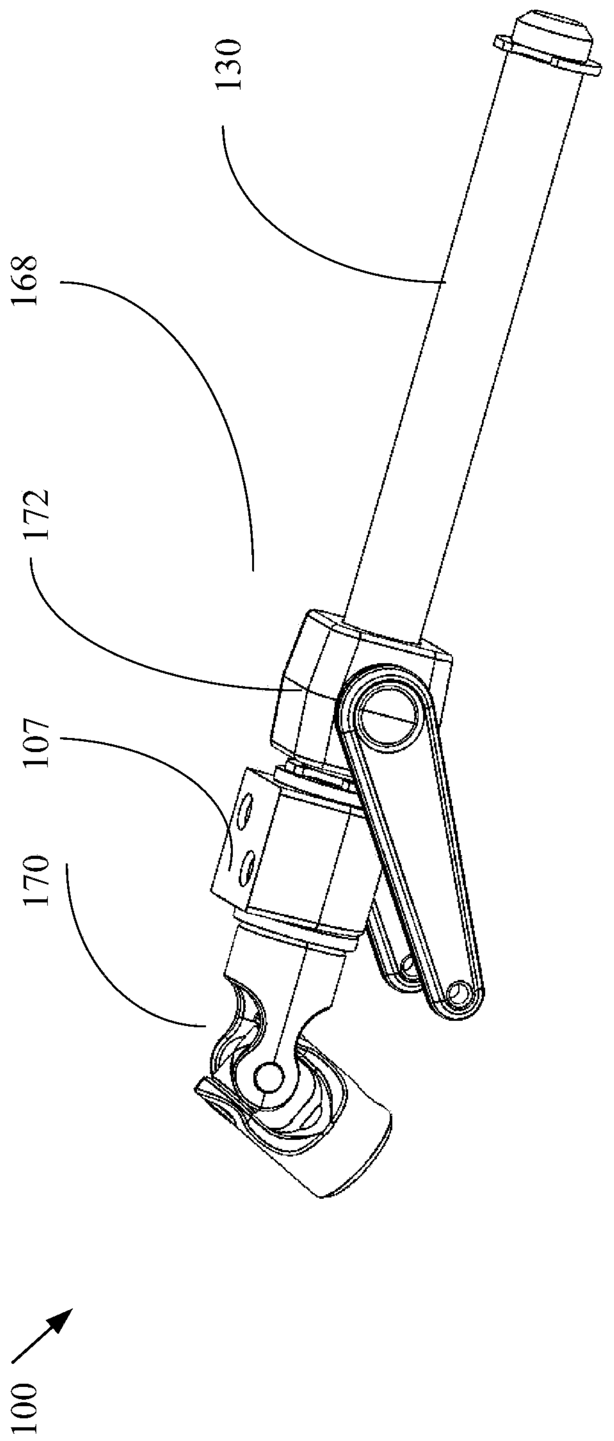

FIG. 122 on sheet 120 of the drawings is a screenshot of Universal Joint-related features of the examples [100*a*-*d*] of the lighting system.

Figure 123:
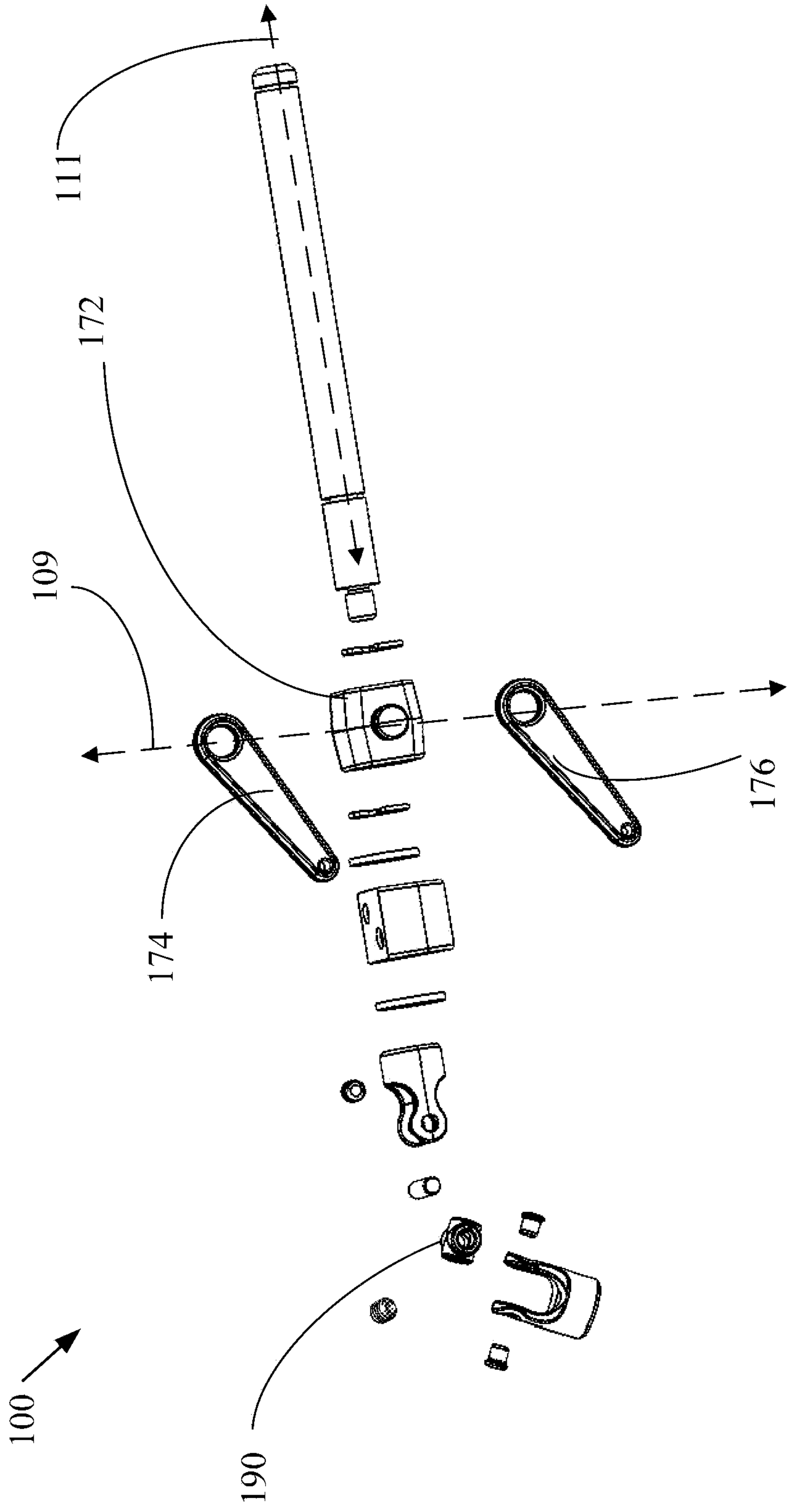

FIG. 123 on sheet 121 of the drawings is a screenshot of Universal Joint-related features of the examples [100*a*-*d*] of the lighting system.

Figure 124:
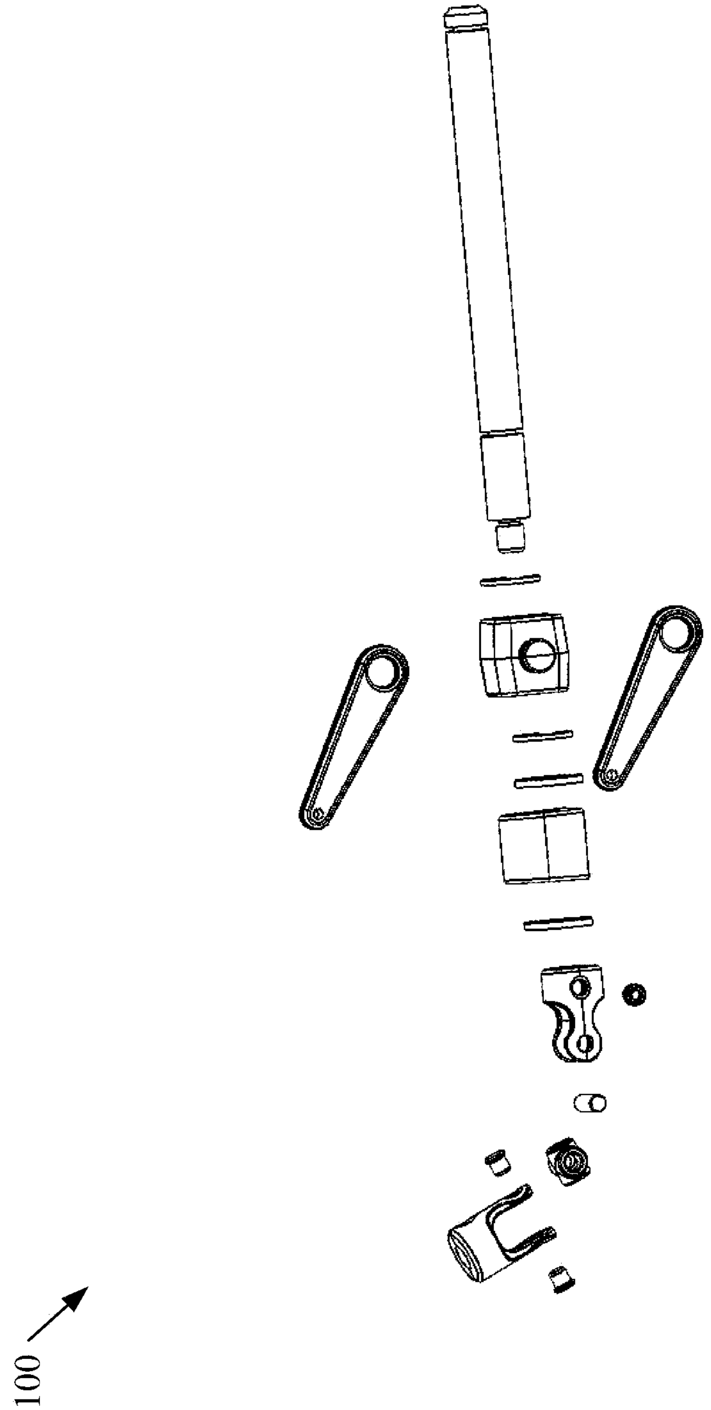

FIG. 124 on sheet 122 of the drawings is a screenshot of Universal Joint-related features of the examples [100*a*-*d*] of the lighting system.

Figure 125:
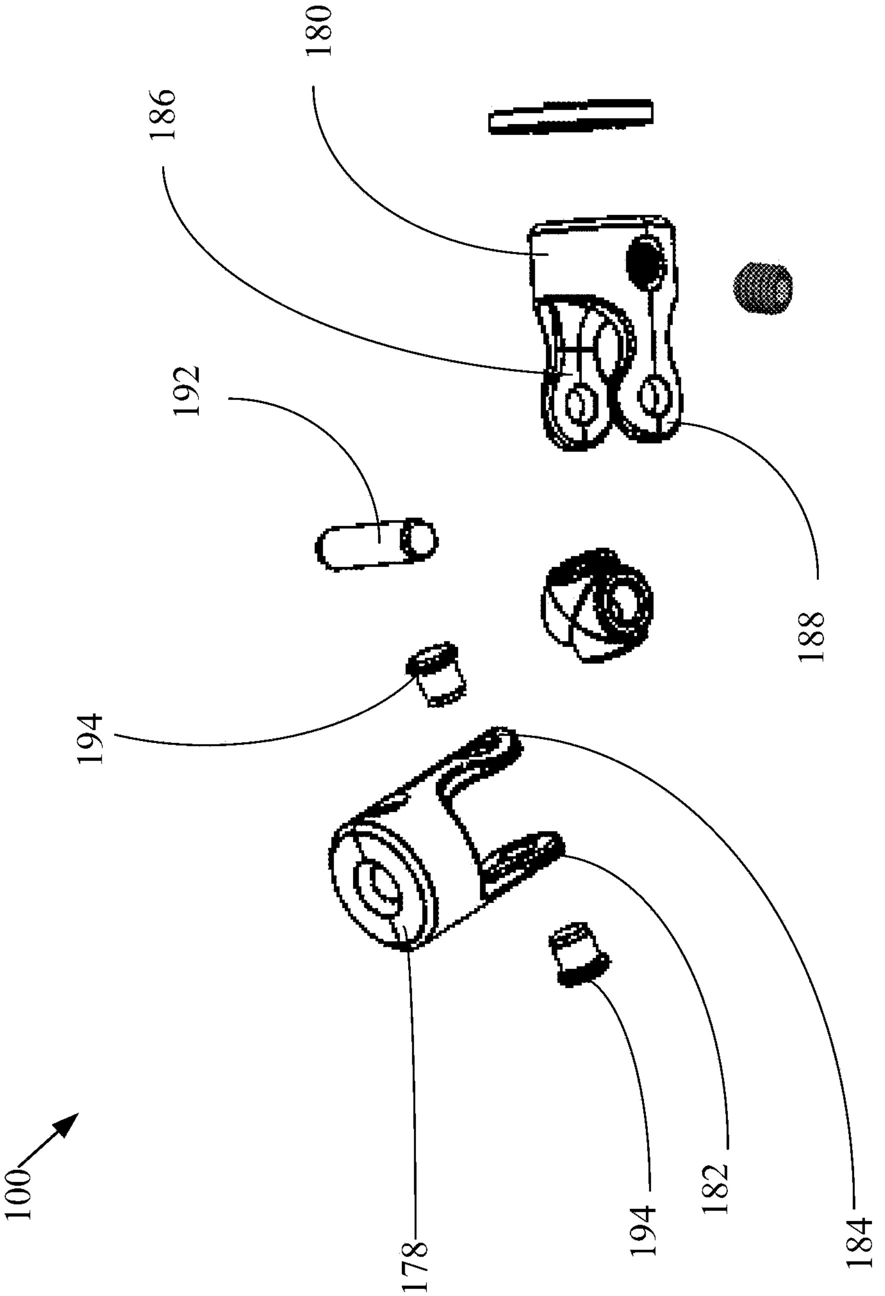

FIG. 125 on sheet 123 of the drawings is a screenshot of Universal Joint-related features of the examples [100*a*-*d*] of the lighting system.

Figure 126:
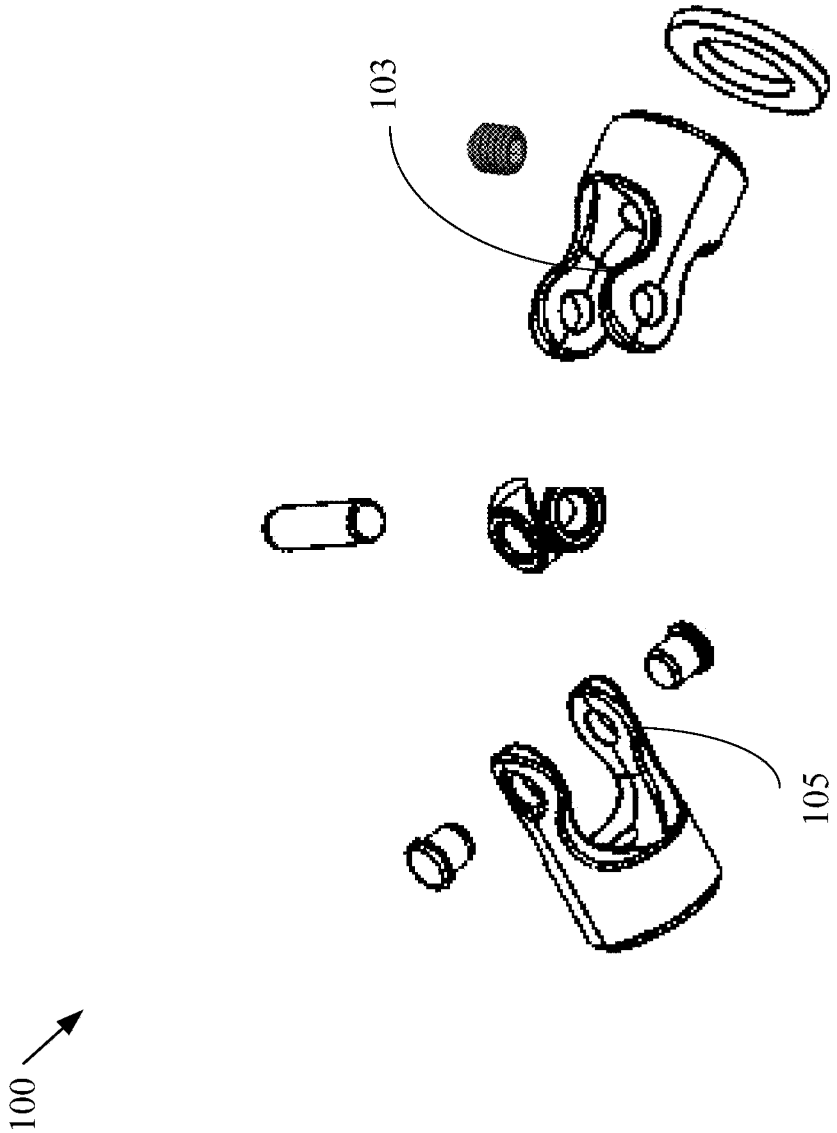

FIG. 126 on sheet 124 of the drawings is a screenshot of Universal Joint-related features of the examples [100*a*-*d*] of the lighting system.

Figure 127:
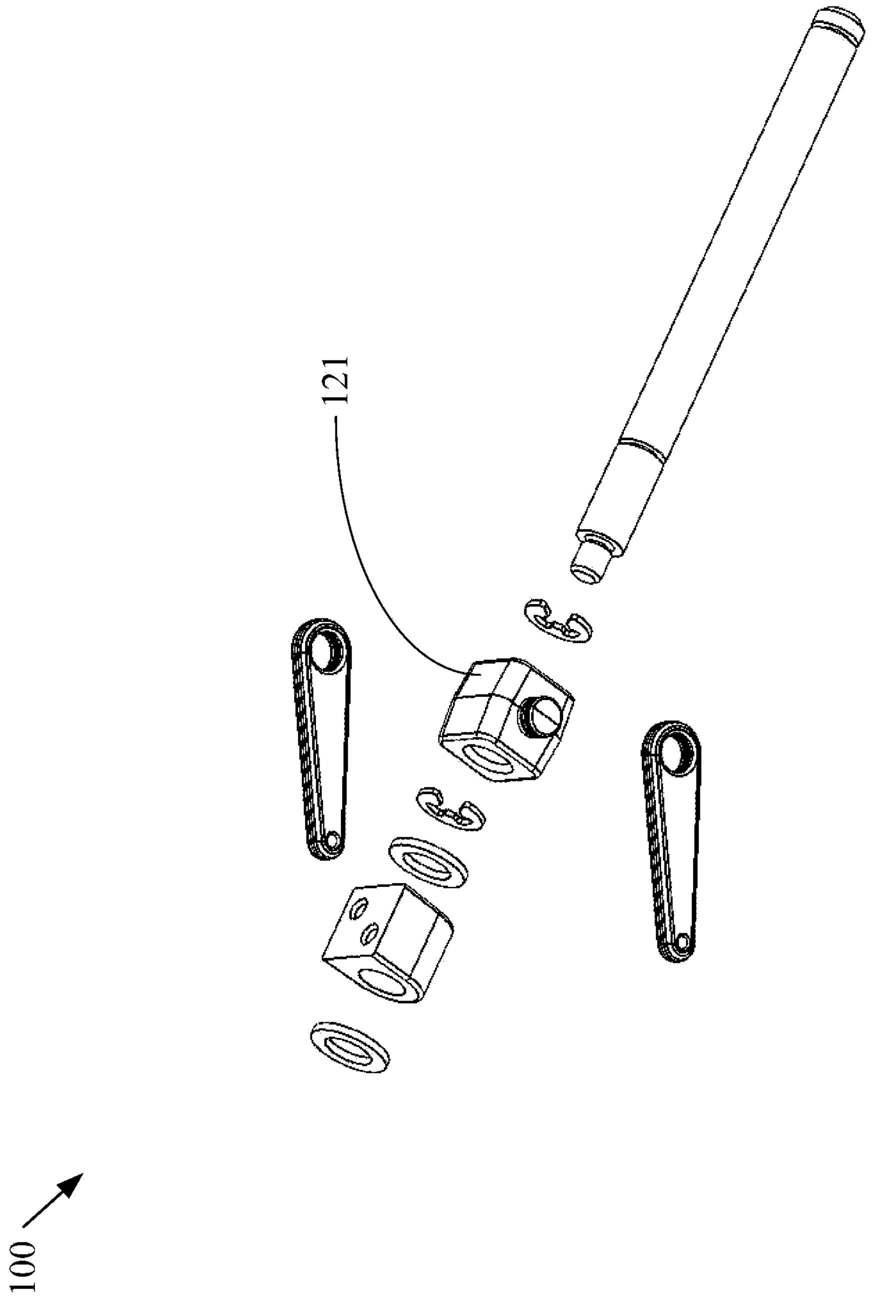

FIG. 127 on sheet 125 of the drawings is a screenshot of Universal Joint-related features of the examples [100*a*-*d*] of the lighting system.

Figure 128:
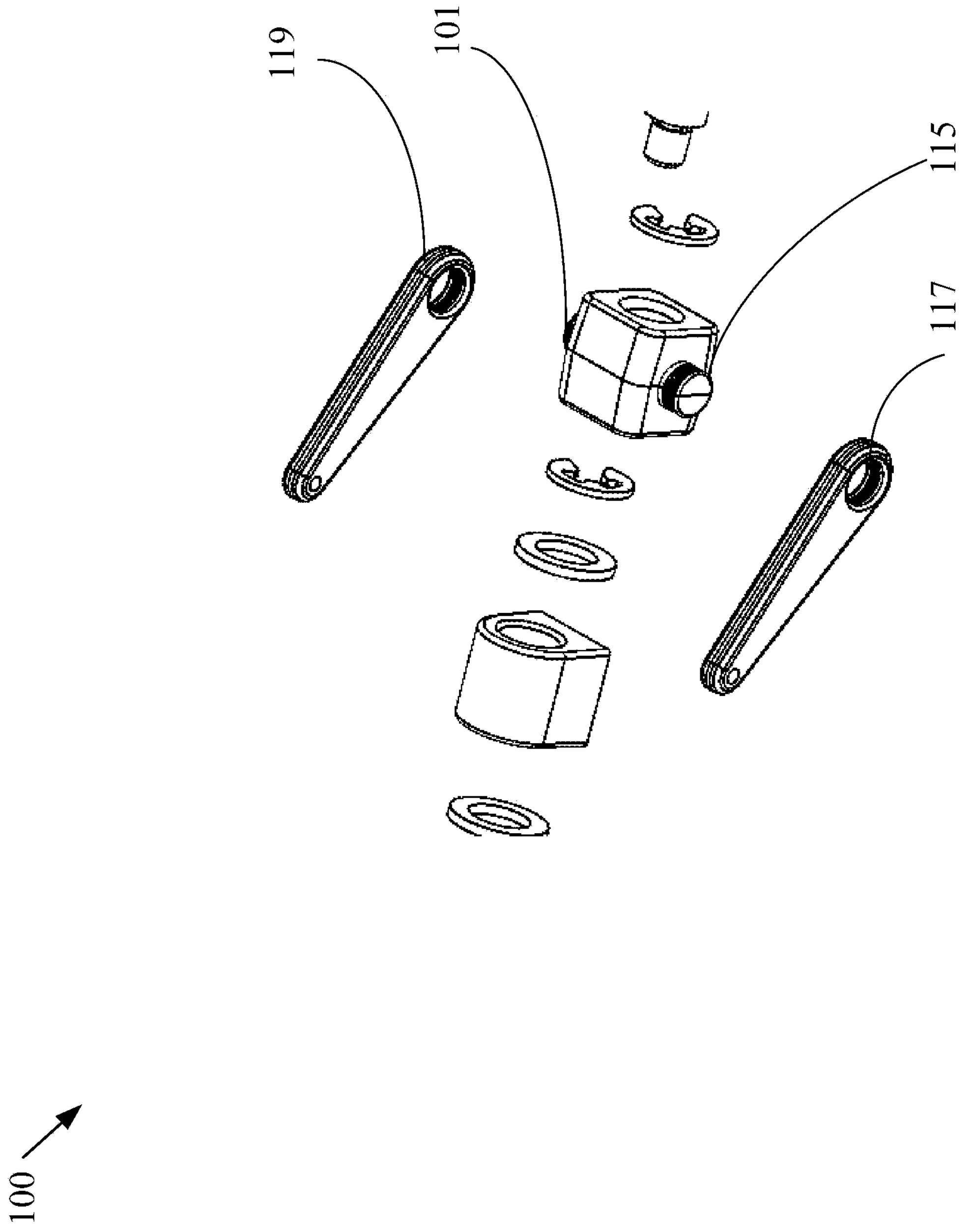

FIG. 128 on sheet 126 of the drawings is a screenshot of Universal Joint-related features of the examples [100*a*-*d*] of the lighting system.

Figure 129:
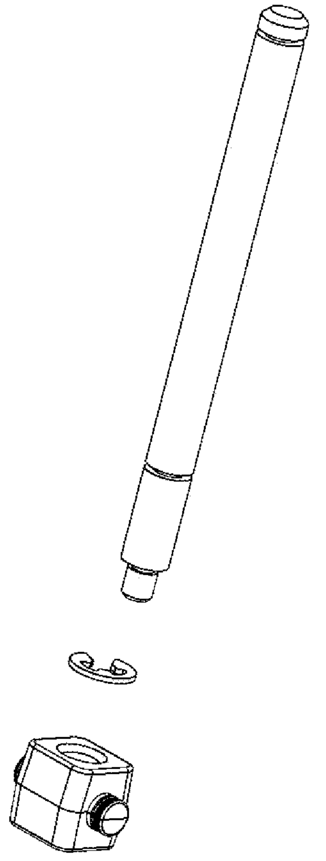

FIG. 129 on sheet 127 of the drawings is a screenshot of Universal Joint-related features of the examples [100*a*-*d*] of the lighting system.

Figure 130:
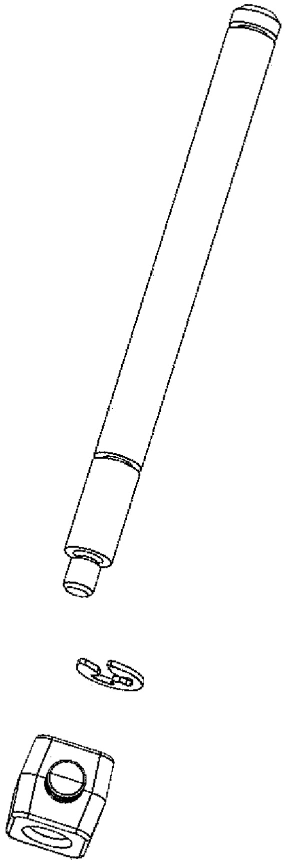

FIG. 130 on sheet 127 of the drawings is a screenshot of Universal Joint-related features of the examples [100*a*-*d*] of the lighting system.

Figure 131:
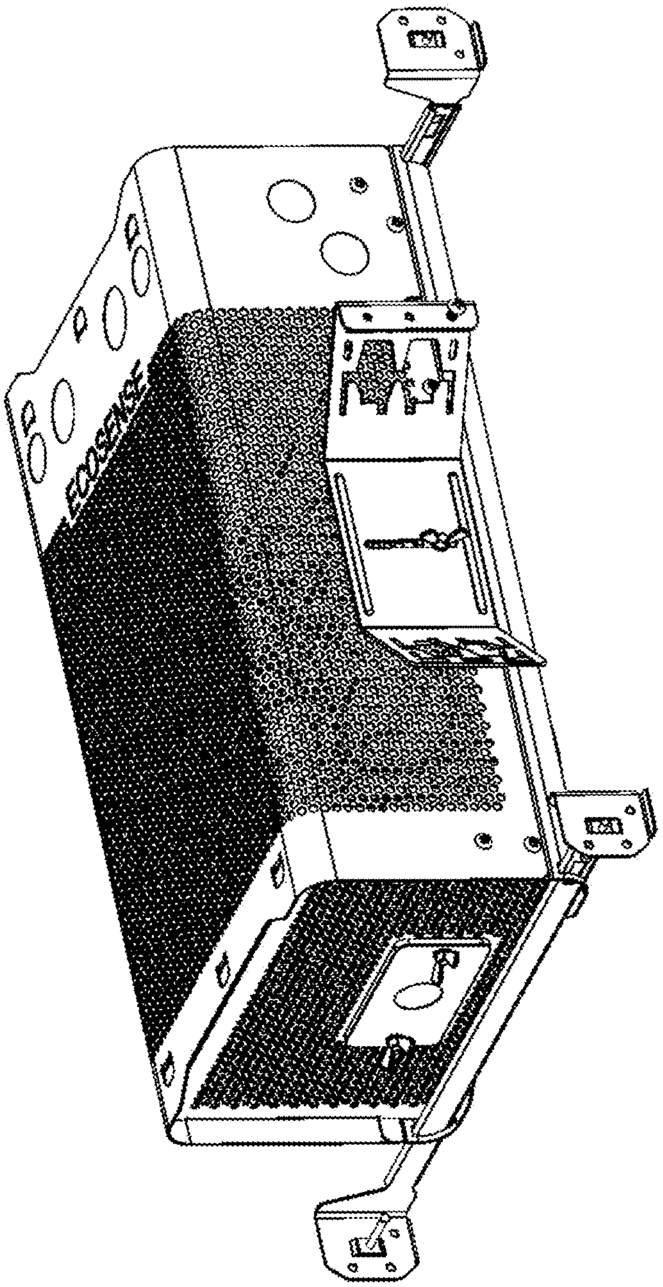

FIG. 131 on sheet 128 of the drawings is a screenshot of Z-Adjustment-related features of the examples [100*a*-*d*] of the lighting system.

Figure 132:
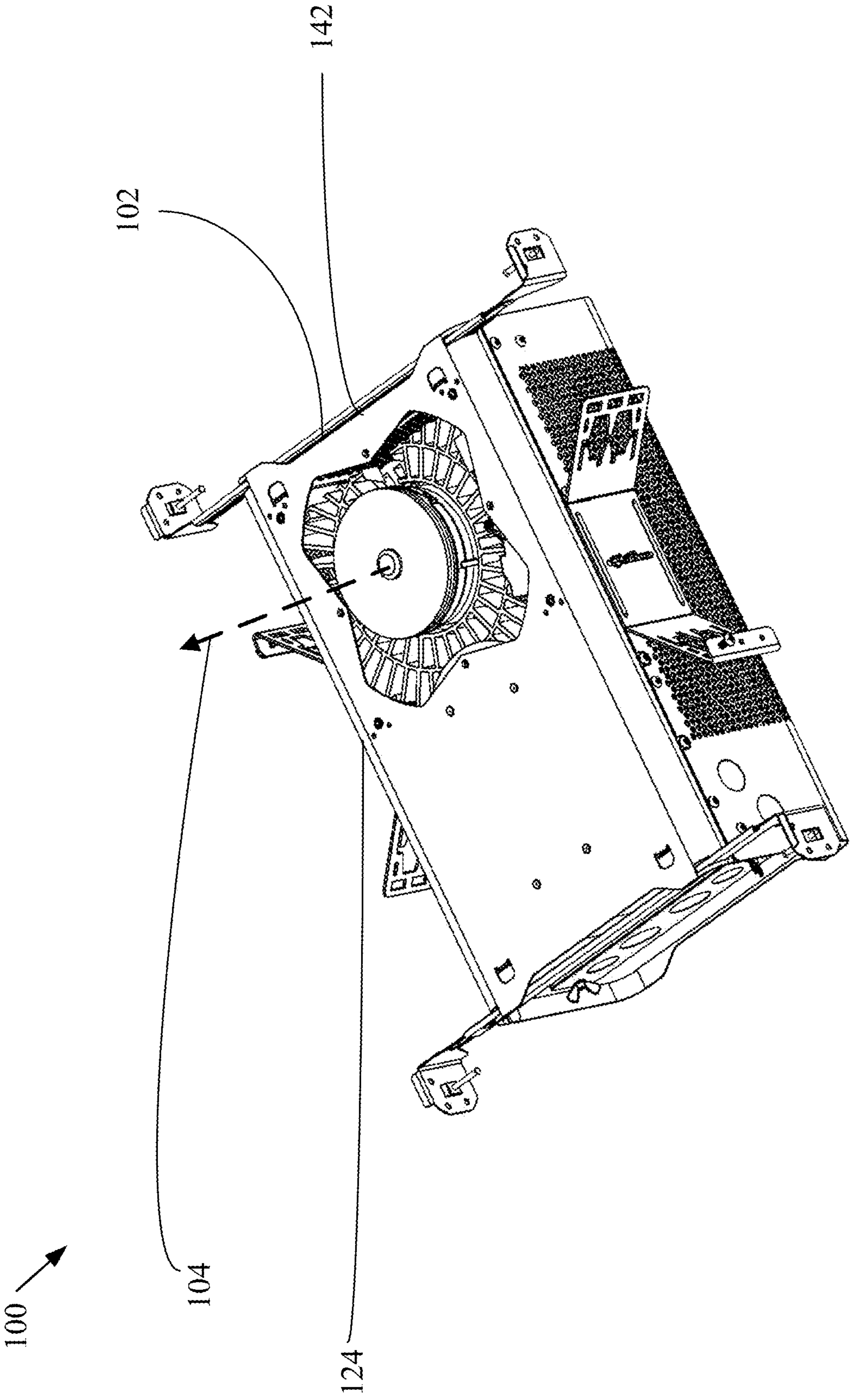

FIG. 132 on sheet 129 of the drawings is a screenshot of Z-Adjustment-related features of the examples [100*a*-*d*] of the lighting system.

Figure 133:
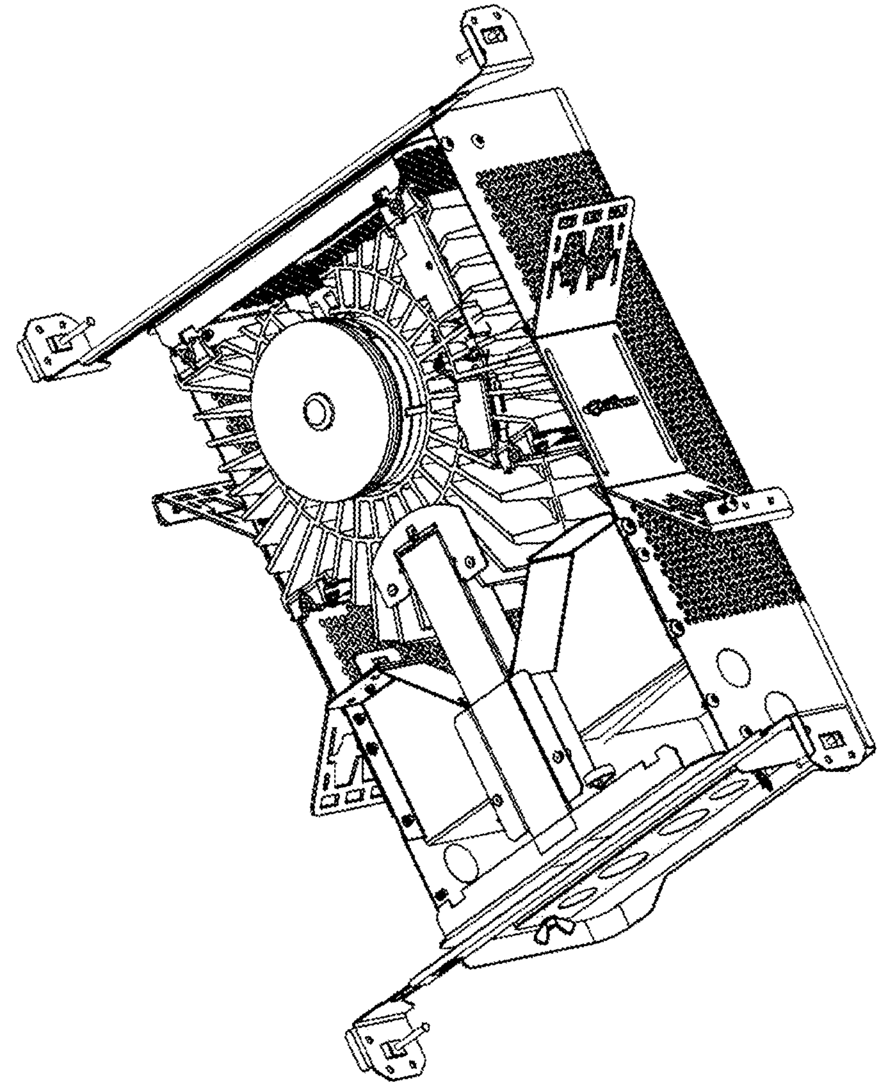

FIG. 133 on sheet 130 of the drawings is a screenshot of Z-Adjustment-related features of the examples [100*a*-*d*] of the lighting system.

Figure 134:
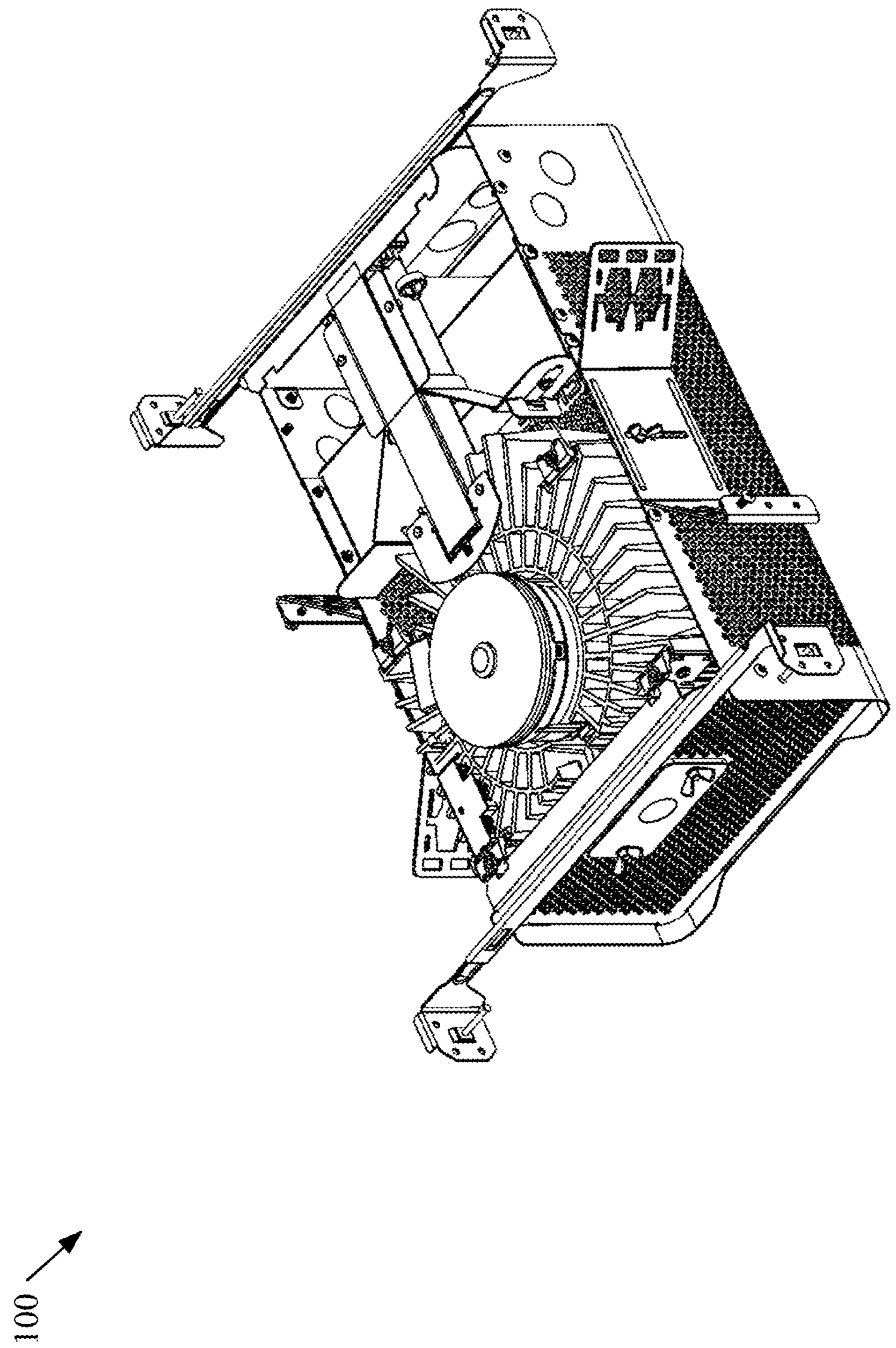

FIG. 134 on sheet 131 of the drawings is a screenshot of Z-Adjustment-related features of the examples [100*a*-*d*] of the lighting system.

Figure 135:
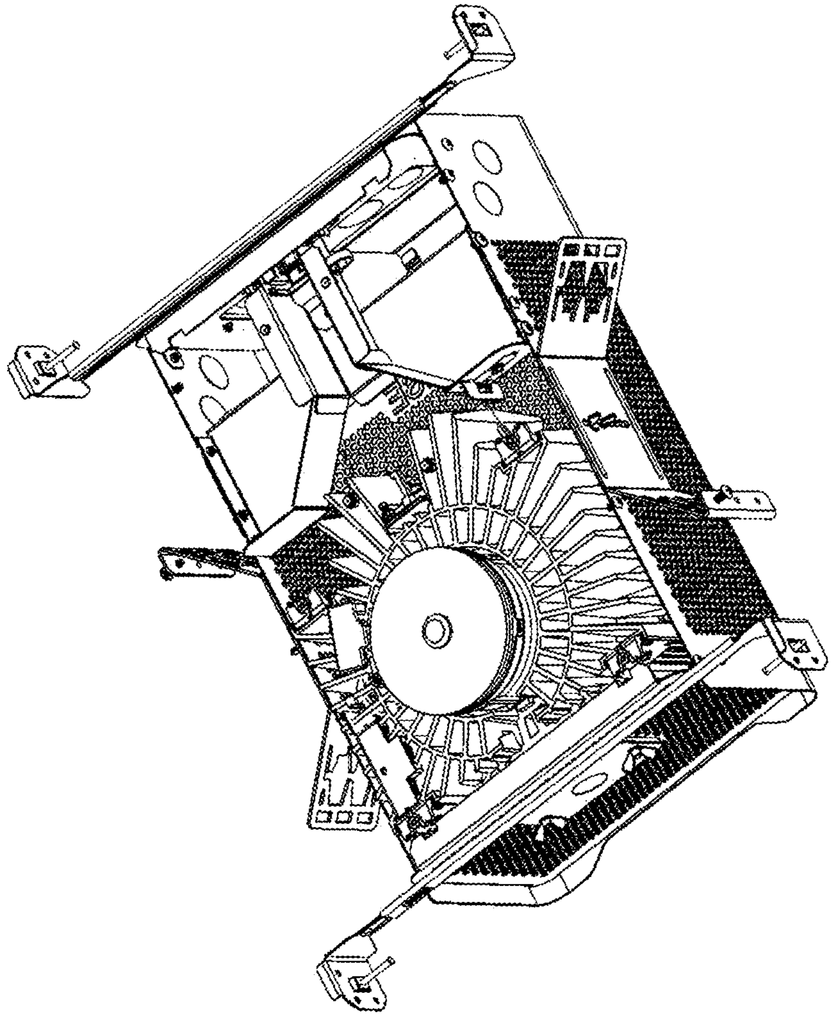

FIG. 135 on sheet 132 of the drawings is a screenshot of Z-Adjustment-related features of the examples [100*a*-*d*] of the lighting system.

Figure 136:
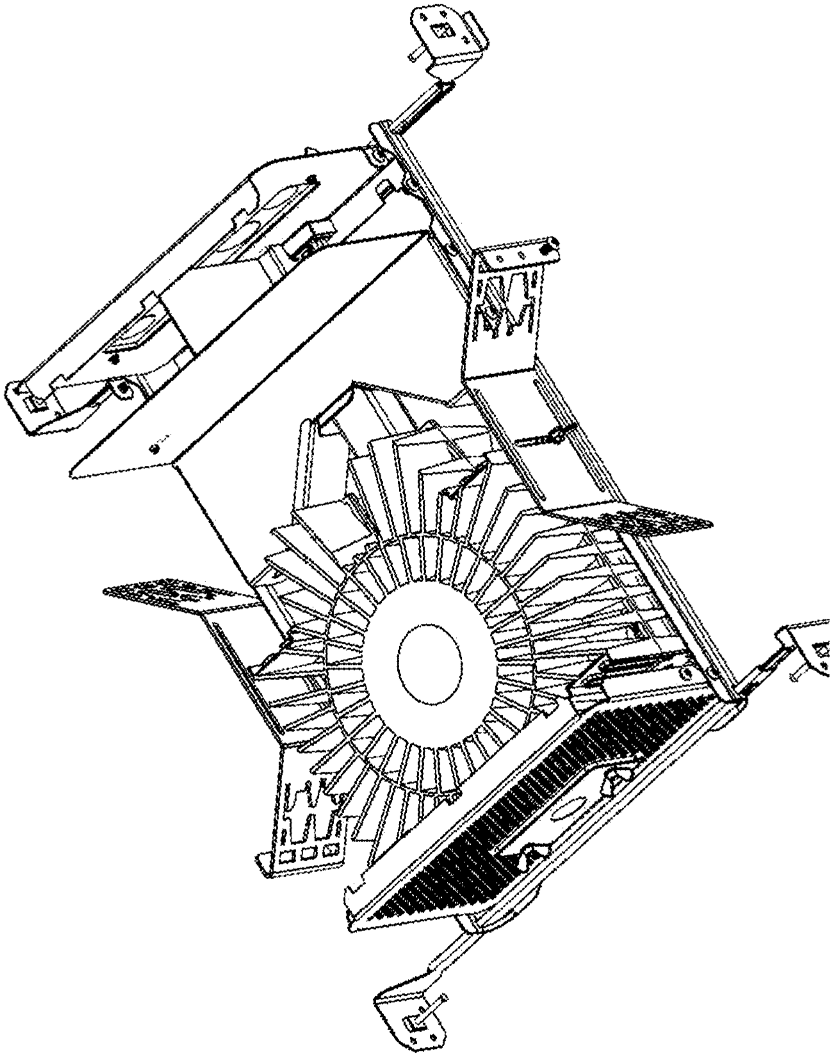

FIG. 136 on sheet 133 of the drawings is a screenshot of Z-Adjustment-related features of the examples [100*a-d*] of the lighting system.

Figure 137:
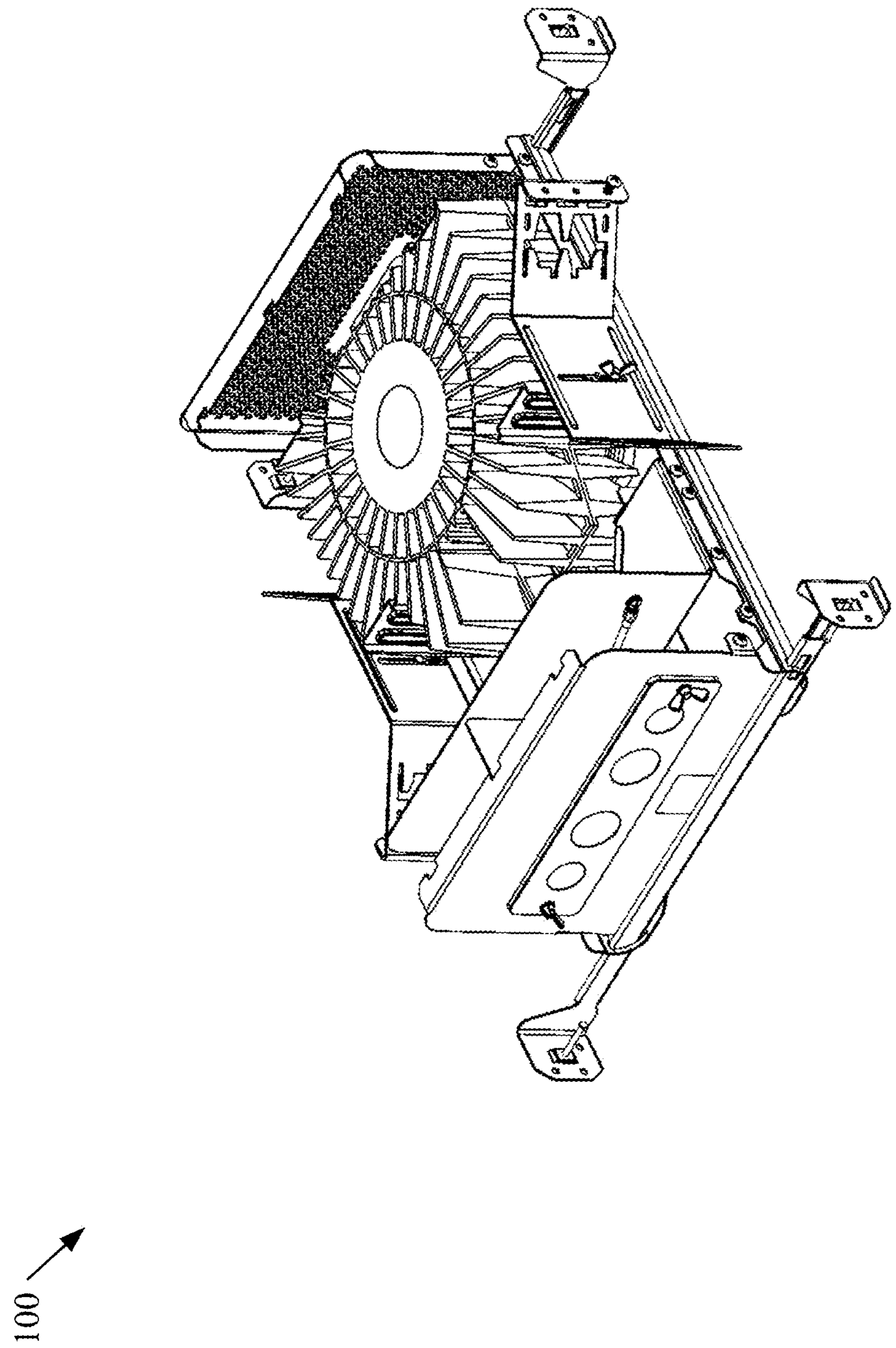

FIG. 137 on sheet 134 of the drawings is a screenshot of Z-Adjustment-related features of the examples [100*a-d*] of the lighting system.

Figure 138:
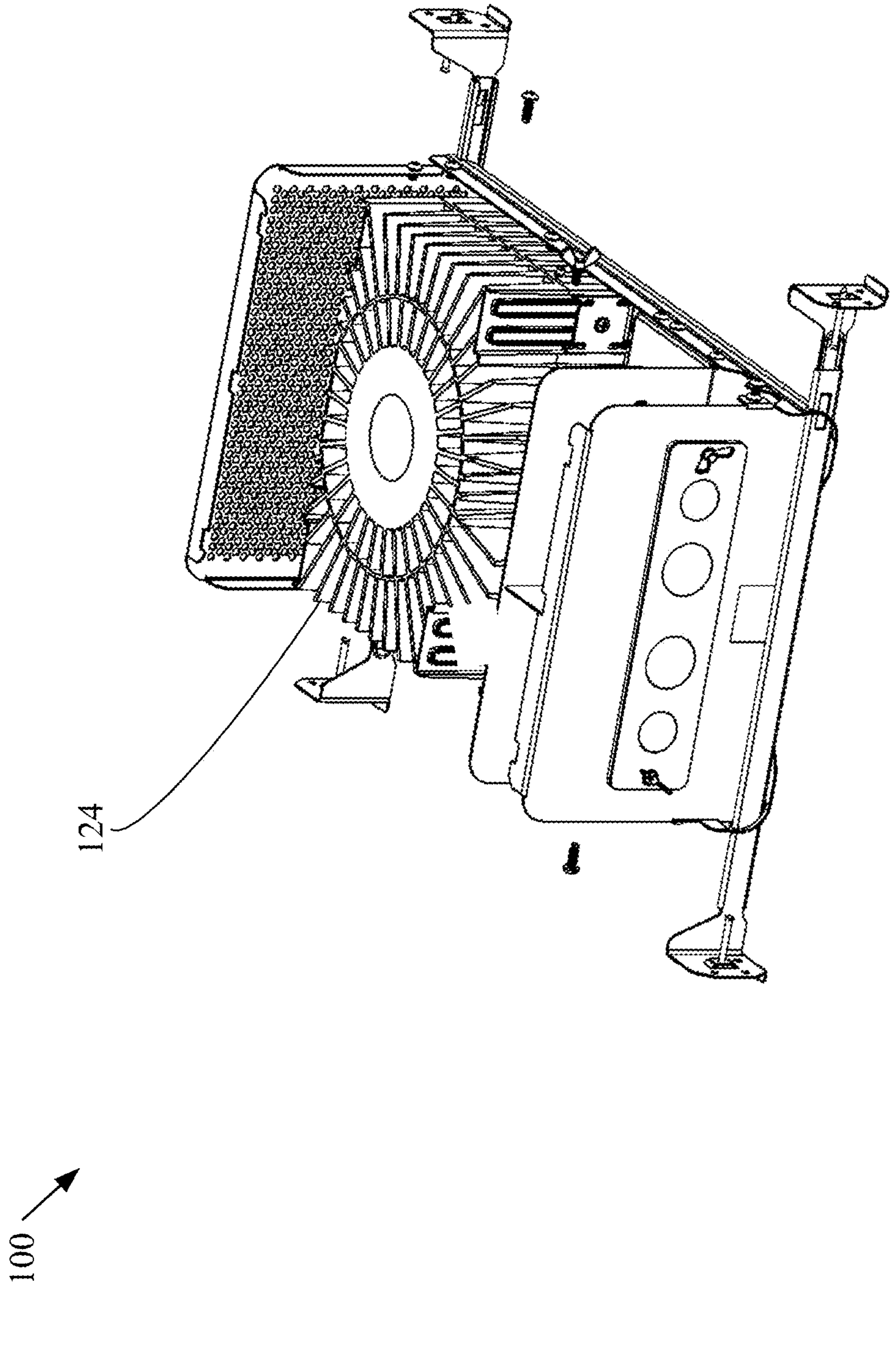

FIG. 138 on sheet 135 of the drawings is a screenshot of Z-Adjustment-related features of the examples [100*a-d*] of the lighting system.

Figure 139:
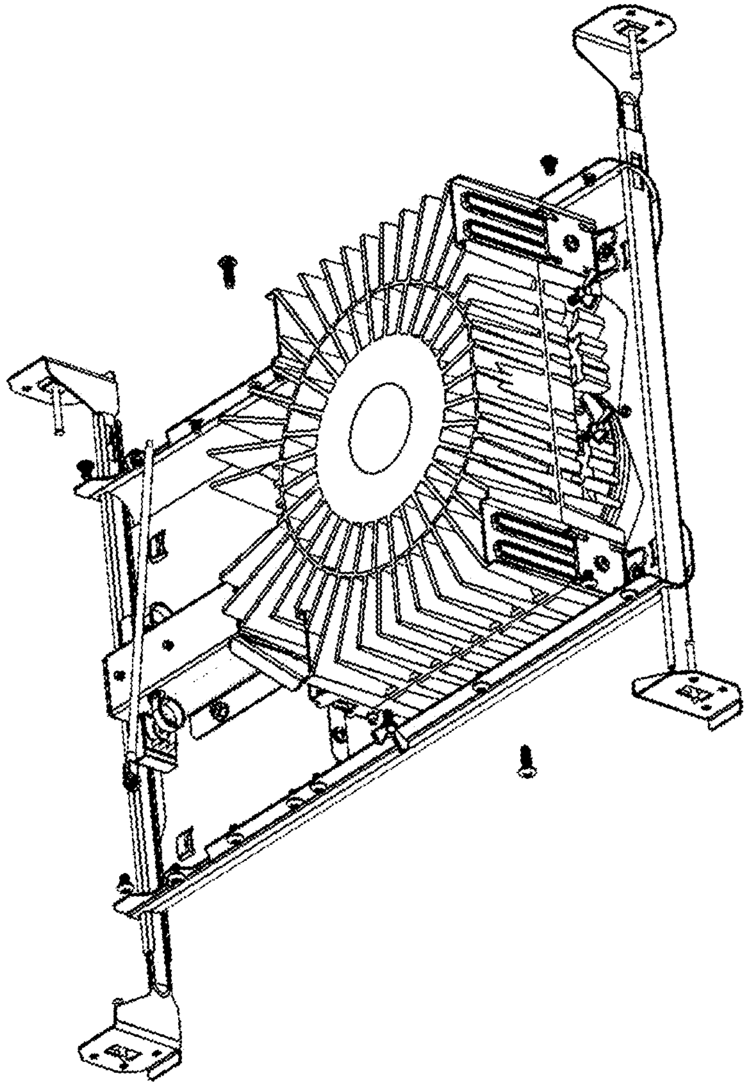

FIG. 139 on sheet 136 of the drawings is a screenshot of Z-Adjustment-related features of the examples [100*a-d*] of the lighting system.

Figure 140:
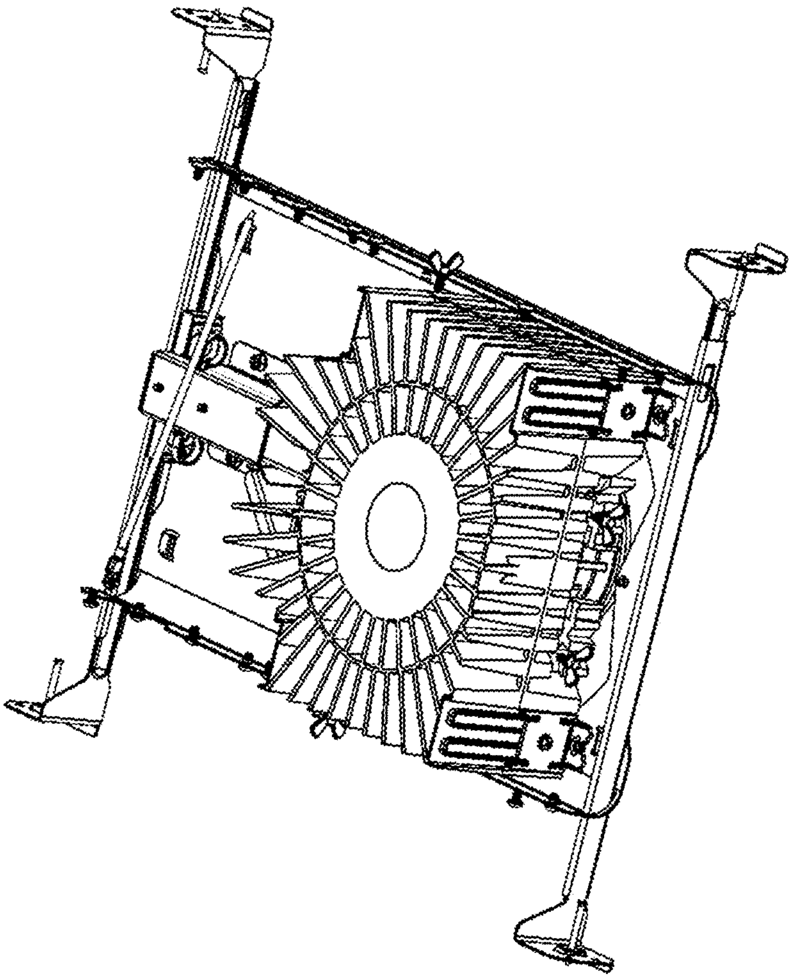

FIG. 140 on sheet 137 of the drawings is a screenshot of Z-Adjustment-related features of the examples [100*a-d*] of the lighting system.

Figure 141:
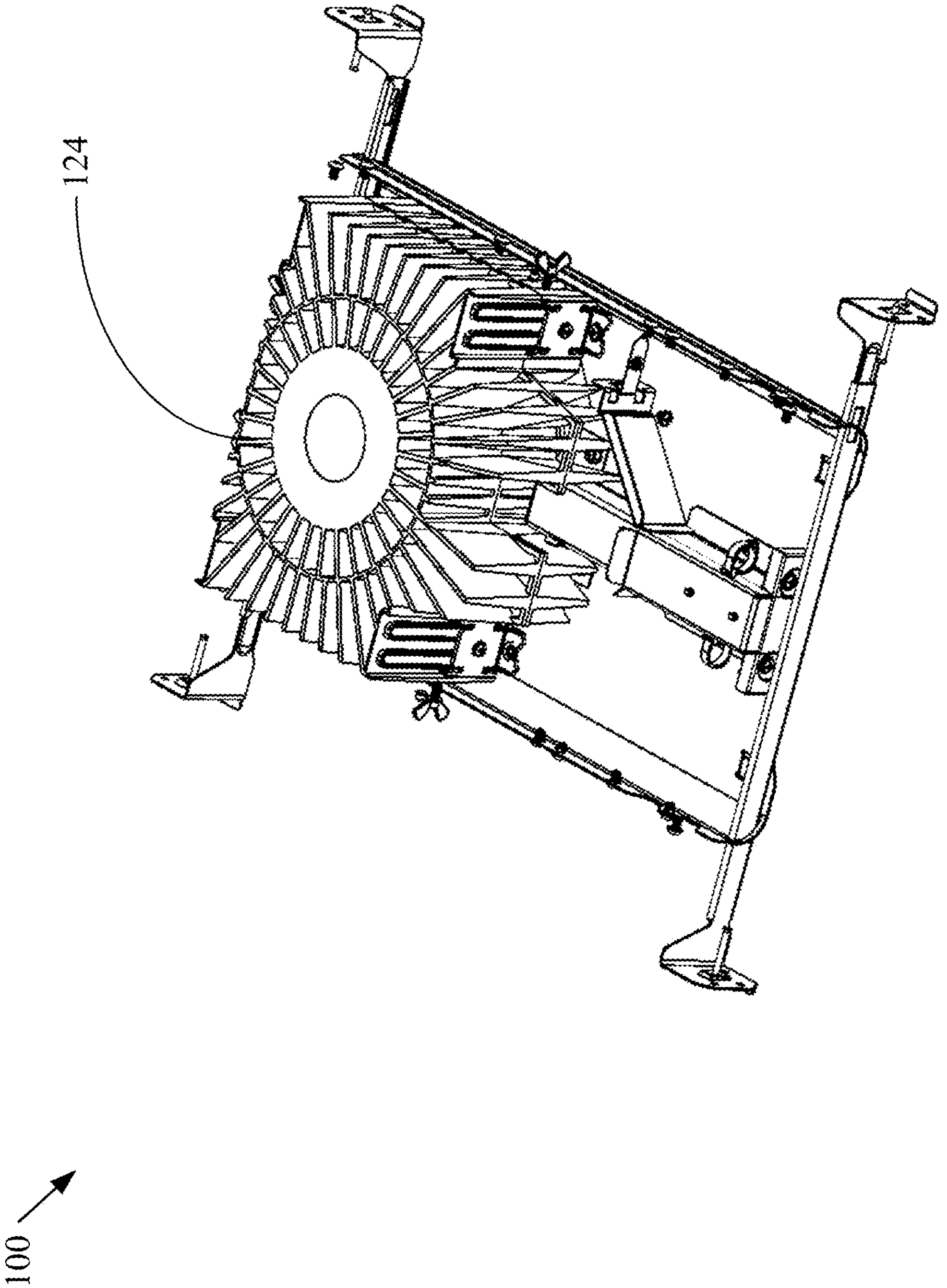

FIG. 141 on sheet 138 of the drawings is a screenshot of Z-Adjustment-related features of the examples [100*a-d*] of the lighting system.

Figure 142:
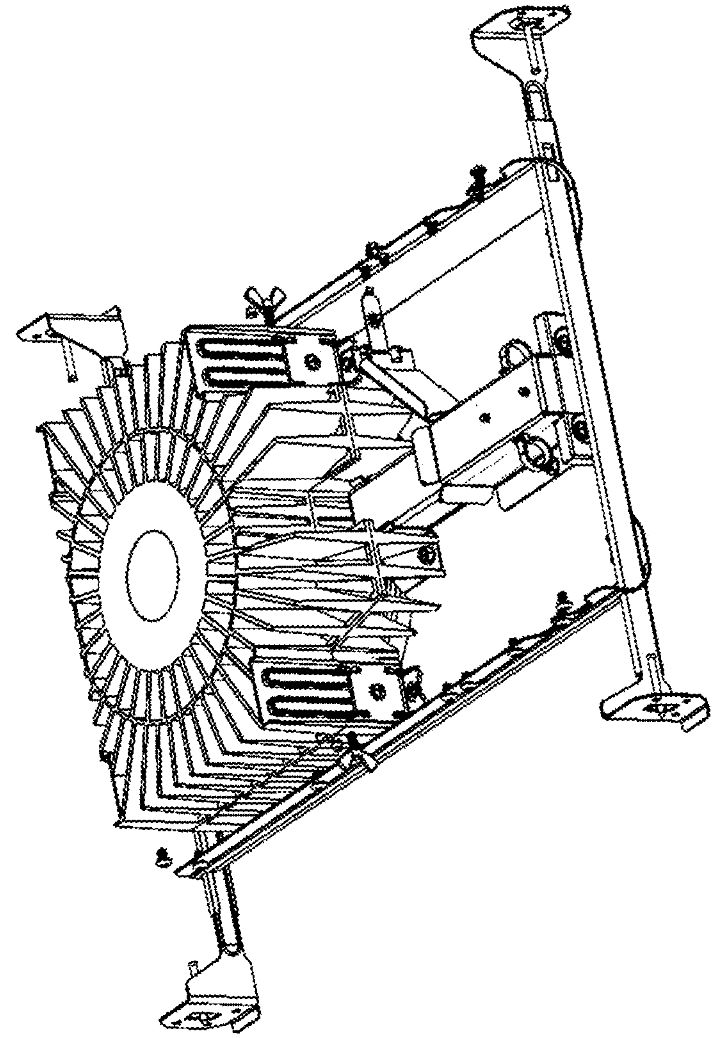

FIG. 142 on sheet 139 of the drawings is a screenshot of Z-Adjustment-related features of the examples [100*a-d*] of the lighting system.

Figure 143:
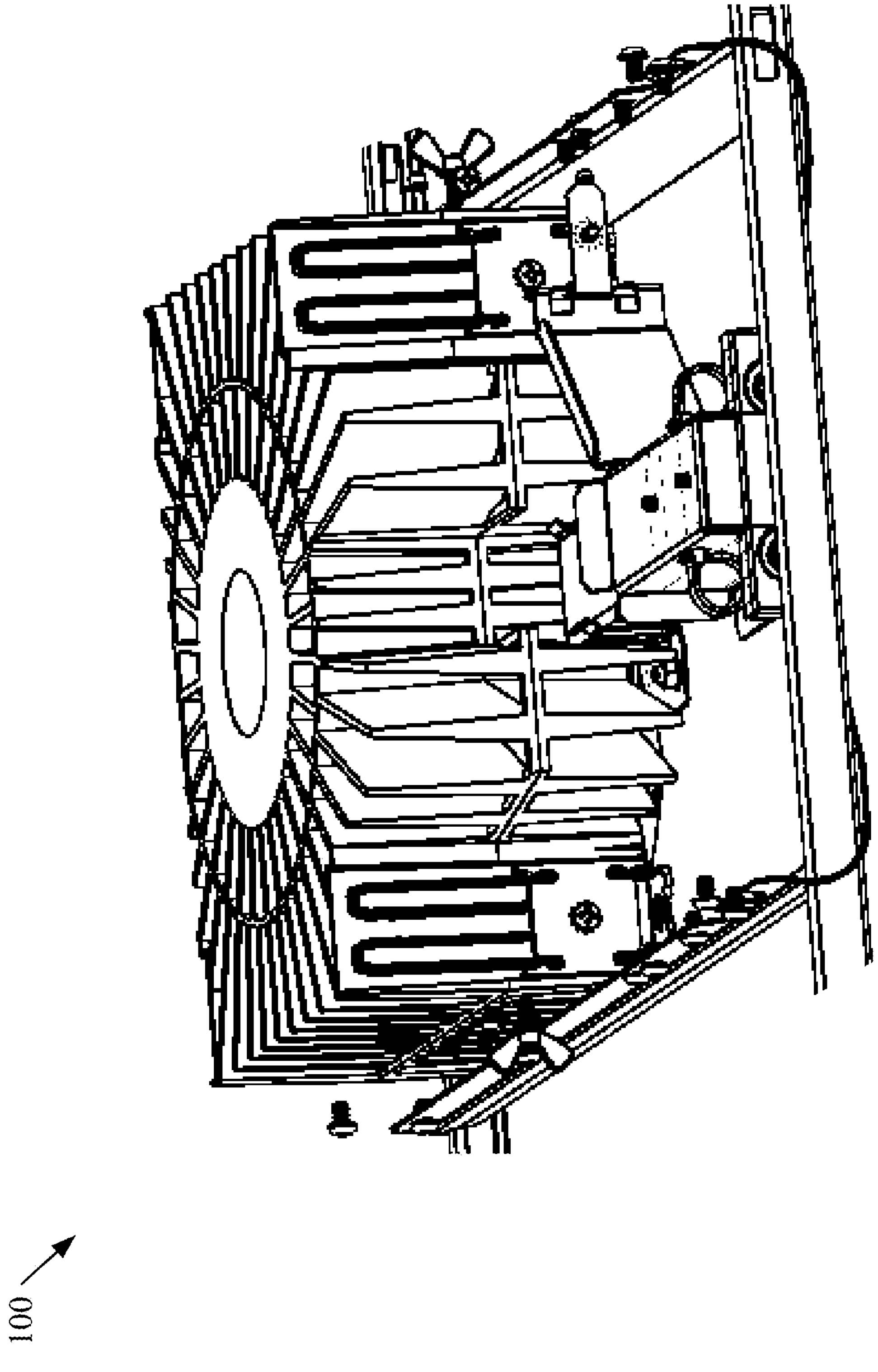

FIG. 143 on sheet 140 of the drawings is a screenshot of Z-Adjustment-related features of the examples [100*a-d*] of the lighting system.

Figure 144:
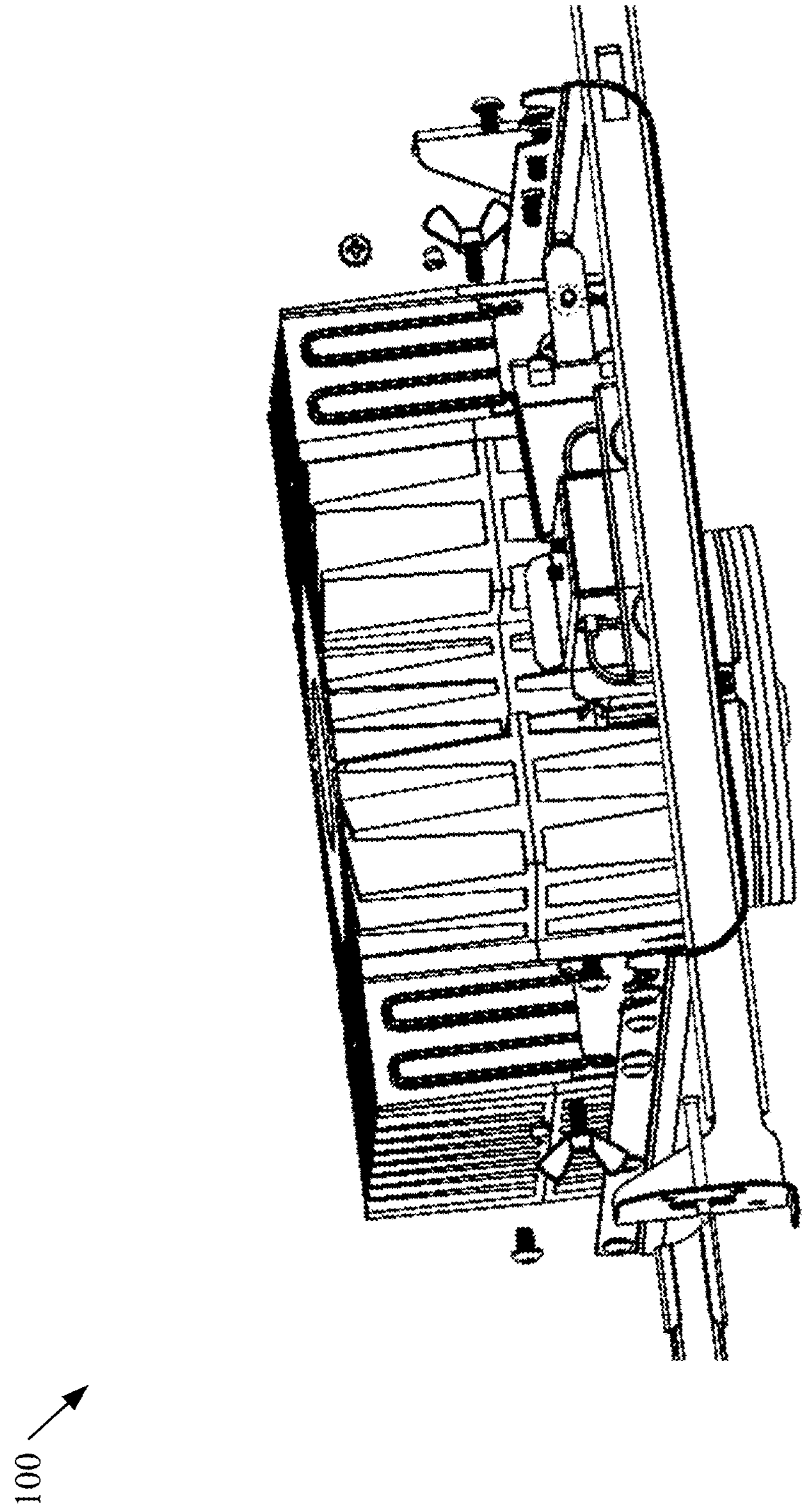

FIG. 144 on sheet 141 of the drawings is a screenshot of Z-Adjustment-related features of the examples [100*a-d*] of the lighting system.

Figure 145:
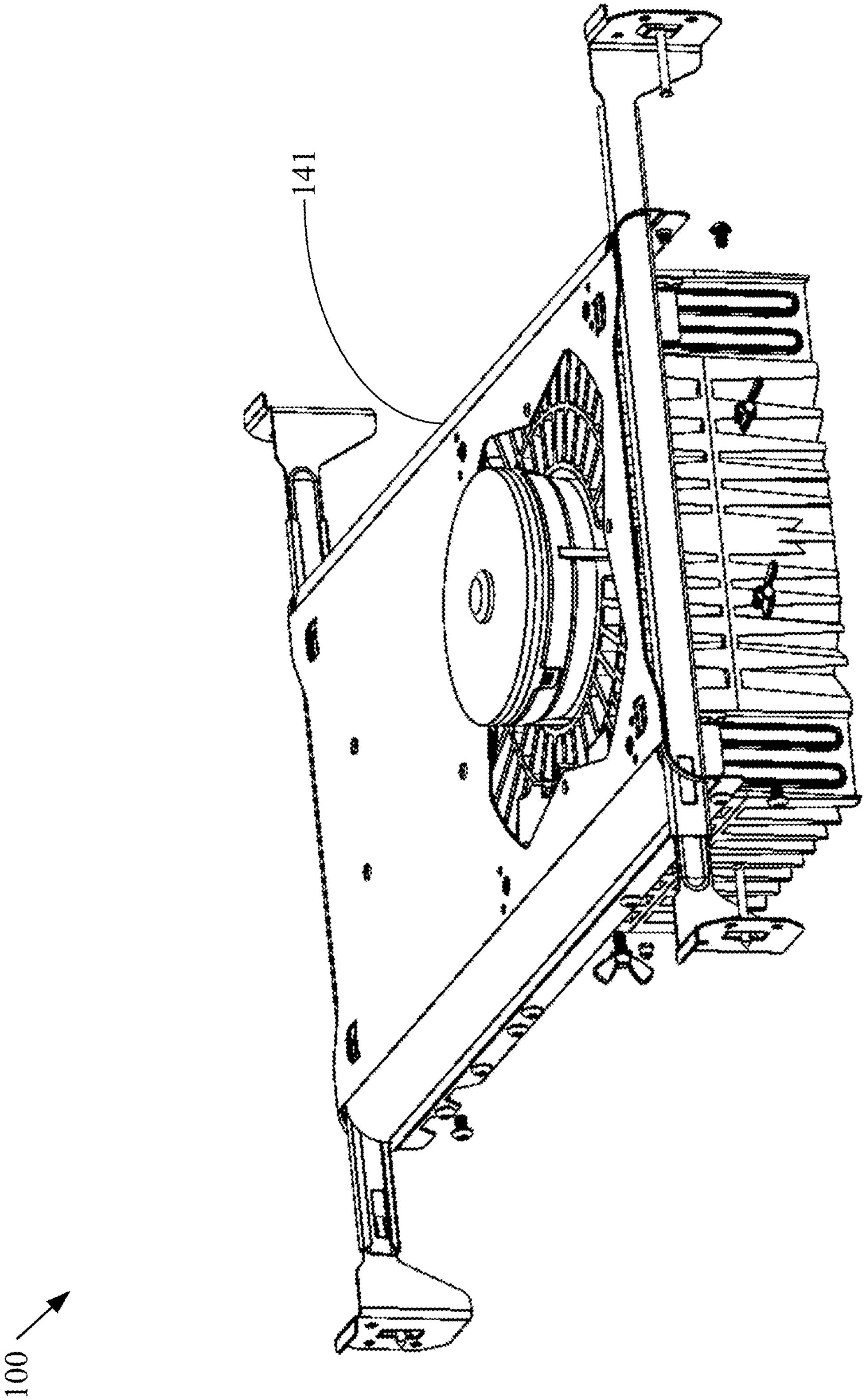

FIG. 145 on sheet 142 of the drawings is a screenshot of Z-Adjustment-related features of the examples [100*a-d*] of the lighting system.

Figure 146:
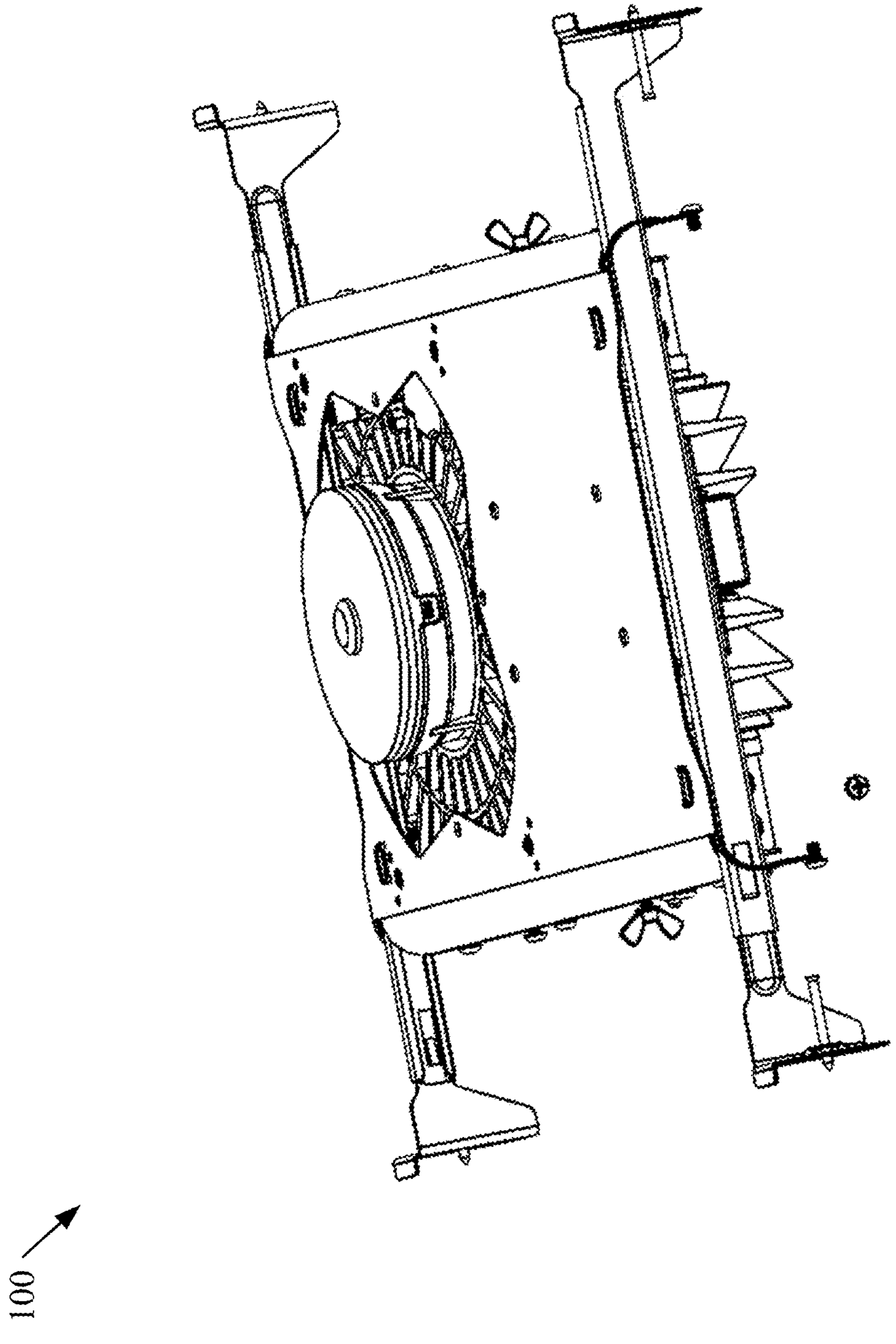

FIG. 146 on sheet 143 of the drawings is a screenshot of Z-Adjustment-related features of the examples [100*a-d*] of the lighting system.

Figure 147:
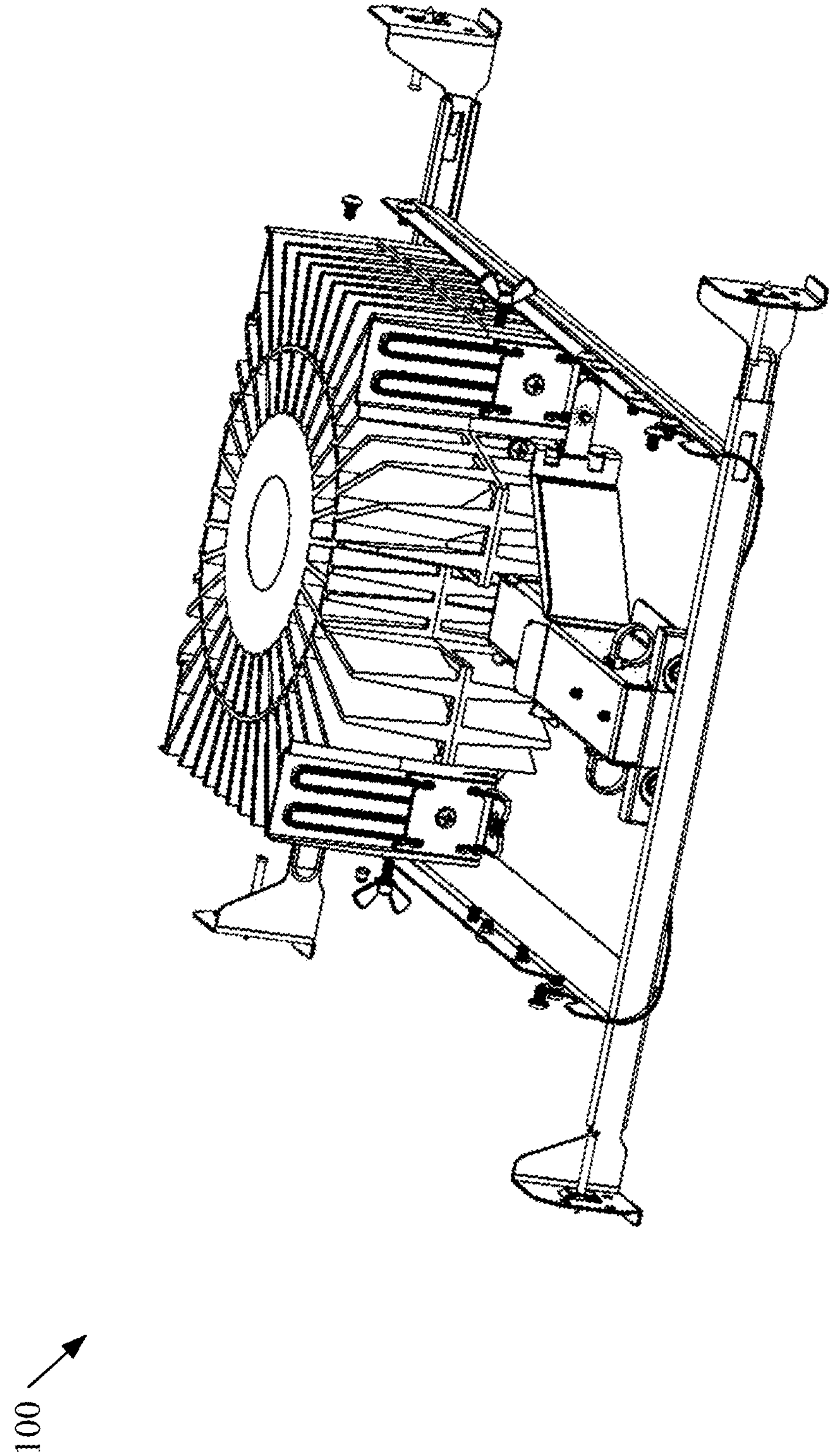

FIG. 147 on sheet 144 of the drawings is a screenshot of Z-Adjustment-related features of the examples [100*a-d*] of the lighting system.

Figure 148:
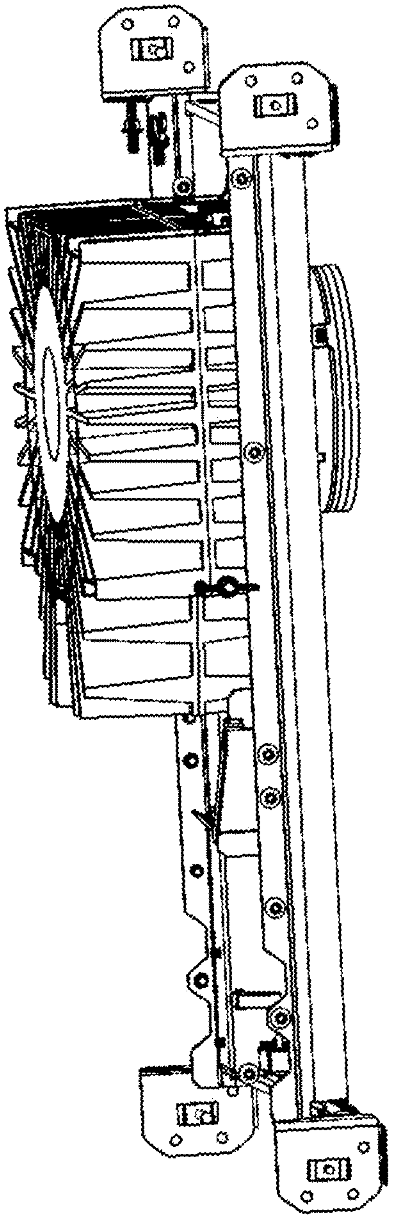

FIG. 148 on sheet 145 of the drawings is a screenshot of Z-Adjustment-related features of the examples [100*a-d*] of the lighting system.

Figure 149:
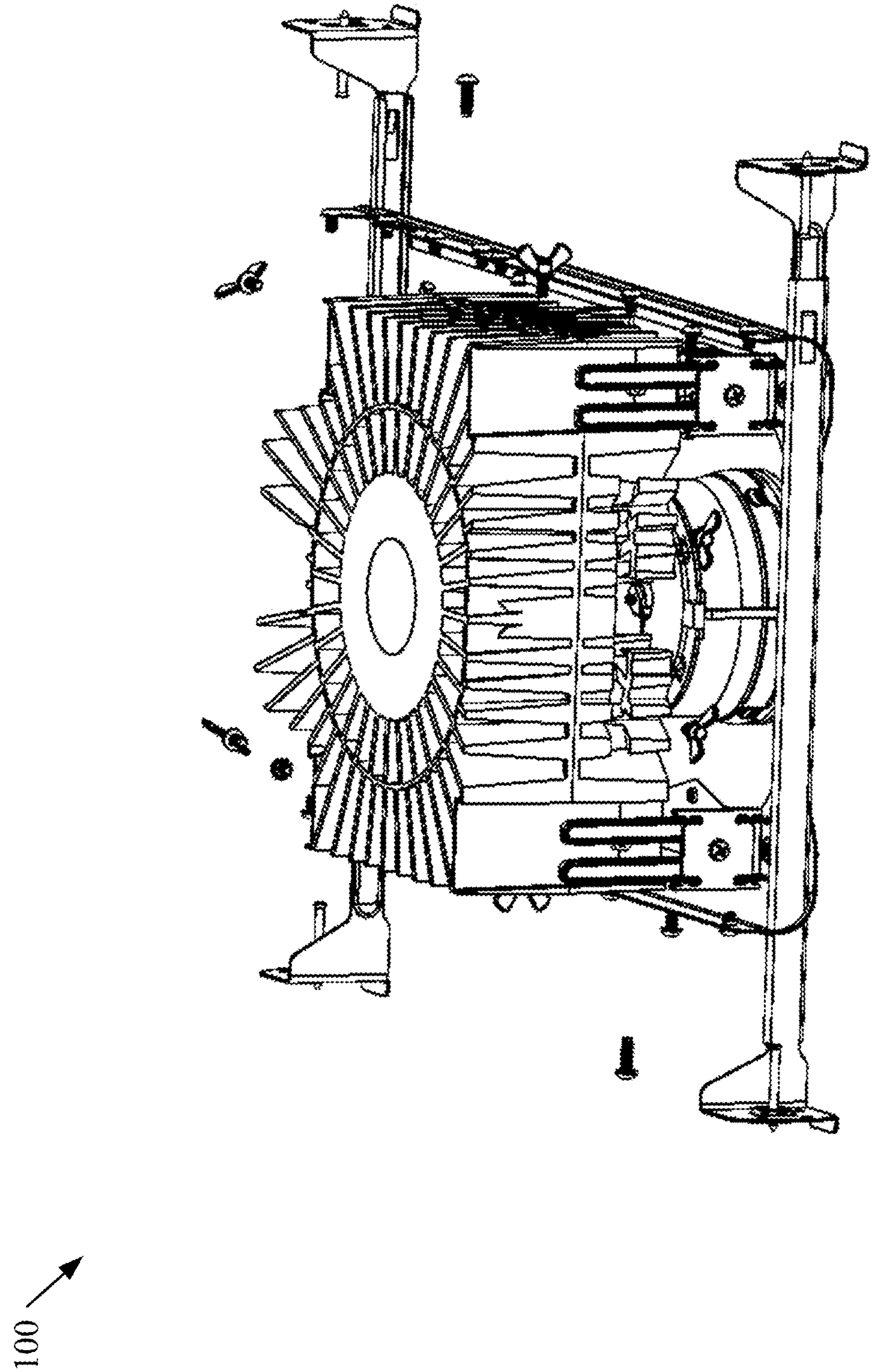

FIG. 149 on sheet 146 of the drawings is a screenshot of Z-Adjustment-related features of the examples [100*a-d*] of the lighting system.

Figure 150:
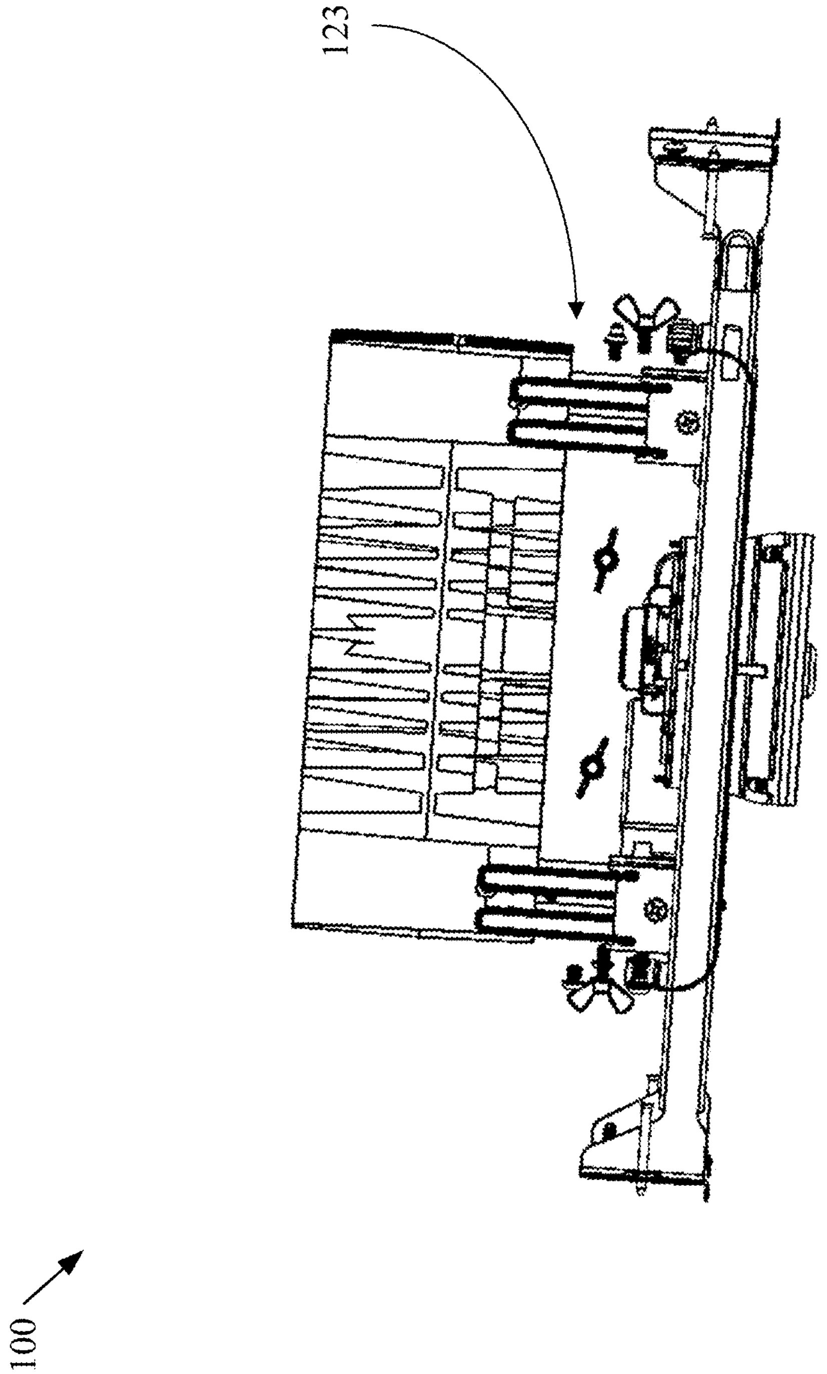

FIG. 150 on sheet 147 of the drawings is a screenshot of Z-Adjustment-related features of the examples [100*a-d*] of the lighting system.

Figure 151:
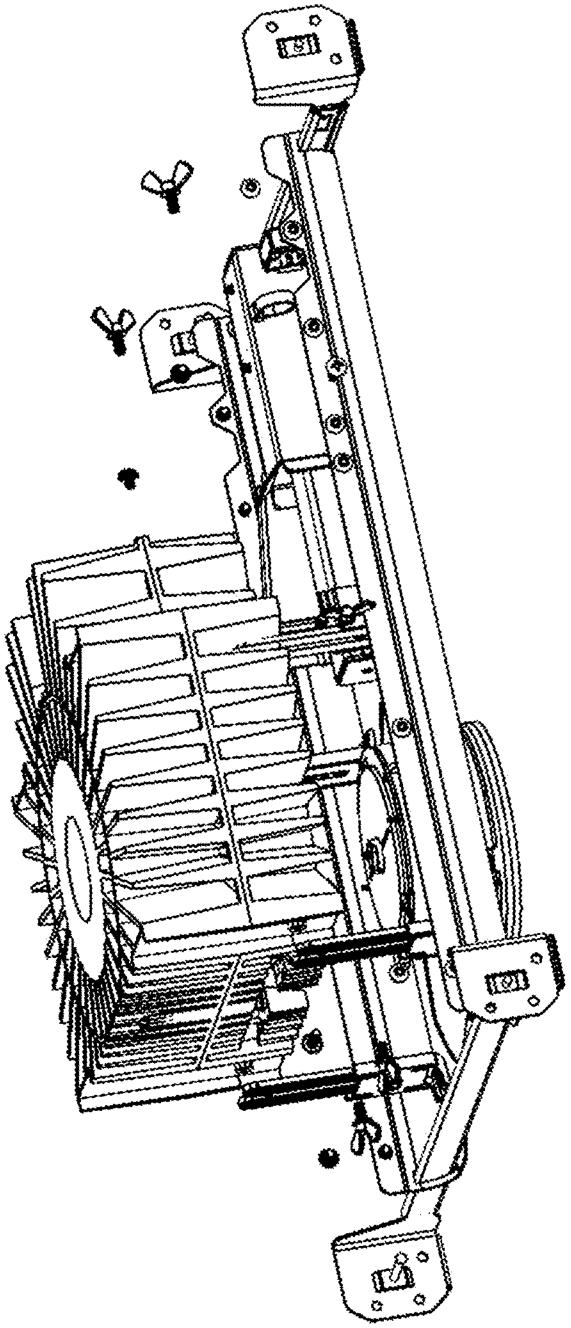

FIG. 151 on sheet 148 of the drawings is a screenshot of Z-Adjustment-related features of the examples [100*a-d*] of the lighting system.

Figure 152:
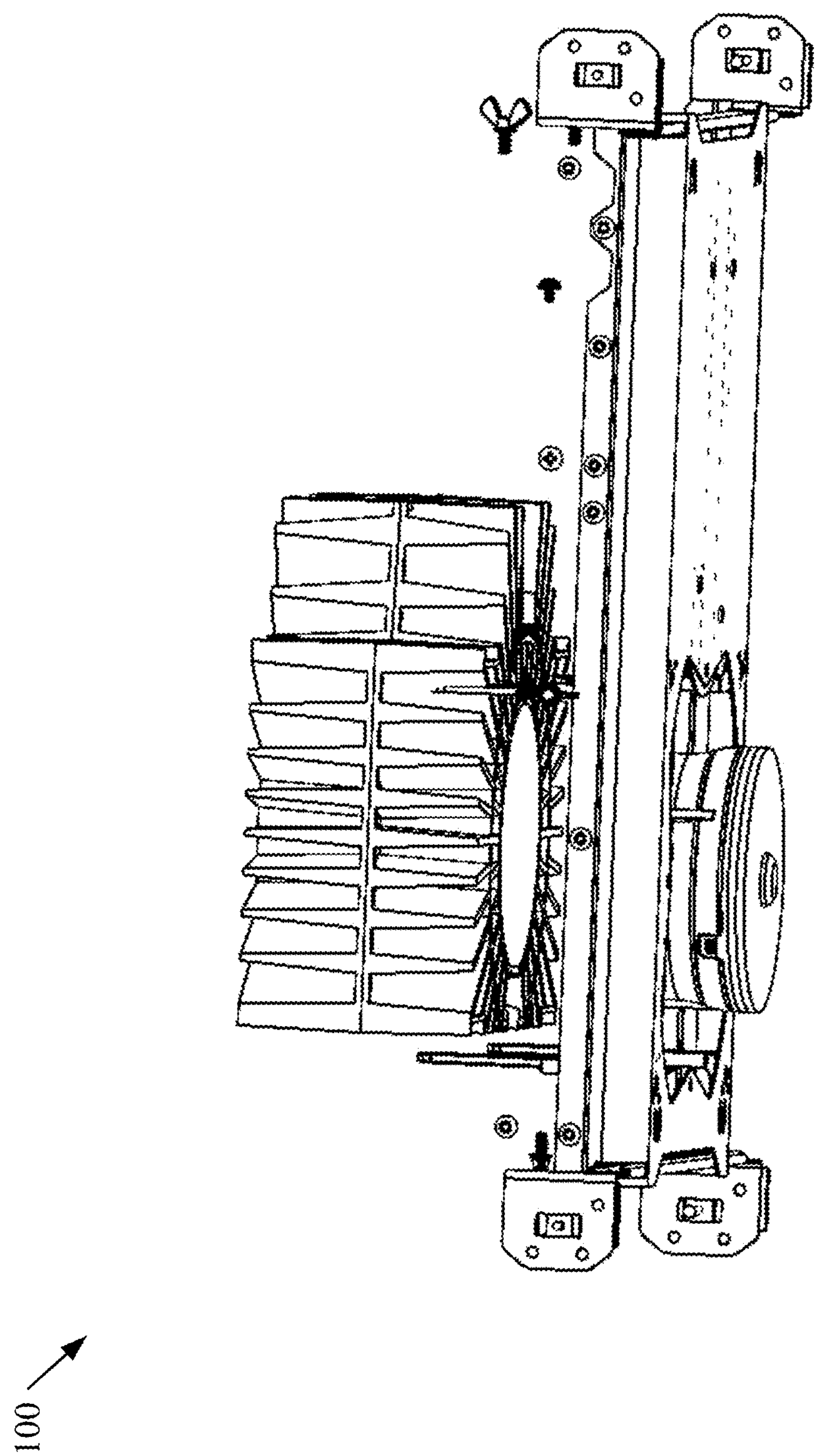

FIG. 152 on sheet 149 of the drawings is a screenshot of Z-Adjustment-related features of the examples [100*a-d*] of the lighting system.

Figure 153:
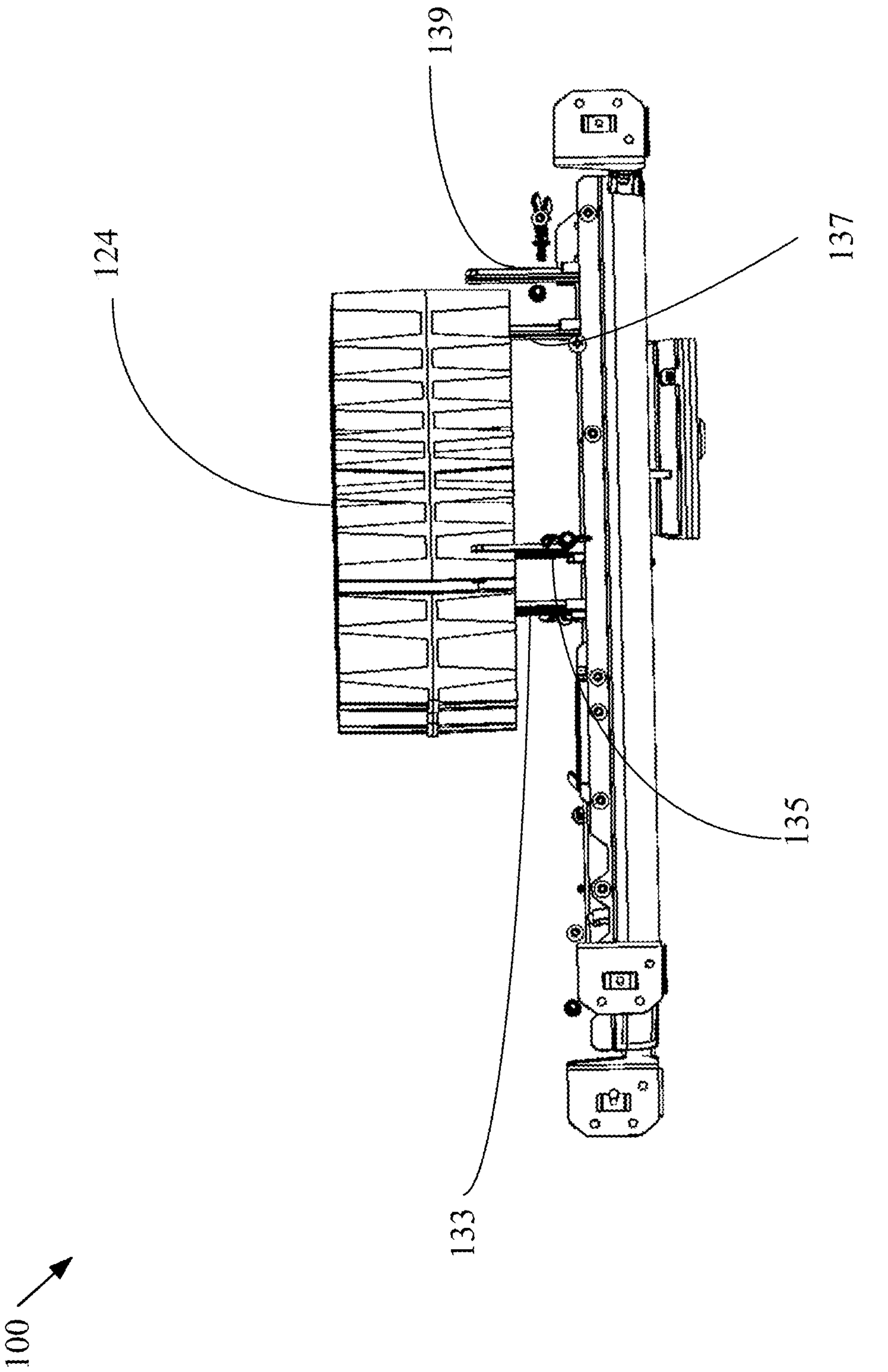

FIG. 153 on sheet 150 of the drawings is a screenshot of Z-Adjustment-related features of the examples [100*a-d*] of the lighting system.

Figure 154:
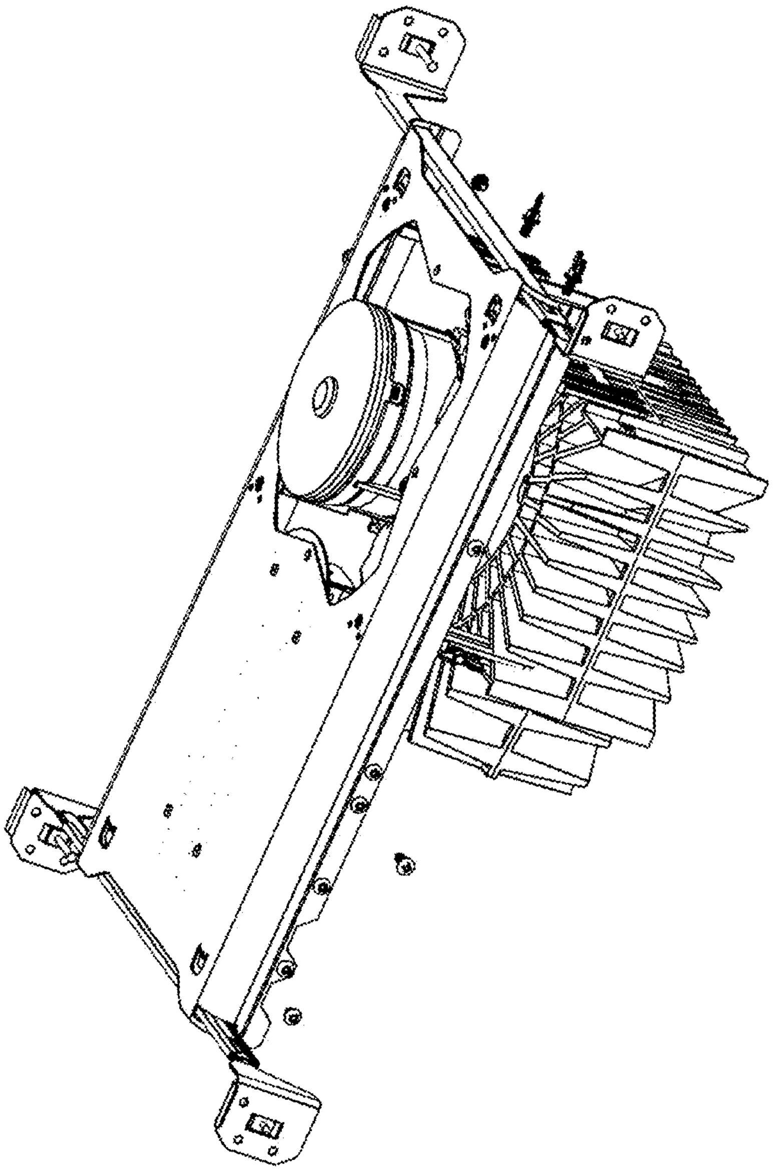

FIG. 154 on sheet 151 of the drawings is a screenshot of Z-Adjustment-related features of the examples [100*a-d*] of the lighting system.

Figure 155:
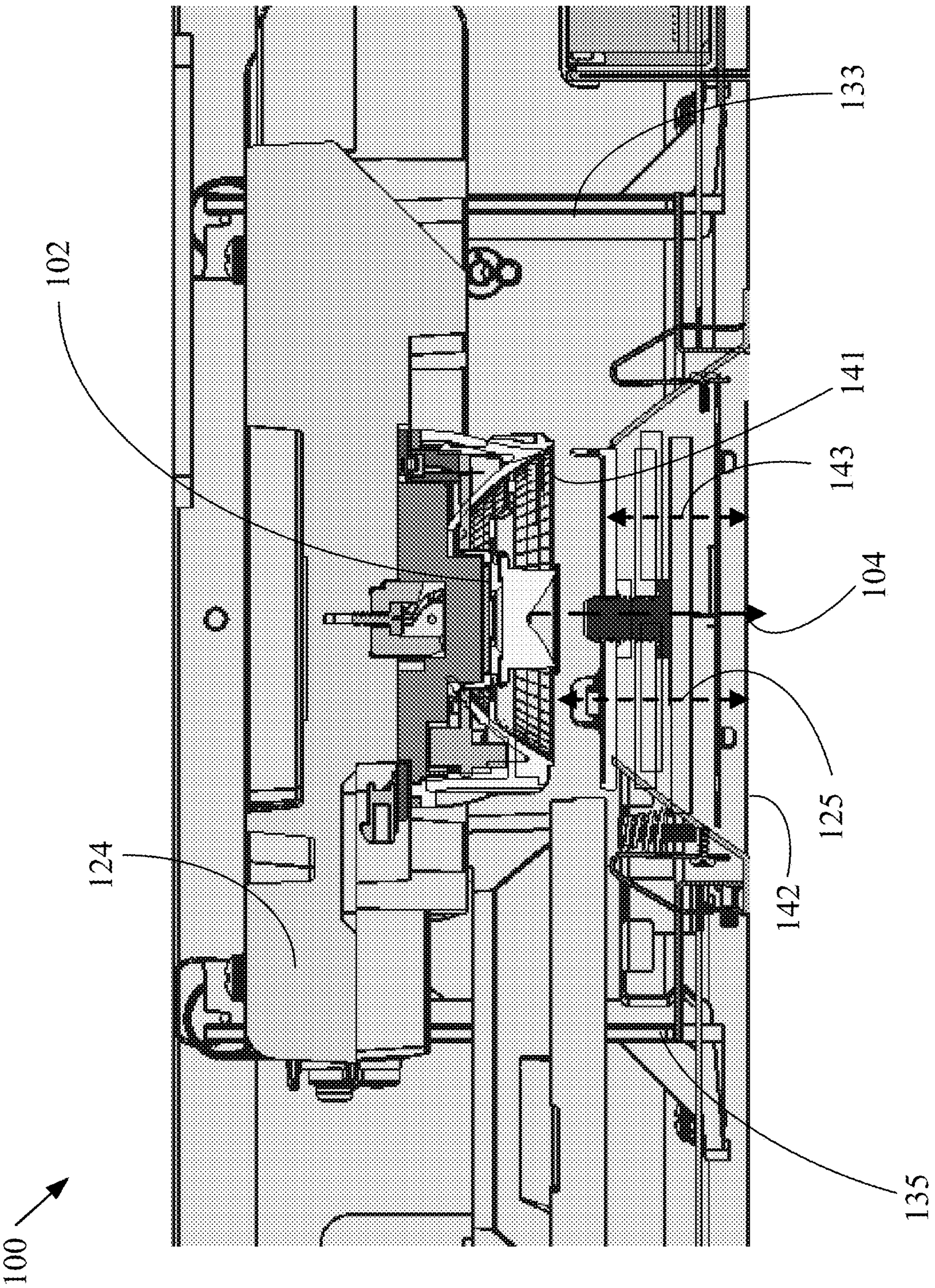

FIG. 155 on sheet 152 of the drawings is a screenshot of Z-Adjustment-related features of the examples [100*a-d*] of the lighting system.

Figure 156:
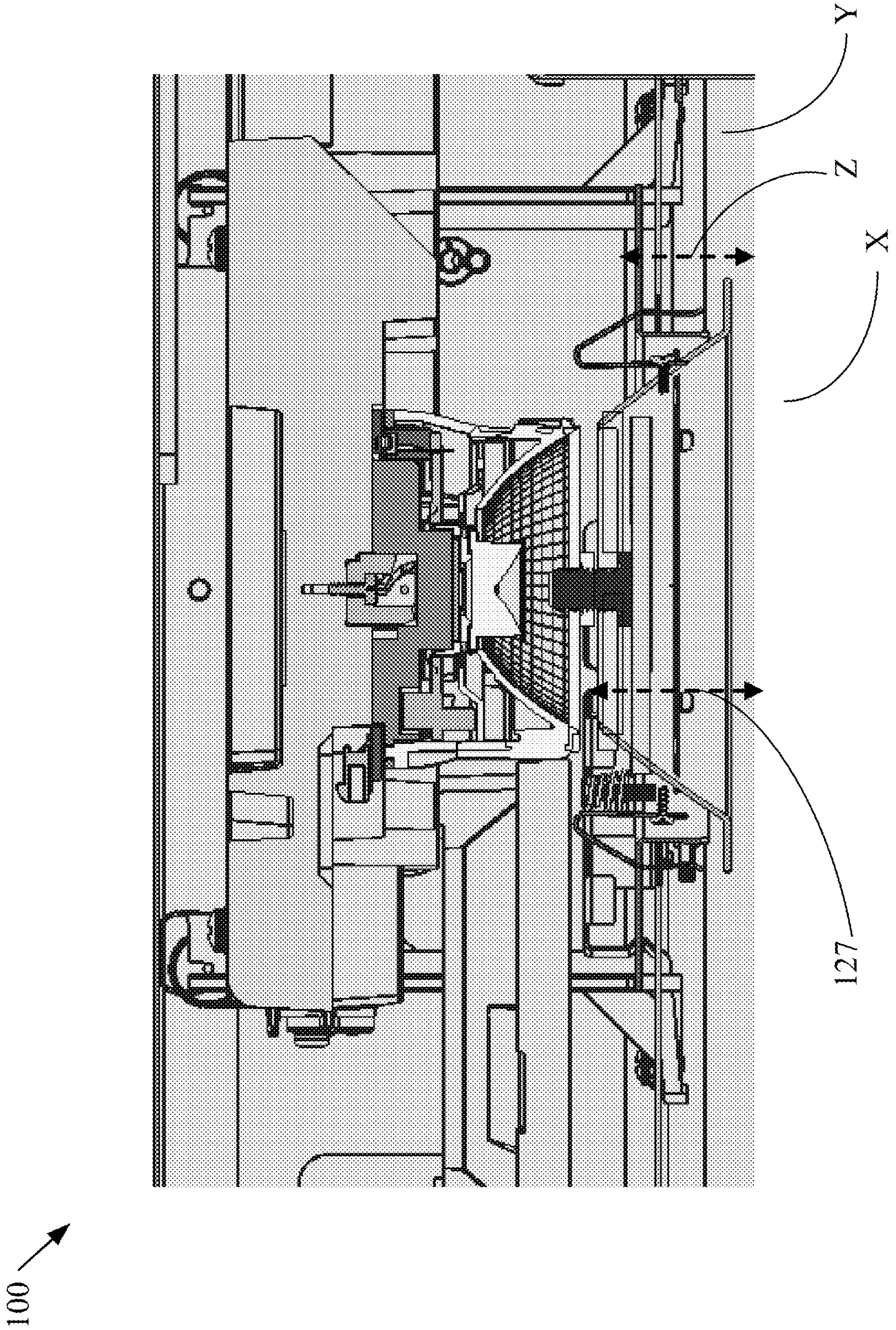

FIG. 156 on sheet 153 of the drawings is a screenshot of Z-Adjustment-related features of the examples [100*a-d*] of the lighting system.

Figure 157:
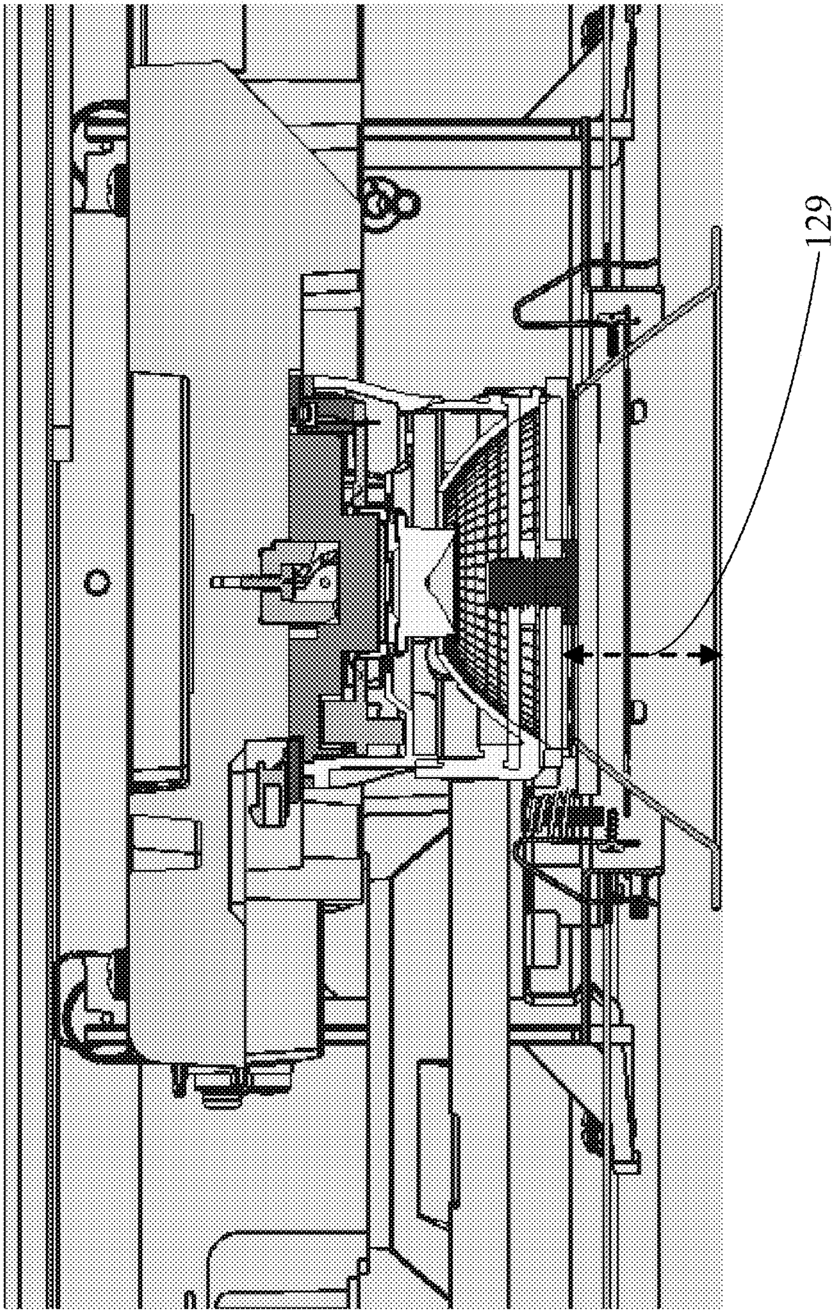

FIG. 157 on sheet 154 of the drawings is a screenshot of Z-Adjustment-related features of the examples [100*a-d*] of the lighting system.

Figure 158:
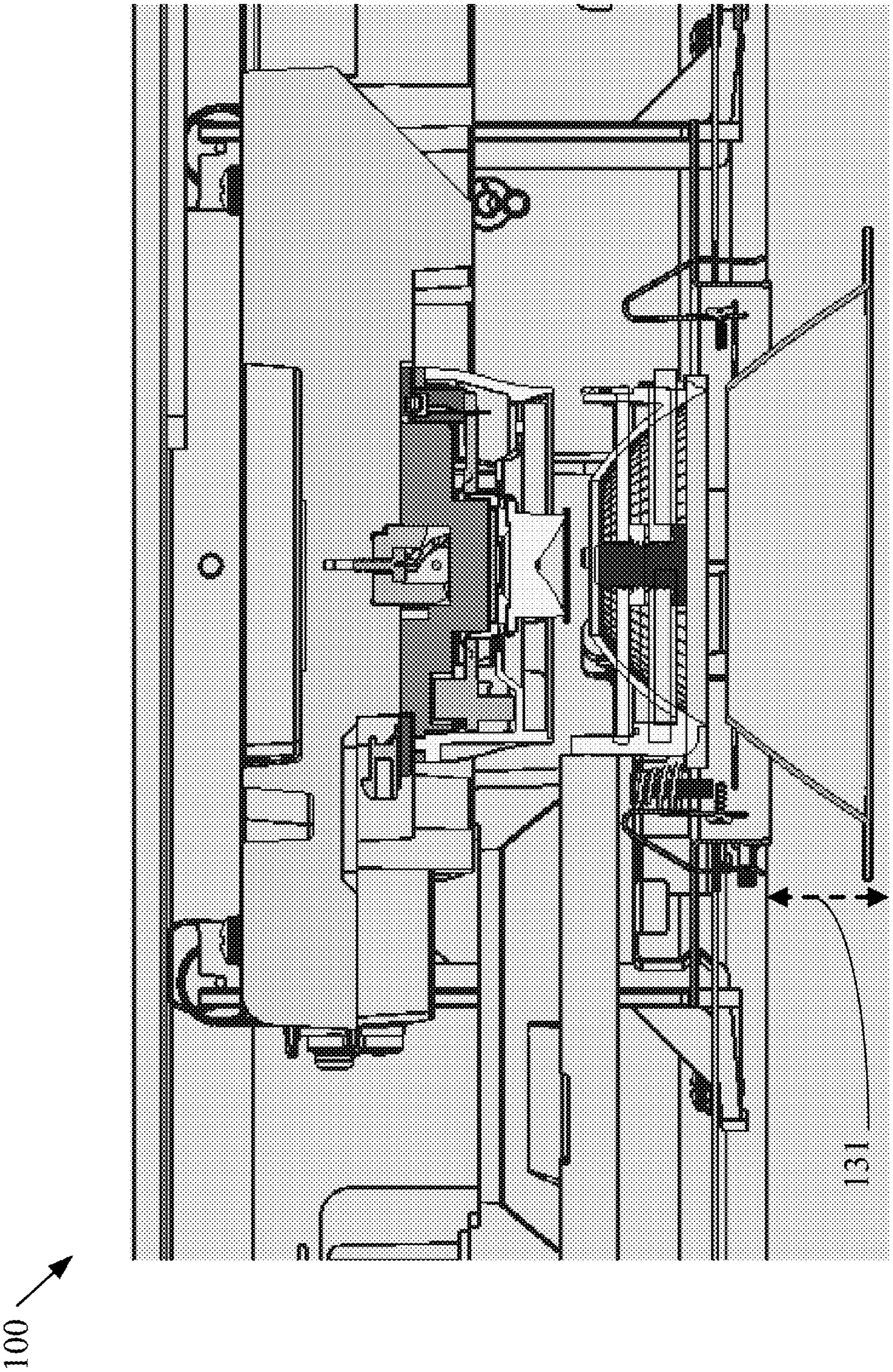

FIG. 158 on sheet 155 of the drawings is a screenshot of Z-Adjustment-related features of the examples [100*a-d*] of the lighting system.

Figure 159:
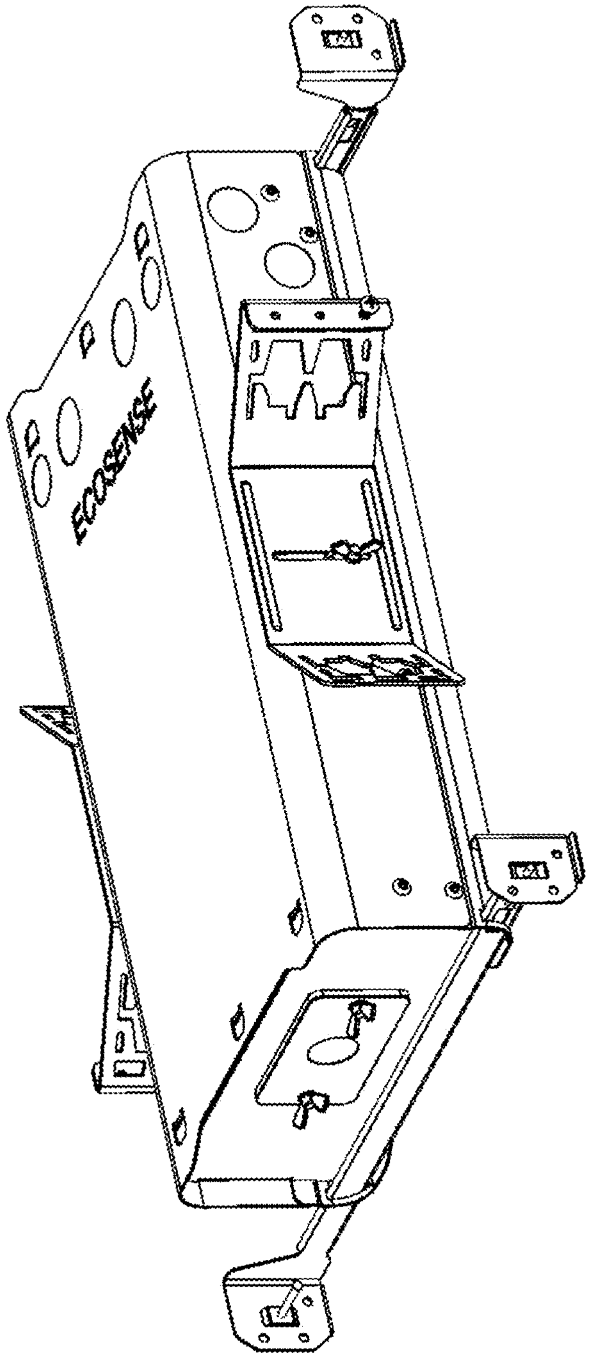

FIG. 159 on sheet 156 of the drawings is a screenshot of Twist-Lock-related features of the examples [100*a-d*] of the lighting system.

Figure 160:
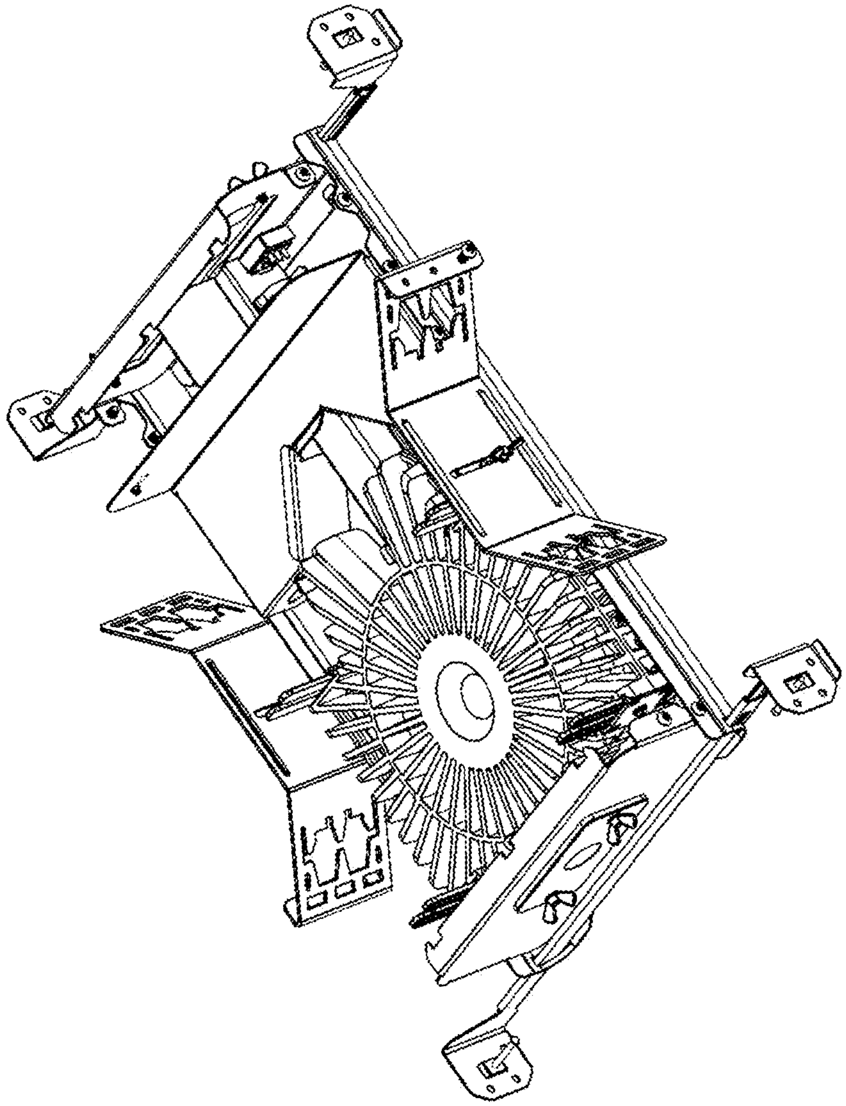

FIG. 160 on sheet 157 of the drawings is a screenshot of Twist-Lock-related features of the examples [100*a-d*] of the lighting system.

Figure 161:
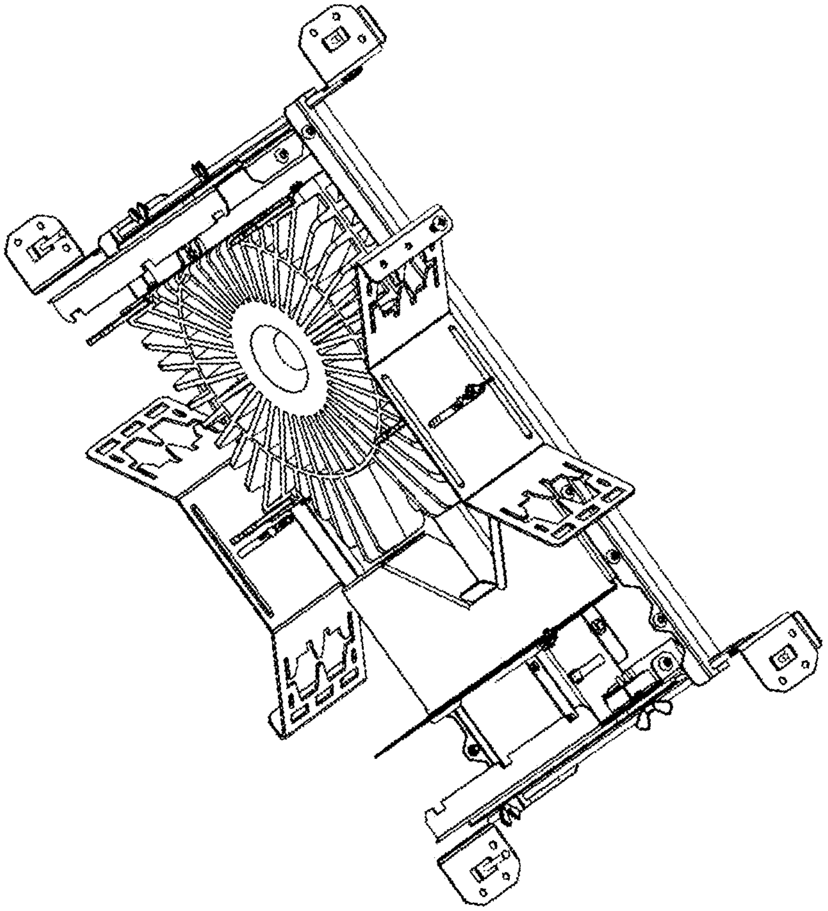

FIG. 161 on sheet 158 of the drawings is a screenshot of Twist-Lock-related features of the examples [100*a-d*] of the lighting system.

Figure 162:
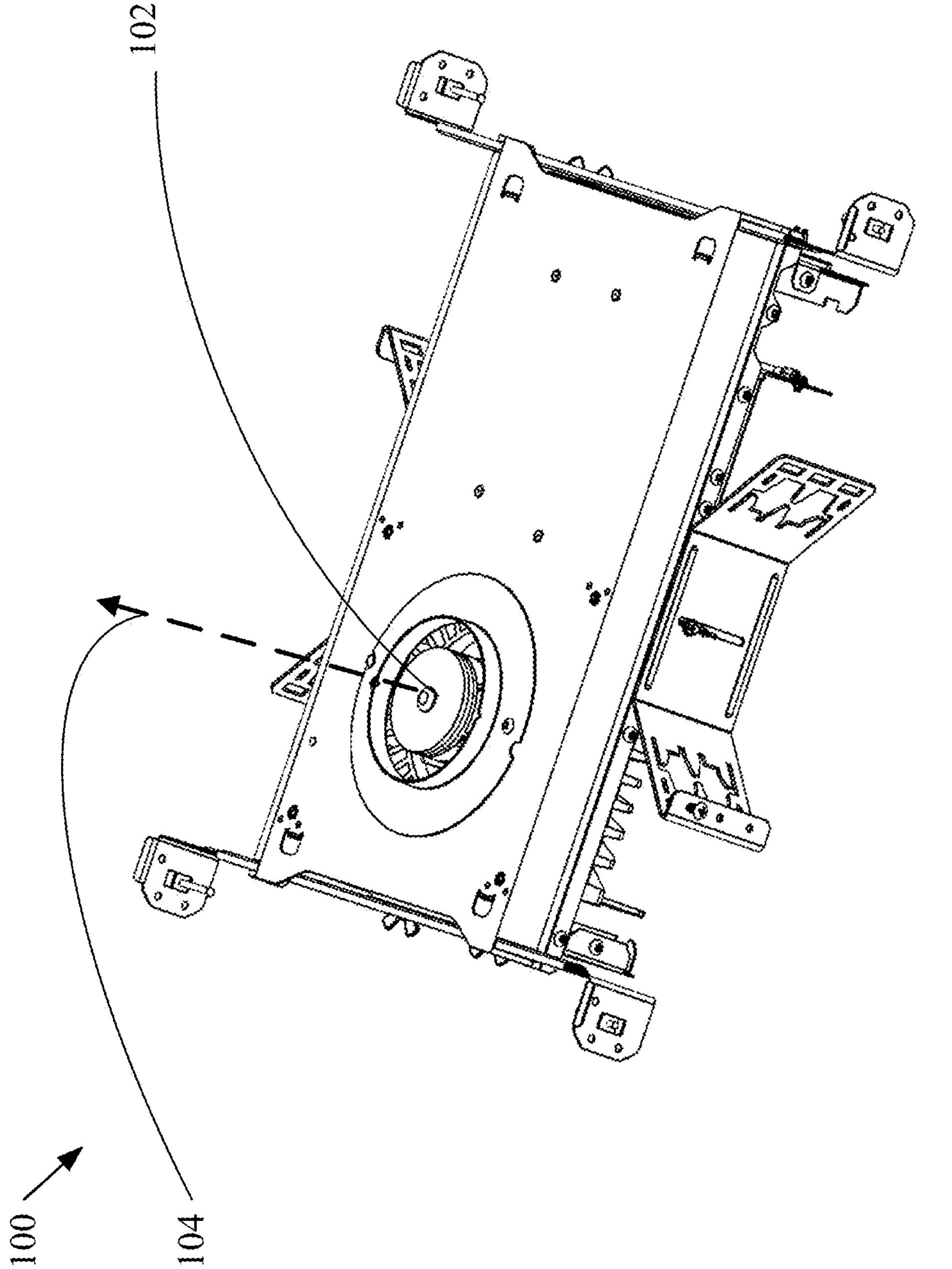

FIG. 162 on sheet 159 of the drawings is a screenshot of Twist-Lock-related features of the examples [100*a-d*] of the lighting system.

Figure 163:
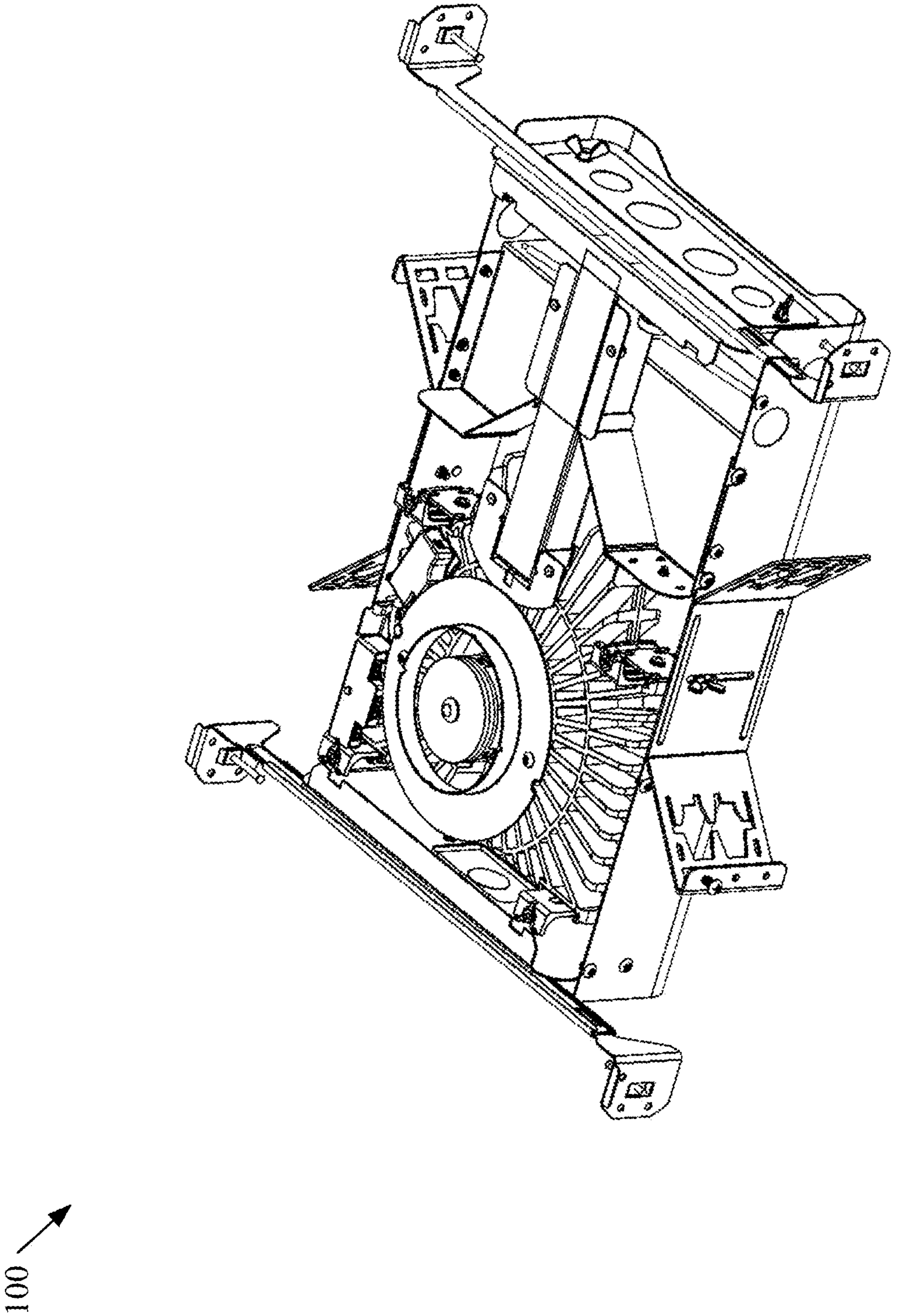

FIG. 163 on sheet 160 of the drawings is a screenshot of Twist-Lock-related features of the examples [100*a-d*] of the lighting system.

Figure 164:
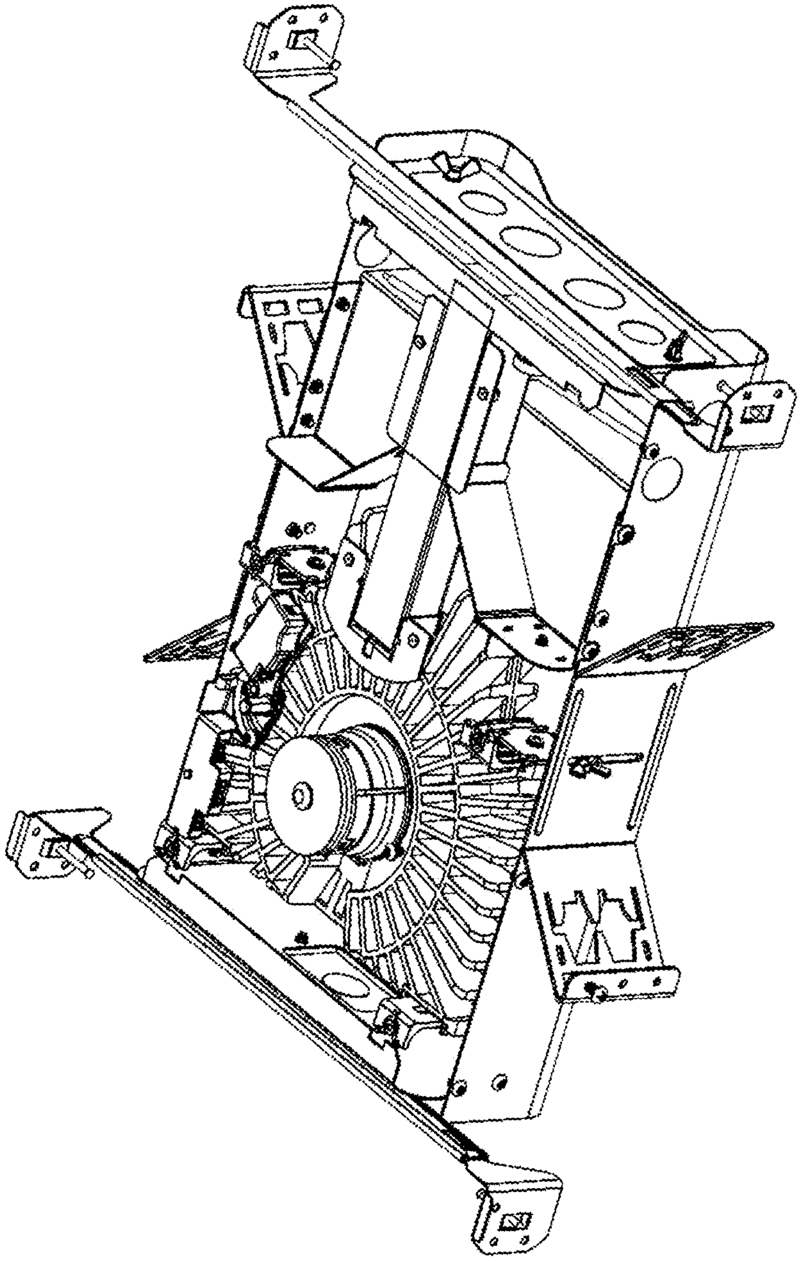

FIG. 164 on sheet 161 of the drawings is a screenshot of Twist-Lock-related features of the examples [100*a-d*] of the lighting system.

Figure 165:
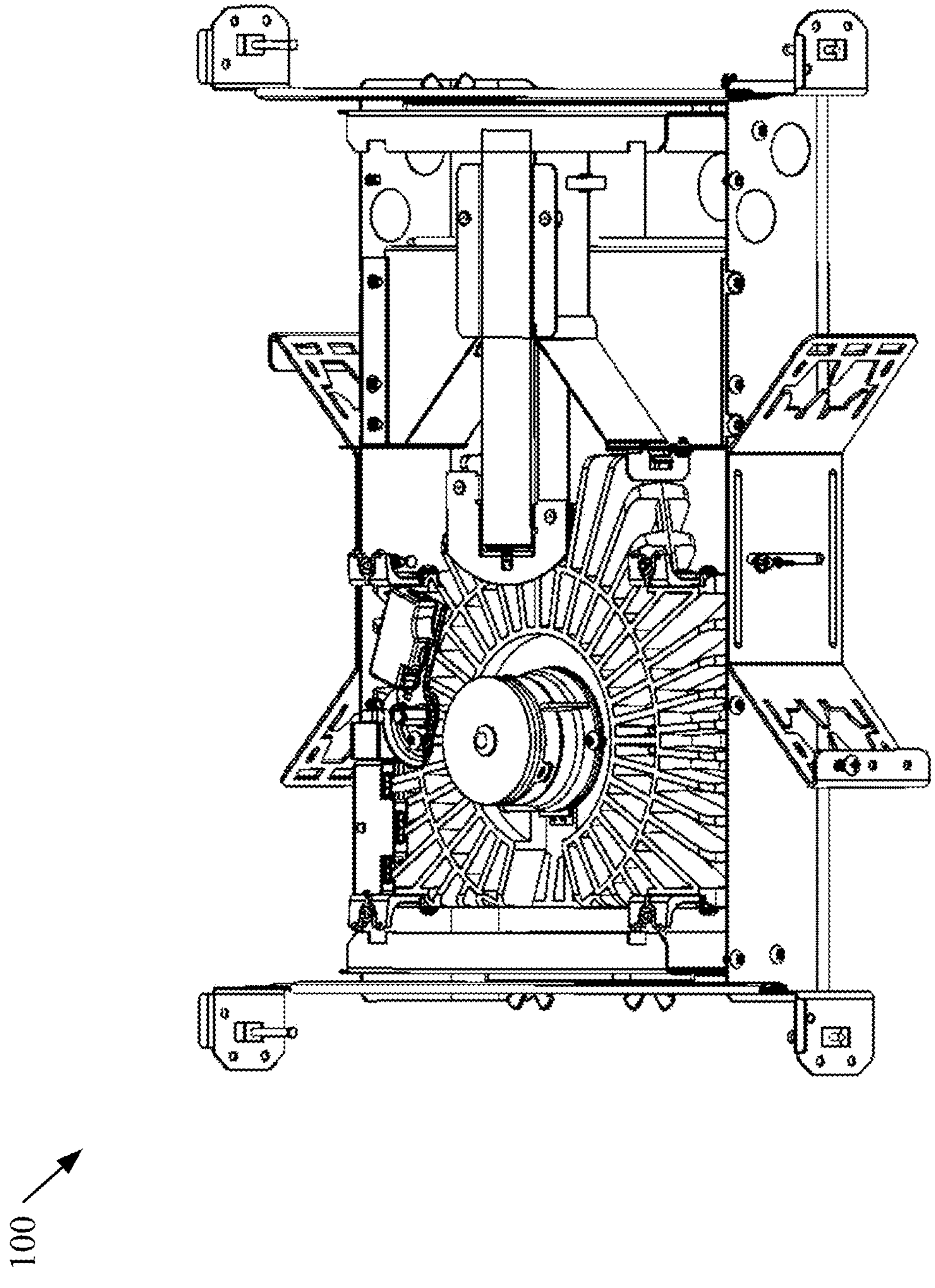

FIG. 165 on sheet 162 of the drawings is a screenshot of Twist-Lock-related features of the examples [100*a-d*] of the lighting system.

Figure 166:
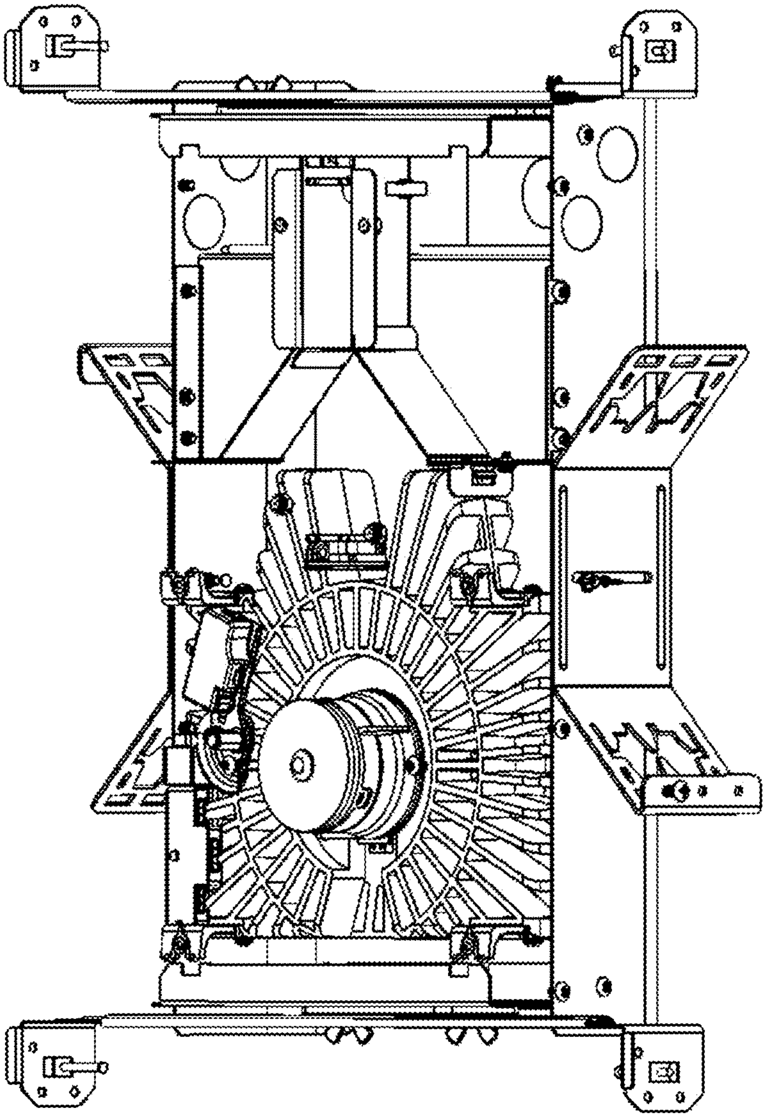

FIG. 166 on sheet 163 of the drawings is a screenshot of Twist-Lock-related features of the examples [100*a-d*] of the lighting system.

Figure 167:
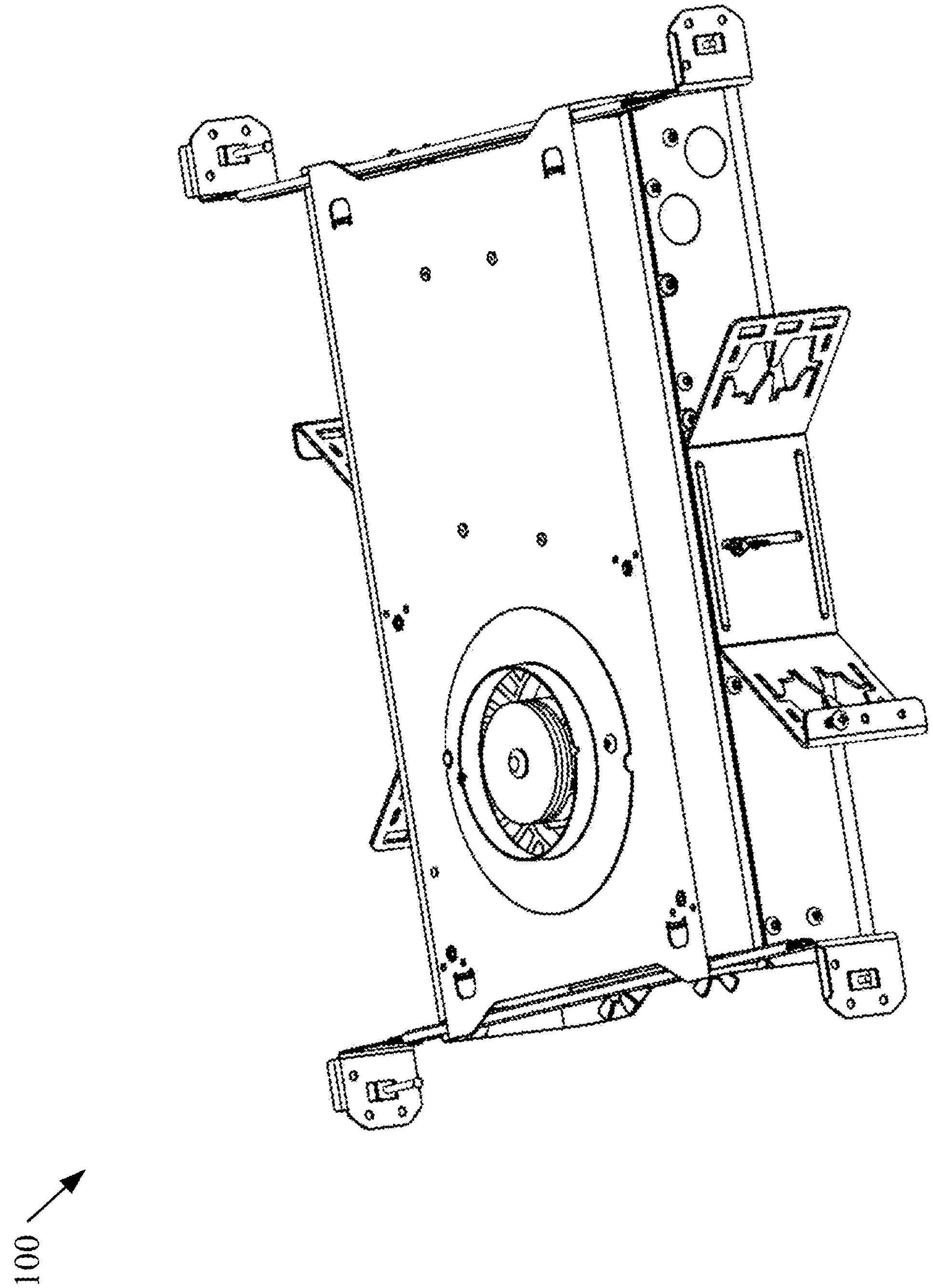

FIG. 167 on sheet 164 of the drawings is a screenshot of Twist-Lock-related features of the examples [100*a-d*] of the lighting system.

Figure 168:
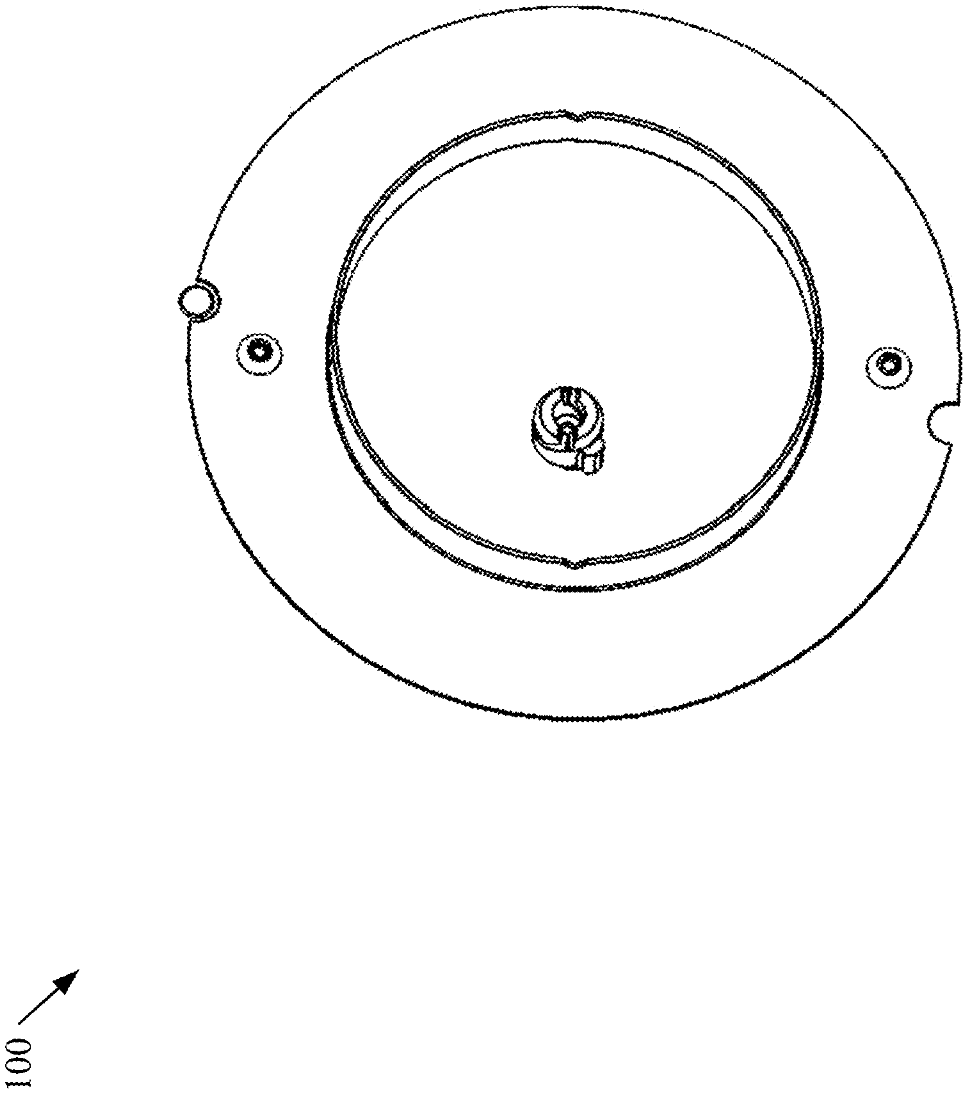

FIG. 168 on sheet 165 of the drawings is a screenshot of Twist-Lock-related features of the examples [100*a-d*] of the lighting system.

Figure 169:
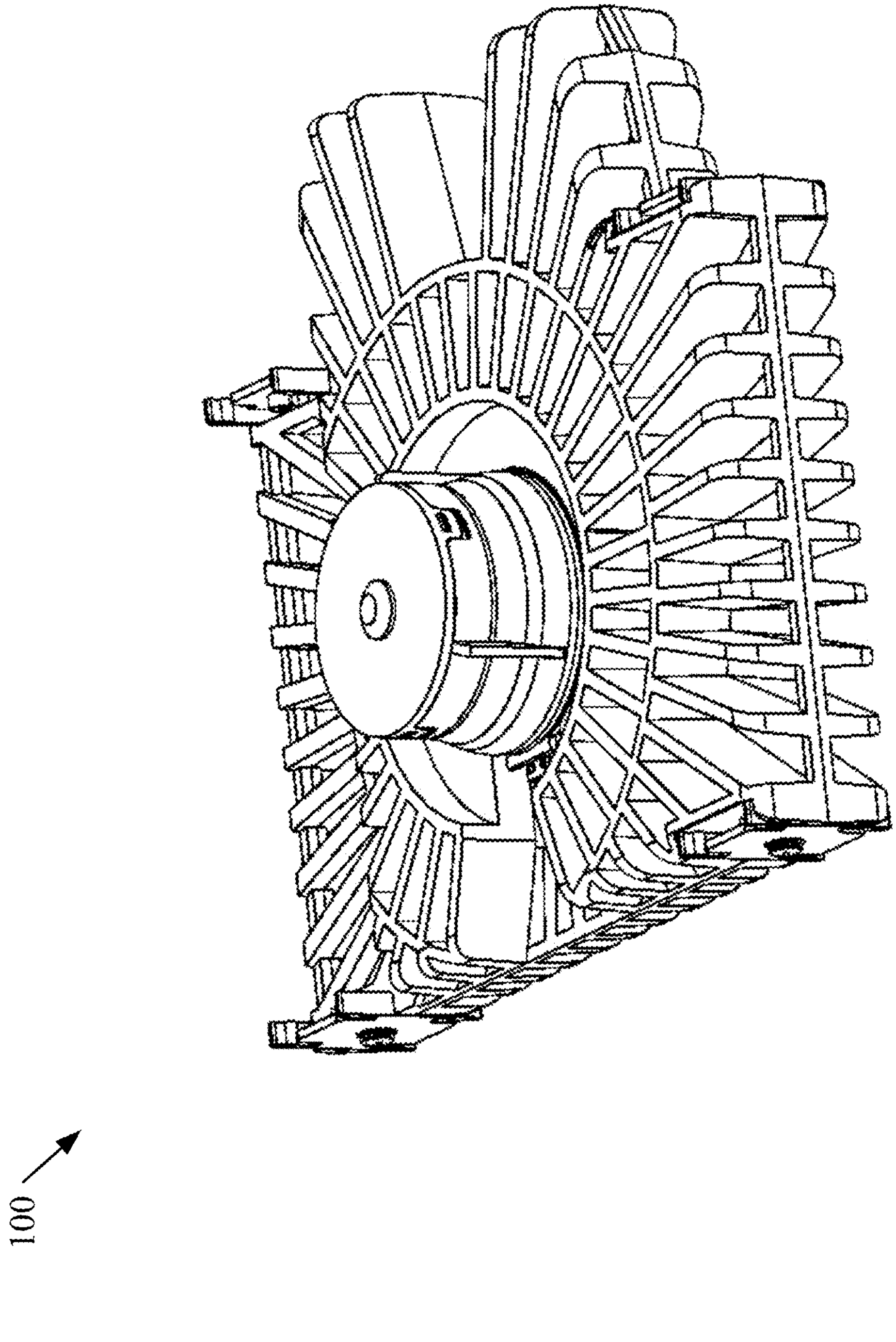

FIG. 169 on sheet 166 of the drawings is a screenshot of Twist-Lock-related features of the examples [100*a-d*] of the lighting system.

Figure 170:
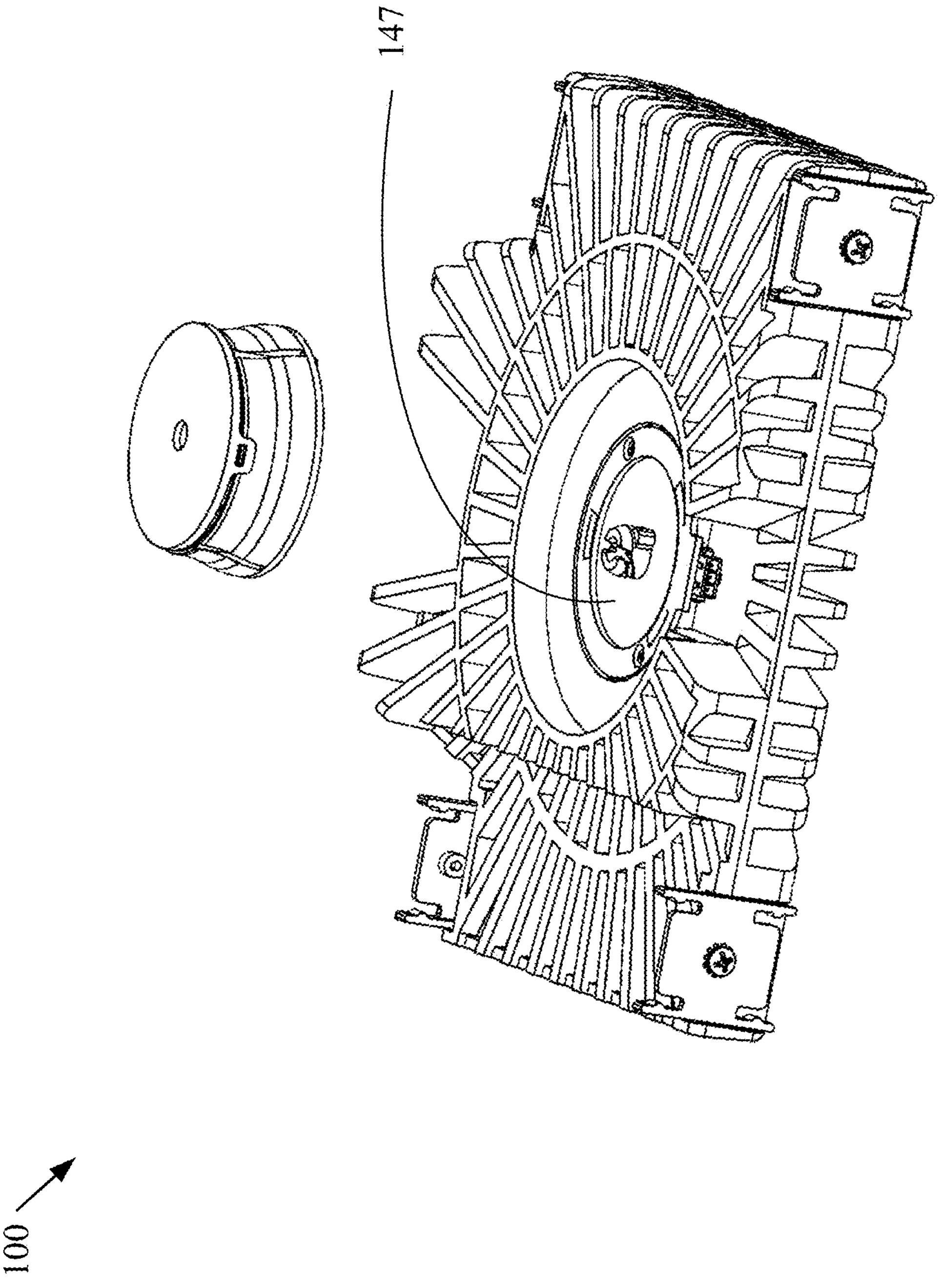

FIG. 170 on sheet 167 of the drawings is a screenshot of Twist-Lock-related features of the examples [100*a-d*] of the lighting system.

Figure 171:
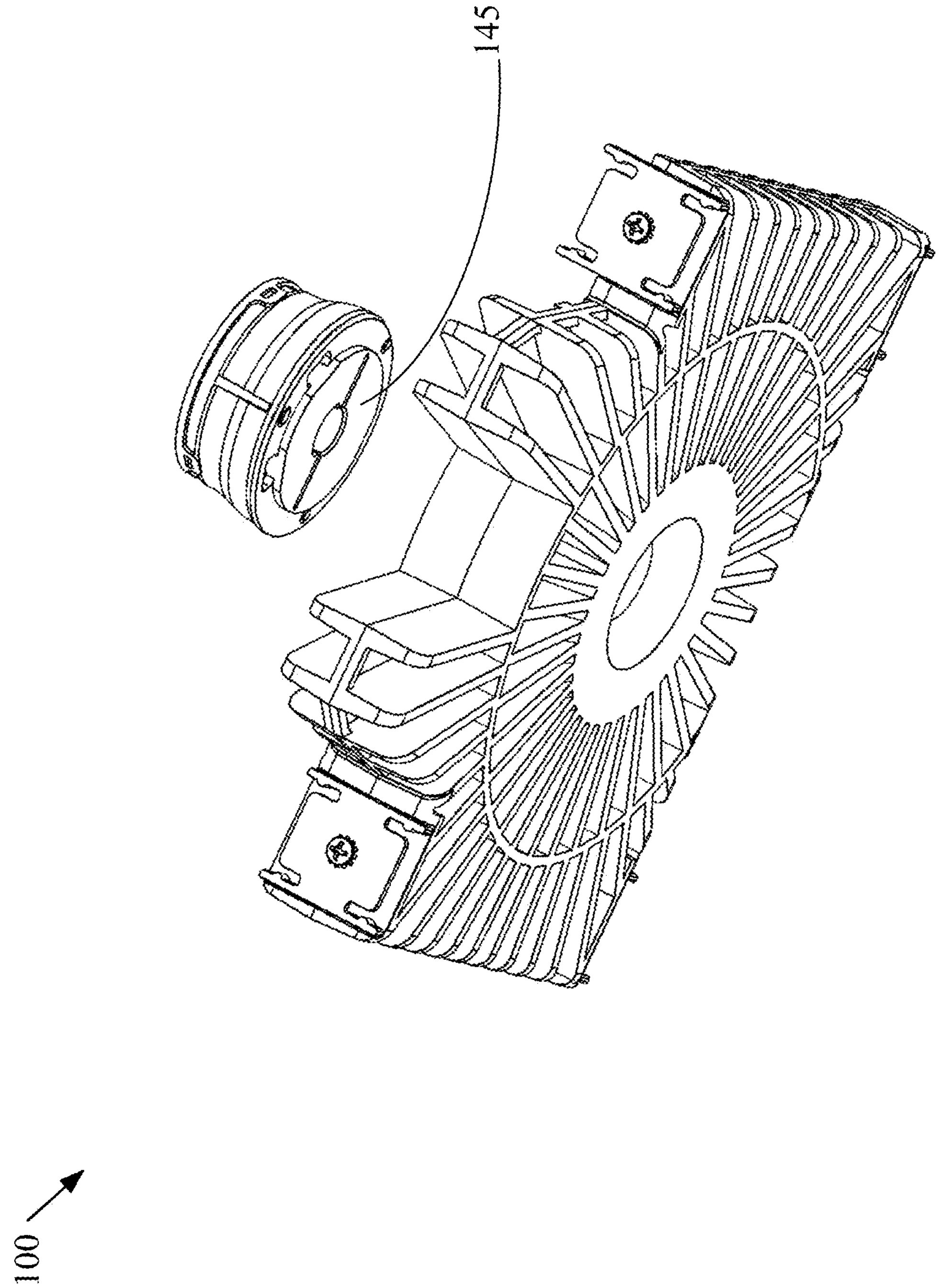

FIG. 171 on sheet 168 of the drawings is a screenshot of Twist-Lock-related features of the examples [100*a-d*] of the lighting system.

Figure 172:
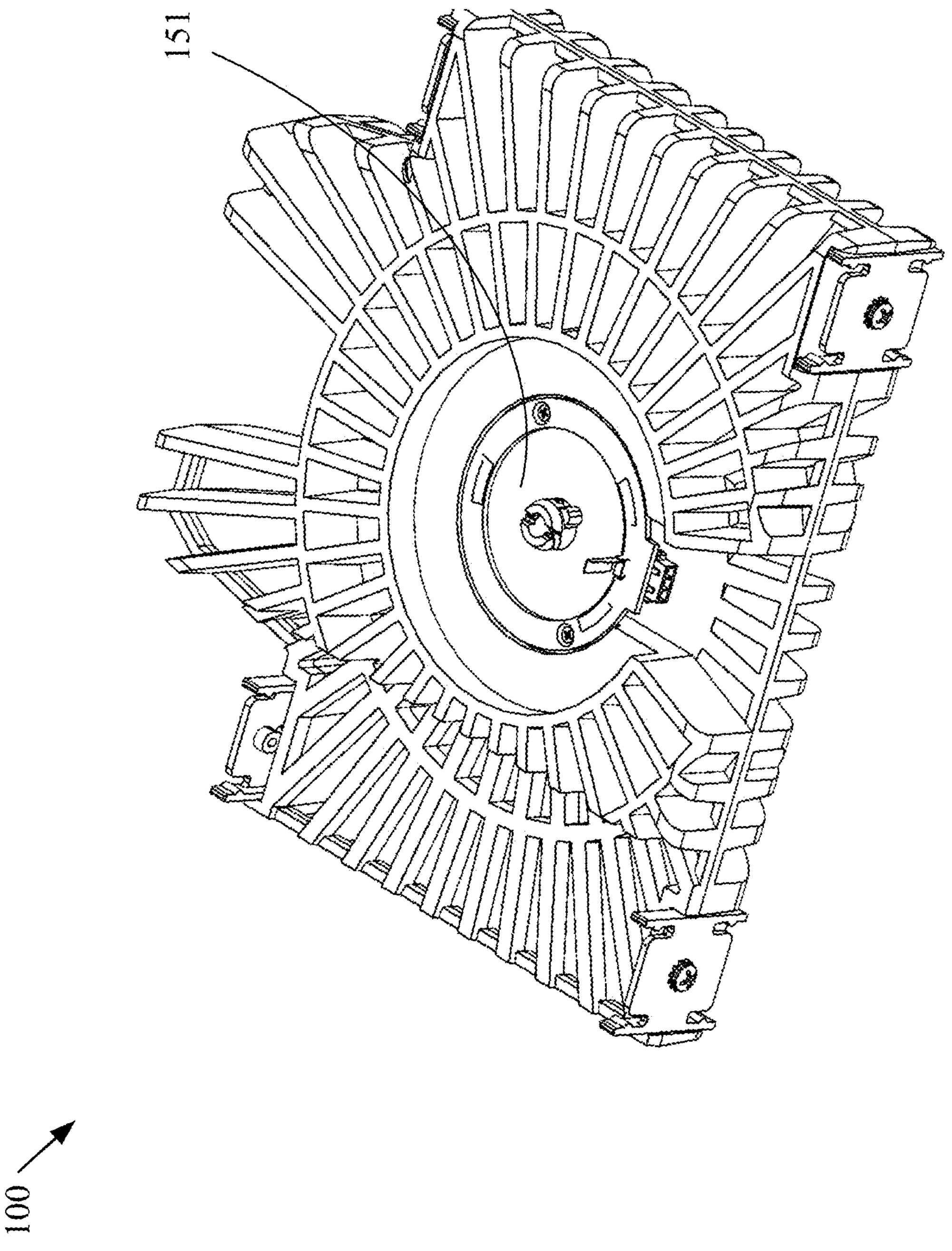

FIG. 172 on sheet 169 of the drawings is a screenshot of Twist-Lock-related features of the examples [100*a-d*] of the lighting system.

Figure 173:
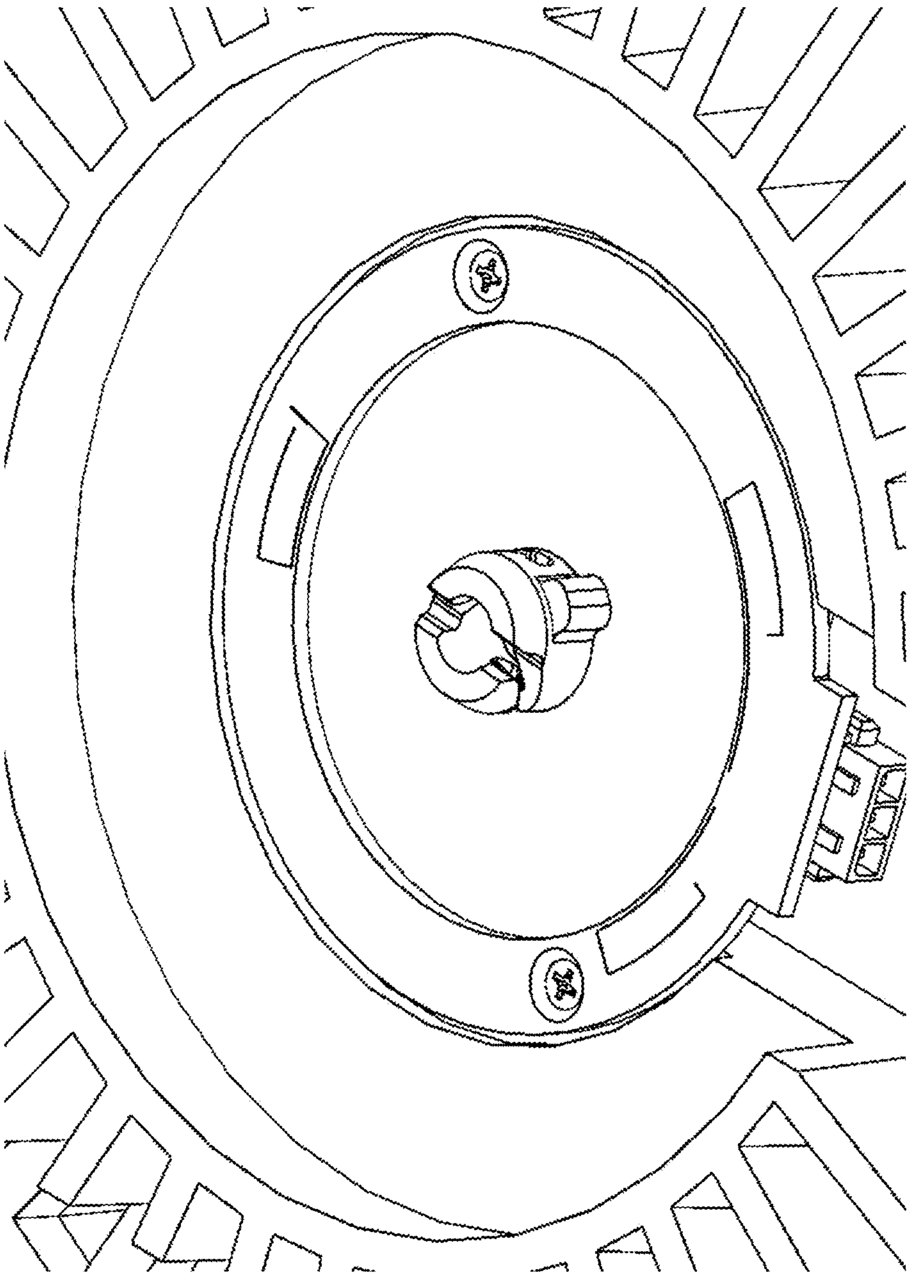

FIG. 173 on sheet 170 of the drawings is a screenshot of Twist-Lock-related features of the examples [100*a-d*] of the lighting system.

Figure 174:
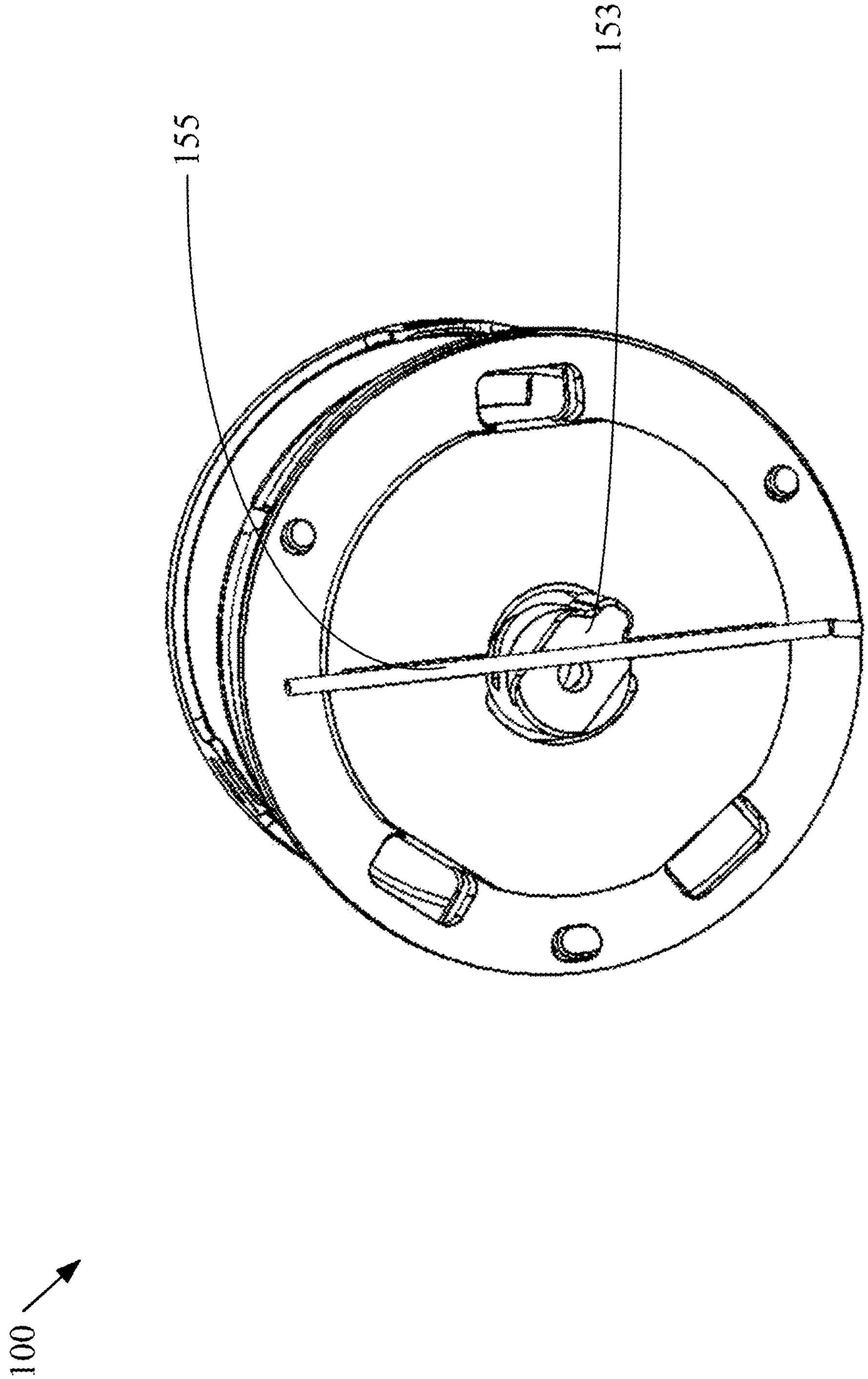

FIG. 174 on sheet 171 of the drawings is a screenshot of Twist-Lock-related features of the examples [100*a-d*] of the lighting system.

Figure 175:
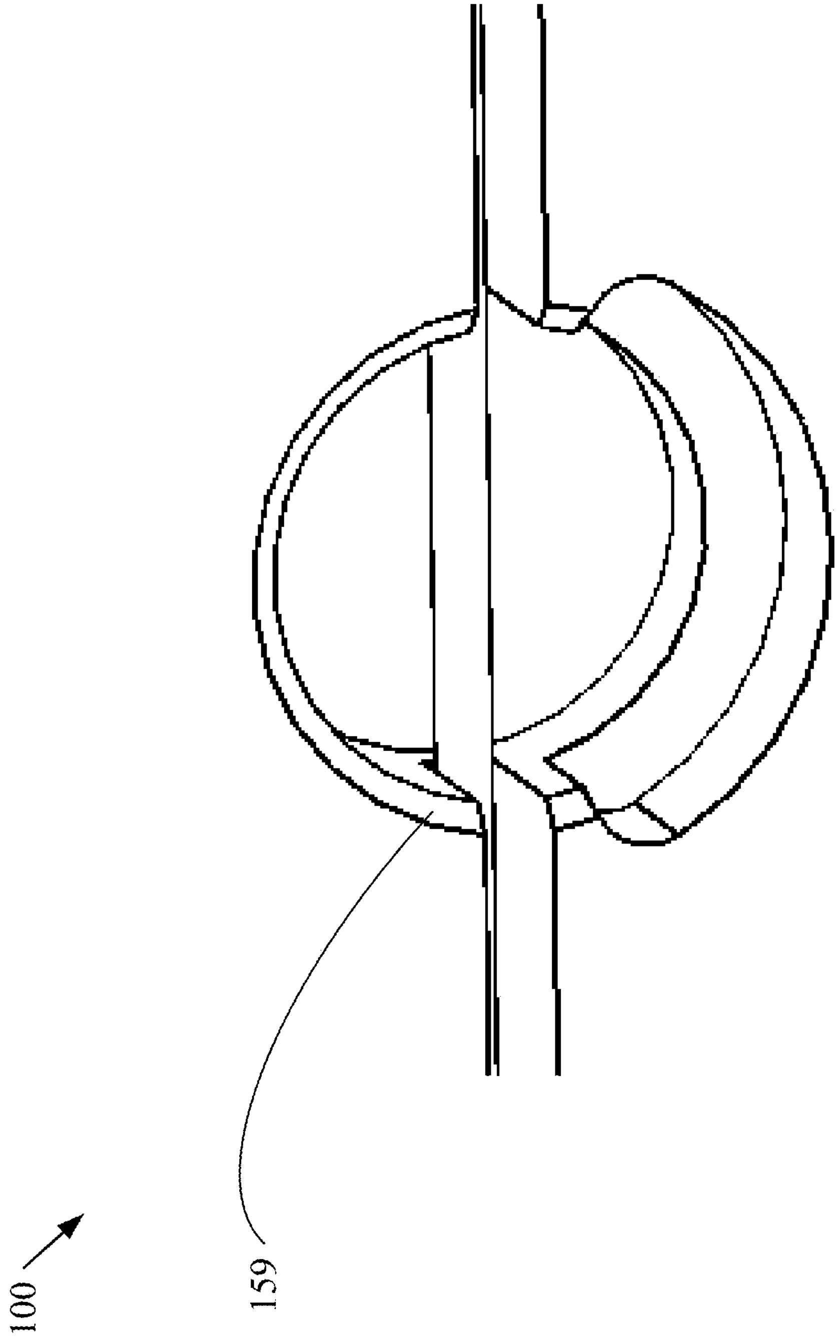

FIG. 175 on sheet 172 of the drawings is a screenshot of Twist-Lock-related features of the examples [100*a-d*] of the lighting system.

Figure 176:
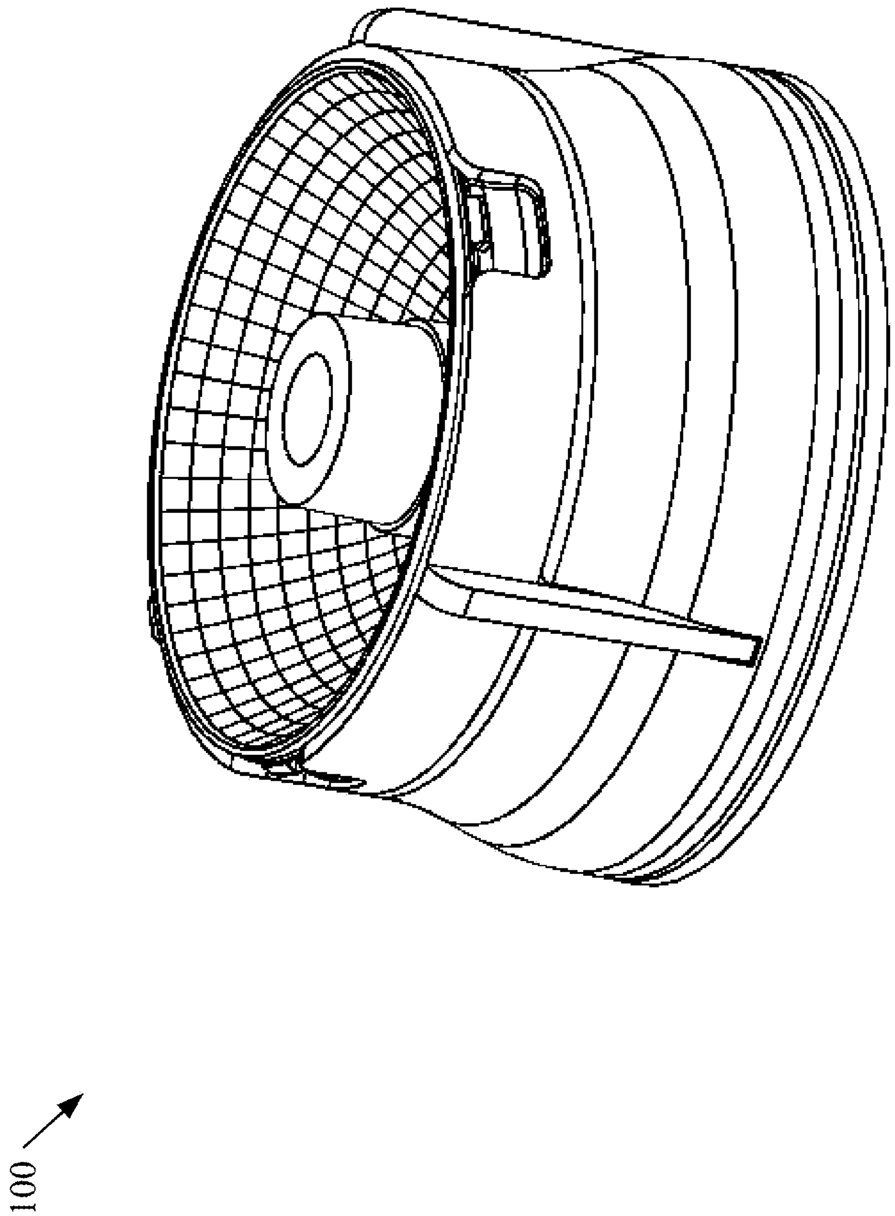

FIG. 176 on sheet 173 of the drawings is a screenshot of Twist-Lock-related features of the examples [100*a-d*] of the lighting system.

Figure 177:
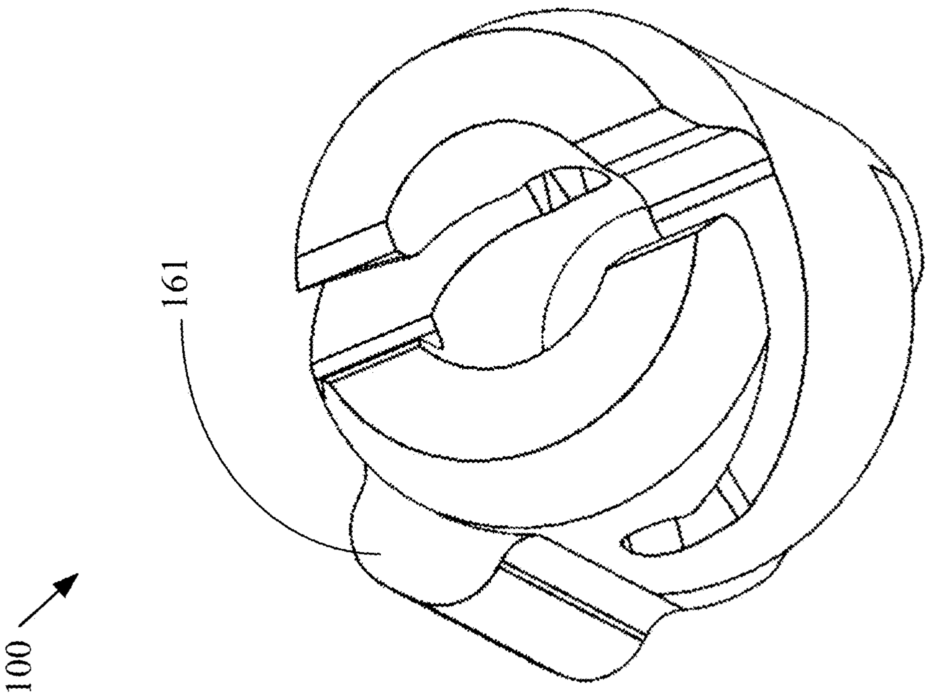

FIG. 177 on sheet 174 of the drawings is a screenshot of Twist-Lock-related features of the examples [100*a-d*] of the lighting system.

Figure 178:
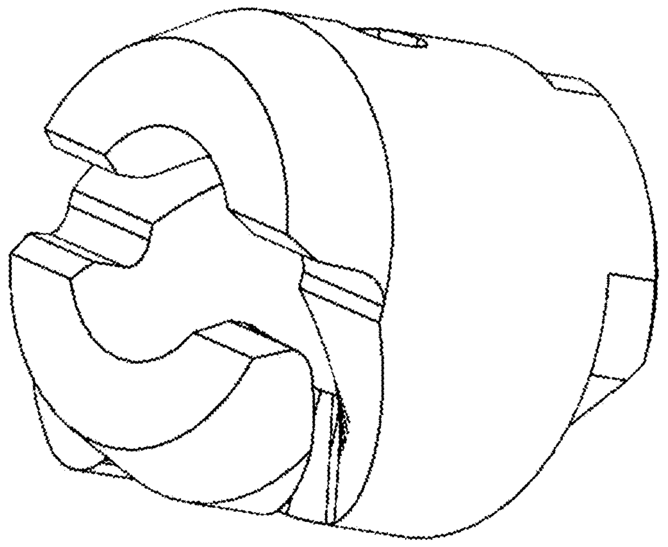

FIG. 178 on sheet 174 of the drawings is a screenshot of Twist-Lock-related features of the examples [100*a-d*] of the lighting system.

Figure 179:
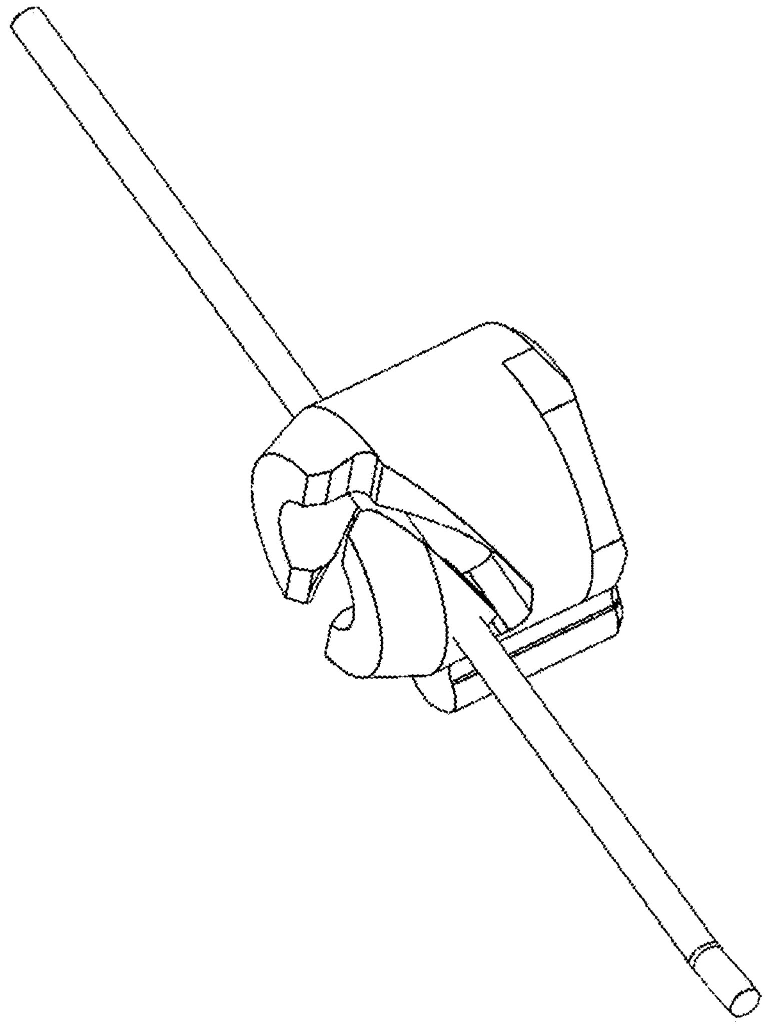

FIG. 179 on sheet 175 of the drawings is a screenshot of Twist-Lock-related features of the examples [100*a-d*] of the lighting system.

Figure 180:
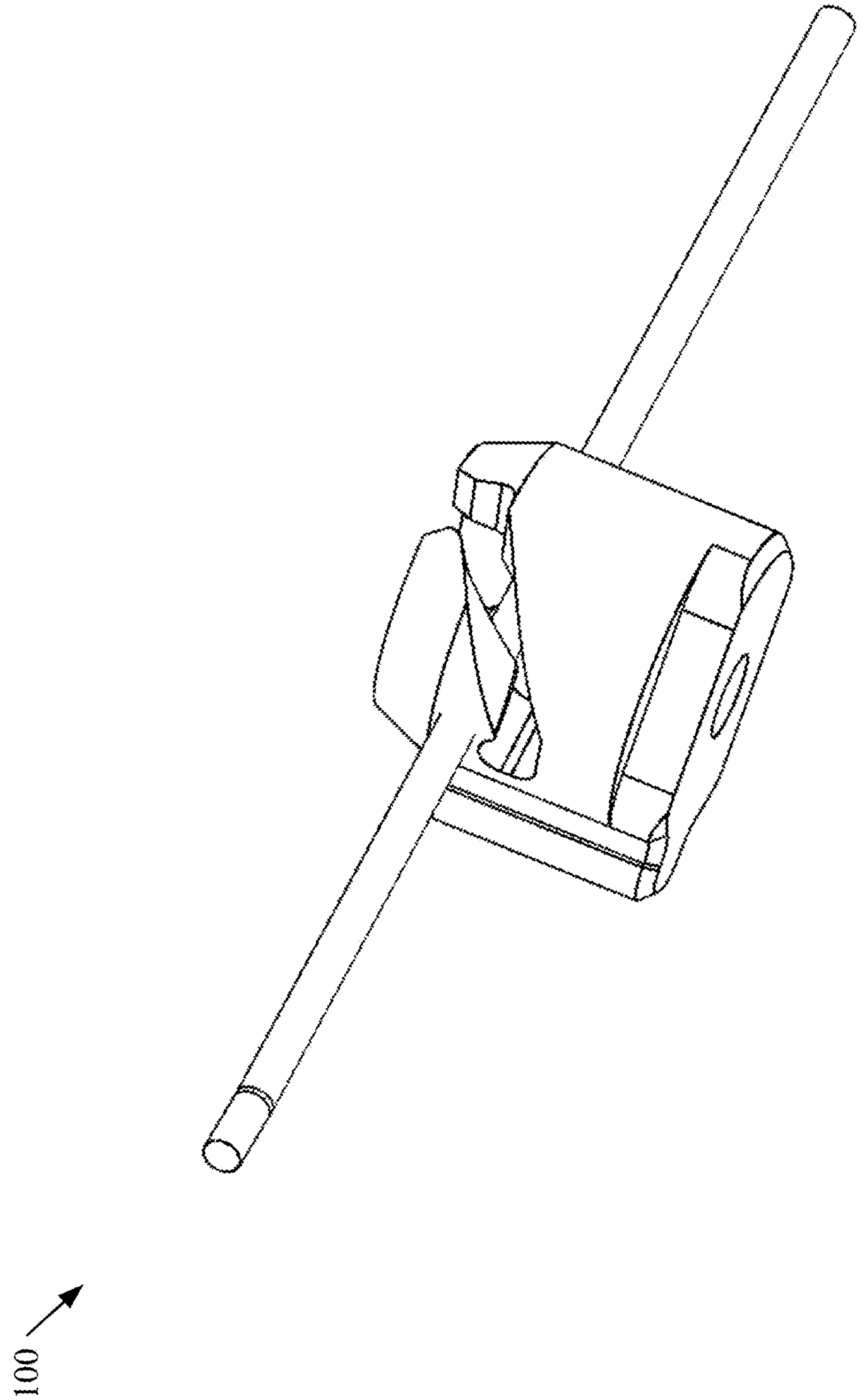

FIG. 180 on sheet 176 of the drawings is a screenshot of Twist-Lock-related features of the examples [100*a-d*] of the lighting system.

Figure 181:
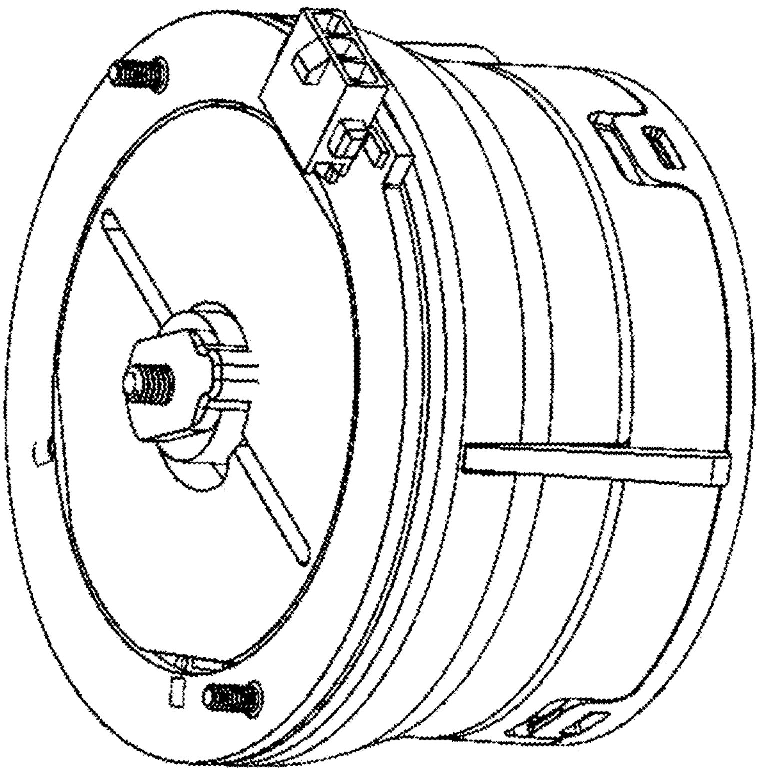

FIG. 181 on sheet 177 of the drawings is a screenshot of Twist-Lock-related features of the examples [100*a-d*] of the lighting system.

Figure 182:
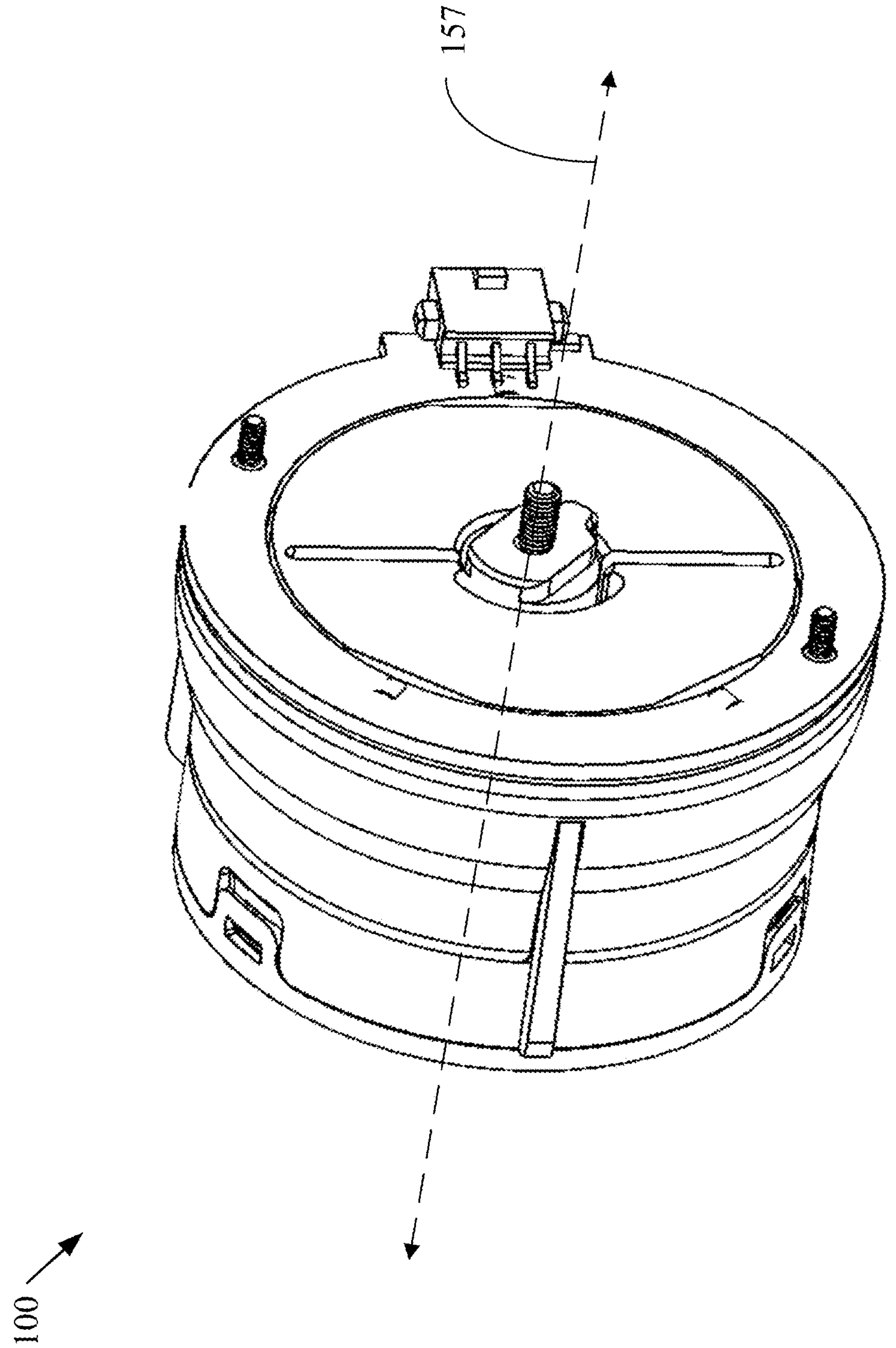

FIG. 182 on sheet 178 of the drawings is a screenshot of Twist-Lock-related features of the examples [100*a-d*] of the lighting system.

Figure 183:
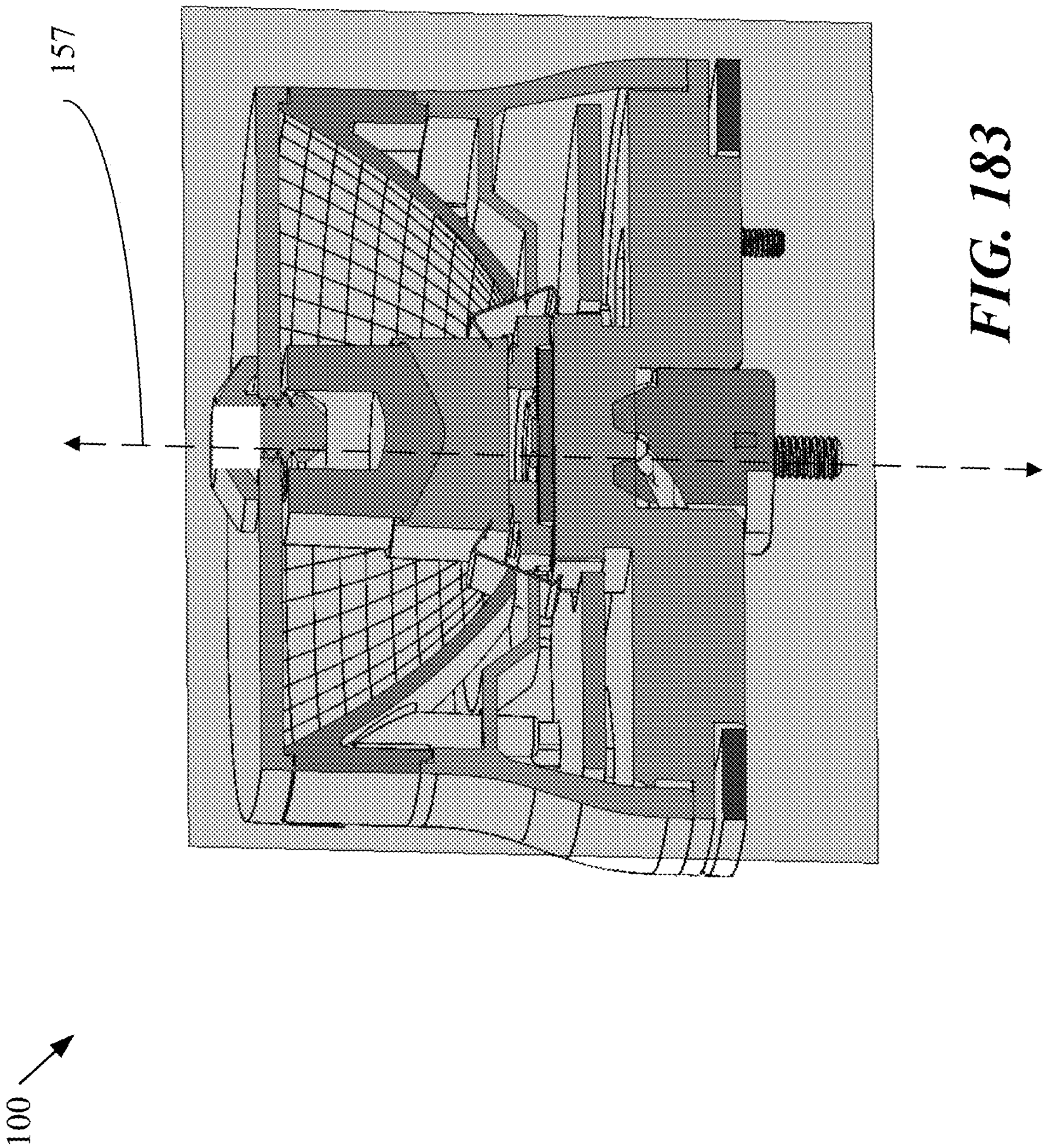

FIG. 183 on sheet 179 of the drawings is a screenshot of Twist-Lock-related features of the examples [100*a-d*] of the lighting system.

Figure 184:
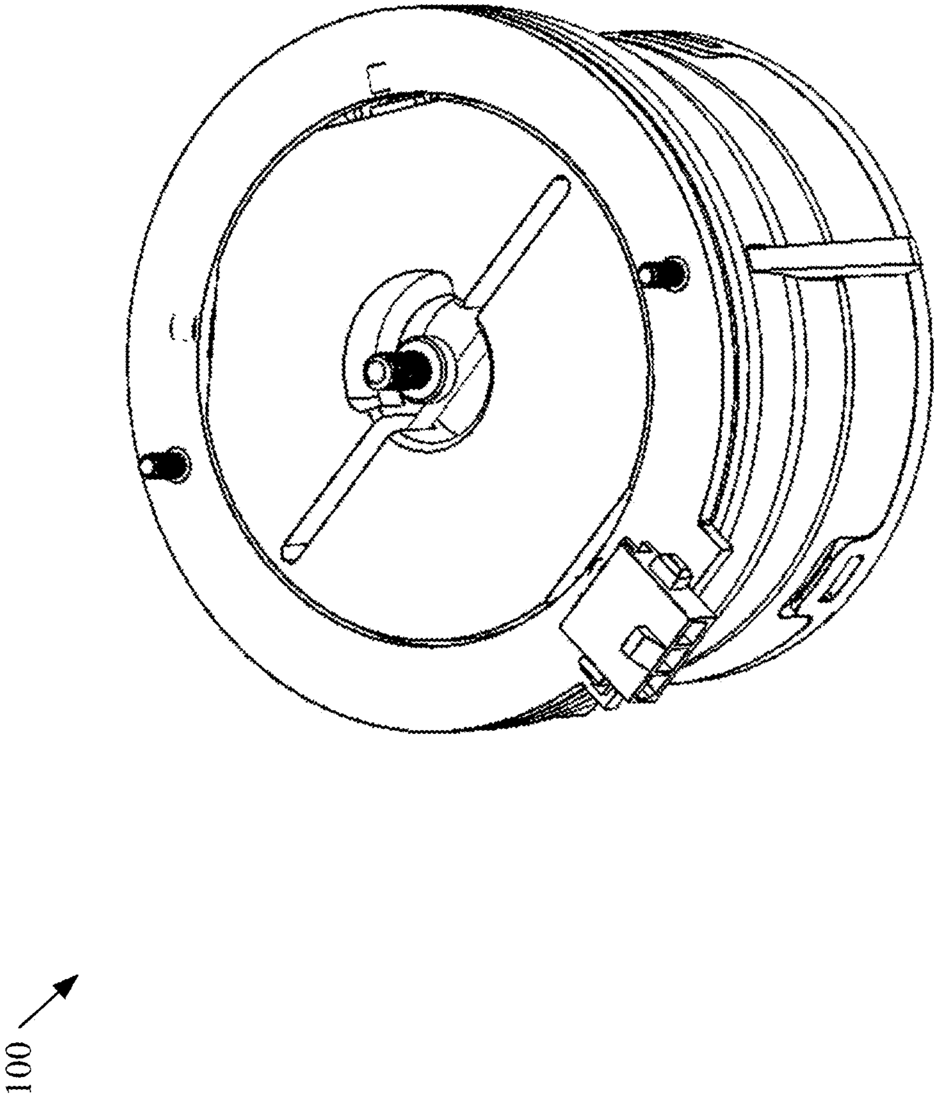

FIG. 184 on sheet 180 of the drawings is a screenshot of Twist-Lock-related features of the examples [100*a-d*] of the lighting system.

Figure 185:
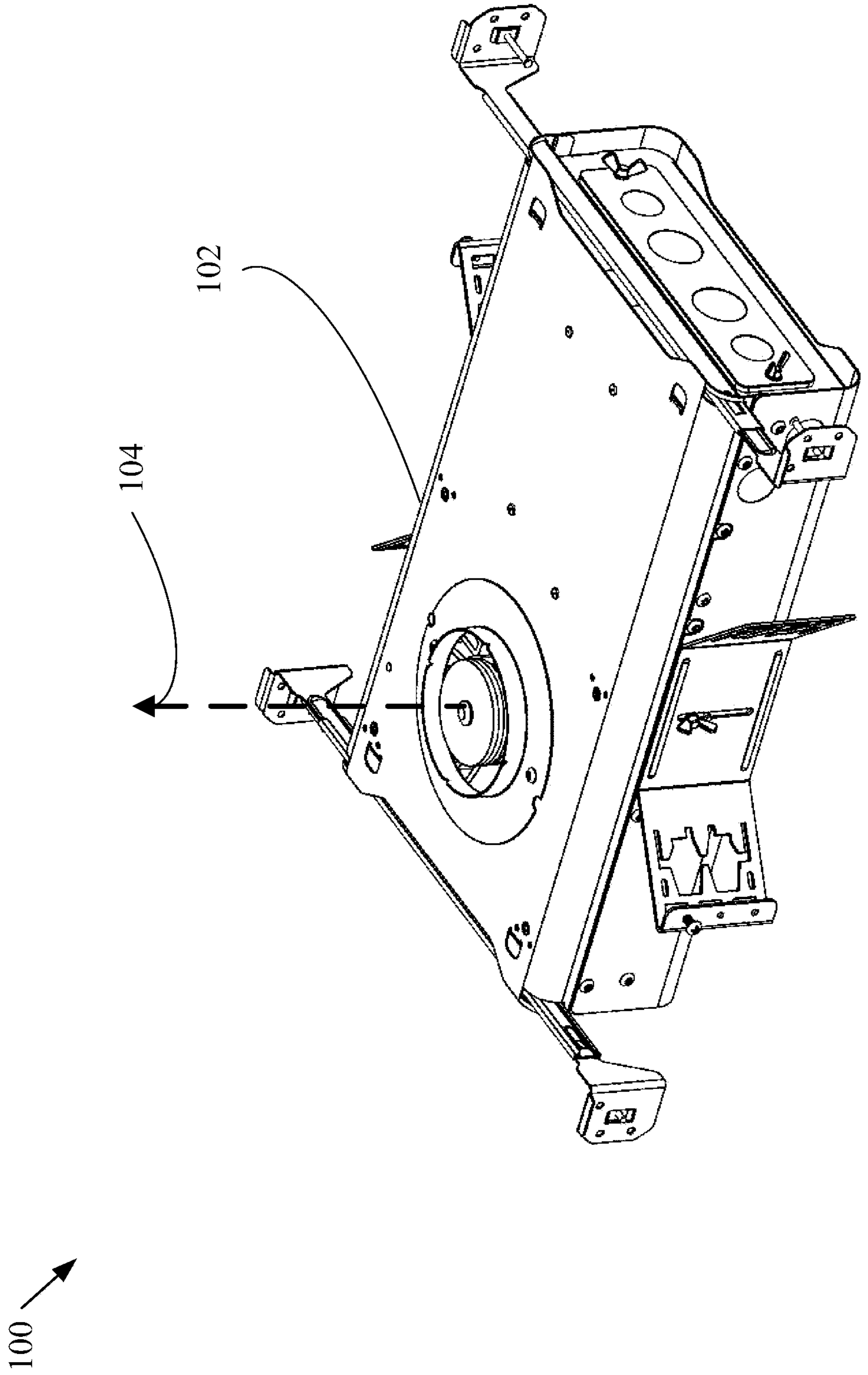

FIG. 185 on sheet 181 of the drawings is a screenshot of Pluggable Power Supply-related features of the examples [100*a-d*] of the lighting system.

Figure 186:
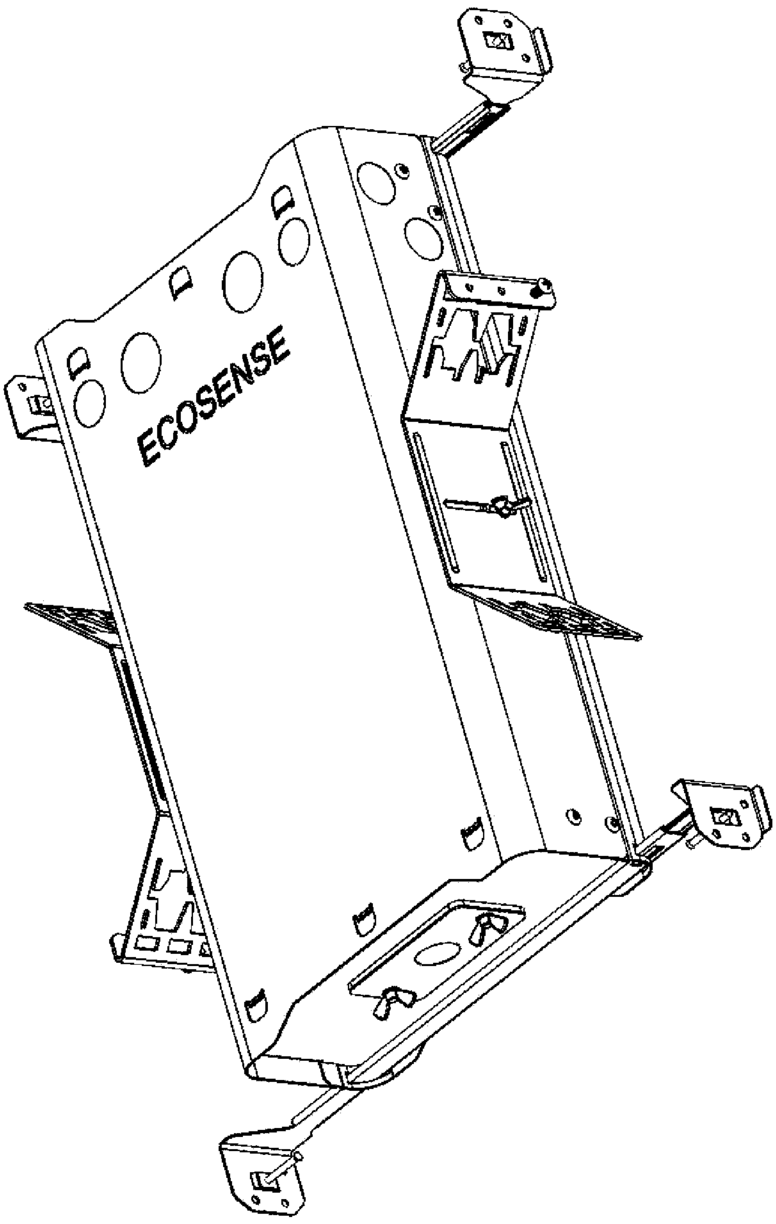

FIG. 186 on sheet 182 of the drawings is a screenshot of Pluggable Power Supply-related features of the examples [100*a-d*] of the lighting system.

Figure 187:
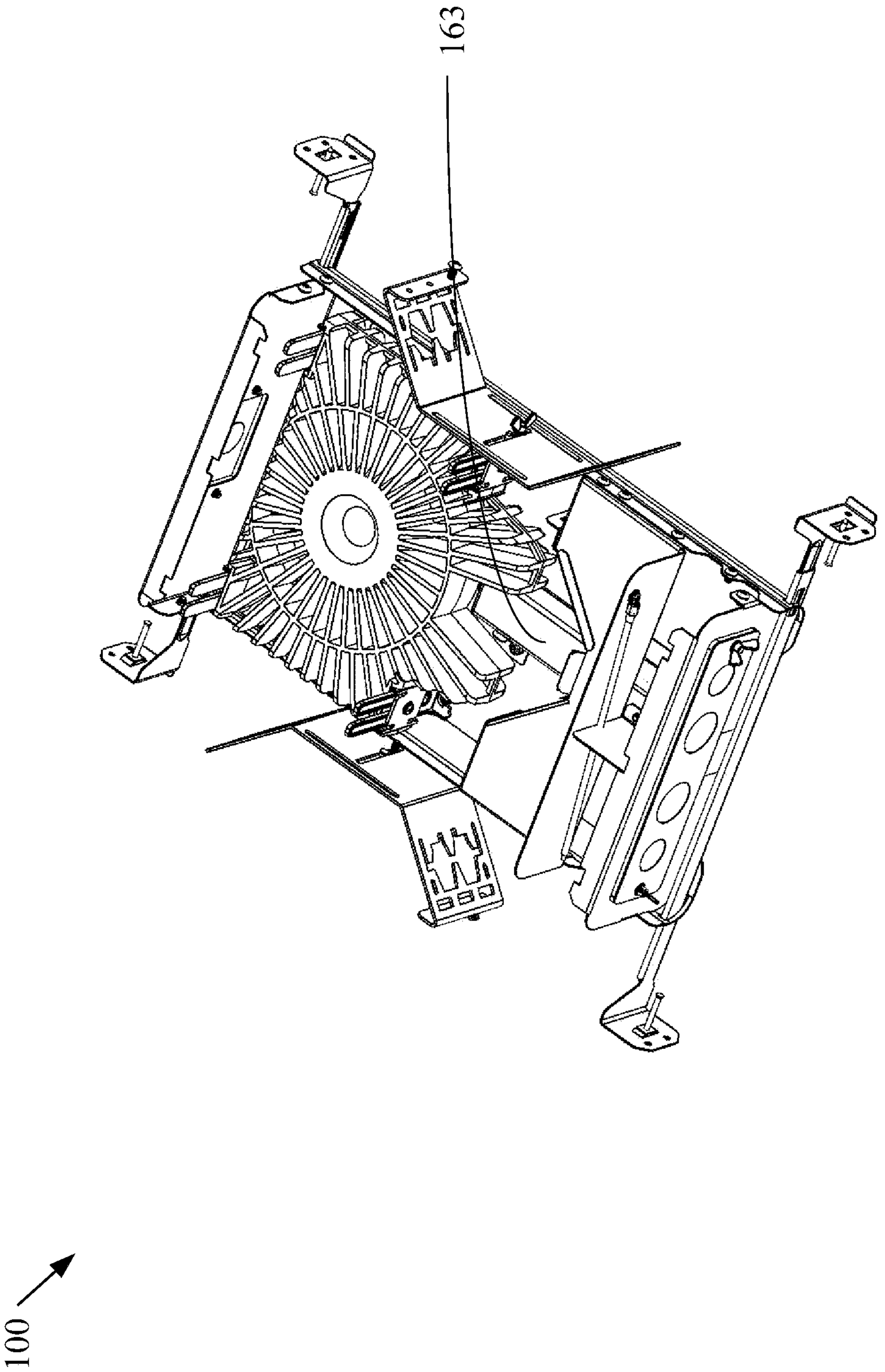

FIG. 187 on sheet 183 of the drawings is a screenshot of Pluggable Power Supply-related features of the examples [100*a-d*] of the lighting system.

Figure 188:
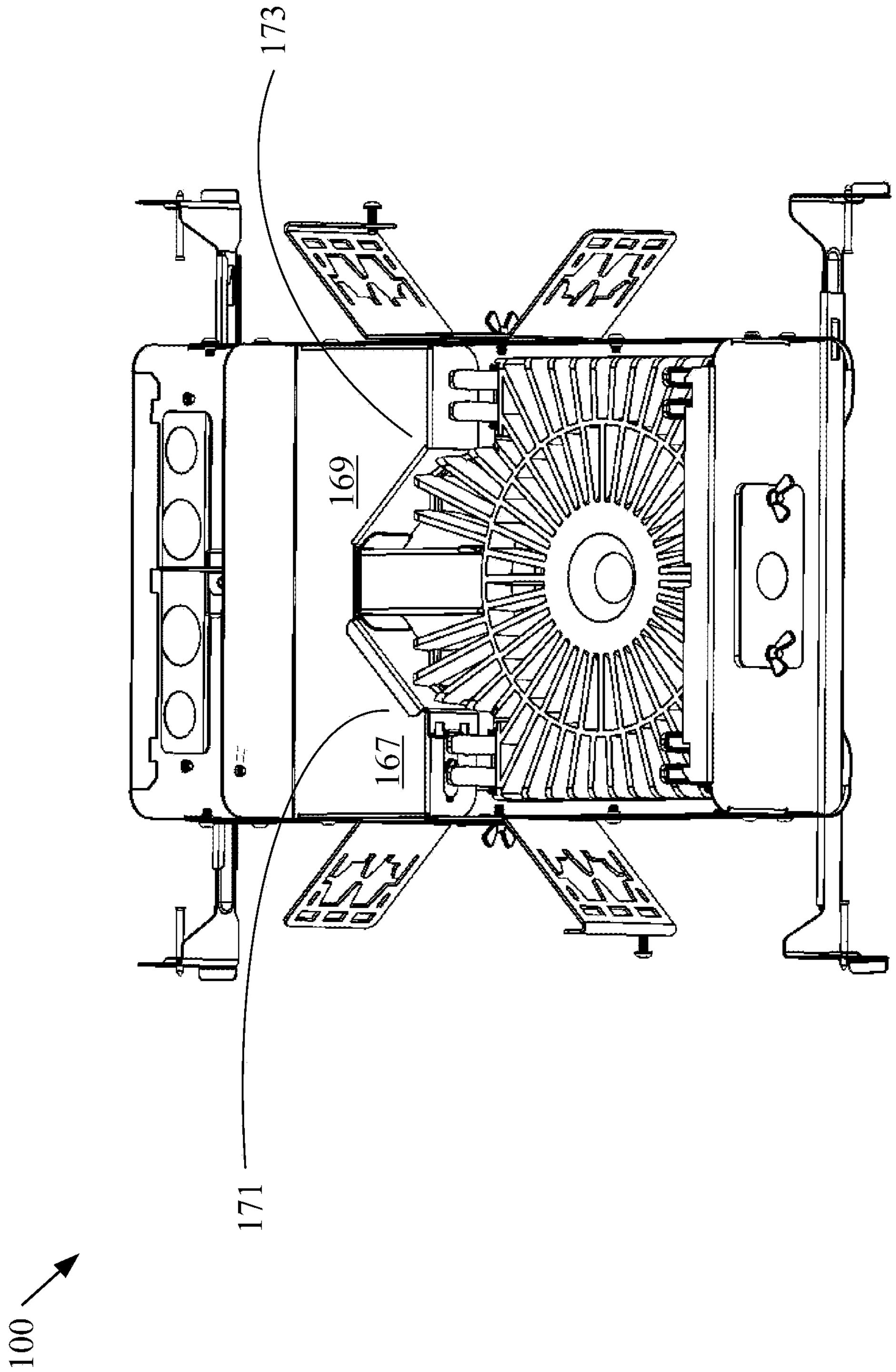

FIG. 188 on sheet 184 of the drawings is a screenshot of Pluggable Power Supply-related features of the examples [100*a-d*] of the lighting system.

Figure 189:
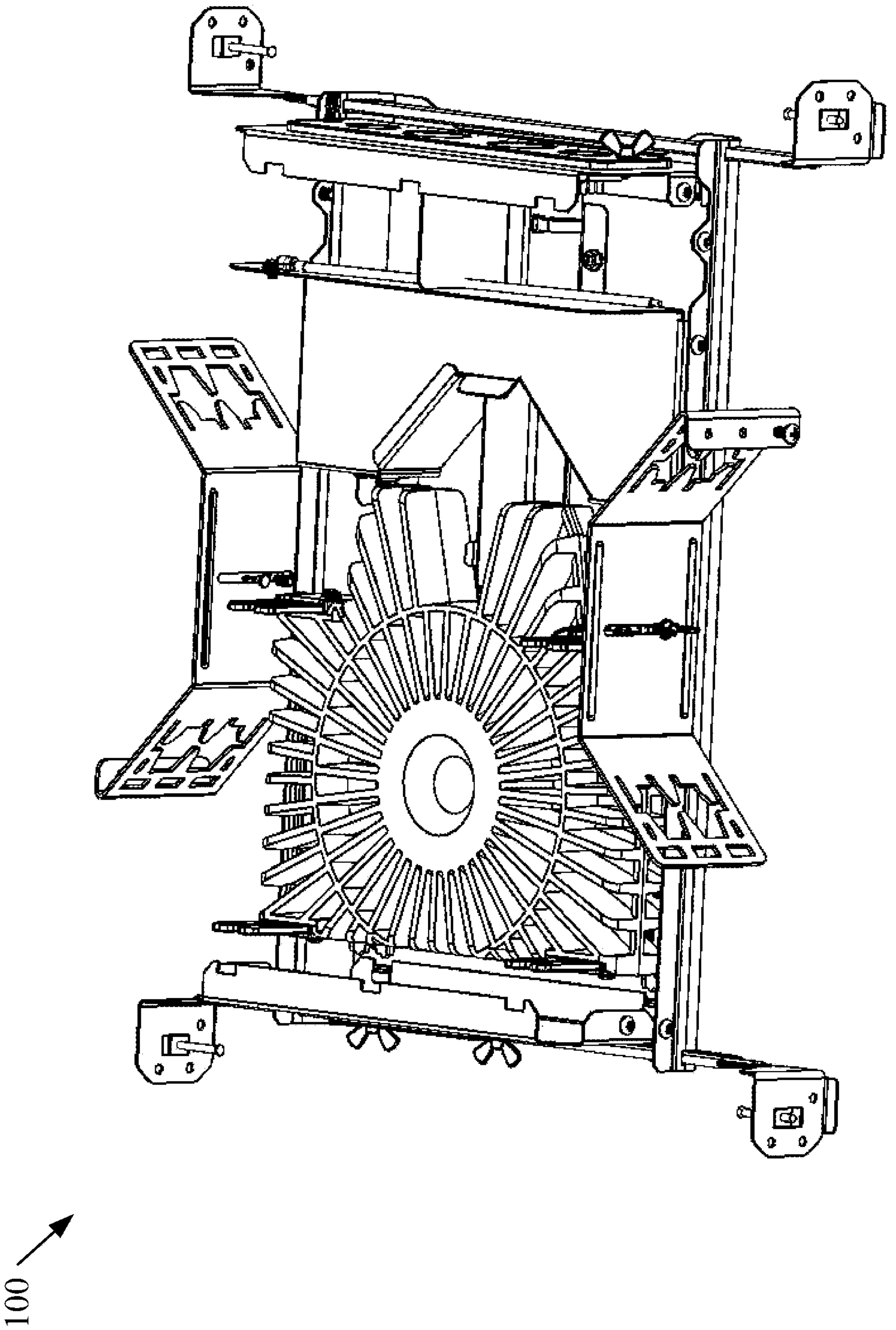

FIG. 189 on sheet 185 of the drawings is a screenshot of Pluggable Power Supply-related features of the examples [100*a-d*] of the lighting system.

Figure 190:
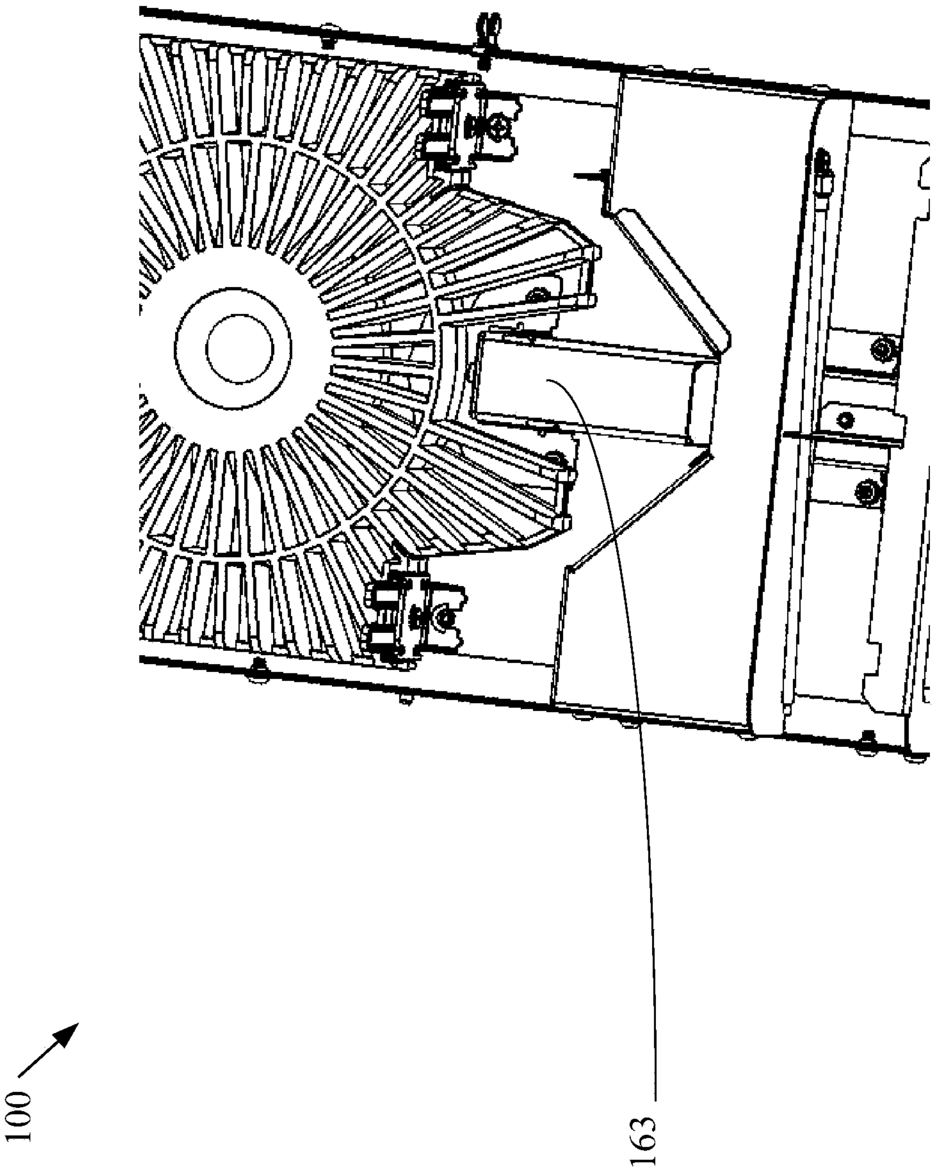

FIG. 190 on sheet 186 of the drawings is a screenshot of Pluggable Power Supply-related features of the examples [100*a-d*] of the lighting system.

Figure 191:
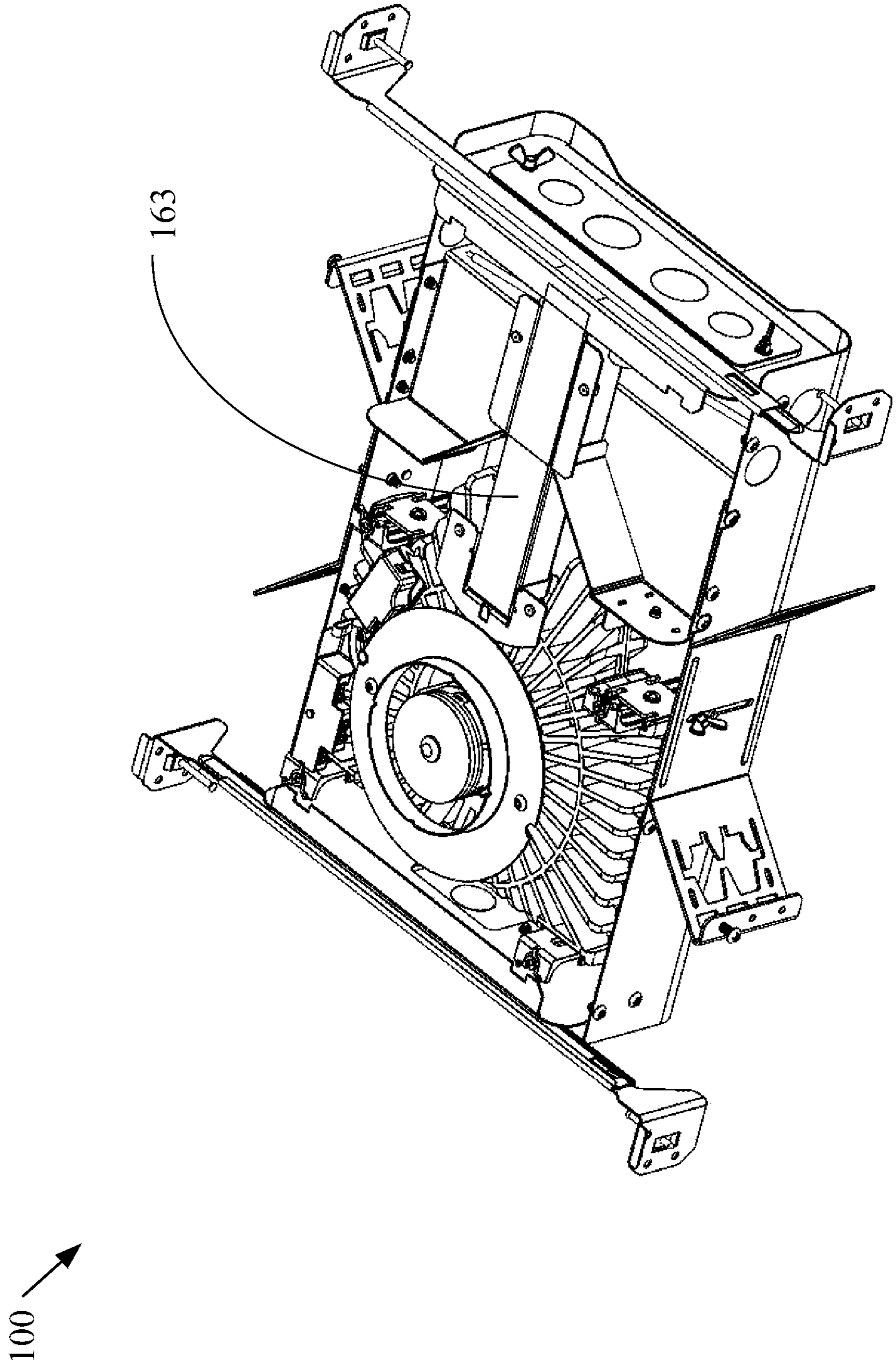

FIG. 191 on sheet 187 of the drawings is a screenshot of Pluggable Power Supply-related features of the examples [100*a-d*] of the lighting system.

Figure 192:
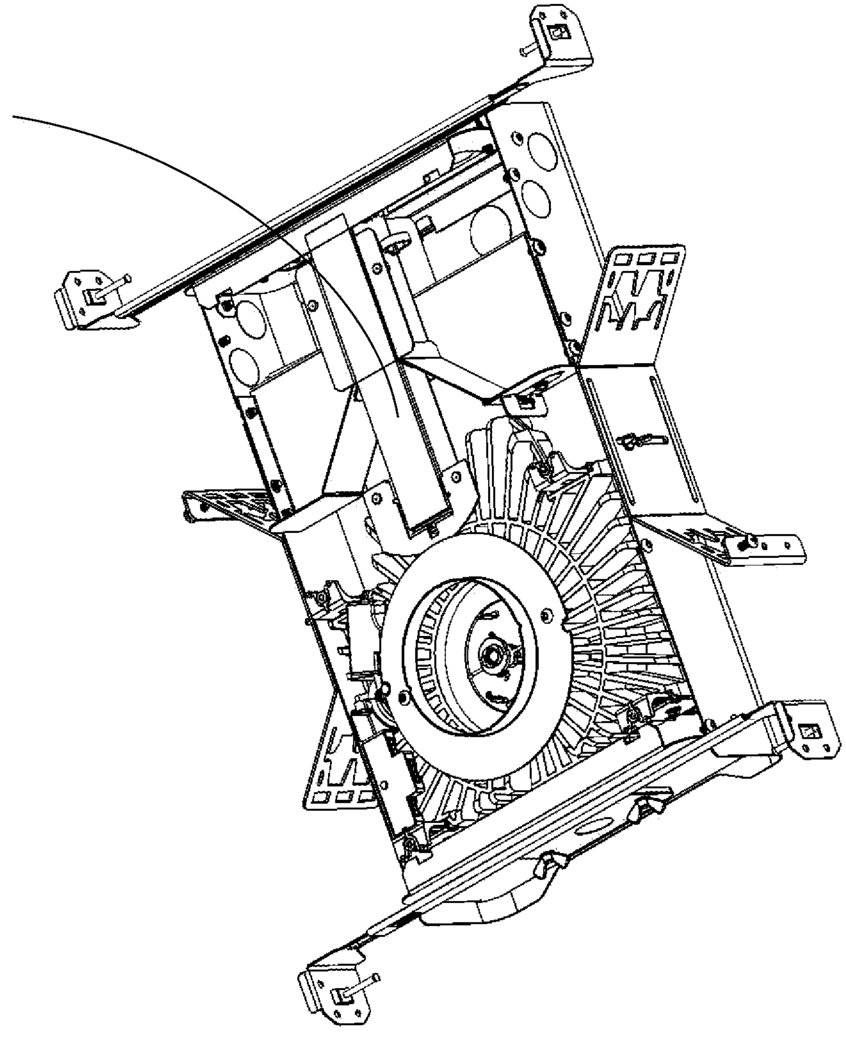

FIG. 192 on sheet 188 of the drawings is a screenshot of Pluggable Power Supply-related features of the examples [100*a-d*] of the lighting system.

Figure 193:
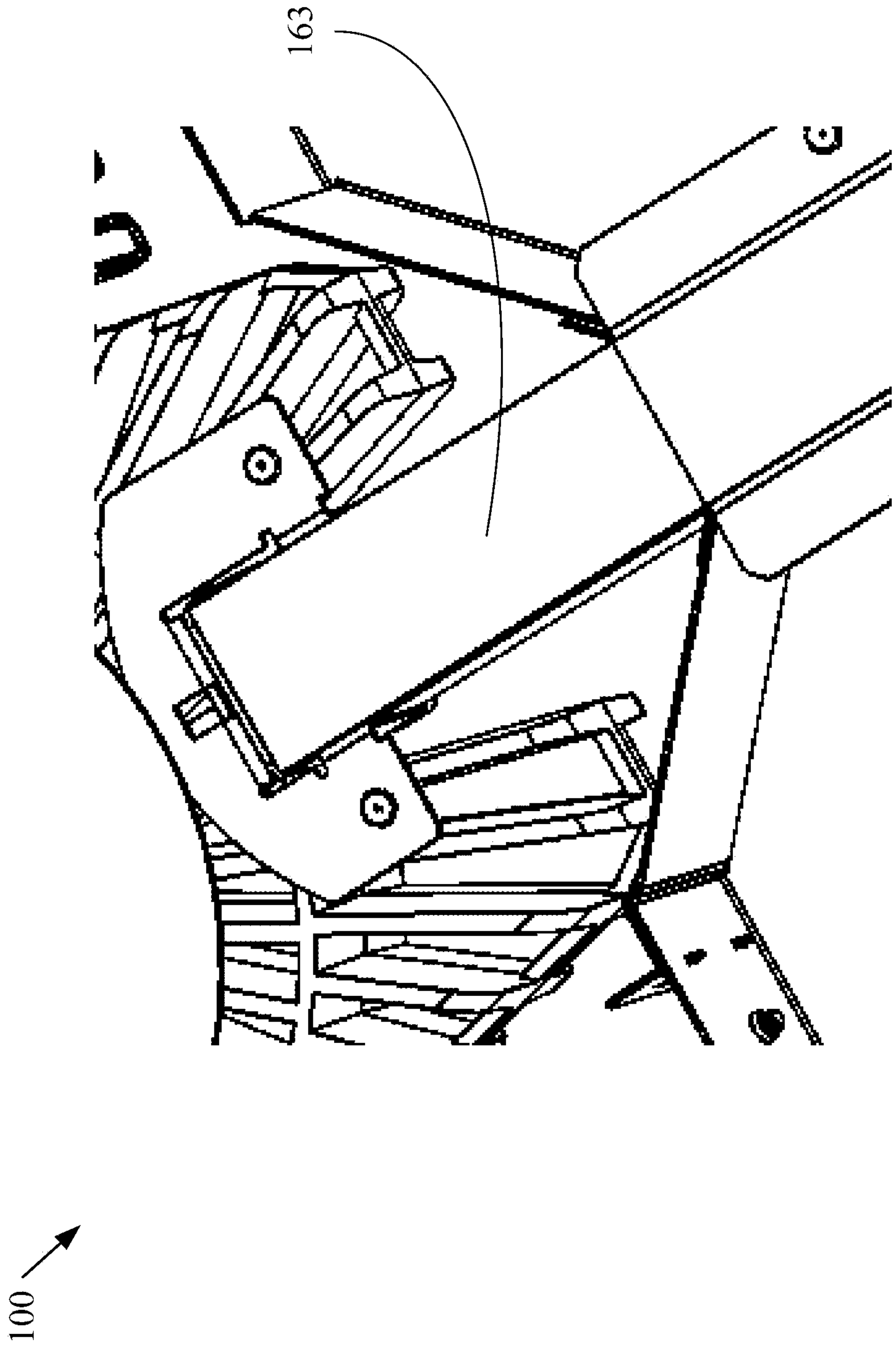

FIG. 193 on sheet 189 of the drawings is a screenshot of Pluggable Power Supply-related features of the examples [100*a-d*] of the lighting system.

Figure 194:
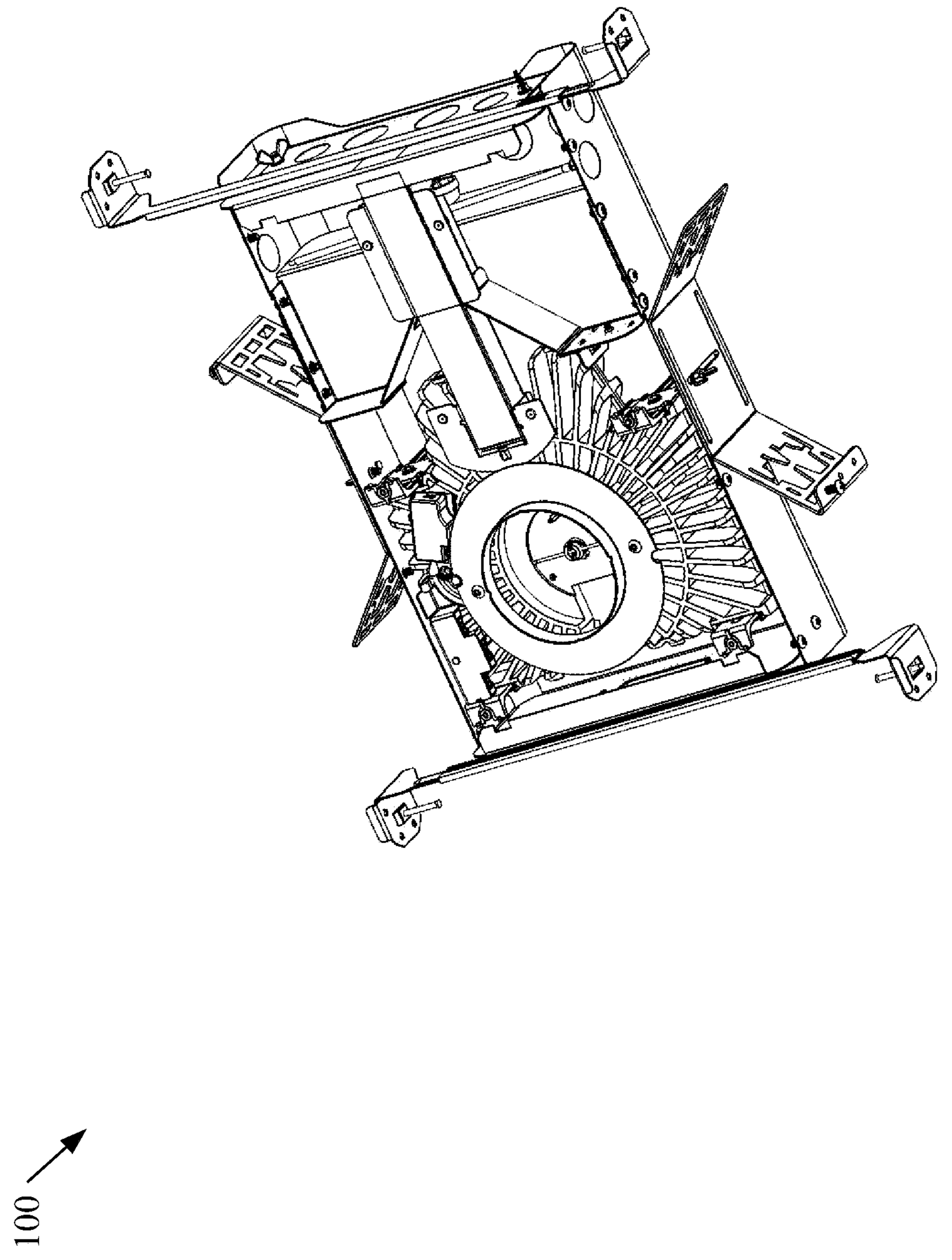

FIG. 194 on sheet 190 of the drawings is a screenshot of Pluggable Power Supply-related features of the examples [100*a-d*] of the lighting system.

Figure 195:
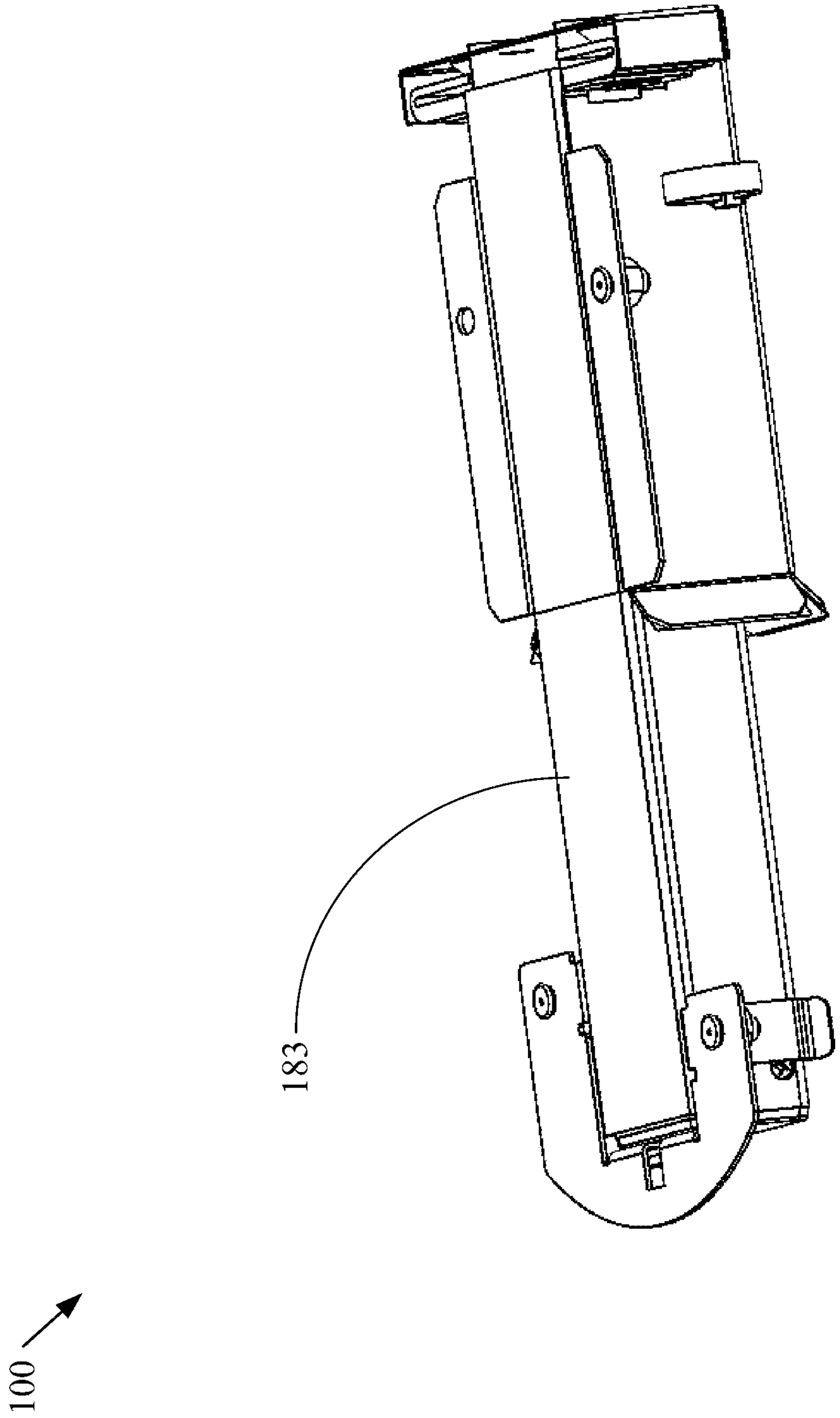

FIG. 195 on sheet 191 of the drawings is a screenshot of Pluggable Power Supply-related features of the examples [100*a-d*] of the lighting system.

Figure 196:
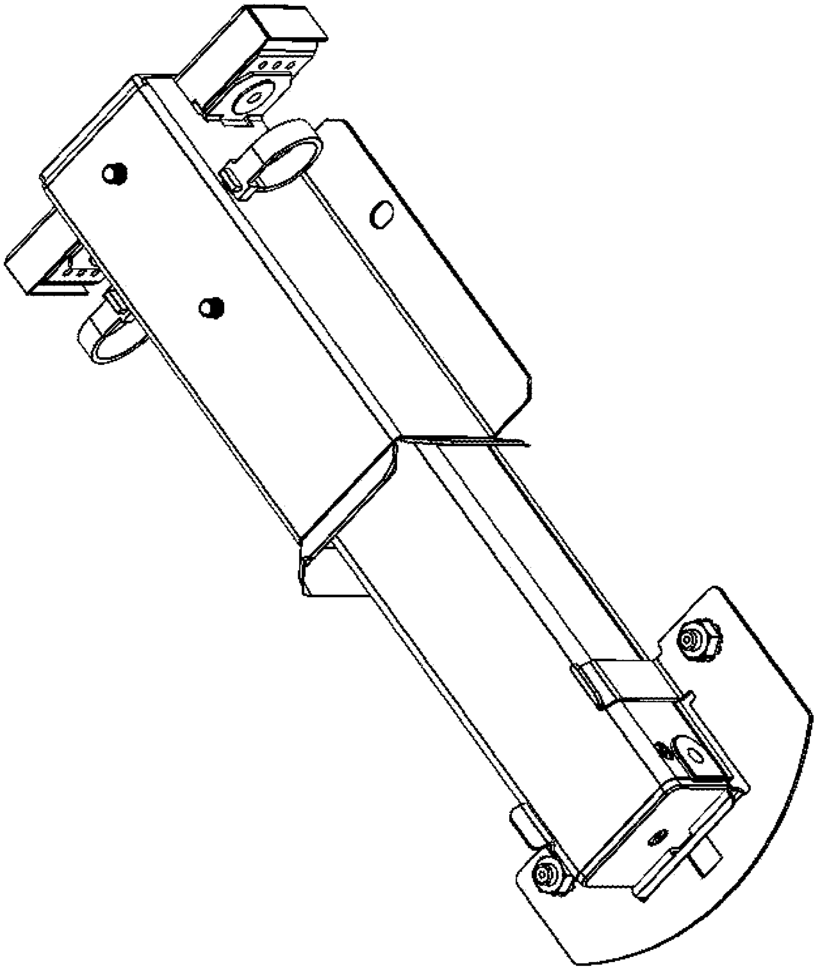

FIG. 196 on sheet 192 of the drawings is a screenshot of Pluggable Power Supply-related features of the examples [100*a-d*] of the lighting system.

Figure 197:
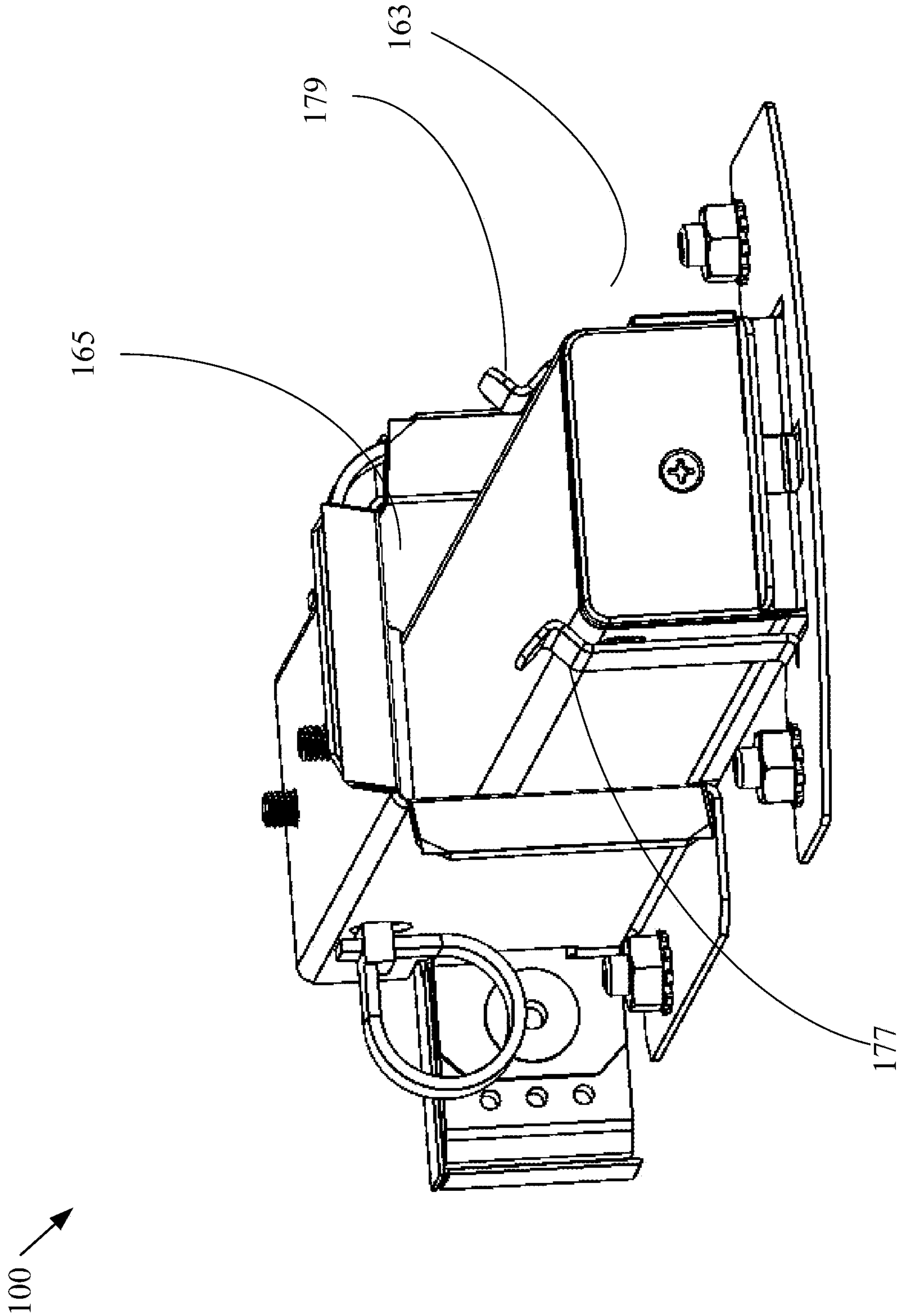

FIG. 197 on sheet 193 of the drawings is a screenshot of Pluggable Power Supply-related features of the examples [100*a-d*] of the lighting system.

Figure 198:
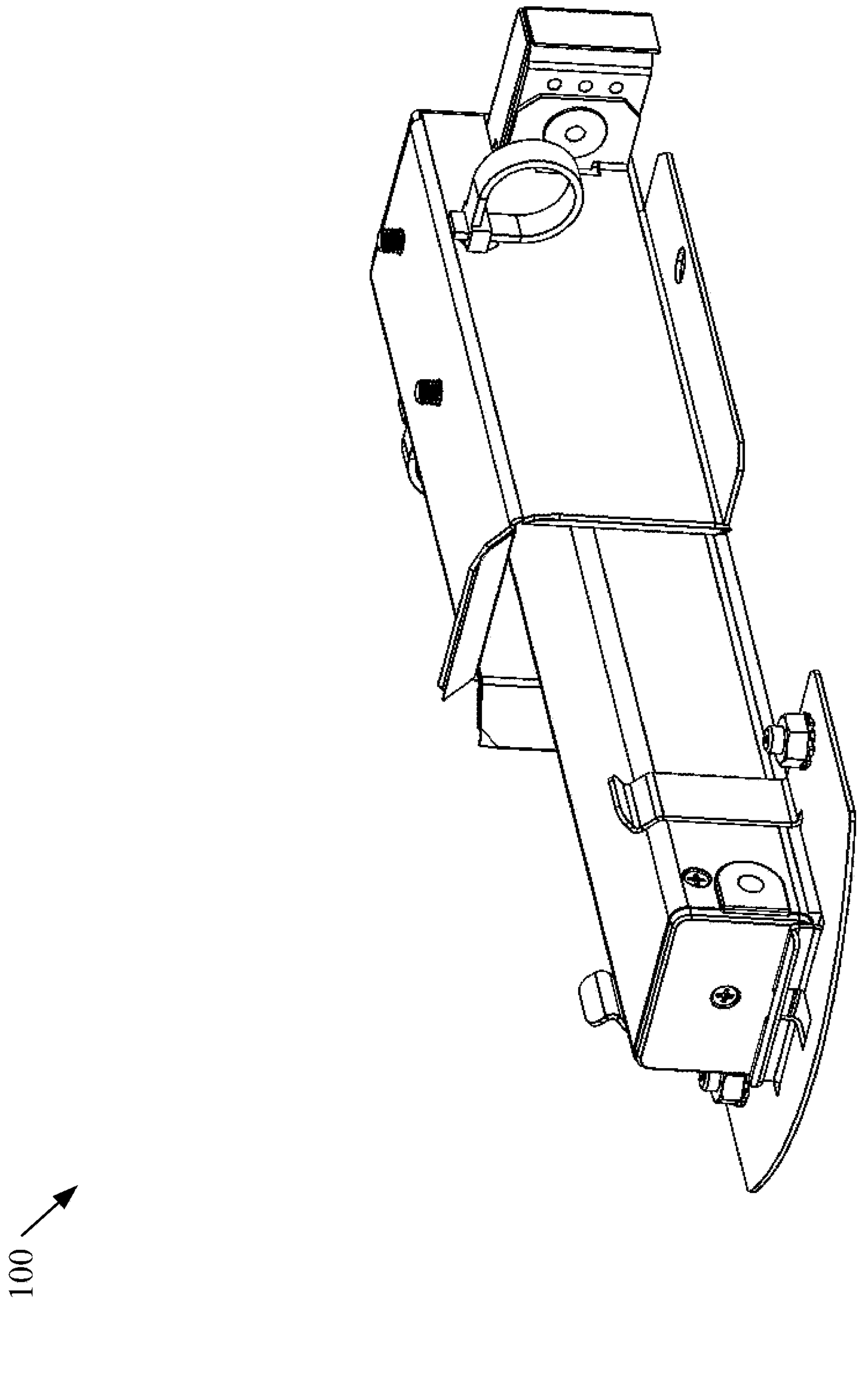

FIG. 198 on sheet 194 of the drawings is a screenshot of Pluggable Power Supply-related features of the examples [100*a-d*] of the lighting system.

Figure 199:
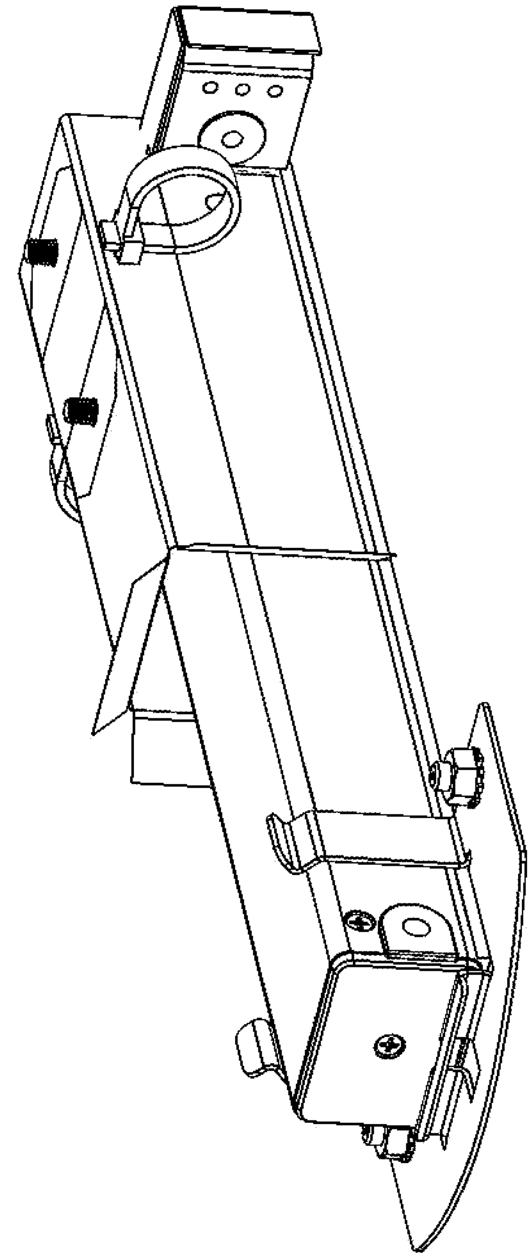

FIG. 199 on sheet 195 of the drawings is a screenshot of Pluggable Power Supply-related features of the examples [100*a-d*] of the lighting system.

Figure 200:
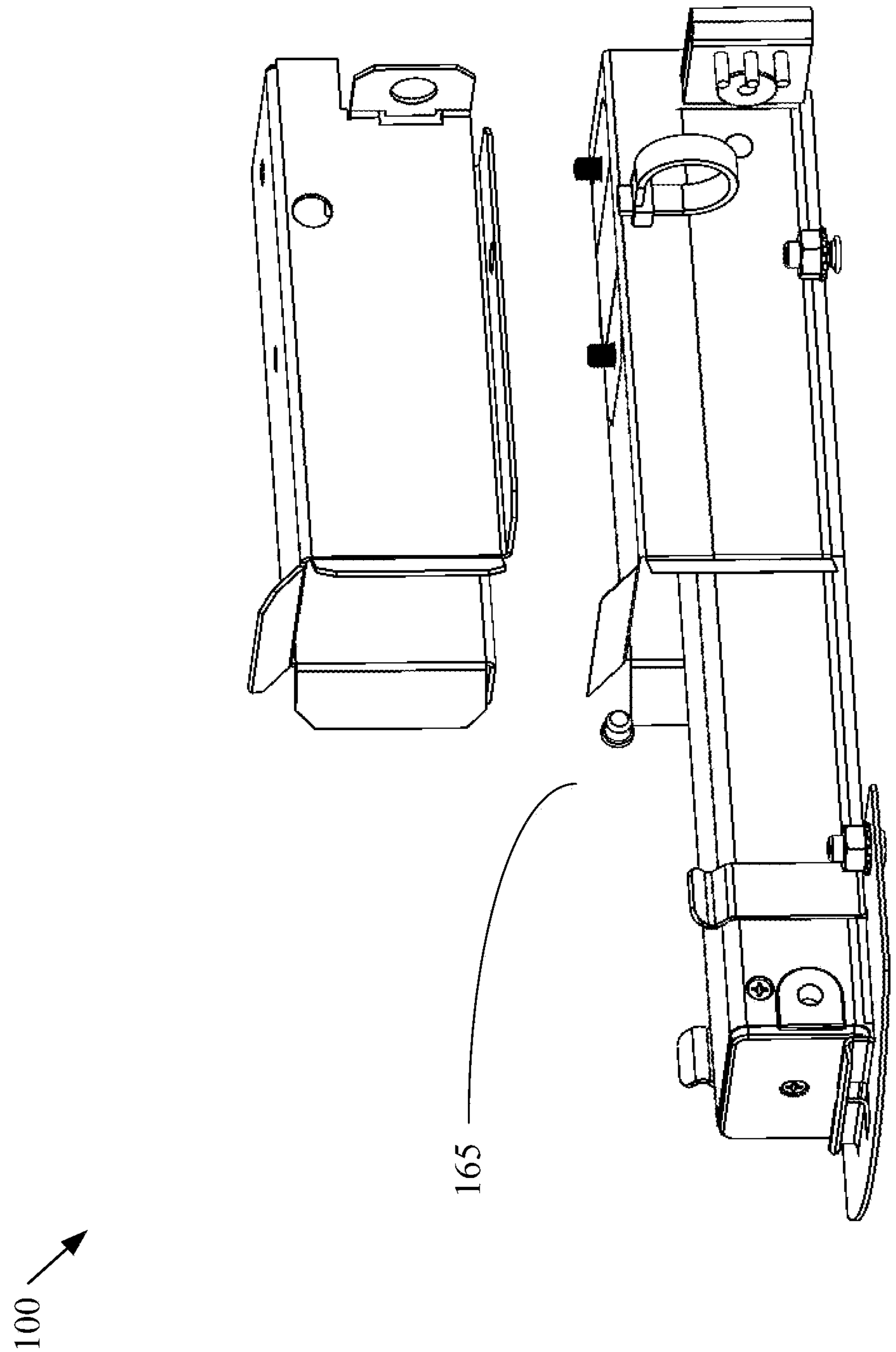

FIG. 200 on sheet 196 of the drawings is a screenshot of Pluggable Power Supply-related features of the examples [100*a-d*] of the lighting system.

Figure 201:
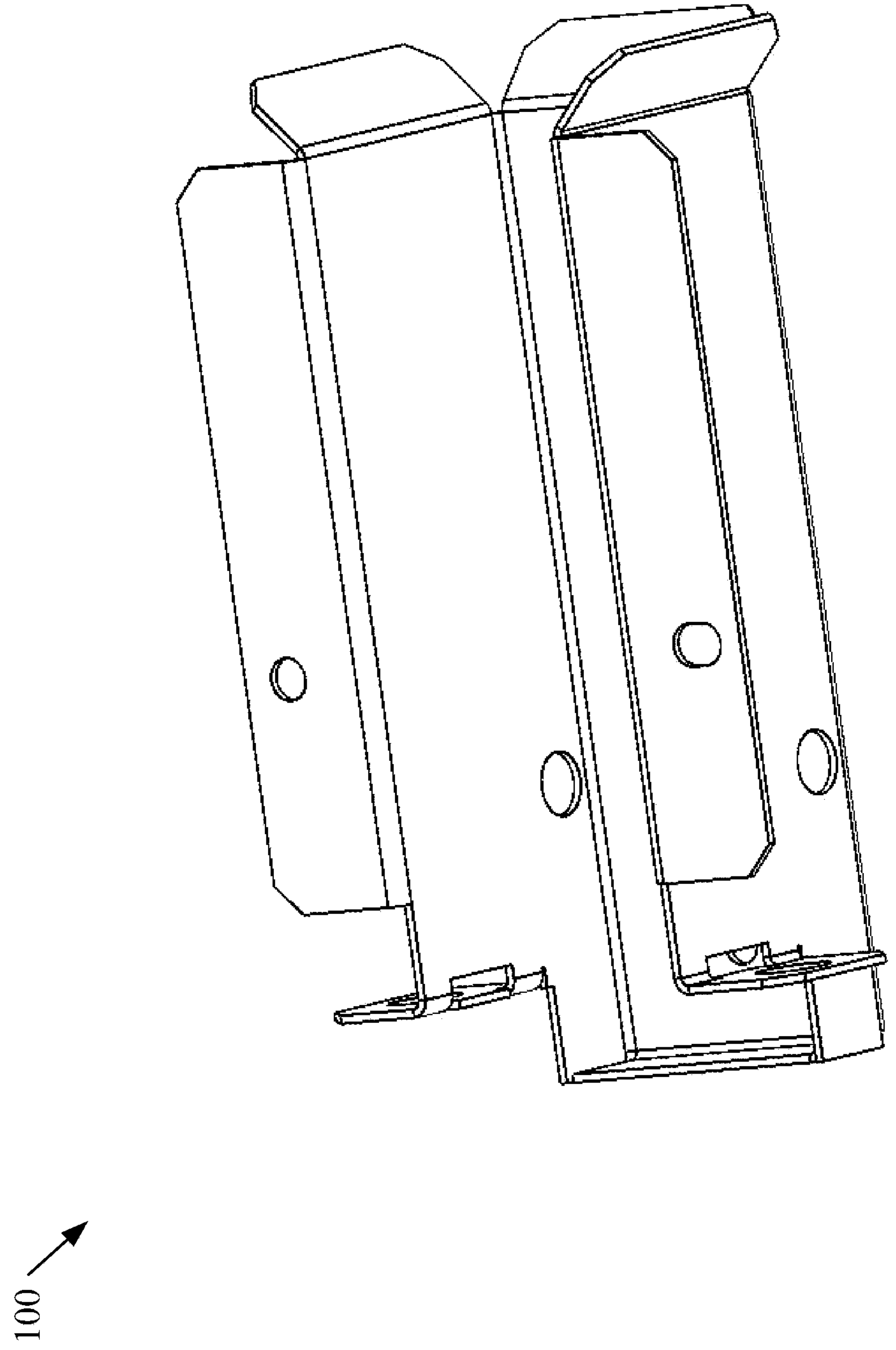

FIG. 201 on sheet 197 of the drawings is a screenshot of Pluggable Power Supply-related features of the examples [100*a-d*] of the lighting system.

Figure 202:
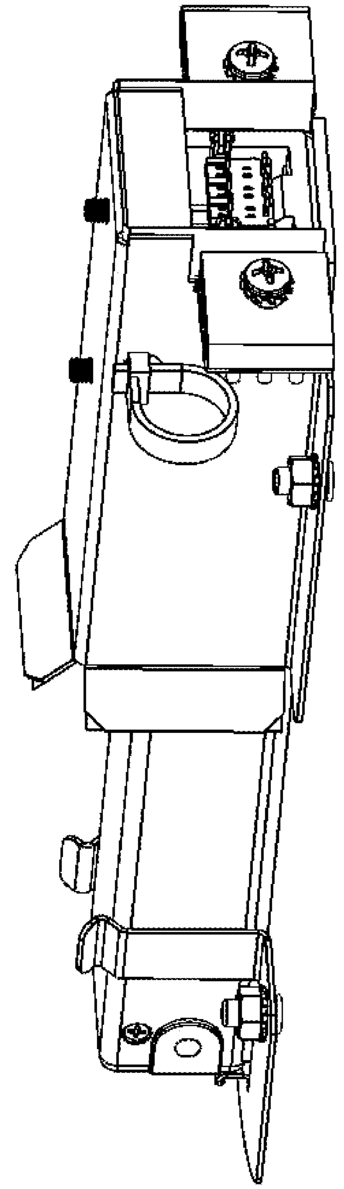

FIG. 202 on sheet 198 of the drawings is a screenshot of Pluggable Power Supply-related features of the examples [100*a-d*] of the lighting system.

Figure 203:
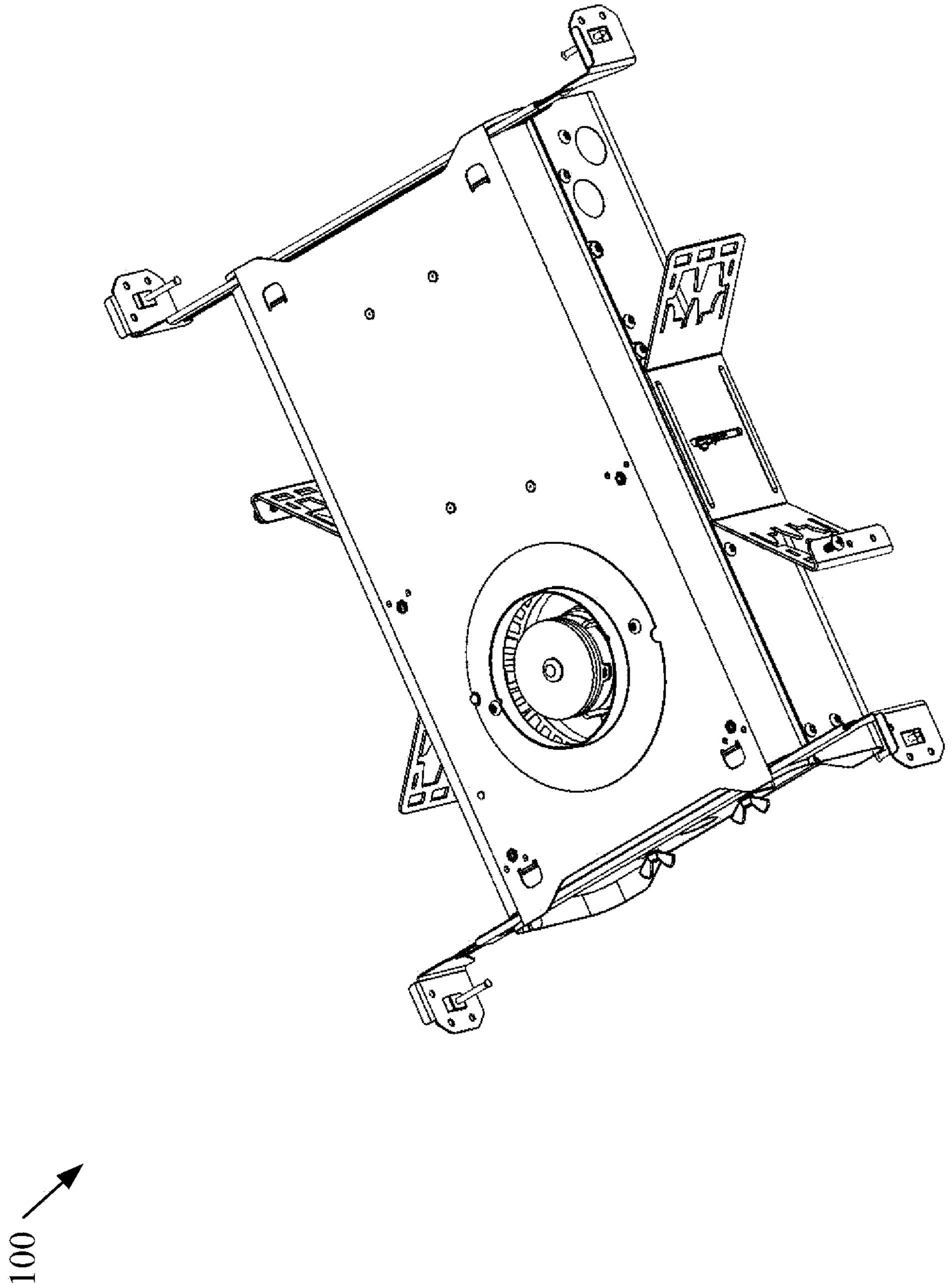

FIG. 203 on sheet 199 of the drawings is a screenshot of Pluggable Power Supply-related features of the examples [100*a-d*] of the lighting system.

Figure 204:
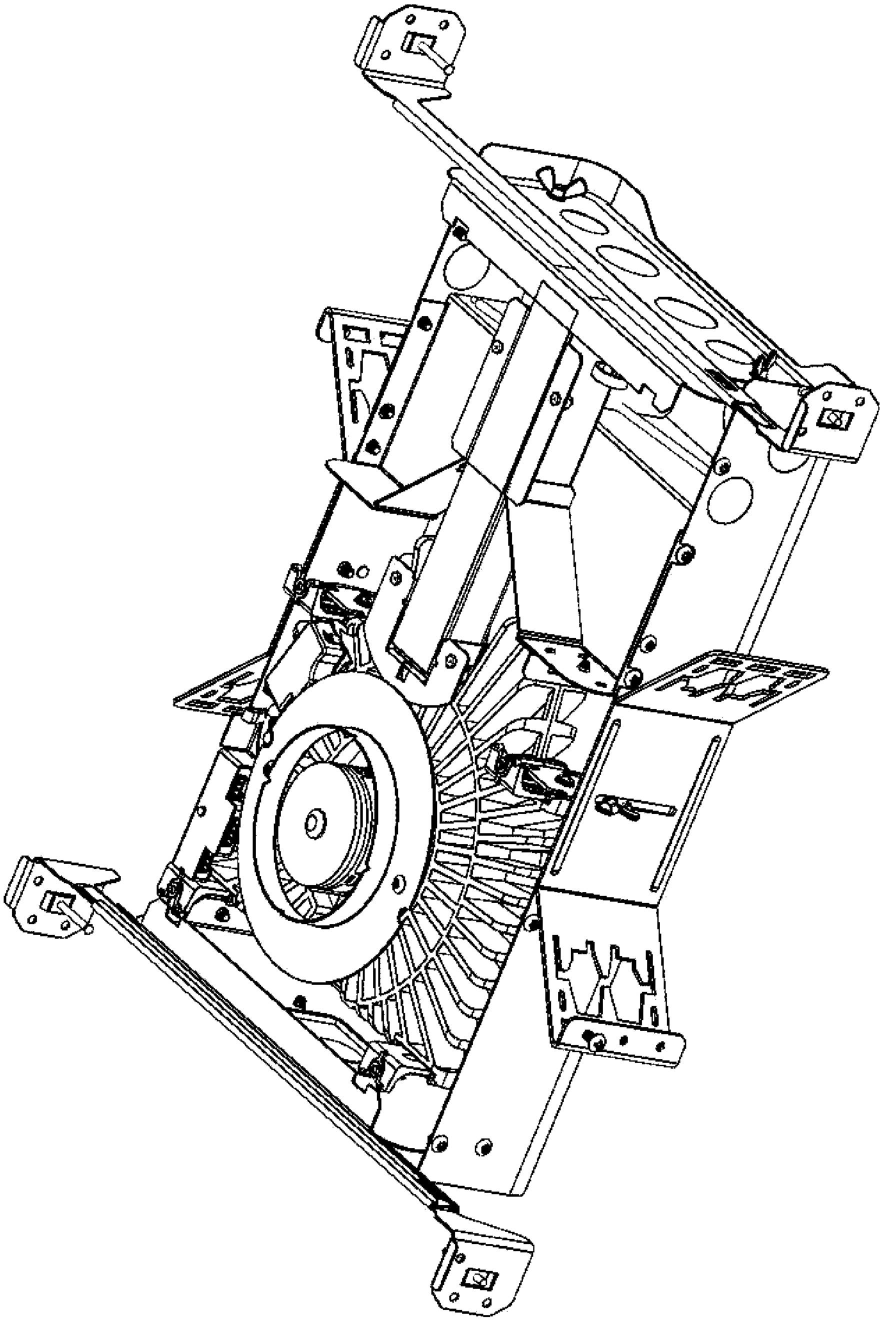

FIG. 204 on sheet 200 of the drawings is a screenshot of Pluggable Power Supply-related features of the examples [100*a-d*] of the lighting system.

Figure 205:
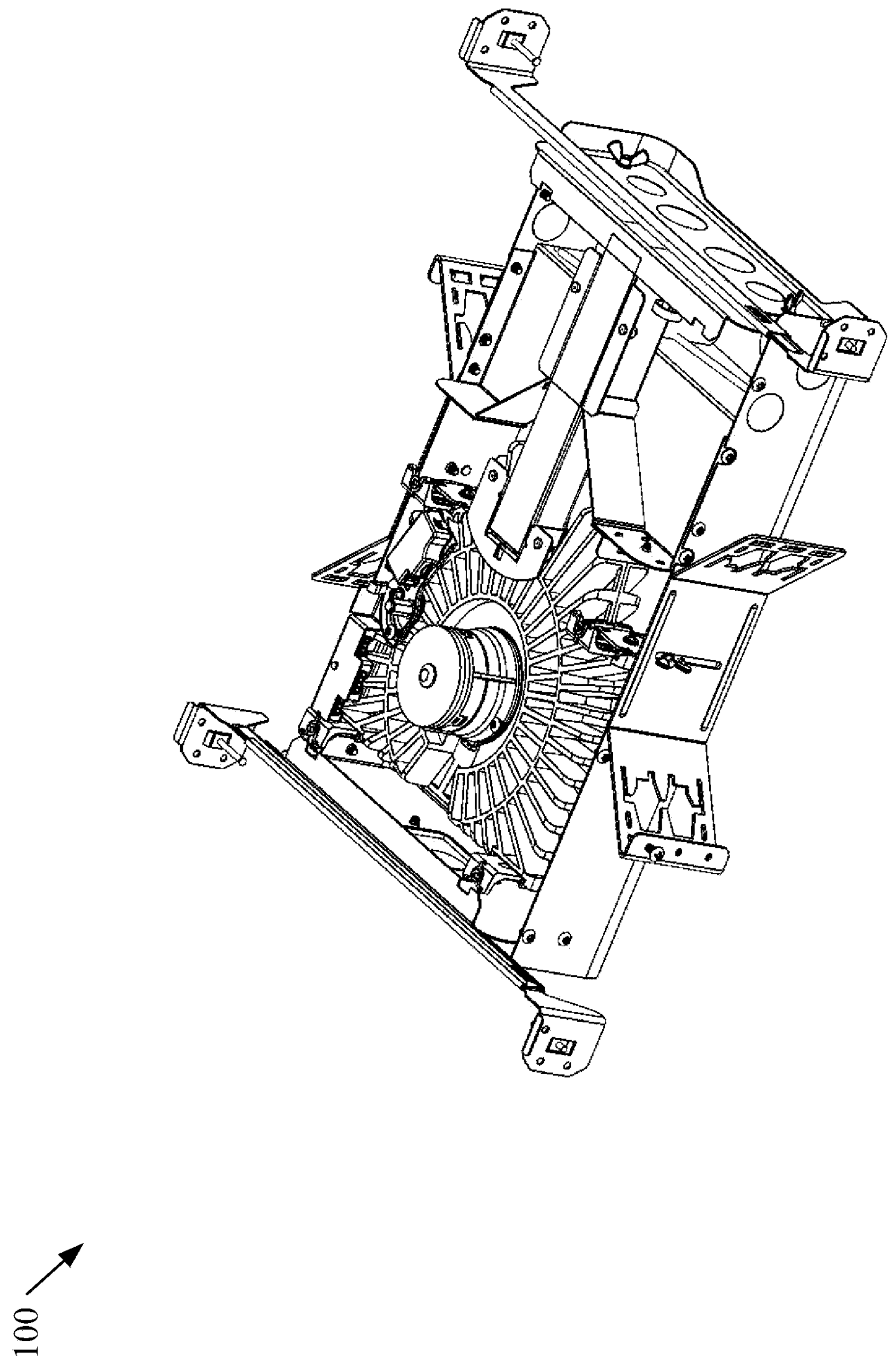

FIG. 205 on sheet 201 of the drawings is a screenshot of Pluggable Power Supply-related features of the examples [100*a-d*] of the lighting system.

Figure 206:
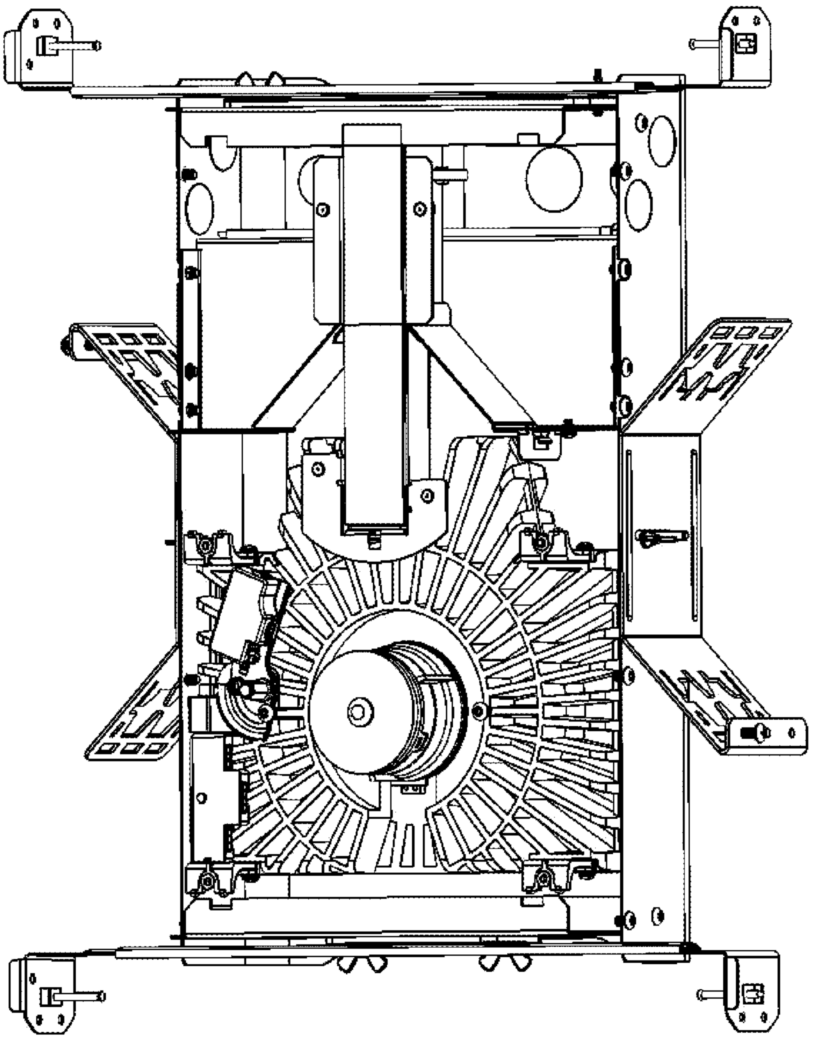

FIG. 206 on sheet 202 of the drawings is a screenshot of Pluggable Power Supply-related features of the examples [100*a-d*] of the lighting system.

Figure 207:
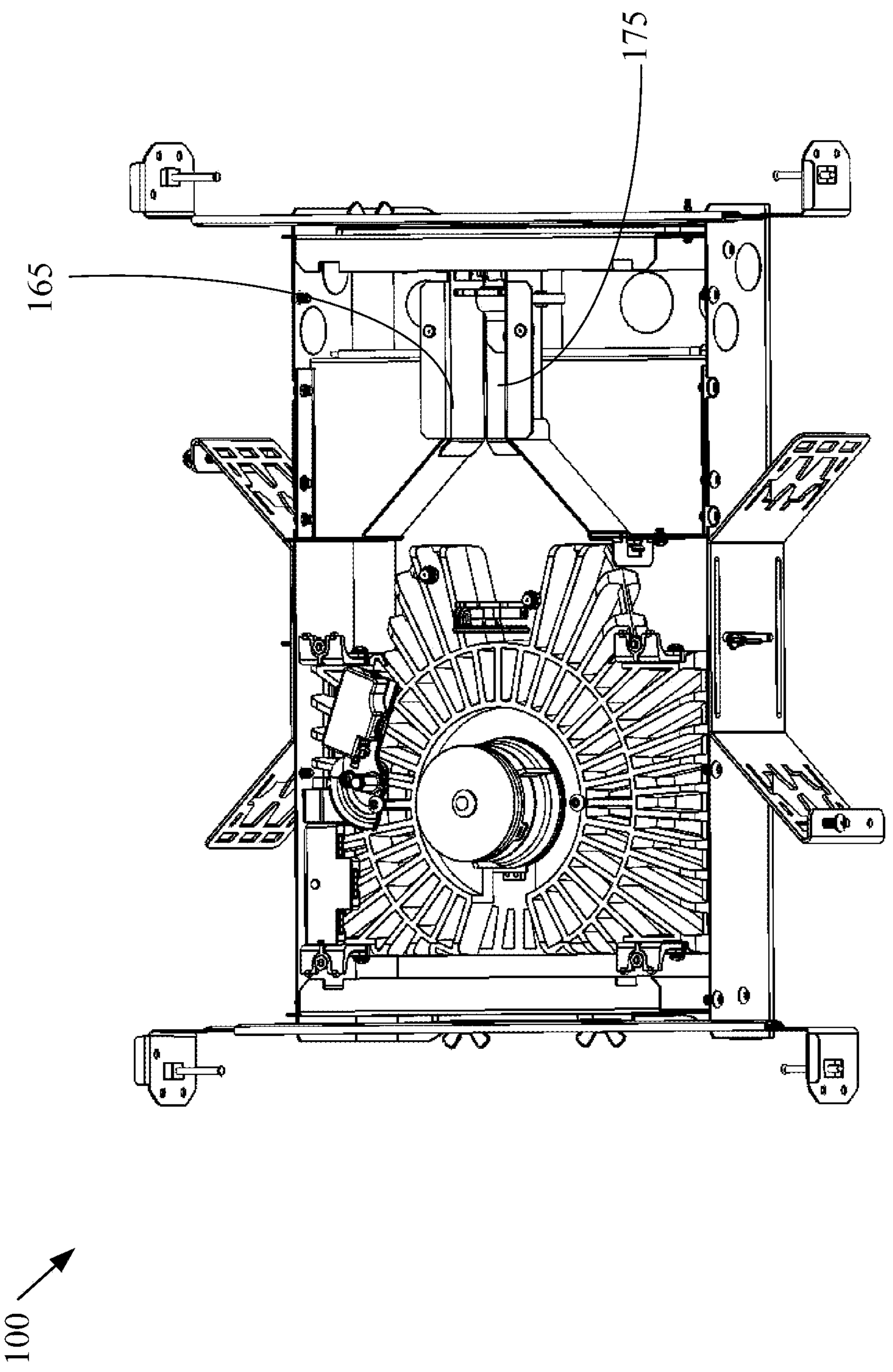

FIG. 207 on sheet 203 of the drawings is a screenshot of Pluggable Power Supply-related features of the examples [100*a-d*] of the lighting system.

Figure 208:
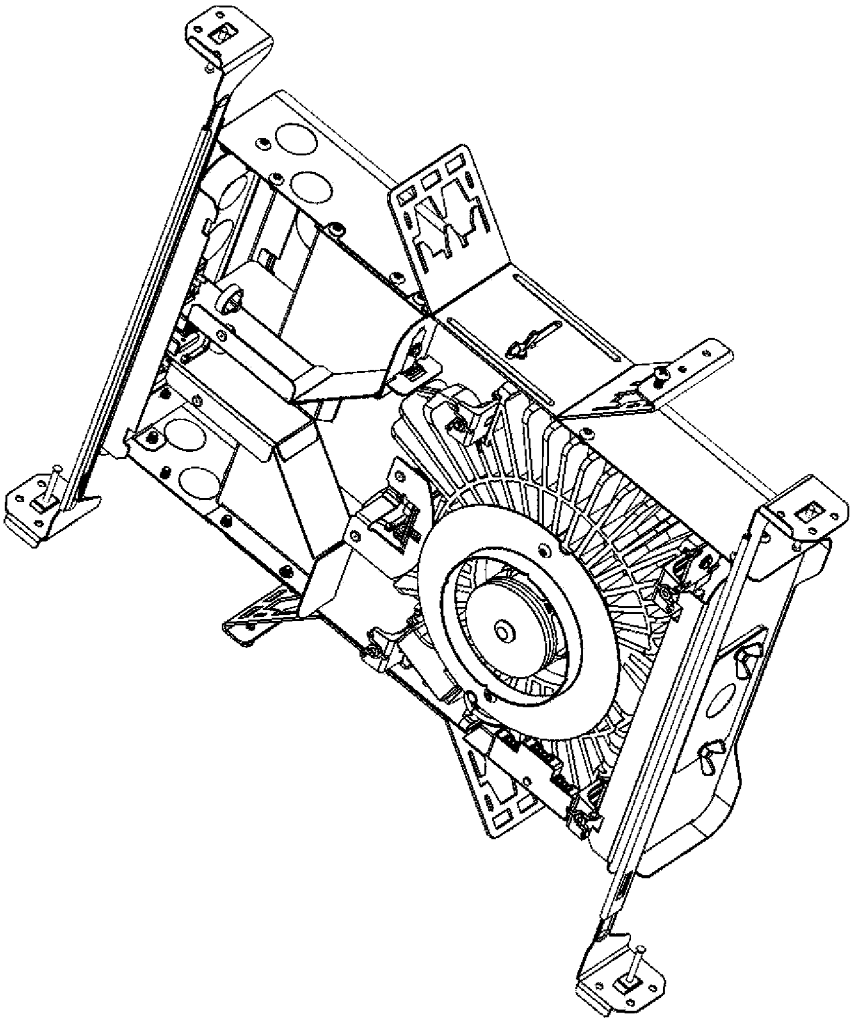

FIG. 208 on sheet 204 of the drawings is a screenshot of Pluggable Power Supply-related features of the examples [100*a-d*] of the lighting system.

Figure 209:
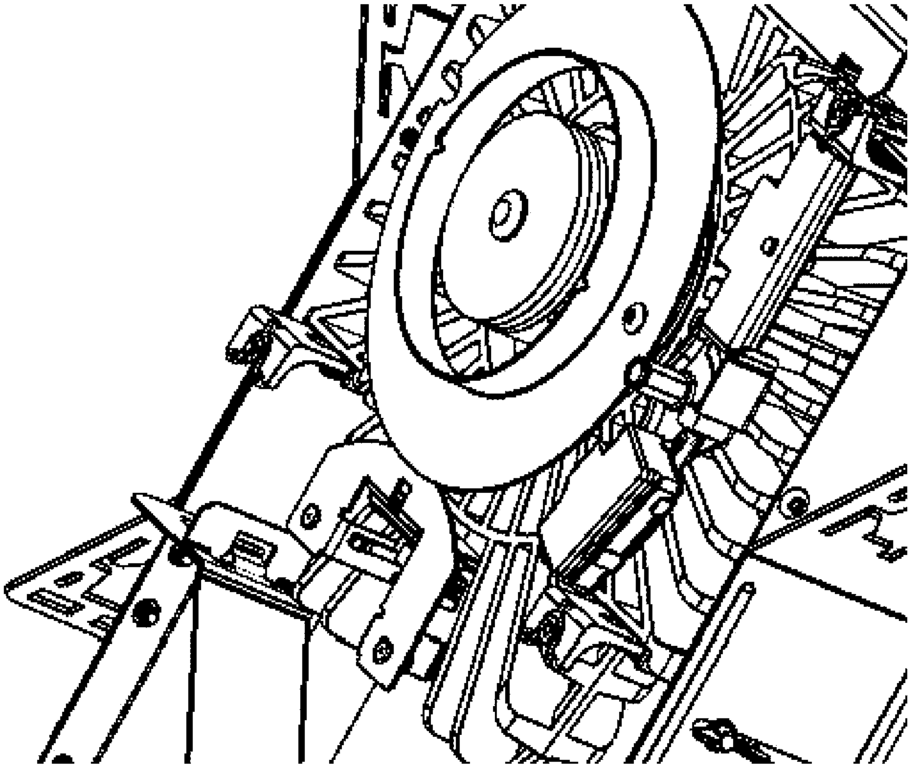

FIG. 209 on sheet 205 of the drawings is a screenshot of Pluggable Power Supply-related features of the examples [100*a-d*] of the lighting system.

Figure 210:
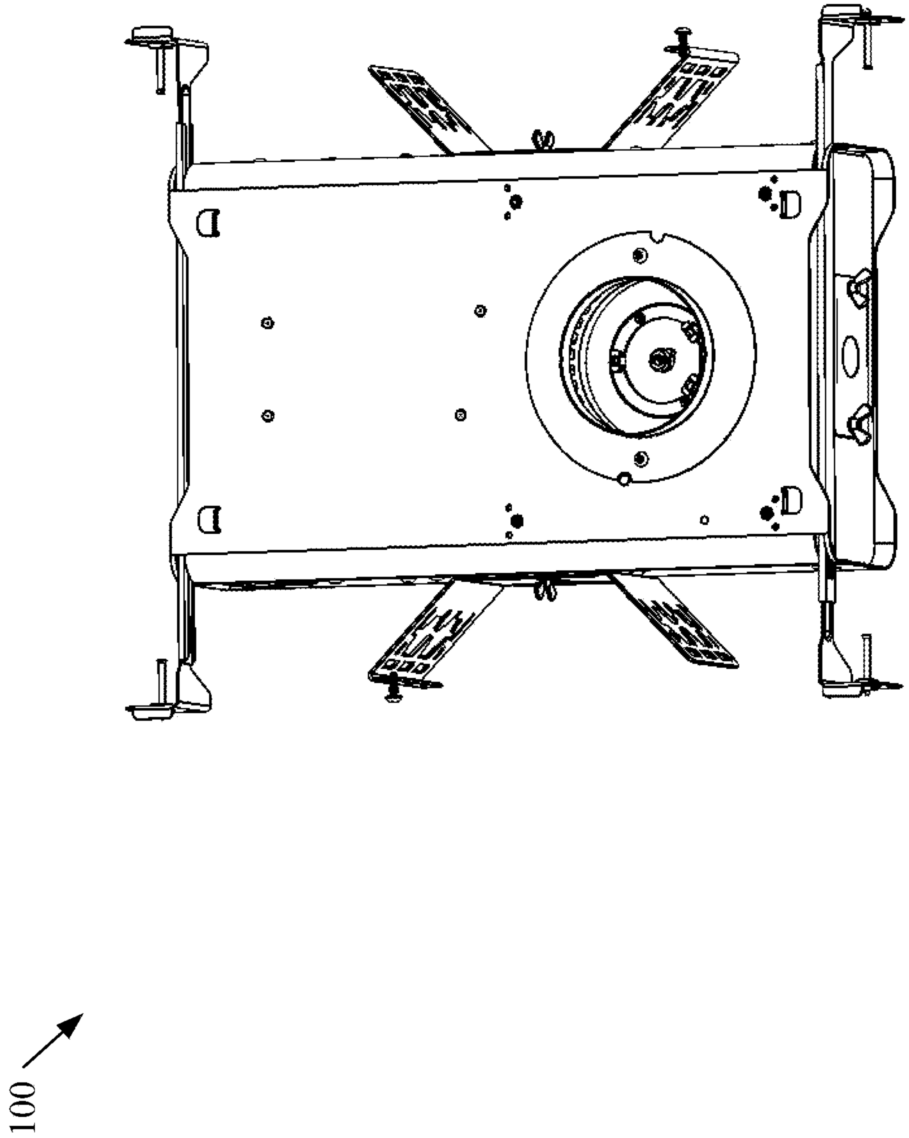

FIG. 210 on sheet 206 of the drawings is a screenshot of Pluggable Power Supply-related features of the examples [100*a-d*] of the lighting system.

Figure 211:
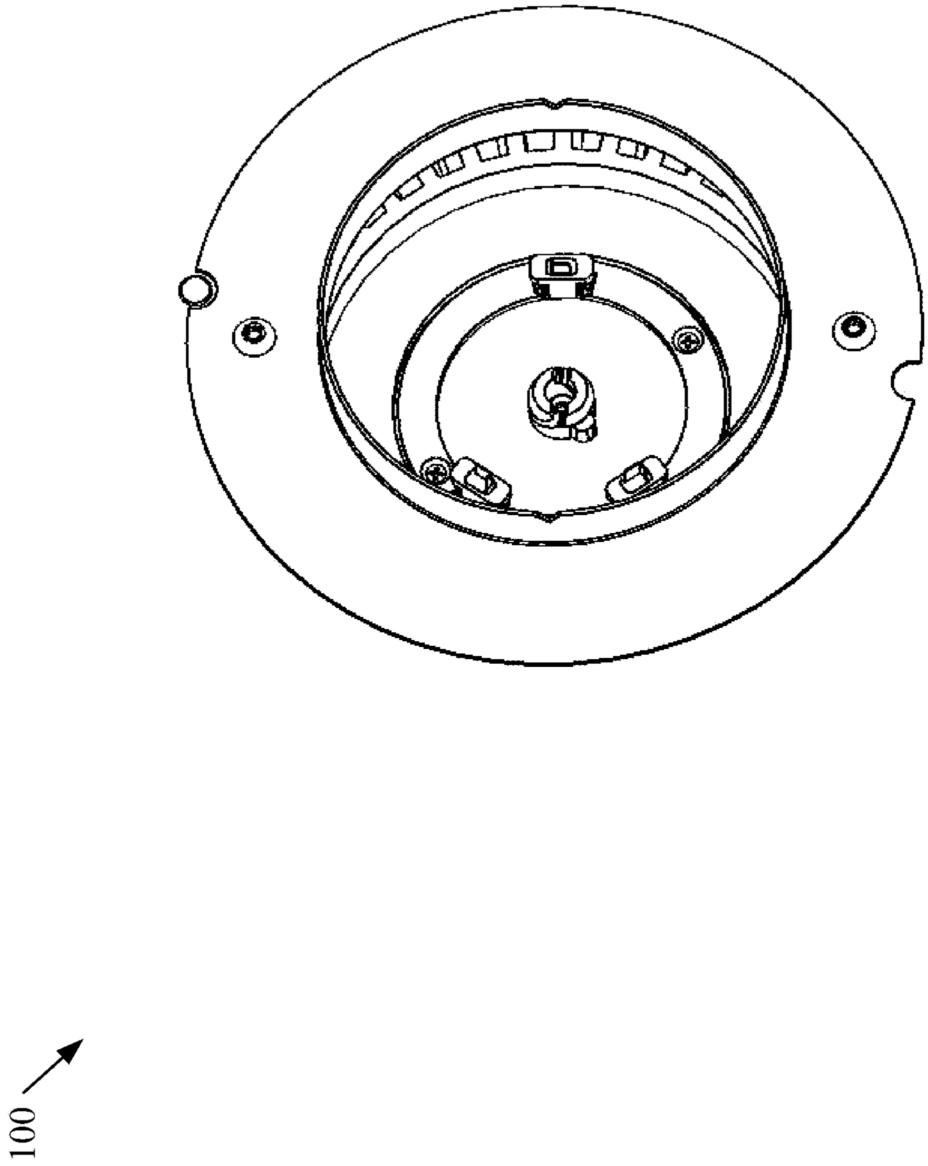

FIG. 211 on sheet 207 of the drawings is a screenshot of Pluggable Power Supply-related features of the examples [100*a-d*] of the lighting system.

Figure 212:
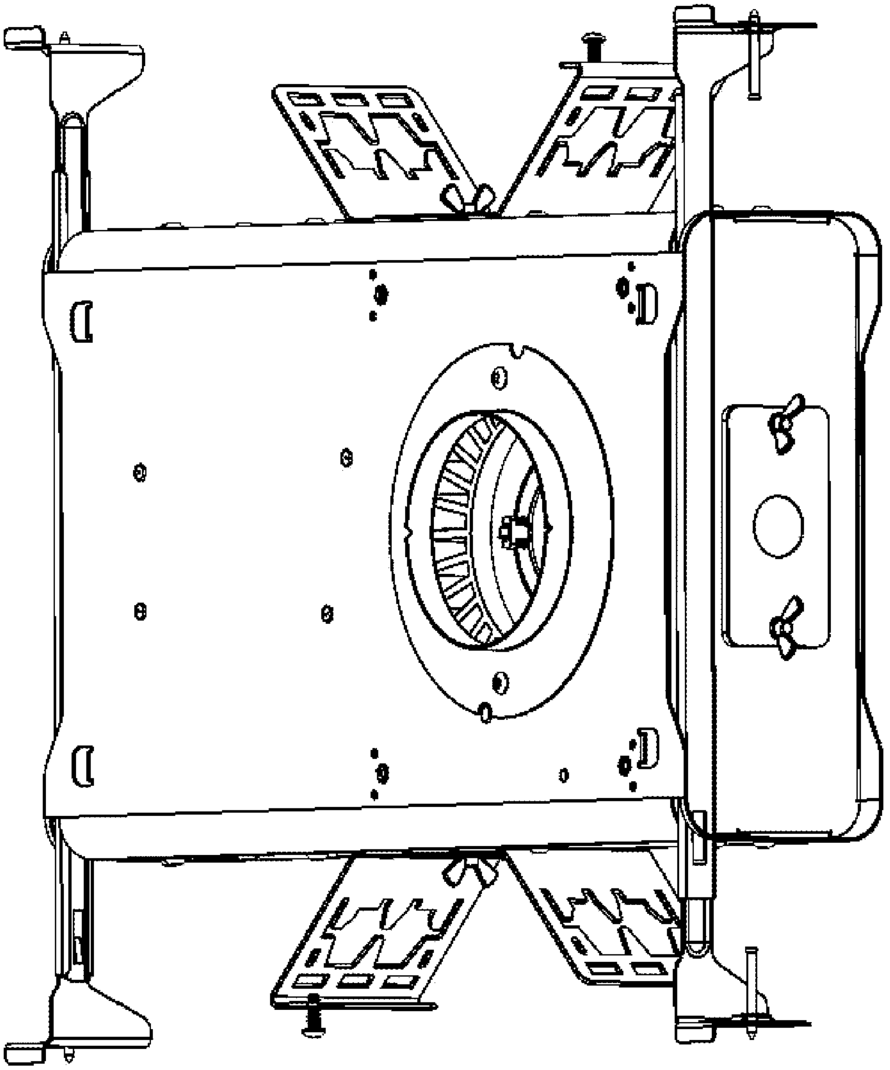

FIG. 212 on sheet 208 of the drawings is a screenshot of Pluggable Power Supply-related features of the examples [100*a-d*] of the lighting system.

Figure 213:
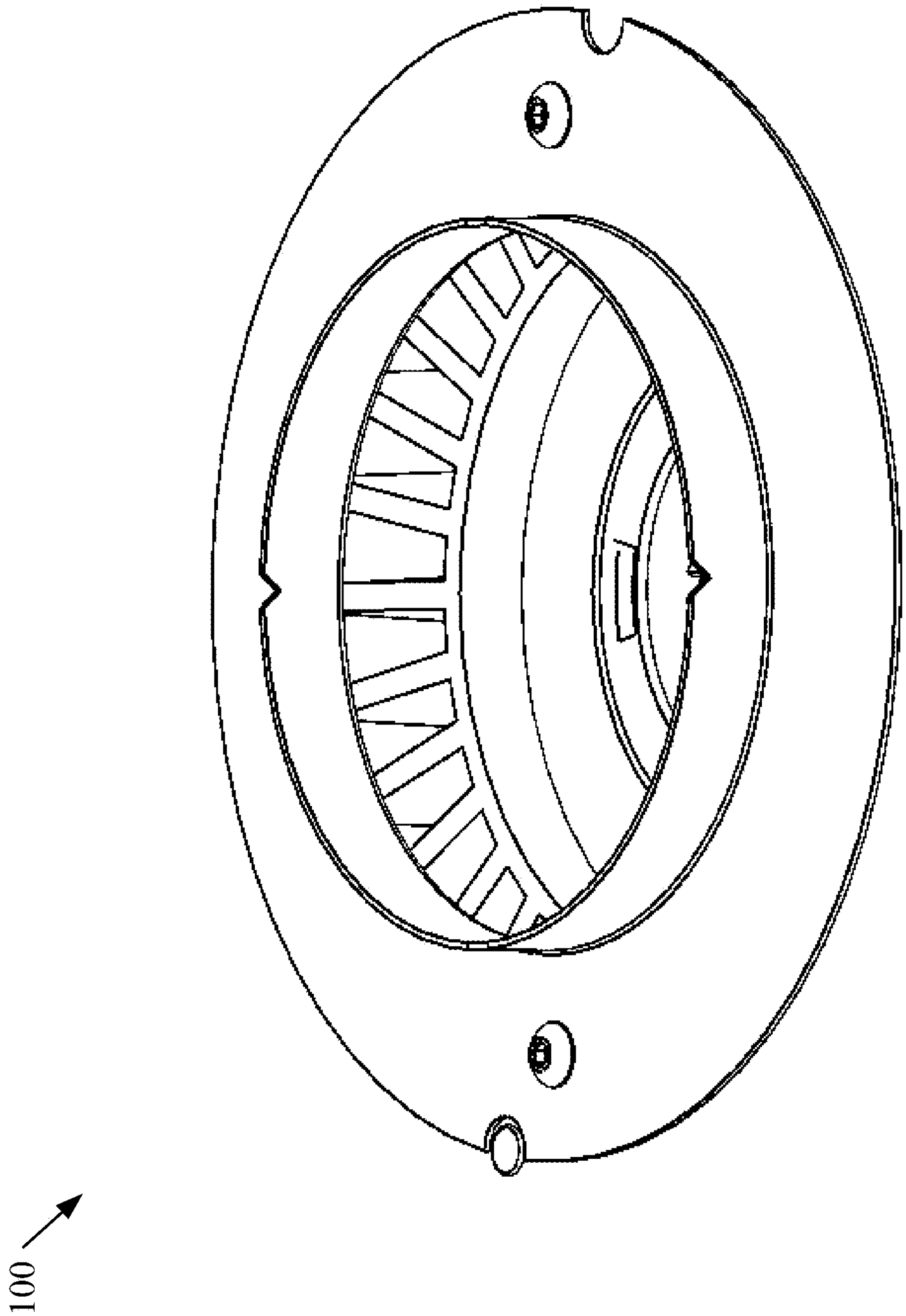

FIG. 213 on sheet 209 of the drawings is a screenshot of Pluggable Power Supply-related features of the examples [100*a-d*] of the lighting system.

Figure 214:
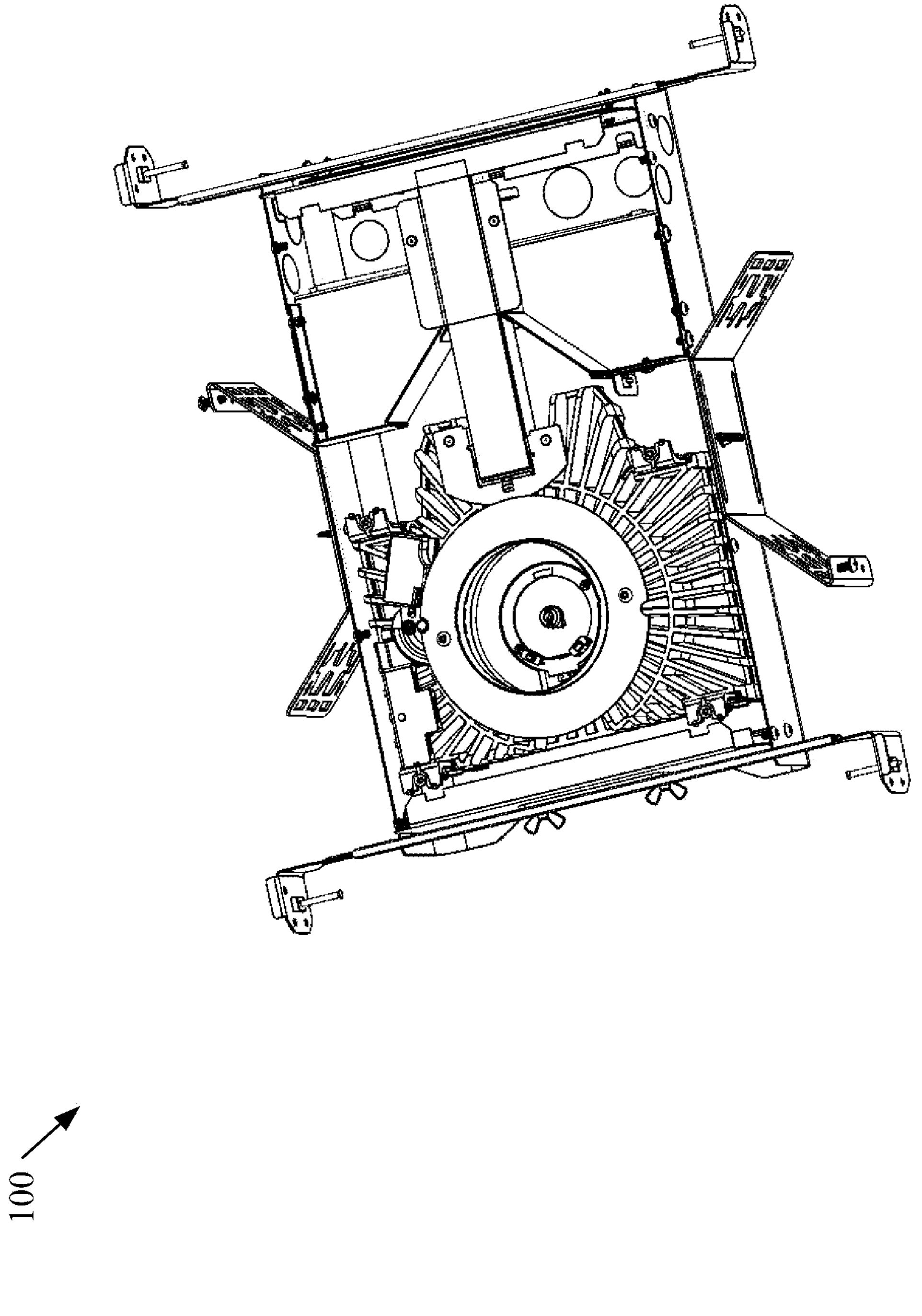

FIG. 214 on sheet 210 of the drawings is a screenshot of Pluggable Power Supply-related features of the examples [100*a-d*] of the lighting system.

Figure 215:
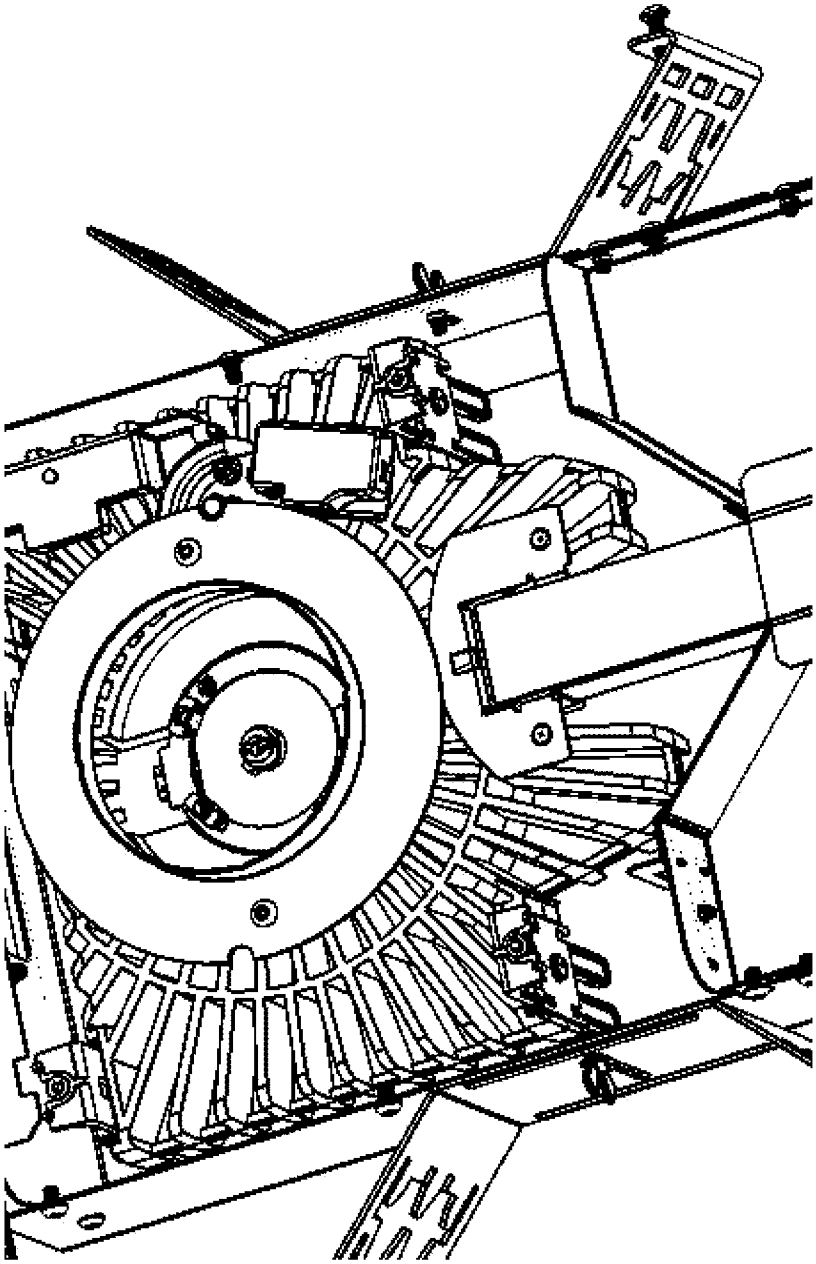

FIG. 215 on sheet 211 of the drawings is a screenshot of Pluggable Power Supply-related features of the examples [100*a-d*] of the lighting system.

Figure 216:
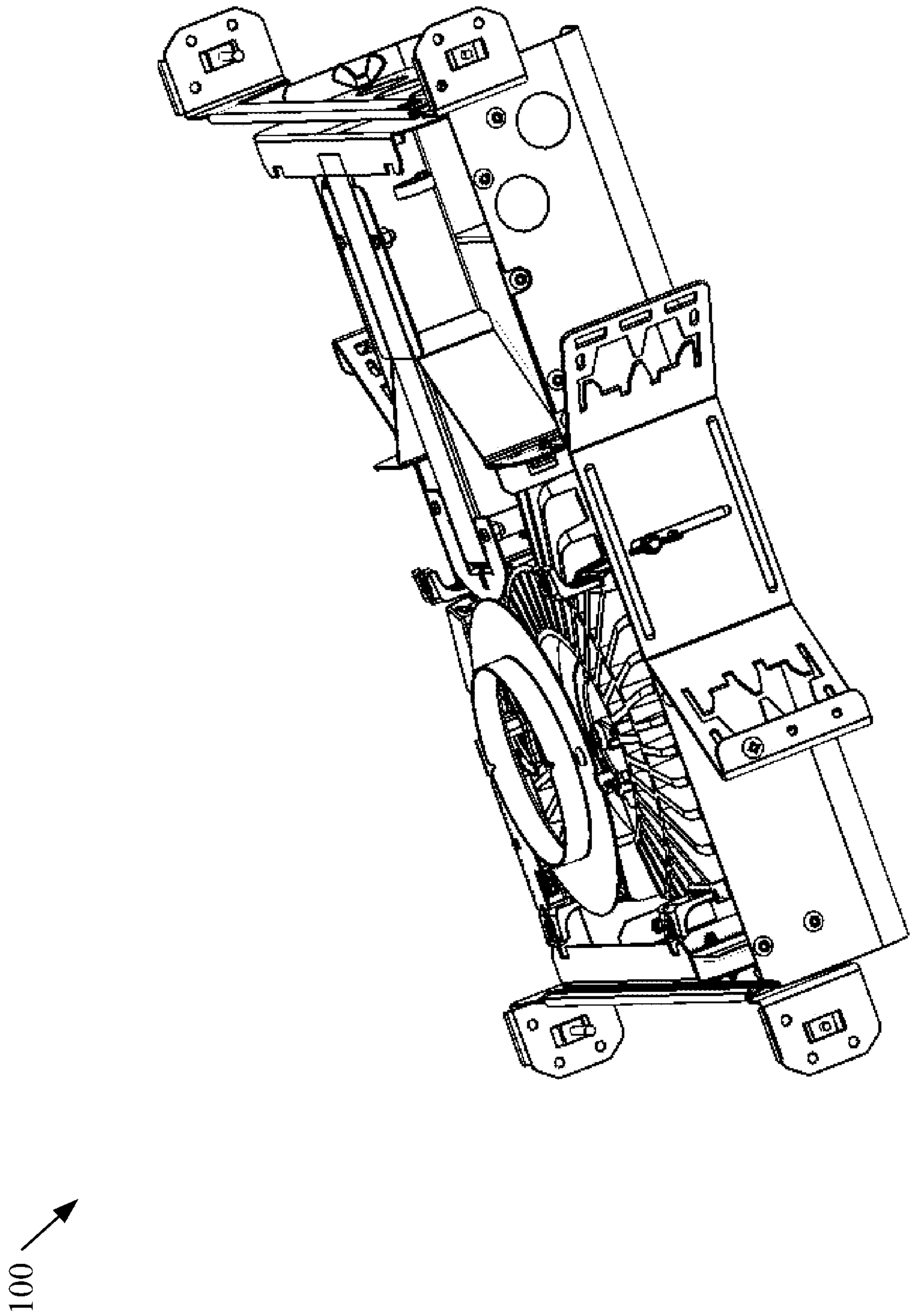

FIG. 216 on sheet 212 of the drawings is a screenshot of Pluggable Power Supply-related features of the examples [100*a-d*] of the lighting system.

Figure 217:
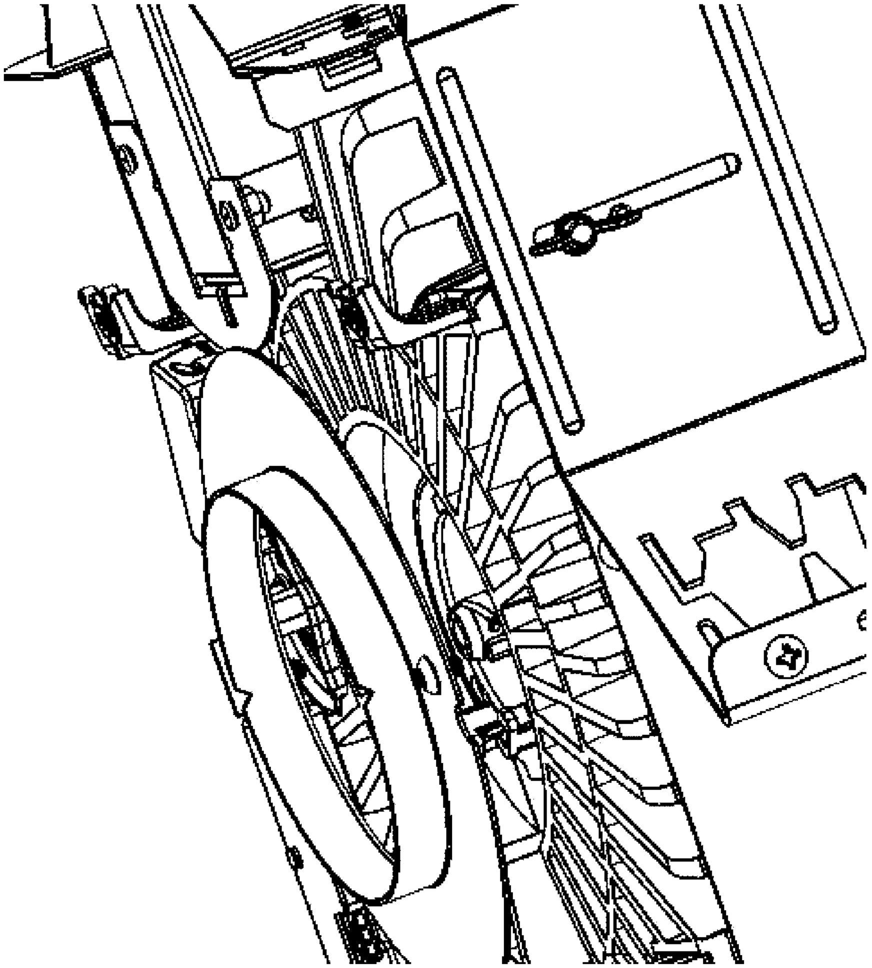

FIG. 217 on sheet 213 of the drawings is a screenshot of Pluggable Power Supply-related features of the examples [100*a-d*] of the lighting system.

Figure 218:
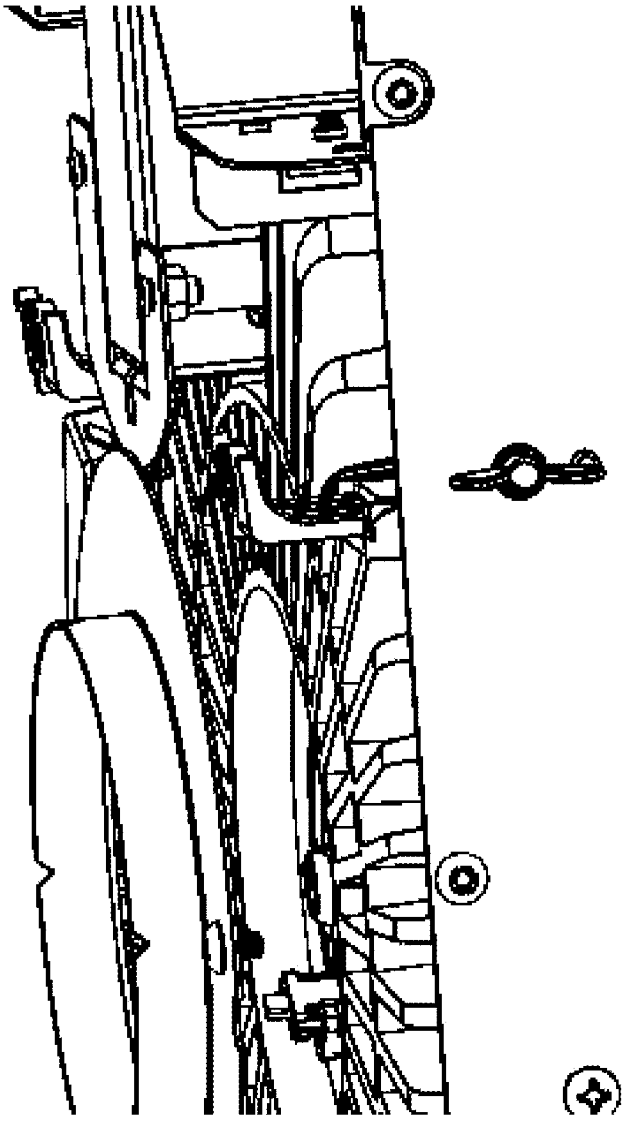

FIG. 218 on sheet 214 of the drawings is a screenshot of Pluggable Power Supply-related features of the examples [100*a-d*] of the lighting system.

Figure 219:
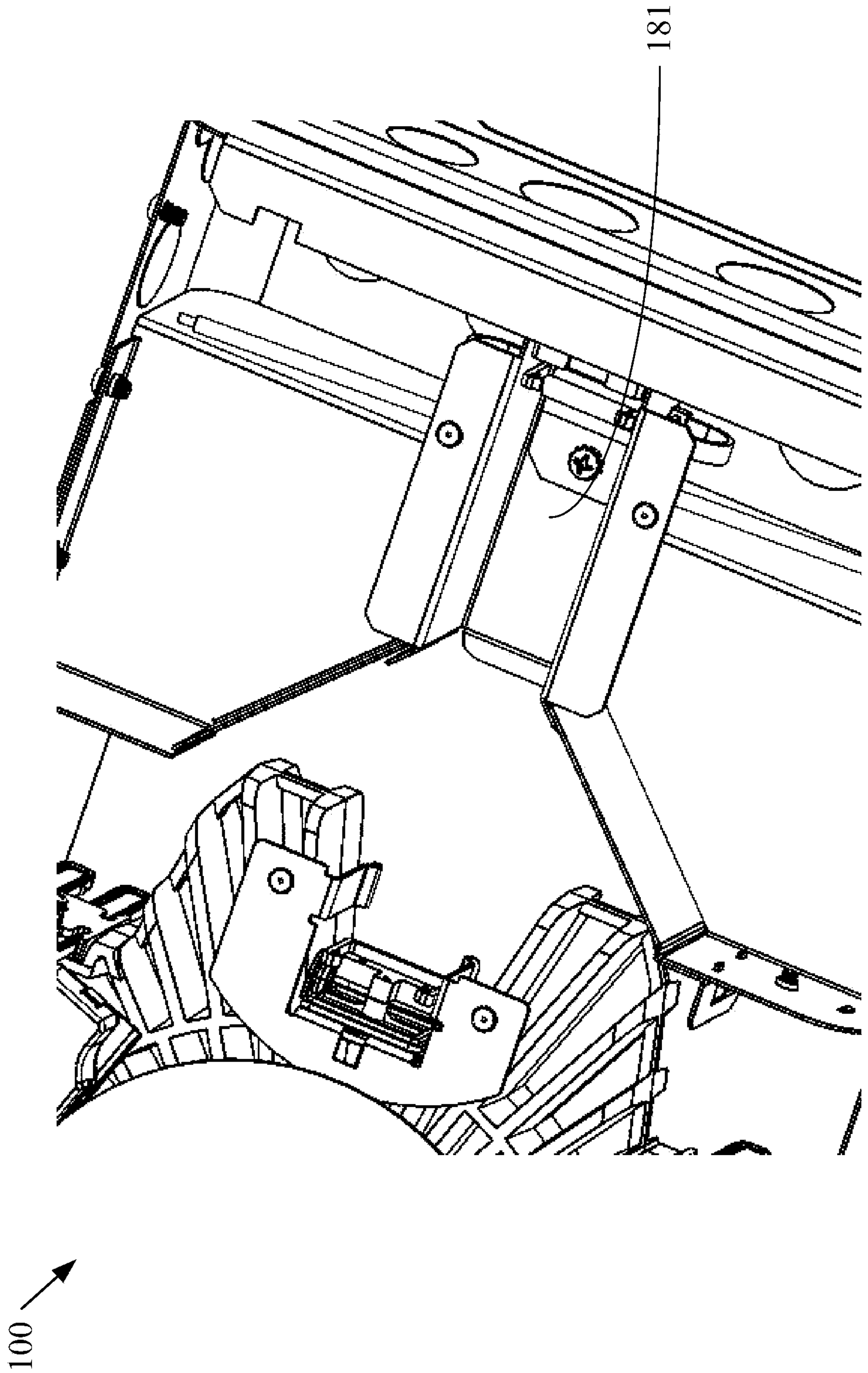

FIG. 219 on sheet 215 of the drawings is a screenshot of Pluggable Power Supply-related features of the examples [100*a-d*] of the lighting system.

Figure 220:
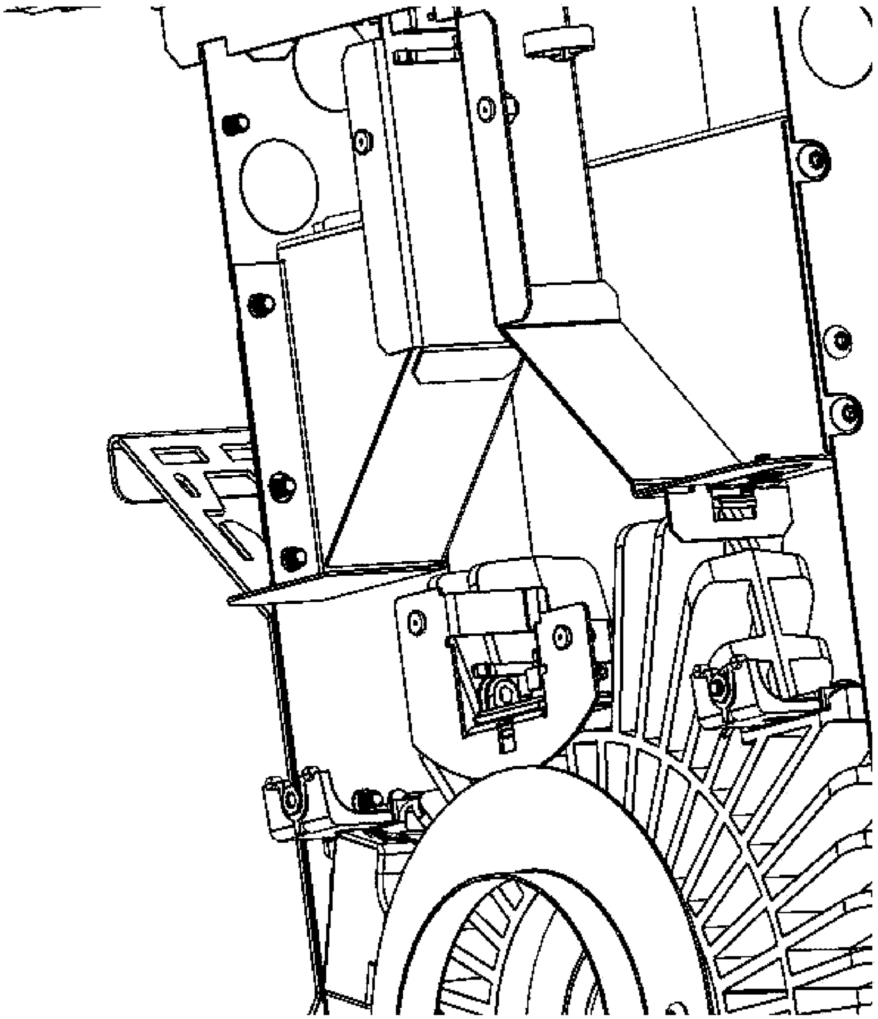

FIG. 220 on sheet 216 of the drawings is a screenshot of Pluggable Power Supply-related features of the examples [100*a-d*] of the lighting system.

Figure 221:
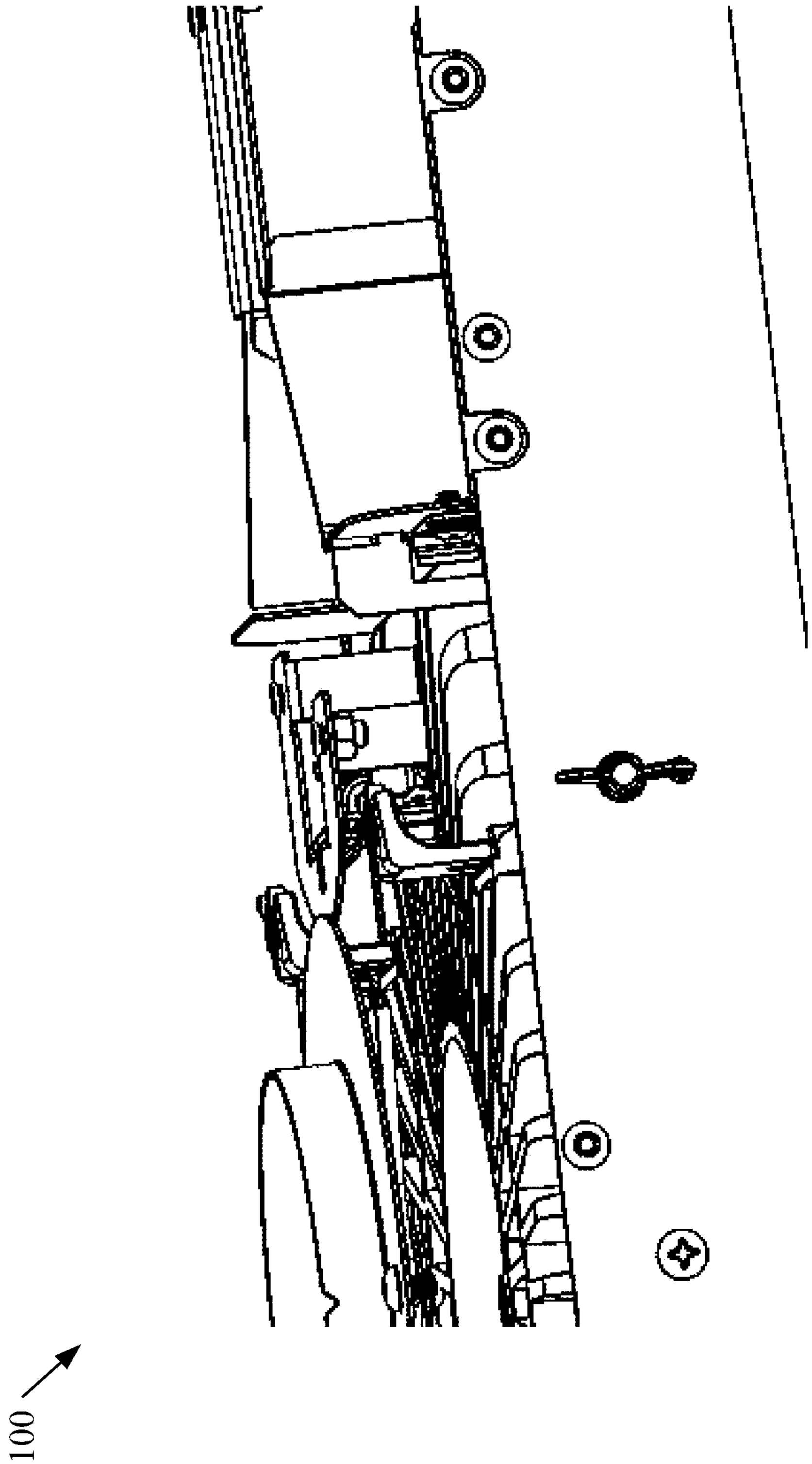

FIG. 221 on sheet 217 of the drawings is a screenshot of Pluggable Power Supply-related features of the examples [100*a-d*] of the lighting system.

Figure 222:
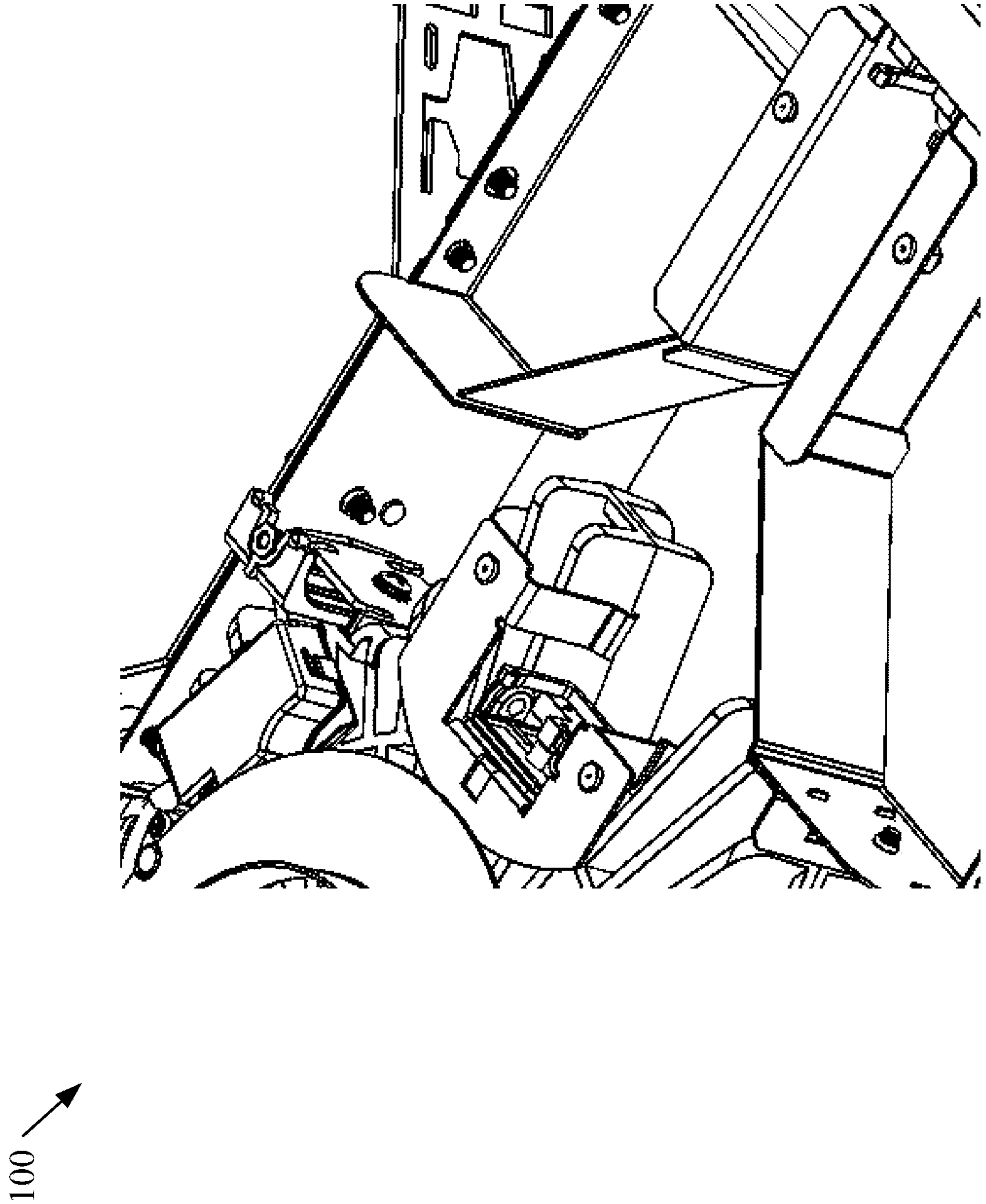

FIG. 222 on sheet 218 of the drawings is a screenshot of Pluggable Power Supply-related features of the examples [100*a-d*] of the lighting system.

Figure 223:
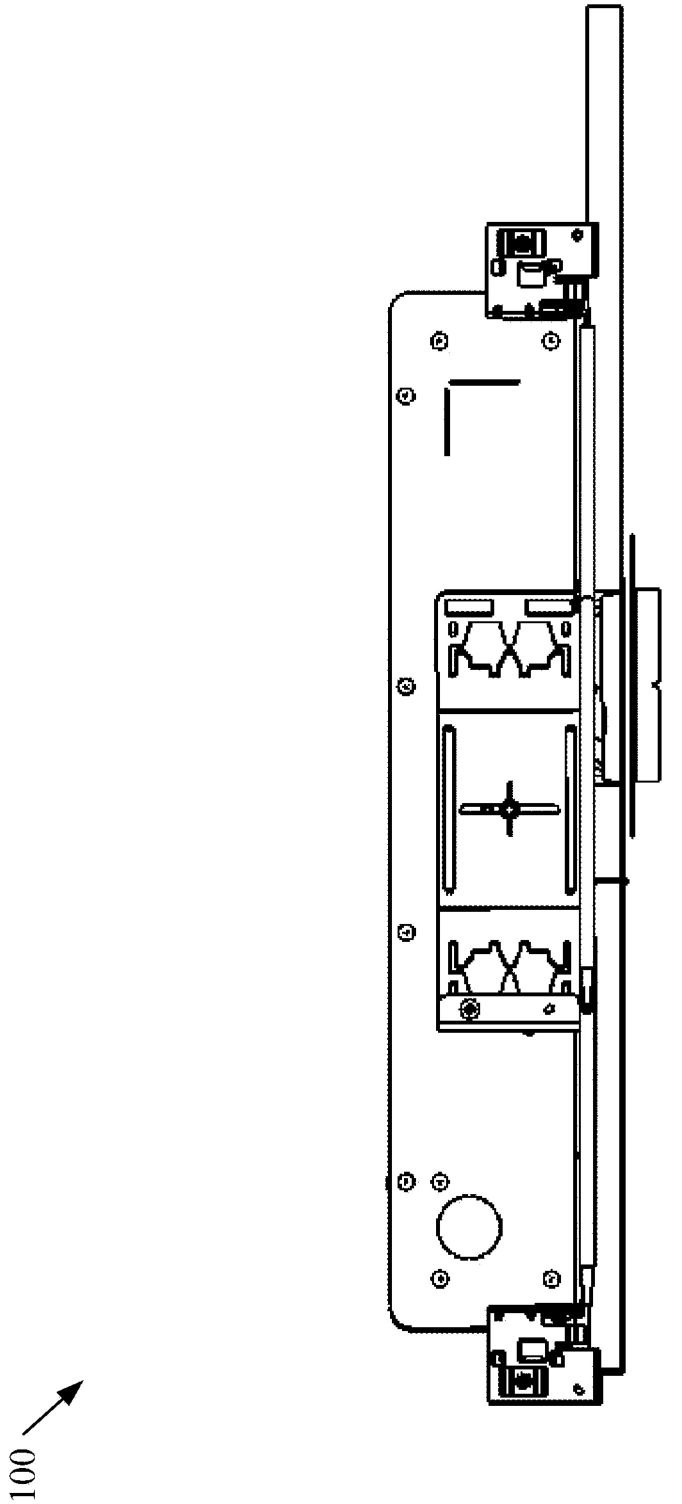

FIG. 223 on sheet 219 of the drawings is a screenshot of Pluggable Power Supply-related features of the examples [100*a-d*] of the lighting system.

Figure 224:
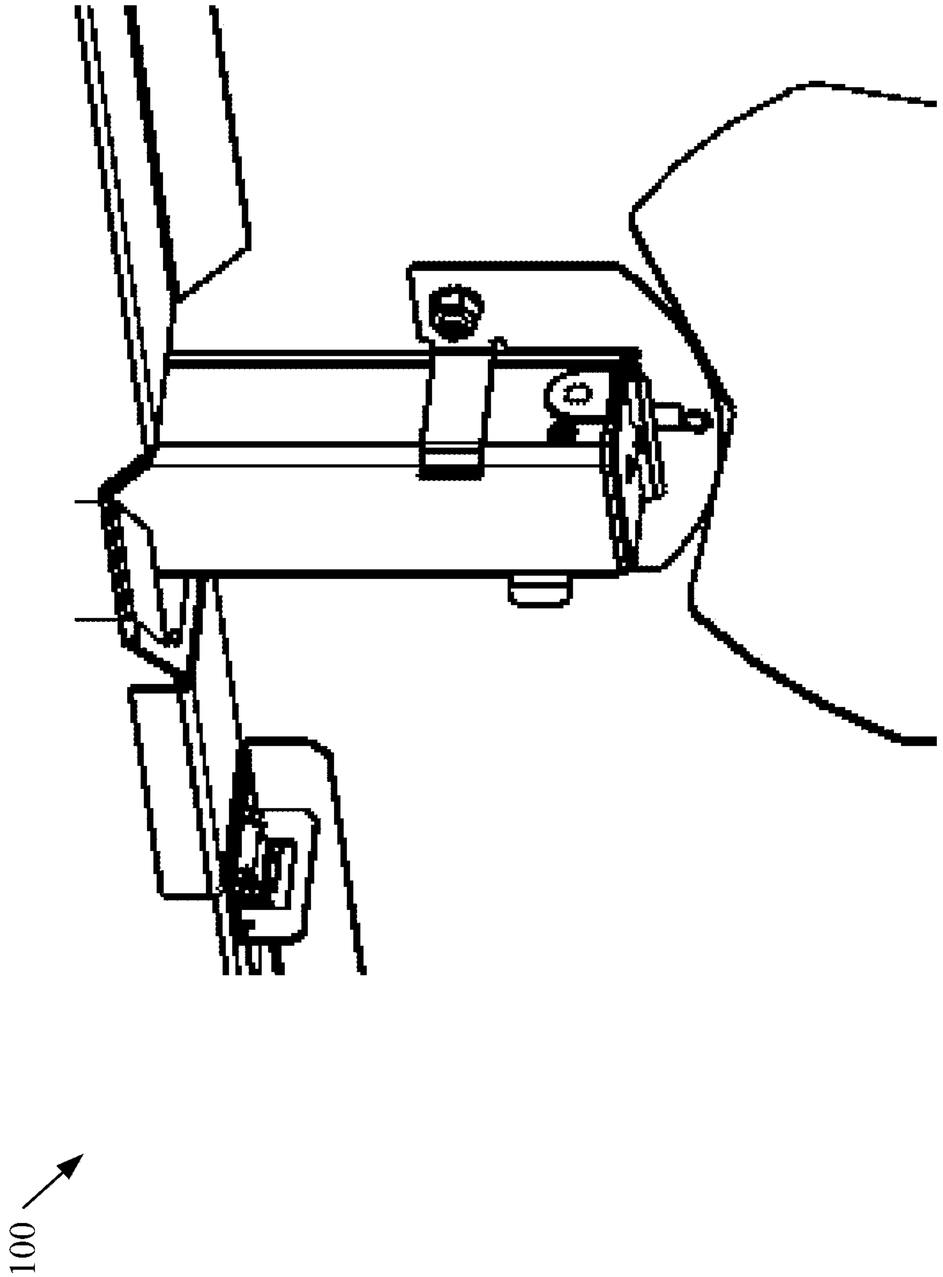

FIG. 224 on sheet 220 of the drawings is a screenshot of Pluggable Power Supply-related features of the examples [100*a-d*] of the lighting system.

Figure 225:
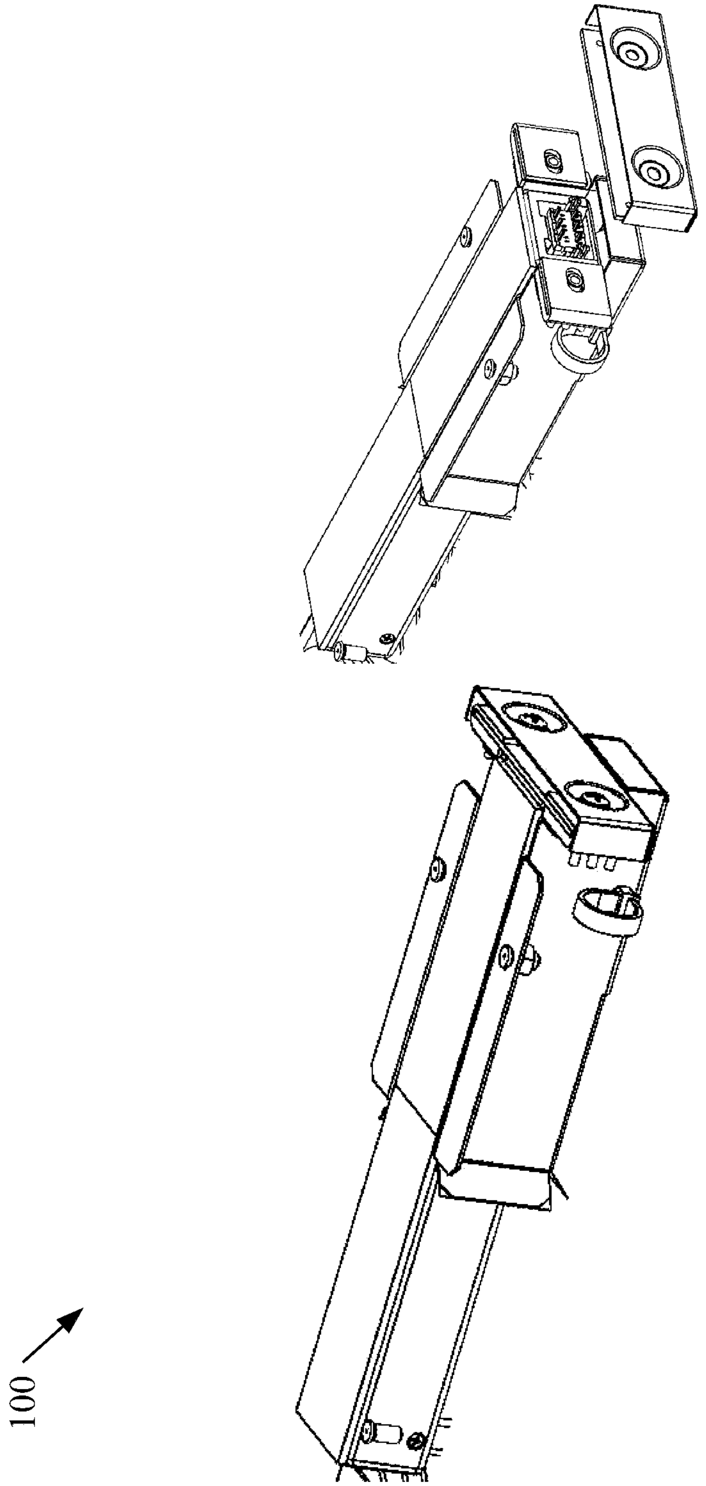

FIG. 225 on sheet 221 of the drawings is a screenshot of Pluggable Power Supply-related features of the examples [100*a-d*] of the lighting system.

Figure 226:
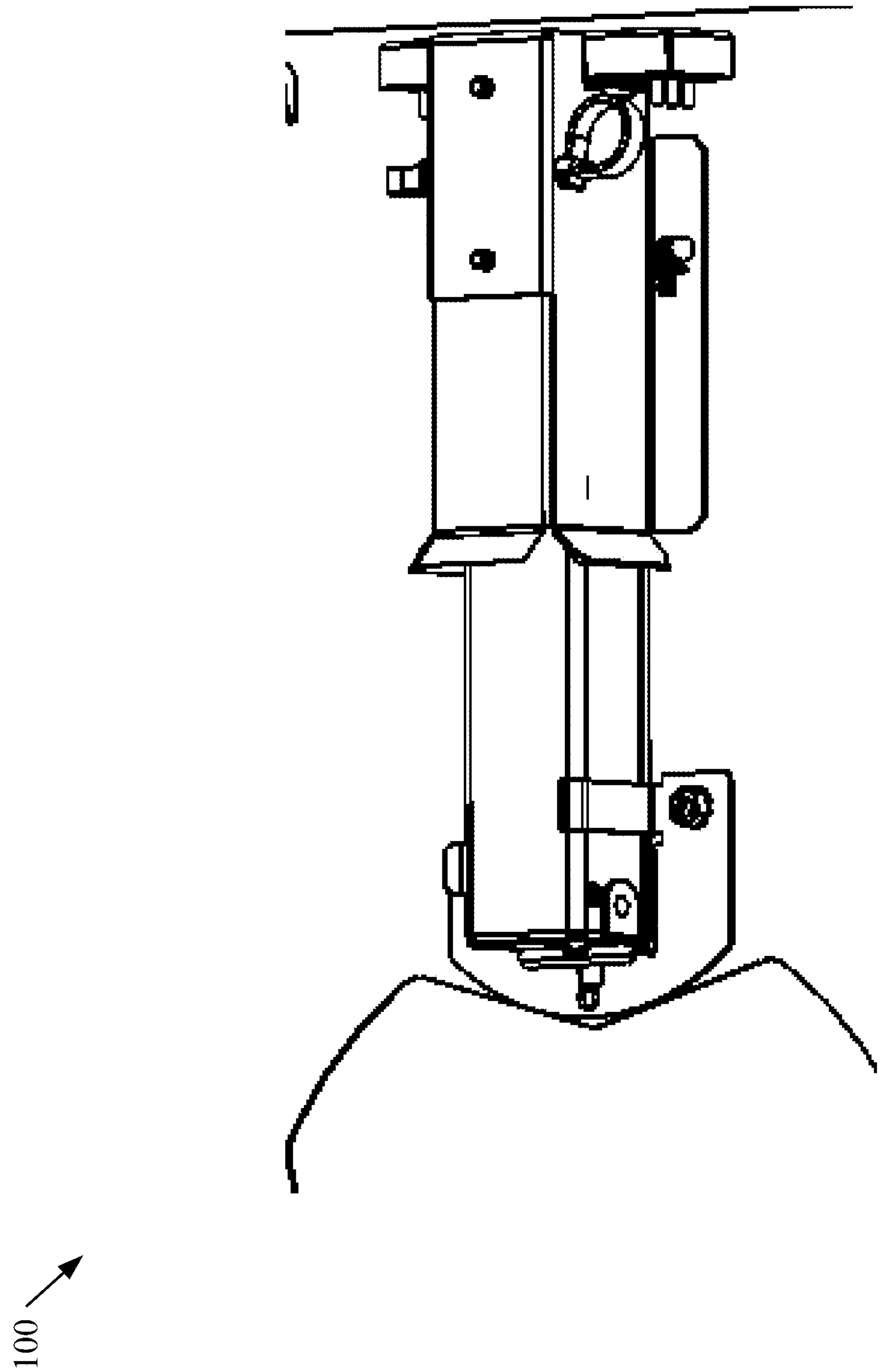

FIG. 226 on sheet 222 of the drawings is a screenshot of Pluggable Power Supply-related features of the examples [100*a-d*] of the lighting system.

Figure 227:
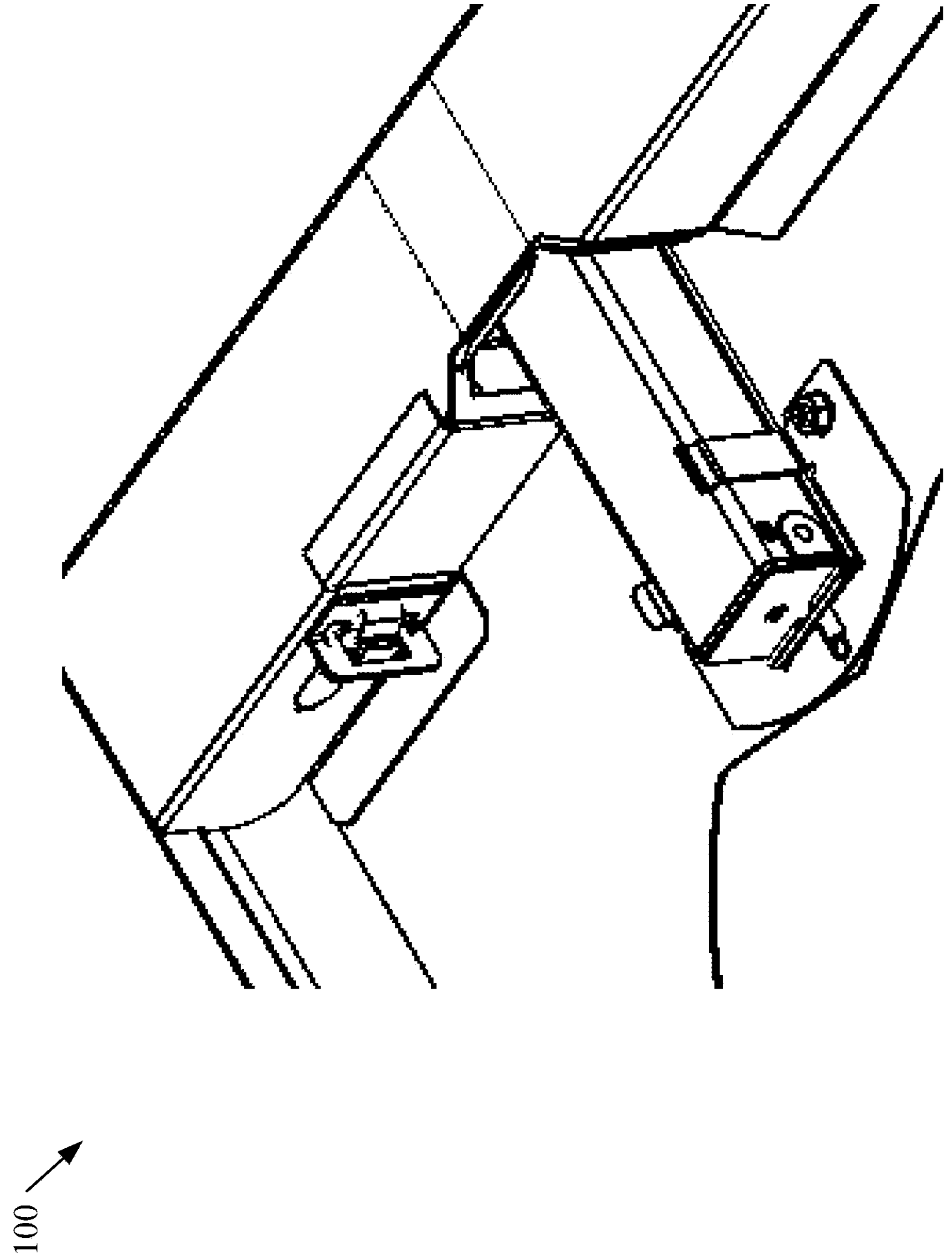

FIG. 227 on sheet 223 of the drawings is a screenshot of Pluggable Power Supply-related features of the examples [100*a-d*] of the lighting system.

Figure 228:
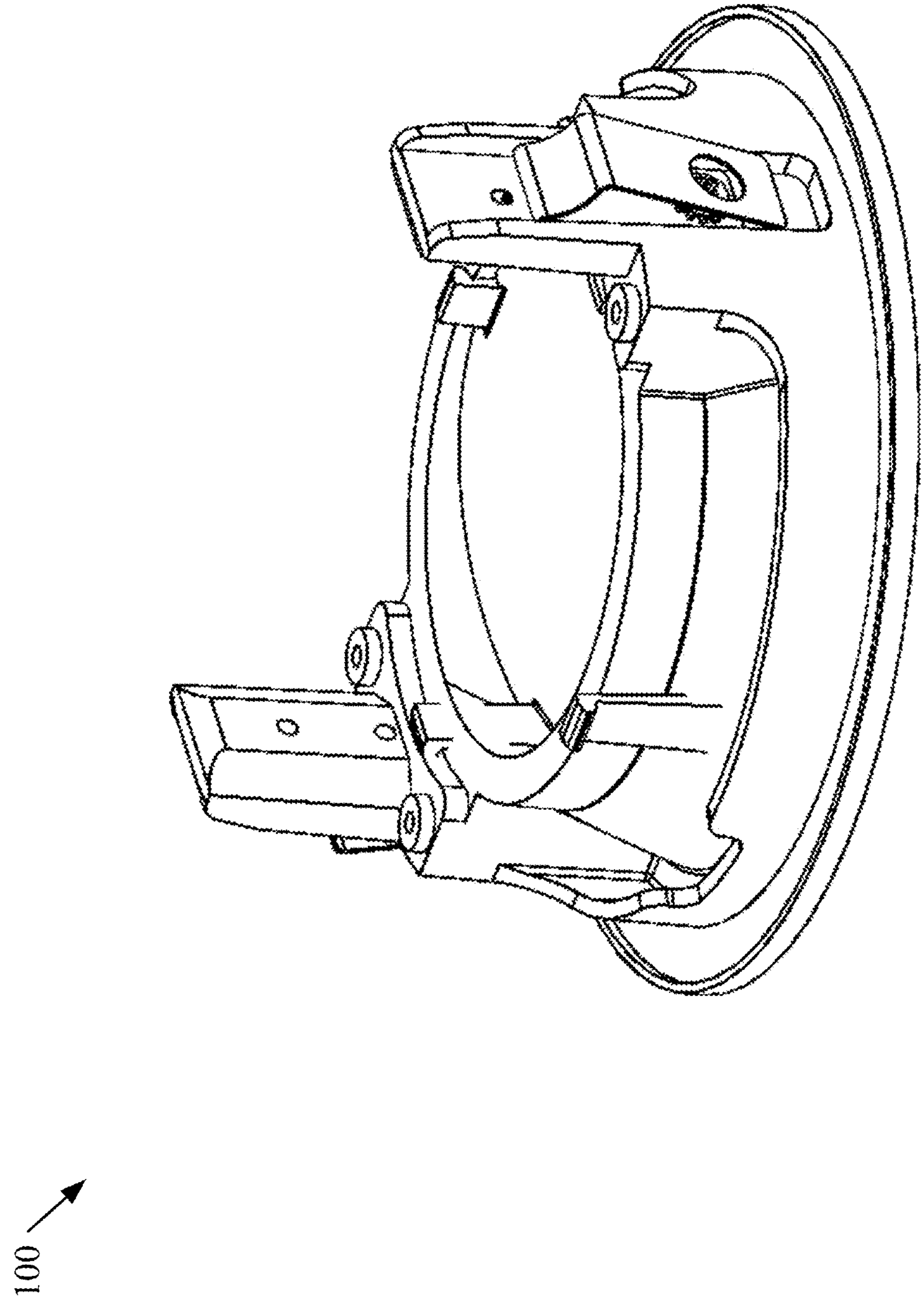

FIG. 228 on sheets 224 of the drawings is a screenshot of Wall wash-related features of the examples [100*a-d*] of the lighting system.

Figure 229:
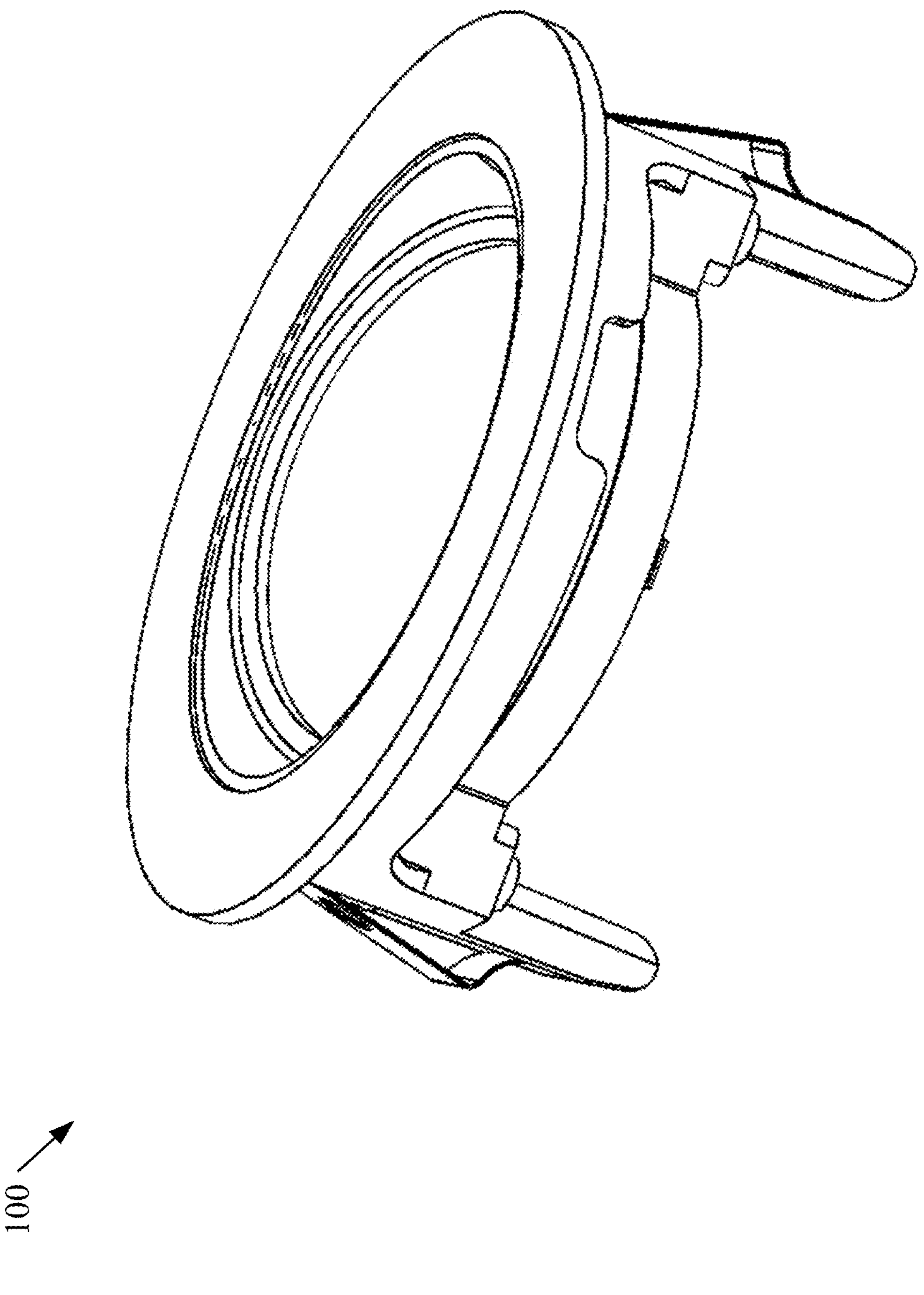

FIG. 229 on sheet 225 of the drawings is a screenshot of Wall wash-related features of the examples [100*a-d*] of the lighting system.

Figure 230:
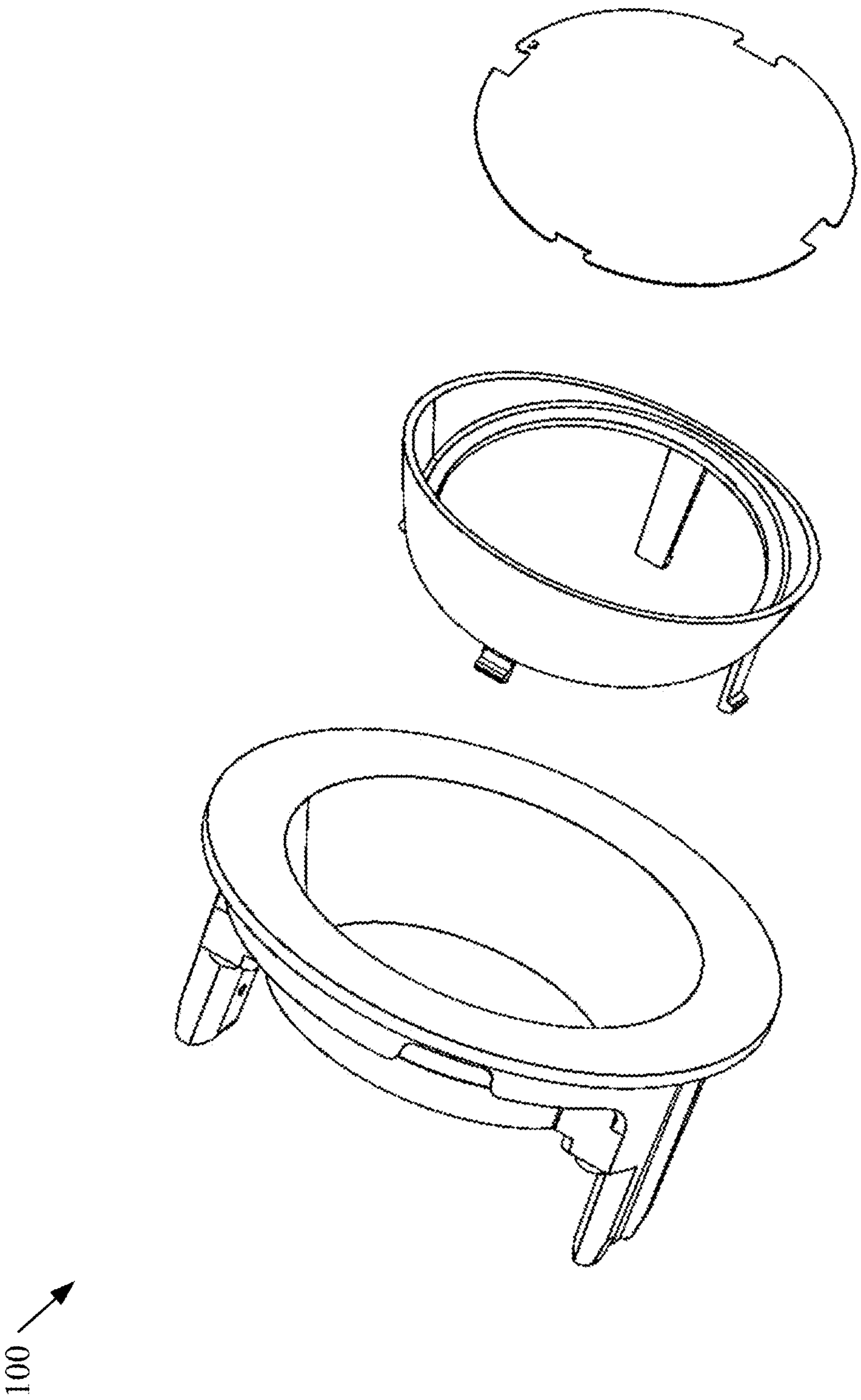

FIG. 230 on sheet 226 of the drawings is a screenshot of Wall wash-related features of the examples [100*a-d*] of the lighting system.

Figure 231:
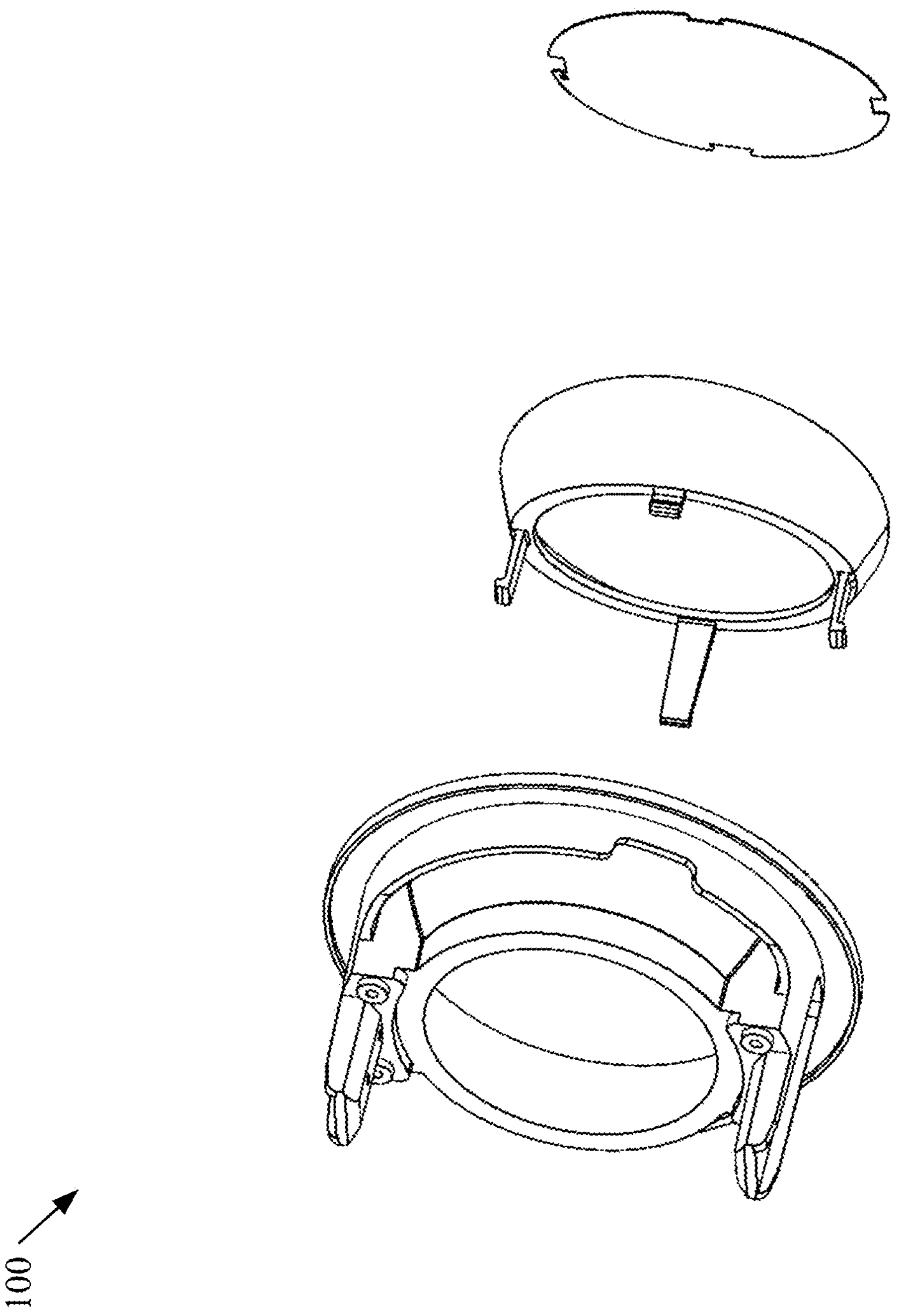

FIG. 231 on sheet 227 of the drawings is a screenshot of Wall wash-related features of the examples [100*a-d*] of the lighting system.

Figure 232:
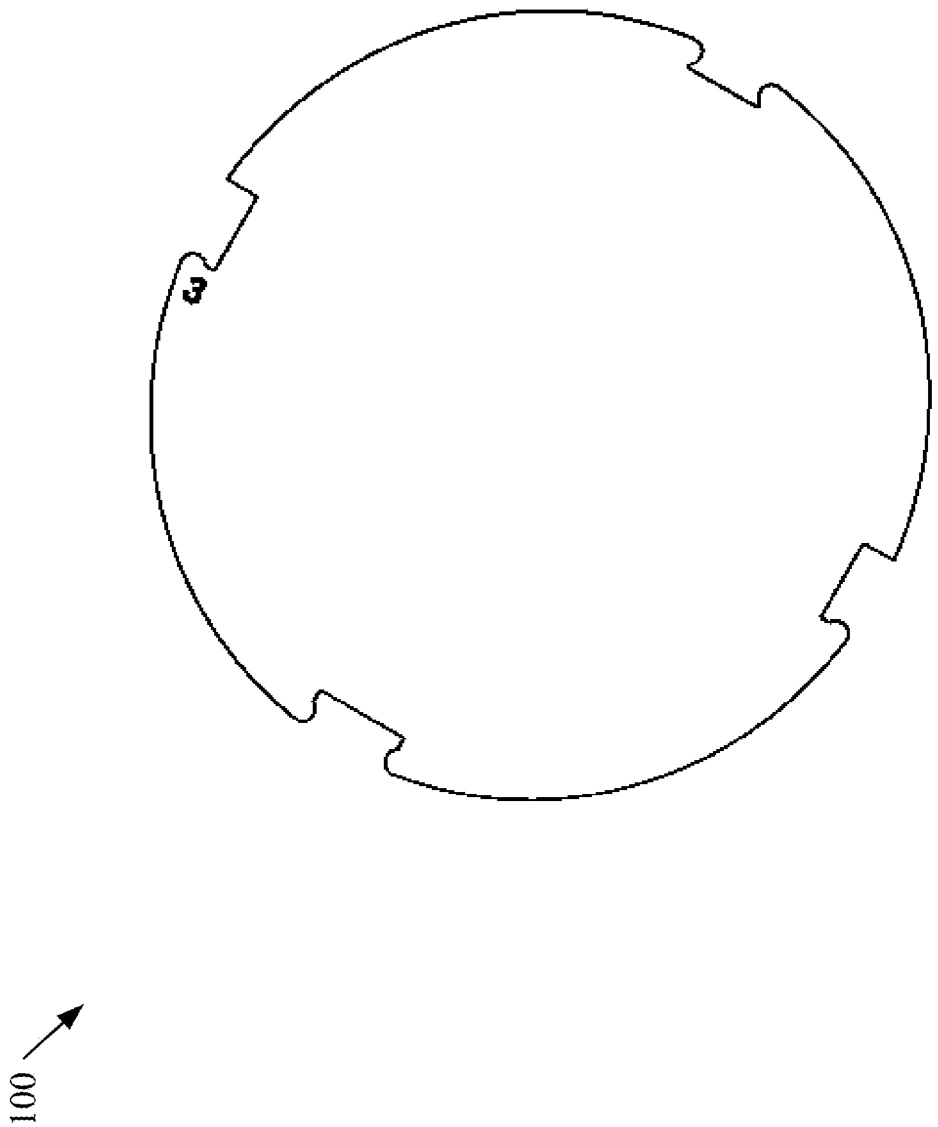

FIG. 232 on sheet 228 of the drawings is a screenshot of Wall wash-related features of the examples [100*a-d*] of the lighting system.

Figure 233:
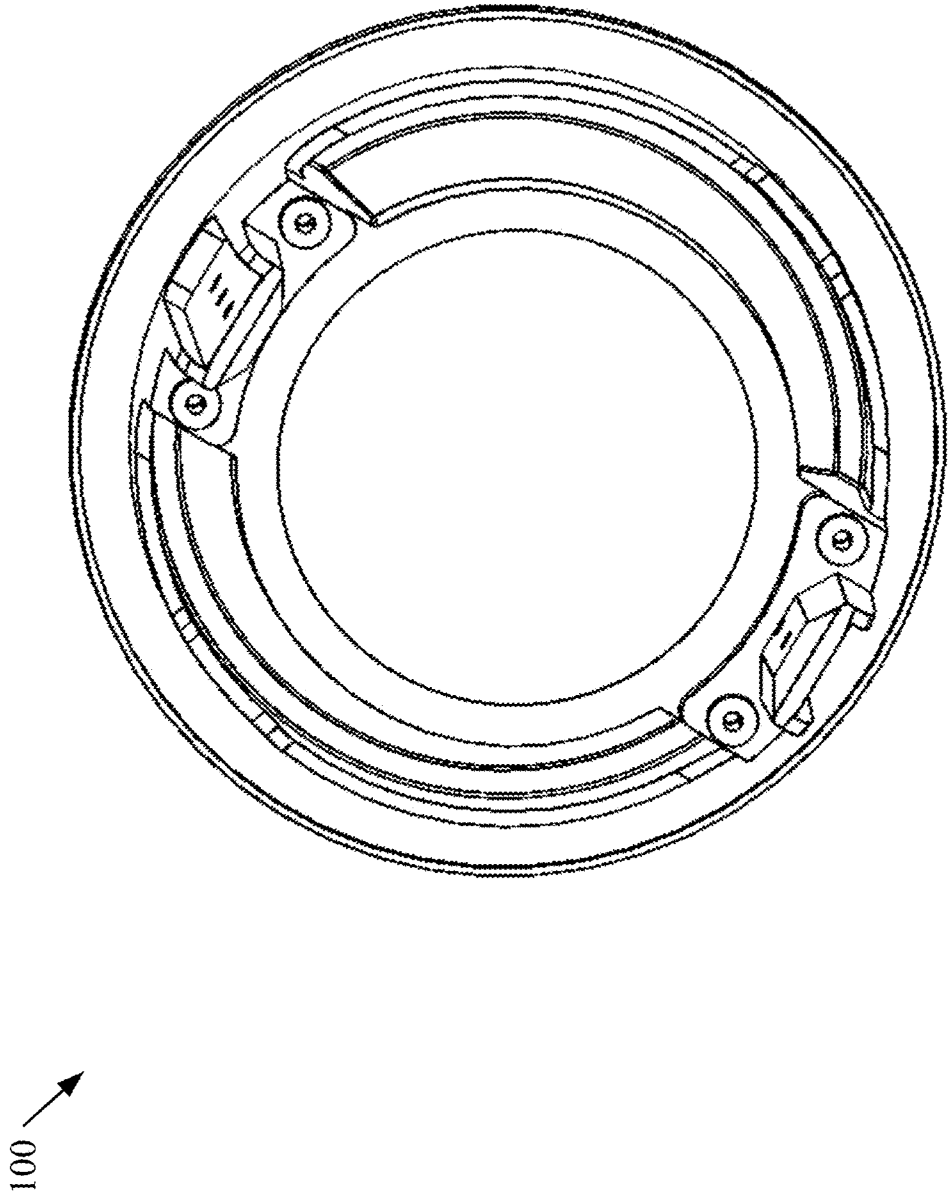

FIG. 233 on sheet 229 of the drawings is a screenshot of Wall wash-related features of the examples [100*a-d*] of the lighting system.

Figure 234:
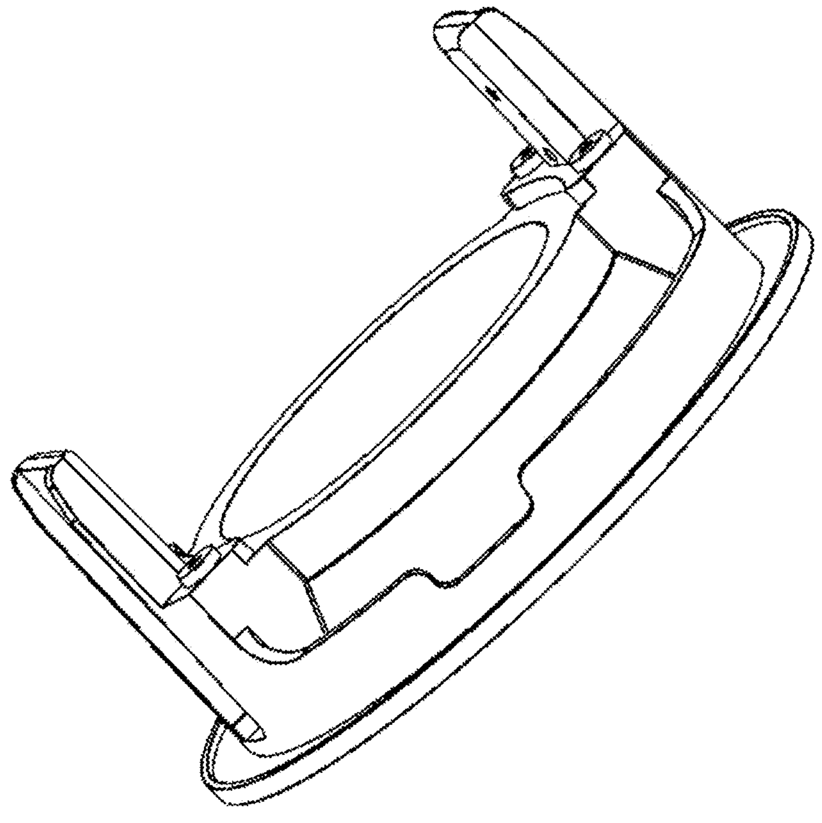

FIG. 234 on sheet 230 of the drawings is a screenshot of Wall wash-related features of the examples [100*a-d*] of the lighting system.

Figure 235:
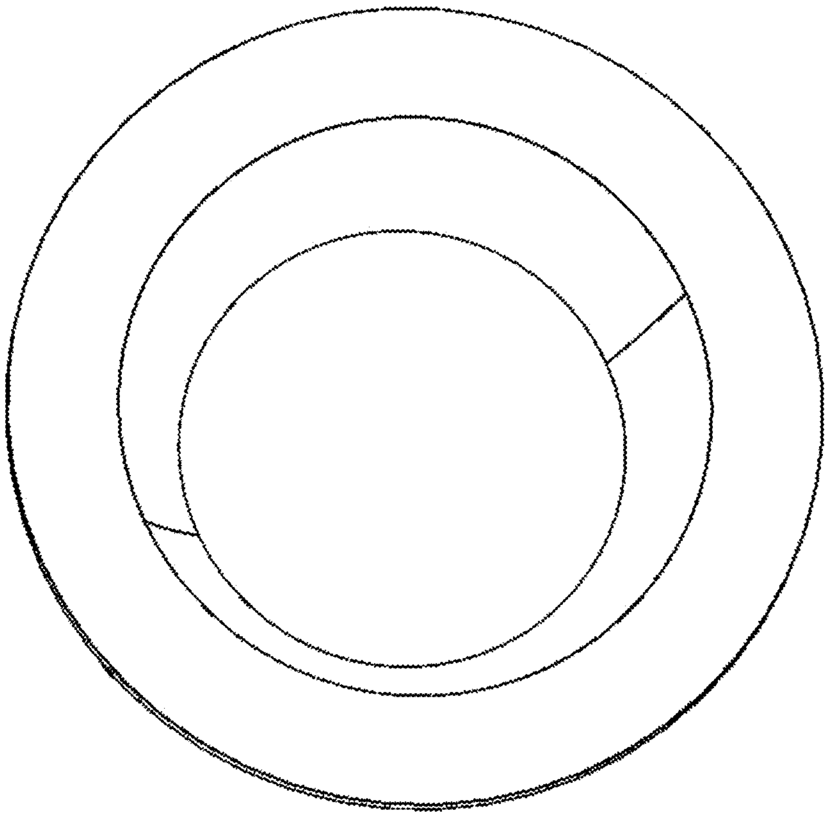

FIG. 235 on sheet 231 of the drawings is a screenshot of Wall wash-related features of the examples [100*a-d*] of the lighting system.

Figure 236:
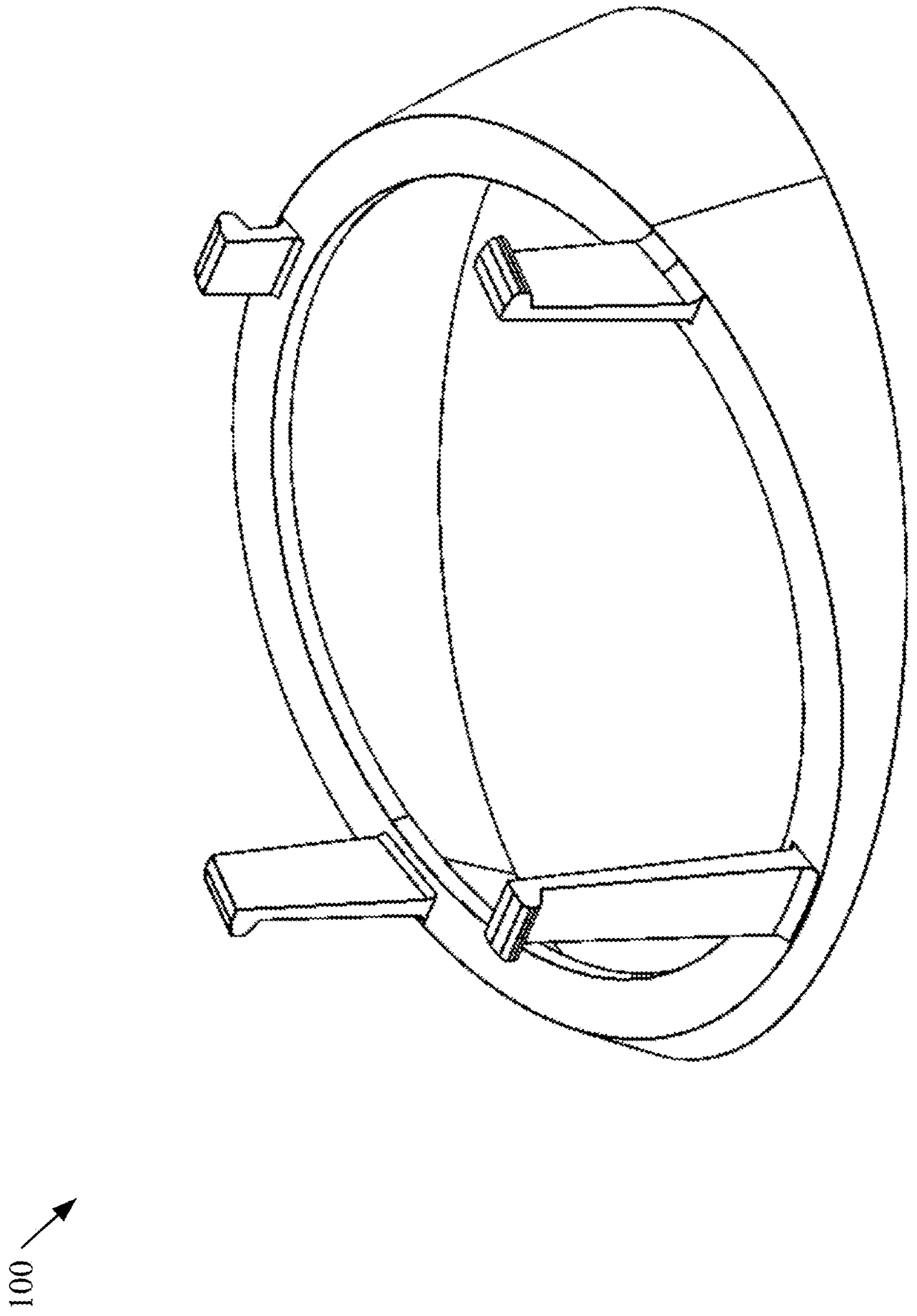

FIG. 236 on sheet 232 of the drawings is a screenshot of Wall wash-related features of the examples [100*a-d*] of the lighting system.

Figure 237:
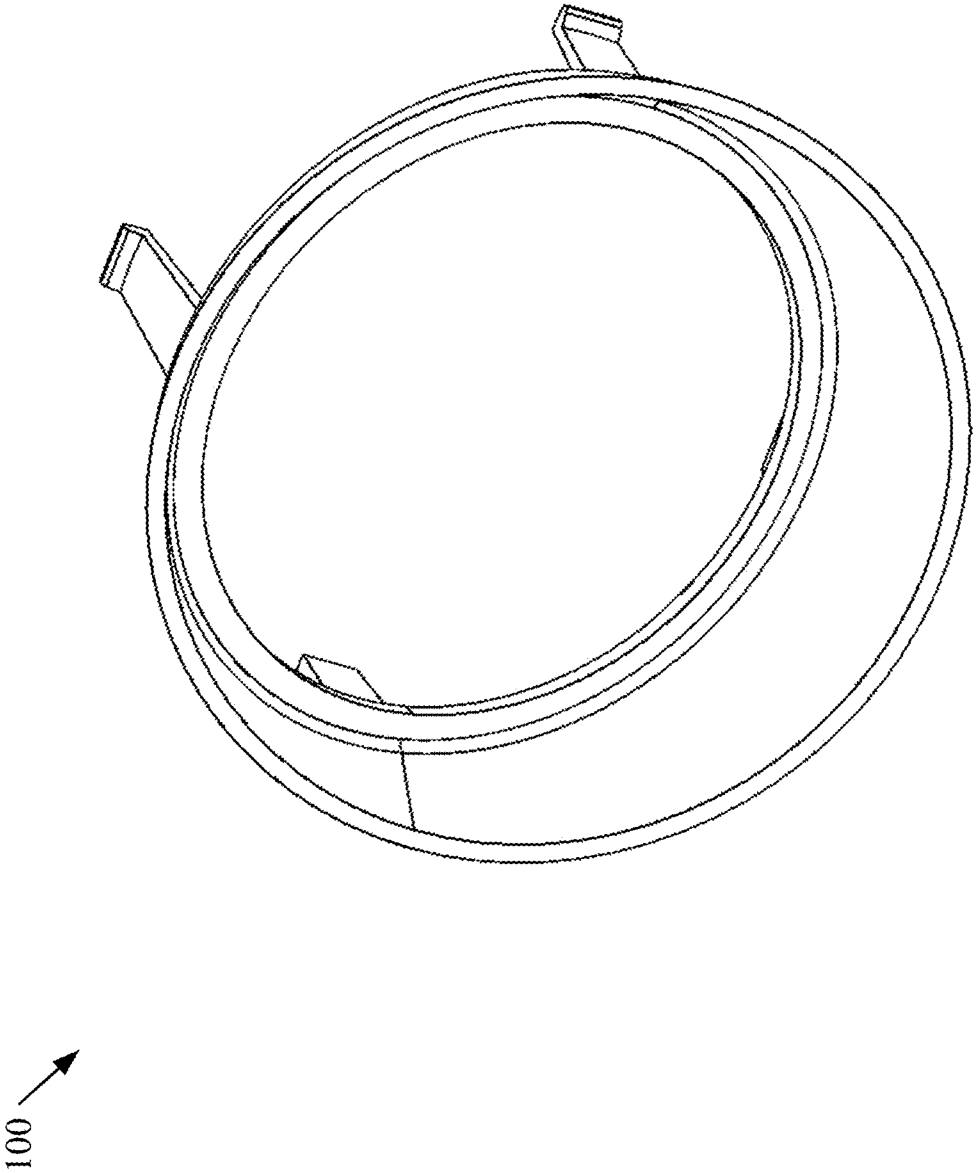

FIG. 237 on sheet 233 of the drawings is a screenshot of Wall wash-related features of the examples [100*a-d*] of the lighting system.

Figure 238:
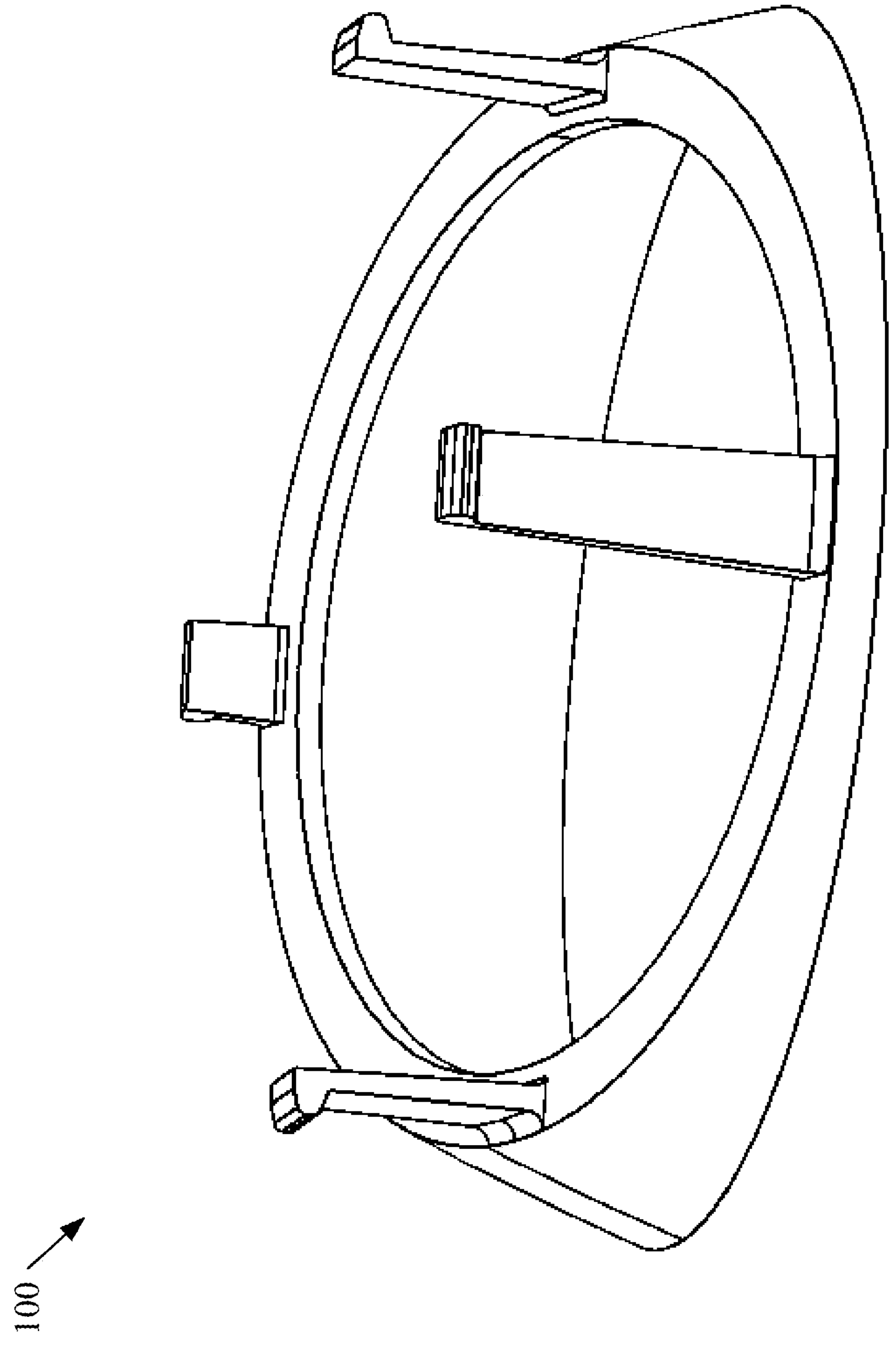

FIG. 238 on sheet 234 of the drawings is a screenshot of Wall wash-related features of the examples [100*a-d*] of the lighting system.

Figure 239:
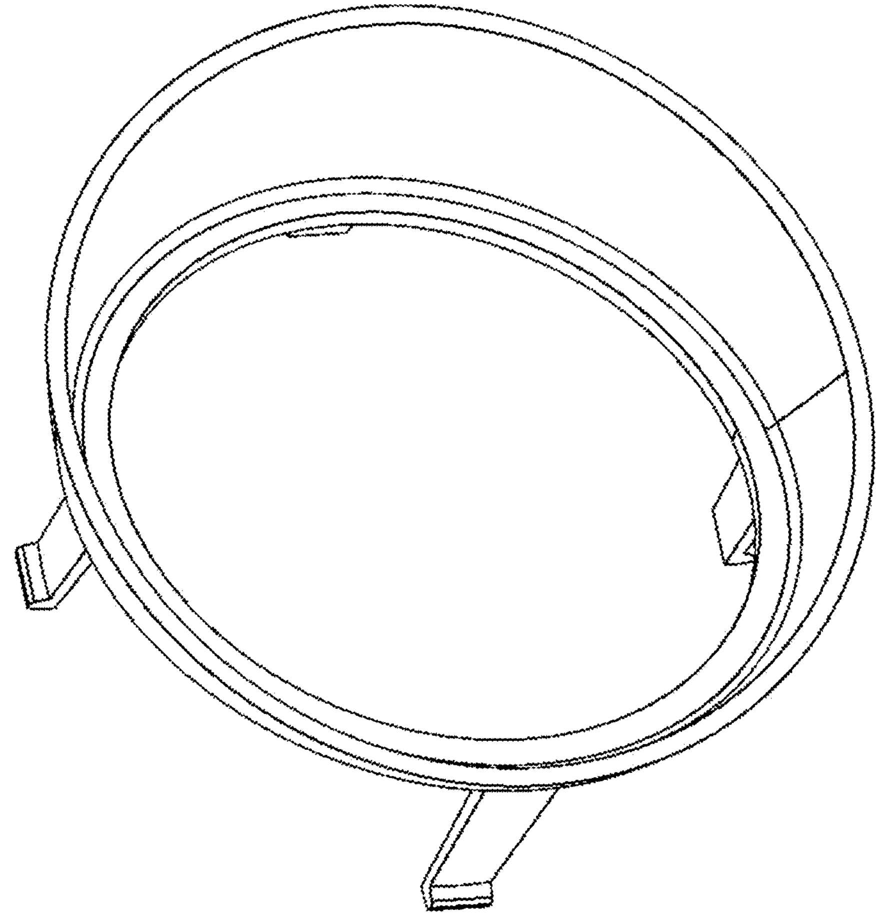

FIG. 239 on sheet 235 of the drawings is a screenshot of Wall wash-related features of the examples [100*a-d*] of the lighting system.

Figure 240:
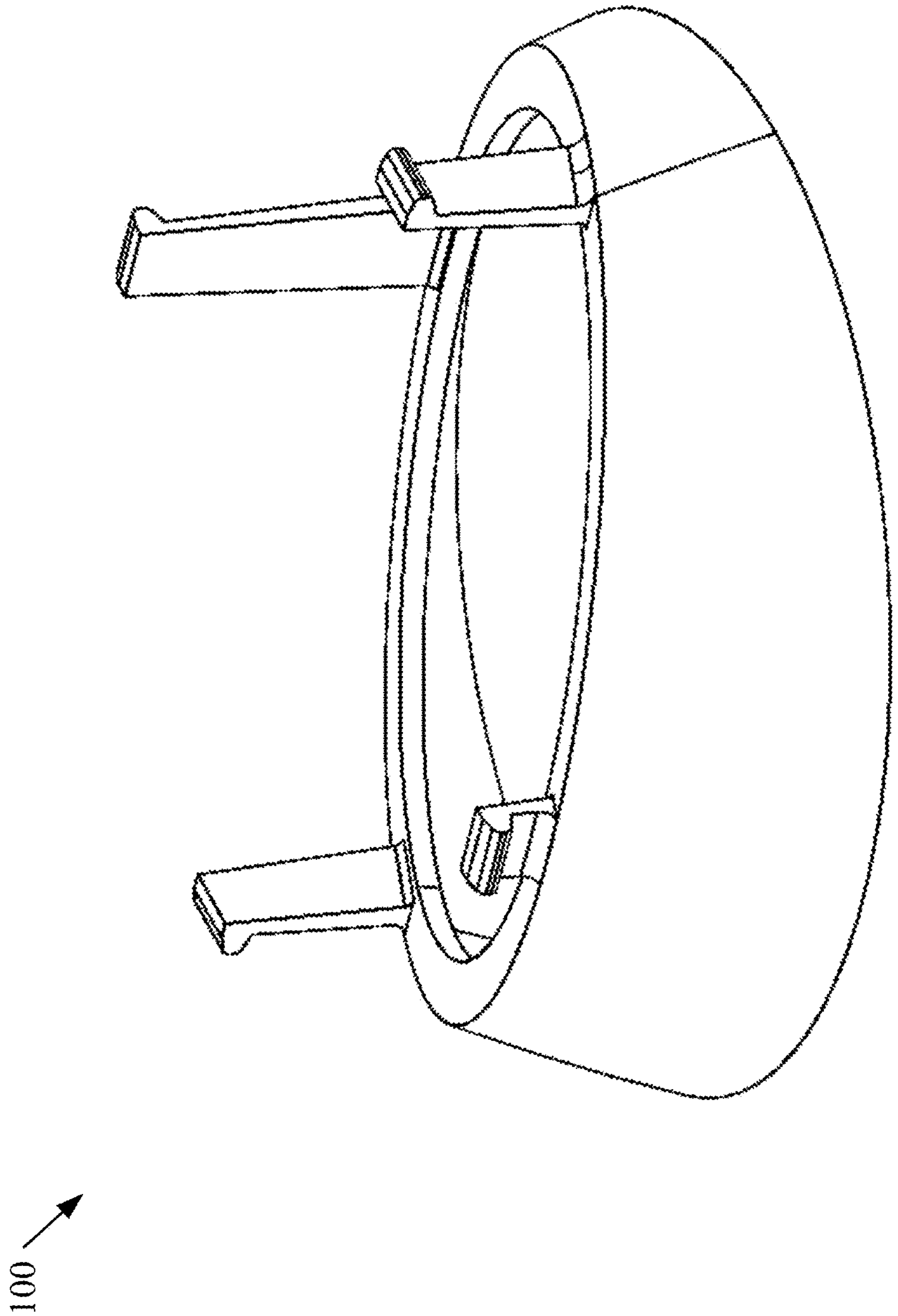

FIG. 240 on sheet 236 of the drawings is a screenshot of Wall wash-related features of the examples [100*a-d*] of the lighting system.

Figure 241:
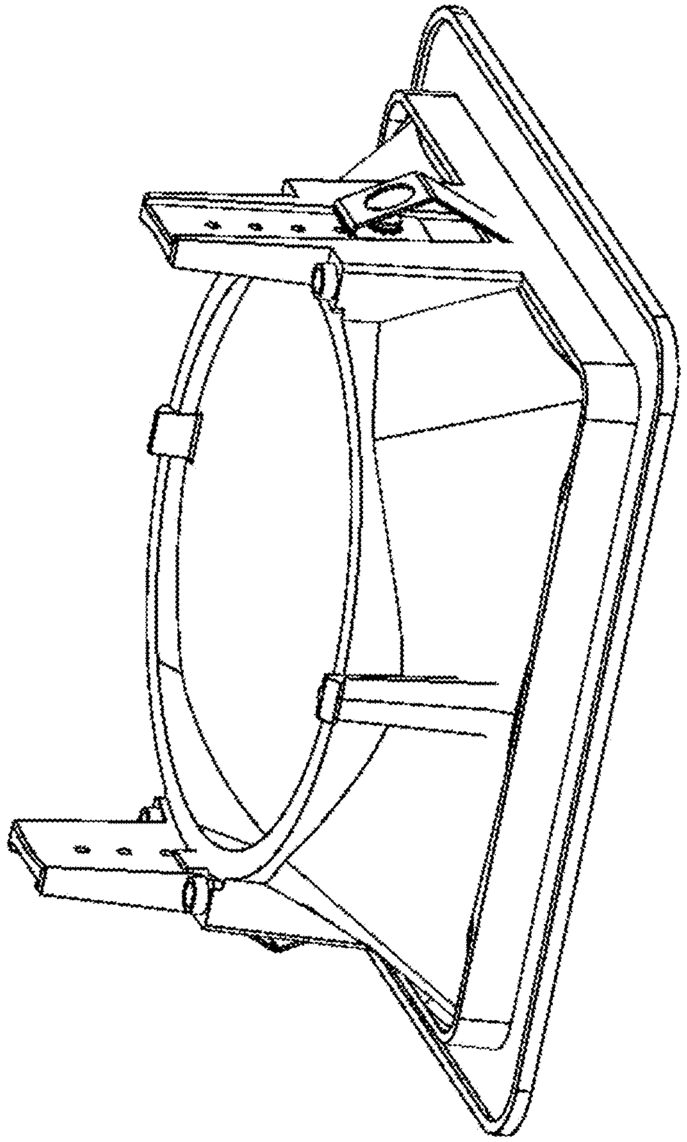

FIG. 241 on sheet 237 of the drawings is a screenshot of Wall wash-related features of the examples [100*a-d*] of the lighting system.

Figure 242:
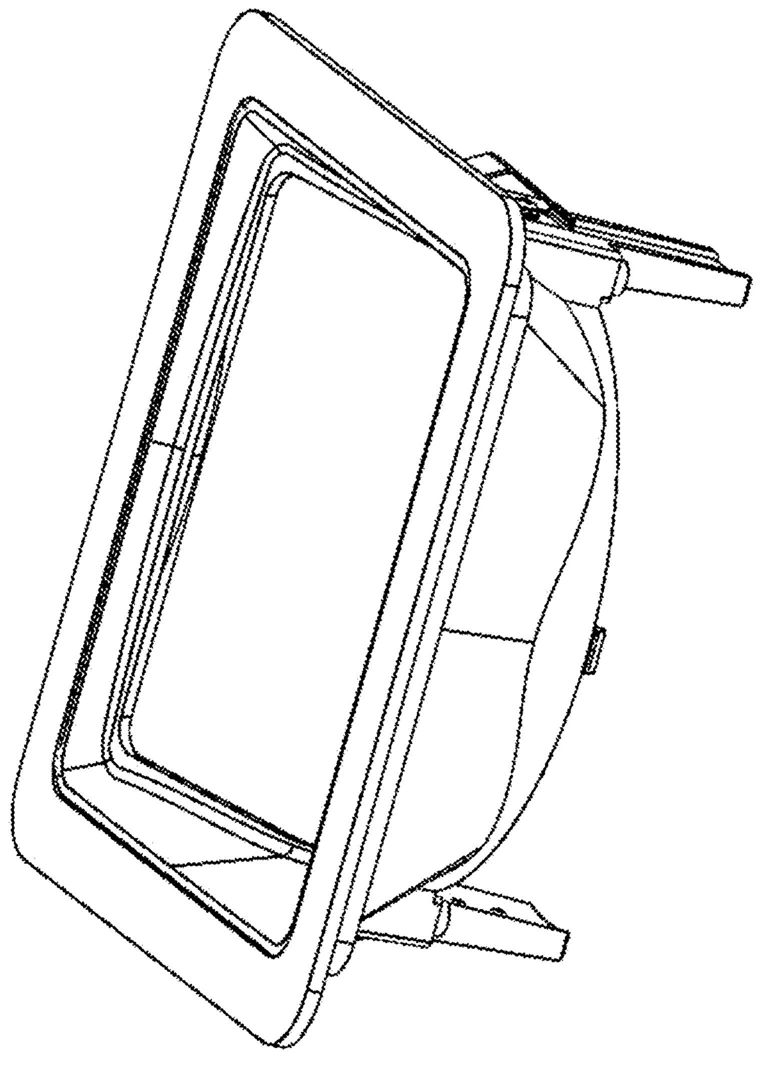

FIG. 242 on sheet 238 of the drawings is a screenshot of Wall wash-related features of the examples [100*a-d*] of the lighting system.

Figure 243:
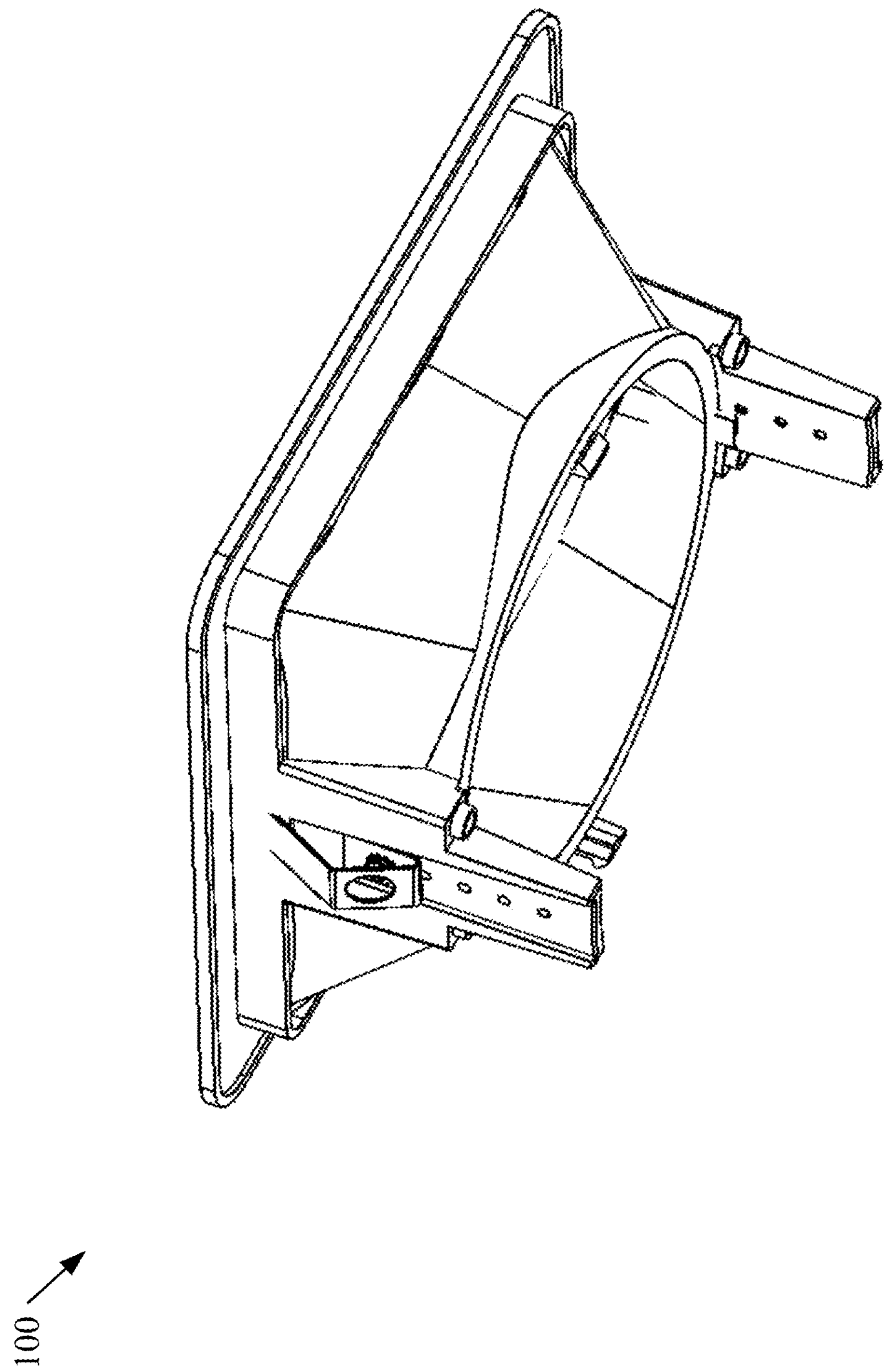

FIG. 243 on sheet 239 of the drawings is a screenshot of Wall wash-related features of the examples [100*a-d*] of the lighting system.

Figure 244:
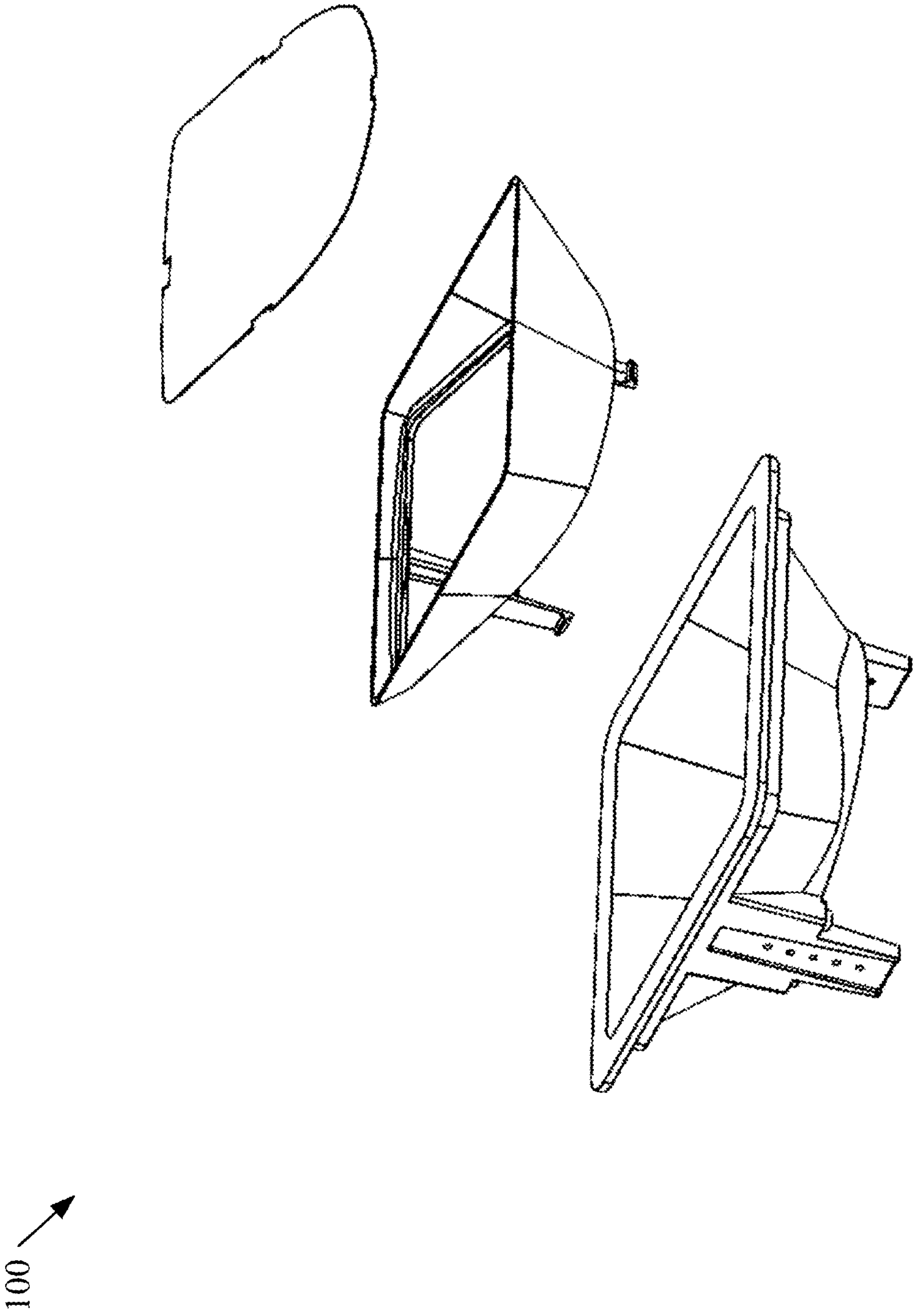

FIG. 244 on sheet 240 of the drawings is a screenshot of Wall wash-related features of the examples [100*a-d*] of the lighting system.

Figure 245:
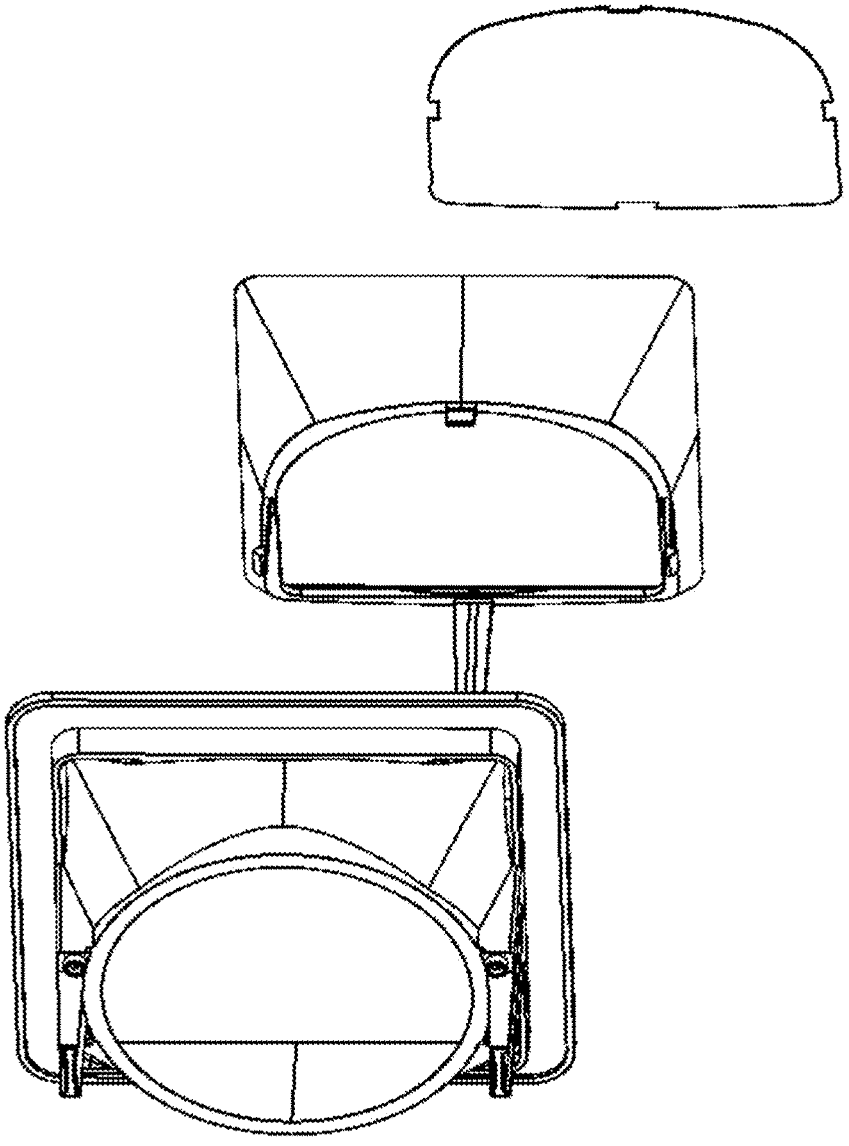

FIG. 245 on sheet 241 of the drawings is a screenshot of Wall wash-related features of the examples [100*a-d*] of the lighting system.

Figure 246:
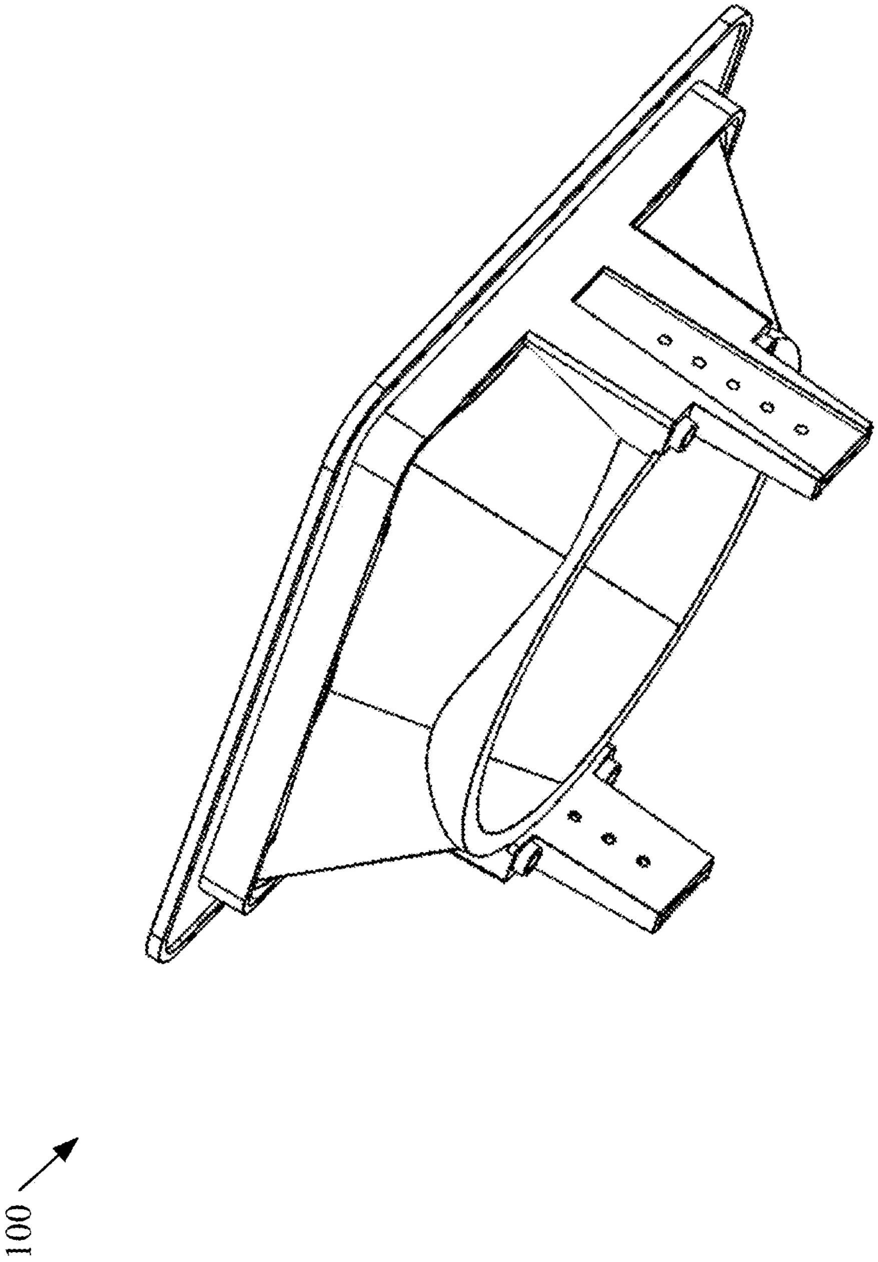

FIG. 246 on sheet 242 of the drawings is a screenshot of Wall wash-related features of the examples [100*a-d*] of the lighting system.

Figure 247:
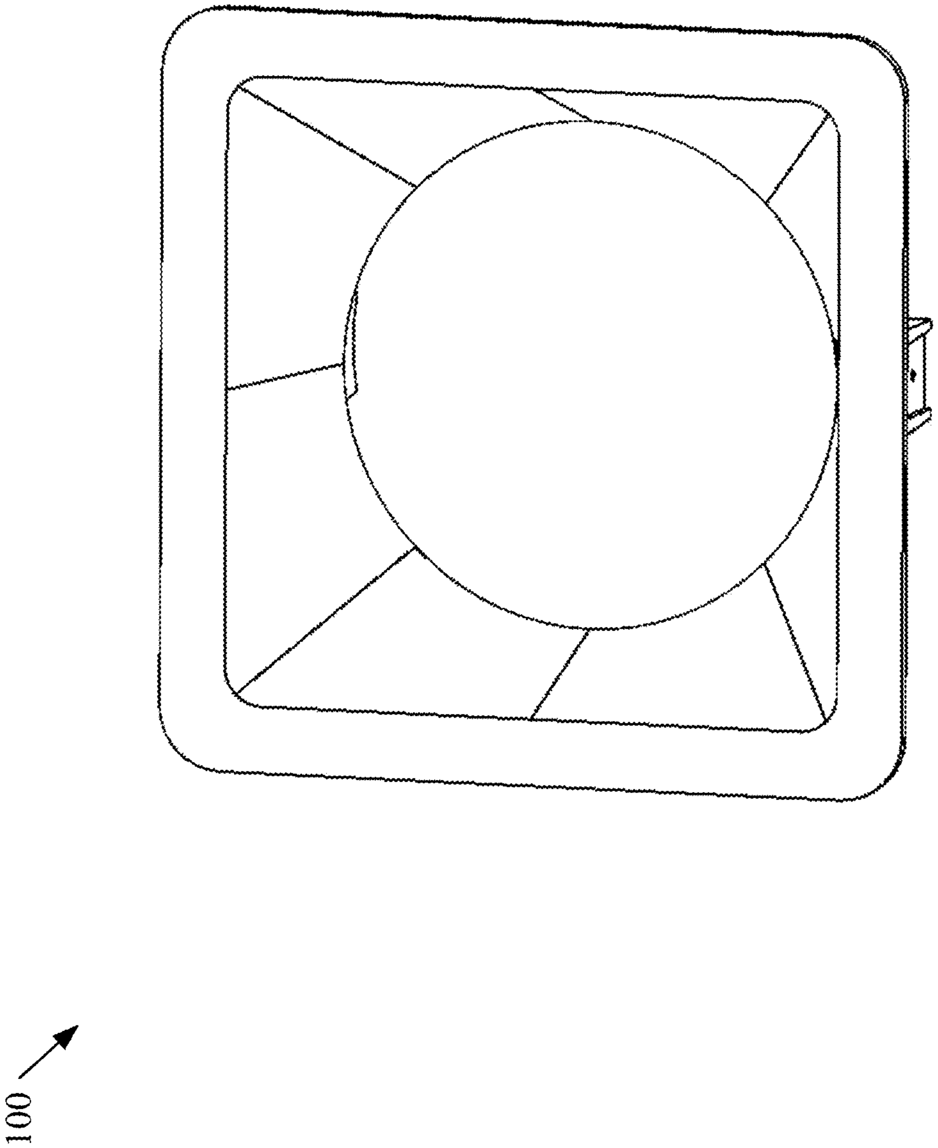

FIG. 247 on sheet 243 of the drawings is a screenshot of Wall wash-related features of the examples [100*a-d*] of the lighting system.

Figure 248:
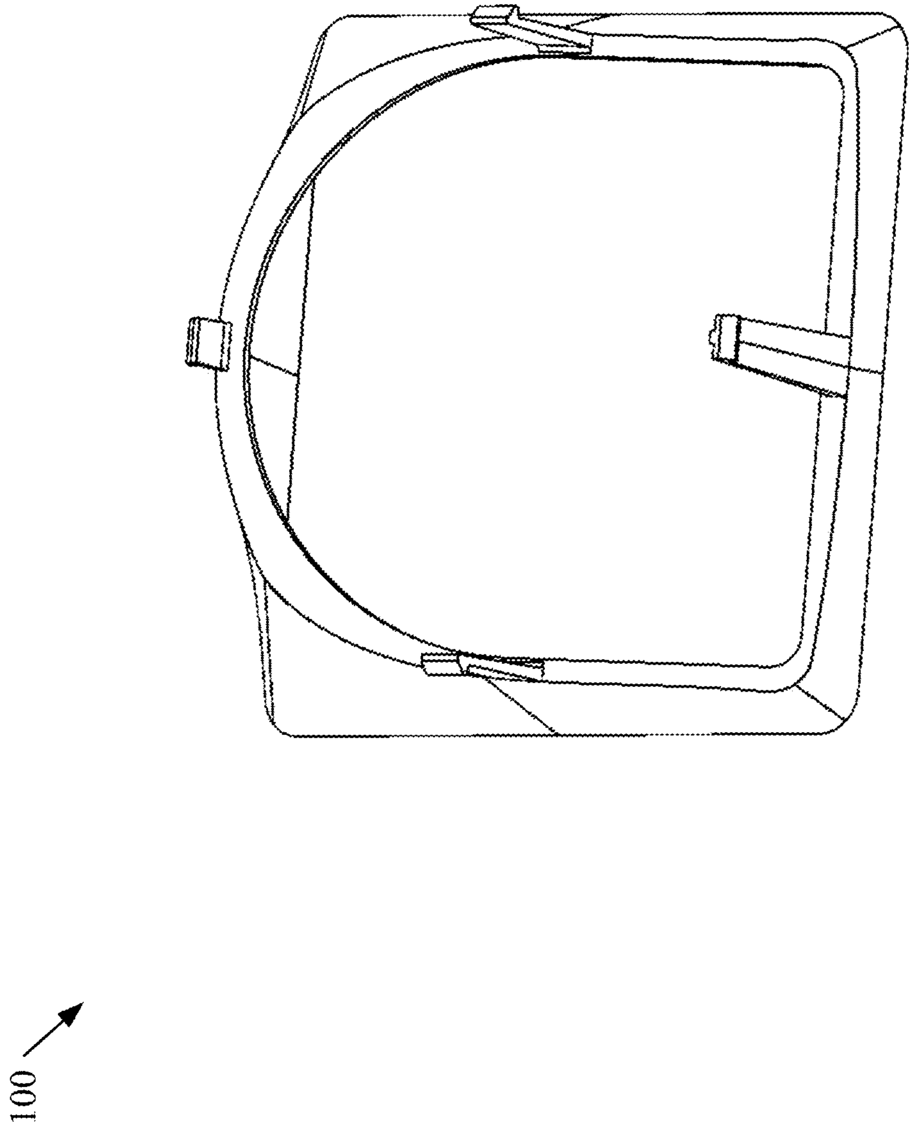

FIG. 248 on sheet 244 of the drawings is a screenshot of Wall wash-related features of the examples [100*a-d*] of the lighting system.

Figure 249:
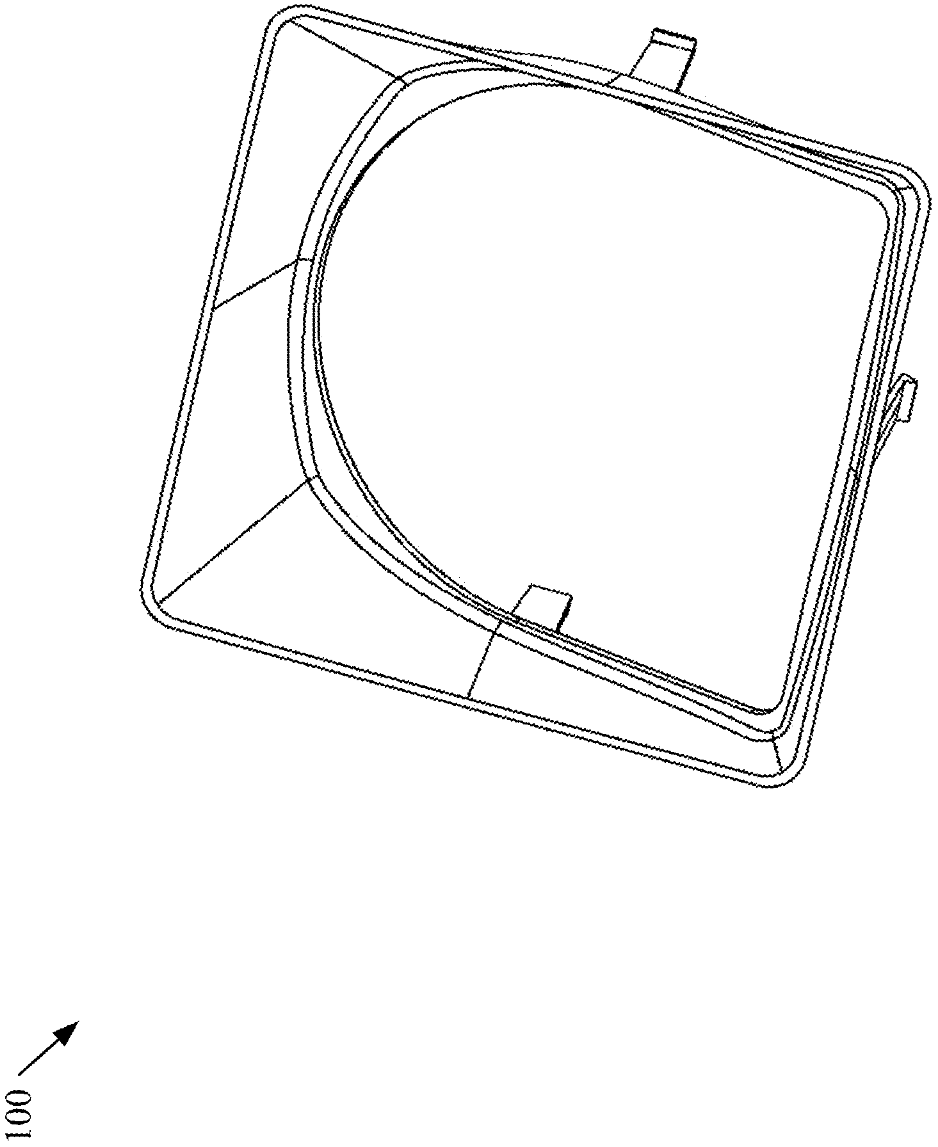

FIG. 249 on sheet 245 of the drawings is a screenshot of Wall wash-related features of the examples [100*a-d*] of the lighting system.

Figure 250:
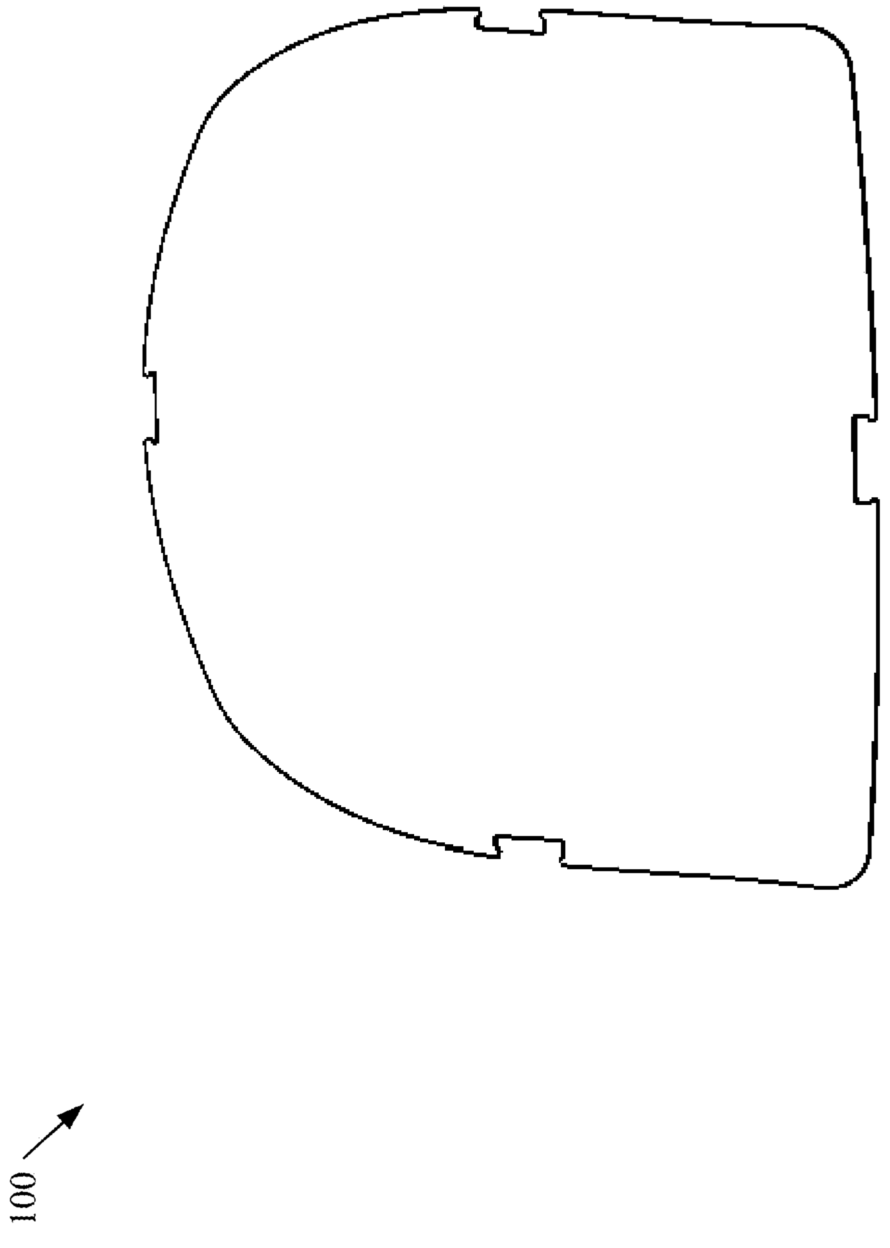

FIG. 250 on sheet 246 of the drawings is a screenshot of Wall wash-related features of the examples [100*a-d*] of the lighting system.

Figure 251:
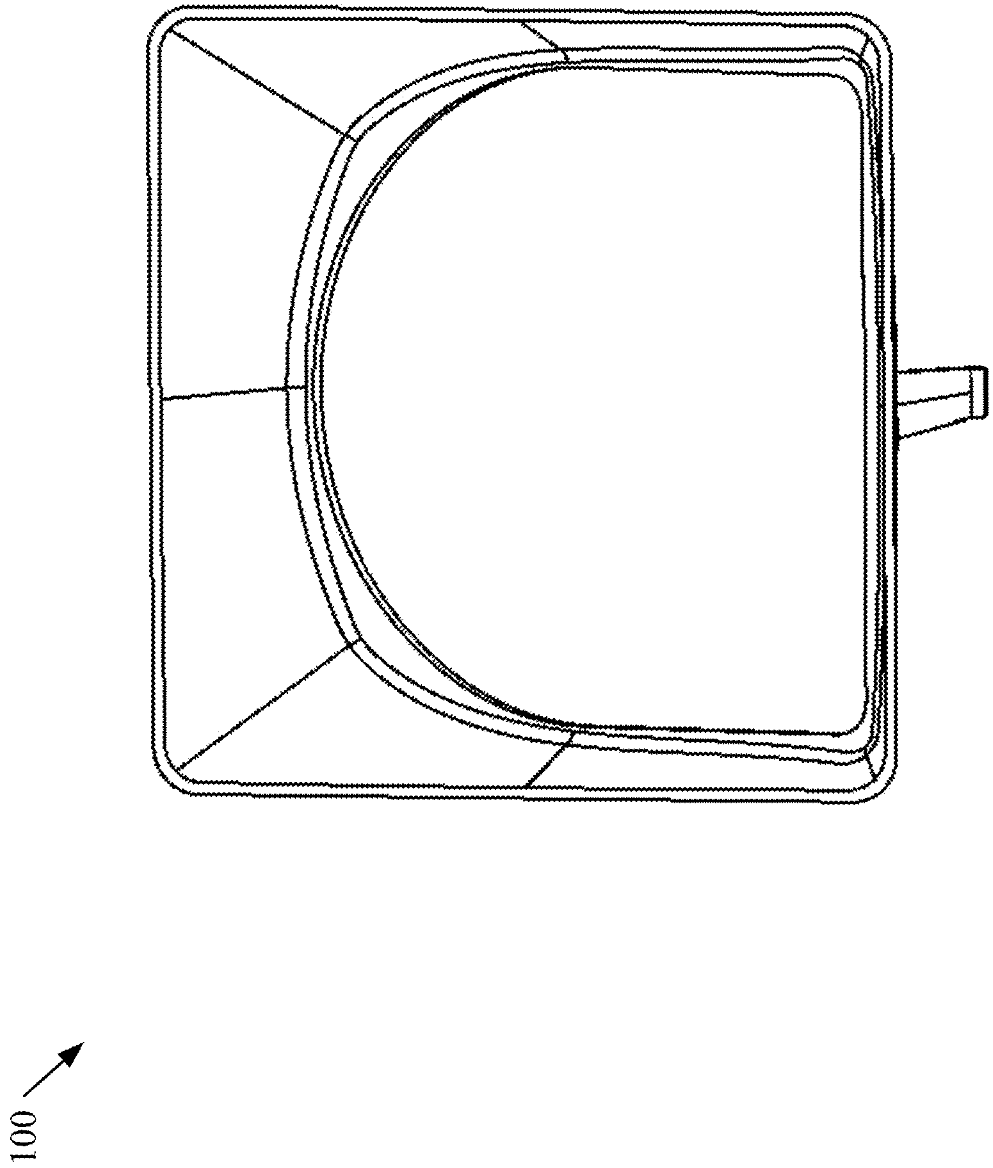

FIG. 251 on sheet 247 of the drawings is a screenshot of Wall wash-related features of the examples [100*a-d*] of the lighting system.

Figure 252:
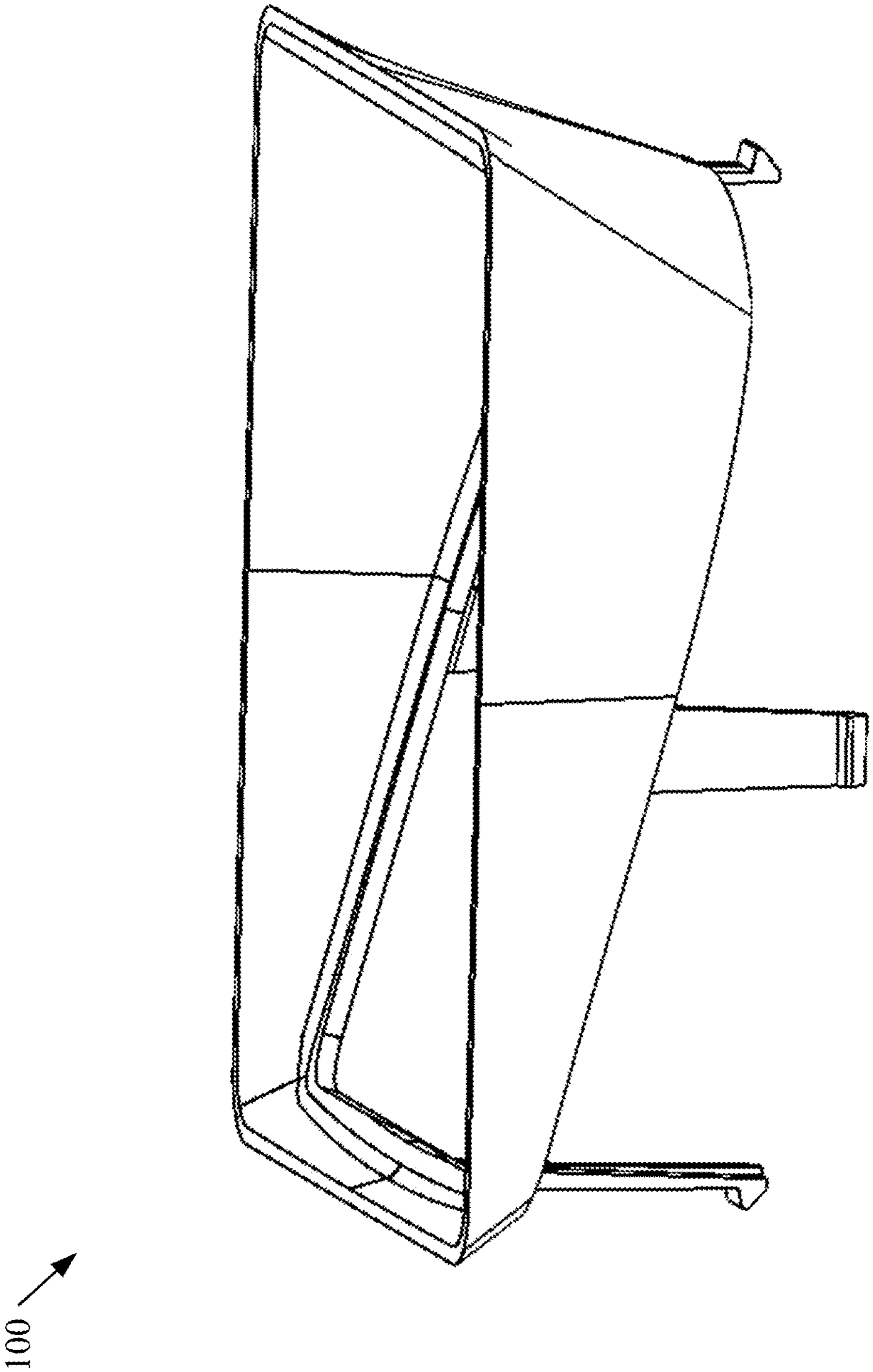

FIG. 252 on sheet 248 of the drawings is a screenshot of Wall wash-related features of the examples [100*a-d*] of the lighting system.

Figure 253:
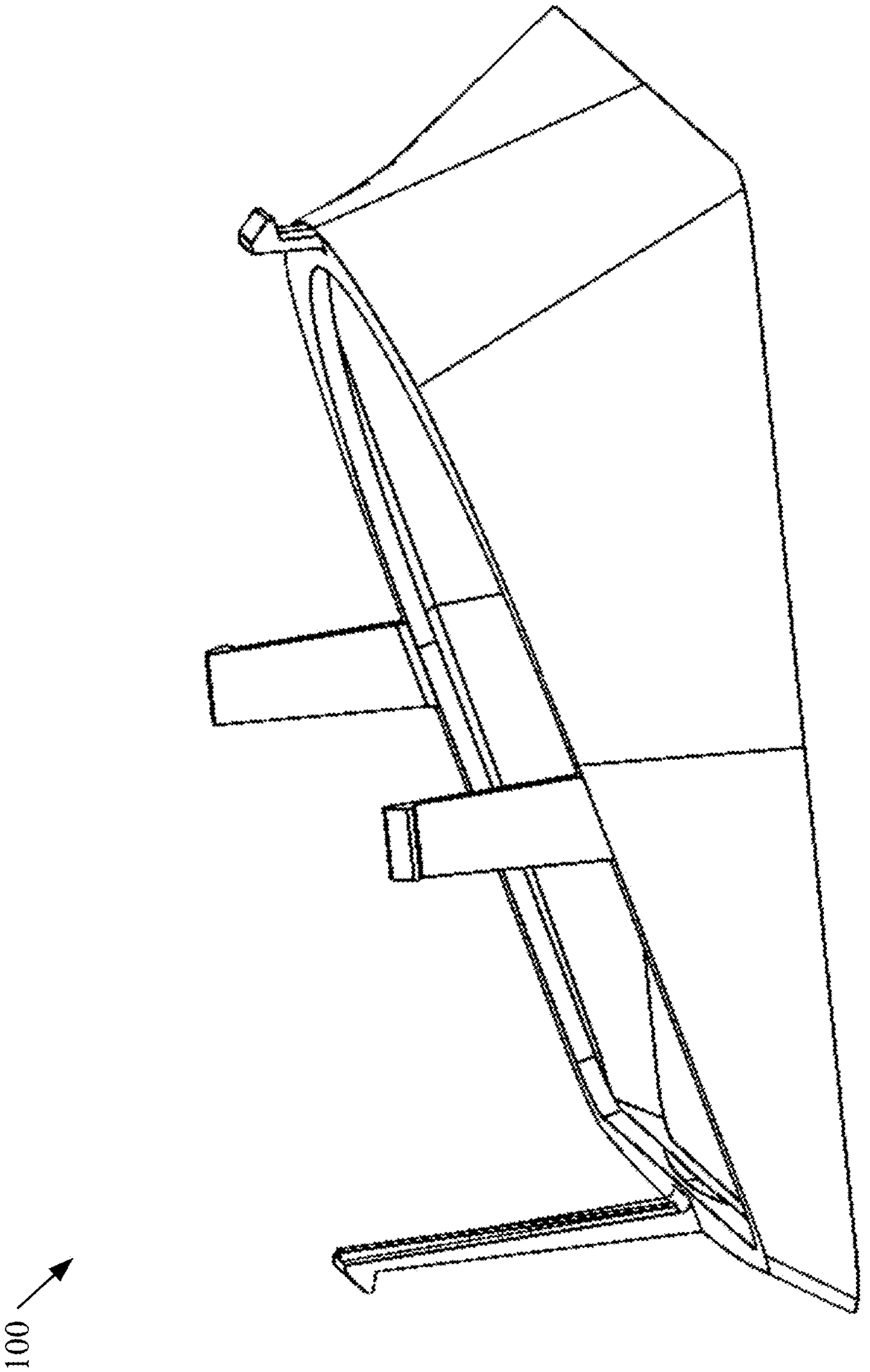

FIG. 253 on sheet 249 of the drawings is a screenshot of Wall wash-related features of the examples [100*a-d*] of the lighting system.

Figure 254:
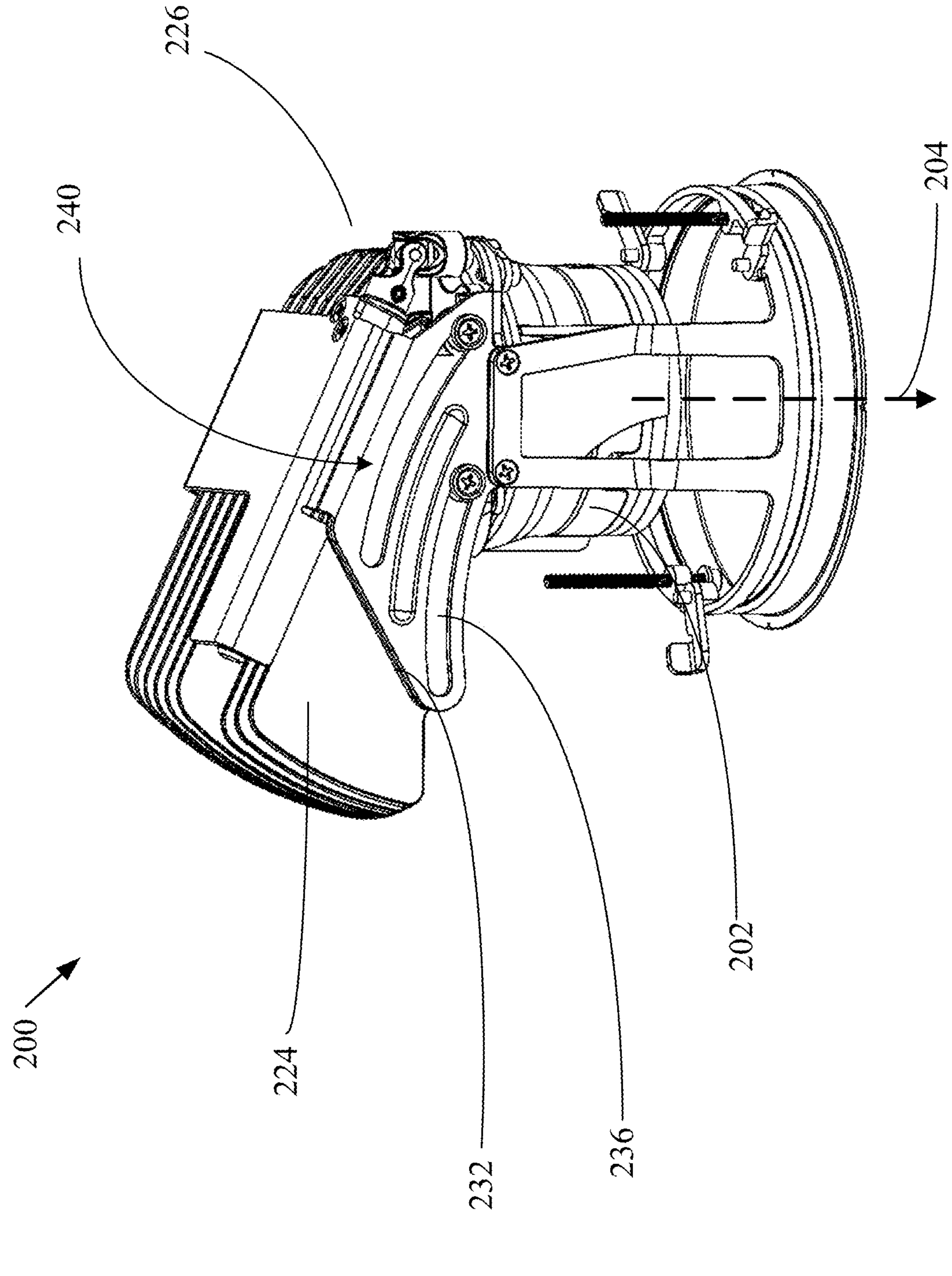

FIG. 254 on sheet 250 of the drawings is a screenshot of features of examples of another lighting system.

Figure 255:
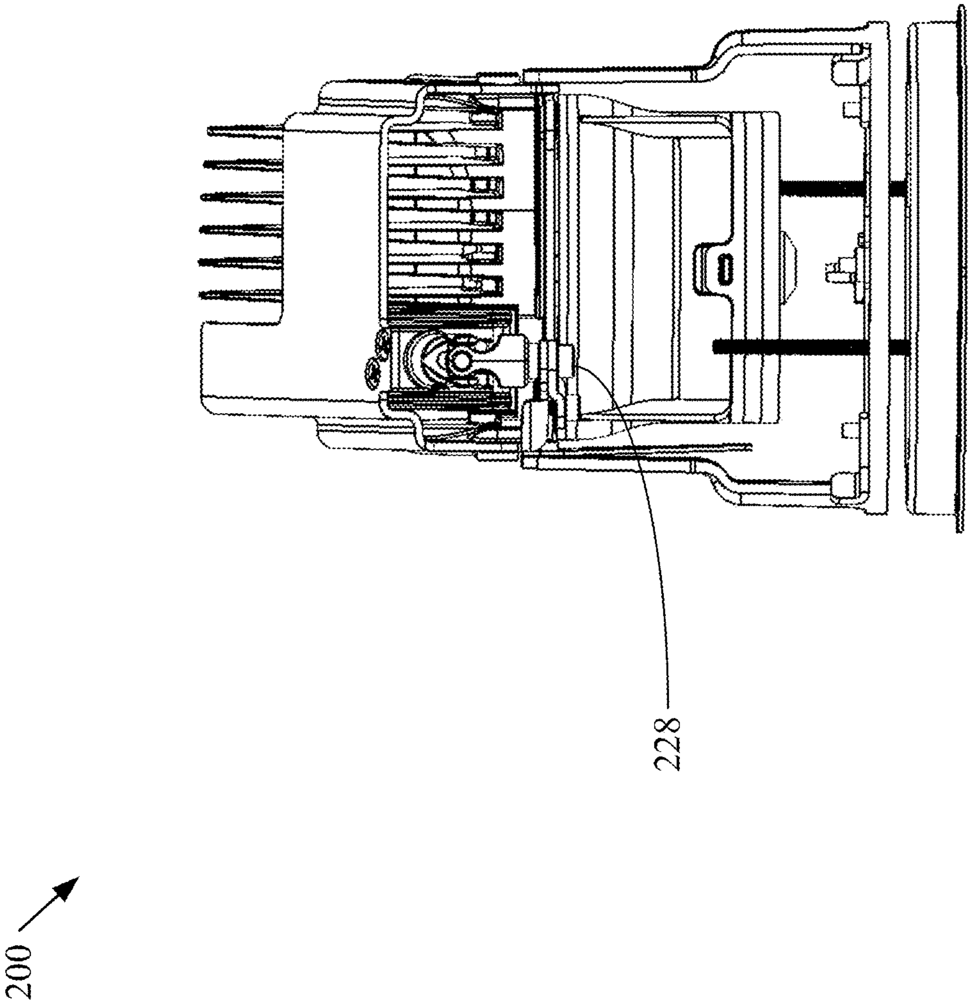

FIG. 255 on sheet 251 of the drawings is a screenshot of features of examples of another lighting system.

Figure 256:
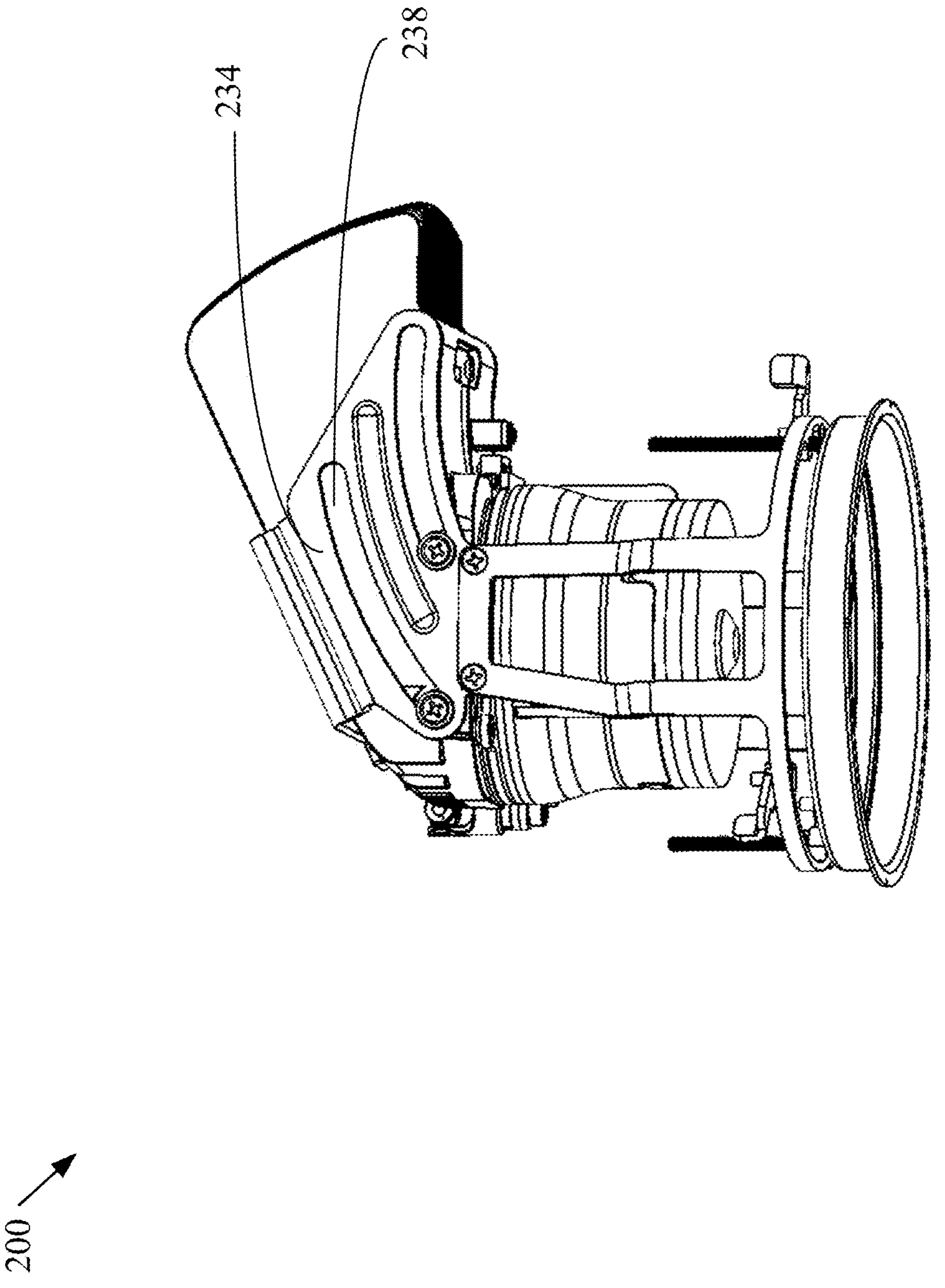

FIG. 256 on sheet 252 of the drawings is a screenshot of features of examples of another lighting system.

Figure 257:
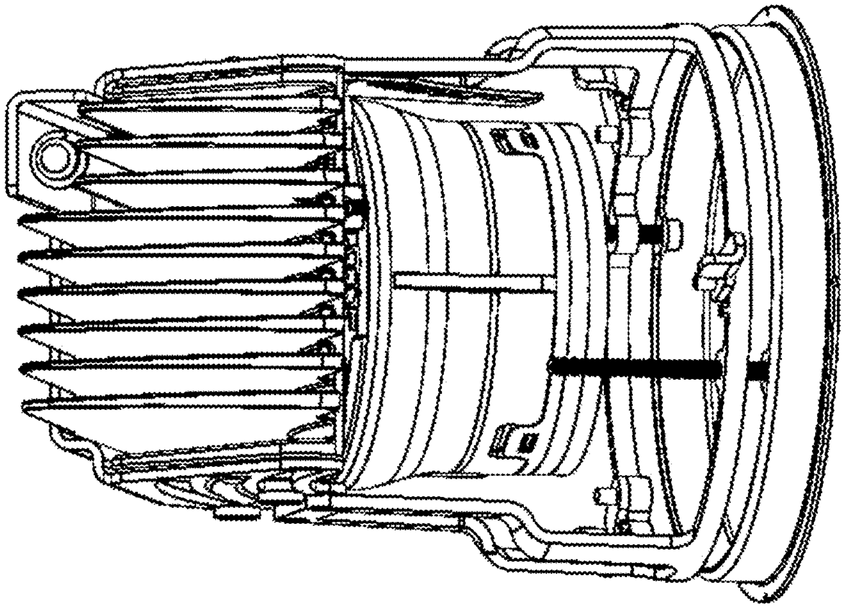

FIG. 257 on sheet 253 of the drawings is a screenshot of features of examples of another lighting system.

Figure 258:
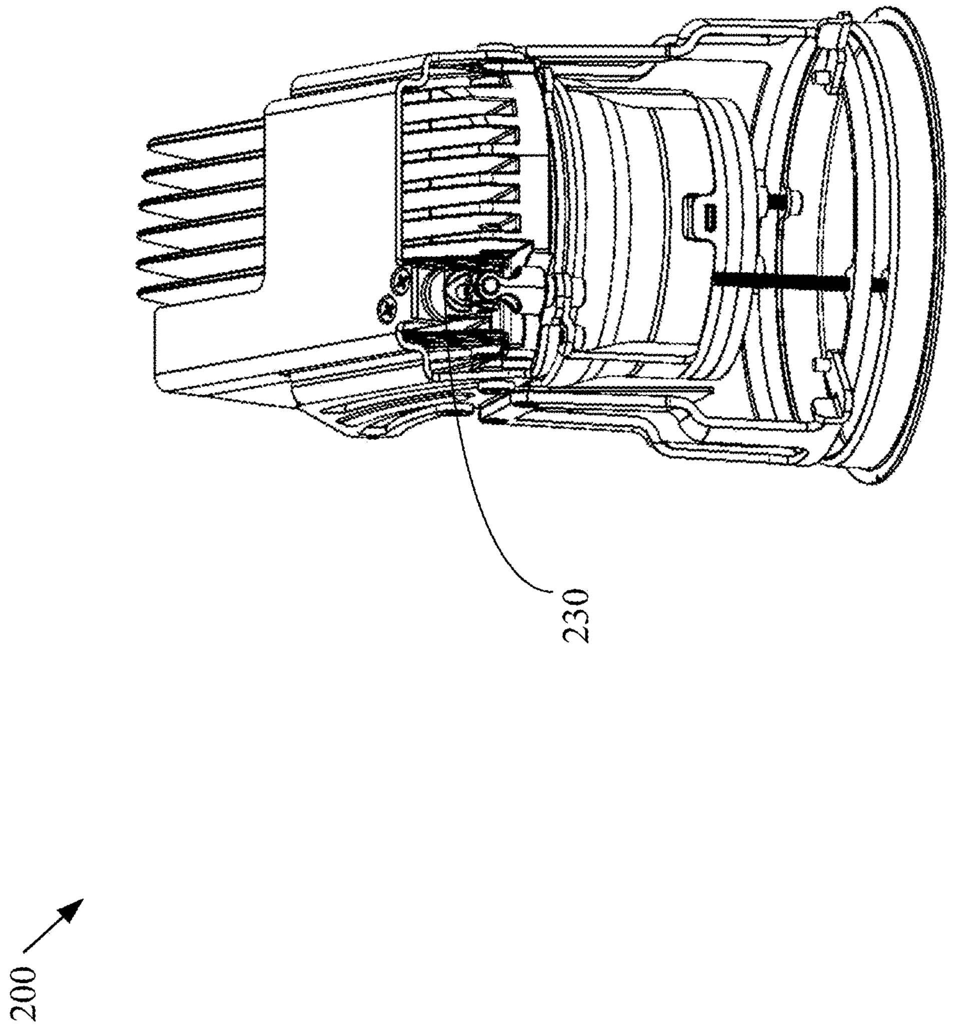

FIG. 258 on sheet 254 of the drawings is a screenshot of features of examples of another lighting system.

Figure 259:
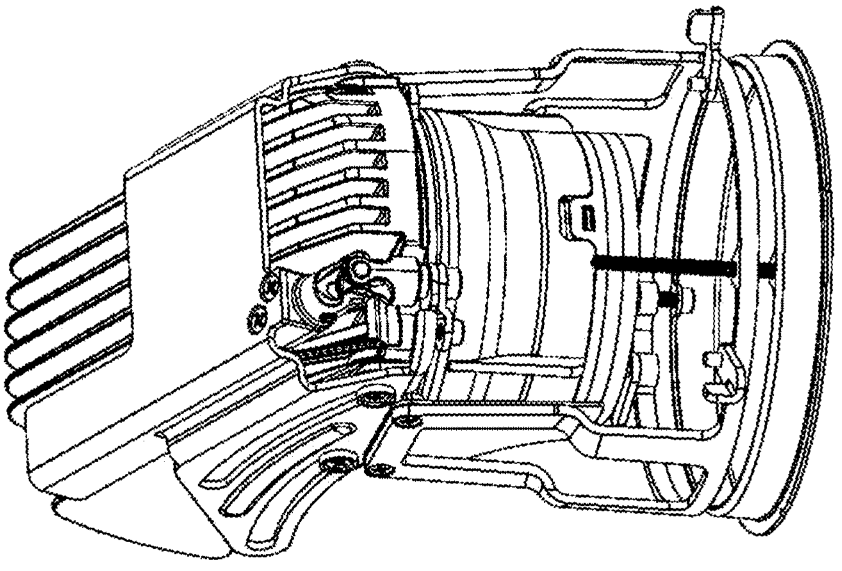

FIG. 259 on sheet 255 of the drawings is a screenshot of features of examples of another lighting system.

Figure 260:
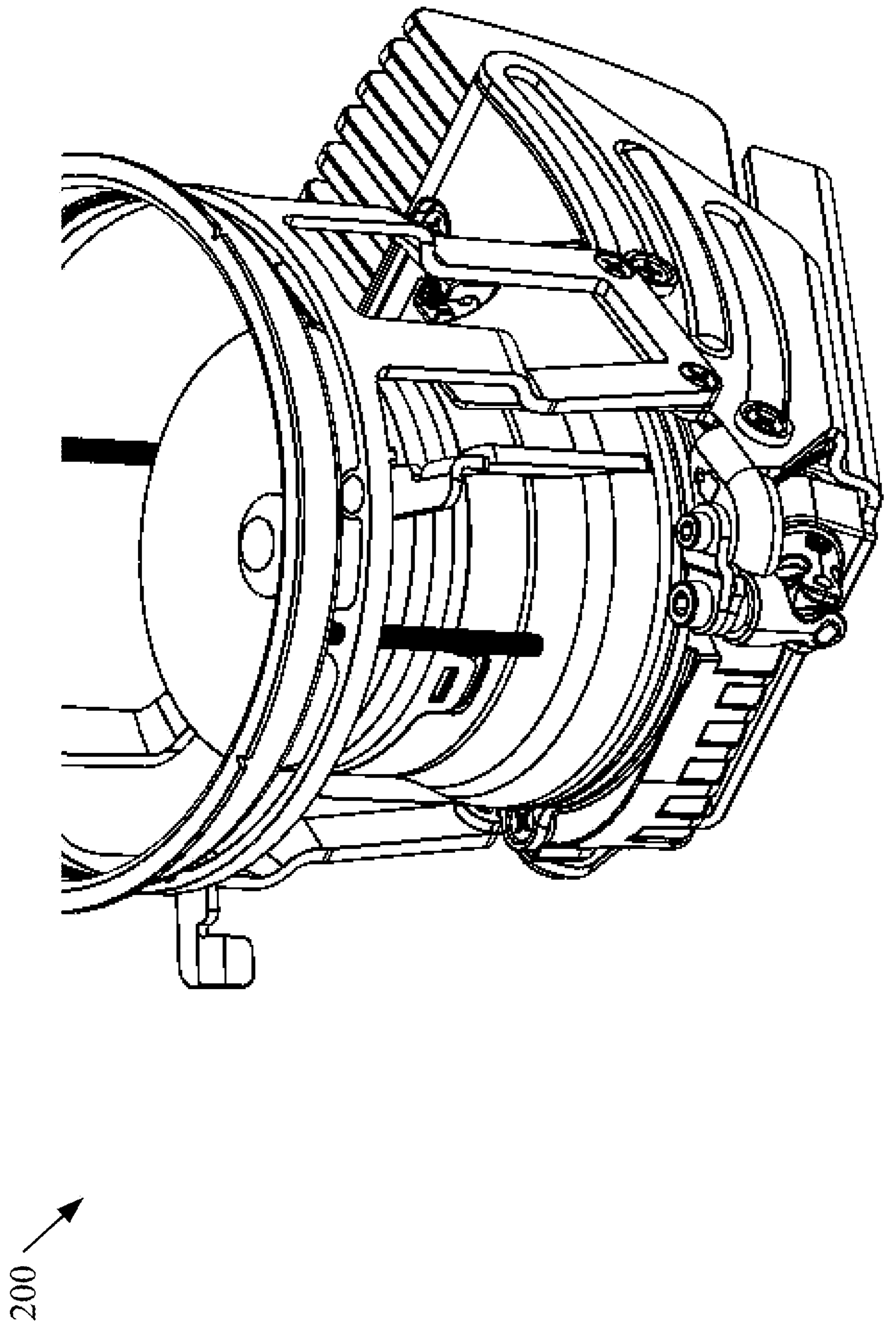

FIG. 260 on sheet 256 of the drawings is a screenshot of features of examples of another lighting system.

Figure 261:
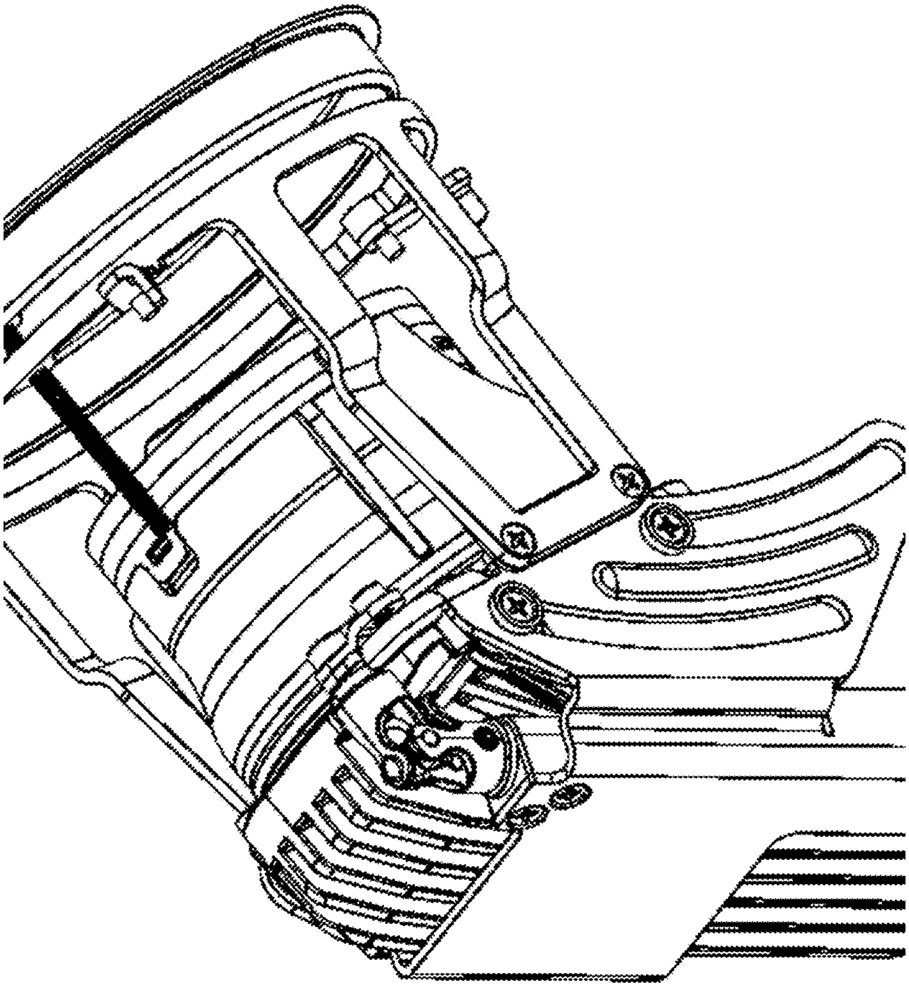

FIG. 261 on sheet 257 of the drawings is a screenshot of features of examples of another lighting system.

Figure 262:
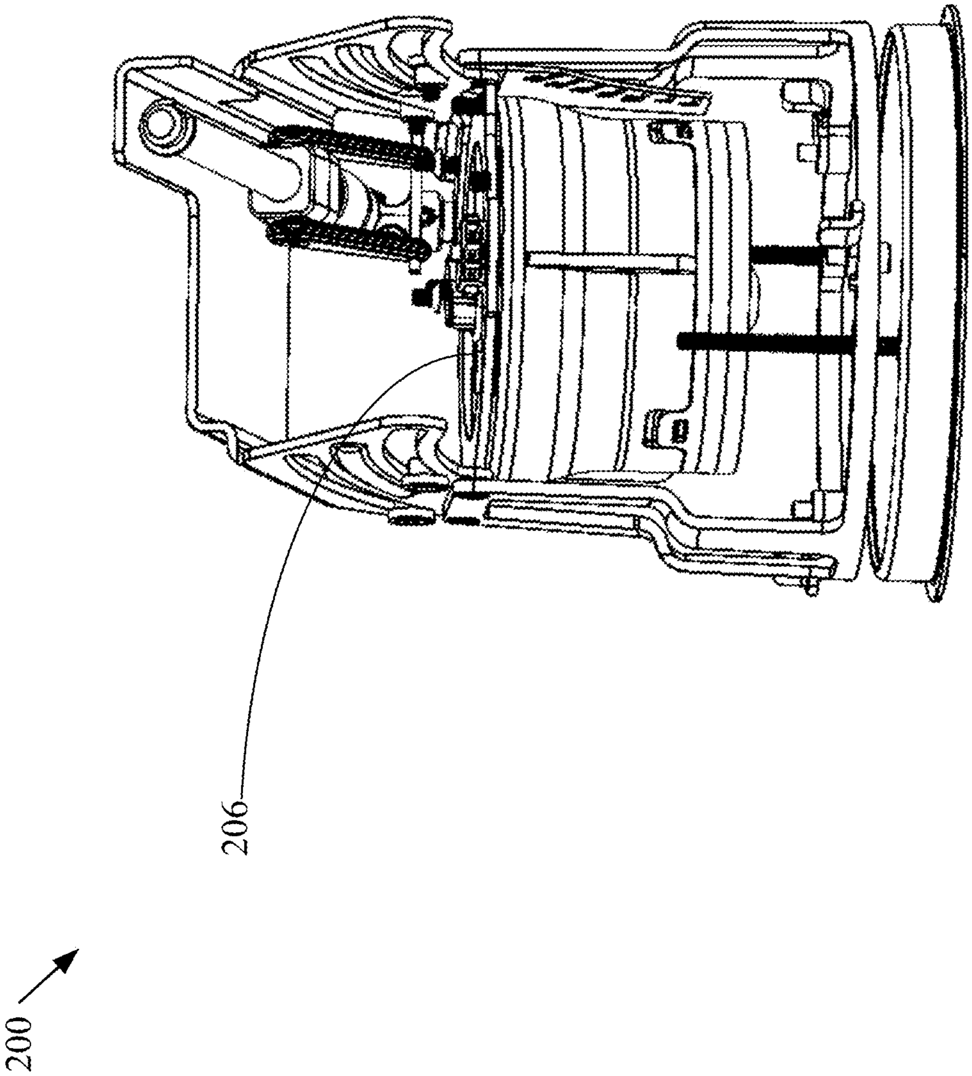

FIG. 262 on sheet 258 of the drawings is a screenshot of features of examples of another lighting system.

Figure 263:
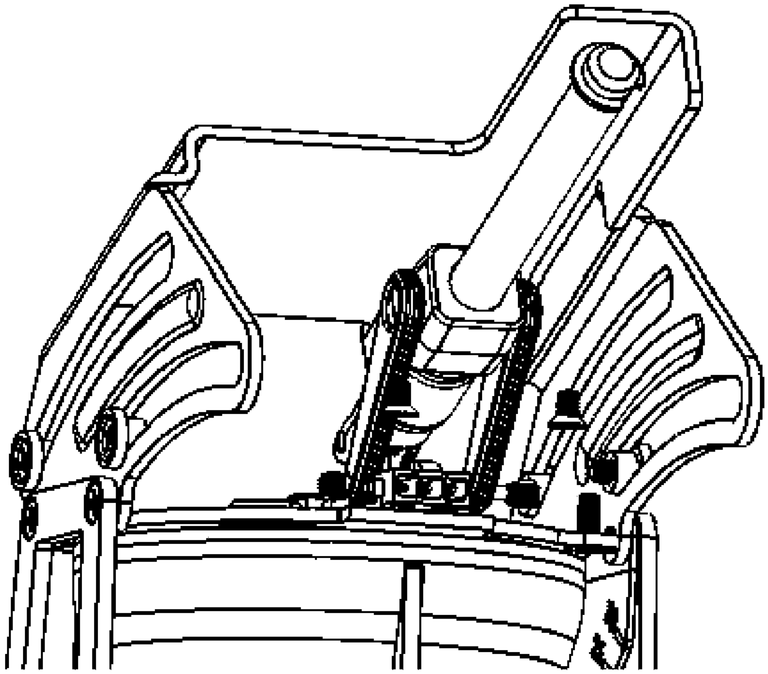

FIG. 263 on sheet 259 of the drawings is a screenshot of features of examples of another lighting system.

Figure 264:
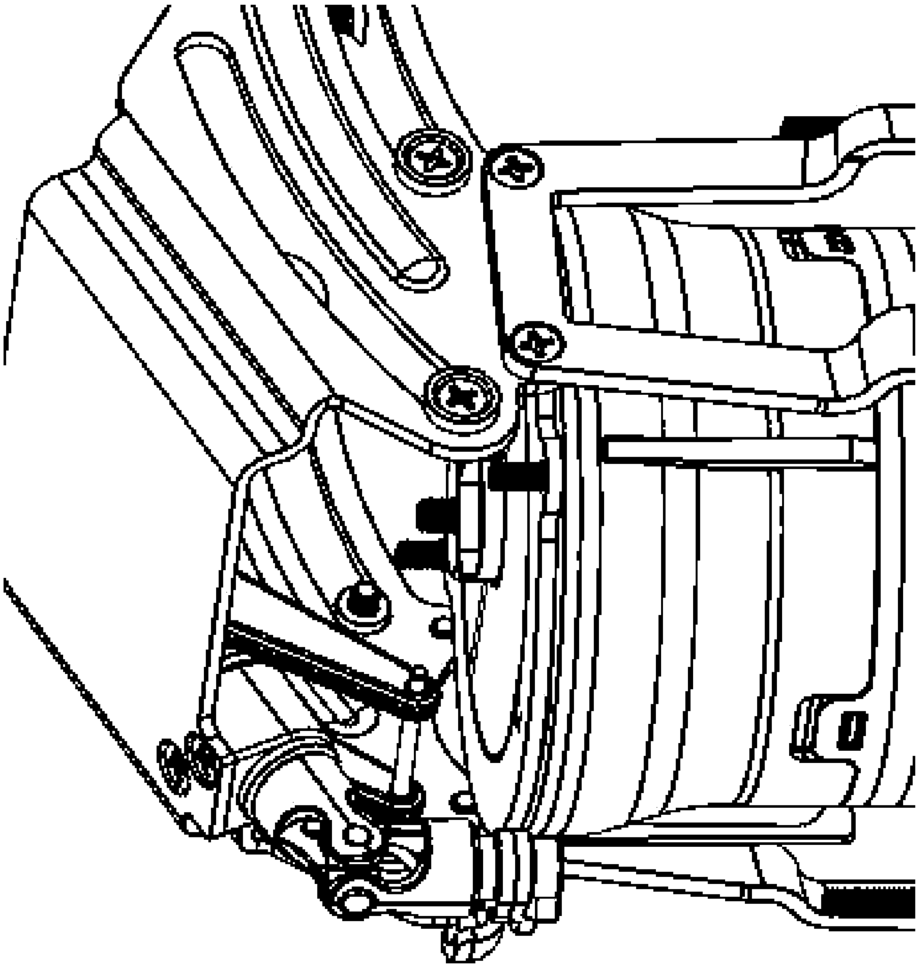

FIG. 264 on sheet 260 of the drawings is a screenshot of features of examples of another lighting system.

Figure 265:
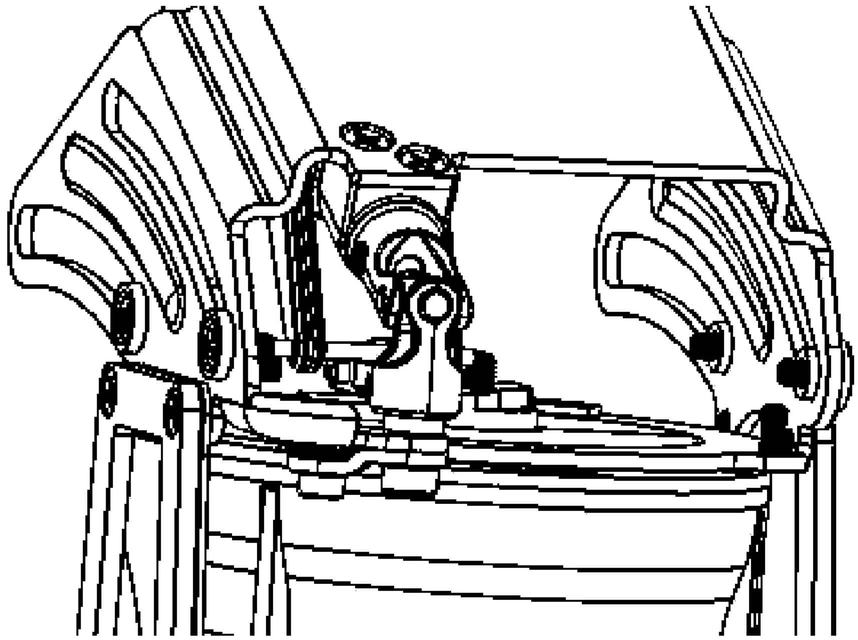

FIG. 265 on sheet 261 of the drawings is a screenshot of features of examples of another lighting system.

Figure 266:
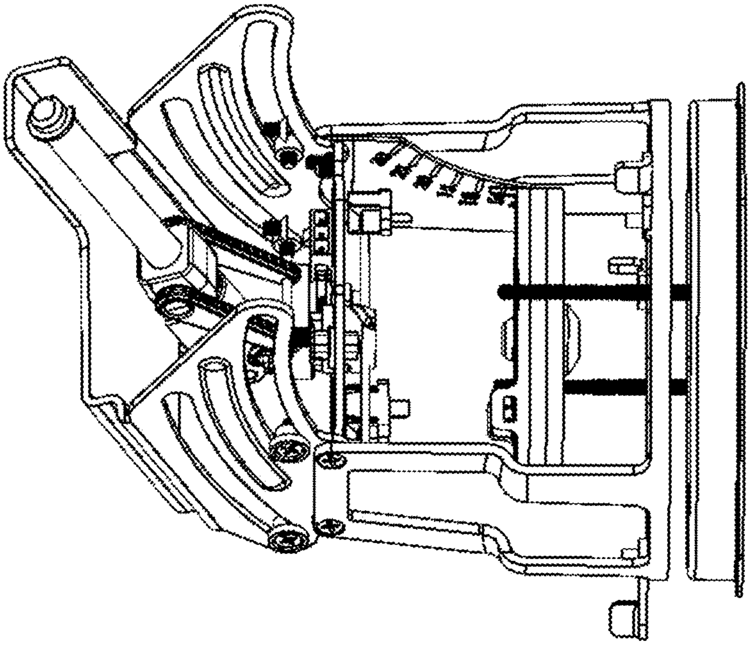

FIG. 266 on sheet 262 of the drawings is a screenshot of features of examples of another lighting system.

Figure 267:
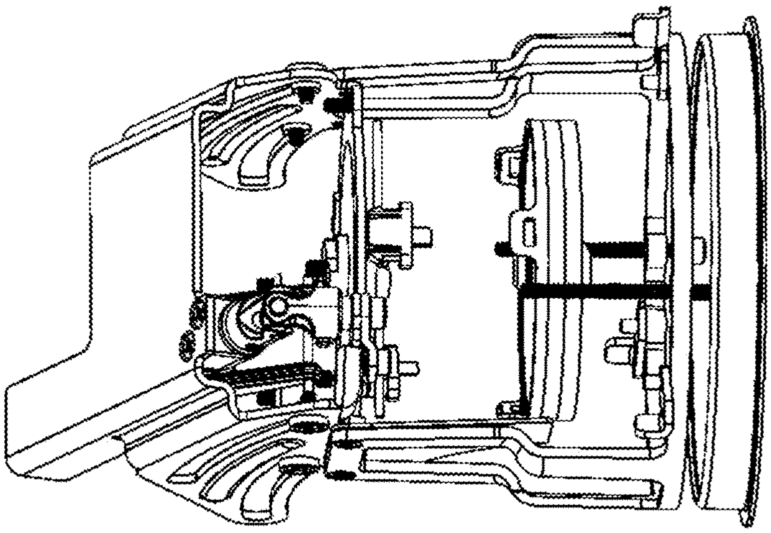

FIG. 267 on sheet 263 of the drawings is a screenshot of features of examples of another lighting system.

Figure 268:
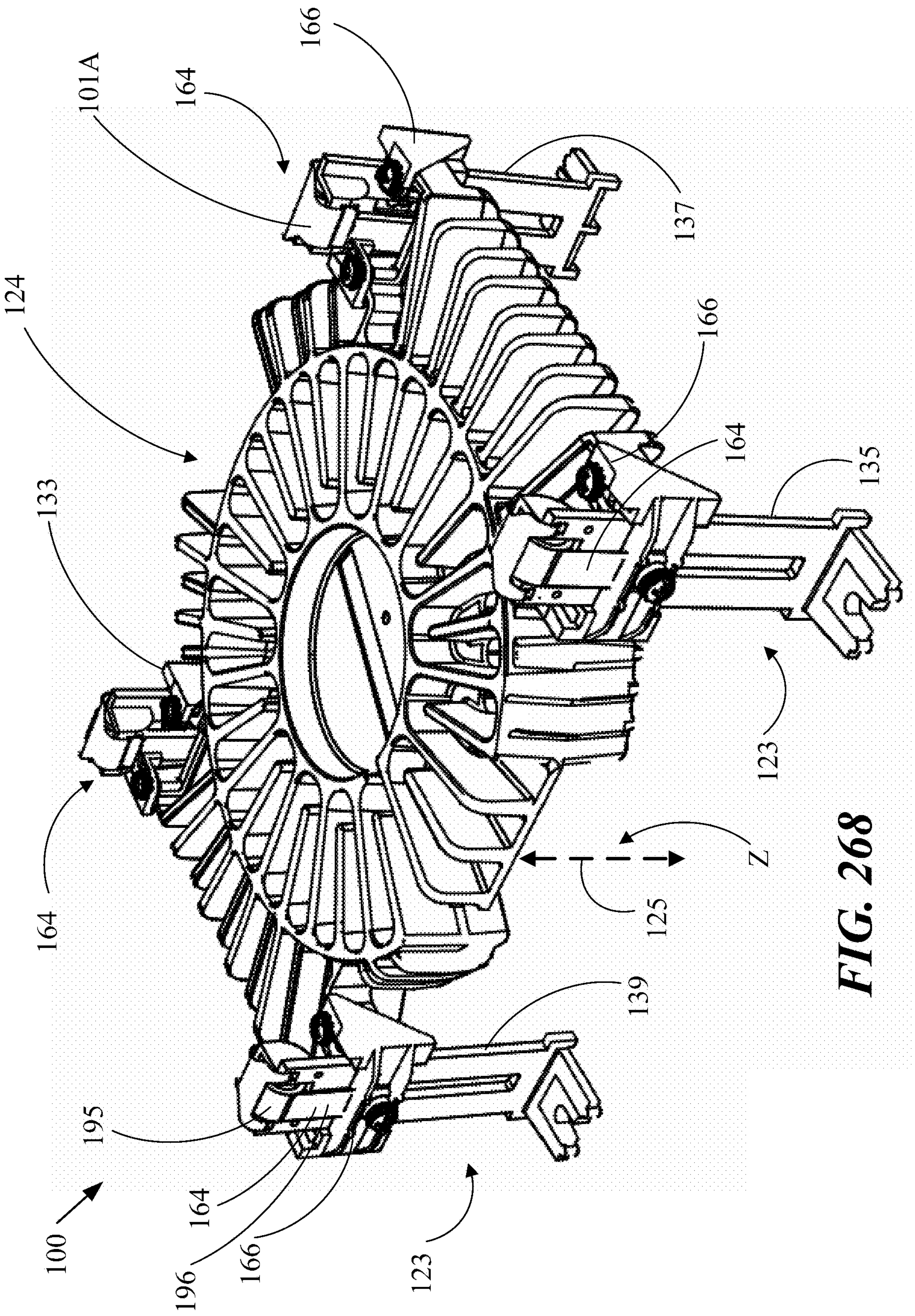

FIG. 268 on sheet 264 of the drawings is a screenshot of additional Z-Adjustment-related features of the examples [100*a-d*] of the lighting system.

Figure 269:
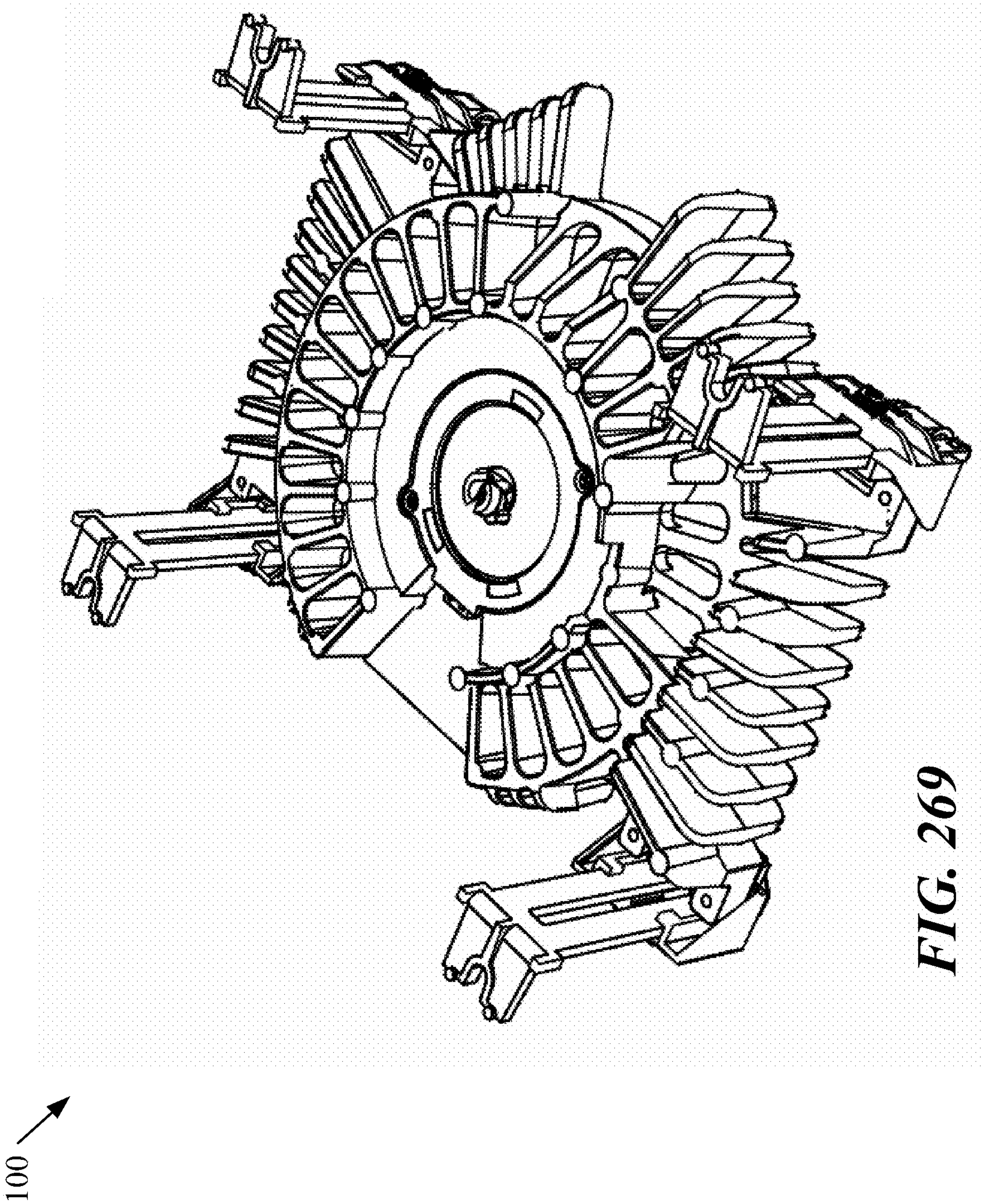

FIG. 269 on sheet 265 of the drawings is a screenshot of additional Z-Adjustment-related features of the examples [100*a-d*] of the lighting system.

Figure 270:
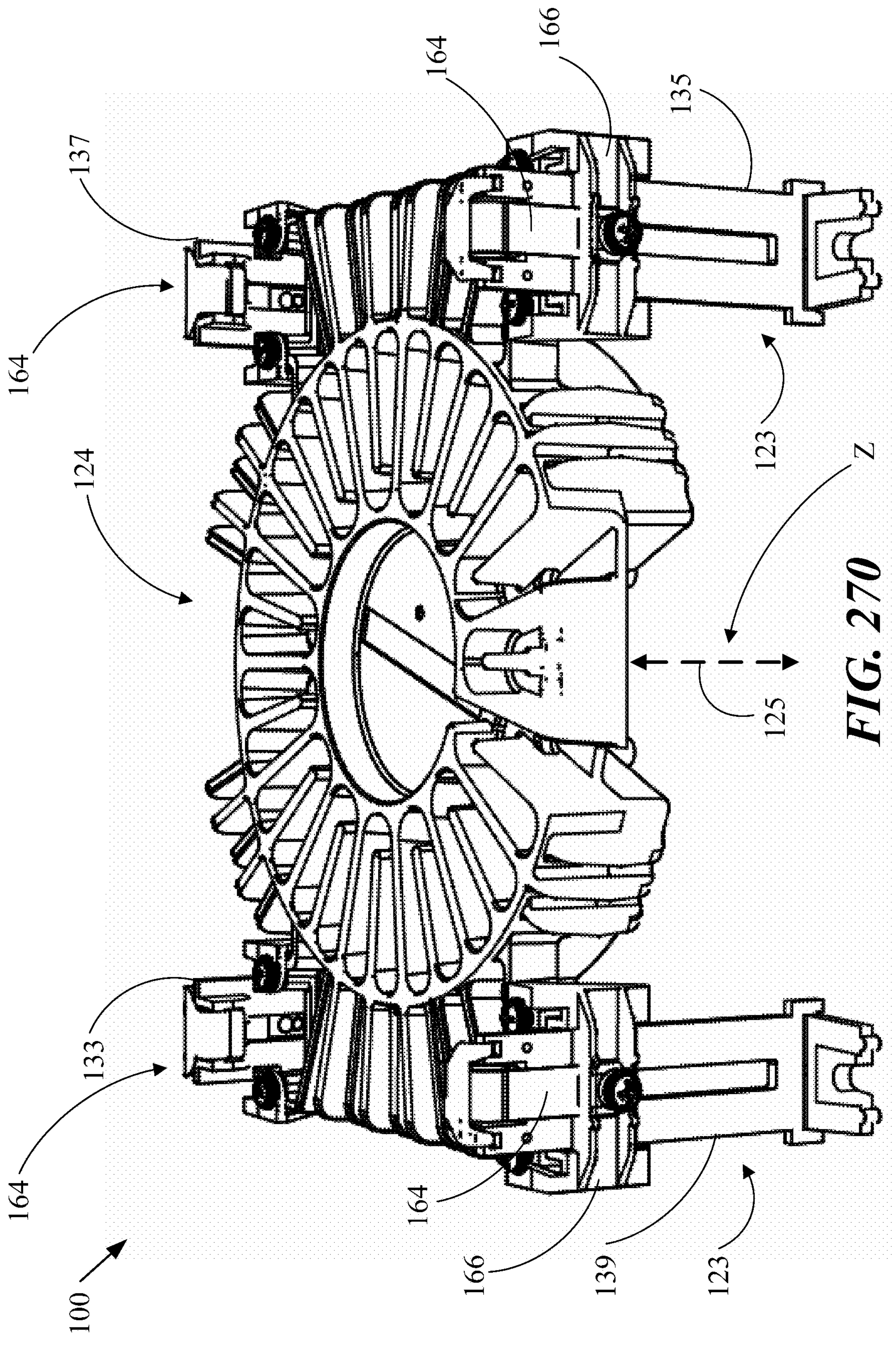

FIG. 270 on sheet 266 of the drawings is a screenshot of additional Z-Adjustment-related features of the examples [100*a-d*] of the lighting system.

Figure 271:
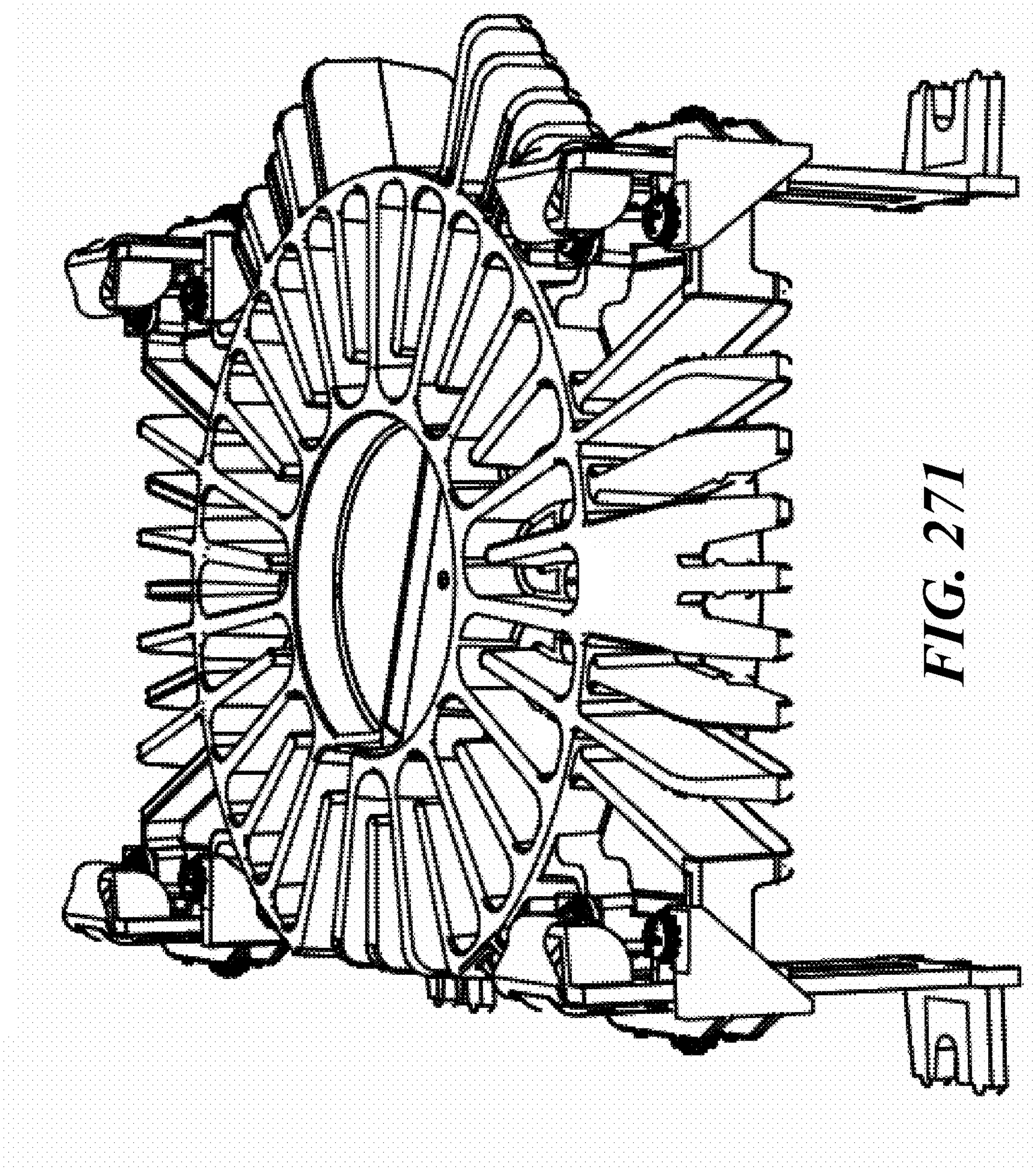

FIG. 271 on sheet 267 of the drawings is a screenshot of additional Z-Adjustment-related features of the examples [100*a-d*] of the lighting system.

Figure 272:
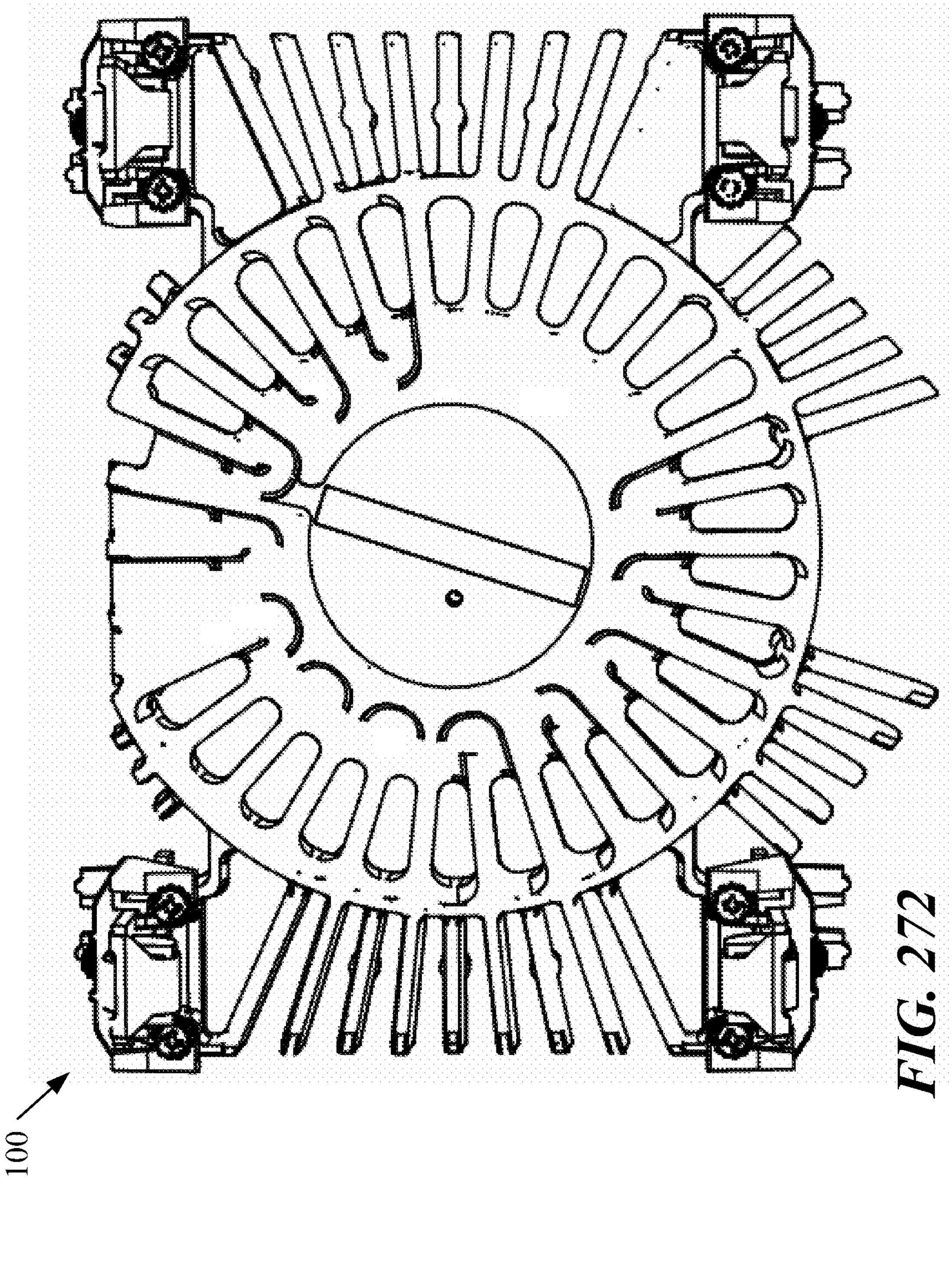

FIG. 272 on sheet 268 of the drawings is a screenshot of additional Z-Adjustment-related features of the examples [100*a-d*] of the lighting system.

Figure 273:
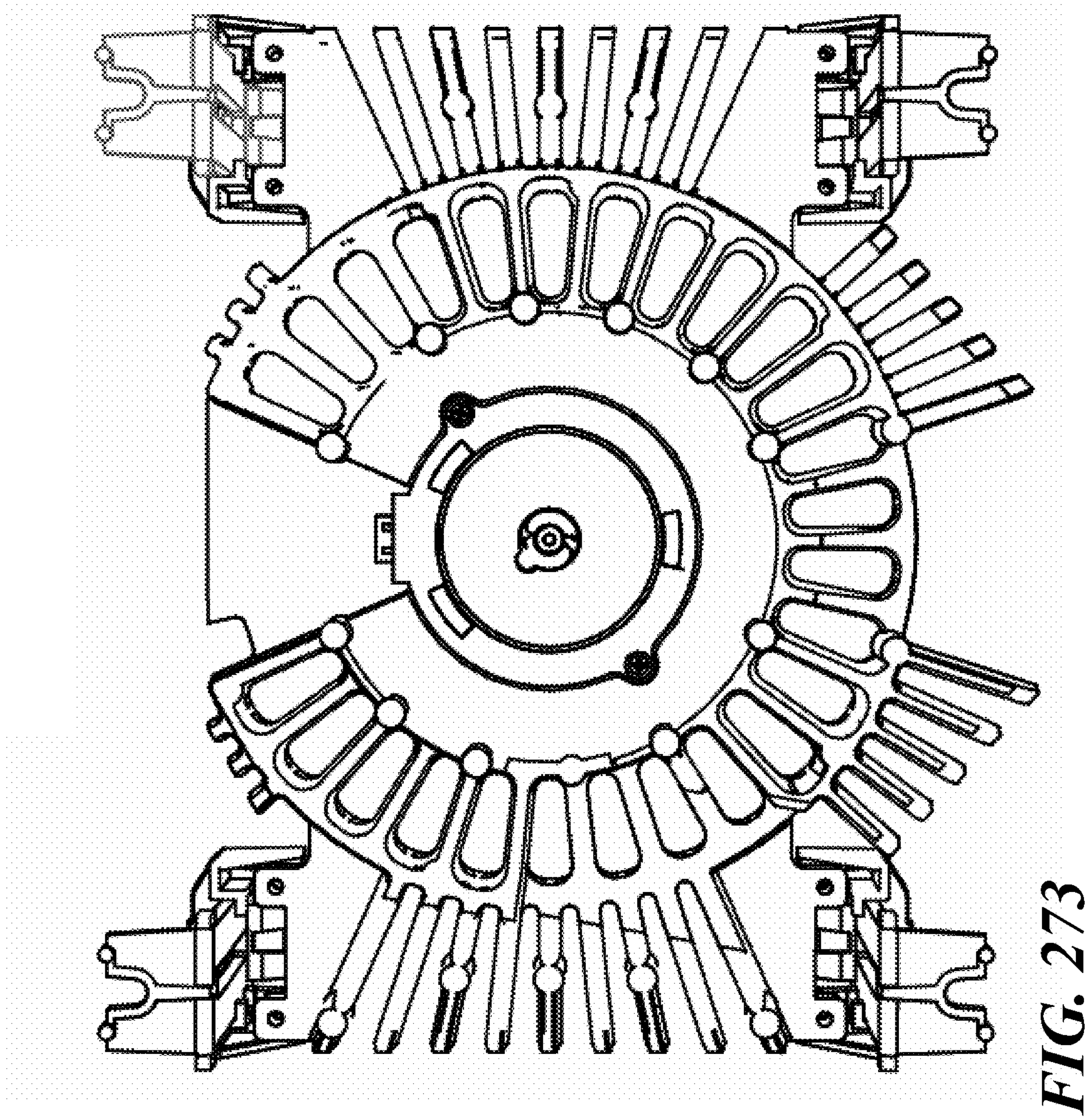

FIG. 273 on sheet 269 of the drawings is a screenshot of additional Z-Adjustment-related features of the examples [100*a-d*] of the lighting system.

Figure 274:
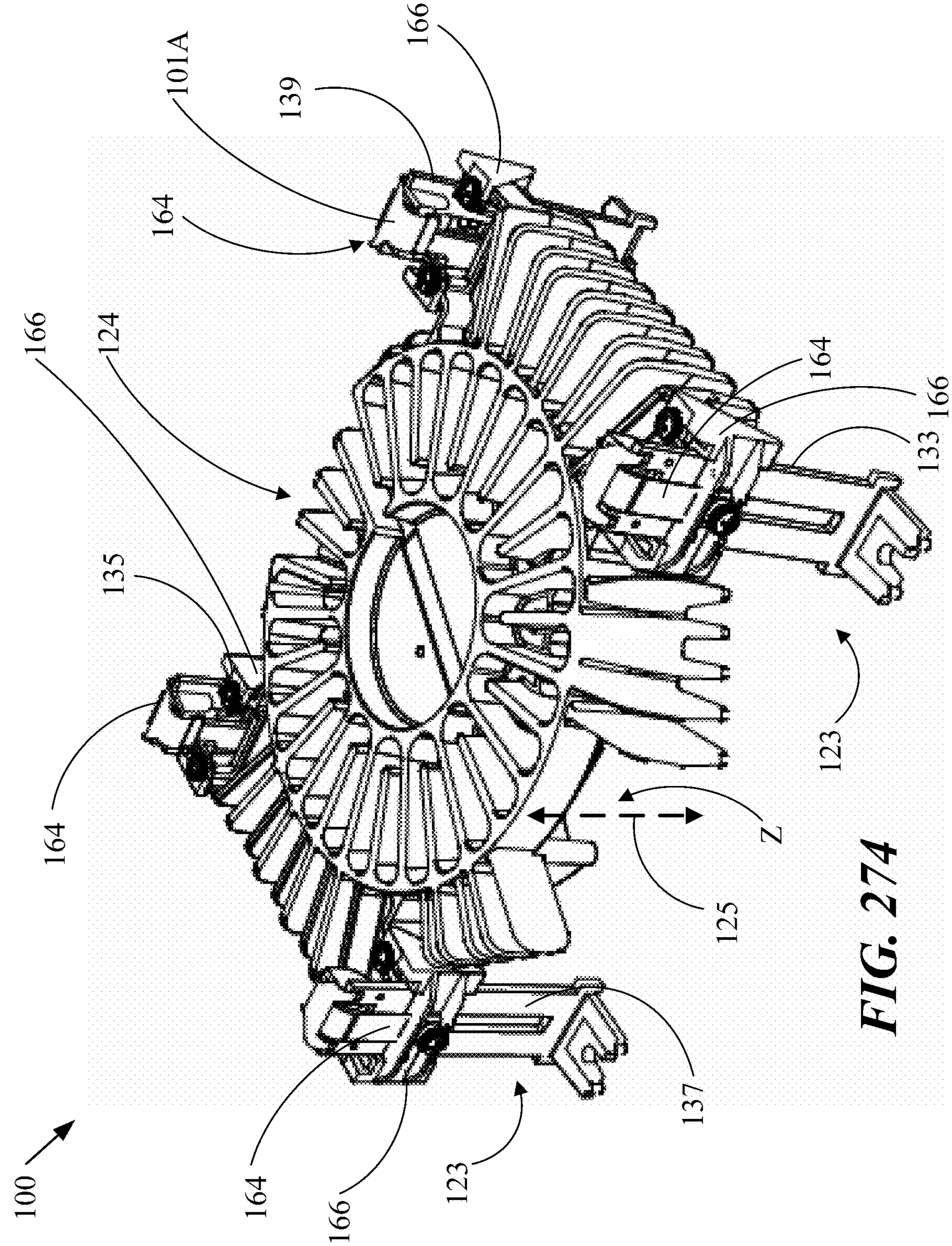

FIG. 274 on sheet 270 of the drawings is a screenshot of additional Z-Adjustment-related features of the examples [100*a-d*] of the lighting system.

Figure 275:
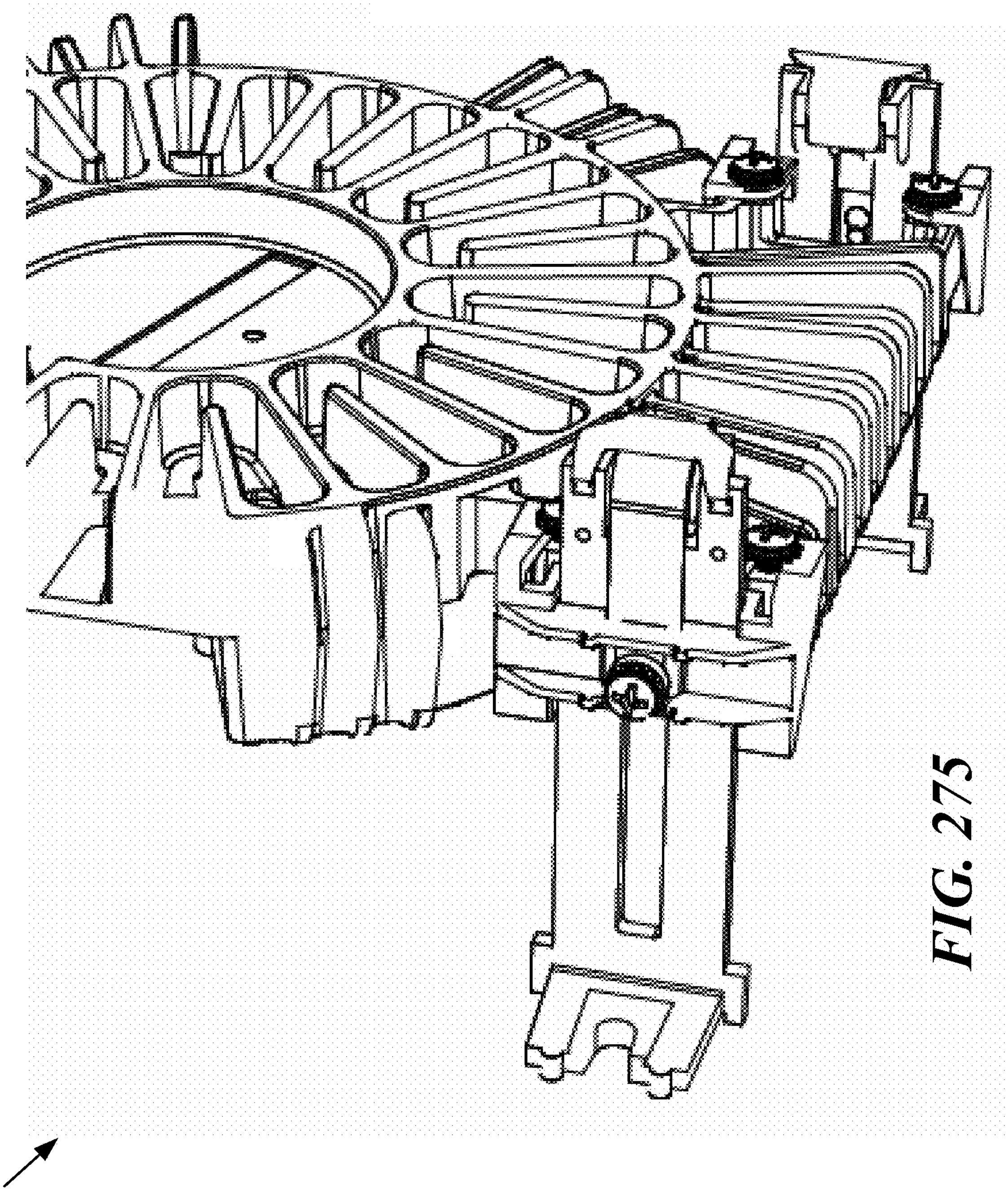

FIG. 275 on sheet 271 of the drawings is a screenshot of additional Z-Adjustment-related features of the examples [100*a-d*] of the lighting system.

Figure 276:
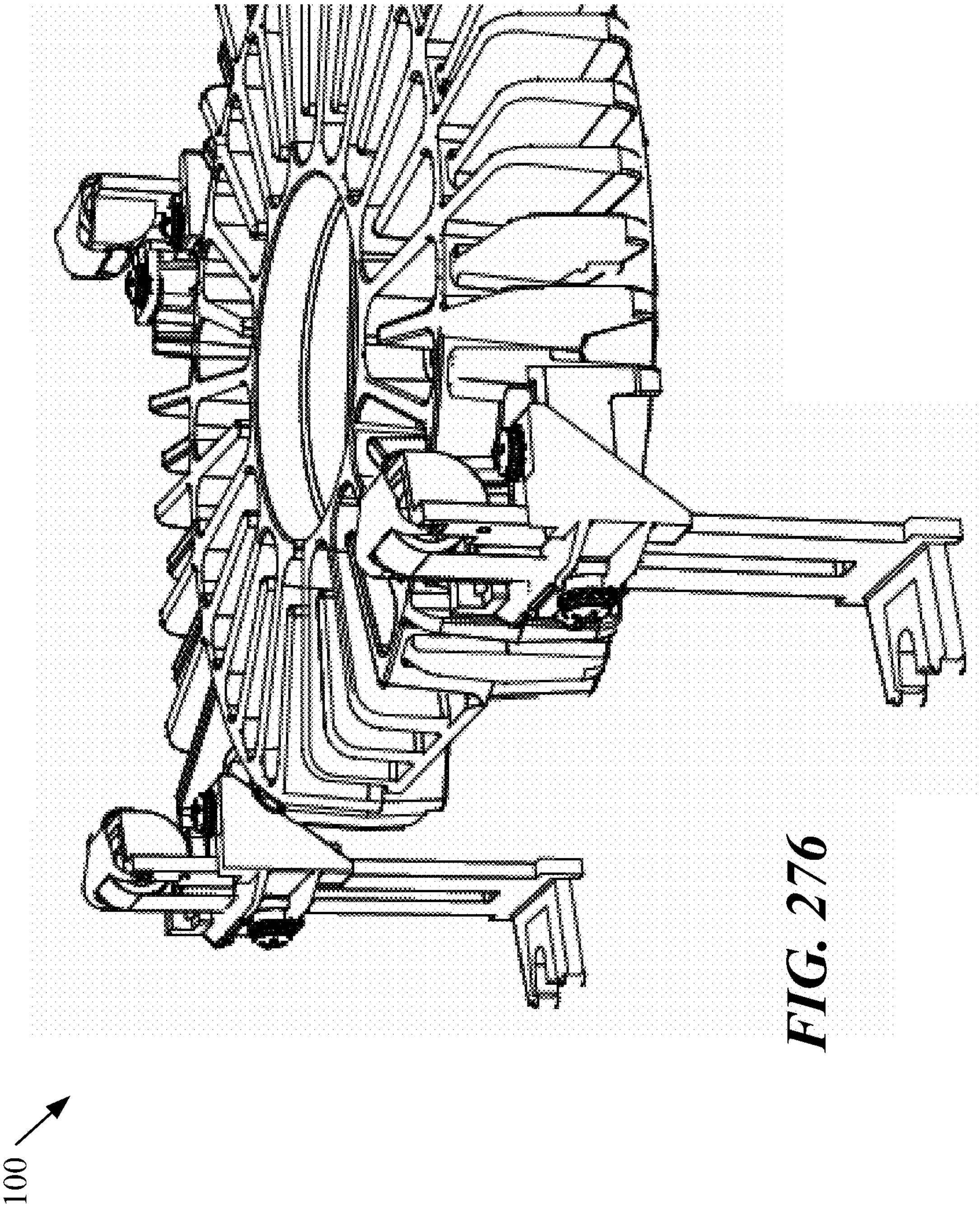

FIG. 276 on sheet 272 of the drawings is a screenshot of additional Z-Adjustment-related features of the examples [100*a-d*] of the lighting system.

Figure 277:
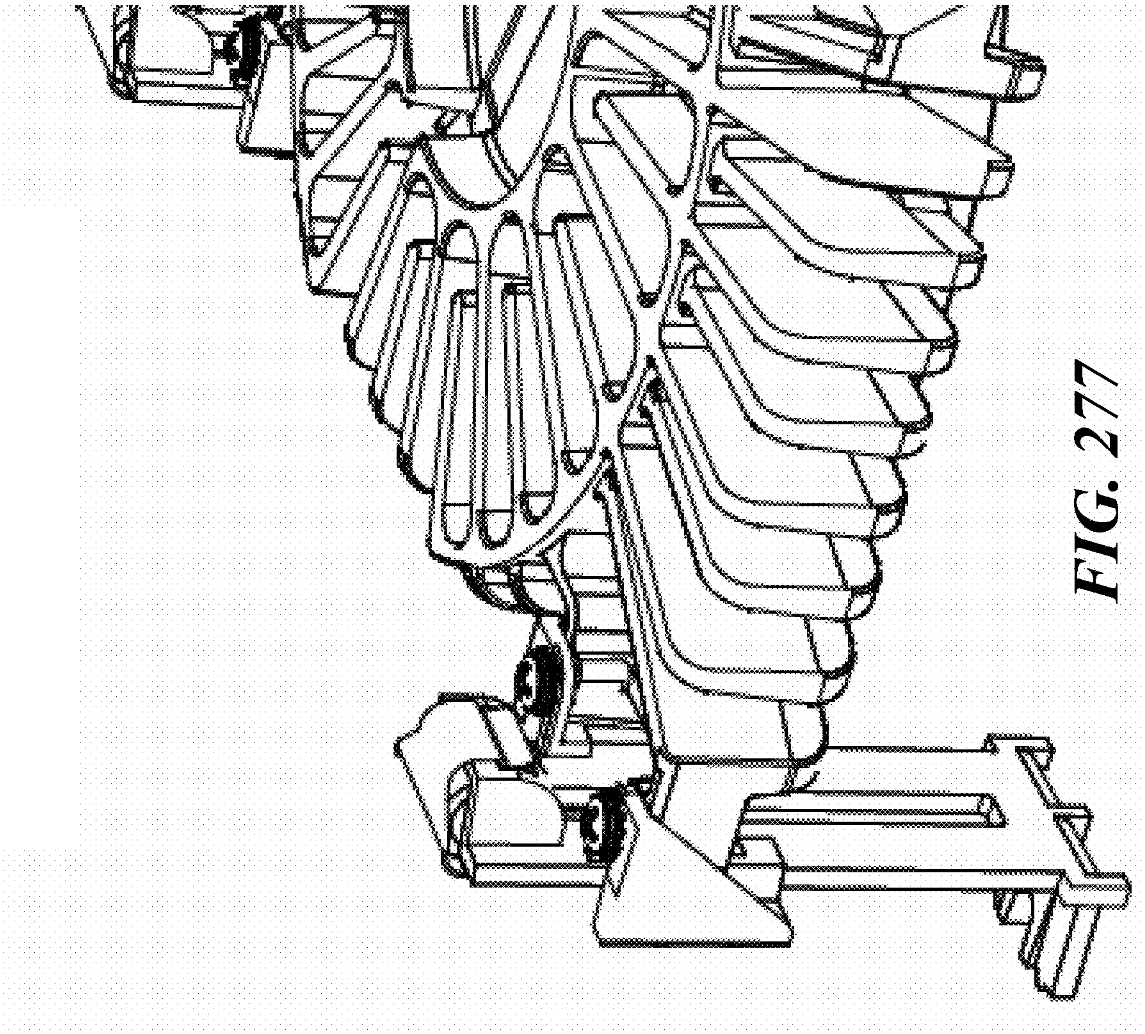

FIG. 277 on sheet 273 of the drawings is a screenshot of additional Z-Adjustment-related features of the examples [100*a-d*] of the lighting system.

Figure 278:
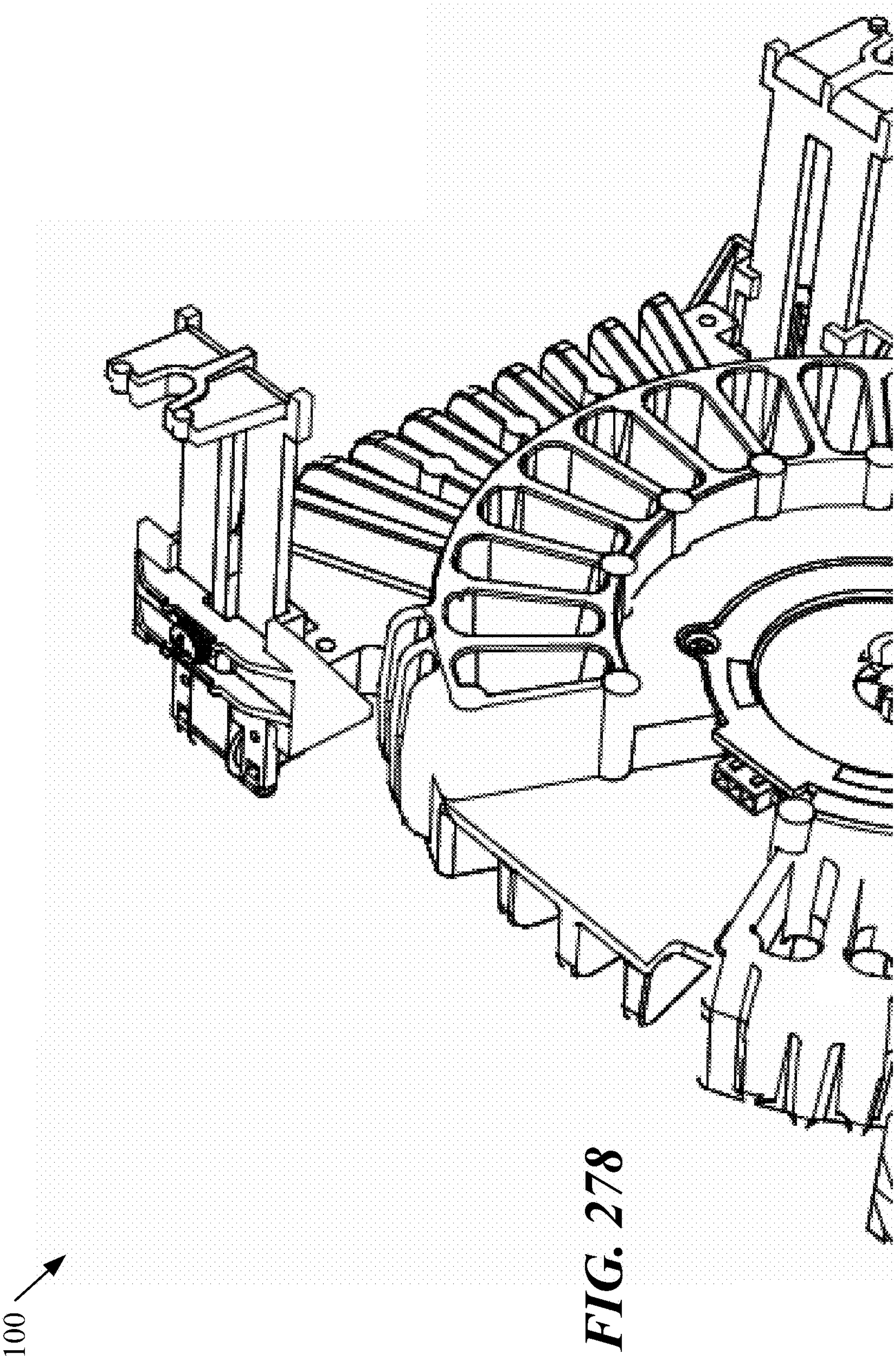

FIG. 278 on sheet 274 of the drawings is a screenshot of additional Z-Adjustment-related features of the examples [100*a-d*] of the lighting system.

Figure 279:
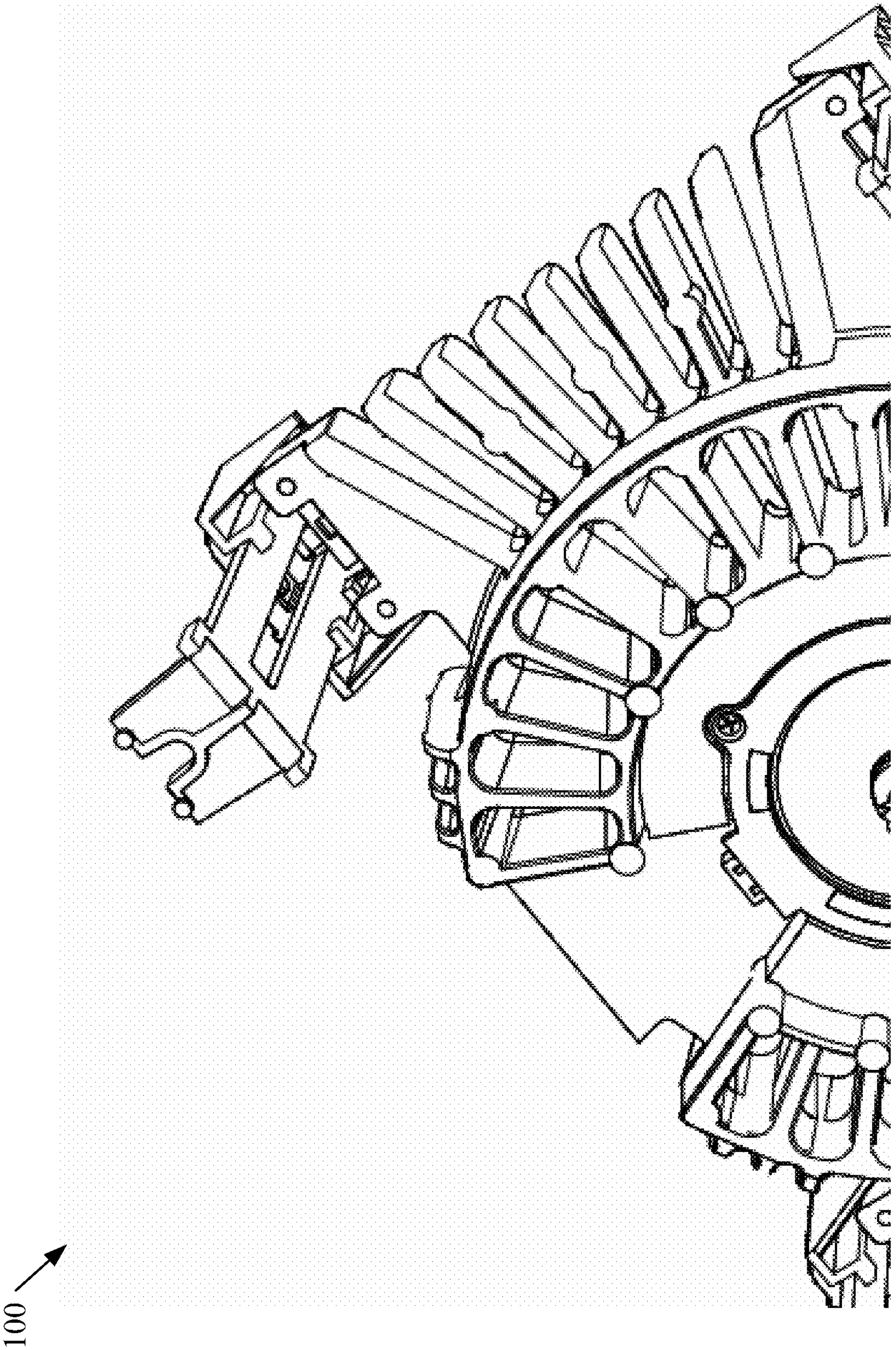

FIG. 279 on sheet 275 of the drawings is a screenshot of additional Z-Adjustment-related features of the examples [100*a-d*] of the lighting system.

Figure 280:
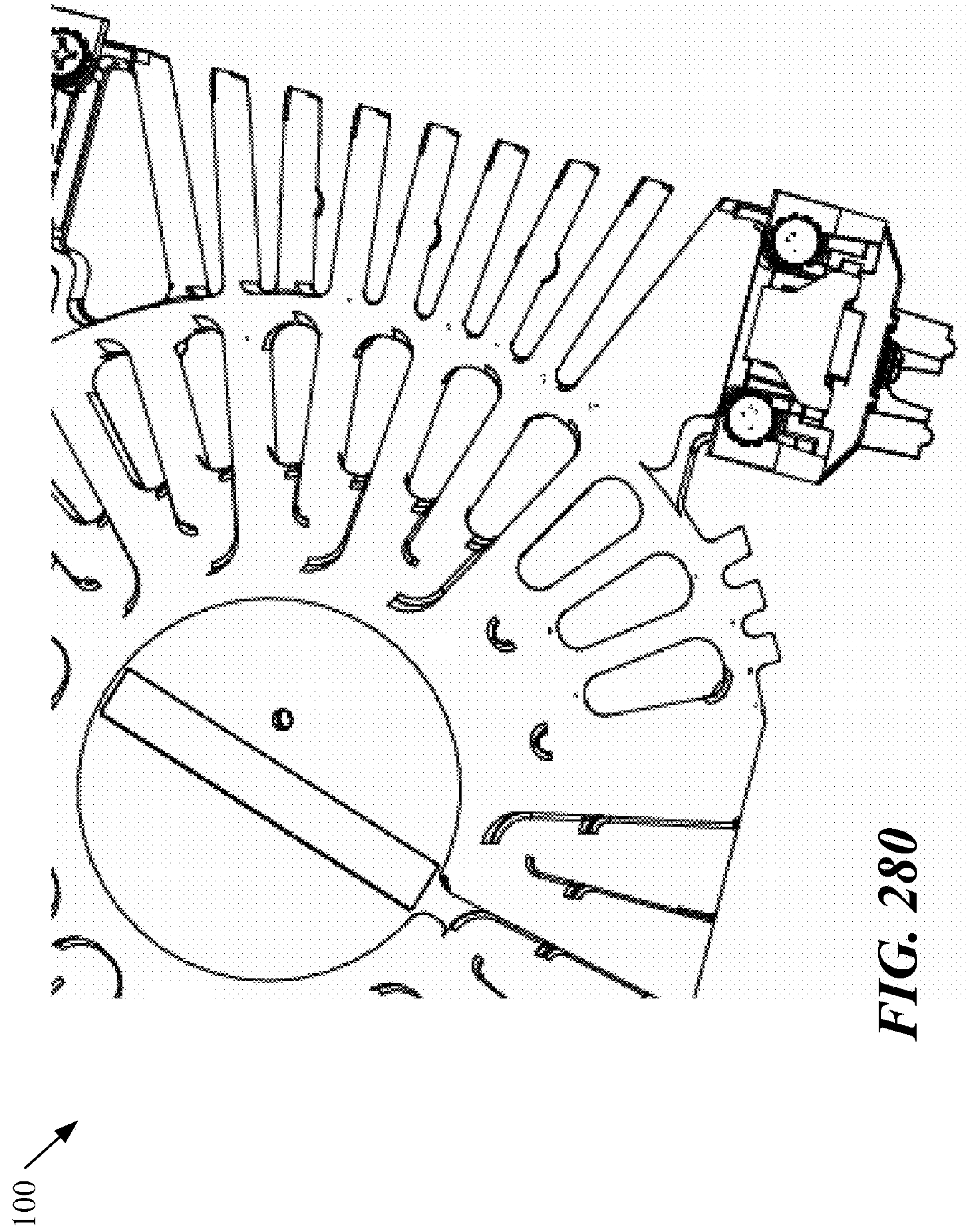

FIG. 280 on sheet 276 of the drawings is a screenshot of additional Z-Adjustment-related features of the examples [100*a-d*] of the lighting system.

Figure 281:
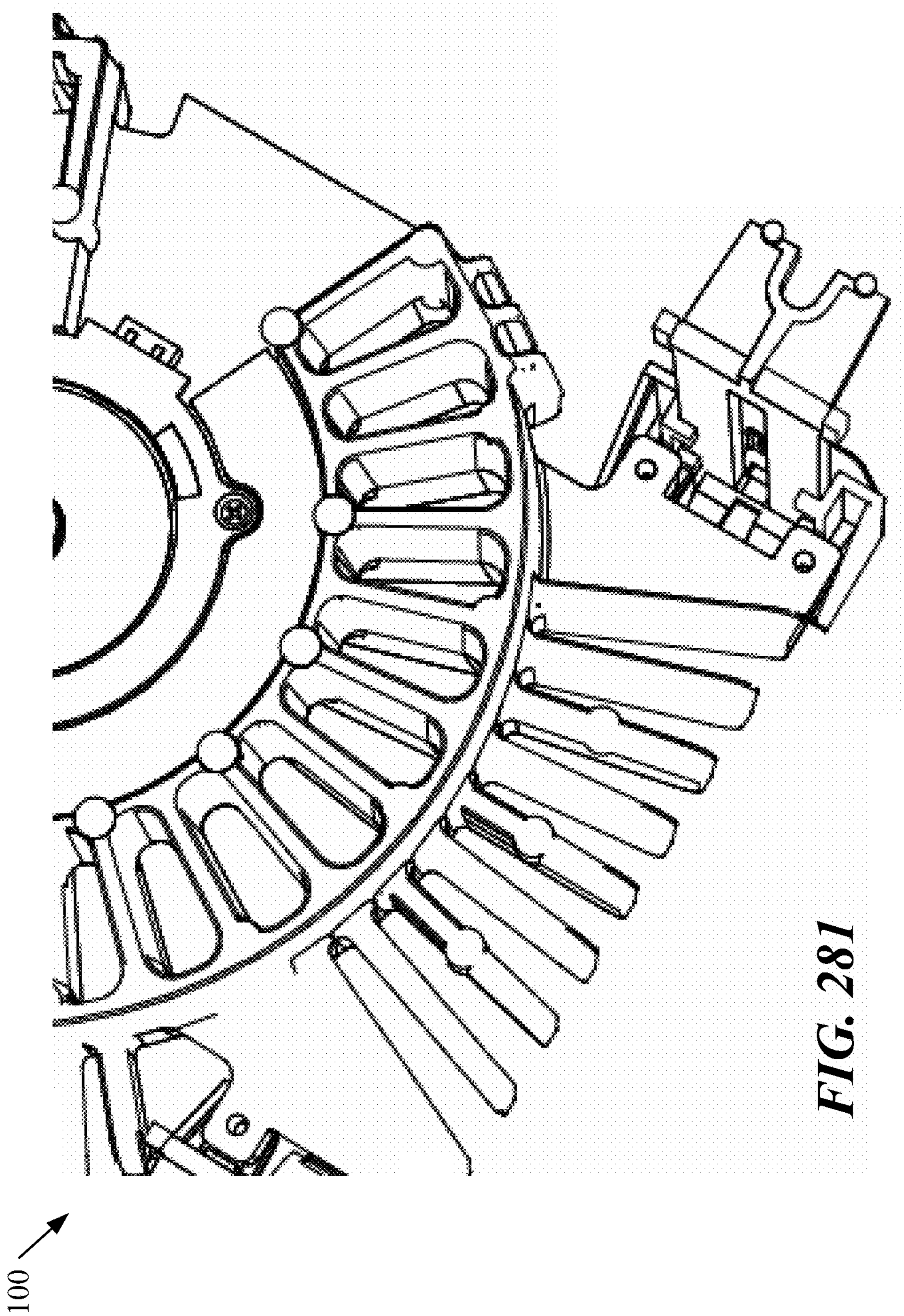

FIG. 281 on sheet 277 of the drawings is a screenshot of additional Z-Adjustment-related features of the examples [100*a-d*] of the lighting system.

Figure 282:
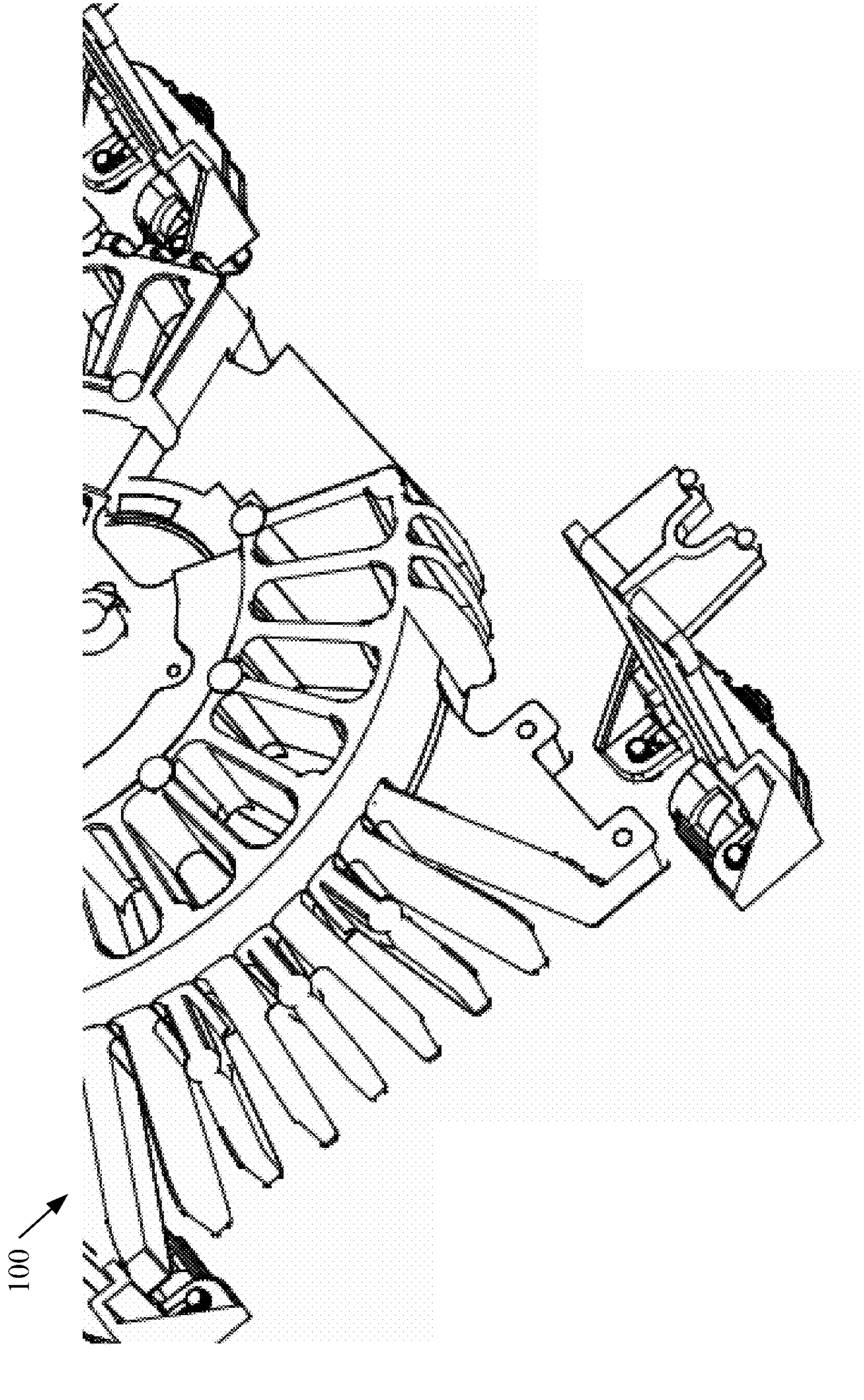

FIG. 282 on sheet 278 of the drawings is a screenshot of additional Z-Adjustment-related features of the examples [100*a-d*] of the lighting system.

Figure 283:
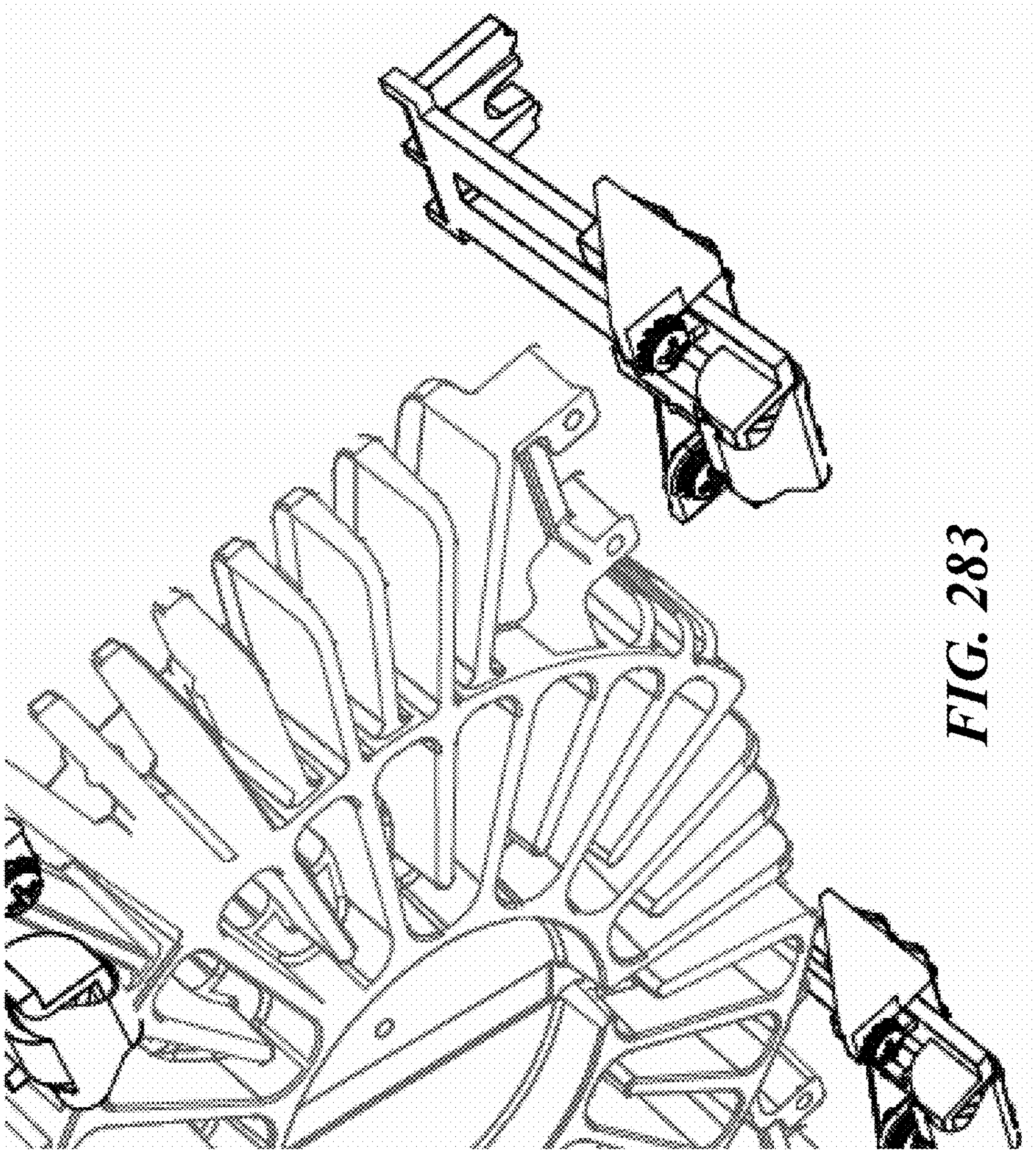

FIG. 283 on sheet 279 of the drawings is a screenshot of additional Z-Adjustment-related features of the examples [100*a-d*] of the lighting system.

Figure 284:
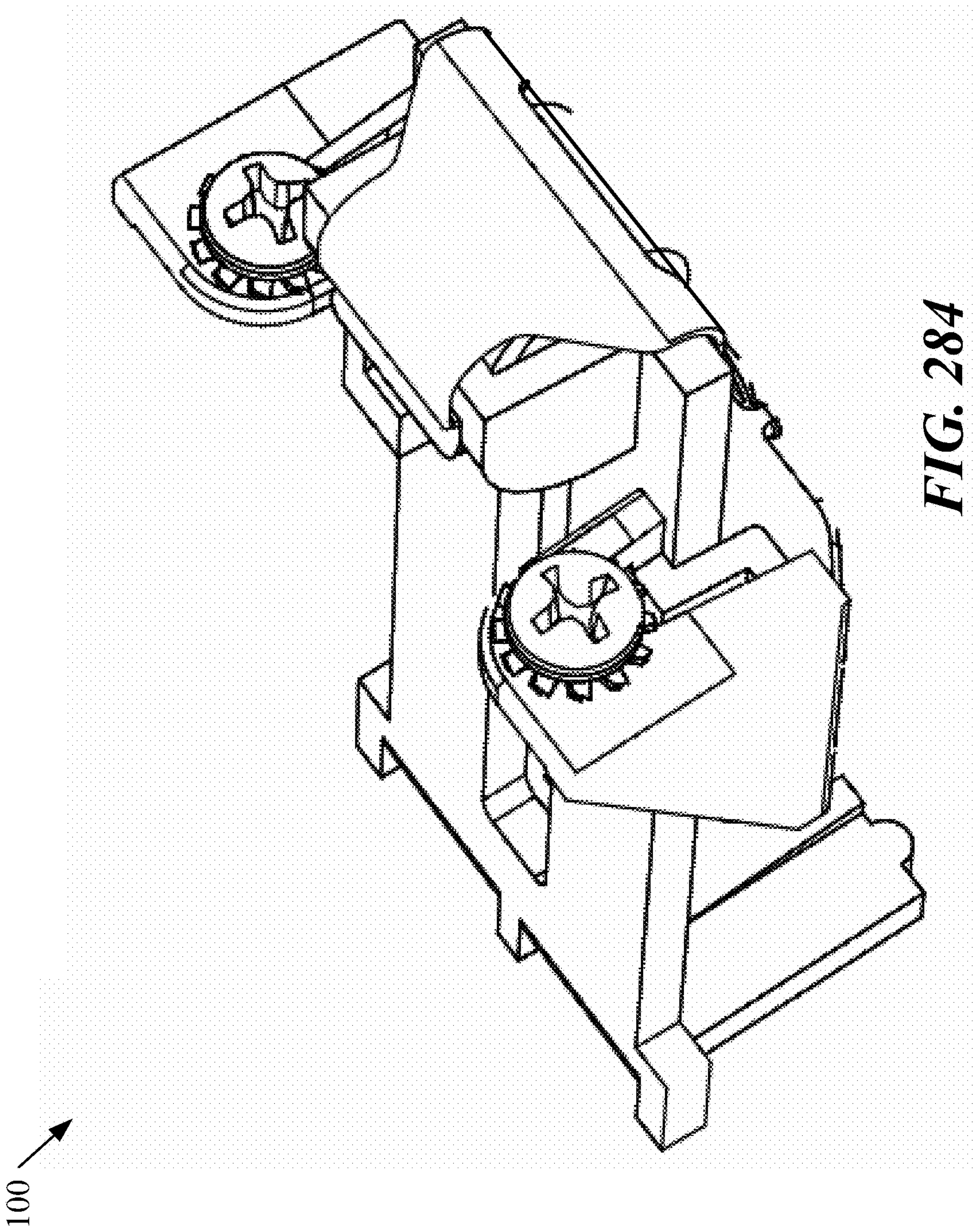

FIG. 284 on sheet 280 of the drawings is a screenshot of additional Z-Adjustment-related features of the examples [100*a-d*] of the lighting system.

Figure 285:
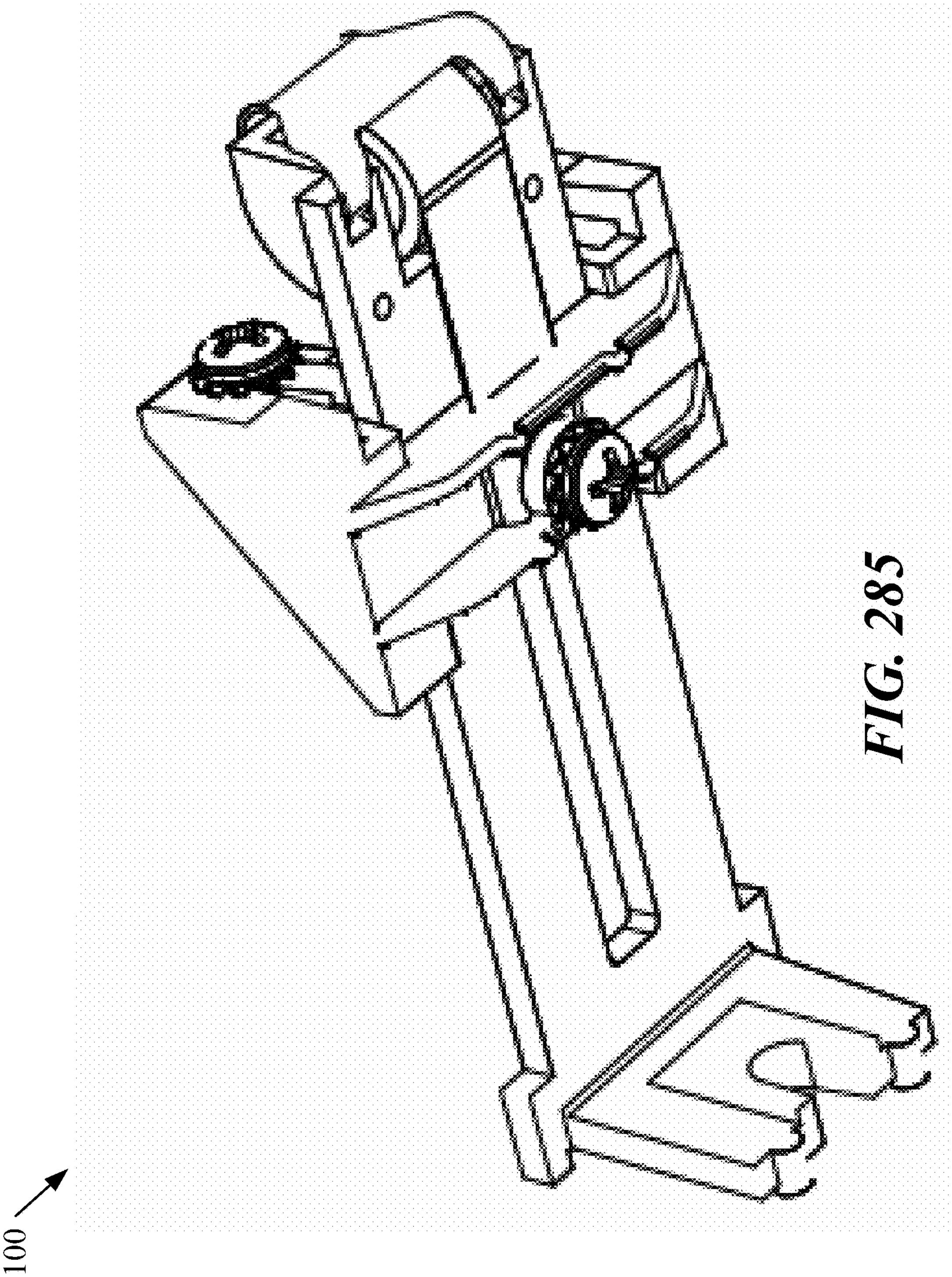

FIG. 285 on sheet 281 of the drawings is a screenshot of additional Adjustment-related features of the examples [100*a-d*] of the lighting system.

Figure 286:
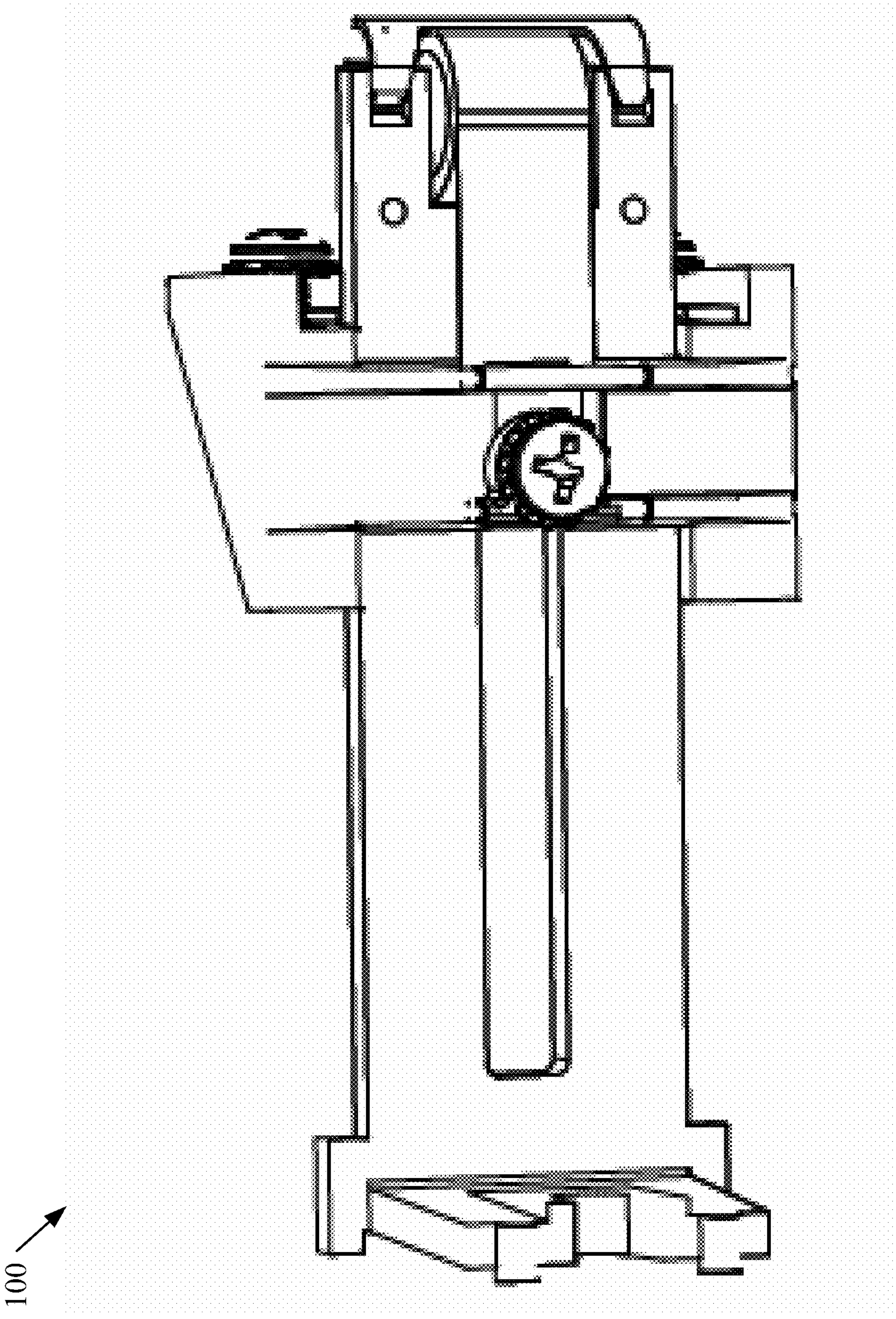

FIG. 286 on sheet 282 of the drawings is a screenshot of additional Z-Adjustment-related features of the examples [100*a-d*] of the lighting system.

Figure 287:
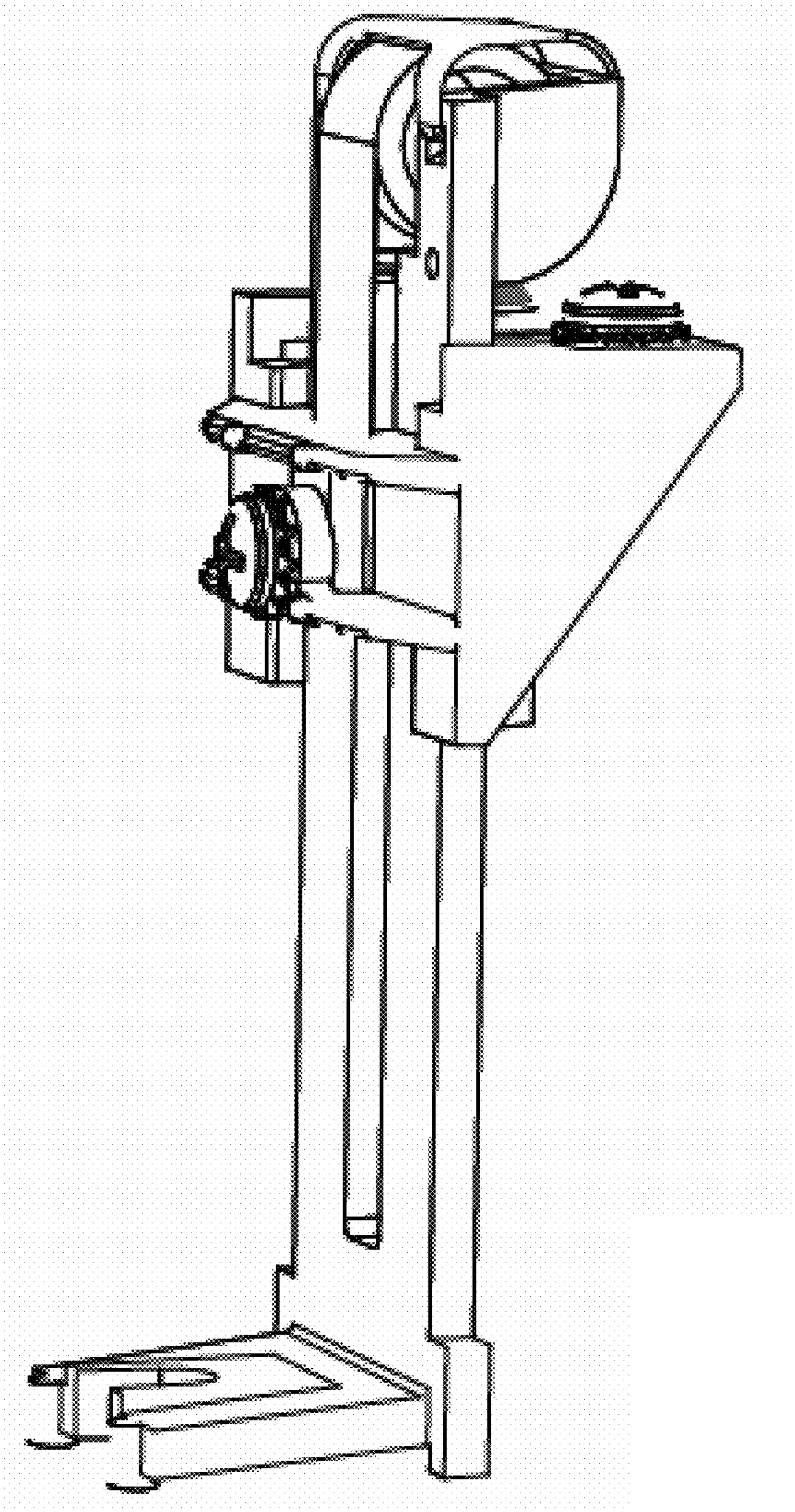

FIG. 287 on sheet 283 of the drawings is a screenshot of additional Z-Adjustment-related features of the examples [100*a-d*] of the lighting system.

Figure 288:
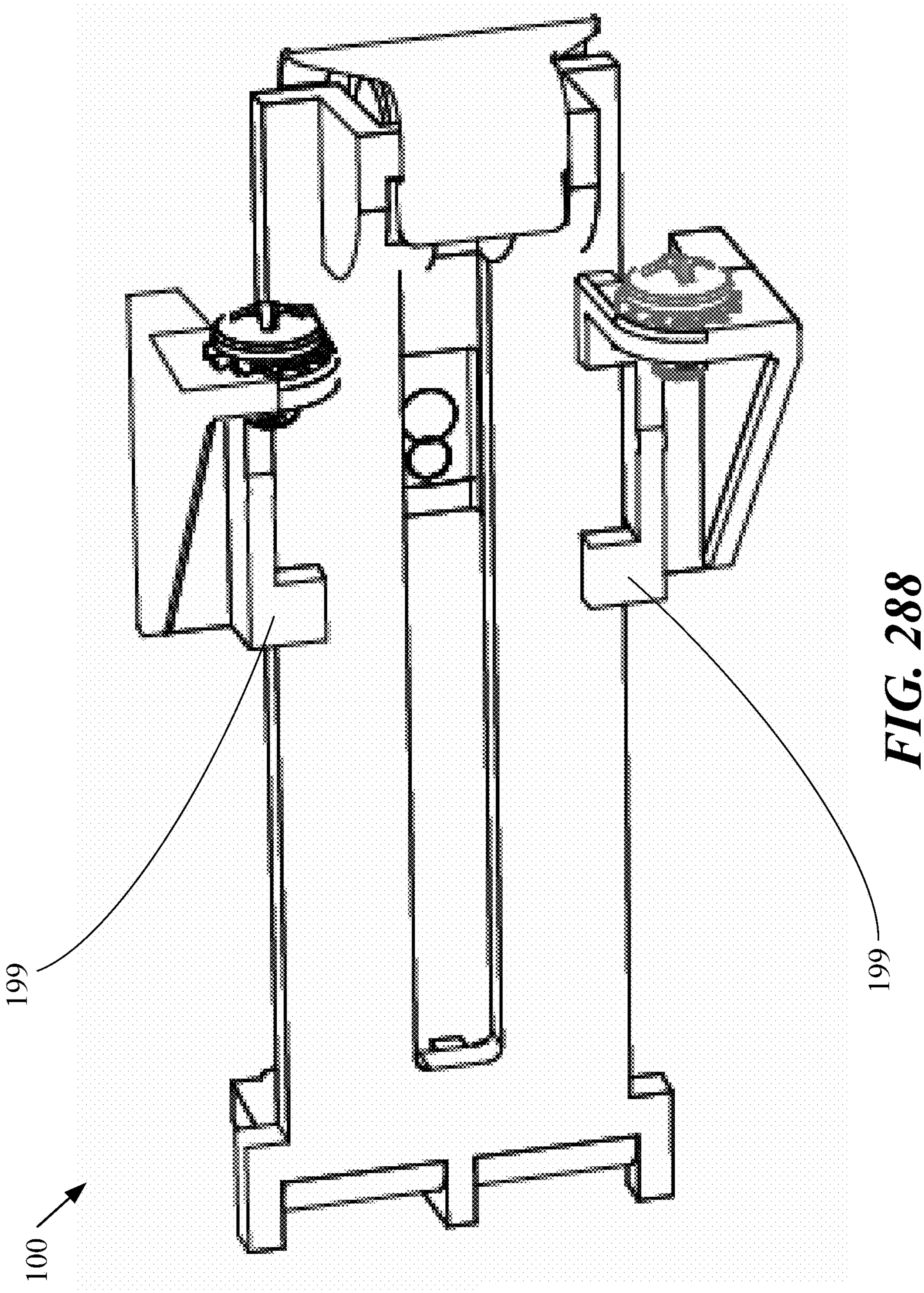

FIG. 288 on sheet 284 of the drawings is a screenshot of additional Z-Adjustment-related features of the examples [100*a-d*] of the lighting system.

Figure 289:
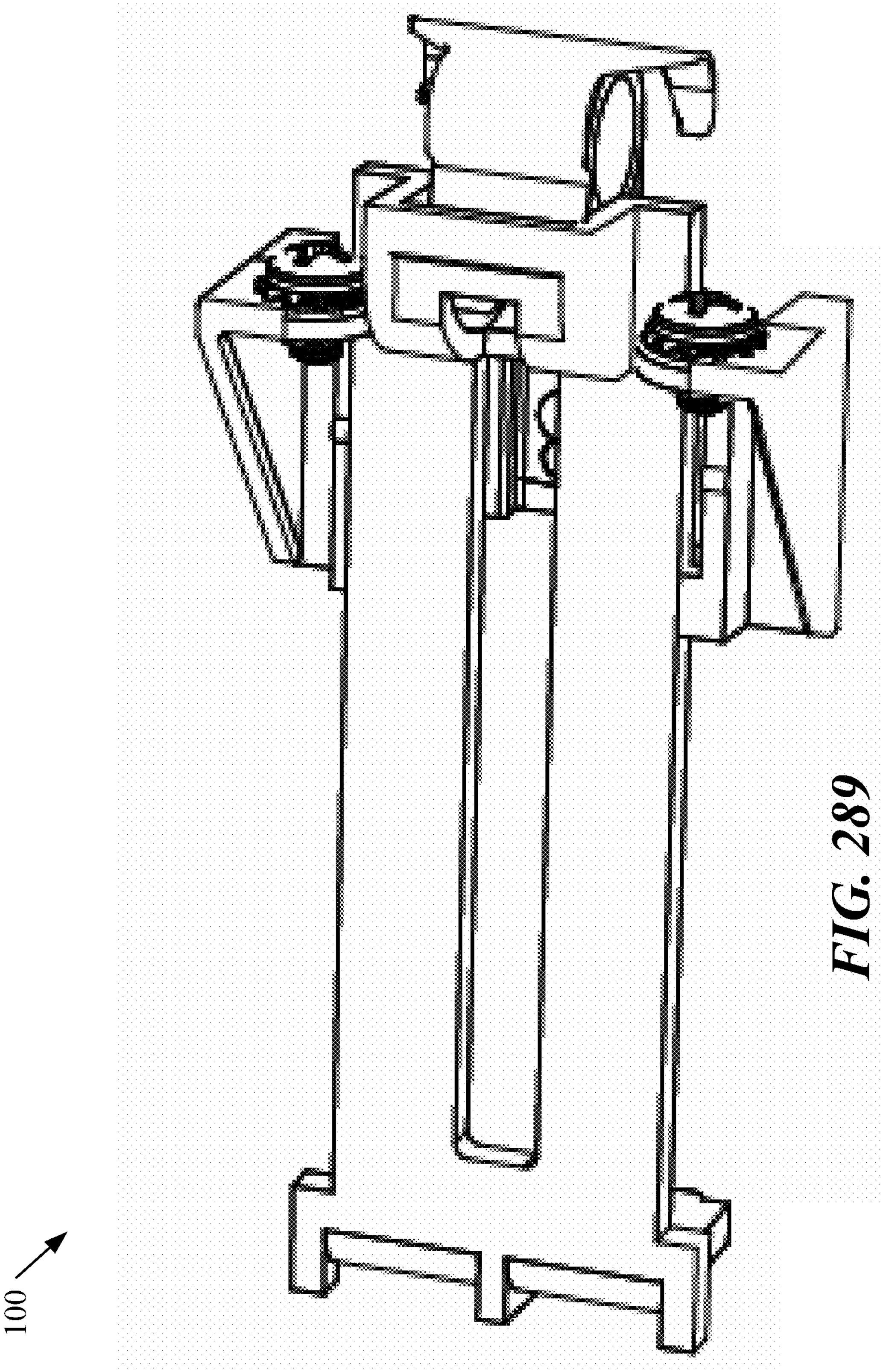

FIG. 289 on sheet 285 of the drawings is a screenshot of additional Z-Adjustment-related features of the examples [100*a-d*] of the lighting system.

Figure 290:
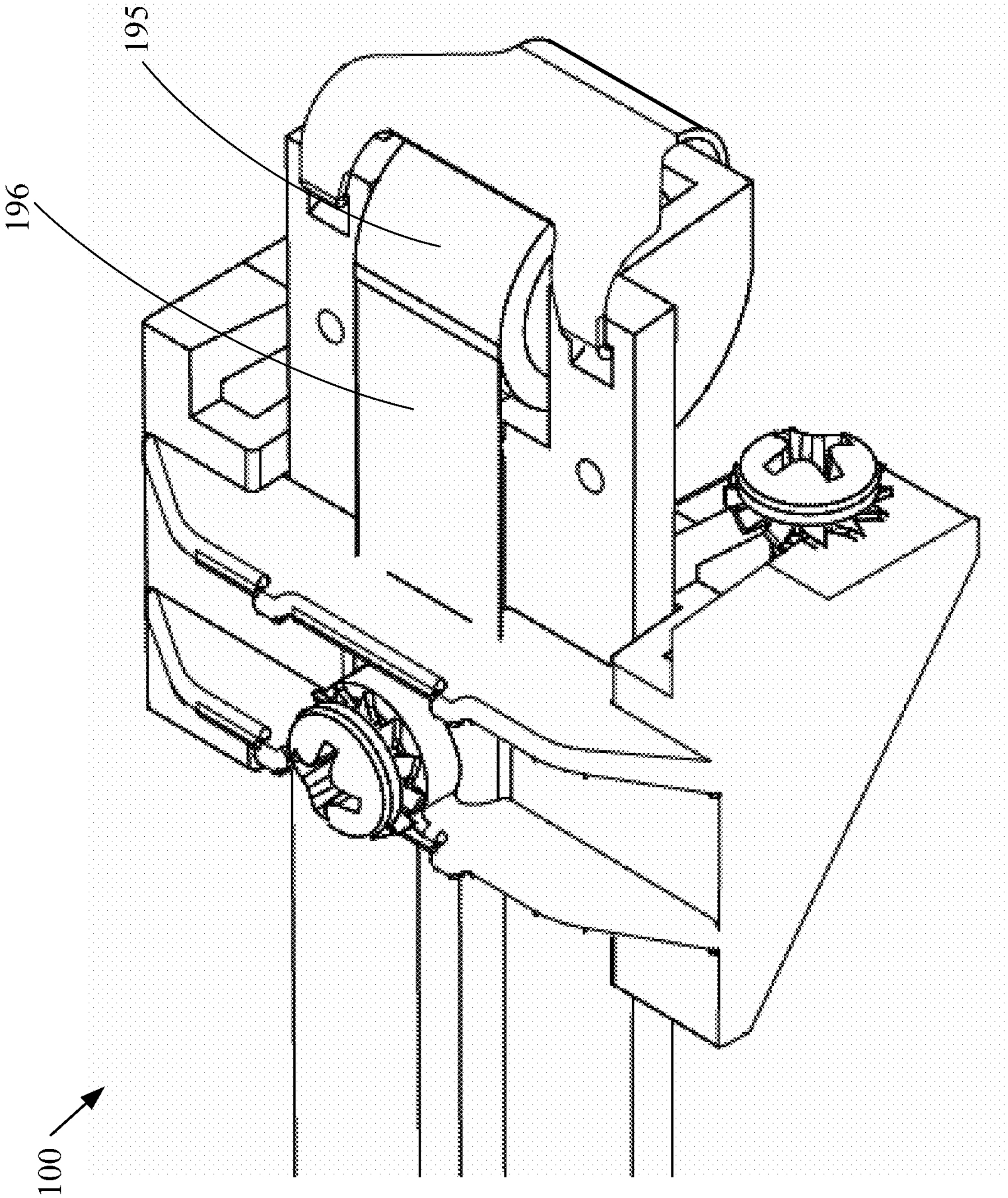

FIG. 290 on sheet 286 of the drawings is a screenshot of additional Z-Adjustment-related features of the examples [100*a-d*] of the lighting system.

Figure 291:
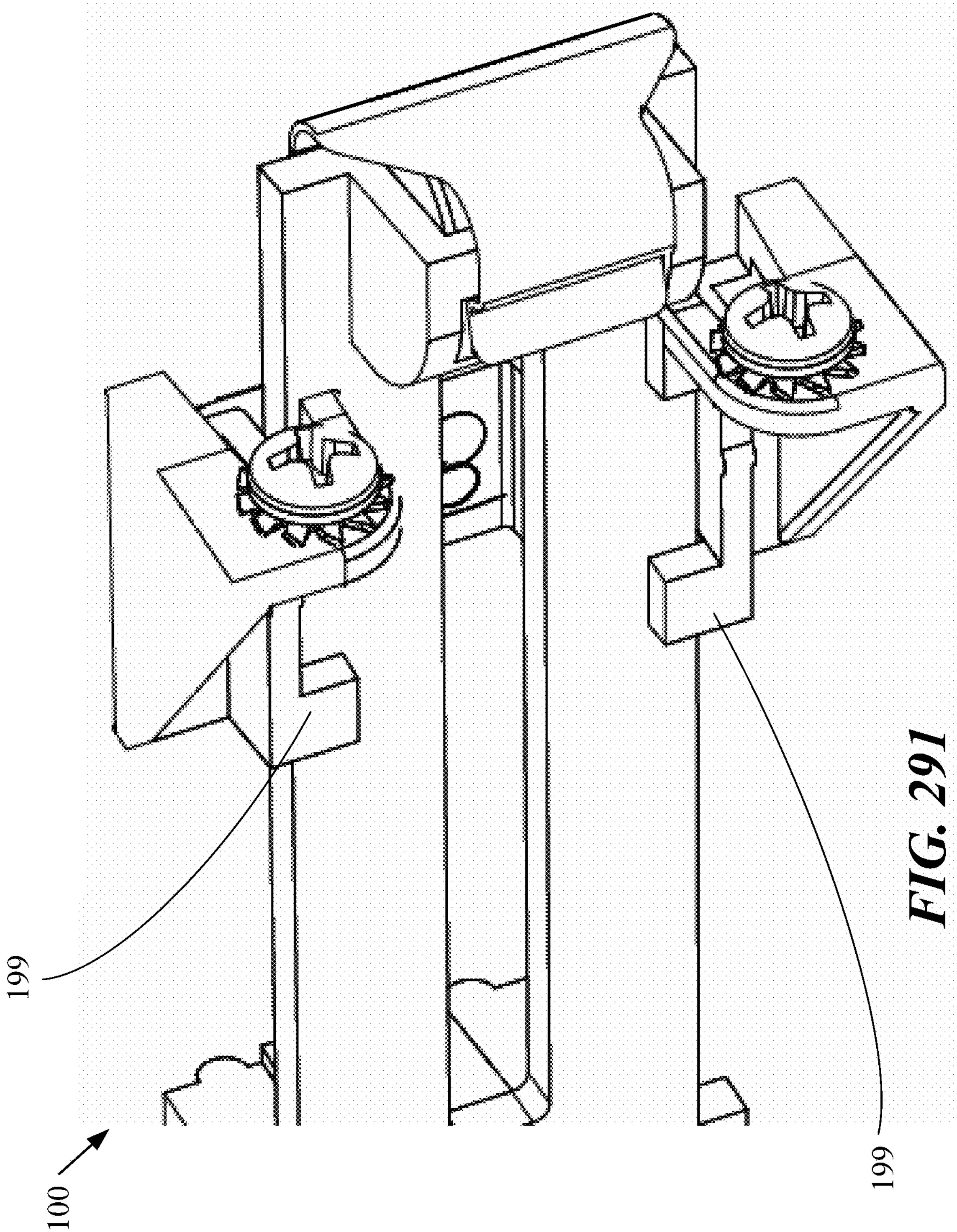

FIG. 291 on sheet 287 of the drawings is a screenshot of additional Z-Adjustment-related features of the examples [100*a-d*] of the lighting system.

Figure 292:
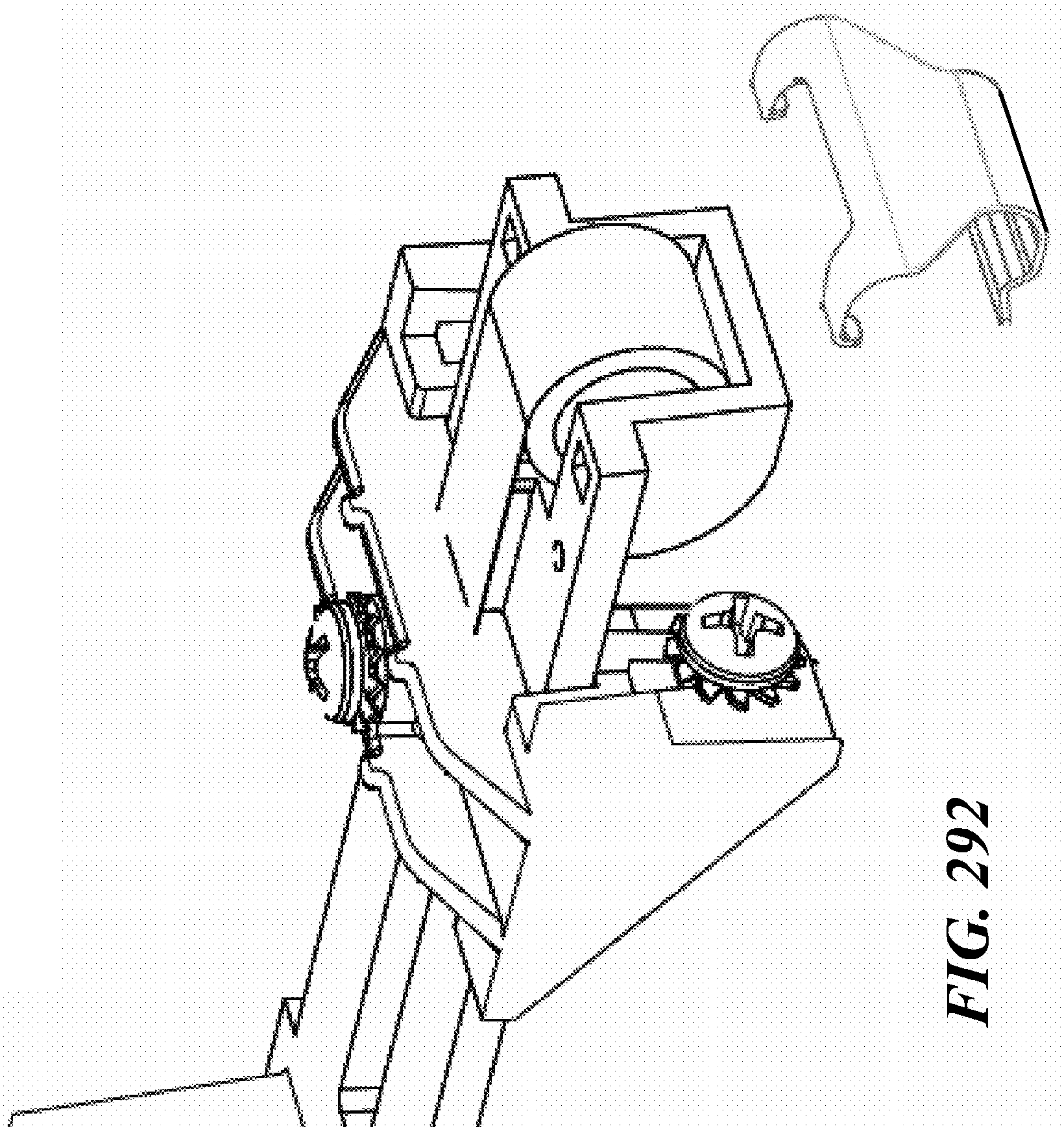

FIG. 292 on sheet 288 of the drawings is a screenshot of additional Z-Adjustment-related features of the examples [100*a-d*] of the lighting system.

Figure 293:
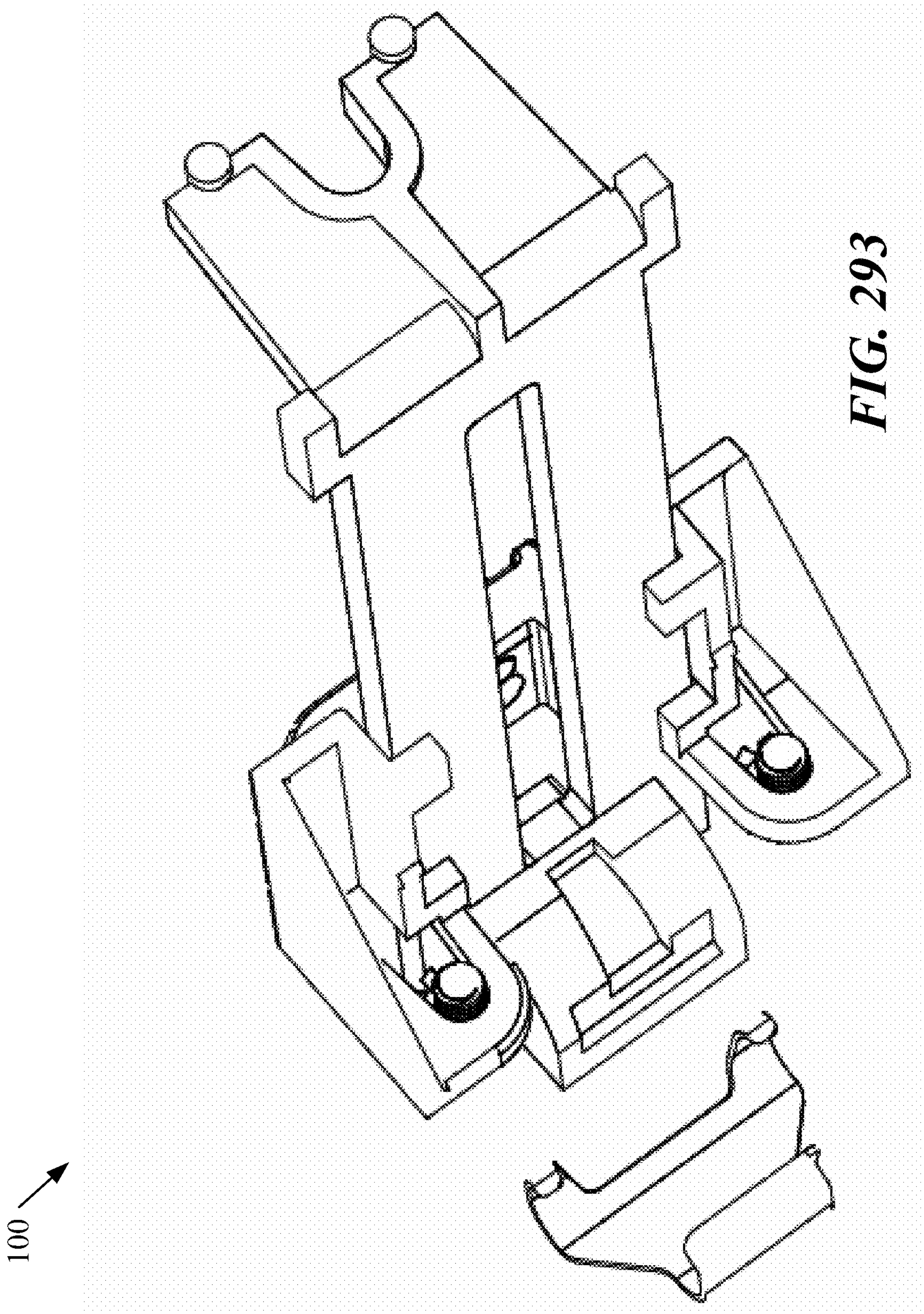

FIG. 293 on sheet 289 of the drawings is a screenshot of additional Z-Adjustment-related features of the examples [100*a-d*] of the lighting system.

Figure 294:
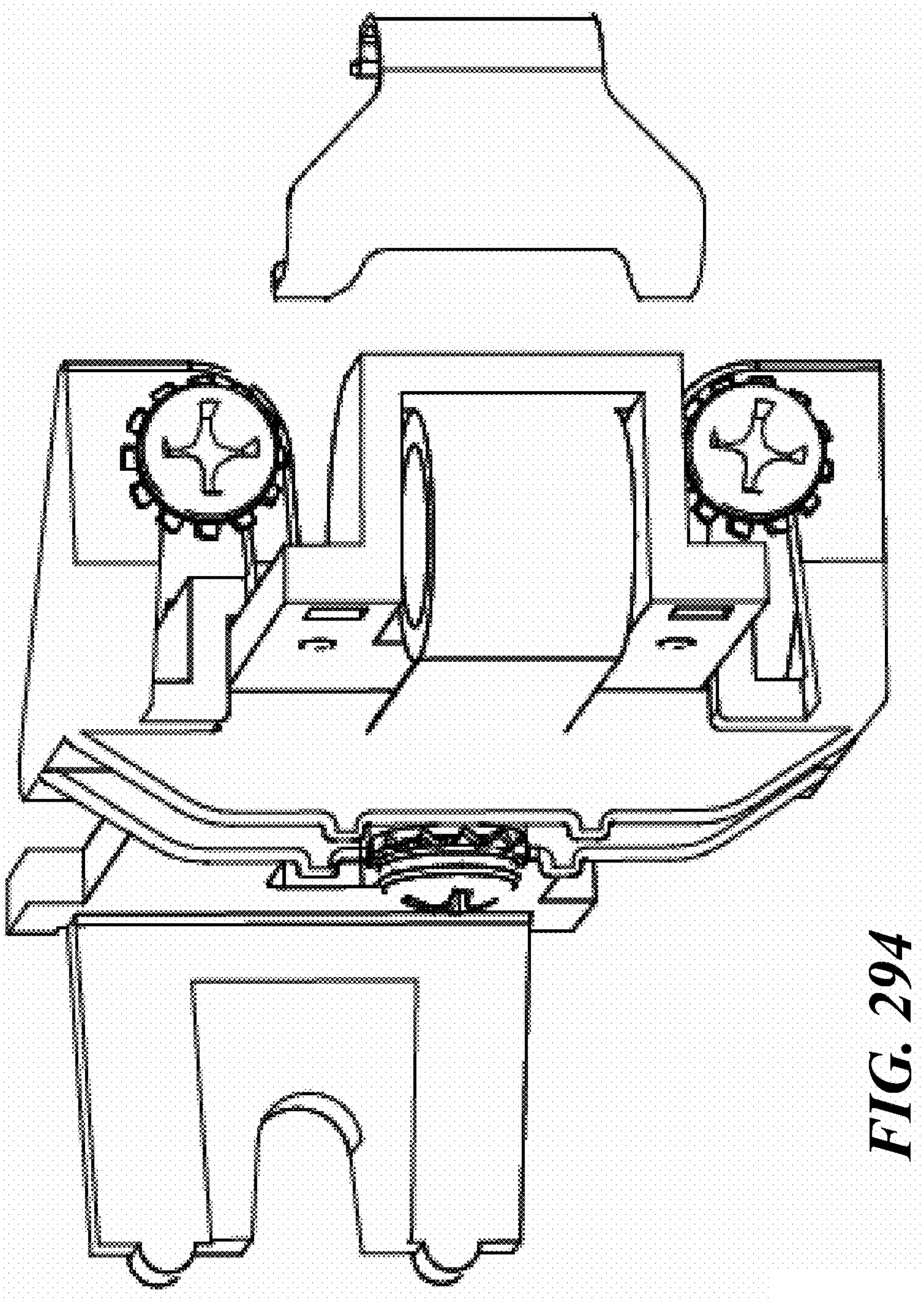

FIG. 294 on sheet 290 of the drawings is a screenshot of additional Z-Adjustment-related features of the examples [100*a-d*] of the lighting system.

Figure 295:
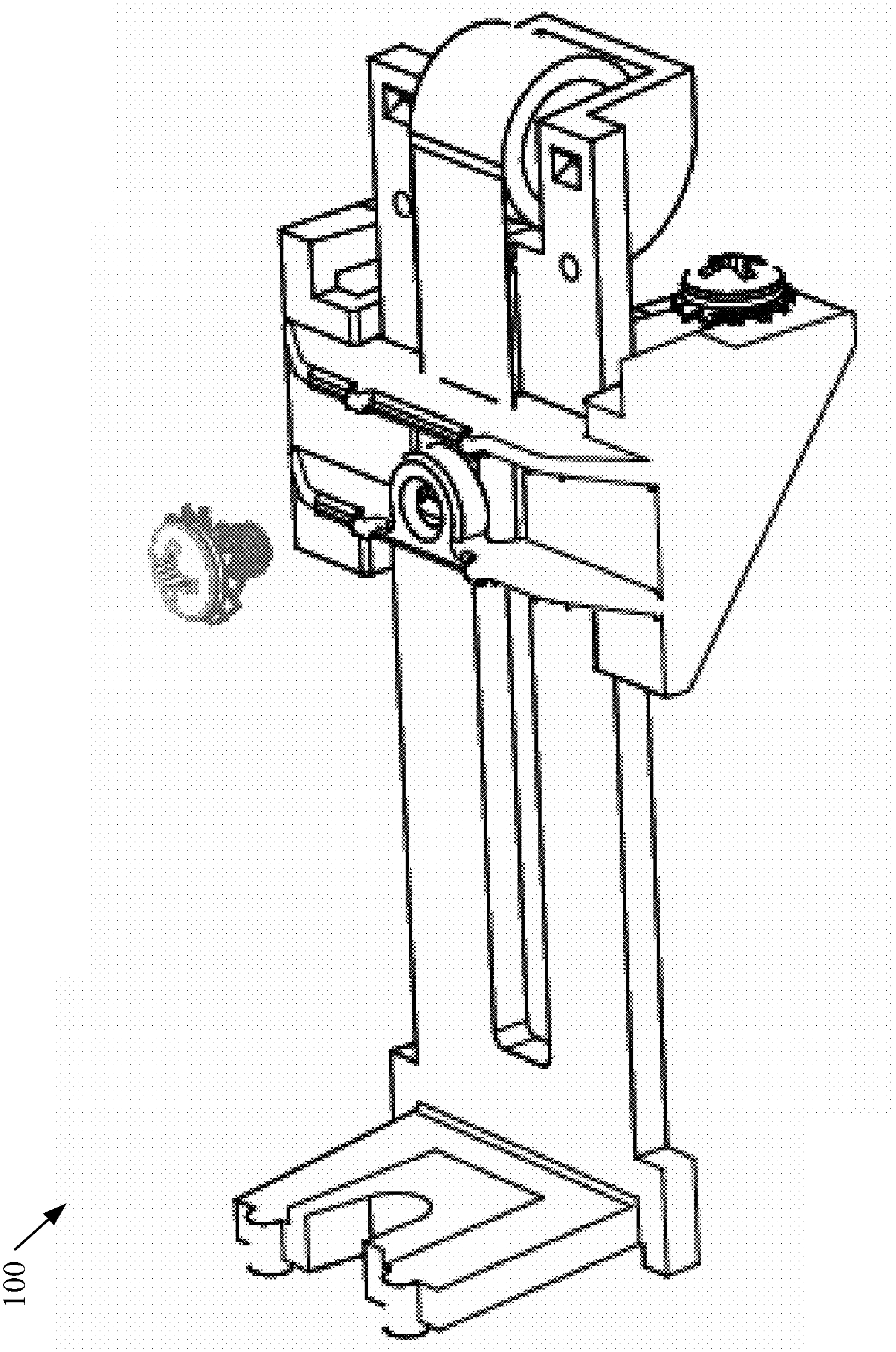

FIG. 295 on sheet 291 of the drawings is a screenshot of additional Z-Adjustment-related features of the examples [100*a-d*] of the lighting system.

Figure 296:
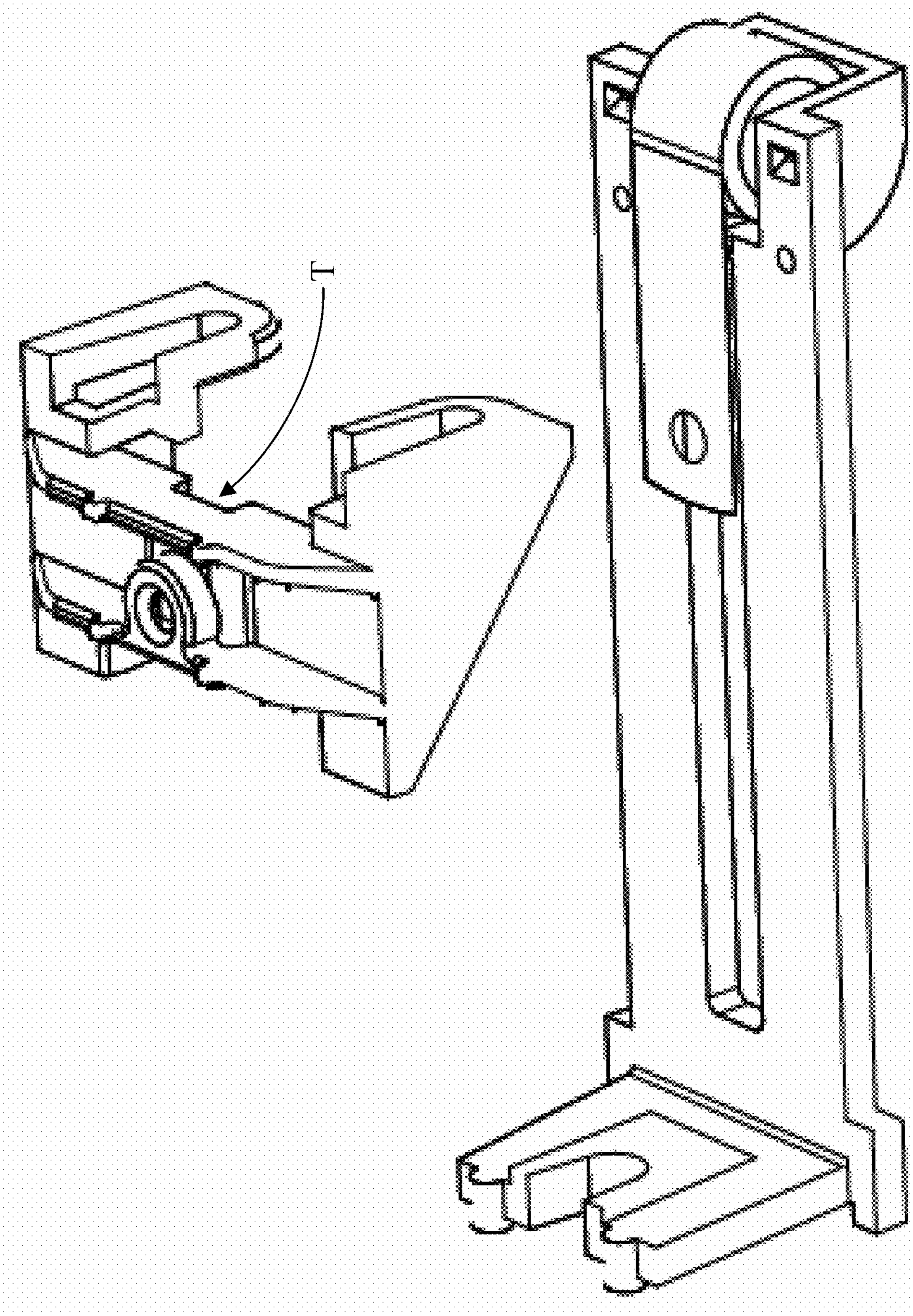

FIG. 296 on sheet 292 of the drawings is a screenshot of additional Z-Adjustment-related features of the examples [100*a-d*] of the lighting system.

Figure 297:
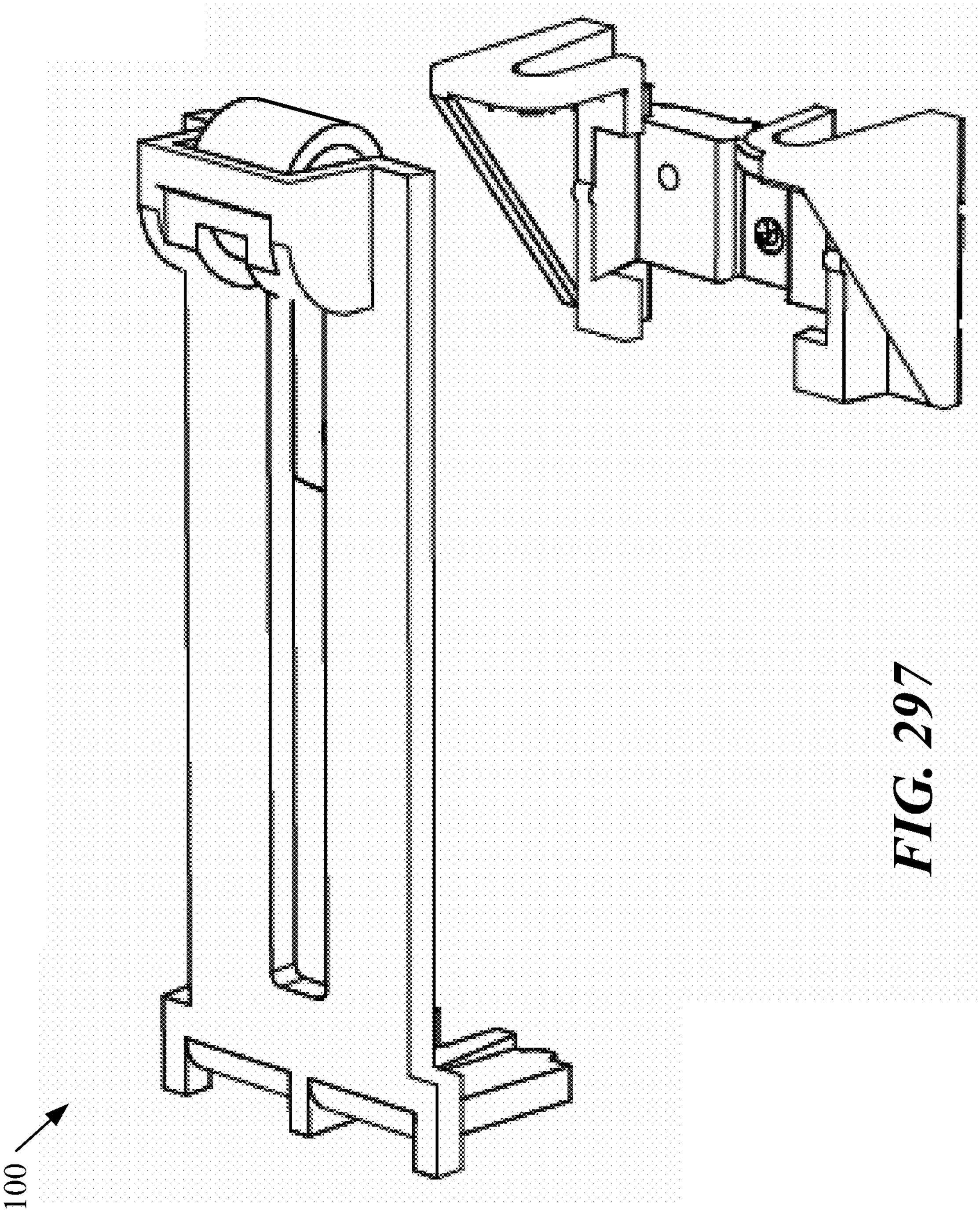

FIG. 297 on sheet 293 of the drawings is a screenshot of additional Z-Adjustment-related features of the examples [100*a-d*] of the lighting system.

Figure 298:
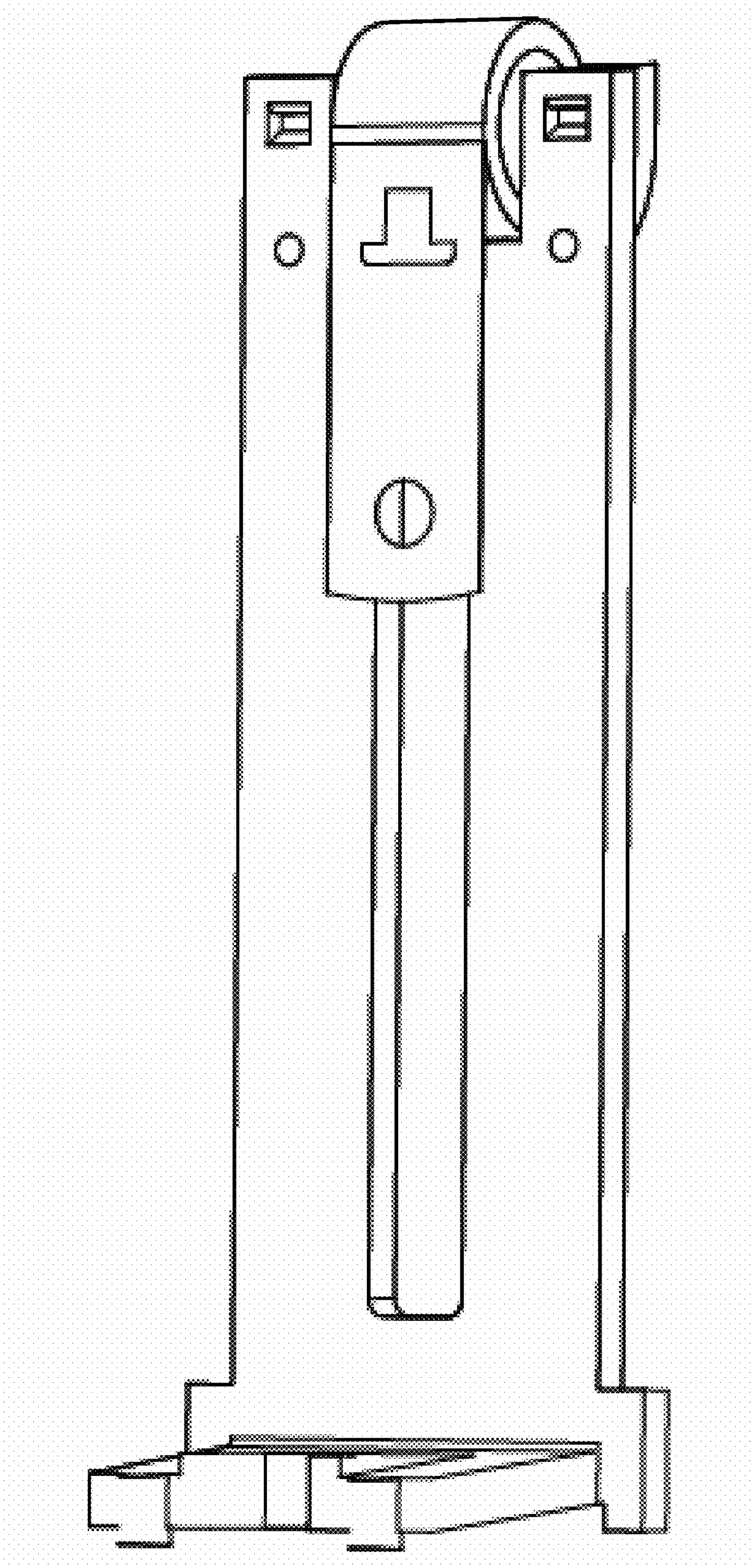

FIG. 298 on sheet 294 of the drawings is a screenshot of additional Z-Adjustment-related features of the examples [100*a-d*] of the lighting system.

Figure 299:
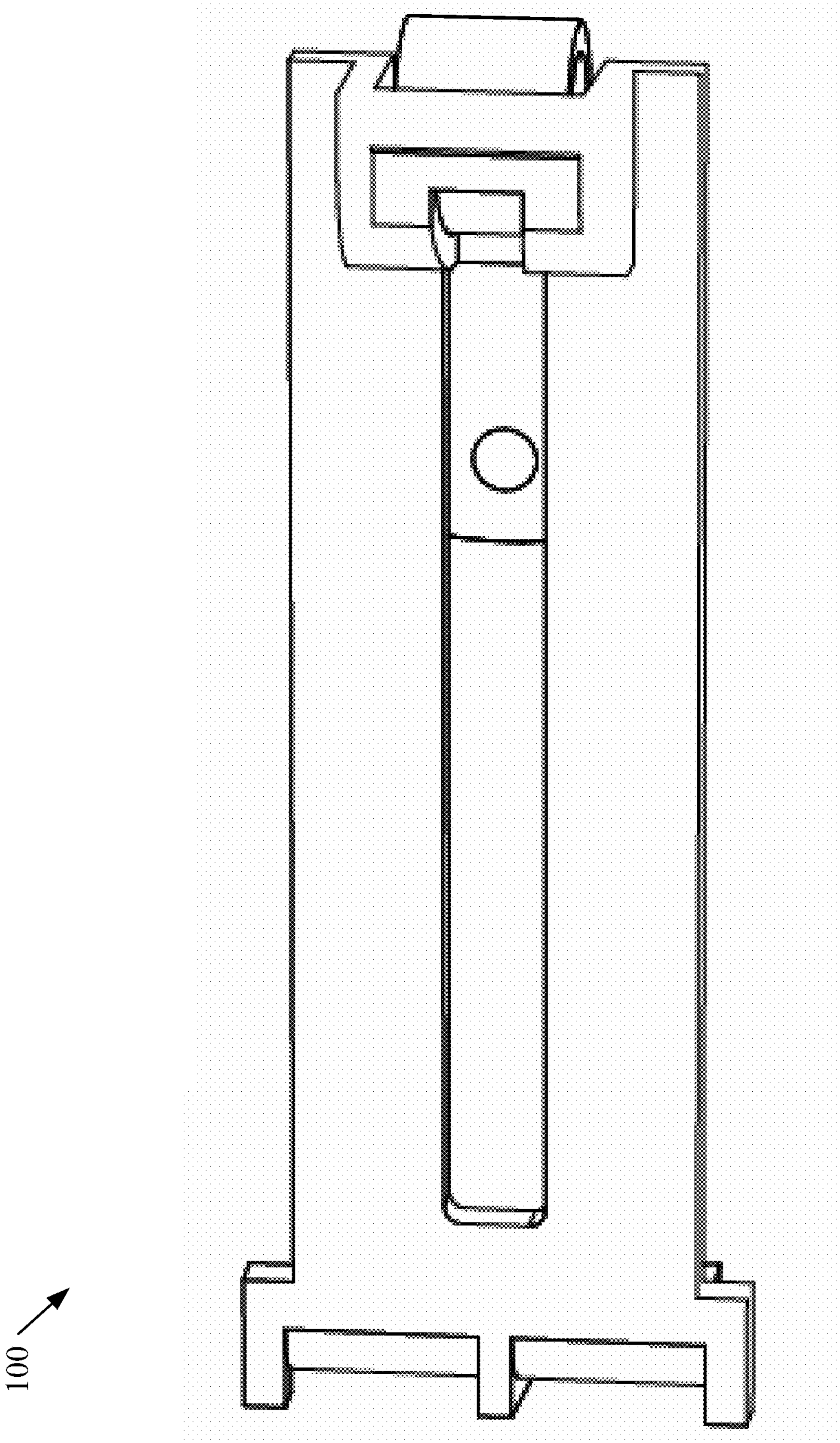

FIG. 299 on sheet 295 of the drawings is a screenshot of additional Z-Adjustment-related features of the examples [100*a-d*] of the lighting system.

Figure 300:
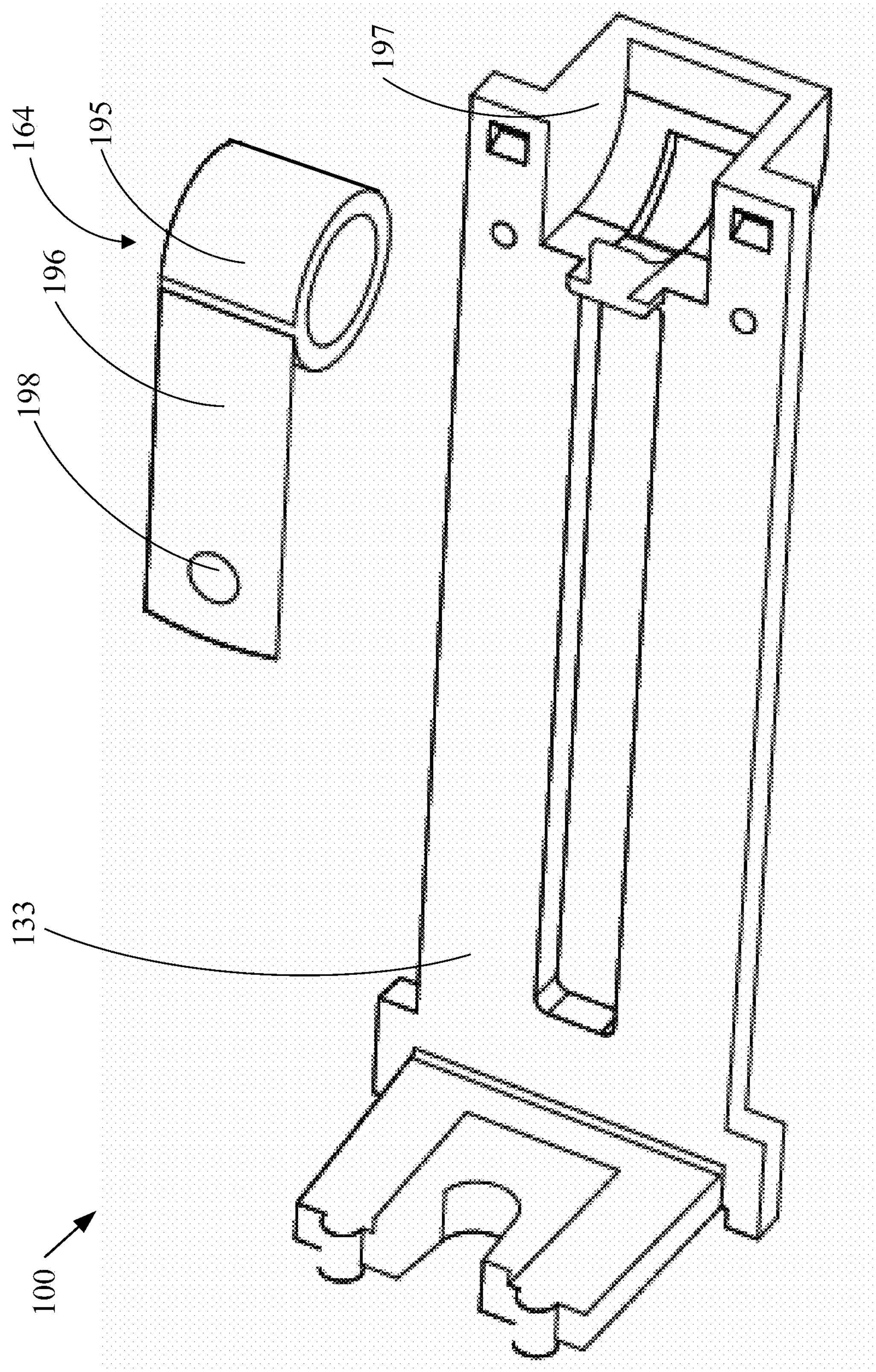

FIG. 300 on sheet 296 of the drawings is a screenshot of additional Z-Adjustment-related features of the examples [100*a-d*] of the lighting system.

Figure 301:
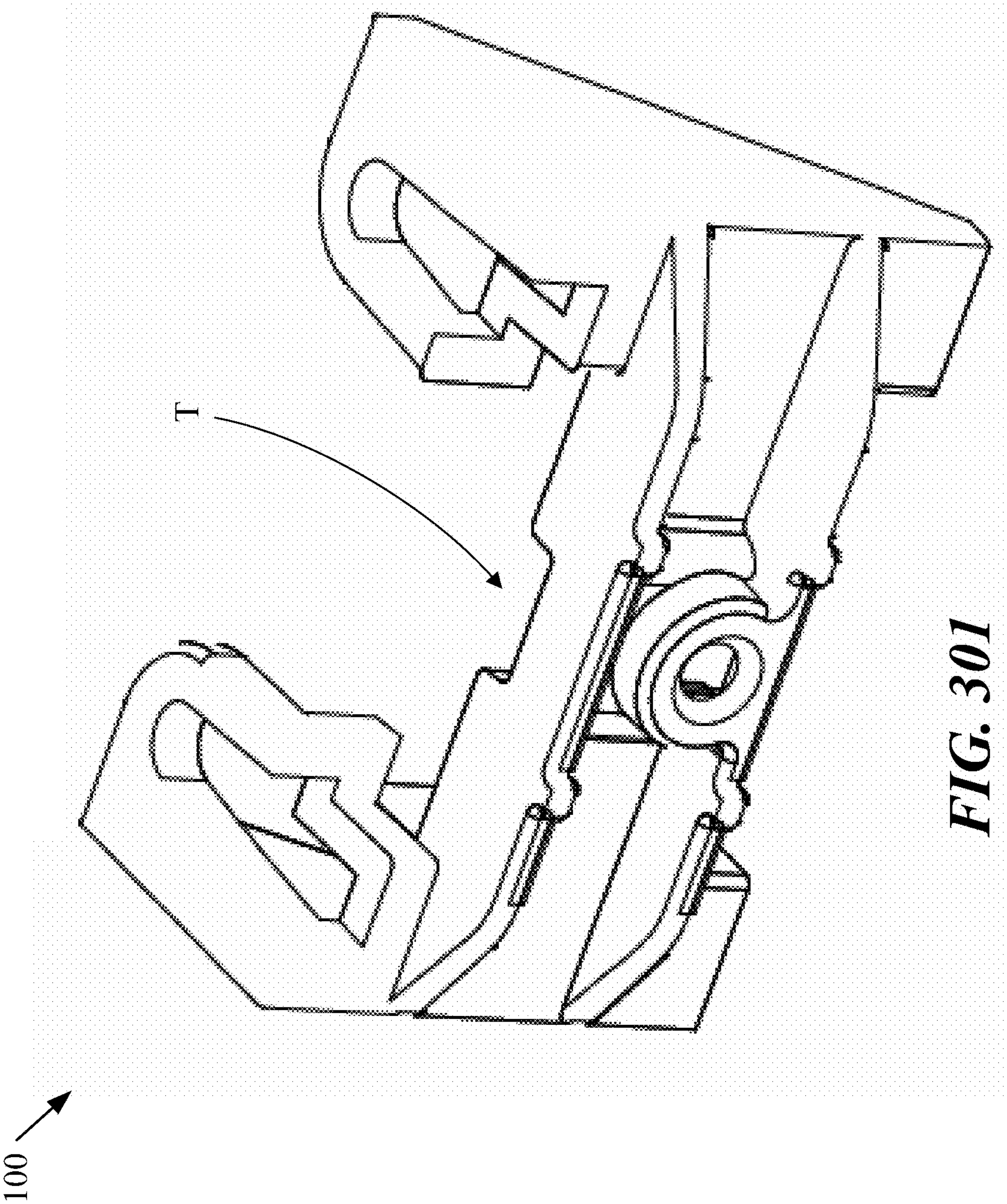

FIG. 301 on sheet 297 of the drawings is a screenshot of additional Z-Adjustment-related features of the examples [100*a-d*] of the lighting system.

Figure 302:
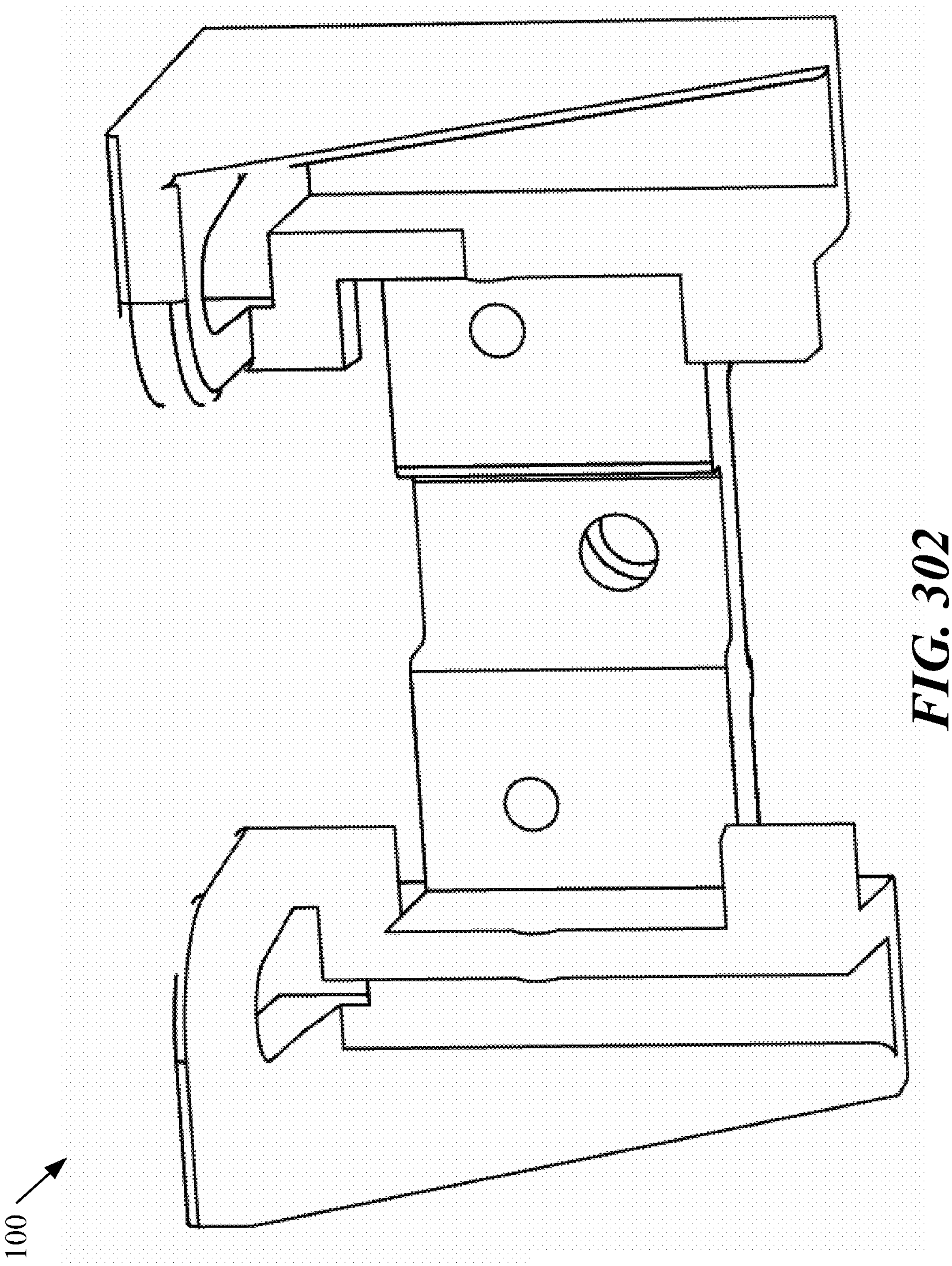

FIG. 302 on sheet 298 of the drawings is a screenshot of additional Z-Adjustment-related features of the examples [100*a-d*] of the lighting system.

Figure 303:
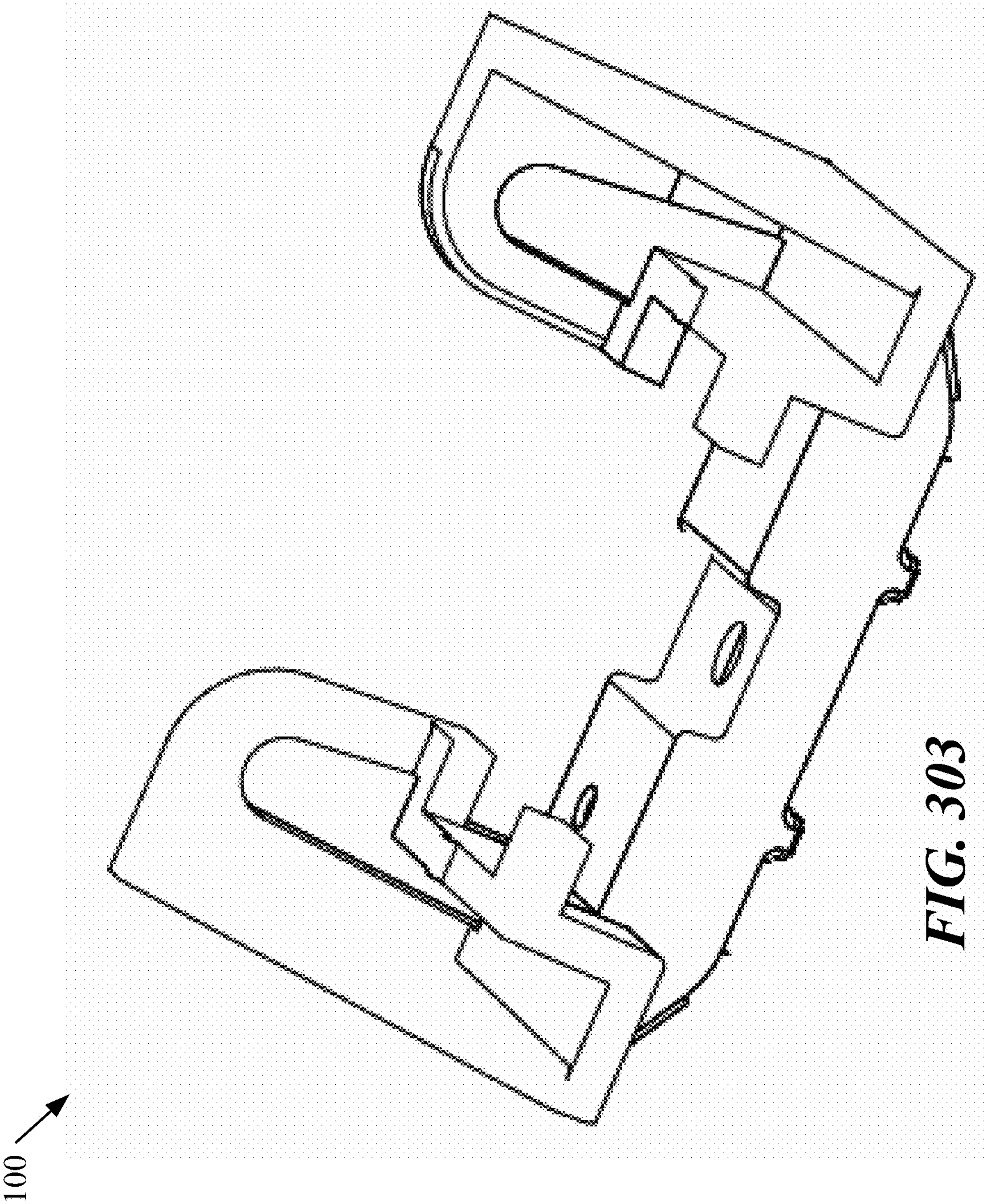

FIG. 303 on sheet 299 of the drawings is a screenshot of additional Z-Adjustment-related features of the examples [100*a-d*] of the lighting system.

Figure 304:
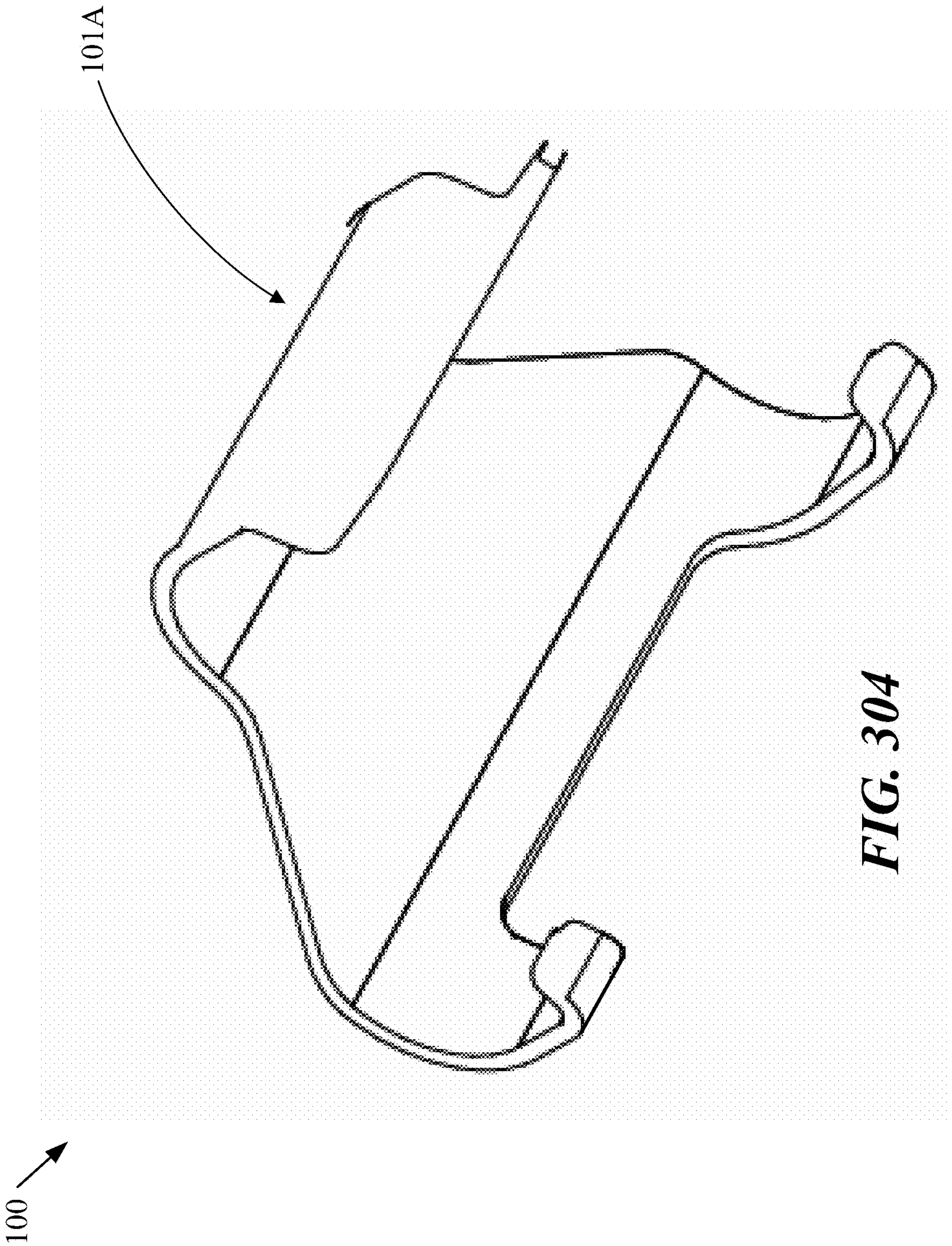

FIG. 304 on sheet 300 of the drawings is a screenshot of additional Z-Adjustment-related features of the examples [100*a-d*] of the lighting system.

Figure 305:
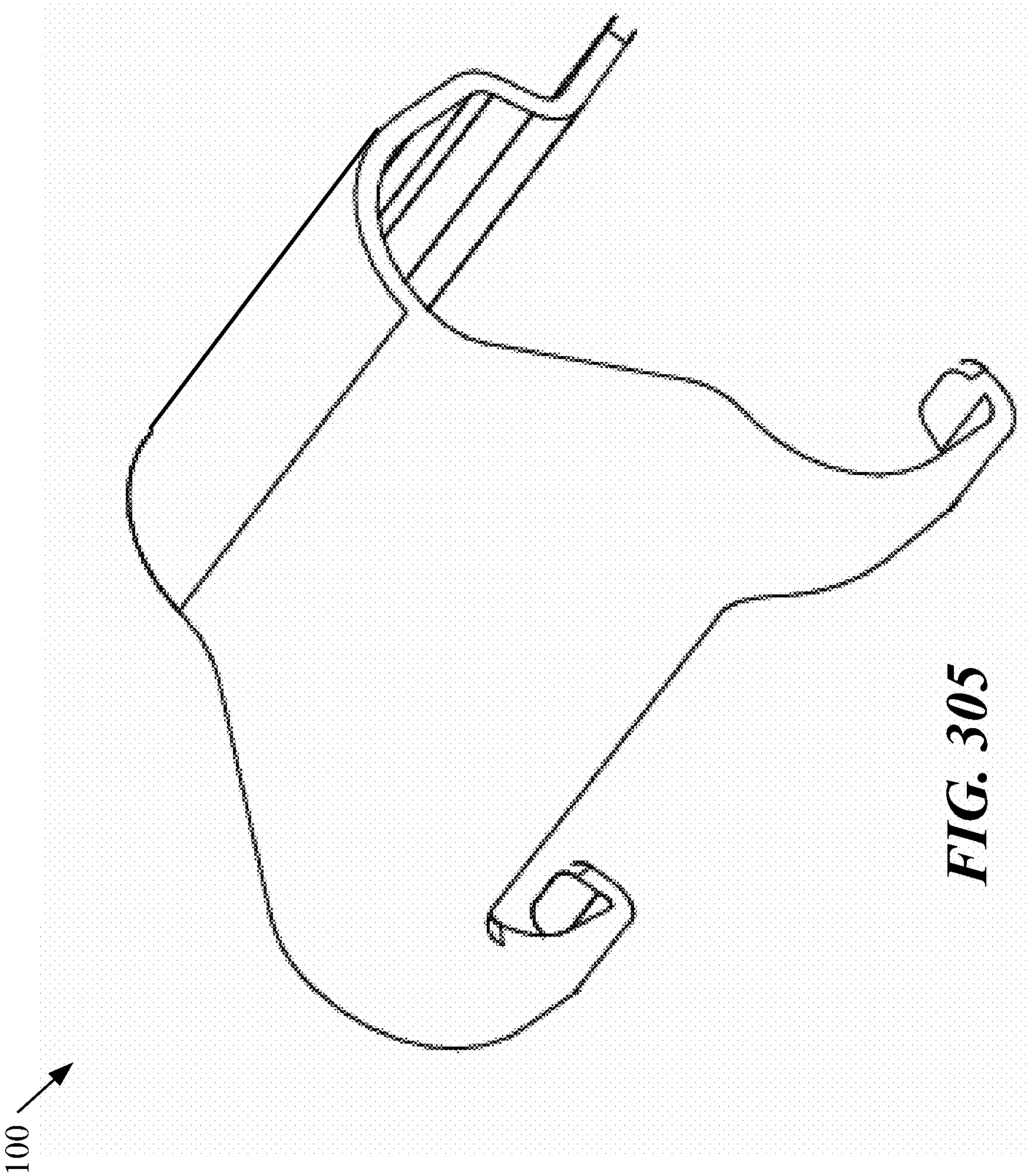

FIG. 305 on sheet 301 of the drawings is a screenshot of additional Z-Adjustment-related features of the examples [100*a-d*] of the lighting system.

DETAILED DESCRIPTION

Various lighting systems and processes that utilize semiconductor light-emitting devices have been designed. Many such lighting systems and processes exist that are capable of being mounted at a boundary. However, existing lighting systems and processes often have demonstrably failed to provide versatile control over the directions in which light is propagated away from a boundary, and have also demonstrably failed to provide easy access to the internal components of boundary-mounted lighting systems for servicing purposes such as, for example, adjustments in directional light emissions, and replacement of components such as light-emitting modules and power supply/driver units.

The following definitions of terms, being stated as applying "throughout this specification", are hereby deemed to be incorporated throughout this specification, including but not limited to the Summary, Brief Description of the Figures, Detailed Description, and Claims.

Throughout this specification, the term "semiconductor" means: a substance, examples including a solid chemical element or compound, that can conduct electricity under some conditions but not others, making the substance a good medium for the control of electrical current.

Throughout this specification, the term "semiconductor light-emitting device" (also being abbreviated as "SLED") means: a light-emitting diode; an organic light-emitting diode; a laser diode; or any other light-emitting device having one or more layers containing inorganic and/or organic semiconductor(s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device.

Further background information regarding semiconductor light-emitting devices is provided in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Throughout this specification, the term "spectral power distribution" means: the emission spectrum of the one or more wavelengths of light emitted by a semiconductor light-emitting device. Throughout this specification, the term "peak wavelength" means: the wavelength where the spectral power distribution of a semiconductor light-emitting device reaches its maximum value as detected by a photo-detector. As an example, an LED may be a source of nearly monochromatic light and may appear to emit light having a single color. Thus, the spectral power distribution of the light emitted by such an LED may be centered about its peak wavelength. As examples, the "width" of the spectral power distribution of an LED may be within a range of between about 10 nanometers and about 30 nanometers, where the width is measured at half the maximum illumination on each side of the emission spectrum.

Throughout this specification, both of the terms "beam width" and "full-width-half-maximum" ("FWHM") mean: the measured angle, being collectively defined by two mutually-opposed angular directions away from a center emission direction of a visible-light beam, at which an intensity of the visible-light emissions is half of a maximum intensity measured at the center emission direction. Throughout this specification, in the case of a visible-light beam having a non-circular shape, e.g. a visible-light beam having an elliptical shape, then the terms "beam width" and "full-width-half-maximum" ("FWHM") mean: the measured maximum and minimum angles, being respectively defined in two mutually-orthogonal pairs of mutually-opposed angular directions away from a center emission direction of a visible-light beam, at which a respective intensity of the visible-light emissions is half of a corresponding maximum intensity measured at the center emission direction. Throughout this specification, the term "field angle" means: the measured angle, being collectively defined by two opposing angular directions away from a center emission direction of a visible-light beam, at which an intensity of the visible-light emissions is one-tenth of a maximum intensity measured at the center emission direction. Throughout this specification, in the case of a visible-light beam having a non-circular shape, e.g. a visible-light beam having an elliptical shape, then the term "field angle" means: the measured maximum and minimum angles, being respectively defined in two mutually-orthogonal pairs of mutually-opposed angular directions away from a center emission direction of a visible-light beam, at which a respective intensity of the visible-light emissions is one-tenth of a corresponding maximum intensity measured at the center emission direction.

Throughout this specification, the term "dominant wavelength" means: the wavelength of monochromatic light that has the same apparent color as the light emitted by a semiconductor light-emitting device, as perceived by the human eye. As an example, since the human eye perceives yellow and green light better than red and blue light, and because the light emitted by a semiconductor light-emitting device may extend across a range of wavelengths, the color perceived (i.e., the dominant wavelength) may differ from the peak wavelength.

Throughout this specification, the term "luminous flux", also referred to as "luminous power", means: the measure in lumens of the perceived power of light, being adjusted to reflect the varying sensitivity of the human eye to different wavelengths of light. Throughout this specification, the term "radiant flux" means: the measure of the total power of electromagnetic radiation without being so adjusted. Throughout this specification, the term "central axis" means a direction along which the light emissions of a semiconductor light-emitting device have a greatest radiant flux. It is understood throughout this specification that light emissions "along a central axis" means light emissions that: include light emissions in the direction of the central axis; and may further include light emissions in a plurality of other generally similar directions.

Throughout this specification, the term "color bin" means: the designated empirical spectral power distribution and related characteristics of a particular semiconductor light-emitting device. For example, individual light-emitting diodes (LEDs) are typically tested and assigned to a designated color bin (i.e., "binned") based on a variety of characteristics derived from their spectral power distribution. As an example, a particular LED may be binned based on the value of its peak wavelength, being a common metric to characterize the color aspect of the spectral power distribution of LEDs. Examples of other metrics that may be utilized to bin LEDs include: dominant wavelength; and color point.

Throughout this specification, the term "luminescent" means: characterized by absorption of electromagnetic radiation (e.g., visible-light, UV light or infrared light) causing the emission of light by, as examples: fluorescence; and phosphorescence.

Throughout this specification, the term "object" means a material article or device. Throughout this specification, the term "surface" means an exterior boundary of an object. Throughout this specification, the term "incident visible-light" means visible-light that propagates in one or more directions towards a surface. Throughout this specification, the term "any incident angle" means any one or more directions from which visible-light may propagate towards a surface. Throughout this specification, the term "reflective surface" means a surface of an object that causes incident visible-light, upon reaching the surface, to then propagate in one or more different directions away from the surface without passing through the object. Throughout this specification, the term "planar reflective surface" means a generally flat reflective surface.

Throughout this specification, the term "reflection value" means a percentage of a radiant flux of incident visible-light having a specified wavelength that is caused by a reflective surface of an object to propagate in one or more different directions away from the surface without passing through the object. Throughout this specification, the term "reflected light" means the incident visible-light that is caused by a reflective surface to propagate in one or more different directions away from the surface without passing through the object. Throughout this specification, the term "Lambertian reflection" means diffuse reflection of visible-light from a surface, in which the reflected light has uniform radiant flux in all of the propagation directions. Throughout this specification, the term "specular reflection" means mirror-like reflection of visible-light from a surface, in which light from a single incident direction is reflected into a single propagation direction. Throughout this specification, the term "spectrum of reflection values" means a spectrum of values of percentages of radiant flux of incident visible-light, the values corresponding to a spectrum of wavelength values of visible-light, that are caused by a reflective surface to propagate in one or more different directions away from the surface without passing through the object. Throughout this specification, the term "transmission value" means a percentage of a radiant flux of incident visible-light having a specified wavelength that is permitted by a reflective surface to pass through the object having the reflective surface. Throughout this specification, the term "transmitted light" means the incident visible-light that is permitted by a reflective surface to pass through the object having the reflective surface. Throughout this specification, the term "spectrum of transmission values" means a spectrum of values of percentages of radiant flux of incident visible-light, the values corresponding to a spectrum of wavelength values of visible-light, that are permitted by a reflective surface to pass through the object having the reflective surface. Throughout this specification, the term "absorption value" means a percentage of a radiant flux of incident visible-light having a specified wavelength that is permitted by a reflective surface to pass through the reflective surface and is absorbed by the object having the reflective surface. Throughout this specification, the term "spectrum of absorption values" means a spectrum of values of percentages of radiant flux of incident visible-light, the values corresponding to a spectrum of wavelength values of visible-light, that are permitted by a reflective surface to pass through the reflective surface and are absorbed by the object having the reflective surface. Throughout this specification, it is understood that a reflective surface, or an object, may have a spectrum of reflection values, and a spectrum of transmission values, and a spectrum of absorption values. The spectra of reflection values, absorption values, and transmission values of a reflective surface or of an object may be measured, for example, utilizing an ultraviolet-visible-near infrared (UV-VIS-NIR) spectrophotometer. Throughout this specification, the term "visible-light reflector" means an object having a reflective surface. In examples, a visible-light reflector may be selected as having a reflective surface characterized by light reflections that are more Lambertian than specular.

Throughout this specification, the term "lumiphor" means: a medium that includes one or more luminescent materials being positioned to absorb light that is emitted at a first spectral power distribution by a semiconductor light-emitting device, and to re-emit light at a second spectral power distribution in the visible or ultra violet spectrum being different than the first spectral power distribution, regardless of the delay between absorption and re-emission. Lumiphors may be categorized as being down-converting, i.e., a material that converts photons to a lower energy level (longer wavelength); or up-converting, i.e., a material that converts photons to a higher energy level (shorter wavelength). As examples, a luminescent material may include: a phosphor; a quantum dot; a quantum wire; a quantum well; a photonic nanocrystal; a semiconducting nanoparticle; a scintillator; a lumiphoric ink; a lumiphoric organic dye; a day glow tape; a phosphorescent material; or a fluorescent material. Throughout this specification, the term "quantum material" means any luminescent material that includes: a quantum dot; a quantum wire; or a quantum well. Some quantum materials may absorb and emit light at spectral power distributions having narrow wavelength ranges, for example, wavelength ranges having spectral widths being within ranges of between about 25 nanometers and about 50 nanometers. In examples, two or more different quantum materials may be included in a lumiphor, such that each of the quantum materials may have a spectral power distribution for light emissions that may not overlap with a spectral power distribution for light absorption of any of the one or more other quantum materials. In these examples, cross-absorption of light emissions among the quantum materials of the lumiphor may be minimized. As examples, a lumiphor may include one or more layers or bodies that may contain one or more luminescent materials that each may be: (1) coated or sprayed directly onto an semiconductor light-emitting device; (2) coated or sprayed onto surfaces of a lens or other elements of packaging for an semiconductor light-emitting device; (3) dispersed in a matrix medium; or (4) included within a clear encapsulant (e.g., an epoxy-based or silicone-based curable resin or glass or ceramic) that may be positioned on or over an semiconductor light-emitting device. A lumiphor may include one or multiple types of luminescent materials. Other materials may also be included with a lumiphor such as, for example, fillers, diffusants, colorants, or other materials that may as examples improve the performance of or reduce the overall cost of the lumiphor. In examples where multiple types of luminescent materials may be included in a lumiphor, such materials may, as examples, be mixed together in a single layer or deposited sequentially in successive layers.

Throughout this specification, the term "volumetric lumiphor" means a lumiphor being distributed in an object having a shape including defined exterior surfaces. In some examples, a volumetric lumiphor may be formed by dispersing a lumiphor in a volume of a matrix medium having suitable spectra of visible-light transmission values and visible-light absorption values. As examples, such spectra may be affected by a thickness of the volume of the matrix medium, and by a concentration of the lumiphor being distributed in the volume of the matrix medium. In examples, the matrix medium may have a composition that includes polymers or oligomers of: a polycarbonate; a silicone; an acrylic; a glass; a polystyrene; or a polyester such as polyethylene terephthalate. Throughout this specification, the term "remotely-located lumiphor" means a lumiphor being spaced apart at a distance from and positioned to receive light that is emitted by a semiconductor light-emitting device.

Throughout this specification, the term "light-scattering particles" means small particles formed of a non-luminescent, non-wavelength-converting material. In some examples, a volumetric lumiphor may include light-scattering particles being dispersed in the volume of the matrix medium for causing some of the light emissions having the first spectral power distribution to be scattered within the volumetric lumiphor. As an example, causing some of the light emissions to be so scattered within the matrix medium may cause the luminescent materials in the volumetric lumiphor to absorb more of the light emissions having the first spectral power distribution. In examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In examples, light-scattering particles may have particle sizes being within a range of about 0.01 micron (10 nanometers) and about 2.0 microns (2,000 nanometers).

In some examples, a visible-light reflector may be formed by dispersing light-scattering particles having a first index of refraction in a volume of a matrix medium having a second index of refraction being suitably different from the first index of refraction for causing the volume of the matrix medium with the dispersed light-scattering particles to have suitable spectra of reflection values, transmission values, and absorption values for functioning as a visible-light reflector. As examples, such spectra may be affected by a thickness of the volume of the matrix medium, and by a concentration of the light-scattering particles being distributed in the volume of the matrix medium, and by physical characteristics of the light-scattering particles such as the particle sizes and shapes, and smoothness or roughness of exterior surfaces of the particles. In an example, the smaller the difference between the first and second indices of refraction, the more light-scattering particles may need to be dispersed in the volume of the matrix medium to achieve a given amount of light-scattering. As examples, the matrix medium for forming a visible-light reflector may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In other examples, a visible-light reflector may include a reflective polymeric or metallized surface formed on a visible-light-transmissive polymeric or metallic object such as, for example, a volume of a matrix medium. Additional examples of visible-light reflectors may include microcellular foamed polyethylene terephthalate sheets ("MCPET"). Suitable visible-light reflectors may be commercially available under the trade names White Optics® and MIRO® from WhiteOptics LLC, 243-G Quigley Blvd., New Castle, Delaware 19720 USA. Suitable MCPET visible-light reflectors may be commercially available from the Furukawa Electric Co., Ltd., Foamed Products Division, Tokyo, Japan. Additional suitable visible-light reflectors may be commercially available from CVI Laser Optics, 200 Dorado Place SE, Albuquerque, New Mexico 87123 USA.

In further examples, a volumetric lumiphor and a visible-light reflector may be integrally formed. As examples, a volumetric lumiphor and a visible-light reflector may be integrally formed in respective layers of a volume of a matrix medium, including a layer of the matrix medium having a dispersed lumiphor, and including another layer of the same or a different matrix medium having light-scattering particles being suitably dispersed for causing the another layer to have suitable spectra of reflection values, transmission values, and absorption values for functioning as the visible-light reflector. In other examples, an integrally-formed volumetric lumiphor and visible-light reflector may incorporate any of the further examples of variations discussed above as to separately-formed volumetric lumiphors and visible-light reflectors.

Throughout this specification, the term "phosphor" means: a material that exhibits luminescence when struck by photons. Examples of phosphors that may utilized include: $CaAlSiN_3$:Eu, $SrAlSiN_3$:Eu, $CaAlSiN_3$:Eu, $Ba_3Si_6O_{12}N_2$:Eu, $Ba_2SiO_4$:Eu, $Sr_2SiO_4$:Eu, $Ca_2SiO_4$:Eu, $Ca_3Sc_2Si_3O_{12}$:Ce, $Ca_3Mg_2Si_3O_{12}$:Ce, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, Bas $(PO_4)_3Cl$:Eu, $Cs_2CaP_2O_7$, $Cs_2SrP_2O_7$, $SrGa_2S_4$:Eu, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Al_5O_{12}$:Ce, $Y_3Ga_5O_{12}$:Ce, $Gd_3Al_5O_{12}$:Ce, $Gd_3Ga_5O_{12}$:Ce, $Tb_3Al_5O_{12}$:Ce, $Tb_3Ga_5O_{12}$:Ce, $Lu_3Ga_5O_{12}$:Ce, $(SrCa)AlSiN_3$:Eu, LuAG:Ce, $(Y,Gd)_2Al_5)_{12}$:Ce, CaS:Eu, SrS:Eu, $SrGa_2S_4$:$E_4$, $Ca_2(Sc,Mg)_2SiO_{12}$:Ce, $Ca_2Sc_2Si_2)_{12}$:C2, $Ca_2Sc_2O_4$:Ce, $Ba_2Si_6O_{12}N_2$:Eu, $(Sr,Ca)AlSiN_2$:Eu, and $CaAlSiN_2$:Eu.

Throughout this specification, the term "quantum dot" means: a nanocrystal made of semiconductor materials that are small enough to exhibit quantum mechanical properties, such that its excitons are confined in all three spatial dimensions.

Throughout this specification, the term "quantum wire" means: an electrically conducting wire in which quantum effects influence the transport properties.

Throughout this specification, the term "quantum wire" means: a thin layer that can confine (quasi-)particles (typically electrons or holes) in the dimension perpendicular to the layer surface, whereas the movement in the other dimensions is not restricted.

Throughout this specification, the term "photonic nanocrystal" means: a periodic optical nanostructure that affects the motion of photons, for one, two, or three dimensions, in much the same way that ionic: lattices affect electrons in solids.

Throughout this specification, the term "semiconducting nanoparticle" means: a particle having a dimension within a range of between about 1 nanometer and about 100 nanometers, being formed of a semiconductor.

Throughout this specification, the term "scintillator" means: a material that fluoresces when struck by photons.

Throughout this specification, the term "lumiphoric ink" means: a lipid composition containing a luminescent material. For example, a lumiphoric ink composition may contain semiconductor nanoparticles. Examples of lumiphoric ink compositions that may be utilized are disclosed in Cao et al., U.S. Patent Application Publication No. 20130221489 published on Aug. 29, 2013, the entirety of which hereby is incorporated herein by reference.

Throughout this specification, the term "lumiphoric organic dye" means an organic dye having luminescent up-converting or down-converting activity. As an example, some perylene-based dyes may be suitable.

Throughout this specification, the term "day glow tape" means: a tape material containing a luminescent material.

Throughout this specification, the term "CIE 1931 XY chromaticity diagram" means: the 1931 International Commission on Illumination two-dimensional chromaticity diagram, which defines the spectrum of perceived color points of visible-light by (x, y) pairs of chromaticity coordinates that fall within a generally U-shaped area that includes all of the hues perceived by the human eye. Each of the x and y axes of the CIE 1931 XY chromaticity diagram has a scale of between 0.0 and 0.8. The spectral colors are distributed around the perimeter boundary of the chromaticity diagram, the boundary encompassing all of the hues perceived by the human eye. The perimeter boundary itself represents maximum saturation for the spectral colors. The CIE 1931 XY chromaticity diagram is based on the three-dimensional CIE 1931 XYZ color space. The CIE 1931 XYZ color space utilizes three color matching functions to determine three corresponding tristimulus values which together express a given color point within the CIE 1931 XYZ three-dimensional color space. The CIE 1931 XY chromaticity diagram is a projection of the three-dimensional CIE 1931 XYZ color space onto a two-dimensional (x, y) space such that brightness is ignored. A technical description of the CIE 1931 XY chromaticity diagram is provided in, for example, the "Encyclopedia of Physical Science and Technology", vol. 7, pp. 230-231 (Robert A Meyers ed., 1987); the entirety of which hereby is incorporated herein by reference. Further background information regarding the CIE 1931 XY chromaticity diagram is provided in Harbers et al., U.S. Patent Application Publication No. 2012/0224177A1 published on Sep. 6, 2012, the entirety of which hereby is incorporated herein by reference.

Throughout this specification, the term "color point" means: an (x, y) pair of chromaticity coordinates falling within the CIE 1931 XY chromaticity diagram. Color points located at or near the perimeter boundary of the CIE 1931 XY chromaticity diagram are saturated colors composed of light having a single wavelength, or having a very small spectral power distribution. Color points away from the perimeter boundary within the interior of the CIE 1931 XY chromaticity diagram are unsaturated colors that are composed of a mixture of different wavelengths.

Throughout this specification, the term "combined light emissions" means: a plurality of different light emissions that are mixed together. Throughout this specification, the term "combined color point" means: the color point, as perceived by human eyesight, of combined light emissions. Throughout this specification, a "substantially constant" combined color points are: color points of combined light emissions that are perceived by human eyesight as being uniform, i.e., as being of the same color.

Throughout this specification, the term "Planckian—black-body locus" means the curve within the CIE 1931 XY chromaticity diagram that plots the chromaticity coordinates (i.e., color points) that obey Planck's equation: $E(\lambda)=A\lambda-5/(eB/T-1)$, where E is the emission intensity, X is the emission wavelength, T is the color temperature in degrees Kelvin of a black-body radiator, and A and B are constants. The Planckian—black-body locus corresponds to the locations of color points of light emitted by a black-body radiator that is heated to various temperatures. As a black-body radiator is gradually heated, it becomes an incandescent light emitter (being referred to throughout this specification as an "incandescent light emitter") and first emits reddish light, then yellowish light, and finally bluish light with increasing temperatures. This incandescent glowing occurs because the wavelength associated with the peak radiation of the black-body radiator becomes progressively shorter with gradually increasing temperatures, consistent with the Wien Displacement Law. The CIE 1931 XY chromaticity diagram further includes a series of lines each having a designated corresponding temperature listing in units of degrees Kelvin spaced apart along the Planckian—black-body locus and corresponding to the color points of the incandescent light emitted by a black-body radiator having the designated temperatures. Throughout this specification, such a temperature listing is referred to as a "correlated color temperature" (herein also referred to as the "CCT") of the corresponding color point. Correlated color temperatures are expressed herein in units of degrees Kelvin (K). Throughout this specification, each of the lines having a designated temperature listing is referred to as an "isotherm" of the corresponding correlated color temperature.

Throughout this specification, the term "chromaticity bin" means: a bounded region within the CIE 1931 XY chromaticity diagram. As an example, a chromaticity bin may be defined by a series of chromaticity (x,y) coordinates, being connected in series by lines that together form the bounded region. As another example, a chromaticity bin may be defined by several lines or other boundaries that together form the bounded region, such as: one or more isotherms of CCT's; and one or more portions of the perimeter boundary of the CIE 1931 chromaticity diagram.

Throughout this specification, the term "delta(uv)" means: the shortest distance of a given color point away from (i.e., above or below) the Planckian—black-body locus. In general, color points located at a delta(uv) of about equal to or less than 0.015 may be assigned a correlated color temperature (CCT).

Throughout this specification, the term "greenish-blue light" means: light having a perceived color point being within a range of between about 490 nanometers and about 482 nanometers (herein referred to as a "greenish-blue color point.").

Throughout this specification, the term "blue light" means: light having a perceived color point being within a range of between about 482 nanometers and about 470 nanometers (herein referred to as a "blue color point.").

Throughout this specification, the term "purplish-blue light" means: light having a perceived color point being within a range of between about 470 nanometers and about 380 nanometers (herein referred to as a "purplish-blue color point.").

Throughout this specification, the term "reddish-orange light" means: light having a perceived color point being within a range of between about 610 nanometers and about 620 nanometers (herein referred to as a "reddish-orange color point.").

Throughout this specification, the term “red light” means: light having a perceived color point being within a range of between about 620 nanometers and about 640 nanometers (herein referred to as a “red color point.”).

Throughout this specification, the term “deep red light” means: light having a perceived color point being within a range of between about 640 nanometers and about 670 nanometers (herein referred to as a “deep red color point.”).

Throughout this specification, the term “visible-light” means light having one or more wavelengths being within a range of between about 380 nanometers and about 670 nanometers; and “visible-light spectrum” means the range of wavelengths of between about 380 nanometers and about 670 nanometers.

Throughout this specification, the term “white light” means: light having a color point located at a delta(uv) of about equal to or less than 0.006 and having a CCT being within a range of between about 10000K and about 1800K (herein referred to as a “white color point.”). Many different hues of light may be perceived as being “white.” For example, some “white” light, such as light generated by a tungsten filament incandescent lighting device, may appear yellowish in color, while other “white” light, such as light generated by some fluorescent lighting devices, may appear more bluish in color. As examples, white light having a CCT of about 3000K may appear yellowish in color, while white light having a CCT of about equal to or greater than 8000K may appear more bluish in color and may be referred to as “cool” white light. Further, white light having a CCT of between about 2500K and about 4500K may appear reddish or yellowish in color and may be referred to as “warm” white light. “White light” includes light having a spectral power distribution of wavelengths including red, green and blue color points. In an example, a CCT of a lumiphor may be tuned by selecting one or more particular luminescent materials to be included in the lumiphor. For example, light emissions from a semiconductor light-emitting device that includes three separate emitters respectively having red, green and blue color points with an appropriate spectral power distribution may have a white color point. As another example, light perceived as being “white” may be produced by mixing light emissions from a semiconductor light-emitting device having a blue, greenish-blue or purplish-blue color point together with light emissions having a yellow color point being produced by passing some of the light emissions having the blue, greenish-blue or purplish-blue color point through a lumiphor to down-convert them into light emissions having the yellow color point. General background information on systems and processes for generating light perceived as being “white” is provided in “Class A Color Designation for Light Sources Used in General Illumination”, Freyssinier and Rea, *J. Light & Vis. Env.*, Vol. 37, No. 2 & 3 (Nov. 7, 2013, Illuminating Engineering Institute of Japan), pp. 10-14; the entirety of which hereby is incorporated herein by reference.

Throughout this specification, the term “color rendition index” (herein also referred to as “CRT-Ra”) means: the quantitative measure on a scale of 1-100 of the capability of a given light source to accurately reveal the colors of one or more objects having designated reference colors, in comparison with the capability of a black-body radiator to accurately reveal such colors. The CRI-Ra of a given light source is a modified average of the relative measurements of color renditions by that light source, as compared with color renditions by a reference black-body radiator, when illuminating objects having the designated reference color(s). The CRT is a relative measure of the shift in perceived surface color of an object when illuminated by a particular light source versus a reference black-body radiator. The CRI-Ra will equal 100 if the color coordinates of a set of test colors being illuminated by the given light source are the same as the color coordinates of the same set of test colors being irradiated by the black-body radiator. The CRT system is administered by the International Commission on Illumination (CIE). The CIE selected fifteen test color samples (respectively designated as $R_{1-15}$) to grade the color properties of a white light source. The first eight test color samples (respectively designated as $R_{1-8}$) are relatively low saturated colors and are evenly distributed over the complete range of hues. These eight samples are employed to calculate the general color rendering index Ra. The general color rendering index Ra is simply calculated as the average of the first eight color rendering index values, $R_{1-8}$. An additional seven samples (respectively designated as $R_{9-15}$) provide supplementary information about the color rendering properties of a light source; the first four of them focus on high saturation, and the last three of them are representative of well-known objects. A set of color rendering index values, $R_{1-15}$, can be calculated for a particular correlated color temperature (CCT) by comparing the spectral response of a light source against that of each test color sample, respectively. As another example, the CRI-Ra may consist of one test color, such as the designated red color of $R_9$.

As examples, sunlight generally has a CRI-Ra of about 100; incandescent light bulbs generally have a CRI-Ra of about 95; fluorescent lights generally have a CRI-Ra of about 70 to 85;

and monochromatic light sources generally have a CRI-Ra of about zero. As an example, a light source for general illumination applications where accurate rendition of object colors may not be considered important may generally need to have a CRI-Ra value being within a range of between about 70 and about 80. Further, for example, a light source for general interior illumination applications may generally need to have a CRI-Ra value being at least about 80. As an additional example, a light source for general illumination applications where objects illuminated by the lighting device may be considered to need to appear to have natural coloring to the human eye may generally need to have a CRI-Ra value being at least about 85. Further, for example, a light source for general illumination applications where good rendition of perceived object colors may be considered important may generally need to have a CRI-Ra value being at least about 90.

Throughout this specification, the term “in contact with” means: that a first object, being “in contact with” a second object, is in either direct or indirect contact with the second object. Throughout this specification, the term “in indirect contact with” means: that the first object is not in direct contact with the second object, but instead that there are a plurality of objects (including the first and second objects), and each of the plurality of objects is in direct contact with at least one other of the plurality of objects (e.g., the first and second objects are in a stack and are separated by one or more intervening layers). Throughout this specification, the term “in direct contact with” means: that the first object, which is “in direct contact” with a second object, is touching the second object and there are no intervening objects between at least portions of both the first and second objects.

Throughout this specification, the term “spectrophotometer” means: an apparatus that can measure a light beam's intensity as a function of its wavelength and calculate its total luminous flux.

Throughout this specification, the term "integrating sphere-spectrophotometer" means: a spectrophotometer operationally connected with an integrating sphere. An integrating sphere (also known as an Ulbricht sphere) is an optical component having a hollow spherical cavity with its interior covered with a diffuse white reflective coating, with small holes for entrance and exit ports. Its relevant property is a uniform scattering or diffusing effect. Light rays incident on any point on the inner surface are, by multiple scattering reflections, distributed equally to all other points. The effects of the original direction of light are minimized. An integrating sphere may be thought of as a diffuser which preserves power but destroys spatial information. Another type of integrating sphere that can be utilized is referred to as a focusing or Coblentz sphere. A Coblentz sphere has a mirror-like (specular) inner surface rather than a diffuse inner surface. Light scattered by the interior of an integrating sphere is evenly distributed over all angles. The total power (radiant flux) of a light source can then be measured without inaccuracy caused by the directional characteristics of the source. Background information on integrating sphere-spectrophotometer apparatus is provided in Liu et al., U.S. Pat. No. 7,532,324 issued on May 12, 2009, the entirety of which hereby is incorporated herein by reference. It is understood throughout this specification that color points may be measured, for example, by utilizing a spectrophotometer, such as an integrating sphere-spectrophotometer. The spectra of reflection values, absorption values, and transmission values of a reflective surface or of an object may be measured, for example, utilizing an ultraviolet-visible-near infrared (UV-VIS-NIR) spectrophotometer.

Throughout this specification, the term "diffuse refraction" means refraction from an object's surface that scatters the visible-light emissions, casting multiple jittered light rays forming combined light emissions having a combined color point.

Throughout this specification, each of the words "include", "contain", and "have" is interpreted broadly as being open to the addition of further like elements as well as to the addition of unlike elements.

FIGS. LTS1 to LTS37 on sheets 1-37 of the drawings are screenshots of examples [100*a-d*] of the lighting system.

FIGS. PAN1 to PAN34 on sheets 38-71 of the drawings are screenshots of Pan-related features of the examples [100*a-d*] of the lighting system.

FIGS. TLT1 to TLT32 on sheets 72-103 of the drawings are screenshots of Tilt-related features of the examples [100*a-d*] of the lighting system.

FIGS. UJT1 to UJT27 on sheets 104-127 of the drawings are screenshots of Universal Joint-related features of the examples [100*a-d*] of the lighting system.

FIGS. ZAD1 to ZAD28 on sheets 128-155 of the drawings are screenshots of Z-Adjustment-related features of the examples [100*a-d*] of the lighting system.

FIGS. TWL1 to TWL26 on sheets 156-180 of the drawings are screenshots of Twist-Lock-related features of the examples [100*a-d*] of the lighting system.

FIGS. PPS1 to PPS43 on sheets 181-223 of the drawings are screenshots of Pluggable Power Supply-related features of the examples [100*a-d*] of the lighting system.

FIGS. WAW1 to WAW26 on sheets 224-249 of the drawings are screenshots of Wall wash-related features of the examples [100*a-d*] of the lighting system.

FIGS. RMD1 to RMD14 on sheets 250-263 of the drawings are screenshots of features of examples of another lighting system.

FIGS. ZAD29 to ZAD66 on sheets 264-301 of the drawings are screenshots of additional Z-Adjustment-related features of the examples [100*a-d*] of the lighting system.

FIGS. 1-37 respectively correspond to Figures LTS1 to LTS37 on sheets 1-37 of the original drawings. FIGS. 38-71 respectively correspond to Figures PAN1 to PAN34 on sheets 38-71 of the original drawings. FIGS. 72-103 respectively correspond to Figures TLT1 to TLT32 on sheets 72-103 of the original drawings. FIGS. 104-130 respectively correspond to Figures UJT1 to UJT27 on sheets 104-127 of the original drawings. FIGS. 131-158 respectively correspond to Figures ZAD1 to ZAD28 on sheets 128-155 of the original drawings. FIGS. 159-184 respectively correspond to Figures TWL1 to TWL26 on sheets 156-180 of the original drawings. FIGS. 185-227 respectively correspond to Figures PPS1 to PPS43 on sheets 181-223 of the original drawings. FIGS. 228-253 respectively correspond to Figures WAW1 to WAW26 on sheets 224-249 of the original drawings. FIGS. 254-267 respectively correspond to Figures RMD1 to RMD14 on sheets 250-263 of the original drawings. FIGS. 268-305 respectively correspond to Figures ZAD29 to ZAD66 on sheets 264-301 of the original drawings.

It is understood throughout this specification that each one of the examples [100*a-d*] of the lighting system may be modified as including any of the features or combinations of features that are disclosed in connection with any of the foregoing Figures included on sheets 1-301 of the drawings.

It is further understood throughout this specification that the example of another lighting system may be modified as including any of the features or combinations of features that are disclosed in connection with FIGS. PAN1 to PAN34 on sheets 38-71, and may be modified as including any of the features or combinations of features that are disclosed in connection with FIGS. TLT1 to TLT32 on sheets 72-103, and may be modified as including any of the features or combinations of features that are disclosed in connection with FIGS. UJT1 to UJT27 on sheets 104-127 of the drawings.

The Examples [100*a-d*] of a Lighting System

We now refer to FIGS. LTS1 to LTS37 on sheets 1-37 of the drawings, being screenshots of examples [100*a-d*] of the lighting system. FIGS. LTS1-8 illustrate an example [100*a*] of a lighting system, in which FIGS. LTS2-8 are views in which various parts of the lighting system [100*a*] have been successively removed. FIGS. LTS9-18 illustrate an example [100*b*] of a lighting system, in which FIGS. LTS10-18 are views in which various parts of the lighting system [100*b*] have been successively removed. FIGS. LTS19-29 illustrate an example [100*c*] of a lighting system, in which FIGS. LTS20-29 are views in which various parts of the lighting system [100*c*] have been successively removed. FIGS. LTS30-37 illustrate an example [100*d*] of a lighting system, in which FIGS. LTS31-37 are views in which various parts of the lighting system [100*d*] have been successively removed. The examples [100*a*], [100*b*], [100*c*], and [100*d*] of the lighting system as shown in FIGS. LTS1 to LTS37 are collectively referred to throughout this specification and in sheets 1-301 of the drawings as the example of the lighting system. It is understood throughout this specification that any one of the examples [100*a*], [100*b*], [100*c*], and [100*d*] being included in the example of the lighting system may be modified as including any of the features or combinations of features of any of the others among the examples [100*a*], [100*b*], [100*c*], and [100*d*] of the lighting system.

The PAN—Related Features

We now refer to FIGS. PAN1 to PAN34 on sheets 38-71 of the drawings, being screenshots of Pan-related features of the examples [100*a-d*] of the lighting system. In examples, the lighting system [100] may include a visible-light source [102] including a semiconductor light-emitting device, the visible-light source [102] being configured for generating visible-light emissions having a central light emission axis [104] from the semiconductor light-emitting device. Further, the lighting system [100] may include a pan assembly [106] having a pan ring [108], a pinion gear [110], and a central fixed gear [112]. In examples of the lighting system [100], rotating the pinion gear [110] may cause the pan ring [108] to be rotated around a pan axis [113] through a range of rotation [114] around the central fixed gear [112]. Additionally in examples [100] of the lighting system, the causing the pan ring [108] to be rotated around the pan axis [113] may cause the central light emission axis [104] of the visible-light emissions to be rotated around a ring [116] of light emission directions. In some examples, the lighting system [100] may further include a trim ring (not shown), and the pinion gear [110] may be accessible upon removal of the trim ring from the lighting system [100]. As examples [100] of the lighting system, the range of rotation [114] of the pan axis [113] may be greater than 360 degrees, such as, for example, about 370 degrees. In examples [100], the lighting system may include a lever [120] being configured for pivoting to facilitate the range of rotation [114] as being greater than 360 degrees. In examples, the lighting system [100] may further include a locking screw [122] being configured for locking the pan ring [108] at a selected position along the pan axis [113]. In examples of the lighting system [100], the visible-light source [102] may be rotated around the pan axis [113] by inserting an Allen key, or a similarly-functioning tool, into the pinion gear [110]. In further examples [100] of the lighting system, the locking screw [122], may, for example, receive the same Allen key or similarly-functioning tool.

The TILT—Related Features

We now refer to FIGS. TLT1 to TLT32 on sheets 72-103 of the drawings, being screenshots of Tilt-related features of the examples [100*a-d*] of the lighting system. In examples, the lighting system [100] may include a visible-light source [102] including a semiconductor light-emitting device, the visible-light source [102] being configured for generating visible-light emissions having a central light emission axis [104] from the semiconductor light-emitting device. As examples, the lighting system [100] may include a heat-sink [124] being attached to the visible-light source [102]. Further, the example [100] of the lighting system may include a tilt assembly [126] including a tilt adjustment screw [128], a leadscrew [130], and two spaced-apart panels [132], [134] each having an arcuate slot [136], [138], the arcuate slots [136], [138] being mutually concentric and collectively defining an arcuate tilt path [140], the heat-sink [124] being movably attached to the arcuate slots [136], [138]. Additionally in the examples [100] of the lighting system, the tilt adjustment screw [128] may be configured for driving the leadscrew [130] to cause movement of the heat-sink [124] to a selected position along the tilt path [140]; and movement of the heat-sink [124] along the tilt path [140] may cause the visible-light source [102] to be moved along the tilt path [140]. In examples, the lighting system [100] may further include a light emission aperture [142]. As further examples [100], one portion [144] of the tilt path [140] may be configured for causing the visible-light emissions to be emitted from the lighting system [100] in a normal direction [146] through the light emission aperture [142]. In additional examples [100] of the lighting system, another portion [148] of the tilt path [140] may be configured for causing the visible-light emissions to be emitted from the lighting system [100] in a direction through the light emission aperture [142] being tilted away from the normal direction [146] by an angle being within a range of between about zero (0) degrees and about forty (40) degrees. In some examples [100] of the lighting system, the arcuate slots [136], [138] may be configured for defining the tilt path [140] as causing the movement of the heat-sink [124] to include pivoting relative to the normal direction [146]. In additional examples [100] of the lighting system, the arcuate slots [136], [138] may be configured for defining the tilt path [140] as causing the movement of the heat-sink [124] to include both pivoting relative to the normal direction [146] and panning, e.g. in a direction [149], across the light emission aperture [142]. As examples [100] of the lighting system, the arcuate slots [136], [138] may be configured for defining the tilt path [140] as causing a panning movement of the central light emission axis [104] towards one edge [150] of the light emission aperture [142] while the tilting causes a pivoting movement of the central light emission axis [104] of the visible-light source [102] towards another opposite edge [152] of the light emission aperture [142]. In examples, the lighting system [100] may further include a trim ring (not shown); and the tilt adjustment screw [128] may be accessible upon removal of the trim ring from the lighting system [100]. In further examples, the lighting system [100] may include a locking screw [156] being configured for locking the heat-sink [124] at a selected position along the tilt path [140]. As examples [100] of the lighting system, the tilt adjustment screw [128] may be connected with the leadscrew [130] by a universal joint [158]. In examples [100] of the lighting system, the universal joint [158] may facilitate movement of the heat-sink [124] and the leadscrew [130] together along the tilt path [140] while maintaining the tilt adjustment screw [128] at a fixed location in the lighting system [100]. As examples, the lighting system [100] may include a tilt indicator [160] being configured for displaying a tilt angle [162] corresponding to the selected position of the heat-sink [124] along the tilt path [140]. In examples [100] of the lighting system, the heat-sink [124] may be caused to move along the tilt path [140] by inserting an Allen key, or a similarly-functioning tool, into the tilt adjustment screw [128], and thereby causing the leadscrew [130] to be moved along the tilt path [140]. In examples [100] of the lighting system, the tilt path [140] may allow the visible-light source [102] to move aft in a direction [149] as it pivots to better keep the central light emission axis [104] of the visible-light source [102] as being optimized for maximal emission of light from the lighting system [100] through the light emission aperture [142]. In examples of the lighting system [100], the leadscrew [130] may have, for example, a diameter-to-lead ratio of about 4:1, meaning that the diameter may be four times as large as the distance of the lead per revolution. As examples [100] of the lighting system, such a 4:1 ratio may be essentially self-locking, such that the leadscrew [130] may not back drive and may essentially remain in a fixed position once having been set. In further examples of the lighting system [100], the diameter-to-lead ratio of the leadscrew [130] may be within a range of between about 1:1 and about 10:1. In examples [100] of the lighting system, the heat-sink [124] may be caused to be secured at a fixed position along the tilt path [140] by inserting an Allen key, or a similarly-functioning tool, into the locking screw [156], and thereby causing the leadscrew [130] to be immobilized along the tilt path [140]. In further examples, the lighting system [100] may include an indicator [160] being configured to show the amount of tilt in degrees from 0 to 40, which may, for example, be visible both during and after tilt adjustment.

The Universal-Joint—Related Features

We now refer to FIGS. UJT1 to UJT27 on sheets 104-127 of the drawings, being screenshots of Universal Joint-related features of the examples [100*a-d*] of the lighting system. In examples, the lighting system [100] may include a visible-light source [102] including a semiconductor light-emitting device, the visible-light source [102] being configured for generating visible-light emissions having a central light emission axis [104] from the semiconductor light-emitting device. Further, the example [100] of the lighting system may include a tilt adjustment screw [128], a leadscrew [130], and a universal joint assembly [168] linking together the tilt adjustment screw [128] and the leadscrew [130]. Additionally in the example [100] of the lighting system, the universal joint assembly [168] may include a gimbal [170] and a swing bar [172] having swing arms [174], [176]. Also in the example [100] of the lighting system, the swing bar [172] may be in threaded engagement with the leadscrew [130]. In the example [100] of the lighting system, the tilt adjustment screw [128] may be attached to the gimbal [170]. Further in the example [100] of the lighting system, the swing arms [174], [176] may be connected with the visible-light source [102]. Additionally in the example [100] of the lighting system, the tilt adjustment screw [128] may be configured for causing the universal joint assembly [168] to drive the leadscrew [130] for movement of the visible-light source [102] to a selected position along a tilt path [140]. In some examples [100] of the lighting system, the universal joint assembly [168] may facilitate movement of the visible-light source [102] and the leadscrew [130] together along the tilt path [140] while maintaining the tilt adjustment screw [128] at a fixed location in the lighting system [100]. As examples of the lighting system [100], the gymbal [170] may include two yokes [178], [180] each having a pair of trunnions [182], [184], [186], [188], the yokes [178], [180] being attached together by a cross [190] for rotation in two orthogonal degrees of freedom. In examples [100] of the lighting system, the cross [190] may be fabricated of an appropriate plastic material for causing the rotational feel to be smooth and unencumbered by excess rough friction, as well as allowing for wider design tolerances. In examples of the lighting system [100], the cross [190] may be attached to both of the yokes [178], [180] by pins [192], [194] inserted in apertures of the trunnions [182], [184], [186], [188]. In an example [100] of the lighting system, the cross [190] may be encapsulated, i.e., the cross [190] may include the pins [192], [194] as being located inside and freely rotating within the cross [190]. As an example [100] of the lighting system, the trunnions [182], [184], [186], [188] may have cut-back shoulders [103], [105] for defining ranges of motion in the two degrees of freedom. In an example [100] of the lighting system, the trunnions [182], [184], [186], [188] may have the cut-back shoulders [103], [105] for defining the ranges of motion as reaching off-axis angles, i.e., angles between central axes [185], [187] of the two yokes [178], [180], of up to about 65 degrees. As further examples [100] of the lighting system, the shoulders [103], [105] of the trunnions [182], [184], [186], [188] may provide a hard stop. In examples [100], the lighting system may further include a bracket [107] being located on the leadscrew [130] between the gymbal [170] and the swing bar [172], the bracket [107] being freely rotatable around the leadscrew [130], and the bracket [107] forming an attachment of the tilt adjustment screw [128] to the lighting system [100]. In examples [100] of the lighting system, the swing arms [174], [176] may be configured for free rotation around the swing bar [172] on an axis [109] being perpendicular to a longitudinal axis [111] of the leadscrew [130]. In some examples [100] of the lighting system, the swing bar [172] may have two posts [101], [115] being located on opposing sides of the swing bar [172]; and each of the swing arms [174], [176] may have an aperture [117], [119] being mounted on a one of the posts [101], [115]. In other examples [100] of the lighting system, the swing bar [172] may have two cavities (not shown) being located on opposing sides of the swing bar [172]; and each of the swing arms [174], [176] may have a post (not shown) being inserted into a one of the cavities. As an example, the lighting system [100] may further include a locking screw [156] being configured for locking the visible-light source [102] at a selected position along the tilt path [140]. In examples [100] of the lighting system, an angle between the swing bar [172] and the visible-light source [102] may be compensated for by allowing the visible-light source [102] to be pulled/pushed by the swing arms [174], [176] to a selected tilt angle. In examples [100] of the lighting system, a pin [121] may pass through both of the swing arms [174], [176] as well as through the visible-light source [102] and/or through a heat-sink [124] of the lighting system [100] as was earlier discussed in connection with the TILT—Related Features. In examples [100] of the lighting system, the pin [121] may be allowed a freedom of rotation between the swing arms [174], [176] and the visible-light source [102] and/or the heat-sink [124], enabling the swing arms [174], [176] to rotate freely relative to the visible-light source [102] or the heat-sink [124]. In examples of the lighting system [100], the leadscrew [130] may have, for example, a diameter-to-lead ratio of about 4:1, meaning that the diameter may be four times as large as the distance of the lead per revolution. As examples [100] of the lighting system, such a 4:1 ratio may be essentially self-locking, such that the leadscrew [130] may not back drive and may essentially remain in a fixed position once having been set. In further examples of the lighting system [100], the diameter-to-lead ratio of the leadscrew [130] may be within a range of between about 1:1 and about 10:1. In examples [100] of the lighting system, the visible-light source [102] may be caused to be secured at a fixed position along the tilt path [140] by inserting an Allen key, or a similarly-functioning tool, into the locking screw [156], and thereby causing the leadscrew [130] to be immobilized along the tilt path [140].

The Z-Adjustment—Related Features

We now refer to: FIGS. ZAD1 to ZAD28 on sheets 128-155 of the drawings, being screenshots of Z-Gravity Adjustment-related features of the examples [100*a-d*] of the lighting system; and FIGS. ZAD29 to ZAD66 on sheets 264-301 of the drawings, being screenshots of additional Z-Adjustment-related features of the examples [100*a-d*] of the lighting system. In examples, the lighting system [100] may include a visible-light source [102] including a semiconductor light-emitting device, the visible-light source [102] being configured for generating visible-light emissions having a central light emission axis [104] from the semiconductor light-emitting device. Further, the examples [100] of the lighting system may include a light emission aperture [142] being configured for causing the visible-light emissions to be emitted from the lighting system [100]; and a heat-sink [124] being attached to the visible-light source

[102]. Additionally, the examples [100] of the lighting system may include a support assembly [123] being attached to the heat-sink [124] or to the visible-light source [102]. In the examples [100] of the lighting system, the support assembly [123] may be configured for securing the heat-sink [124] and the visible-light source [102] together at a plurality of selectable distances [125], [127], [129], [131] away from the light emission aperture [142]. As an example [100] of the lighting system, the support assembly [123] may be configured for securing the heat-sink [124] and the visible-light source [102] together at a plurality of selectable distances [125], [127], [129], [131] away from the light emission aperture [142] by providing teeth (not shown) on the heat-sink [124] or/and on posts [133], [135], [137], [139], for engaging the heat-sink [124] together with the posts [133], [135], [137], [139]. In some examples [100] of the lighting system, the support assembly [123] may include a plurality of the posts [133], [135], [137], [139] being mutually spaced apart, the posts [133], [135], [137], [139] being configured for being attached to the light emission aperture [142]. As examples [100], the lighting system may include a trim ring [141] being configured for defining the light emission aperture [142]; and the plurality of the selectable distances [125], [127], [129], [131] may compensate for a thickness [143] of the trim ring [141]. In further examples [100] of the lighting system, the trim ring [141] may be configured for being mounted at an aperture [X] in a boundary [Y] defined by a ceiling, a wall, or a floor; and the plurality of the selectable distances [125], [127], [129], [131] may compensate for a thickness [Z] of the boundary [Y]. In examples [100] of the lighting system, the support assembly [123] may facilitate mounting of the lighting system [100] in boundary structures [Y], such as a ceiling, having a range of thicknesses [Z], such as, for example, being within a range of between about one-half inch and about one-and-five-eighths inches. As further examples [100] of the lighting system, the support assembly [123] may allow the heat-sink [124] to be moved up and down in the [Z] direction; and may, at the same time, allow the visible-light source [102] to remain in a selected contact relationship with the trim ring [141]. In additional examples [100] of the lighting system, after the trim ring [141] has been removed, the heat-sink [124] may be caused to move down in the [Z] direction until reaching a hard stop, thereby bringing the visible-light source [102] close to a user for its removal and replacement. As other examples [100] of the lighting system, the visible-light source [102] may be caused to protrude from the aperture [X] in the boundary [Y], facilitating removal and replacement of the visible-light source [102] or of other components of the lighting system [100]. Referring to FIGS. ZAD-29 through ZAD-66, in examples [100] of the lighting system, the plurality of posts [133], [135], [137], [139] may include springs [164] for generating a force along the [Z] direction. In some of those examples [100] of the lighting system, the plurality of posts [133], [135], [137], [139] may include the springs [164] as being for generating an upwardly-directed force along the [Z] direction serving as a counterweight to the downward gravitational force of the heat-sink [124] and any other components of the lighting system [100] that may be attached to the heat-sink [124], such as, for example, the visible-light source [102]. In these examples [100] of the lighting system, the springs [164] may, as an example, permit the heat-sink [124] to be moved in the [Z] direction to any position along the distance [125], and the upward counterweight force of the springs [164] may then hold the heat-sink [124] in that position along the distance [125]. Further in these examples [100] of the lighting system, the upward counterweight force of the springs [164] may facilitate moving the heat-sink [124] in the [Z] direction downward toward the light emission aperture [142] to permit servicing of the examples [100] of the lighting system to be performed, such as replacement of the visible-light source [102] or of other components of the examples [100] of the lighting system. In those examples [100] of the lighting system, after the trim ring [141] has been removed, the springs [164] may permit the heat-sink [124] to be caused to move down in the [Z] direction to any selected position along the distance [125], thereby bringing the visible-light source [102] to a suitable position for its removal and replacement. As other examples [100] of the lighting system, the springs [164] may also permit the visible-light source [102] to be caused to protrude from the aperture [X] in the boundary [Y], further facilitating removal and replacement of the visible-light source [102] or of other components of the lighting system [100]. Further in those examples [100] of the lighting system, the upward counterweight force of the springs [164] in the [Z] direction may then permit the heat-sink [124] to be easily moved upward in the [Z] direction to any selected position along the distance [125]. In some examples [100] of the lighting system, each one of the posts [133], [135], [137], [139] may be received by a mounting bracket [166], the mounting bracket [166] being attached to the heat-sink [124] and having a track [199] shaped for receiving the post [133], [135], [137], [139] while permitting the heat-sink [124] to be moved in the [Z] direction along the track [199] relative to the post [133], [135], [137], [139]. Further in those examples [100] of the lighting system, the springs [164] may be constant-force springs [164] having a coiled portion [195] and an extended portion [196]. As an example, constant-force springs [164] having a tension-force rating being within a range of between about 0.5 pound and about 1.0 pound, or of about 0.5 pound, may be utilized. In another example, constant-force springs [164] may be utilized, collectively having a combined tension-force rating being about the same as the weight of the heat-sink [124] and any other components that may be attached to the heat-sink. Additionally in examples [100] of the lighting system, the coiled portion [195] of the constant-force springs [164] may be housed in a notch [197] forming a part of each one of the posts [133], [135], [137], [139]; and the extended portion [196] of the constant-force springs [164] may be retained in a track [T] defined between the posts [133], [135], [137], [139] and the mounting brackets [166]. As an example [100] of the lighting system, causing the springs [164] to facilitate moving the heat-sink [124] in the [Z] direction downward toward the light emission aperture [142] may cause the coiled portions [195] of the springs [164] to be unwound while the extended portions [196] are pulled downward along the track [T] in the [Z] direction away from the notch [197]. Further in the example [100] of the lighting system, the extended portion [196] of each one of the constant-force springs [164] may be attached to the mounting bracket [166] by a fastener such as a screw, being anchored to the mounting bracket [166] and passing through an aperture [198] in the extended portion [196] of the constant-force spring [164]. In some examples [100], the lighting system may include a cover [101A] for retaining the coiled portion [195] of the spring [164] within the notch [197] of the post [133], [135], [137], [139].

The Twist-Lock—Related Features

We now refer to FIGS. TWL1 to TWL26 on sheets 156-180 of the drawings, being screenshots of Twist-Lock-related features of the examples [100*a-d*] of the lighting system. In examples, the lighting system [100] may include a visible-light source [102] including a semiconductor light-emitting device, the visible-light source [102] being configured for generating visible-light emissions having a central light emission axis [104] from the semiconductor light-emitting device, the visible-light source [102] having a thermally-conductive surface [145]. As further examples, the lighting system [100] may include a heat-sink [124] having another thermally-conductive surface [147] being configured for being placed in thermally-conductive contact with the thermally-conductive surface [145] of the visible-light source [102]. In additional examples [100] of the lighting system, the another thermally-conductive surface [147] of the heat-sink [124] may have a Dzus-type fastener button [151]. Also in the examples [100] of the lighting system, the thermally-conductive surface [145] of the visible-light source [102] may have a Dzus-type cavity [153] containing a spring wire [155]. In examples [100] of the lighting system, the cavity [153] may be adapted for receiving the fastener button [151] and for rotation of the fastener button [151] within the cavity [153] to cause reversible deformation of the spring wire [155] for reversibly locking together the visible-light source [102] and the heat-sink [124]. In examples [100] of the lighting system, the cavity [153] may be likewise adapted for rotation of the fastener button [151] in an opposite direction within the cavity [153] to cause a reduction in the deformation of the spring wire [155] so that the visible-light source [102] may then be detached from the heat-sink [124]. In examples [100] of the lighting system, the spring wire [155] may be installed and held in place while crossing through the cavity [153]. As examples [100] of the lighting system, the spring wire [155] may be retained by mechanical interference within the cavity [153] inside the visible-light source [102]. As examples [100] of the lighting system, a compression force between the visible-light source [102] and the heat-sink [124] may be selected and tuned by an amount of deflection of the spring wire [155], or by selection of a spring wire [155] have a suitable diameter and spring tension properties, or by selecting a degree of deflection of the spring wire [155]. In examples [100] of the lighting system, an end of the spring wire [155] may fit into one end of the cavity [153], or one end of the spring wire [155] may be caused to be deformed by the rotation of the fastener button [151]. In examples [100] of the lighting system, the fastener button [151] and the cavity [153] may be mutually configured for their relative rotation by ninety (90) degrees around a mutual center axis [157]. In some examples [100] of the lighting system, the fastener button [151] and the cavity [153] may be mutually configured so that the cavity [153] may be adapted for receiving the fastener button [151] in one and only one specific relative orientation. As examples [100] of the lighting system, the cavity [153] may include a half-circled recess [159] being adapted to receive a lobe [161] located on the fastener button [151]. In further examples [100] of the lighting system, the spring wire [155] may have a deformation resistance being suitable to maintain a compression force between the locked-together visible-light source [102] and heat-sink [124], for effective heat dissipation. In examples [100] of the lighting system, the visible-light source [102] may be detached from the heat-sink [124] for purposes of replacement of the visible-light source [102] or to facilitate access to other internal components of the lighting system [100] for servicing, adjusting, or replacing such other internal components.

In further examples, the lighting system [100] may include a visible-light source [102] including a semiconductor light-emitting device, the visible-light source [102] being configured for generating visible-light emissions having a central light emission axis [104] from the semiconductor light-emitting device, the visible-light source [102] having a thermally-conductive surface [145]. As further examples, the lighting system [100] may include a heat-sink [124] having another thermally-conductive surface [147] being configured for being placed in thermally-conductive contact with the thermally-conductive surface [145] of the visible-light source [102]. In additional examples [100] of the lighting system, the another thermally-conductive surface [147] of the heat-sink [124] may have (not shown) a Dzus-type cavity [153] containing a spring wire [155]. Also in the examples [100] of the lighting system, the thermally-conductive surface [145] of the visible-light source [102] may have (not shown) a Dzus-type fastener button [151].

The Pluggable-Power-Supply—Related Features

We now refer to FIGS. PPS1 to PPS43 on sheets 181-223 of the drawings, being screenshots of Pluggable Power Supply-related features of the examples [100*a-d*] of the lighting system. In examples, the lighting system [100] may include a visible-light source [102] including a semiconductor light-emitting device, the visible-light source [102] being configured for generating visible-light emissions having a central light emission axis [104] from the semiconductor light-emitting device. In examples [100], the lighting system may include a power supply assembly [163] including conventional electrical circuitry for receiving a power input and a control signal input and for generating a power output being suitable for driving the semiconductor light-emitting device of the visible-light source [102]. In examples [100], the power supply assembly [163] may include an output power tail (not shown) for delivering power to the semiconductor light-emitting device of the visible-light source [102]. Additionally in the examples [100], the lighting system may include a receptacle [165] for self-aligning and reversible installation of the power supply assembly [163]; and the receptacle [165] may have guide walls [167], [169] with lead-ins [171], [173]. As examples, an internal end of the receptacle [165] may include a male pin block for carrying input power and a control signal into a female pin block located at an inner end of the power supply assembly [163]. In some examples [100] of the lighting system, the receptacle [165] may have a thermally-conductive surface [175] for heat dissipation. Further in the examples [100] of the lighting system, the receptacle [165] may have a spring clip [177], [179], [181] for compressing the power supply assembly [163] towards the thermally-conductive surface [175]. In an example [100] of the lighting system, the thermally-conductive surface [175] may have a compressible gap-pad [183] for increasing thermal conductivity between the power supply assembly [163] and the thermally-conductive surface [175]. In examples [100] of the lighting system, the compressible gap-pad [183] may contribute to forming a thermally-conductive pathway for causing dissipation of heat from the power supply assembly [163] through a heat-sink [124] or a housing of the lighting system [100]. In an example [100] of the lighting system, the receptacle [165] may be shaped for receiving the power supply assembly [163] in one and only one specific orientation, such that, as examples, the power supply assembly [163] cannot be inserted into the receptacle [165] in another orientation being upside down or backwards. In examples [100] of the lighting system, the visible-light source [102] may be configured for reversible attachment in the lighting system [100]. As examples [100] of the lighting system, the power supply assembly [163] may be accessible for installation and removal upon detachment of the visible-light source [102] from the lighting system [100]. As examples of the lighting system [100], in a field replacement situation, a user may need to gain access into the lighting system [100] and may need the ability to reach and then replace the power supply assembly [163]. In examples [100] of the lighting system, the power supply assembly [163] and the receptacle [165] may be mutually configured so that the power supply assembly [163] is in the user's line of sight, in harmony with human factors such as visibility and feasibility of manually reaching, removing, and replacing the power supply assembly [163].

The Wall-Wash—Related Features

We now refer to FIGS. WAW1 to WAW26 on sheets 224-249 of the drawings, being screenshots of Wall Wash-related features of the examples [100*a-d*] of the lighting system. In examples, the Lighting System [100] may include the Wall-Wash—Related Features. In examples [100] of the lighting system, wall-wash illumination may be achieved by inserting a wall wash insert into position relative to the visible-light source [102]. As examples [100] of the lighting system, the wall-wash inserts may be attached to a front surface of a trim ring [141] and may be secured there via a series of clips. As an example [100] of the lighting system, the Wall-Wash—Related Features may facilitate the addition of wall-wash capability to the lighting system simply by such attachment of the wall-wash insert; and likewise may facilitate simple removal of the wall wash insert in the field.

The Example [200] of Another Lighting System

We now refer to FIGS. RMD1 to RMD14 on sheets 250-263 of the drawings, being screenshots of features of examples [200] of another lighting system. In examples, the lighting system [200] may include a visible-light source [202] including a semiconductor light-emitting device, the visible-light source [202] being configured for generating visible-light emissions having a central light emission axis [204] from the semiconductor light-emitting device. Further, the lighting system [200] may include a pan assembly [206] having the same components and functional operation as the pan assembly [106] earlier discussed, the pan assembly [206] having a pan ring (not shown), a pinion gear (not shown), and a central fixed gear (not shown). In examples of the lighting system [200], rotating the pinion gear may cause the pan ring to be rotated around a pan axis through a range of rotation around the central fixed gear. As examples, the lighting system [200] may include a heat-sink [224] being attached to the visible-light source [202]. Further, the example [200] of the lighting system may include a tilt assembly [226] including a tilt adjustment screw [228], a leadscrew [230], and two spaced-apart panels [232], [234] each having an arcuate slot [236], [238], the arcuate slots [236], [238] being mutually concentric and collectively defining an arcuate tilt path [240], the heat-sink [224] being movably attached to the arcuate slots [236], [238]. Additionally in the examples [200] of the lighting system, the tilt adjustment screw [228] may be configured for driving the leadscrew [230] to cause movement of the heat-sink [224] to a selected position along the tilt path [240]; and movement of the heat-sink [224] along the tilt path [240] may cause the visible-light source [202] to be moved along the tilt path [240]. It is understood that the lighting system [200] may include any of the PAN—Related Features, any of the TILT—Related Features, and any of the Universal-Joint—Related Features earlier discussed. Accordingly, the discussions above regarding the PAN-, TILT-, and Universal-Joint—Related Features, together with FIGS. PAN1 to PAN34, TLT1 to TLT32, and UJT1 to UJT27 are all deemed to be incorporated into this discussion of the example [200] of the lighting system.

While the present invention has been disclosed in a presently defined context, it will be recognized that the present teachings may be adapted to a variety of contexts consistent with this disclosure and the claims that follow. For example, the lighting systems and processes shown in the figures and discussed above can be adapted in the spirit of the many optional parameters described.

We claim:

1. A lighting system, comprising:

a visible-light source including a semiconductor light-emitting device, the visible-light source being configured for generating visible-light emissions having a central light emission axis from the semiconductor light-emitting device;

a tilt adjustment screw;

a leadscrew;

a universal joint assembly linking together the tilt adjustment screw and the leadscrew, the universal joint assembly including a gimbal and a swing bar having swing arms, the swing bar being in threaded engagement with the leadscrew, the tilt adjustment screw being attached to the gimbal;

wherein the swing arms are connected with the visible-light source; and wherein the tilt adjustment screw is configured for causing the universal joint assembly to drive the leadscrew for movement of the visible-light source to a selected position along a tilt path.

2. The lighting system of claim 1, wherein the universal joint assembly facilitates movement of the visible-light source and the leadscrew together along the tilt path while maintaining the tilt adjustment screw at a fixed location in the lighting system.

3. The lighting system of claim 1, wherein the gymbal includes two yokes each having a pair of trunnions, the yokes being attached together by a cross for rotation in two orthogonal degrees of freedom.

4. The lighting system of claim 3, wherein the cross is attached to both of the yokes by pins inserted in apertures of the trunnions.

5. The lighting system of claim 3, wherein the cross is encapsulated.

6. The lighting system of claim 3, wherein the trunnions have cut-back shoulders for defining ranges of motion in the two degrees of freedom.

7. The lighting system of claim 1, further including a bracket being located on the leadscrew between the gymbal and the swingbar, the bracket being freely rotatable around the leadscrew, and the bracket forming an attachment of the tilt adjustment screw to the lighting system.

8. The lighting system of claim 1, wherein the swing arms are configured for free rotation around the swing bar on an axis being perpendicular to a longitudinal axis of the leadscrew.

9. The lighting system of claim 8, wherein the swing bar has two posts being located on opposing sides of the swing bar, and wherein each of the swing arms has an aperture being mounted on a one of the posts.

10. The lighting system of claim 8, wherein the swing bar has two cavities being located on opposing sides of the swing bar, and wherein each of the swing arms has a post being inserted into a one of the cavities.

11. The lighting system of claim 1, further including a locking screw being configured for locking the visible-light source at a selected position along the tilt path.

* * * * *